US006816497B1

(12) United States Patent
Boldt et al.

(10) Patent No.: US 6,816,497 B1
(45) Date of Patent: Nov. 9, 2004

(54) SYSTEM AND METHOD FOR PROCESSING A CALL

(75) Inventors: Dean C. Boldt, Parkville, MO (US); Jason P. Torrey, Overland Park, KS (US); R. Dean Howell, Trimble, MO (US); Bruce F. Salisbury, Olathe, KS (US); William L. Wiley, Atlanta, GA (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/435,534

(22) Filed: Nov. 5, 1999

(51) Int. Cl.[7] .......................... H04L 12/28; H04L 12/56

(52) U.S. Cl. ........................................ 370/410; 370/467

(58) Field of Search ................................ 370/467, 375, 370/54, 401, 211, 269, 522, 395.5, 395.52, 395.6, 352, 354; 379/211, 269, 221.06

(56) References Cited

U.S. PATENT DOCUMENTS

| | | | |
|---|---|---|---|
| 4,201,889 A | 5/1980 | Lawrence et al. | |
| 4,310,727 A | 1/1982 | Lawser | |
| 4,348,554 A | 9/1982 | Asmuth | |
| 4,453,247 A | 6/1984 | Suzuki et al. | |
| 4,565,903 A | 1/1986 | Riley | |
| 4,683,584 A * | 7/1987 | Chang et al. | 379/269 |
| 4,686,669 A * | 8/1987 | Chang | 370/375 |
| 4,686,701 A * | 8/1987 | Ahmad et al. | 379/211.03 |
| 4,720,850 A | 1/1988 | Oberlander | |
| 4,736,364 A | 4/1988 | Basso et al. | |
| 4,748,658 A | 5/1988 | Gopal et al. | |
| 4,763,317 A | 8/1988 | Lehman | |
| 4,926,416 A | 5/1990 | Weik | |
| 4,979,118 A | 12/1990 | Kheradpir | |
| 4,991,204 A | 2/1991 | Yamamoto et al. | |
| 4,993,014 A | 2/1991 | Gordon | |
| 5,018,191 A | 5/1991 | Catron et al. | |
| 5,058,104 A | 10/1991 | Yonehara et al. | |
| 5,067,123 A | 11/1991 | Hyodo et al. | |
| 5,084,867 A | 1/1992 | Tachibana et al. | |
| 5,089,954 A | 2/1992 | Rago | |
| 5,101,404 A | 3/1992 | Kunimoto et al. | |
| 5,115,427 A | 5/1992 | Johnson, Jr. et al. | |
| 5,115,431 A | 5/1992 | Williams et al. | |
| 5,182,550 A | 1/1993 | Masuda et al. | |
| 5,204,857 A | 4/1993 | Obara | |
| 5,216,669 A | 6/1993 | Hofstetter et al. | |
| 5,218,602 A | 6/1993 | Grant et al. | |
| 5,239,539 A | 8/1993 | Uchida et al. | |
| 5,249,178 A | 9/1993 | Kurano et al. | |
| 5,251,255 A | 10/1993 | Epley | |
| 5,255,266 A | 10/1993 | Watanabe et al. | |

(List continued on next page.)

OTHER PUBLICATIONS

Choi, Requirements For ATM Trunking, ATM Forum Techincal Committee 95–1401, Oct. 2–6, 1995.

Ohta, S., et al., A Dynamically Controllable ATM Transport Network Based On The Virtual Path Concept, pp. 1272–1276, Communications For The Information Age, Globecom '88, Conference Record, vol. III, Nov. 28–Dec. 1, 1988.

(List continued on next page.)

*Primary Examiner*—Wellington Chin
*Assistant Examiner*—Jamal A. Fox

(57) ABSTRACT

The invention comprises a telecommunications signaling processor that processes signaling system #7 telecommunications signaling messages to select asynchronous transfer mode connections and time division multiplex connections and to provide control messages indicating the selected connections. The telecommunications signaling processor also processes non-call associated signaling messages for call maintenance.

97 Claims, 301 Drawing Sheets

U.S. PATENT DOCUMENTS

| | | | | | |
|---|---|---|---|---|---|
| 5,289,536 | A | | 2/1994 | Hokari | |
| 5,291,479 | A | | 3/1994 | Vaziri et al. | |
| 5,291,492 | A | | 3/1994 | Andrews et al. | |
| 5,327,421 | A | | 7/1994 | Hiller et al. | |
| 5,339,318 | A | | 8/1994 | Tanaka et al. | |
| 5,377,186 | A | | 12/1994 | Wegner et al. | |
| 5,384,771 | A | | 1/1995 | Isidoro et al. | |
| 5,392,402 | A | | 2/1995 | Robrock, II | |
| 5,420,857 | A | | 5/1995 | Jurkevich | |
| 5,422,882 | A | | 6/1995 | Hiller et al. | |
| 5,425,090 | A | | 6/1995 | Orriss | |
| 5,428,607 | A | | 6/1995 | Hiller et al. | |
| 5,428,609 | A | | 6/1995 | Eng et al. | |
| 5,434,852 | A | | 7/1995 | La Porta et al. | |
| 5,440,563 | A | | 8/1995 | Isidoro et al. | |
| 5,446,738 | A | | 8/1995 | Kim et al. | |
| 5,452,296 | A | | 9/1995 | Shimizu | |
| 5,452,297 | A | | 9/1995 | Hiller et al. | |
| 5,459,721 | A | | 10/1995 | Yoshida | |
| 5,461,669 | A | | 10/1995 | Vilain | |
| 5,469,501 | A | | 11/1995 | Otsuka | |
| 5,473,679 | A | | 12/1995 | La Porta et al. | |
| 5,479,495 | A | | 12/1995 | Blumhardt | |
| 5,483,527 | A | | 1/1996 | Doshi et al. | |
| 5,495,484 | A | | 2/1996 | Self et al. | |
| 5,499,290 | A | | 3/1996 | Koster | |
| 5,509,010 | A | | 4/1996 | La Porta et al. | |
| 5,509,123 | A | | 4/1996 | Dobbins et al. | |
| 5,513,180 | A | | 4/1996 | Miyake et al. | |
| 5,513,355 | A | | 4/1996 | Doellinger et al. | |
| 5,521,910 | A | | 5/1996 | Matthews | |
| 5,526,359 | A | | 6/1996 | Read et al. | |
| 5,526,414 | A | | 6/1996 | Bedard et al. | |
| 5,530,724 | A | | 6/1996 | Abrams et al. | |
| 5,539,815 | A | | 7/1996 | Samba | |
| 5,539,884 | A | | 7/1996 | Robrock, II | |
| 5,541,917 | A | | 7/1996 | Farris | |
| 5,544,152 | A | | 8/1996 | Obermanns et al. | |
| 5,550,914 | A | | 8/1996 | Clarke et al. | |
| 5,568,475 | A | | 10/1996 | Doshi et al. | |
| 5,572,583 | A | | 11/1996 | Wheeler, Jr. et al. | |
| 5,579,311 | A | | 11/1996 | Chopping et al. | |
| 5,583,849 | A | | 12/1996 | Ziemann et al. | |
| 5,586,177 | A | | 12/1996 | Farris et al. | |
| 5,600,640 | A | | 2/1997 | Blair et al. | |
| 5,600,643 | A | | 2/1997 | Robrock, II | |
| 5,627,836 | A | | 5/1997 | Conoscenti et al. | |
| 5,629,930 | A | | 5/1997 | Beshai et al. | |
| 5,629,938 | A | | 5/1997 | Cerciello et al. | |
| 5,636,261 | A | | 6/1997 | Fils | |
| 5,640,446 | A | | 6/1997 | Everett et al. | |
| 5,666,349 | A | | 9/1997 | Petri | |
| 5,680,390 | A | | 10/1997 | Robrock, II | |
| 5,703,876 | A | | 12/1997 | Christie | |
| 5,708,702 | A | | 1/1998 | De Paul et al. | |
| 5,710,769 | A | | 1/1998 | Anderson et al. | |
| 5,751,706 | A | | 5/1998 | Land | |
| 5,765,108 | A | | 6/1998 | Martin et al. | |
| 5,796,813 | A | | 8/1998 | Sonnenberg | |
| 5,802,045 | A | | 9/1998 | Kos | |
| 5,825,780 | A | | 10/1998 | Christie | |
| 5,835,584 | A | | 11/1998 | Penttonen | |
| 5,867,495 | A | | 2/1999 | Elliott et al. | |
| 5,867,562 | A | | 2/1999 | Scherer | |
| 5,867,570 | A | | 2/1999 | Bargout et al. | |
| 5,867,571 | A | | 2/1999 | Borchering | |
| 5,889,848 | A | | 3/1999 | Cookson | |
| 5,920,562 | A | | 7/1999 | Christie et al. | |
| 5,926,482 | A | | 7/1999 | Christie | |
| 5,940,487 | A | | 8/1999 | Bunch et al. | |
| 5,940,491 | A | | 8/1999 | Anderson et al. | |
| 5,953,338 | A | | 9/1999 | Ma | |
| 5,982,783 | A | | 11/1999 | Frey et al. | |
| 5,991,301 | A | | 11/1999 | Christie | |
| 6,002,689 | A | * | 12/1999 | Christie et al. | 370/401 |
| 6,005,845 | A | | 12/1999 | Svennesson et al. | |
| 6,016,343 | A | | 1/2000 | Hogan et al. | |
| 6,023,474 | A | * | 2/2000 | Gardner et al. | 370/467 |
| 6,031,840 | A | | 2/2000 | Christie et al. | |
| 6,061,364 | A | | 5/2000 | Hager et al. | |
| 6,088,749 | A | | 7/2000 | Hebert et al. | |
| 6,098,094 | A | | 8/2000 | Barnhouse et al. | |
| 6,181,703 | B1 | | 1/2001 | Christie et al. | |
| 6,298,043 | B1 | | 10/2001 | Mauger et al. | |
| 6,324,179 | B1 | | 11/2001 | Doshi et al. | |
| 6,459,788 | B1 | * | 10/2002 | Khuc et al. | 379/265.09 |
| 6,496,512 | B1 | * | 12/2002 | Medhat | 370/410 |
| 6,597,701 | B1 | * | 7/2003 | Howell | 370/410 |

OTHER PUBLICATIONS

Duault, Proposal For ATM Trunking Options, ATM Forum Technical Committee, 95–1230, Oct. 2–6, 1995.

Caves, Proposed modifications to the baseline text (95–0446R2) of the "VTOA—ATM Trunking For Narrowband Services" Specification, ATM Forum Technical Committee 95–1134, Oct. 2–6, 1995.

Amin–Salehi, "Third Party Call Setup For A Video–On–Demand Connection Establishment", ATM Forum Technical Committee 95–0022, Feb. 5–8, 1995.

Barr, W.J., et al., The TINA Initiative, IEEE Communications Magazine, vol. 31, No. 3, New York (US), pp. 70–76, Mar. 1993.

Weisser, F. J., et al., The Intelligent Network and Forward––Looking Technology, IEEE Communications Magazine, vol. 26, No. 12, Dec. 1988, New York, (US), pp. 64–69, Dec., 1988.

"IN/B–ISDN Signaling Three Ways Of Integration," Study Group 11, Geneva, ITU—Telecommunication Standardization Sector, Nov. 29–Dec. 17, 1993.

General Recommendations On Telephone Switching And Signaling Intelligent Network—Intelligent Network Distributed Functional Plane Architecture, Q.1204, ITU–T—Mar. 1993.

General Recommendations On Telephone Switching And Signaling Intelligent Network–Intelligent Network Physical Plane Architecture Q.1205, ITU–T Recommendation, Telecommunication Standardization Sector of ITU.

"General Recommendations On Telephone Switching And Signaling—Intelligent Network/Distributed Functional Plane For Intelligent Network CS–1," ITU–T Recommendation Q.1214, ITU—Telecommunication Standardization Sector.

"Revised Draft Of Q.2650 (DSS2/B–ISUP Interworking Recommendation)," Study Group 11, Geneva, ITU—Telecommunication Standardization Sector, Nov. 29–Dec. 17, 1993.

"Final B–ISUP SDLS," Study Group 11, Geneva ITU—Telecommunication Standardization Sector, Nov. 29–Dec. 17, 1993.

"Revised Q.2931 Network Side SDL Diagrams," Study Group 11, ITU—Telecommunication Standardization Sector, Nov. 29–Dec. 17, 1993.

ITU—Telecommunication Standardization Sector, Study Group 13, "Draft Revised Recommendation 1.580," Geneva, ITU—Telecommunication Standardization Sector, Study Group 13, Jul. 10–21, 1995.

"Final Draft Text For Broadband Capability Set 2 Signaling Requirements," Study Group 11 Attachment "D" Special Drafting Meeting, pp. 1–127, Torino, Italy, ITU–T Telecommunications Standardization Sector, Sep. 13–22, 1993.

"Report Of The Meeting Of SWP 13/1–4", Study Group 13, Temporary Document 46 (13/1), ITUT, Mar. 1994.

Beckman, Richard T. and Matthews, Joseph R., "Proposal For A Physical Architecture Based On The Harmonized Functional Architecture," Committee T1 Contribution T1S1.5/95–027, Bellcore,. Feb. 20, 1995.

Buhrke, Proposed Unified Functional Model, T1S1.5/95–036, Feb. 1995.

Faynberg, I., et al., "The Support Of Network Interworking And Distributed Context Switching In The In Service Data Function Model," pp. 11–16, , 2nd Collogue International, ICIN 92, Mar. 1992.

Fukazawa, M., et al., "Intelligent Network Call Model For Broadband ISDN," pp. 30.6.1–30.6.5, Fujitsu Laboratories Ltd., Japan.

Minoli, Daniel/DVI Communications, Inc./Stevens Institute of Technology and Dobrowski, George/Bell Communications Research (Bellcore), Principles Of Signaling For Cell Relay And Frame Relay © pp. 1–2, 5–6 and 229, 1994.

"Network Signaling," Telephony, TCX12004, University of Excellence, pp. 5.8–5.17, Oct. 21, 1991.

McKinney, Scott, "ATM for Narrowband Services" IEEE Communications Magazine, Apr., 1994, New York, US, pp. 64–72.

Ahmad, K., "Meeting Report on Q.18/15", Study Group 15, Nov. 13–24, 1995, Geneva.

Helen A. Bauer, John J. Kulzer, Edward G. Sable, "Designing Service–Independent Capabilities for Intelligent Networks," IEEE, Dec. 1988, pp. 31–41.

ITU–T Q.1219, "Intelligent Network User's Guide For Capability Set 1," Apr., 1994.

Thorner, "Intelligent Networks, Capter 2," 1994, Artech House, pp. 11–107.

ITU–T, Recommendation Q.722, "Specifications of Signalling System No. 7, General Function of Telephone Messages and Signals," 1993.

* cited by examiner

| TRUNK GROUP NUMBER | GROUP MEMBER | TCIC | EC LABEL | IWU LABEL | IWU PORT | DS1/E1 LABEL | DS1/E1 CHANNEL | INITIAL STATE |
|---|---|---|---|---|---|---|---|---|
| | | | | | | | | |
| | | | | | | | | |

FIG. 12

| TRUNK GROUP NUMBER | GROUP SIZE | STARTING CIC | TRANSMIT INTERFACE LABEL | TRANSMIT VPI | RECEIVE INTERFACE LABEL | RECEIVE VPI | INITIAL STATE |
|---|---|---|---|---|---|---|---|
| | | | | | | | |
| | | | | | | | |

FIG. 13

| TRUNK GROUP NUMBER | ADMIN INFORMATION | ASSOCIATED POINT CODE | CLLI | TRUNK TYPE | ASSOCIATED NPA | ASSOCIATED JIP | TIME ZONE LABEL | ECHO CANCELLER INFORMATION |
|---|---|---|---|---|---|---|---|---|
| | | | | | | | | |
| | | | | | | | | |

FIG. 14A

| SATELLITE | SELECT SEQUENCE | IWU PRIORITY | GLARE RESOLUTION | CONTINUITY CONTROL | REATTEMPTS | IGNORE LNP INFORMATION | TREATMENT LABEL | MESSAGE MAPPING LABEL |
|---|---|---|---|---|---|---|---|---|
| | | | | | | | | |
| | | | | | | | | |

FIG. 14B

| QUEUE | RING NO ANSWER | VOICE PATH CUT THROUGH | ORIGINATING COS LABEL | TERMINATING COS LABEL | CALL CONTROL | NEXT FUNCTION | NEXT LABEL |
|---|---|---|---|---|---|---|---|
| | | | | | | | |
| | | | | | | | |

FIG. 14C

| CARRIER LABEL | CARRIER ID | CARRIER SELECTION | NEXT FUNCTION | NEXT LABEL |
|---|---|---|---|---|
| | | | | |
| | | | | |

FIG. 15

| EXCEPTION LABEL | CALLING PARTY'S CATEGORY | CALLED NUMBER | | | NEXT FUNCTION | NEXT LABEL |
|---|---|---|---|---|---|---|
| | | NATURE OF ADDRESS | DIGITS FROM | DIGITS TO | | |
| | | | | | | |
| | | | | | | |

FIG. 16

| OLI LABEL | ORIGINATION LINE INFORMATION | NEXT FUNCTION | NEXT LABEL |
|---|---|---|---|
| | | | |
| | | | |

FIG. 17

| ANI LABEL | CHARGE CALLING PARTY NUMBER | | TIME ZONE LABEL | CUSTOMER INFORMATION | EC INFORMATION | QUEUE | TREATMENT LABEL | NEXT FUNCTION | NEXT LABEL |
|---|---|---|---|---|---|---|---|---|---|
| | DIGITS FROM | DIGITS TO | | | | | | | |
| | | | | | | | | | |
| | | | | | | | | | |

FIG. 18

| CALLED NUMBER SCREENING LABEL | CALLED NUMBER | | | DELETE DIGITS | NEXT FUNCTION | NEXT LABEL |
|---|---|---|---|---|---|---|
| | NATURE OF ADDRESS | DIGITS FROM | DIGITS TO | | | |
| | | | | | | |
| | | | | | | |

FIG. 19

| CALLED NUMBER LABEL | CALLED NUMBER | | | NEXT FUNCTION | NEXT LABEL |
|---|---|---|---|---|---|
| | NATURE OF ADDRESS | DIGITS FROM | DIGITS TO | | |
| | | | | | |
| | | | | | |

FIG. 20

| DAY OF LABEL | DATE | NEXT FUNCTION | NEXT LABEL |
|---|---|---|---|
| | | | |
| | | | |

FIG. 21

| DAY OF WEEK | DAY FROM | DAY TO | NEXT FUNCTION | NEXT LABEL |
|---|---|---|---|---|
| | | | | |
| | | | | |

FIG. 22

| TIME OF DAY LABEL | TIME FROM | TIME TO | NEXT FUNCTION | NEXT LABEL |
|---|---|---|---|---|
| | | | | |
| | | | | |

FIG. 23

| TIME ZONE LABEL | UTC OFFSET | DAYLIGHT SAVING |
|---|---|---|
| | | |
| | | |

FIG. 24

| ROUTING LABEL | ROUTE NUMBER | NEXT FUNCTION | NEXT LABEL | SIGNAL ROUTE LABEL |
|---|---|---|---|---|
| | | | | |
| | | | | |

*FIG. 25*

| ORIGINATING TRUNK COS LABEL | TERMINATING TRUNK COS LABEL | NEXT FUNCTION | NEXT LABEL |
|---|---|---|---|
| | | | |
| | | | |

*FIG. 26*

| TREATMENT LABEL | ERROR/CAUSE LABEL | NEXT FUNCTION | NEXT LABEL |
|---|---|---|---|
| | | | |
| | | | |

*FIG. 27*

| OUTGOING RELEASE LABEL | OUTGOING CAUSE VALUE | | |
|---|---|---|---|
| | LOCATION | CODING STANDARD | CAUSE VALUE |
| | | | |
| | | | |

*FIG. 28*

| PERCENT LABEL | CONTROL PERCENTAGE | CONTROL | | PASSED | |
|---|---|---|---|---|---|
| | | NEXT FUNCTION | NEXT LABEL | NEXT FUNCTION | NEXT LABEL |
| | | | | | |
| | | | | | |

*FIG. 29*

| CALL RATE LABEL | CALL RATE | CONTROL | | PASSED | |
|---|---|---|---|---|---|
| | | NEXT FUNCTION | NEXT LABEL | NEXT FUNCTION | NEXT LABEL |
| | | | | | |
| | | | | | |

FIG. 30

| DATABASE SERVICES LABEL | SERVICE TYPE | SCCPE LABEL | TCAP LABEL | NEXT FUNCTION | NEXT LABEL |
|---|---|---|---|---|---|
| | | | | | |
| | | | | | |

FIG. 31

| SCCP LABEL | MESSAGE TYPE | PROTOCOL CLASS | MESSAGE HANDLING | HOP COUNTER | SEGMENTATION |
|---|---|---|---|---|---|
| | | | | | |
| | | | | | |

FIG. 32A

| ISNI | | | |
|---|---|---|---|
| ISNI TYPE | ROUTE INDICATOR | MARK INDICATOR | LABEL |
| | | | |
| | | | |

FIG. 32B

| CALLED PARTY ADDRESS | | | | | | | | | | |
|---|---|---|---|---|---|---|---|---|---|---|
| ADDRESS INDICATOR | | | | | SUB | POINT | GLOBAL TITLE | | | |
| SSN | POINT CODE | GLOBAL TITLE INDICATOR | ROUTING INDICATOR | NATIONAL/ INTERNATIONAL | SYSTEM NUMBER | CODE NUMBER | TRANSLATION TYPE | ENCODE SCHEME | NUMBER PLAN | ADDRESS TYPE |
| | | | | | | | | | | |
| | | | | | | | | | | |

FIG. 32C

| CALLING PARTY ADDRESS | | | | | | | | | | |
|---|---|---|---|---|---|---|---|---|---|---|
| ADDRESS INDICATOR | | | | | SUB SYSTEM NUMBER | POINT CODE NUMBER | GLOBAL TITLE | | | |
| SSN | POINT CODE | GLOBAL TITLE INDICATOR | ROUTING INDICATOR | NATIONAL/ INTERNATIONAL | | | TRANSLATION TYPE | ENCODE SCHEME | NUMBER PLAN | ADDRESS TYPE |
| | | | | | | | | | | |
| | | | | | | | | | | |

*FIG. 32D*

| ISNI LABEL | NETWORK 1 | NETWORK 2 | NETWORK 3 | NETWORK . . . | NETWORK 16 |
|---|---|---|---|---|---|
| | | | | | |
| | | | | | |

*FIG. 33*

| TCAP LABEL | TCAP TYPE | TAG CLASS | PACKAGE TYPE | COMPONENT TYPE | MESSAGE TYPE |
|---|---|---|---|---|---|
| | | | | | |
| | | | | | |

*FIG. 34*

| ECHO CANCELLER LABEL | ECHO CANCELLER TYPE | RS-232 ADDRESS | MODULE |
|---|---|---|---|
| | | | |
| | | | |

*FIG. 35*

| IWU LABEL | IWU ID | IP SOCKET 1 | IP SOCKET 2 | IP SOCKET 3 | IP SOCKET 4 |
|---|---|---|---|---|---|
| | | | | | |
| | | | | | |

*FIG. 36*

| CAM INTERFACE LABEL | CAM LABEL | LOGICAL INTERFACE |
|---|---|---|
| | | |
| | | |

FIG. 37

| CAM LABEL | CAM TYPE | CAM ADDRESS |
|---|---|---|
| | | |
| | | |

FIG. 38

| OFFICE CLLI NAMEL | SITE NODE ID | ORIGINATION ID | SOFTWARE ID | CALL PROCESSOR ID |
|---|---|---|---|---|
| | | | | |
| | | | | |

FIG. 39A

| ACC ENABLED | ACL 1 ONSET | ACL 1 ABATE | ACL 2 ONSET | ACL 2 ABATE | ACL 3 ONSET | ACL 3 ABATE |
|---|---|---|---|---|---|---|
| | | | | | | |
| | | | | | | |

FIG. 39B

| MAX TRUNKS OHQ | OHQ TQ1 | OHQ TQ2 | RING NO ANSWER TIMER | BILLING ACTIVE | NWM ALLOWT | BILLING FAILURE FREE CALL |
|---|---|---|---|---|---|---|
| | | | | | | |
| | | | | | | |

FIG. 39C

| MAX HOP COUNTS | MAX TABLE LOOKUPS |
|---|---|
| | |
| | |

FIG. 39D

| AIN EVENT PARAMETERS LABEL | MESSAGE NAME #1 | MESSAGE NAME #.... | MESSAGE NAME #N |
|---|---|---|---|
| ACCESS CODE | | | |
| ACG ENCOUNTERED | | | |
| ALTERNATE BILLING INDICATOR | | | |
| ALTERNATE TRUNK GROUP | | | |
| AMA ALTERNATE BILLING NUMBER | | | |
| AMA BUSINESS CUSTOMER ID | | | |
| AMA DIGITS DIALED WC | | | |
| AMA LINE NUMBER | | | |
| AMA SLPID | | | |
| AMP | | | |
| ANSWER INDICATOR | | | |
| BEARER CAPABILITY | | | |
| BUSY CAUSE | | | |
| CALLED PARTY ID | | | |
| CALLED PARTY STATION TYPE | | | |
| CALLING PARTY BGID | | | |
| CARRIER | | | |
| CHARGE NUMBER | | | |
| CHARGE PARTY STATION TYPE | | | |
| CLEAR CAUSE | | | |
| COLLECTED ADDRESS INFORMATION | | | |
| COLLECTED DIGITS | | | |
| CONTROLLING LEG TREATMENT | | | |
| DISCONNECT FLAG | | | |
| DISPLAY TEXT | | | |
| FACILITY GID (TRUNK GROUP ID) | | | |
| FACILITY GID (PRIVATE FACILITY GID) | | | |
| FACILITY GID (ROUTE INDEX) | | | |
| FACILITY MEMBER ID | | | |
| FAILURE CAUSE | | | |
| GENERIC NAME | | | |
| ISDN INTERFACE ID | | | |
| LATA | | | |
| ORIGINAL CALLED PARTY ID | | | |
| OUTPULSE NUMBER | | | |
| OVERFLOW BILLING NUMBER | | | |
| PASSIVE LEG TREATMENT | | | |
| PRIMARY BILLING INDICATOR | | | |
| PRIMARY CARRIER | | | |
| PRIMARY TRUNK GROUP | | | |
| REDIRECTING PARTY ID | | | |
| REDIRECTION INFORMATION | | | |
| RESOURCE TYPE | | | |
| SECOND ALTERNATE BILLING INDICATOR | | | |
| SECOND ALTERNATE CARRIER | | | |
| SECOND ALTERNATE TRUNK GROUP | | | |
| SPID | | | |
| STR PARAMETER BLOCK | | | |

*FIG. 40A*

| AIN EVENT PARAMETERS LABEL | MESSAGE NAME #1 | MESSAGE NAME #.... | MESSAGE NAME #N |
|---|---|---|---|
| TCM | | | |
| TRIGGER CRITERIA TYPE | | | |
| USER ID | | | |
| VERTICAL SERVICE CODE | | | |
| APPLICATION ERROR STRING | | | |
| ERROR CAUSE | | | |
| FAILED MESSAGE | | | |
| CONNECT TIME | | | |
| CONTROL CAUSE INDICATOR | | | |
| ECHO DATA | | | |
| FACILITY STATUS | | | |
| GAP DURATION | | | |
| GAP INTERVAL (NATIONAL GAP INTERVAL) | | | |
| GAP INTERVAL (PRIVATE GAP INTERVAL) | | | |
| GLOBAL TITLE VALUE | | | |
| MONITOR TIME | | | |
| STATUS CAUSE | | | |
| TERMINATION INDICATOR | | | |
| TRANSLATION TYPE | | | |
| TRIGGER CRITERIA FLAG | | | |

*FIG. 40B*

| MESSAGE TYPE | PARAMETERS | INDEX #1 | INDEX #.... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | PRIVATE OPTIONAL | | | |
| ANSWER | ACCESS TRANSPORT | | | |
| | BACKWARD CALL INDICATOR | | | |
| | PRIVATE OPTIONAL | | | |
| CALL PROGRESS | NOTIFICATION | | | |
| | BACKWARD CALL INDICATOR | | | |
| | ACCESS TRANSPORT | | | |
| | CAUSE INDICATOR | | | |
| | BACKWARD CALL INDICATOR | | | |
| CIRCUIT VALIDATION | CIRCUIT ID NAME | | | |
| RESPONSE MESSAGE | | | | |
| | CLLI CODE | | | |
| CONTINUITY | CONTINUITY INDICATOR | | | |
| EXIT | DISPOSITION | | | |
| | TRUNK GROUP NUMBER | | | |
| | SEND BACK EXIT MESSAGE | | | |
| INITIAL ADDRESS | FORWARD CALL INDICATOR | | | |
| | CALLING PARTY'S CATEGORY | | | |
| | GENERIC ADDRESS PARAMETER (LNP) | | | |
| | CALLED PARTY NUMBER | | | |
| | CALLING PARTY NUMBER | | | |
| | GENERIC DIGITS | | | |
| | CHARGE NUMBER | | | |
| | ORIGINATING LINE INFORMATION | | | |
| | TRANSIT NETWORK SELECTION | | | |
| | CARRIER SELECTION INFORMATION | | | |
| | ORIGINATING LINE INFORMATION | | | |
| | SERVICE CODE | | | |
| | CARRIER IDENTIFICATION | | | |
| | ORIGINAL CALLED NUMBER | | | |
| | REDIRECTING NUMBER | | | |
| | REDIRECTION INFORMATION | | | |
| | GENERIC ADDRESS (NON-LNP) | | | |
| | ACCESS TRANSPORT | | | |
| | HOP COUNTER | | | |
| | JURISDICATION INFORAMTION | | | |
| RELEASE | ACCESS TRANSPORT | | | |
| | AUTOMATIC CONGESTION CONTROL | | | |

*FIG. 41*

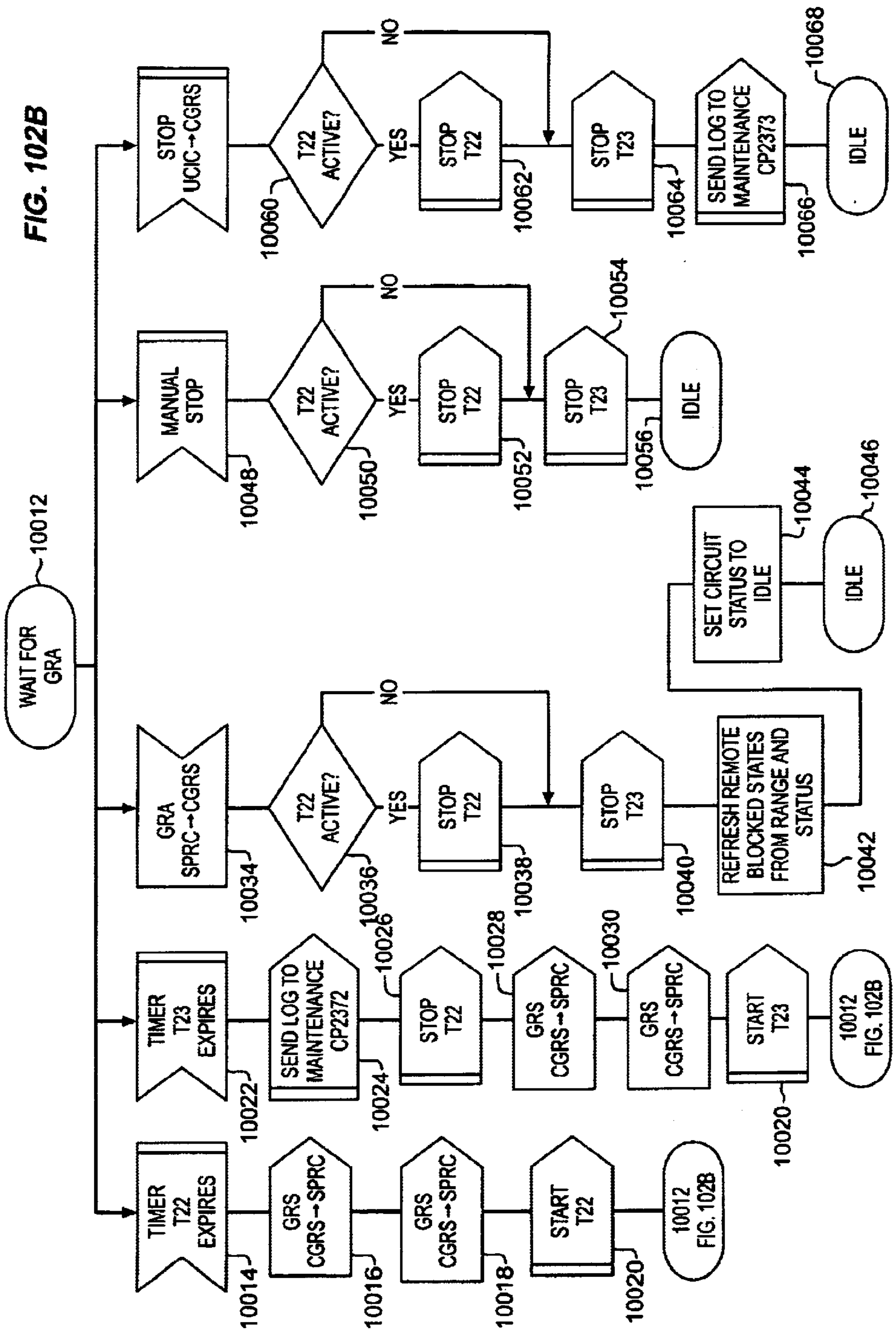
FIG. 102B
WAIT FOR GRA
10012
TIMER T22 EXPIRES
10014
GRS CGRS→SPRC
10016
GRS CGRS→SPRC
10018
START T22
10020
10012 FIG. 102B
TIMER T23 EXPIRES
10022
SEND LOG TO MAINTENANCE CP2372
10024
STOP T22
10026
GRS CGRS→SPRC
10028
GRS CGRS→SPRC
10030
START T23
10020
10012 FIG. 102B
GRA SPRC→CGRS
10034
T22 ACTIVE?
10036
YES
NO
STOP T22
10038
STOP T23
10040
REFRESH REMOTE BLOCKED STATES FROM RANGE AND STATUS
10042
SET CIRCUIT STATUS TO IDLE
10044
IDLE
10046
MANUAL STOP
10048
T22 ACTIVE?
10050
YES
NO
STOP T22
10052
STOP T23
10054
10056
IDLE
STOP UCIC→CGRS
10060
T22 ACTIVE?
YES
NO
STOP T22
10062
STOP T23
10064
SEND LOG TO MAINTENANCE CP2373
10066
IDLE
10068

WAIT FOR REL
10110
COT
10112
STOP TIMER T34
10114
FIRST TIME INDICATOR ON?
10116
ON
OFF
10118
SEND LOG TO MAINTENANCE CP2375
SET FIRST TIME INDICATOR OFF
10120
REMOVE LOOP AT AVM
10122
ENABLE ECHO CANCELLER
10124
START TIMER T27
10126
WAIT FOR CCR
10128
10100 FIG. 104A
STOP CRI
10130
STOP TIMER T34
10132
REL
10142
STOP TIMER T34
10144
RLC
10146
TIMER T34
10148
START CRS
10150
REMOVE LOOP AT AVM
10134
ENABLE ECHO CANCELLER
10136
UPDATE CIRCUIT STATUS TO IDLE
10138
IDLE
10140

SYSTEM AND METHOD FOR PROCESSING A CALL

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the processing of telecommunications signaling in order to establish communications paths, and in particular, to processing Signaling System #7 (SS7) signaling messages to establish communications paths.

BACKGROUND OF THE INVENTION

A telephone call typically comprises both call signaling and caller information. Call signaling is typically data (i.e. the called number) that is used by a switch to establish call connections. The call connections carry the caller information (i.e. voice). A telecommunications switch contains a processor that can process telecommunications signaling in order to select call connections. This switch also contains a switching matrix that can establish the selected connections. The combination of the signaling processor and the switching matrix in the switch is problematic. Additional cost and complexity are added by the matrix. Signaling processors are needed that are not combined with the switching matrix.

In the United States, the predominant form of telecommunications signaling is Signaling System #7 (SS7). In addition, asynchronous transfer mode (ATM) equipment and other high speed switching equipment is being developed to transport all types of traffic at high speeds over connections. Signaling processors are needed that can process SS7 signaling and select ATM connections and other high speed connections.

SUMMARY OF THE INVENTION

The present invention comprises a system that processes signaling for a call. The system comprises a call processing logic module comprising an origination process module that is adapted to process signaling information parameters that relate to an originating circuit to determine if a first terminating circuit should be selected. The call processing logic module further comprises a termination process module that is adapted to process the signaling information parameters to select the first terminating circuit and a second terminating circuit. The system has a processor to execute the call processing logic module to select the first terminating circuit and the second terminating circuit. The system includes a connection system that is adapted to connect the first terminating circuit to the originating circuit and to connect the second terminating circuit to the first terminating circuit.

The present invention further comprises a system that processes signaling for a call. The system comprises a call processing logic module comprising an origination process module that is adapted to process signaling information parameters that relate to an originating circuit to determine whether a call attempt is to be authorized. The call processing logic module further comprises a termination process module that is adapted to process the signaling information parameters to select the first terminating circuit and a second terminating circuit. The system has a processor to execute the call processing logic module to select the first terminating circuit and the second terminating circuit. The system includes a connection system that is adapted to connect the first terminating circuit to the originating circuit and to connect the second terminating circuit to the first terminating circuit.

Also, the present invention comprises a system that processes signaling for a call. The system comprises a call processing logic module comprising an origination process module that is adapted to process signaling information parameters that relate to an originating circuit to determine whether the call is to be accepted. The call processing logic module further comprises a termination process module that is adapted to process the signaling information parameters to select the first terminating circuit and a second terminating circuit. The system has a processor to execute the call processing logic module to select the first terminating circuit and the second terminating circuit. The system includes a connection system ;that is adapted to connect the first terminating circuit to the originating circuit and to connect the second terminating circuit to the first terminating circuit.

Further still, the present invention comprises a system that processes signaling for a call. The system comprises a call processing logic module comprising an origination process module that is adapted to process signaling information parameters that relate to an originating circuit to determine that additional signaling information parameters that relate to the originating circuit are needed and to collect the additional signaling information parameters. The call processing logic module further comprises a termination process module that is adapted to process the signaling information parameters to select the first terminating circuit and a second terminating circuit. The system has a processor to execute the call processing logic module to select the first terminating circuit and the second terminating circuit. The system includes a connection system that is adapted to connect the first terminating circuit to the originating circuit and to connect the second terminating circuit to the first terminating circuit.

In addition, the present invention comprises a system that processes signaling for a call. The system comprises a call processing logic module comprising an origination process module that is adapted to process signaling information parameters that relate to an originating circuit and to segment the call for particular processing based on the signaling information parameters. The call processing logic module further comprises a termination process module that is adapted to process the signaling information parameters to select the first terminating circuit and a second terminating circuit. The system has a processor to execute the call processing logic module to select the first terminating circuit and the second terminating circuit. The system includes a connection system that is adapted to connect the first terminating circuit to the originating circuit and to connect the second terminating circuit to the first terminating circuit.

Further, the present invention is directed to a system that processes signaling from a call. The system comprises a call processing logic module comprising a termination process module that is adapted to process signaling information parameters to select a first terminating circuit and a second terminating circuit. The call processing logic module also has an origination process module that is adapted to error check the signaling information parameters that relate to an originating circuit to determine if the signaling information parameters can be processed by the termination process module to select the first terminating circuit and the second terminating circuit. The system has a processor to execute the call processing logic module to select the first terminating circuit and the second terminating circuit. The system includes a connection system that is adapted to connect the first terminating circuit to the originating circuit and to connect the second terminating circuit to the first terminating circuit.

Further still, the present, invention is directed to a system that processes signaling from a call. The system comprises a call processing logic module comprising a termination process module that is adapted to process signaling information parameters to select a first terminating circuit and a second terminating circuit. The call processing logic module also has an origination process module that is adapted to obtain signaling information parameters that relate to an originating circuit in order to allow the termination process module to select the first terminating circuit and the second terminating circuit. The system has a processor to execute the call processing logic module to select the first terminating circuit and the second terminating circuit. The system includes a connection system that is adapted to connect the first terminating circuit to the originating circuit and to connect the second terminating circuit to the first terminating circuit.

Still further, the present invention is directed to a system that processes signaling for a call. The system comprises a call processing logic module comprising an origination process module adapted to process signaling information parameters that relate to an originating circuit and to access call-associated data in data structures to determine if the call can be connected through the system. The call processing logic module further comprises a termination process module adapted to process the signaling information parameters with call-associated data in data structures to select a first selected circuit and a second selected circuit. The system has a processor adapted to execute the call processing logic module to select the first terminating circuit and the second terminating circuit. The system has a connection system adapted to connect the first selected circuit to the originating circuit and to connect the second selected circuit to the first selected circuit.

BRIEF DESCRIPTION OF THE DRAWINGS

FIG. 12 is a table diagram of a time division multiplex trunk circuit table used in the signaling processor of FIG. 8.

FIG. 13 is a table diagram of an asynchronous transfer mode trunk circuit table used in the signaling processor of FIG. 8.

FIG. 14A is a table diagram of a trunk group table used in the signaling processor of FIG. 8.

FIG. 14B is a continuation table diagram of the trunk group table of FIG. 14A.

FIG. 14C is a table diagram of a continuation of the trunk group table of FIG. 14B.

FIG. 15 is a table diagram of a carrier table used in the signaling processor of FIG. 8.

FIG. 16 is a table diagram of an exception table used in the signaling processor of FIG. 8.

FIG. 17 is a table diagram of an originating line information table used in the signaling processor of FIG. 8.

FIG. 18 is a table diagram of an automated number identification table used in the signaling processor of FIG. 8.

FIG. 19 is a table diagram of a called number screening table used in the signaling processor of FIG. 8.

FIG. 20 is a table diagram of a called number table used in the signaling processor of FIG. 8.

FIG. 21 is a table diagram of a day of year table used in the signaling processor of FIG. 8.

FIG. 22 is a table diagram of a day of week table used in the signaling processor of FIG. 8.

FIG. 23 is a table diagram of a time of day table used in the signaling processor of FIG. 8.

FIG. 24 is a table diagram of a time zone table used in the signaling processor of FIG. 8.

FIG. 25 is a table diagram of a routing table used in the signaling processor of FIG. 8.

FIG. 26 is a table diagram of a trunk group class of service table used in the signaling processor of FIG. 8.

FIG. 27 is a table diagram of a treatment table used in the signaling processor of FIG. 8.

FIG. 28 is a table diagram of an outgoing release table used in the signaling processor of FIG. 8.

FIG. 29 is a table diagram of a percent control table used in the signaling processor of FIG. 8.

FIG. 30 is a table diagram of a call rate table used in the signaling processor of FIG. 8.

FIG. 31 is a table diagram of a database services table used in the signaling processor of FIG. 8.

FIG. 32A is a table diagram of a signaling connection control part table used in the signaling processor of FIG. 8.

FIG. 32B is a continuation table diagram of the signaling connection control part table of FIG. 32A.

FIG. 32C is a continuation table diagram of the signaling connection control part table of FIG. 32B.

FIG. 32D is a continuation table diagram of the signaling connection control part table of FIG. 32C.

FIG. 33 is a table diagram of an intermediate signaling network identification table used in the signaling processor of FIG. 8.

FIG. 34 is a table diagram of a transaction capabilities application part table used in the signaling processor of FIG. 8.

FIG. 35 is a table diagram of a external echo canceller table used in the signaling processor of FIG. 8.

FIG. 36 is a table diagram of an interworking unit used in the signaling processor of FIG. 8.

FIG. 37 is a table diagram of a controllable asynchronous transfer mode matrix interface table used in the signaling processor of FIG. 8.

FIG. 38 is a table diagram of a controllable asynchronous transfer mode matrix table used in the signaling processor of FIG. 8.

FIG. 39A is a table diagram of a site office table used in the signaling processor of FIG. 8.

FIG. 39B is a continuation table diagram of the site office table of FIG. 39A.

FIG. 39C is a continuation table diagram of the site office table of FIG. 39B.

FIG. 39D is a continuation table diagram of the site office table of FIG. 39C.

FIG. 40A is a table diagram of an advanced intelligent network event parameters table used in the signaling processor of FIG. 8.

FIG. 40B is a continuation table diagram of the advanced intelligent network event parameters table of FIG. 40A.

FIG. 41 is a table diagram of a message mapping table used in the signaling processor of FIG. 8.

FIGS. 102A–102B are SDL diagrams of logic used in a version of the invention for a circuit group reset sending process.

DETAILED DESCRIPTION OF THE PREFERRED EMBODIMENTS

Telecommunication systems have a number of communication devices in local exchange and interexchange environments that interact to provide call services to customers. Both traditional and intelligent network (IN) services and resources are used to process, route, or connect a call to a designated connection.

A call has user communications and call signaling. The user communications contain the caller's information, such as a voice communication or data communication, and they are transported over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on ITU recommendation Q.931. A call can be connected to and from communication devices.

Connections are used to transport user communications and other device information between communication devices and between the elements and devices of the system. The term "connection" as used herein means the transmission media used to carry user communications between: elements of the various telecommunications networks and systems. For example, a, connection could carry a user's voice, computer data, or other communication device data. A connection can be associated with either in-band communications or out-of-band communications.

Links are used to transport call signaling and control messages. The term "link" as used herein means a transmission media used to carry call signaling and control messages. For example, a link would carry call signaling or a device control message containing device instructions and data. A link can carry, for example, out-of-band signaling such as that used in SS7, C7, ISDN, DPNSS, B-ISDN, GR-303, or could be via local area network (LAN), or data bus call signaling. A link can be, for example, an asynchronous transfer mode (ATM) adaptation layer 5 (AAL5) data link, UDP/IP, ethernet, DS0, or DS1. In addition, a link, as shown in the figures, can represent a single physical link or multiple links, such as one link or a combination of links of ISDN, SS7, TCP/IP, or some other data link. The term "control message" as used herein means a control or signaling message, a control or signaling instruction, or a control or signaling signal, whether proprietary or standardized, that conveys information from one point to another.

Figure 1:
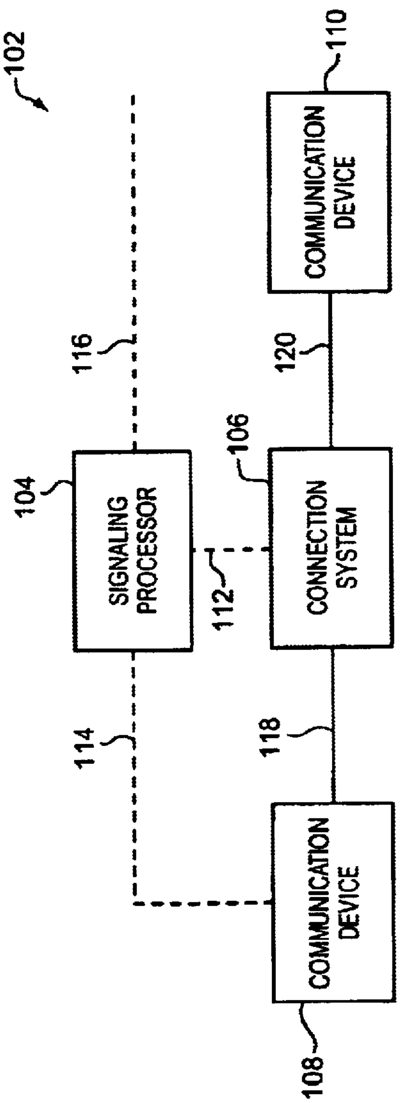
FIG. 1 is a block diagram of an embodiment of a call processing system in accordance with the present invention.

FIG. 1 illustrates an exemplary embodiment of a call processing system 102 of the present invention. The call processing system 102 includes a signaling processor 104, a connection system 106, and communication devices 108 and 110. The signaling processor 104 is linked to the connection system 106 by a link 112 and to the communication device 108 by a link 114. A link 116 extends from the signaling processor 104. The connection system 106 is connected to the communication device 108 by a connection 118 and to the other communication device 110 by a connection 120.

The signaling processor 104 is a signaling platform that can receive, process, and generate call signaling. Based on the processed call signaling, the signaling processor 104 selects processing options, such as services, communication devices, or resources for the user communications and generates and transmits control messages that identify the processing option, such as the service, communication device, or resource that is to be used. The signaling processor 104 also selects other processing options, such as virtual connections and circuit-based connections for call routing, and generates and transports control messages that identify the selected connections. The signaling processor 104 can process various form's of signaling, including ISDN, GR-303, B-ISDN, SS7, C7, and DPNSS. It will be appreciated that the signaling processor 104 can select connections on a call-by-call basis.

The connection system 106 is a communication device on the bearer channel that makes connections for calls. The connection system 106 may interwork user communications to connections and/or switch user communications between connections. Preferably, interworking occurs between time division multiplex (TDM) connections and asynchronous transfer mode (ATM) connections, and switching occurs between ATM connections and other ATM connections and between TDM connections and other TDM connections. The connection system 106 establishes connections for user communications in response to control messages from the signaling processor 104. The connection system 106 can include one or more of an interworking unit, an ATM matrix, a TDM switch, an ATM switch, or any other device capable of making connections for user communications on a bearer channel.

The communication devices 108 and 110 comprise customer premises equipment (CPE), a service platform, a switch, a remote digital terminal, a cross connect, an interworking unit, an ATM gateway, or any other device capable of initiating, handling, or terminating a call. CPE can be, for example, a telephone, a computer, a facsimile machine, or a private branch exchange. A service platform can be, for example, any enhanced computer platform that is capable of processing calls. A remote digital terminal is a device that concentrates analog twisted pairs from telephones and other like devices and converts the analog signals to a digital format known as GR-303. An ATM gateway is a device that changes ATM cell header virtual path/virtual channel (VP/VC) identifiers.

The system of FIG. 1 operates as follows. The communication device 108 transmits call signaling to the signaling processor 104 over the link 114 and transports user communications to the connection system 106 over the connection 118. The signaling processor 104 receives the call signaling. The signaling processor 104 processes the call signaling to determine one or more connections for the user communications or other processing options for the call.

The signaling processor 104 determines that the user communications are to be connected over the connection 120. The signaling processor 104 transmits a control message to the connection system 106 over the link 112 identifying the connection 120 over which to connect the user communications. The signaling processor 104 generates and transmits new call signaling in the forward direction over the link 116.

The connection system 106 receives the user communications from the communication device 108 over the connection 118 and the control message from the signaling processor 104. The connection system 106 transports the user communications on the selected connection 120 in response to the control message. The communication device 110 receives the user communications.

Figure 2:
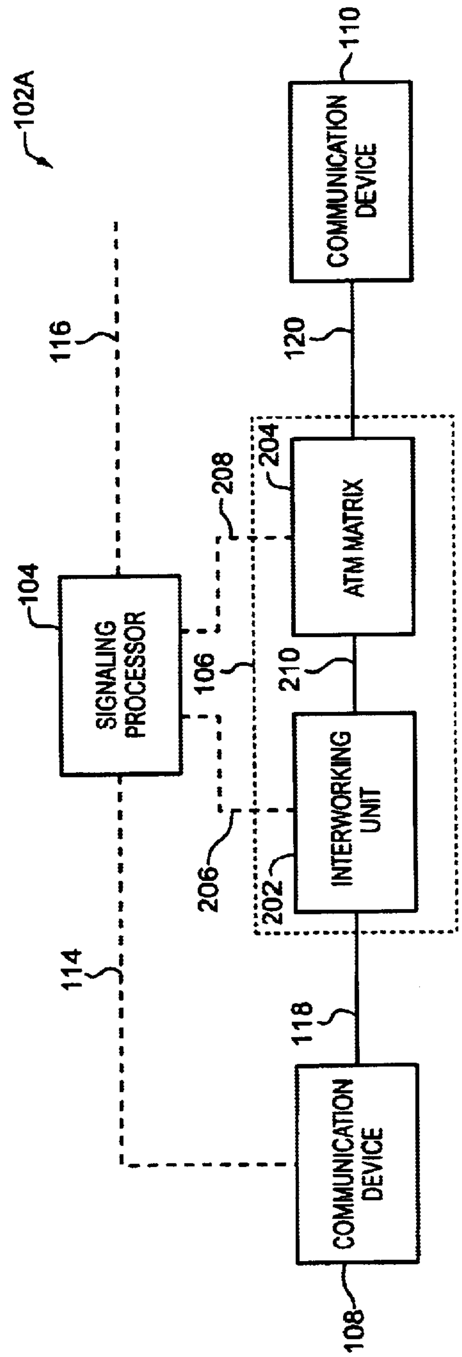
FIG. 2 is a block diagram of an embodiment of a call processing system with an expanded connection system in accordance with the present invention.

FIG. 2 illustrates an exemplary embodiment of a call processing system of the-present invention with an embodiment of a connection system. The call processing system 102A of FIG. 2 comprises, in addition to the elements of FIG. 1, an interworking unit 202 and an asynchronous transfer mode (ATM) matrix 204. The signaling processor 104 is linked to the interworking unit 202 by a link 206 and to the ATM matrix 204 by a link 208. The interworking unit 202 is connected to the ATM matrix 204 by a connection 210. It will be appreciated that other embodiments are possible.

The interworking unit 202 interworks traffic between various protocols. Preferably, the interworking unit 202 interworks between ATM traffic and non-ATM traffic, such as TDM traffic. The interworking unit 202 operates in accordance with control messages received from the signaling processor 104. These control messages typically are provided on a call-by-call basis and typically identify an assignment between a digital signal level zero (DS0) and a VP/VC for which user communications are interworked. In some instances, the interworking unit 202 may transport control messages which may include data to the signaling processor 104. In some instances, the interworking unit 202 can be configured to switch user communications from TDM connections to other TDM connections. The TDM to TDM switching functionality can be a sole configuration or a joint configuration with the TDM to ATM interworking functionality. The interworking unit 2021 can be identified as a communication device.

The ATM matrix 204 is a controllable ATM matrix that establishes connections in response to control messages received from the signaling processor 104. The ATM matrix 204 is able to interwork between ATM connections and TDM connections. The ATM matrix 204 also switches ATM connections with other ATM connections. In addition, the ATM matrix 204 can switch calls from TDM connections to other TDM connections. The ATM matrix 204 transmits and receives call signaling and user communications over the connections. The ATM matrix 204 can be identified as a communication device.

The system of FIG. 2 operates similar to the system of FIG. 1. However, in the system of FIG. 2, the connection system 108 makes connections for TDM to ATM interworking, for ATM to ATM switching, and also for TDM to TDM switching. Therefore, the signaling processor 104 of FIG. 2 transmits control messages to the interworking unit 202 and/or to the ATM matrix 204 identifying the selected connections.

In a first example, the communication device 108 transmits call signaling to the signaling processor 104 over the link 114. The communication device 108 also transports user communications to the interworking unit 202. In this example, the communications device 108 is a TDM switch, and the call signaling is an initial address message (IAM).

The signaling processor 104 receives the call signaling and, if required, converts the call signaling into SS7. In this example, conversion is not required. The signaling processor 104 processes the call signaling to determine processing options, such as connections, for the call. The signaling processor 104 selects the connections 210 and 120 to connect the user communications to the communication device 110.

The signaling processor 104 creates new call signaling and transmits the new call signaling to the communication device 110 via a link. In addition, the signaling processor 104 transmits a control message to the interworking unit 202 identifying the selected connection 210 over which to interwork the user communications. The signaling processor 104 also transmits a control message to the ATM matrix 204 identifying the selected connection 120 over which to switch the user communications The interworking unit 202 receives the user communications from the communication device 108 over the connection 118 and the control message from the signaling processor 104 over the link 206. In response to the control message, the interworking unit 202 interworks the user communications to the connection 210 selected by the signaling processor 104. In this example, the selected connection is VP/VC on the connection 210, and the connection over which the user communications were received is a DS0 on the connection 118.

The ATM matrix 204 receives the user communications over the connection 210 and the control message from the signaling processor 104 over the link 208. In response to the control message, the ATM matrix connects the user communications to the connection 120 selected by the signaling processor 104. In this example, the selected connection is a VP/VC on the connection 120. The communication device 110 receives the user communications over the connection 120 and the new call signaling transmitted from the signaling processor 104.

In another example, the signaling processor 104 receives call signaling over the link 116. The communication device 110 transports user communications to the ATM matrix 204.

The signaling processor 104 receives the call signaling and, if required, converts the call signaling into SS7. The signaling processor 104 processes the call signaling to determine processing options, such as connections, for the call. The signaling processor 104 selects the connections 210 and 118 to connect the user communications to the communication device 108.

The signaling processor 104 creates new call signaling and transmits the new call signaling to the communication device 108 via the link 114. In addition, the signaling processor 104 transmits a control message to the interworking unit 202 identifying the selected connection 118 over which to interwork the user communications. The signaling processor 104 also transmits a control message to the ATM matrix 204 identifying the selected connection 210 over which to switch the user communications The ATM matrix 204 receives the user communications over the connection 120 and the control message: from the signaling processor 104 over the link 208. In response to the control message, the ATM matrix connects the user communications to the connection 210 selected by the signaling processor 104. In this example, the selected connection is a VP/VC on the connection 210.

The interworking unit 202 receives the user communications from the ATM matrix 204 over the connection 120 and the control message from the signaling processor 104 over the link 206. In response to the control message, the interworking unit 202 interworks the user communications to the connection 118 selected by the signaling processor 104. In this example, the selected connection is a DS0 on the connection 118, and the connection over which the user communications were received is a VP/VC on the connection 210. The communication device 108 receives the user communications over the connection 118 and the new call signaling transmitted from the signaling processor 104 over the link 114.

The Controllable ATM Matrix

Figure 3:
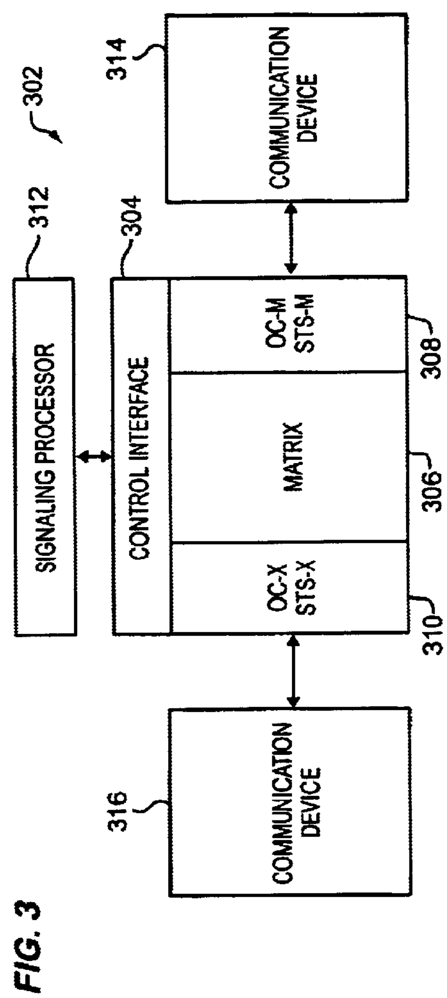
FIG. 3 is a functional diagram of a controllable asynchronous transfer mode matrix in accordance with the present invention.

FIG. 3 illustrates ah exemplary embodiment of a controllable asynchronous transfer mode (ATM) matrix (CAM), but other CAMs that support the requirements of the invention also are applicable. The CAM 302 may receive and transmit ATM formatted user communications or call signaling.

The CAM 302 preferably has a control interface 304, a controllable ATM matrix 306, an optical carrier-M/synchronous transport signal-M (OC-M/STS-M) interface 308, and an OC-X/STS-X interface 310. As used herein in conjunction with OC or STS, "M" refers to an integer, and "X" refers to an integer.

The control interface 304 receives control messages originating from the signaling processor 312, identifies virtual connection assignments in the control messages, and provides these assignments to the matrix 306 for implementation. The control messages may be received over an ATM virtual connection and through either the OC-M/STS-M interface 308 or the OC-X/STS-X interface 310 through the matrix 306 to the control interface 304, through either the OC-M/STS-M interface or the OC-X/STS-X interface directly to the control interfaced, or through the control interface from a link.

The matrix 306 is a controllable ATM matrix that provides cross connect functionality in response to control messages from the signaling processor 312. The matrix 306 has access to virtual path/virtual channels (VP/VCs) over which it can connect calls. For example, a call can come in over a VP/VC through the OC-M/STS-M interface 308 and be connected through the matrix 306 over a VP/VC through the OC-X/STS-X interface 310 in response to a control message received by the signaling processor 312 through the control interface 304. Alternately, a call can be connected in the opposite direction. In addition, the a call can be received over a VP/VC through the OC-M/STS-M interface 308 or the OC-X/STS-X interface 310 and be connected through the matrix 306 to a different VP/VC on the same OC-M/STS-M interface or the same OC-X/STS-X interface.

The OC-M/STS-M interface 308 is operational to receive ATM cells from the matrix 306 and to transmit the ATM cells over a connection to the communication device 314. The OC-M/STS-M interface 308 also may receive ATM cells in the OC or STS format and transmit them to the matrix 306.

The OC-X/STS-X interface 310 is operational to receive ATM cells from the matrix 306 and to transmit the ATM cells over a connection to the communication device 316. The OC-X/STS-X interface 310 also may receive ATM cells in the OC or STS format and transmit them to the matrix 306.

Call signaling may be received through and transferred from the OC-M/STS-M interface 308. Also, call signaling may be received through and transferred from the OC-X/STS-X interface 310. The call signaling may be connected on a connection or transmitted to the control interface directly or via the matrix 306.

The signaling processor 3112 is configured to send control messages to the CAM 302 to implement particular features on particular VP/VC circuits. Alternatively, lookup tables may be used to implement particular features for particular VP/VCs.

Figure 4:
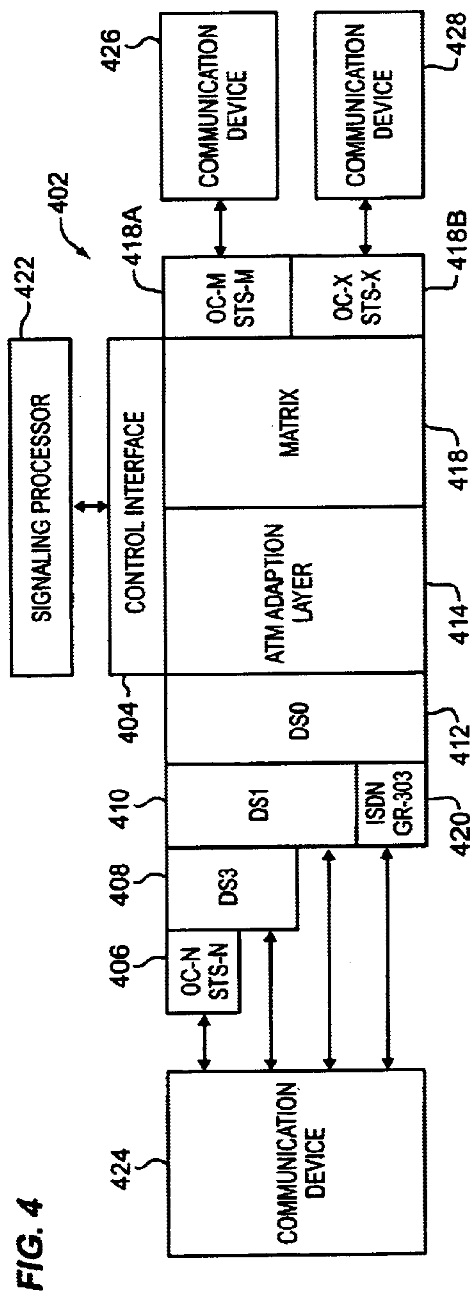
FIG. 4 is a functional diagram of a controllable asynchronous transfer mode matrix with time division multiplex capability in accordance with the present invention.

FIG. 4 illustrates another exemplary embodiment of a CAM which has time division multiplex (TDM) capability, but other CAMs that support the requirements of the invention also are applicable. The CAM 402 may receive and transmit in-band and out-of-band signaled calls.

The CAM 402 preferably has a control interface 404, an OC-N/STS-N interface 406, a digital signal level 3 (DS3)

interface 408, a DS1 interface 410, a DS0 interface 412, an ATM adaptation layer (AAL) 414, a controllable ATM matrix 416, an OC-M/STS-M interface 418 A, an OC-X/STS-X interface 418 B, and an ISDN/GR-303 interface 420. As used herein in conjunction with OC or STS, "N" refers to an integer, "M" refers to an integer, and "X" refers to an integer.

The control interface 404 receives control messages originating from the signaling processor 422, identifies DS0 and virtual connection assignments in the control messages, and provides these assignments to the AAL 414 or the matrix 416 for implementation. The control messages may be received over an ATM virtual connection and through the OC-M/STS-M interface 418A to the control interface 404, through the OC-X/STS-X interface 418B and the matrix 416 to the control interface, or directly through the control interface from a link.

The OC-N/STS-N interface 406, the DS3 interface 408, the DS1 interface 410, the DS0 interface 412, and the ISDN/GR-303 interface 420 each can receive user communications from a communication device 424. Likewise, the OC-M/STS-M interface 418A and the OC-X/STS-X interface 418B can receive user communications from the communication devices 426 and 428.

The OC-N/STS-N interface 406 receives OC-N formatted user communications and STS-N formatted user communications and converts the user communications to the DS3 format. The DS3 interface 408 receives user communications in the DS3 format and converts the user communications to the DS1 format. The DS3 interface 408 can receive DS3 s from the OC-N/STS-N interface 406 or from an external connection. The DS1 interface 410 receives the user communications in the DS1 format and converts the user communications to the DS0 format. The DS1 interface 410 receives DS1s from the DS3 interface 408 or from an external connection. The DS0 interface 412 receives user communications in the DS0 format and provides an interface to the AAL 414. The ISDN/GR-303 interface 420 receives user communications in either the ISDN format or the GR-303 format and converts the user communications to the DS0 format. In addition, each interface may transmit user communications in like manner to the communication device 424.

The OC-M/STS-M interface 418A is operational to receive ATM cells from the AAL 414 or from the matrix 416 and to transmit the ATM cells over a connection to the communication device 426. The OC-M/STS-M interface 418A also may receive ATM cells in the OC or STS format and transmit them to the AAL 414 or to the matrix 416.

The OC-X/STS-X interface 418B is operational to receive ATM cells from the AAL 414 or from the matrix 416 and to transmit the ATM cells over a connection to the communication device 428. The OC-X/STS-X interface 418B also may receive ATM cells in the OC or STS format and transmit them to the AAL 414 or to the matrix 416.

Call signaling may be received through and transferred from the OC-N/STS-N interface 406 and the ISDN/GR-303 interface 420. Also, call signaling may be received through and transferred from the OC-M/STS-M interface 418A and the OC-X/STS-X interface 418B. The call signaling may be connected on a connection or transmitted to the control interface directly or via an interface as explained above.

The AAL 414 comprises both a convergence sublayer and a segmentation and reassembly (SAR) sublayer. The AAL 414 obtains the identity of the DS0 and the ATM VP/VC from the control interface 404. The AAL 414 is operational to convert between the DS0 format and the ATM format. AALs are known in the art, and information about AALs is provided by International Telecommunications Union (ITU) documents in the series of 1.363, which are incorporated herein by reference. For example, ITU document 1.363.1 discusses AAL1. An AAL for voice calls is described in U.S. Pat. No. 5,706,553 entitled "Cell Processing for Voice Transmission," which is incorporated herein by reference.

Calls with multiple 64 Kilo-bits per second (Kbps) DS0s are known as N×64 calls. If desired, the AAL 414 can be configured to accept control messages through the control interface 404 for N×64 calls. The CAM 402 is able to interwork, multiplex, and demultiplex for multiple, DS0s. A technique for processing VP/VCs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically unidirectional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

The matrix 416 is a controllable ATM matrix that provides cross connect functionality in response to control messages from the signaling processor 422. The matrix 416 has access to VP/VCs over which it can connect calls. For example, a call can come in over a VP/VC through the OC-M/STS-M interface 418A and be connected through the matrix 416 over a VP/VC through the OC-X/STS-X interface 418B in response to a control message received by the signaling processor 422 through the control interface 404. Alternately, the matrix 416 may transmit a call received over a VP/VC through the OC-M/STS-M interface 41;8A to the AAL 414 in response to a control message received by the signaling processor 422 through the control interface 404. Communications also may occur in opposite directions through the various interfaces.

In some embodiments, it may be desirable to incorporate digital signal processing capabilities, for example, at the DS0 level. It also may be desired to apply echo control to selected DS0 circuits. In these embodiments, a signal processor may be included. The signaling processor 422 is configured to send control messages to the CAM 402 to implement particular features on particular DS0 or VP/VC circuits. Alternatively, lookup tables may be used to implement particular features for particular circuits or VP/VCs.

It will be appreciated from the teachings above for the CAMs and for the teachings below for the ATM interworking units, that the above described CAMs can be adapted for modification to transmit and receive other formatted communications such as synchronous transport module (STM) and European level (E) communications. For example, the OC/STS, DS3, DS1, DS0, and ISDN/GR-303 interfaces can be replaced by STM electrical/optical (E/O), E3, E1, E0, and digital private network signaling system (DPNSS) interfaces, respectively.

The ATM Interworking Unit

Figure 5:
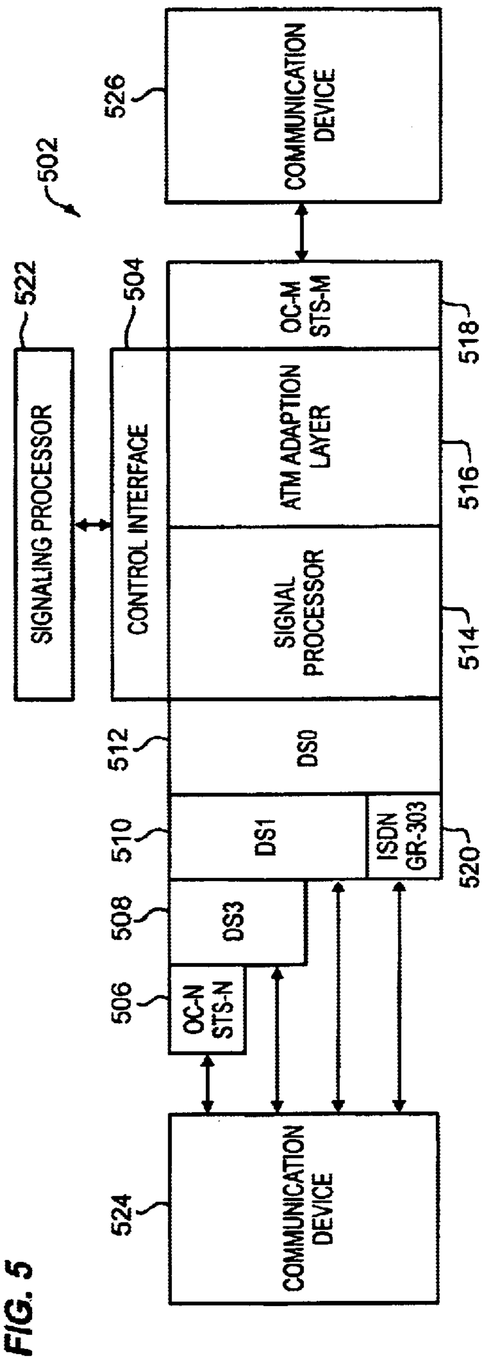
FIG. 5 is a functional diagram of an asynchronous transfer mode interworking unit for use with a synchronous optical network system in accordance with the present invention.

FIG. 5 illustrates an exemplary embodiment of an interworking unit which is an ATM interworking unit 502 suitable for the present invention for use with a SONET system. Other interworking units that support the requirements of the invention also are applicable. The ATM interworking unit 502 may receive and transmit in-band and out-of-band calls.

The ATM interworking unit 502 preferably has a control interface 504, an OC-N/STS-N interface 506, a DS3 interface 508, a DS1 interface 510, a DS0 interface 512, a signal processor 514, an AAL 516, an OC-M/STS-M interface 518, and an ISDN/GR-303 interface 520. As used herein in conjunction with OC or STS, "N" refers to an integer, and "M" refers to an integer.

The control interface 504 receives control messages originating from the signaling processor 522, identifies DS0 and virtual connection assignments in the control messages, and provides these assignments to the AAL 516 for implementation. The control messages are received over an ATM virtual connection and through the OC-M/STS-M interface 518 to the control interface 504 or directly through the control interface from a link.

The OC-N/STS-N interface 506, the DS3 interface 508, the DS1 interface 510, the DS0 interface 512, and the ISDN/GR-303 interface 520 each can receive user communications from a communication device 524. Likewise, the OC-M/STS-M interface 518 can receive user communications from a communication device 526.

The OC-N/STS-N interface 506 receives OC-N formatted user communications and STS-N formatted user communications and demultiplexes the user communications to the DS3 format. The DS3 interface 508 receives user communications in the DS3 format and demultiplexes the user communications to the DS1 format. The DS3 interface 508 can receive DS3 s from the OC-N/STS-N interface 506 or from an external connection. The DS1 interface 510 receives the user communications in the DS1 format and demultiplexes the user communications to the DS0 format. The DS1 interface 510 receives DS1s from the DS3 interface 508 or from an external connection. The DS0 interface 512 receives user communications in the DS0 format and provides an interface to the AAL 516. The ISDN/GR-303 interface 520 receives user communications in either the ISDN format or the GR-303 format and converts the user communications to the DS0 format. In addition, each interface may transmit user communications in like manner to the communication device 524.

The OC-M/STS-M interface 518 is operational to receive ATM cells from the AAL 516 and to transmit the ATM cells over the connection to the communication device 526. The OC-M/STS-M interface 518 also may receive ATM cells in the OC or STS format and transmit them to the AAL 516.

Call signaling may be received through and transferred from the OC-N/STS-N interface 506 and the ISDN/GR-303 interface 520. Also, call signaling may be received through and transferred from the OC-M/STS-M interface 518. The call signaling may be connected on a connection or transmitted to the control interface directly or via another interface as explained above.

The AAL 516 comprises both a convergence sublayer and a segmentation and reassembly (SAR) sublayer. The AAL 516 obtains the identity of the DS0 and the ATM VP/VC from the control interface 504. The AAL 516 is operational to convert between the DS0 format and the ATM format.

If desired, the AAL 516 can be configured to accept control messages through the control interface 504 for N×64 calls. The ATM interworking unit 502 is able to interwork, multiplex, and demultiplex for multiple DS0s.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

In some embodiments, it may be desirable to incorporate digital signal processing capabilities at the DS0 level. It may also be desired to apply echo control to selected DS0 circuits. In these embodiments, a signal processor 514 is included either separately (as shown) or as a part of the DS0 interface 512. The signaling processor 522 is configured to send control messages to the ATM interworking unit 502 to implement particular features on particular DS0 circuits. Alternatively, lookup tables may be used to implement particular features for particular circuits or VP/VCs.

Figure 6:
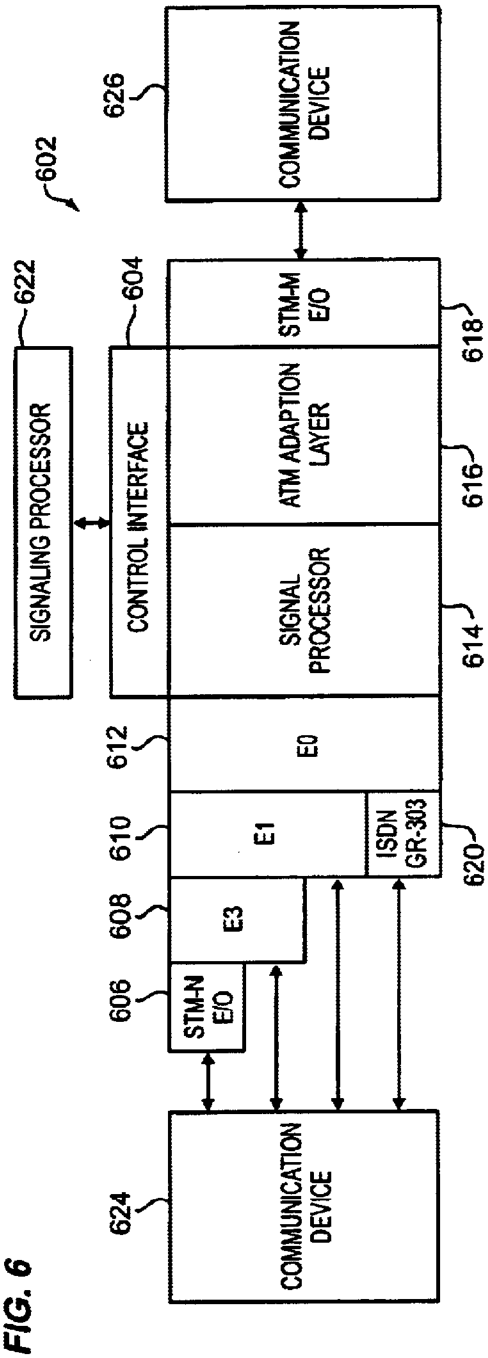
FIG. 6 is a functional diagram of an asynchronous transfer mode interworking unit for use with a synchronous digital hierarchy system in accordance with the present invention.

FIG. 6 illustrates another exemplary embodiment of an interworking unit which is an ATM interworking unit 602 suitable for the present invention for use with an SDH system. The ATM interworking unit 602 preferably has a control interface 604, an STM-N electrical/optical (E/O) interface 606, an E3 interface 608, an E1 interface 610, an E0 interface 612, a signal processors 614, an AAL 616, an STM-M electrical/optical (E/O) interface 618, and a DPNSS interface 620. As used herein in conjunction with STM, "N" refers to an integer, and "M" refers to an integer.

The control interface 604 receives control messages from the signaling processor 622, identifies E0 and virtual connection assignments in the control messages, and provides these assignments to the AAL 616 for implementation. The control messages are received over an ATM virtual connection and through the STM-M interface 618 to the control interface 504 or directly through the control interface from a link.

The STM-N E/O interface 606, the E3 interface 608, the E1 interface 610, the E0 interface 612, and the DPNSS interface 620 each can receive user communications from a second communication device 624. Likewise, the STM-M E/O interface 618 can receive user communications from a third communication device 626.

The STM-N E/O interface 606 receives STM-N electrical or optical formatted user communications and converts the user communications from the STM-N electrical or STM-N optical format to the E3 format. The E3 interface 608 receives user communications in the E3 format and demultiplexes the user communications to the E1 format. The E3 interface 608 can receive E3 s from the STM-N E/O interface 606 or from an external connection. The E1 interface 610 receives the user communications in the E1 format and demultiplexes the user communications to the E0 format. The E1 interface 610 receives E1s from the STM-N E/O interface 606 or the E3 interface 608 or from an external connection. The E0 interface 612 receives user communications in the E0 format and provides an interface to the AAL 616. The DPNSS interface 620 receives user communications in the DPNSS format and converts the user communications to the E0 format. In addition, each interface may transmit user communications in a like manner to the communication device 624.

The STM-M E/O interface 618 is operational to receive ATM cells from the AAL 616 and to transmit the ATM cells over the connection to the communication device 626. The STM-M E/O interface 618 may also receive ATM cells in the STM-M E/O format and transmit them to the AAL 616.

Call signaling may be received through and transferred from the STM-N E/O interface 606 and the DPNSS interface 620. Also, call signaling may be received through and transferred from the STM-M E/O interface 618. The call signaling may be connected on a connection or transmitted to the control interface directly or via another interface as explained above.

The AAL 616 comprises both a convergence sublayer and a segmentation and reassembly (SAR) sublayer. The AAL obtains the identity of the E0 and the ATM VP/VC from the control interface 604. The AAL 616 is operational to convert between the E0 format and the ATM format, either in response to a control instruction or without a control instruction. AAL's are known in the art. If desired, the AAL 616 can be configured to receive control messages through the control interface 604 for N×64 user communications.

E0 connections are bi-directional and ATM connections typically are uni-directional. As a result, two virtual connections in opposing directions typically will be required for each E0. Those skilled in the art will appreciate how this can be accomplished in the context of the invention.

In some instances, it may be desirable to incorporate digital signal processing capabilities at the E0 level. Also, it may be desirable to apply echo control. In these embodiments, a signal processor 614 is included either separately (as shown) or as a part of the E0 interface 612. The signaling processor 622 is configured to send control messages to the ATM interworking unit 602 to implement particular features on particular circuits. Alternatively, lookup tables may be used to implement particular features for particular circuits or VP/VCs.

The Signaling Processor

The signaling processor receives and processes telecommunications call signaling, control messages, and customer data to select connections that establish communication paths for calls. In the preferred embodiment, the signaling processor processes SS7 signaling to select connections for a call. An example of call processing in a call processor and the associated maintenance that is performed for call processing is described in a U.S. patent application Ser. No. 09/026,766 entitled "System and Method for Treating a Call for Call Processing," filed on Feb. 20, 1998, which is incorporated herein by reference.

In addition to selecting connections, the signaling processor performs many other functions in the context of call processing. It not only can control routing and select the actual connections, but it also can validate callers, control echo cancellers, generate accounting information, invoke intelligent network functions, access remote databases, manage traffic, and balance network loads. One skilled in the art will appreciate how the signaling processor described below can be adapted to operate in the above embodiments.

Figure 7:
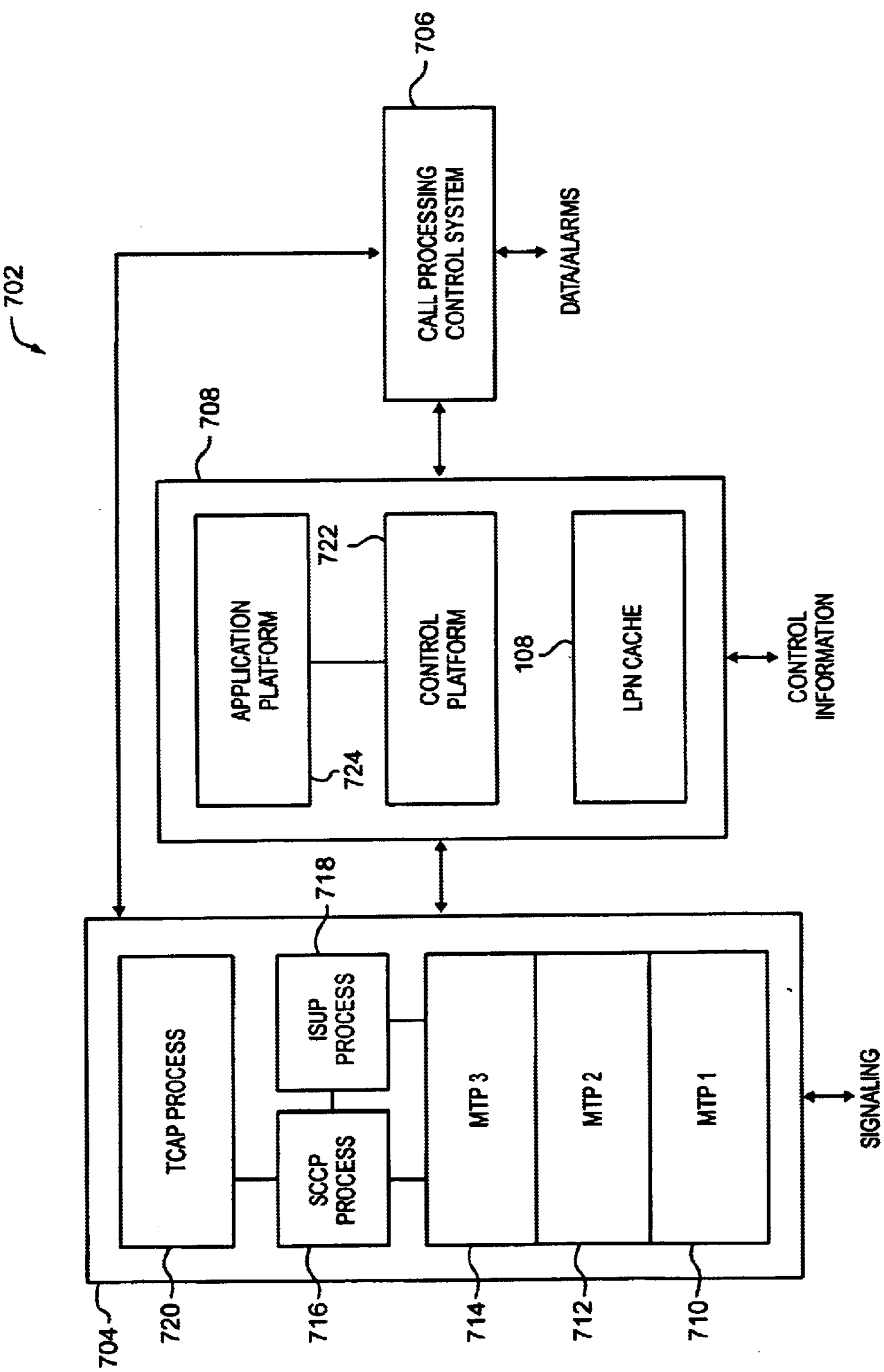
FIG. 7 is a block diagram of a signaling processor constructed in accordance with the present system.

FIG. 7 depicts an embodiment of a signaling processor. Other versions also are contemplated. In the embodiment of FIG. 7, the signaling processor 702 has a signaling interface 704, a call processing control system 706 (CPCS), and a call processor 708. It will be appreciated that the signaling processor 702 may be constructed as modules in a single unit or as multiple units.

The signaling interface 704 is coupled externally to signaling systems—preferably to signaling systems having a message transfer part (MTP), an ISDN user part (ISUP), a signaling connection control part (SCCP), an intelligent network application part (INAP), and a transaction capabilities application part (TCAP). The signaling interface 704 preferably is a platform that comprises an MTP level 1 710, an MTP level 2 712, an MTP level 3 714, an SCCP process 716, an ISUP process 718, and a TCAP process 720. The signaling interface 704 also has INAP functionality.

The signaling interface 704 may be linked to a communication device (not shown). For example, the communication device may be an SCP which is queried by the signaling interface with a TCAP query to obtain additional call-associated data. The answer message may have additional information parameters that are required to complete call processing. The communication device also may be an STP or other device.

The signaling interface 704 is operational to transmit, process, and receive call signaling. The TCAP, SCCP, ISUP, and INAP functionality use the services of the MTP to transmit and receive the messages. Preferably, the signaling interface 704 transmits and receives SS7 messages for MTP, TCAP, SCCP, and ISUP. Together, this functionality is referred to as an "SS7 stack," and it is well known. The software required by one skilled in the art to configure an SS7 stack is commercially available. One example is the OMNI SS7 stack from Dale, Gesek, McWilliams & Sheridan, Inc. (the DGM&S company).

The processes of the signaling interface 704 process information that is received in message signal units (MSUs) and convert the information to call information elements that are sent to the call processor 708 to be processed. A call information element may be, for example, an ISUP IAM message parameter from the MSU. The signaling interface 704 strips the unneeded header information from the MSU to isolate the message information parameters and passes the information parameters to the call processor 708 as the call information elements. Examples of these information parameters are the called number, the calling number, and user service information. Other examples of messages with information parameters are an ANM, an ACM, an REL, an RLC, and an INF. In additions call information elements are transferred from the call processor 708 back to the signaling interface 704, and the information elements are reassembled into MSUs and transferred to a signaling point. The term information parameter and the term signaling parameter can be used alternately herein and have the same meaning.

The CPCS 706 is a management and administration system. The CPCS 706 is the user interface and external systems interface into the call processor 708. The CPCS 706 serves as a collection point for call-associated data such as logs, operational measurement data, statistical information, accounting information, and other call data. The CPCS 706 can configure the call-associated data and/or transmit it to reporting centers.

The CPCS 706 accepts data, such as the translations, from a source such as an operations system and updates the data in the tables in the call processor 708. The CPCS 706 ensures that this data is in the correct format prior to transferring the data to the call processor 708. The CPCS 706 also provides configuration data to other devices including the call processor 708, the signaling interface 704, the interworking unit (not shown), and the controllable ATM matrix (not shown). In addition, the CPCS 706 provides for remote control of call monitoring and call tapping applications from the call processor 708.

The CPCS 706 also serves as a collection point for alarms. Alarm information is transferred to the CPCS 706. The CPCS 706 then transports alarm messages to the required communication device. For example, the CPCS 706 can transport alarms to an operations center.

The CPCS 706 also has a human-machine interface (HMI). This allows a person to log onto the CPCS 706 and manage data tables or review data tables in the CPCS or provide maintenance services.

The call processor 708 processes call signaling and controls an ATM interworking unit, such as an ATM interworking multiplexer (mux) that performs interworking of DS0s and VP/VCs, and an ATM matrix. However, the call processor 708 may control other communications devices and connections in other embodiments.

The call processor 708 comprises a control platform 722 and an application platform 724. Each platform 722 and 724 is coupled to the other platform.

The control platform 722 is comprised of various external interfaces including an interworking unit interface, a controllable ATM matrix, an echo interface, a resource control interface, a call information interface, and an operations interface. The control platform 722 is externally coupled to an interworking unit control, a controllable ATM matrix control, an echo control, a resource control, accounting, and operations. The interworking unit interface exchanges messages with at least one interworking unit. These messages comprise DS0 to VP/VC assignments, acknowledgments, and status information. The controllable ATM matrix interface exchanges messages with at least one controllable ATM matrix. These messages comprise DS0 to VP/VC assignments, VP/VC to VP/VC assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The call information interface transfers pertinent call information to a call information processing system, such as to the CPCS 706. Typical call information includes accounting information, such as the parties to the call, time points for the call, and any special features applied to the call. One skilled in the art will appreciate how to produce the software for the interfaces in the control platform 722.

The application platform 724 processes signaling information from the signaling interface 704 to select connections. The identity of the selected connections are provided to the control platform 722 for the interworking unit interface and/or for the controllable ATM matrix interface. The application platform 724 is responsible for validation, translation, routing, call control, exceptions, screening, and error handling. In addition to providing the control requirements for the interworking unit and the controllable ATM matrix, the application platform 724 also provides requirements for echo control and resource control to the appropriate interface of the control platform 722. In addition, the application platform 724 generates signaling information for transmission by the signaling interface 704. The signaling information might be for ISUP, INAP, or TCAP messages to external network elements. Pertinent information for each call is stored in an enhanced circuit data block (ECDB) for the call. The ECDB can be used for tracking and accounting the call. Fixed attribute information, such as a name associated with a trunk group number for example, is added by the CPCS to generate a call information block (CIB).

The application platform 724 preferably operates in general accord with the Basic Call State Model (BCSM) defined by the ITU. An instance of the BCSM is created to handle each call. The BCSM includes an originating process and a terminating process. The application platform 724 includes a service switching function (SSF) that is used to invoke the service control function (SCF). Typically, the SCF is contained in an SCP. The SCF is queried with TCAP or INAP messages that are transported by the signaling interface 704 and which are, initiated with information from the SSF in the application platform 724. The originating or terminating processes will access remote databases with intelligent network (IN) functionality via the SSF.

Software requirements for the application platform 724 can be produced in specification and description language (SDL) defined in ITU-T Z.100 or similar logic or description languages. The SDL can be converted into C code. A real time case tool such as SDT from Telelogic, Inc. or Object Time from Object Time, Inc. can be used. Additional C and C++ code can be added as required to establish the environment. It will be appreciated that other software languages and tools may be used.

The call processor 708 can be comprised of the above-described software loaded onto a computer. The computer can be a generally available fault-tolerant Unix computer, such as those provided by Sun, Tandem, or Hewlett Packard. It may be desirable to utilize the multi-threading capability of a Unix operating system.

From FIG. 7, it can be seen that the application platform 724 processes signaling information to control numerous systems and facilitate call connections and services. The SS7 signaling is exchanged between the call processor 708 and external components through the signaling interface 704, and control information is exchanged with external systems through the control platform 722. Advantageously, the signaling interface 704, the CPCS 706, and the call processor 708 are not integrated into a switch central processing unit (CPU) that is coupled to a switching matrix. Unlike an SCP, the components of the signaling processor 702 are capable of processing ISUP messages independently of TCAP queries.

SS7 Message Designations

SS7 messages are well known. Designations for various SS7 messages commonly are used. Those skilled in, the art are familiar with the following message designations:

| | | |
|---|---|---|
| ACM | -- | Address Complete Message |
| ANM | -- | Answer Message |
| BLO | -- | Blocking |
| BLA | -- | Blocking Acknowledgment |
| CPG | -- | Call Progress |
| CGB | -- | Circuit Group Blocking |
| CGBA | -- | Circuit Group Blocking Acknowledgment |
| GRS | -- | Circuit Group Reset |
| GRA | -- | Circuit Group Reset Acknowledgment |
| CGU | -- | Circuit Group Unblocking |
| CGUA | -- | Circuit Group Unblocking Acknowledgment |
| CQM | -- | Circuit Group Query |
| CQR | -- | Circuit Group Query Response |
| CRM | -- | Circuit Reservation Message |
| CRA | -- | Circuit Reservation Acknowledgment |
| CVT | -- | Circuit Validation Test |
| CVR | -- | Circuit Validation Response |
| CFN | -- | Confusion |
| COT | -- | Continuity |
| CCR | -- | Continuity Check Request |
| EXM | -- | Exit Message |
| INF | -- | Information |
| INR | -- | Information Request |
| IAM | -- | Initial Address Message |
| LPA | -- | Loop Back Acknowledgment |
| PAM | -- | Pass Along Message |
| REL | -- | Release |
| RLC | -- | Release Complete |
| RSC | -- | Reset Circuit |
| RES | -- | Resume |
| SUS | -- | Suspend |

-continued

| | | |
|---|---|---|
| UBL | -- | Unblocking |
| UBA | -- | Unblocking Acknowledgment |
| UCIC | -- | Unequipped Circuit Identification Code. |

Call Processor Tables

Call processing typically entails two aspects. First, an incoming or "originating" connection is recognized by an origination call process. For example, the initial connection that a call uses to enter a network is the originating connection in that network. Second, an outgoing or "terminating" connection is selected by a termination call process. For example, the terminating connection is coupled to the originating connection in order to extend the call through the network. These two aspects of call processing are referred to as the originating side of the call and the terminating side of the call.

The system of the present invention can be configured to select two connections when two communication devices are used to connect a call, such as both the interworking unit and the ATM matrix. In this configuration, the system selects two terminating connections: one for the first originating connection originating at the first communication device and one for the second originating connection originating at the second communication device. In this configuration, the terminating connection at the first communication device is the originating connection at the second communication device. In this configuration, the connections are not prone for selection using a static table to determine a particular terminating connection for a particular originating connection.

The system of the present invention also can be configured to select one connection using a static table and to select one connection with non-static signaling parameter processing when two communication devices are used to connect a call, such as both the interworking unit and the ATM matrix. In this configuration, the system selects two terminating connections: one for the first originating connection originating at the first communication device and one for the second originating connection originating at the second communication device. In this configuration, the terminating connection at the first communication device is the originating connection at the second communication device. In this configuration, either the first or the second connection is selected using a static table to process the signaling parameters. For example, a particular originating connection always can be connected to a particular terminating connection. The other connection is selected by processing signaling parameters that are not prone to having a static result.

It will be appreciated that the following tables are used by the origination call process module and the termination call process module described below. The origination call process module, the termination call process module, and the tables are constructed so that any of the tables be used to determine a terminating connection based on the particular signaling parameter for that call. Thus, the origination call process module can use one or more of the tables to process the signaling parameters to accept and to analyze the call, and the termination call process module can use one or more of the tables to process the signaling parameters to determine and to establish a terminating connection.

The system segments call traffic and takes specific actions on that segmentation based on particular signaling parameters. Call traffic is isolated and particular connections are determined and established according to the particular signaling parameters. Any call that has a particular set of signaling parameters is dispatched in a particular way.

Figure 8:
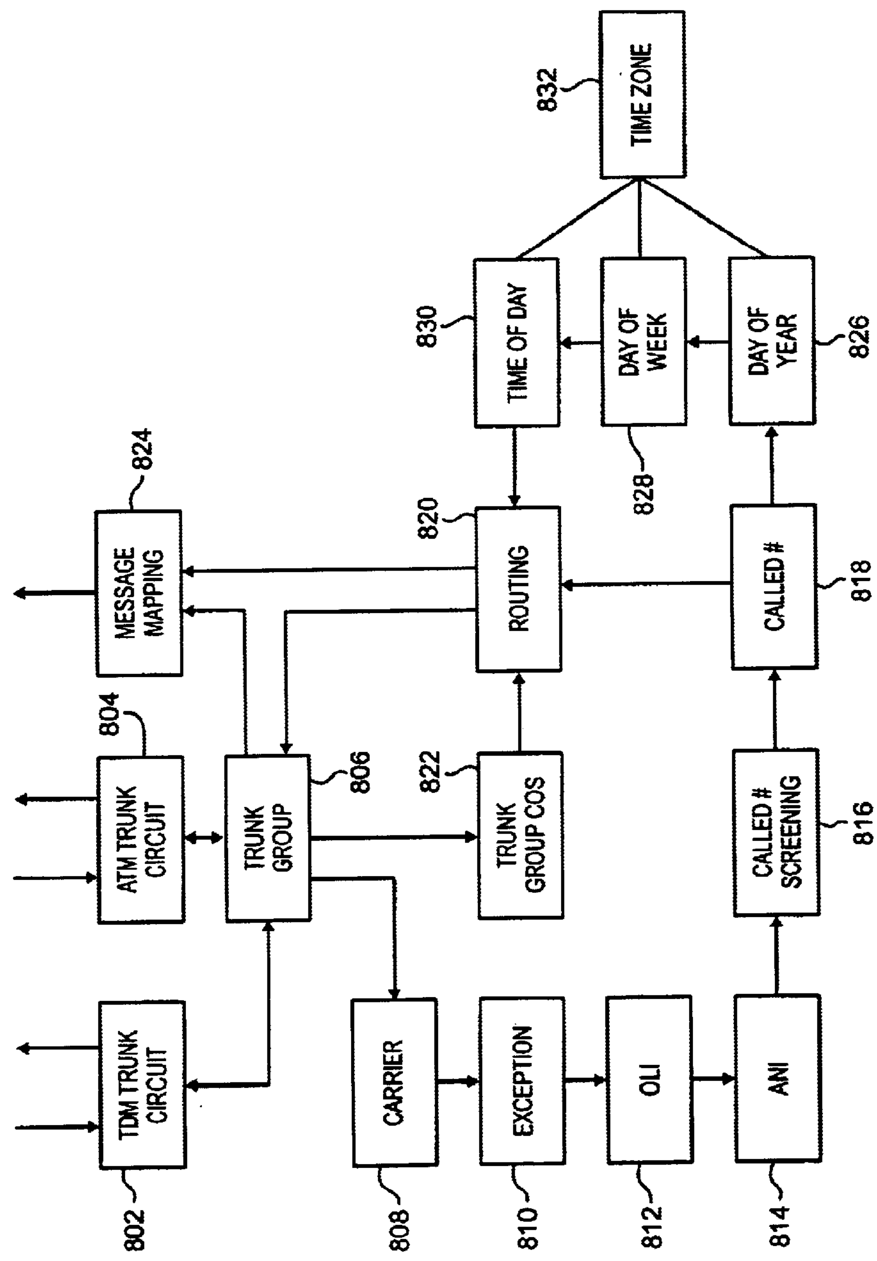
FIG. 8 is a block diagram of a data structure having tables that are used in the signaling processor of FIG. 7.

FIG. 8 depicts an exemplary data structure preferably used by the call processor 702 of FIG. 7 to execute the, BCSM. This is accomplished through a series of tables that point to one another in various ways. The pointers typically are comprised of next function and next label designations. The next function points to the next table, and the next label points to an entry or a range of entries in that table. It will be appreciated that the pointers for the main call processing are illustrated in FIG. 8.

The primary data structure has a TDM trunk circuit table 802, an ATM trunk circuit table 804, a trunk group table 806, a carrier table 808, an exception table 810, an originating line information (OLI) table 812, an automatic number identification (ANI) table 814, a called number screening table 816, a called number table 818, a routing table 820, a trunk group class of service (COS) table 822, and a message mapping table 824. Also included in the data structure are a day of year table 826, a day of week table 828, a time of day table 830, and a time zone table 832.

The TDM trunk circuit table 802 contains information required to provision the TDM side of a connection from the call processor site. Each circuit on the TDM side of a connection has an entry. The TDM trunk circuit table 802 is accessed from the trunk group table 806 or an external call process, and it points to the trunk group table.

The ATM trunk circuit table 804 contains information required to provision the ATM side of a connection. Typically, one record appears in this table per ATM trunk group. Although, the system can be configured alternately for multiple records per trunk group. The ATM trunk circuit table 804 is accessed from the trunk group table 806 or an external call process, and it points to the trunk group table.

The trunk group table 806 contains information that is required to build trunk groups out of different trunk members identified in the TDM and ATM trunk circuit tables 802 and 804. The trunk group table 806 contains information related to the originating and terminating trunk groups. The trunk group table 806 typically points to the carrier table 808. Although, the trunk group table 806 may point to the exception table 810, the OLI table 812, the ANI table 814, the called number screening table 816, the called number table 818, the routing table 820, the day of year table 826, the day of week table 828, the time of day table 830, and the treatment table (see FIG. 9).

For default processing of an IAM of an outgoing call in the forward direction, when the call process determines call setup and routing parameters for user communications on the originating portion, the trunk group table 806 is the next table after the TDM and ATM trunk circuit tables 802 and 804, and the trunk group table points to the carrier table 808. For default processing of an IAM of an outgoing call in the forward direction, when the call process determines call setup and routing parameters for user communications on the terminating portion, the trunk group table 806 is the next table after the routing table 820, and the trunk group table points to the TDM or ATM trunk circuit table 802 or 804. For default processing of an ACM or an ANM of an outgoing call in the originating direction, when the call process determines parameters for signaling, the trunk group table 806 is the next table after the TDM or ATM trunk circuit table 802 or 804, and the trunk group table points to the message mapping table 824. It will be appreciated that this is the default method, and, as explained herein, other implementations of table processing occur.

The carrier table 808 contains information that allows calls to be screened based, at least in part, on the carrier information parameter and the carrier selection parameter. The carrier table 808 typically points to the exception table 810. Although, the carrier table 808 may point to the OLI table 812, the ANI table 814, the called number screening table 816, the called number table 818, the routing table 820, the day of year table 826, the day of week table 828, the time of day table 830, the treatment table (see FIG. 9), and the database services table (see FIG. 11).

The exception table 810 is used to identify various exception conditions related to the call that may influence the routing or handling of the call. The exception table 810 contains information that allows calls to be screened based, at least in part, on the called party number and the calling party's category. The exception table 810 typically points to the OLI table 812. Although, the exception table 810 can point to the ANI table 814, the called number screening table 816, the called number table 818, the routing table 820, the day of year table 826, the day of week table 828, the time of day table 830, the call rate table, the percent control table, the treatment table (see FIG. 9), and the database services table (see FIG. 11).

The OLI table 812 contains information that allows calls to be screened based, at least in part, on originating line information in an IAM. The OLI table 812 typically points to the ANI table 814. Although, the OLI table can point to the called number screening table 816, the called number table 818, the routing table 820, the day of year table 826, the day of week table 828, the time of day table 830, and the treatment table (see FIG. 9).

The ANI table 814 is used to identify any special characteristics related to the caller's number, which is commonly, known as automatic number identification. The ANI table 814 is used to screen an d validate an incoming ANI. ANI specific requirements such as queuing, echo cancellation, time zone, and treatments can be established. The ANI table 814 typically points to the called number screening table 816. Although, the ANI table 814 can point to the called number table 818, the routing table 820, the day of year table 826, the day of week table 828, the time of day table 830, and the treatment table (see FIG. 9).

The called number screening table 816 is used to screen called numbers. The called number screening table 816 determines the disposition of the called number and the nature of the called number. The called number screening table 816 is used to provide the trigger detection point (TDP) for an AIN SCP TCAP query. It is used, for example, with the local number portability (LNP) feature. The called number screening table can invoke a TCAP query. The called number screening table 816 typically points to the called number table 818. Although, the called number screening table 816 can point to the routing table 820, the treatment table, the call rate table, the percent table (see FIG. 9), and the database services table (see FIG. 11).

The called number table 818 is used to identify routing requirements based on, for example, the called number. This will be the case for standard calls. The called number table 818 typically points to the routing table 810. In addition, the called number table 826 can be configured to alternately point to the day of year table 826. The called number table 818 can also point to the treatment table (see FIG. 9) and the database services table (see FIG. 11).

The routing table 820 contains information relating to the routing of a call for various connections. The routing table 820 typically points to the treatment table (see FIG. 9). Although, the routing table also can point to the trunk group table 806 and the database services table (see FIG. 11).

For default processing of an IAM of an outgoing call in the forward direction, when the call process determines call setup and routing parameters for user communications, the routing table 820 is the next table after the called number table 818, and the routing table points to the trunk group table 806. For default processing of an IAM of an outgoing call in the forward direction, when the call process determines parameters for signaling, the routing table 820 is the next table after the called number table 818, and the routing table points to the message mapping table 824. It will be appreciated that this is the default method, and, as explained herein, other implementations of table processing occur.

The trunk group COS table 822 contains information that allows calls to be routed differently based on the class of service assigned to the originating trunk group and to the terminating trunk group. The trunk group COS table can point to the routing table 820 or the treatment table (see FIG. 9).

When the trunk group, COS table 822 is used in processing, after the routing table 820 and the trunk group table 806 are processed, the trunk group table points to the trunk group COS table. The trunk group COS table points back to the routing table 820 for further processing. Processing then continues with the routing table 820 which points to the trunk group table 806, and the trunk group table which points to the TDM or ATM trunk circuit table 802 or 804. It will be appreciated that this is the default method, and, as explained herein, other implementations of table processing occur.

The message mapping table 824 is used to provide instructions for the formatting of signaling messages from the call processor. It typically can be accessed by the routing table 820 or the trunk group table 806 and typically determines the format of the outgoing messages leaving the call processor.

The day of year table 826 contains information that allows calls to be routed differently based on the day of the year. The day of year table typically points to the routing table 820 and references the time zone table 832 for information. The day of year table 826 also can point to the called number screening table 816, the called number table 818, the routing table 820, the day of week table 828, the time of day table 830, and the treatment table (see FIG. 9).

The day of week table 828 contains information that allows calls to be routed differently based on the day of the week. The day of week table typically points to the routing table 820 and references the time zone table 832 for information. The day of week table 828 also can point to the called number screening table 816, the called number table 818, the time of day table 830, and the treatment table (see FIG. 9).

The time of day table 830 contains information that allows calls to be routed differently based on the time of the day. The time of day table 830 typically points to the routing table 820 and references the time zone table 832 for information. The time of day table 830 also can point to the called number screening table 816, the called number table 818, and the treatment table (see FIG. 9).

The time zone table 832 contains information that allows call processing to determine if the time associated with the call processing should be offset based on the time zone or daylight savings time. The time zone table 832 is referenced by, and provides information to, the day of year table 826, the day of week table 828, and the time of day table 830.

Figure 9:
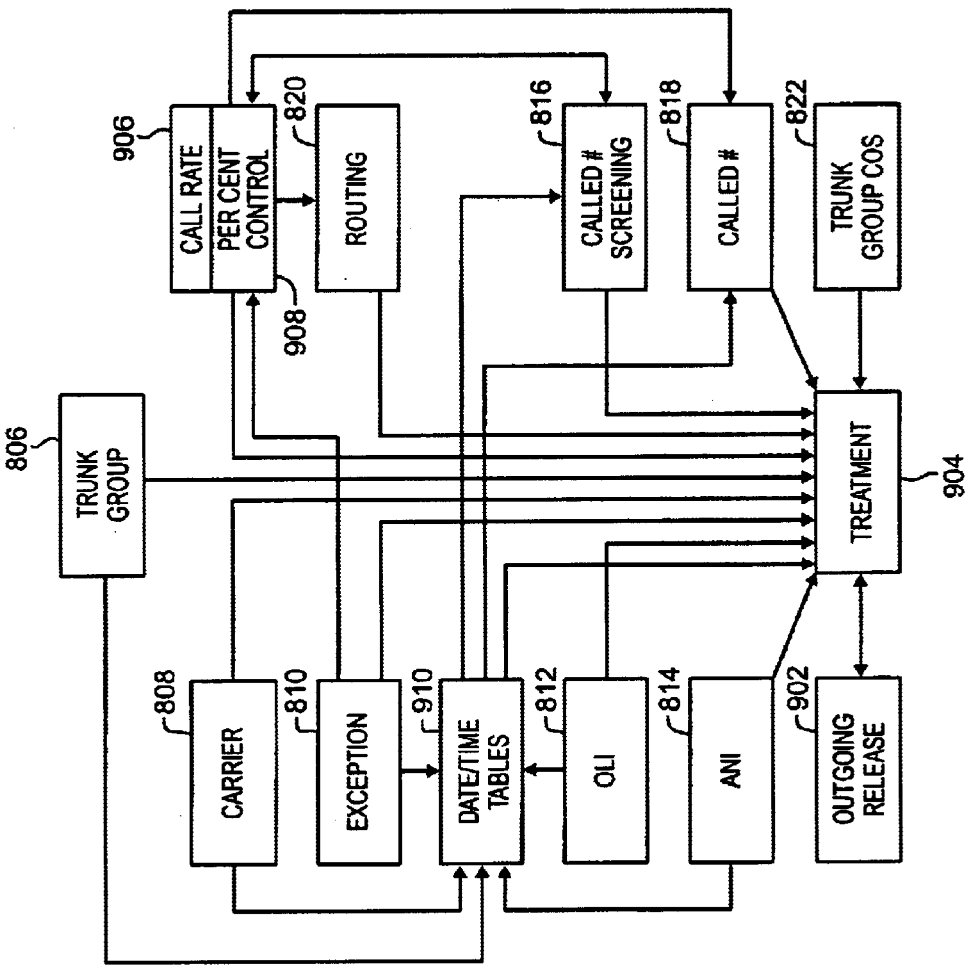
FIG. 9 is a block diagram of additional tables that are used in the signaling processor of FIG. 8.

FIG. 9 is an overlay of FIG. 8. The tables from FIG. 8 are present. However, for clarity, the table's pointers have been omitted, and some tables have not been duplicated in FIG. 9. FIG. 9 illustrates additional tables that can be accessed from the tables of FIG. 8. These include an outgoing release table 902, a treatment table 904, a call rate table 906, and a percent control table 908, and time/date tables 910.

The outgoing release table 902 contains information that allows call processing to determine how an outgoing release message is to be formatted. The outgoing release table 902 typically points to the treatment table 906.

The treatment table 904 identifies various special actions to be taken in the course of call processing. For example, based on the incoming trunk group or ANI, different treatments or cause codes are-used to convey problems to the called and calling parties. This typically will result in the transmission of a release message (REL) and a cause value. The treatment table 904 typically points to the outgoing release table 902 and the database services table (see FIG. 10).

The call rate table 906 contains information that is used to control call attempts on an attempt per second basis. Preferably, attempts from 100 per second to 1 per minute are programmable. The call rate table 906 typically points to the called number screening table 816, the called number table 818, the routing table 820, and the treatment table 904.

The percent control table 908 contains information that is used to control call attempts based upon a percent value of the traffic that is processed through call processing. The percent control table 908 typically points to the called number screening table 816, the called number table 818, the routing table 820, and the treatment table 904.

The date/time tables 910 have been identified in FIG. 8 as the day of year table 826, the day of week table 828, the time of day table 826, and the time zone table 832. They are illustrated in FIG. 9 as a single location for ease and clarity but need not be so located.

Figure 10:
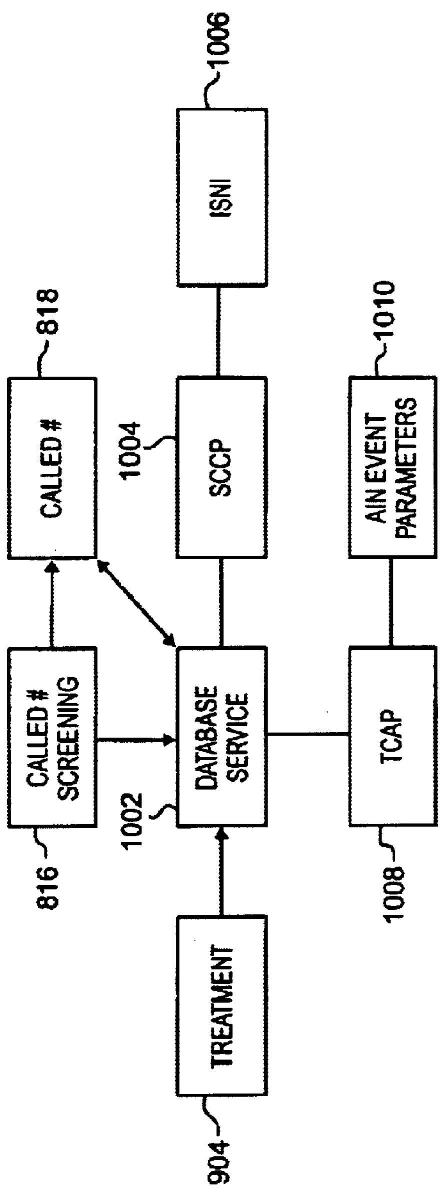
FIG. 10 is a block diagram of additional tables that are used in the signaling processor of FIG. 8.

FIG. 10 is an overlay of FIGS. 8–9. The tables from FIGS. 8–9 are present. However, for clarity, the table's pointers have been omitted, and some tables have not been duplicated in FIG. 10.

FIG. 10 illustrates additional tables that can be accessed from the tables of FIGS. 8–9 and which are directed to the TCAP and the SCCP message processes. These include a database services table 1002, a signaling connection control part (SCCP) table 1004, an intermediate signaling network identification (ISNI) table 1006, a transaction capabilities application part (TCAP) table 1008, and an advanced intelligent network (AIN) event parameters table 1010.

The database services table 1002 contains information about the type of database service requested by call processing. The database services table 1002 references and obtains information from the SCCP table 1004 and the TCAP table 1008. After the database function is performed, the call is returned to normal call processing. The database services table 1002 points to the called number table 818.

The SCCP table 1004 contains information and parameters required to build an SCCP message. The SCCP table 1004 is referenced by the database services table 1002 and provides information to the database services table.

The ISNI table 1006 contains network information that is used for routing SCCP message to a destination node. The ISNI table 1006 is referenced by the SCCP table 1004 and provides information to the SCCP table.

The TCAP table 1008 contains information and parameters required to build a TCAP message. The TCAP table 1008 is referenced by the database services table 1002 and provides information to the database services table.

The AIN event parameters table 1010 contains information and parameters that are included in the parameters portion of a TCAP event message. The AIN event parameters table 1010 is referenced by the TCAP table 1008 and provides information to the TCAP table.

Figure 11:
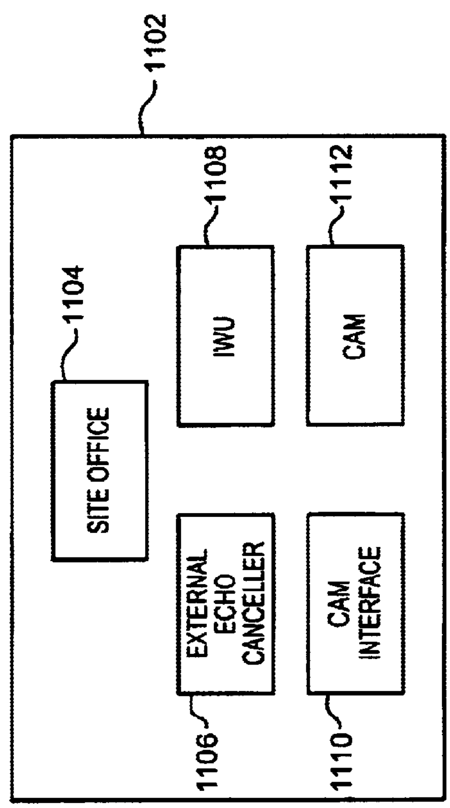
FIG. 11 is a block diagram of additional tables that are used in the signaling processor of FIG. 8.

FIG. 11 is an overlay of FIGS. 8–10. The tables from FIGS. 8–10 are present. However, for clarity, the tables have not been duplicated in FIG. 11. FIG. 11 illustrates additional tables that can be used to setup the call process so that the tables of FIGS. 8–10 may be used. These setup tables 1102 include a site office table 1104, an external echo canceller table 1106, an interworking unit (IWU) table 1108, a controllable ATM matrix (CAM) interface table 1110, and a controllable ATM matrix (CAM) table 1112.

The site office table 1104 contains information which lists office-wide parameters, some of which are information-based and others which affect call processing. The site office table 1104 provides information to the call processor or switch during initialization or other setup procedures, such as population of data or transfer of information to one or more memory locations for use during call processing.

The external echo canceller 1106 contains information that provides the interface identifier and the echo canceller type when an external echo canceller is required. The external echo canceller table 1106 provides information to the call processor or switch during initialization or other setup procedures, such as population of data or transfer of information to one or more memory locations for use during call processing.

The IWU table 1108 contains the internet protocol (IP) identification numbers for interfaces to the interworking units at the call processor or switch site. The IWU table 1108 provides information the call processor or switch during initialization or other setup procedures, such as population of data or transfer of information to one or more memory locations for use during call processing.

The CAM interface table 1110 contains information for the logical interfaces associated with the CAM. The CAM interface table 1110 provides information to the call processor or switch during initialization or other setup procedures, such as population of data or transfer of information to one or more memory locations for use during call processing.

The CAM table 1112 contains information associated with the logical and physical setup properties of the CAM. The CAM table 1112 provides information to the call processor or switch during initialization or other setup procedures, such as population of data or transfer of information to one or more memory locations for use during call processing.

FIGS. 12–41 depict examples of the various tables described above. It will be appreciated that other versions of tables may be used. In addition, information from the identified tables may be combined or changed to form different tables.

FIG. 12 depicts an example of a TDM trunk circuit table. The TDM trunk circuit table is used to access information about the originating circuit for originating circuit call processing. It also is used to provide information about the terminating circuit for terminating circuit call processing. The trunk group number of the circuit associated with the call is used to enter the table. The group member is the second entry that is used as a key to identify or fill information in the table. The group member identifies the member number of the trunk group to which the circuit is assigned, and it is used for the circuit selection control.

The table also contains the trunk circuit identification code (TCIC). The TCIC identifies the trunk circuit which is typically a DS0. The echo canceller (EC) label entry identifies the echo canceller, if any, which is connected to the circuit. The interworking unit (IWU) label and the interworking unit (IWU) port identify the hardware location and the port number, respectively, of the interworking unit. The DS1/E1 label and the DS1 E1 channel denote the DS1 or the E1 and the channel within the DS1 or E1, respectively, that contains the circuit. The initial state specifies the state of the circuit when it is installed. Valid states include blocked if the circuit is installed and blocked from usage, unequipped if the circuit is reserved, and normal if the circuit is installed and available from usage.

FIG. 13 depicts an example of an ATM trunk circuit table. The ATM trunk circuit table is used to access information about the originating circuit for originating circuit call processing. It,also is used to provide information about the terminating circuit for terminating circuit call processing.

The trunk group number, of the circuit associated with the call is used to enter the table. The group size denotes the number of members in the trunk group. The starting trunk circuit identification code (TCIC) is the starting TCIC for the trunk group, and it is used in the routing label of an ISUP message. The transmit interface label identifies the hardware location of the virtual path on which the call will be transmitted. The transmit interface label may designate either an interworking unit interface or a CAM interface for the designated trunk members. The transmit virtual path identifier (VPI) is the VP that will be used on the transmission circuit side of the call. The receive interface label identifies the hardware location of the virtual path on which the call will be received. The receive interface label may designate either an interworking unit interface or a CAM interface for the designated trunk members. The receive virtual path identifier (VPI) is the VP that will be used on the reception circuit side of the call. The initial state specifies the state of the circuit when it is installed. Valid states include blocked if the circuit is installed and blocked from usage, unequipped if the circuit is reserved, and normal if the circuit is installed and available from usage.

FIG. 14A depicts an example of a trunk group table. The trunk group number of the trunk group associated with the circuit is used to key into the trunk group table. The administration information field is used for information purposes concerning the trunk group and typically is not used in call processing. The associated point code is the point code for the far end switch or call processor to which the trunk group is connected. The common language location identifier (CLLI) entry is a standardized Bellcore entry for the associated office to which the trunk group is connected. The trunk type identifies the type of the trunk in the trunk group. The trunk type may be a TDM trunk, an ATM trunk from the interworking unit, or an ATM trunk from the CAM.

The associated numbering plan area (NPA) contains information identifying the switch from which the trunk group is originating or to which the trunk group is terminating. The associated jurisdiction information parameter (JIP) contains information identifying the switch from which the trunk group is originating or to which the trunk group is terminating. If an ISUP JIP is received, an outgoing JIP has the same value as the received JIP. If an ISUP JIP is not received in an IAM, and a default JIP value is present, then call processing will populate the JIP of the outgoing IAM with the default value from the trunk group table. If a JIP is not received, and there is no default JIP value, then an outgoing JIP is not transmitted.

The time zone label identifies the time zone that should be used when computing a local date and a local time for use with a day of year table, the day of week table, and the time of day table. The echo canceller information field describes the trunk group echo cancellation requirements. Valid entries for the echo canceller information include normal for a trunk group that uses internal echo cancellation, external for a trunk group that requires external echo cancellers, and disable for a trunk group that requires no echo cancellation for any call passing over the group.

FIG. 14B is a continuation of FIG. 14A for the trunk group table. The satellite entry specifies that the trunk group for the circuit is connected through a satellite. If the trunk group uses too many satellites, then a call should not use the identified trunk group. This field is used in conjunction with the nature of connection satellite indicator field from the incoming IAM to determine if the outgoing call can be connected over this trunk group. The select sequence indicates the methodology that will be used to select a connection. Valid entries for the select sequence field include the following: most idle, least idle, ascending, or descending. The interworking unit (IWU) priority signifies that outgoing calls will attempt to use a trunk circuit on the same interworking unit before using a trunk circuit on a different interworking unit.

Glare resolution indicates how a glare situation is to be resolved. Glare is the dual seizure of the same circuit. If the glare resolution entry is set to "even/odd," the switch or the call processor with the higher point code value will control the even number TCICs within the trunk group. The switch or call processor with the lower point code value will control the odd number TCICs. If the glare resolution entry is set to "all," the call processor controls all of the TCICs within the trunk group. If the glare resolution entry is set to "none," the call processor will have no glare control and will yield to all double seizures within the trunk group.

Continuity control indicates whether continuity is to be checked. Continuity for outgoing calls on the originating call processor are controlled on a trunk group basis. This field specifies whether continuity is not required or whether continuity is required and the frequency of the required check. The field identifies a percentage of the calls that require continuity check.

The reattempt entry specifies how many times the outgoing call will be re-attempted using a different circuit from the same trunk group after a continuity check failure, a glare, or other connection failure. The ignore local number portability (LNP) information specifies whether or not the incoming LNP information is ignored. The treatment label is a label into the treatment table for the trunk group used on the call. Because specific trunk group connections may require specific release causes or treatments for a specific customer, this field identifies the type of treatment that is required. The message mapping label is a label into the message mapping table which specifies the backward message configuration that will be used on the trunk group.

FIG. 14C is a continuation of FIG. 14B for the trunk group table. The queue entry signifies that the terminating part of the trunk group is capable of queuing calls originating from a subscriber that called a number which terminates in this trunk group. The ring no answer entry specifies whether the trunk group requires ring no answer timing. If the entry is set to 0, the call processing will not use the ring no answer timing for calls-terminated on the trunk group. A number other than 0 specifies the ring no answer timing in seconds for calls terminating on this trunk group. The voice path cut through entry identifies how and when the terminating call's voice path will be cut through on the trunk group. The options for this field include the following: connect for a cut through in both directions after receipt of an ACM, answer for cut through in the backward direction upon receipt of an ACM, then cut through in the forward direction upon receipt of an ANM, or immediate for cut through in both directions immediately after an IAM has been sent.

The originating class of service (COS) label provides a label into a class of service table that determines how a call is handled based on the combination of the originating COS and the terminating COS from another trunk group. Based on the combination of this field and the terminating COS of another trunk group's field, the call will be handled differently. For example, the call may be denied, route advanced, or otherwise processed. The terminating class of service (COS) label provides a label into a class of service table that determines how a call is handled based on the combination of the originating COS from another trunk group and the terminating COS from the present trunk group. Based on a combination of this field and the originating COS the call will be handled differently. For example, the call may be denied, route advanced, or otherwise processed.

Call control provides an index to a specific trunk group level traffic management control. Valid entries include normal for no control applied, skip control, applied wide area telecommunications service (WATS) reroute functionality, cancel control, reroute control overflow, and reroute immediate control. The next function points to the next table, and the next label points to an entry or a range of entries in that table.

FIG. 15 depicts an example of a carrier table. The carrier label is the key to enter the table. The carrier identification (ID) specifies the carrier to be used by the calling party. The carrier selection entry identifies how the caller specifies the carrier. For example, it identifies whether the caller dialed a prefix digit or whether the caller was pre-subscribed. The carrier selection is used to determine how the call will be routed. The next function points to the next table, and the next label defines an area in that table for further call processing.

FIG. 16 depicts an example of an exception table. The exception label is used as a key to enter the table. The calling party's category entry specifies how to process a call from an ordinary subscriber, an unknown subscriber, or a test phone. The called number nature of address differentiates between 0+ calls, 1+ calls, test calls, local routing number (LRN) calls, and international calls. For example, international calls might be routed to a pre-selected international carrier. The called number "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" is a decimal number ranging from 1–15 digits. It can be any length and, if filled with less than 15 digits, is filled with 9s for the remaining digits. The next function and next label entries point to the next table and the next entry within that table for the next routing function.

FIG. 17 depicts an example of the originating line information (OLI) table. The OLI label is used as a key to enter the table from a prior next function operation. The originating line information entry specifies the information digits that are being transmitted from a carrier. Different calls are differentiated based on the information digits. For example, the information digits may identify an ordinary subscriber, a multi-party line, N00 service, prison service, cellular service, or private pay station. The next function and next label entries point to the next table and the area within that table for the next routing function.

FIG. 18 depicts an example of an automatic number identification (ANI) table. The ANI label is used as a key to enter the table from a prior next option. The charge calling party number "digits from" and "digits to" focus further processing unique to ANI within a given range. These entries are looked at to determine if the incoming calling number falls within the "digits from" and "digits to" fields. The time zone label indicates the entry in the time zone table that should be used when computing the local date and time. The time zone label overrides the time zone information from the trunk group table 806.

The customer information entry specifies further customer information on the originating side for call process routing. The echo cancellation (EC) information field specifies whether or not to apply echo cancellation to the associated ANI. The queue entry identifies whether or not queuing is available to the calling party if the called party is busy. Queuing timers determine the length of time that a call can be queued. The treatment label defines how a call will be treated based on information in the treatment table. For example, the treatment label may send a call to a specific recording based on a dialed number. The next function and next label point to the next table and an area within that table for further call processing.

FIG. 19 depicts an example of a called number screening table. The called number screening label is used as a key to enter the table. The called number nature of address indicates the type of dialed number, for example, national versus international. The nature of address entry allows the call process to route a call differently based on the nature of address value provided. The "digits from" and "digits to" entries focus further processing unique to a range of called numbers. The "digits from" and "digits to" columns both contain called number digits, such as NPA-NXX ranges, that may contain ported numbers, and are checked for an LRN. This table serves as the trigger detection point (TDP) for an LNP TCAP when, for example, NPA-NXXs of donor switches that have had subscribers port their numbers are data filled in the "digits from" and "digits to" fields. The delete digits field provides the number of digits to be deleted from the called number before processing continues. The next function and next label point to the next table and the area within that table for further call processing.

FIG. 20 depicts an example of a called number table. The called number label is used as a key to enter the table. The called number nature of address entry indicates the type of dialed number, for example, national versus international. The "digits from" and "digits to" entries focus further processing unique to a range of numbers, including LRNs. The next function and next label point to a next table and the area within that table used for further call processing.

FIG. 21 depicts an example of a day of year table. The day of year label is used as a key to enter the table. The date field indicates the local date which is applicable to the action to be taken during the processing of this table. The next function and next label identify the table and the area within that table for further call processing.

FIG. 22 depicts an example of a day of week table. The day of week label is a key that is used to enter the table. The "day from" field indicates the local day of the week on which the action to be taken by this table line entry is to start. The "day to" field indicates the local day of the week on which the action to be taken by this table line entry is to end. The next function and next label identify the next table and the area within that table for further call processing.

FIG. 23 depicts an example of a time of day table. The time of day label is used as a key to enter the table from a prior next function. The "time from" entry indicates the local time on which an action to be taken is to start. The "time to" field indicates the local time just before which the action to be taken is to stop. The next function and next label entries identify the next table and the area within that table for further call processing.

FIG. 24 depicts an example of a time zone table. The time zone label is used as a key to enter the table and to process an entry so that a customer's local date and time may be computed. The coordinated universal time (UTC) indicates a standard offset of this time zone from the UTC. The UTC is also known as Greenwich mean time, GMT, or Zulu. The UTC should be positive for time zones east of Greenwich, such as Europe and Asia, and negative for time zones west of Greenwich, such as North America. The daylight savings entry indicates whether daylight savings time is used during the summer in this time zone.

FIG. 25 depicts an example of a routing table. The routing label is used as a key to enter the table from a prior next function. The route number specifies a route within a route list. Call processing will process the route choices for a given route label in the order indicated by the route numbers. The next function and next label identify the next table and the area within that table for further call processing. The signal route label is associated with the next action to be taken by call processing for this call. The signal route label provides the index to access the message mapping label. The signal route label is used in order to modify parameter data fields in a signaling message that is being propagated to a next switch or a next call processor.

FIG. 26 depicts an example of a trunk group class of service (COS) table. The originating trunk COS label and the terminating trunk COS label are used as keys to enter the table and define call processing. The next function identifies the next action that will be taken by call processing for this call. Valid entries in the next function column may be continued, treat, route advanced, or routing. Based on these entries call processing may continue using the current trunk group, send the calls to treatment, skip the current trunk group and the routing table and go to the next trunk group on the list, or send the call to a different label in the routing table. The next label entry is a pointer that defines the trunk circuit group that the next function will use to process the call. This field is ignored when the next function is continued or route advanced.

FIG. 27 depicts an example of a treatment table. The treatment label is a key that is used to enter the table. The treatment label is a designation in a call process that determines the disposition of the call. The error/cause label correspond either to internally generated error conditions and call processing or to incoming release cause values. For each treatment label, there "will be a set of error conditions and cause values that will be associated with a series of labels for the call processing error conditions and a series of labels for all incoming release message cause values. The next function and next label point to the next table and the area within that table for further call processing.

FIG. 28 depicts an example of an outgoing release table. The outgoing release label is used as a key to enter the table for processing. The outgoing cause value location identifies the type of network to be used. For example, the location entry may specify a local or remote network or a private, transit, or international network. The coding standard identifies the standard as an International Telecommunications-Union (ITU) standard or an American National Standards Institute (ANSI) standard. The cause value designates error, maintenance, or non-connection processes.

FIG. 29 depicts an example of a percent control table. The percent label is used as a key to enter the table. The control percentage specifies the percentage of incoming calls that will be affected by the control. The control next function allows attempts for call connection to be routed to another table during call processing. The control next label points to an area within that table for further call processing. The passed next function allows only incoming attempts to be routed to another table. The next label points to an area in that table for further call processing.

FIG. 30 depicts an example of a call rate table. The call rate label is used as a key to enter the table. The call rate specifies the number of calls that will be passed by the control on or for completion. Call processing will use this information to determine if the incoming call number falls within this control. The control next function allows a blocked call attempt to be routed to another table. The control next label is a pointer that defines the area in the next table for further call processing. The passed next function allows only an incoming call attempt to be rerouted to another table. The passed next function is a pointer that defines an area in that table for further call processing.

FIG. 31 depicts an example of a database services table. The database services label is used as a key to enter the table. The service type determines the type of logic that is applied when building and responding to database queries. Service types include local number portability and N00 number translation. The signaling connection control part (SCCP) label identifies a location within an SCCP table for further call processing. The transaction capabilities application part (TCAP) label identifies a location within a TCAP table for further processing. The next function identifies the location for the next routing function based on information contained in the database services table as well as information received from a database query. The next label entry specifies an area within the table identified in the next function for further processing.

FIG. 32A depicts an example of a signaling connection control part (SCCP) table. The SCCP label is used as, a key to enter the field. The message type entry identifies the type of message that will be sent in the SCCP message. Message types include Unitdata messages and Extended Unitdata messages. The protocol class entry indicates the type of protocol class that will be used for the message specified in the message type field. The protocol class is used for connectionless transactions to determine whether messages are discarded or returned upon an error condition. The message handling field identifies how the destination call processor or switch is to handle the SCCP message if it is received with errors. This field will designate that the message is to be discarded or returned. The hop counter entry denotes the number of nodes through which the SCCP message can route before the message is returned with an error condition. The segmentation entry denotes whether or not this SCCP message will use segmentation and send more than one SCCP message to the destination.

FIG. 32B is a continuation of FIG. 32A for the SCCP table. The intermediate signaling network identification (ISNI) fields allow the SCCP message to traverse different networks in order to reach a desired node. The ISNI type identifies the type of ISNI message format that will be used for this SCCP message. The route indicator subfield identifies whether or not this SCCP message requires a special type of routing to go through other networks. The mark indicator subfield identifies whether or not network identification will be used for this SCCP message. The label subfield identifies a unique address into the ISNI table when the route indicator sub-field is set to "constrained" and the mark indicator subfield is set to "yes."

FIG. 32C is a continuation of FIG. 32B for the SCCP table. FIG. 32C identifies the called party address field and subfields to provide information on how to route this SCCP message. The address indicator subsystem number (SSN)

indicates whether or not a subsystem number will be included in the called party address. The point code entry indicates whether or not a point code will be included in the calling party address. The global title indicator subfield identifies whether or not a global title translation will be used to route the SCCP message. If a global title translation is chosen, this subfield also identifies the type. The routing indicator subfield identifies the elements that will be used to route the message. Valid entries include global title and point code. The national/international subfield identifies whether the SCCP message will use national or international routing and set up.

The subsystem number field identifies the subsystem number for the SCCP message. The point code number indicates the destination point code to which the SCCP message will be routed. This field will be used for routing messages that do not require SCCP translation.

The global title translation field allows intermediate nodes to translate SCCP messages so that the messages can be routed to the correct destination with the correct point code. The global title translation type entry directs the SCCP message to the correct global title translation function. The encode scheme identifies how the address type will be encoded. The number plan subfield identifies the numbering plan that will be sent to the destination node. The address type subfield will identify which address type to use for address digits and the SCCP routing through the network.

FIG. 32D is a continuation of FIG. 32C for the SCCP table. FIG. 32D identifies the calling party address field which contains the routing information that the destination database uses to retain the SCCP message. The address indicator subsystem number (SSN) indicates whether or not a subsystem number will be included in the called party address. The point code subfield indicates whether or not a point code will be included in the calling party address. The global title indicator subfield identifies whether or not global title translation will be used to route the SCCP message. The routing indicator subfield identifies which elements will be used throughout the message. This field may include global title elements or point code elements. The national/international subfield identifies whether the SCCP will use national or international routing and set up.

The subsystem number identifies a subsystem number for the SCCP message. The point code number field indicates the destination point code to which the SCCP message will be routed. The global title translations allow the intermediate nodes to translate SCCP messages and to route the messages to the correct destination. The global title translation type directs the SCCP message to the correct global title translation function. The encode scheme identifies how the address type will be encoded. The number plan identifies the number plan that will be sent to the destination node. The address type subfield identifies the address type to use for address digits in the SCCP routing through the network.

FIG. 33 depicts an example of an intermediate signaling network identification (ISNI) table. The ISNI table contains a list of networks that will be used for routing SCCP messages to the destination node. The ISNI label is used as a key to enter the table. The network fields 1–16 identify the network number of up to 16 networks that may be used for routing the SCCP message.

FIG. 34 depicts an example of a transaction capabilities application part (TCAP) table. The TCAP label is used as a key to enter the table. The TCAP type identifies the type of the TCAP that will be constructed. The TCAP types include advanced intelligent network (AIN) and distributed intelligent network architecture (DINA). The tag class indicates whether the message will use a common or proprietary structure. The package type field identifies the package type that will be used in the transaction portion of the TCAP message. The component type field identifies the component type that will be used in the component portion of the TCAP message. The message type field identifies the type of TCAP message. Message types include variable options depending on whether they are AIN message types or DINA message types.

FIG. 35 depicts an example of an external echo canceller table. The echo canceller type specifies if an external echo canceller is being used on the circuit and, if so, the type of echo canceller. The echo canceller label points to a location in the controllable ATM matrix table for further call processing. The RS-232 address is the address of the RS-232 interface that is used to communicate with the external echo canceller. The module entry is the module number of the external echo canceller.

FIG. 36 depicts an example of an interworking unit interface table. The interworking unit (IWU) label is a key that is used to enter the table. The IWU identification (ID) identifies which interworking unit is being addressed. The internet protocol (IP) sockets 1–4 specify the IP socket address of any of the four connections to the interworking unit.

FIG. 37 depicts an example of a controllable ATM matrix (CAM) interface table. The CAM interface label is used as a key to enter the table. The CAM label indicates which CAM contains the interface. The logical interface entry specifies a logical interface or port number in the CAM.

FIG. 38 depicts an example of a controllable ATM matrix (CAM) table. The CAM label is used as a key to enter the table. The CAM type indicates the type of CAM control protocol. The CAM address identifies the address of the CAM.

FIG. 39A depicts an example of a call processor or switch site office table. The office CLLI name identifies a CLLI of the associated office for the call processor or switch. The call processor or switch site node identifier (ID) specifies the call processor or switch node identifier. The call processor or switch origination identifier (ID) specifies a call processor or switch origination identifier. The software identifier (ID) specifies a software release identifier. The call processor identifier (ID) specifies the call processor or switch identifier that is sent to the inter working units.

FIG. 39B is a continuation of FIG. 39A of the call processor or switch site office table. The automatic congestion control (ACC) specifies whether ACC is enabled or disabled. The automatic congestion control level (ACL) 1 onset identifies an onset percentage value of a first buffer utilization. The ACL 1 abate entry specifies an abatement percentage of utilization for a .first buffer. The ACL 2 onset entry specifies an onset level for a second buffer. The ACL 2 abate entry specifies an abatement level percentage of buffer utilization for a second buffer. The ACL 3 onset entry specifies an onset level percentage of buffer utilization for a third buffer. The ACL 3 abate entry specifies an abatement level percentage of buffer utilization for a third buffer.

FIG. 39C is a continuation of FIG. 39B for the call processor or switch site office table. The maximum trunks for the off hook queuing (max trunks OHQ) specifies a maximum number of trunk groups that can have the off hook queuing enabled. The OHQ timer one (Tq1) entry specifies the number of milliseconds for the off hook timer number one. The OHQ timer two (Tq2) entry specifies the number of seconds for the off hook timer number two. The ring no answer timer specifies the number of seconds for the ring no answer timer. The billing active entry specifies whether ECDBs are being sent to the call processing control system (CPCS). The network management (NWM) allow entry identifies whether or not a selective trunk reservation and group control are allowed or disallowed. The billing failure free call entry specifies if a call will not be billed if the billing process is unavailable. The billing failure free call will either be enabled for free calls or disabled so that there are no free calls.

FIG. 39D is a continuation of FIG. 39C for the call processor or switch site office table. The maximum (max) hop counts identifies the number of call processor or switch hops that may be made in a single call. The maximum (max) table lookups identifies the number of table lookups that may performed for a single call. This value is used to detect loops in routing tables.

FIGS. 40A–40B depict an example of an advanced intelligent network (AIN) event parameters table. The AIN event parameters table has two columns. The first identifies the parameters that will be included in the parameters portion of the TCAP event message. The second entry may include information for analysis.

FIG. 41 depicts an example of a message mapping table. This table allows the call processor to alter information in outgoing messages. The message type field is used as a key to enter the table and represents the outgoing standard message type. The parameters entry is a pertinent parameter within the outgoing message. The indexes point to various entries in the trunk group and determine if parameters are passed unchanged, omitted, or modified in the outgoing messages.

Initial Call Processing

The above-described tables essentially select a connection or treatment for a call from call set-up to call tear-down. The remaining figures detail the processing of the various SS7 signaling messages by the call processor. These figures use the well known SDL nomenclature. In SDL, rectangles indicate processes, and diamonds represent decisions. Pointed rectangles represent messages sent, and indented rectangles represent messages received. If a vertical line is included in the rectangle, the message is internal to the call processor. If no line is present, the message is external to the call processor. If the point or indent is on the left, the message is related to the origination side of the call. If the point or indent is on the right, the message is related to the termination side of the call. In the following discussion, a transition from one figure to another will be indicated by placing the new figure in parentheses.

The following figures illustrate an example of an origination process module, a termination process module, and a maintenance process module. The origination process module processes, analyzes, and collects the call signaling parameters in order to place the call signaling in a form that will allow the termination process module to select connections. The origination process module accepts the call signaling, determines whether a call attempt is to be authorized, collects additional call signaling parameters if needed, such as LNP parameters, and segments calls for particular processing based on the call signaling parameters. The termination process module selects the termination circuits for the call. The termination process module can have a routing process module that determines a correct route and a termination call control process module that establishes the termination circuits that corresponds to the route.

It will be appreciated that if two terminating circuits are selected, one of the terminating circuits is the originating circuit for the other terminating circuit. The maintenance module provides call maintenance and treatment for the circuits and for treating calls for non-call associated messaging.

Figure 42A:
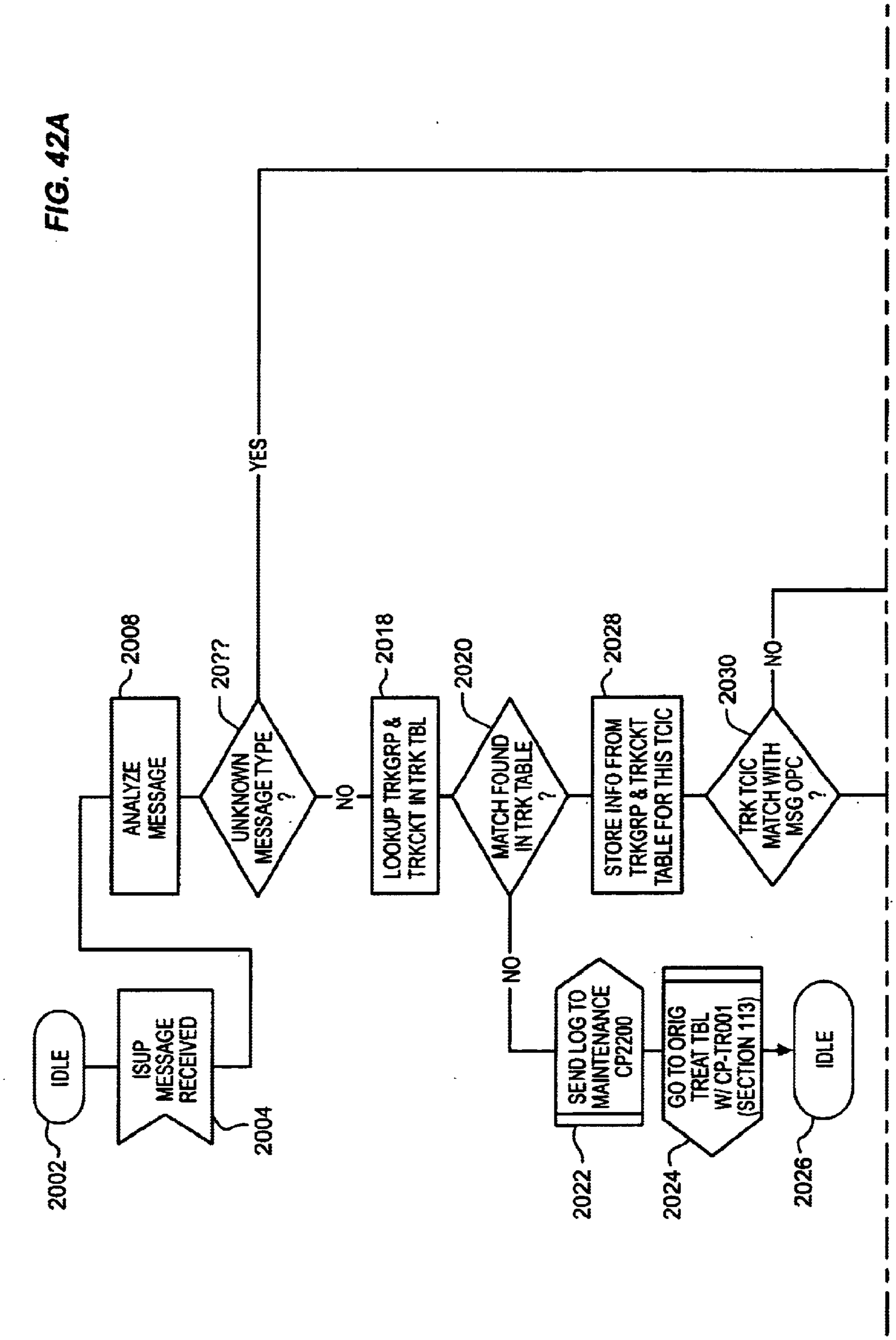
FIGS. 42A–42B are SDL diagram of logic used in a version of the invention for initial call processing.
Figure 42B:
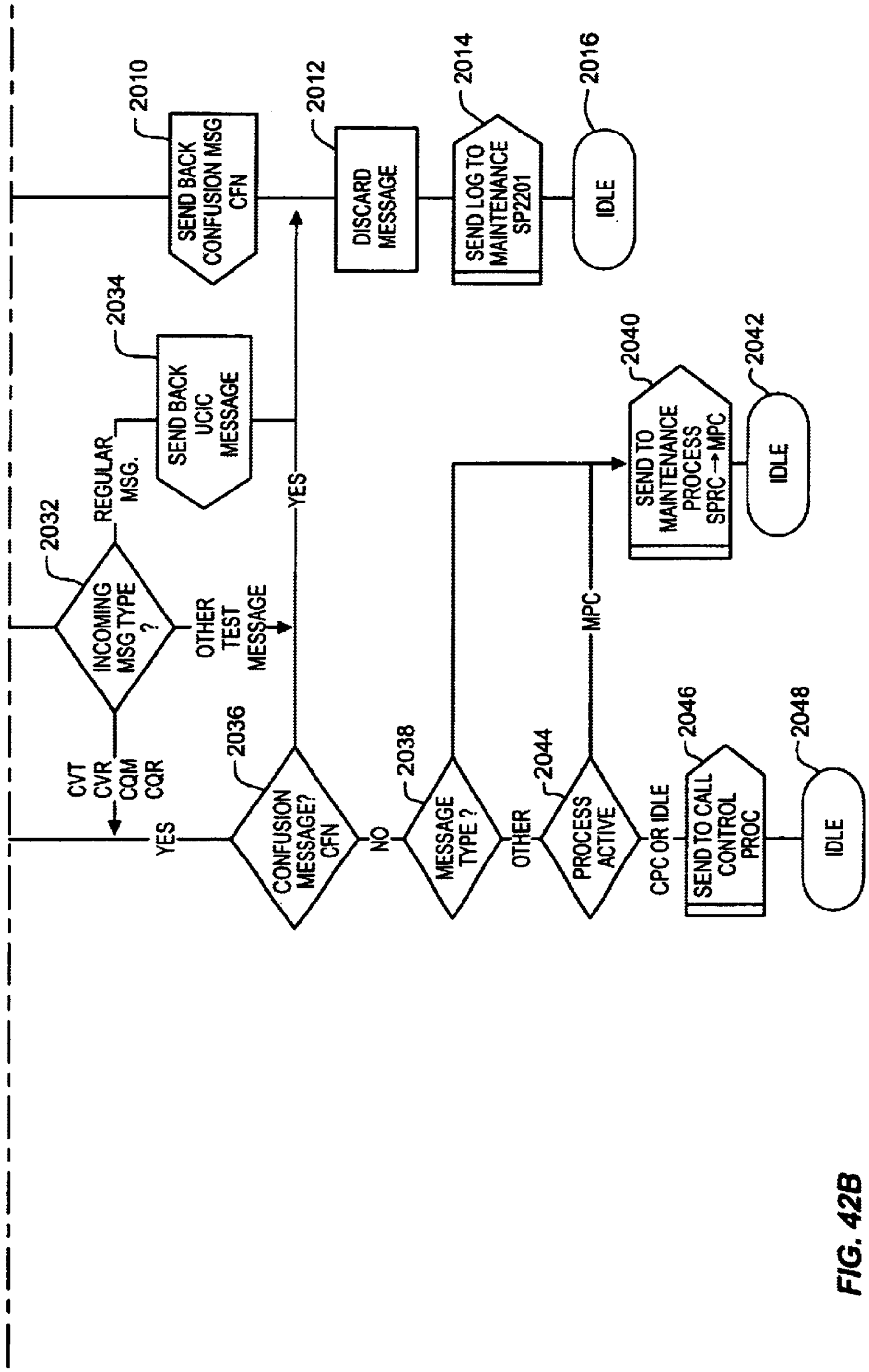

FIGS. 42A–42B depicts an example of the initial handling of all messages by the call processor. The process begins with step 2002 in the idle state. At 2004, a message is received, and it is analyzed at 2006. If the message is unrecognized at 2008, then a confusion message (CFN) is sent back at 2010, and the message is discarded at 2012. The maintenance process (maintenance) is informed with a log message at 2014, and idle is attained at 2016.

If the message is recognized at 2008, the trunk table is checked at 2018 to determine the trunk group and the trunk circuit. If a match is not found at 2020, a log is sent to maintenance at 2022, and the process is sent to the treatment table for the origination process at 2024. The idle state is attained at 2026.

If a match is found in the trunk table at 2020, the information from the trunk group table and the trunk circuit table are stored for this trunk circuit identification code (TCIC) at 2028. If the TCIC does not match the origination point code (OPC) from the incoming message at 2030, and if the incoming message type is a regular message at 2032, then an unequipped circuit identification code message (UCIC) is sent back at 2034. The message is discarded at 2012, a log is sent to maintenance at 2014, and idle is attained at 2016.

If the TIC does not match the OPC from the incoming message at 2030, and if the incoming message type is a test message other than a circuit validation test message (CVT), a circuit validation response (CVR), a circuit query message (CQM), or a circuit query response (CQR) at 2032, then the message is discarded at 2012. A log is sent to maintenance at 2014, and idle is attained at 2016.

If the TCIC matches the OPC from the incoming message at 2030, or if the incoming message type is a CDT, a CVR, a CQM, or a CQR at 2032, then it is determined if the message is a CFN at 2036. If the message is a CFN at 2036, the message is discarded at 2012, and a log is sent to maintenance at 2014. Idle is attained at 2016.

If the message is not a CFN at 2036, and if the message is a maintenance message at 2038, the message is sent to maintenance at 2040, and idle is attained at 2042. The following messages are maintenance messages: BLO, BLA, CCR, CFN, COB, CGBA, CGU, CGUA, CQM, CQR, GRA, CVT, CVR, GRS, LPA, RSC, UBL, UBA, and UCIC. If the message is other thin a maintenance message at 2038, but the active process is a maintenance processing control (MPC) process at 2044, then the message is sent to maintenance at 2040. Idle is attained at 2042.

If the active process at 2044 is a call processing control (CPC) process or if the process is idle, then it is sent to the call control process at 2046. Idle is attained at 2048.

Figure 43:
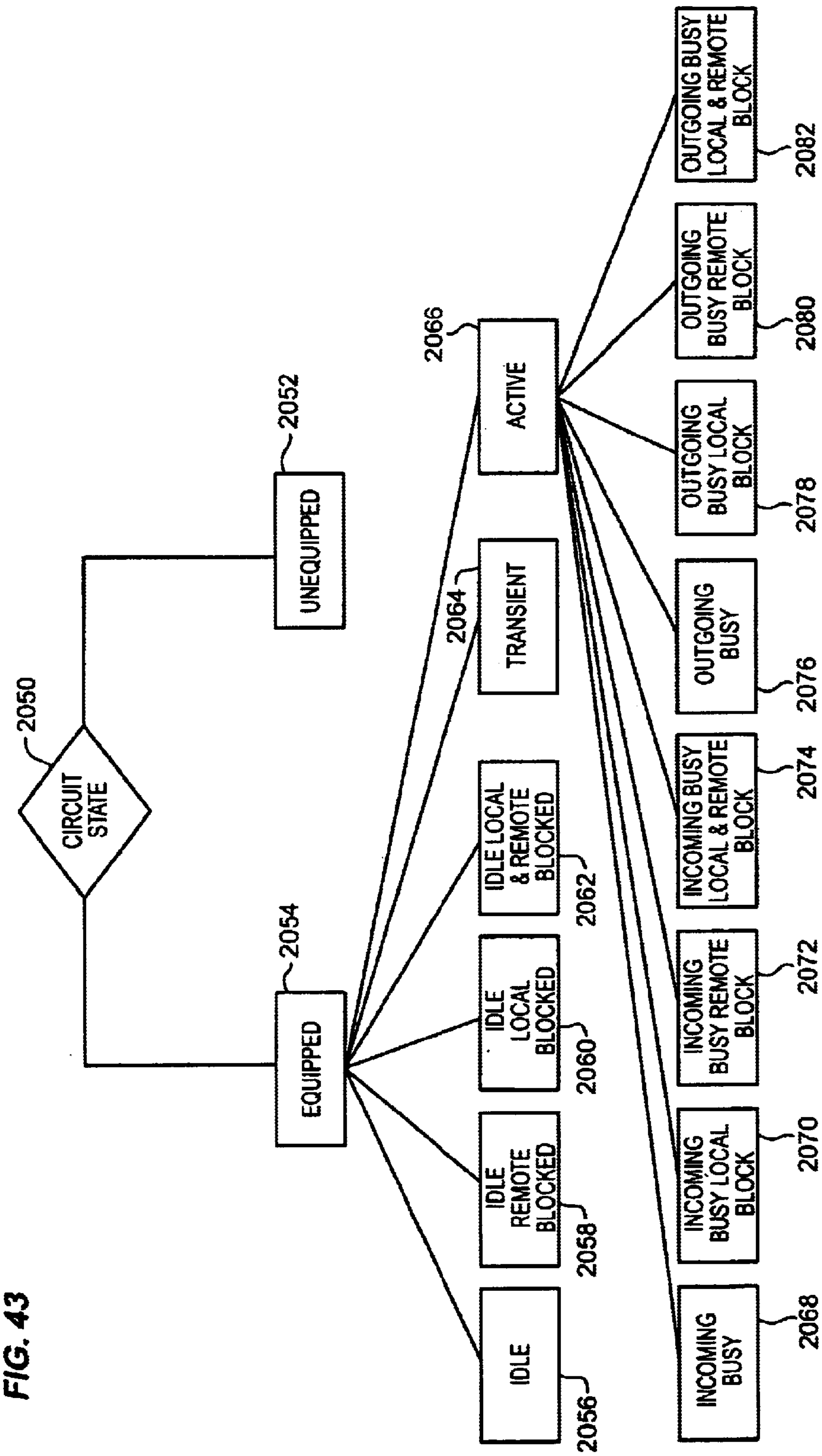
FIG. 43 is an SDL diagram of logic used in a version of the invention for determining a circuit state.

FIG. 43 depicts a process for determining a circuit state. At 2050, the circuit state is checked to determine if it is an unequipped circuit at 2052 or an equipped circuit at 2054. If the circuit is equipped at 2054, it can be idle at 2056, idle and remotely blocked at 2058, idle and locally blocked at 2060, idle and locally and remotely blocked at 2062, transient at 2064, or active at 2066. If the call is active at 2066, it can be incoming busy at 2068, incoming busy land locally blocked at 2070, incoming busy and remotely blocked at 2072, incoming busy and locally and remotely blocked at 2074, outgoing busy at 2076, outgoing busy and locally blocked at 2078, outgoing busy and remotely blocked at 2080, or outgoing busy and locally and remotely blocked at 2082.

Trunk Circuit and Trunk Group Table Origination Process

Figure 44A:
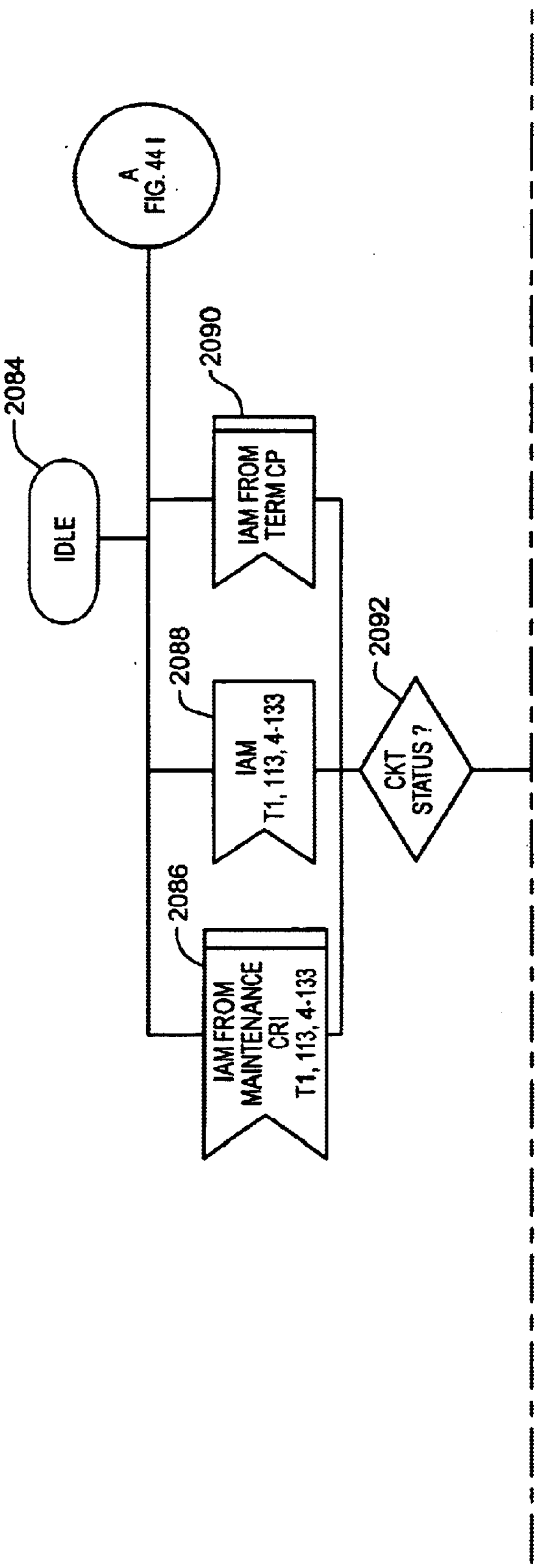
FIGS. 44A–44O are SDL diagrams of logic used in a version of the invention for trunk circuit and group table processing for an origination process.
Figure 44B:
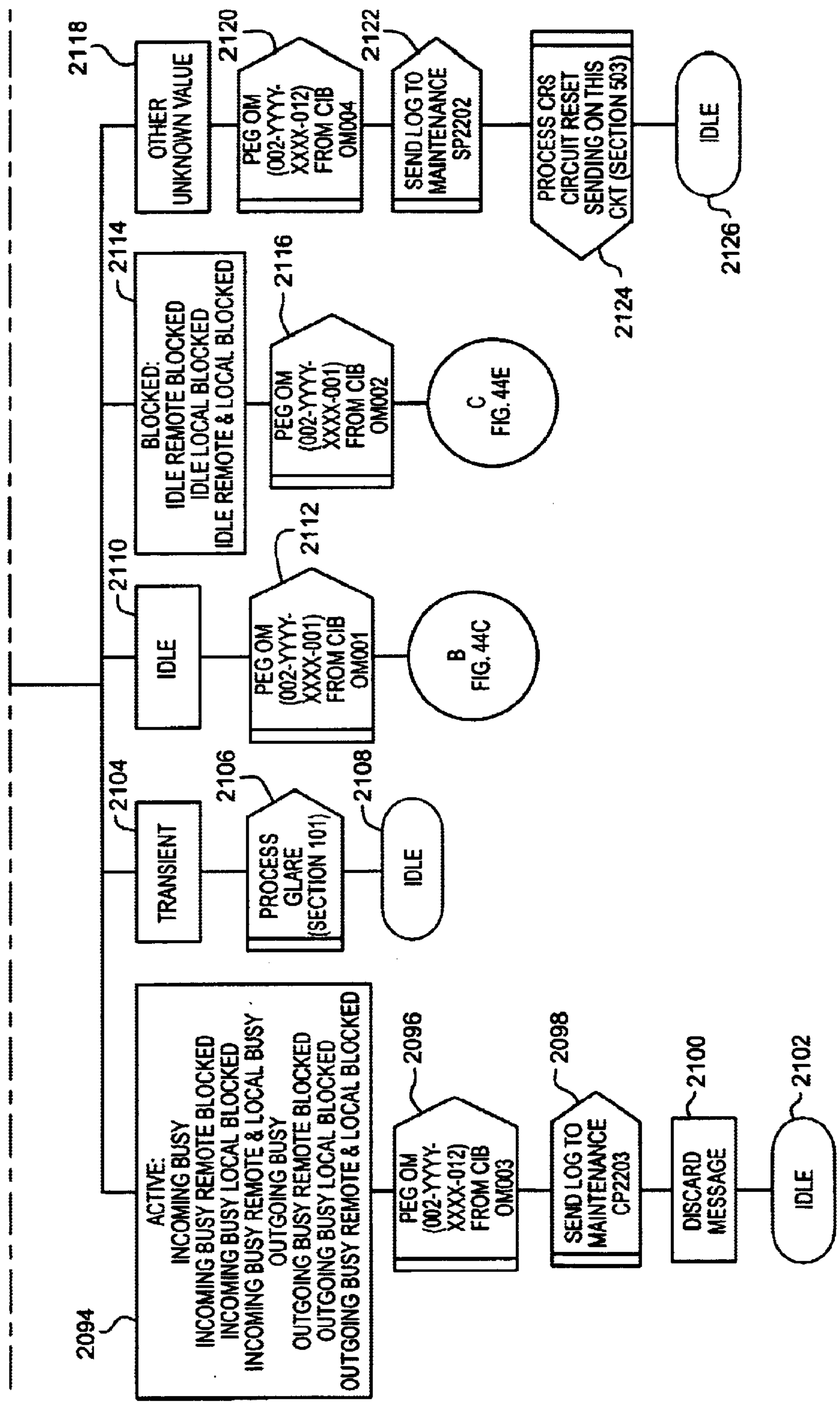
Figure 44C:
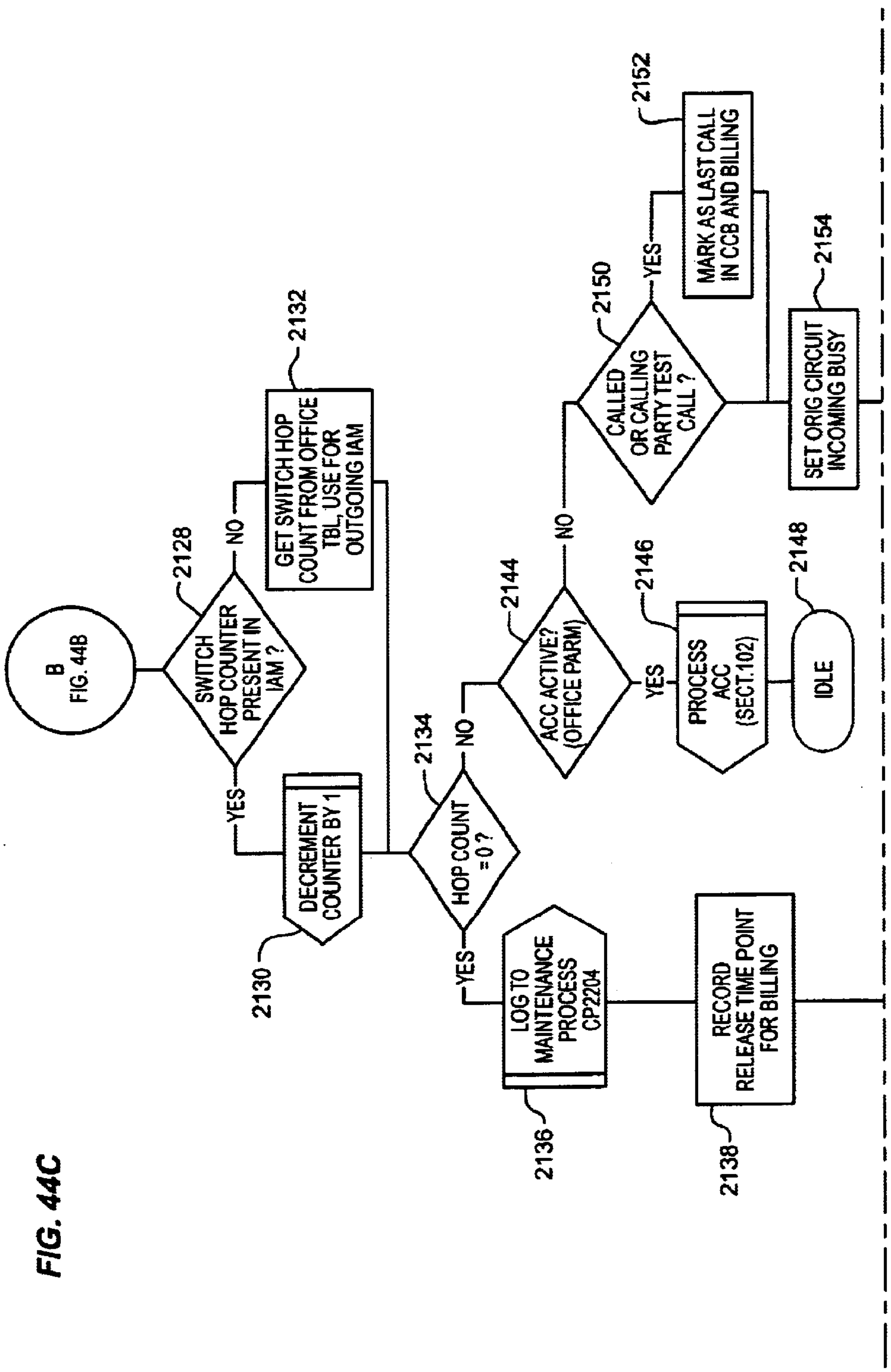
Figure 44D:
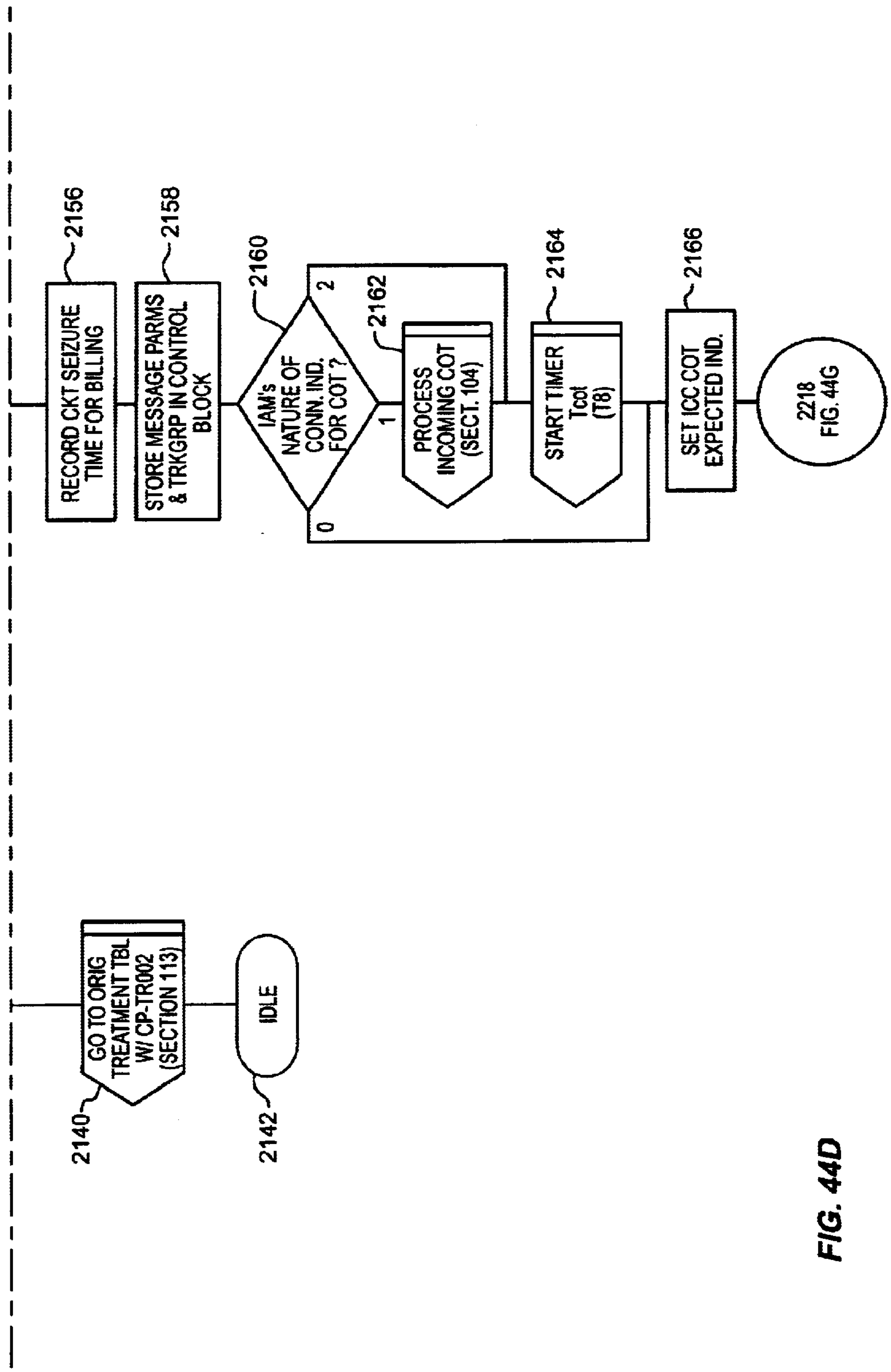
Figure 44E:
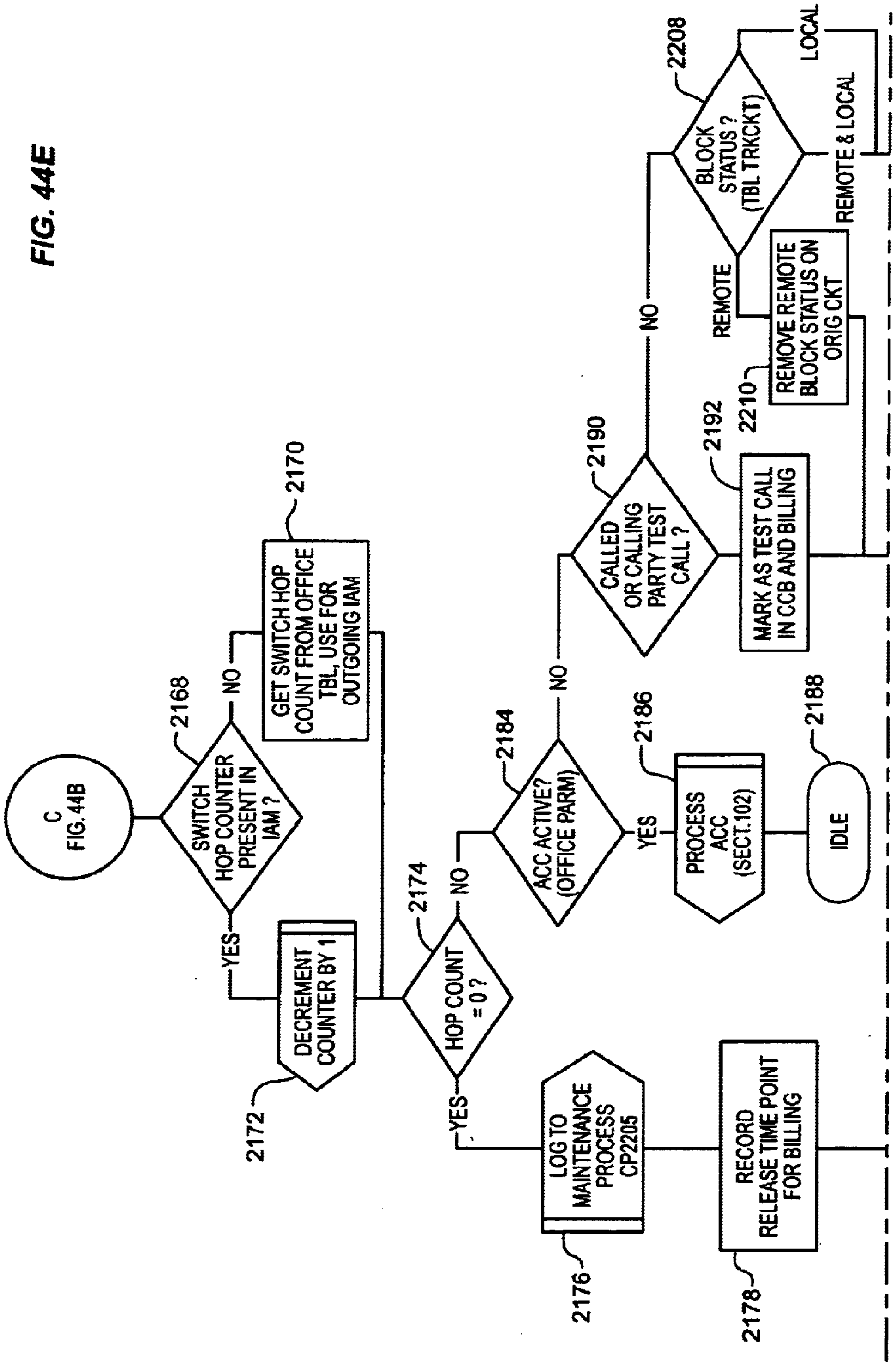
Figure 44F:
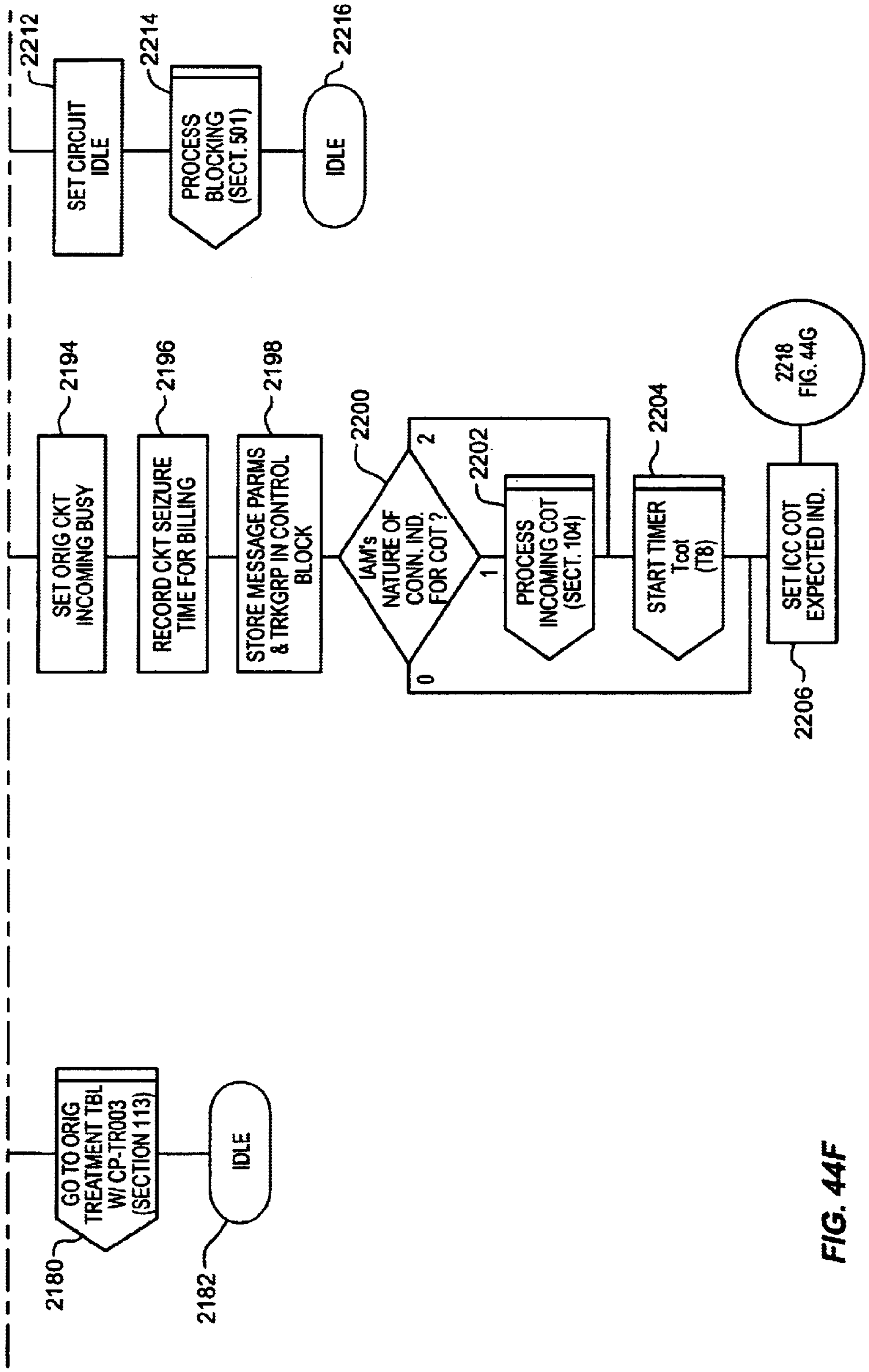
Figure 44G:
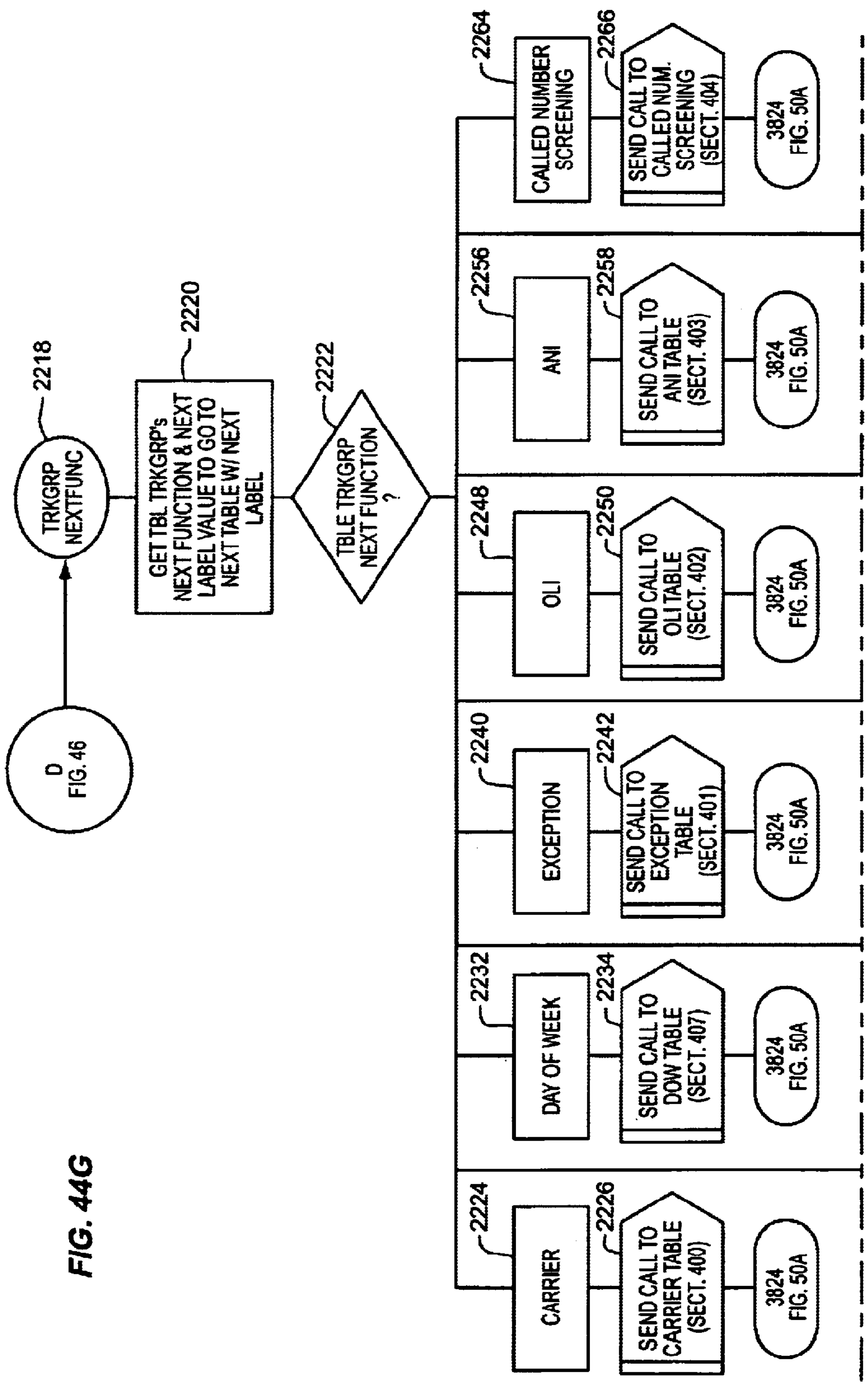
Figure 44H:
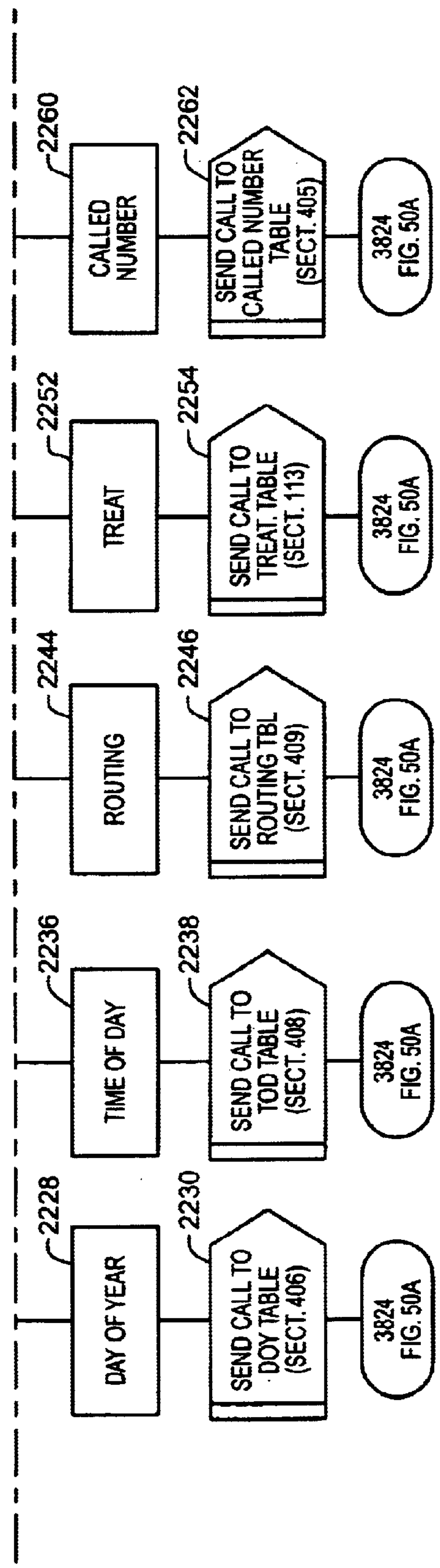
Figure 44I:
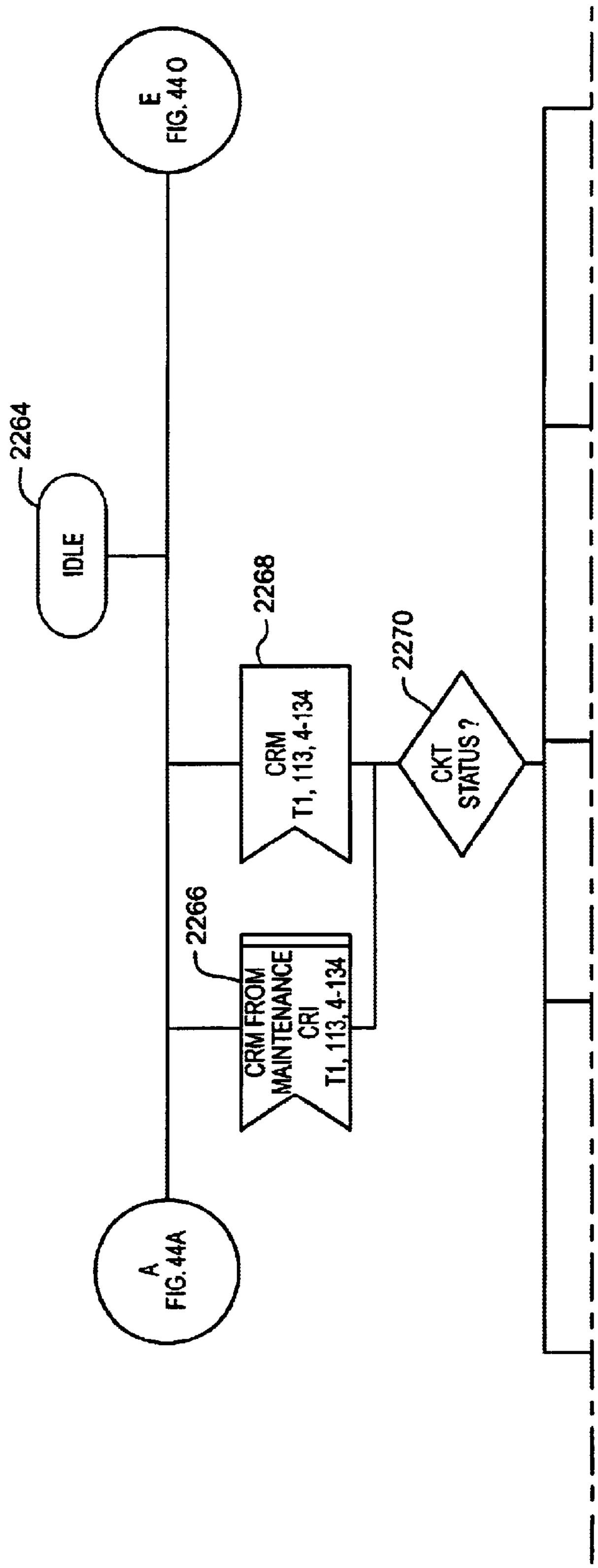
Figure 44J:
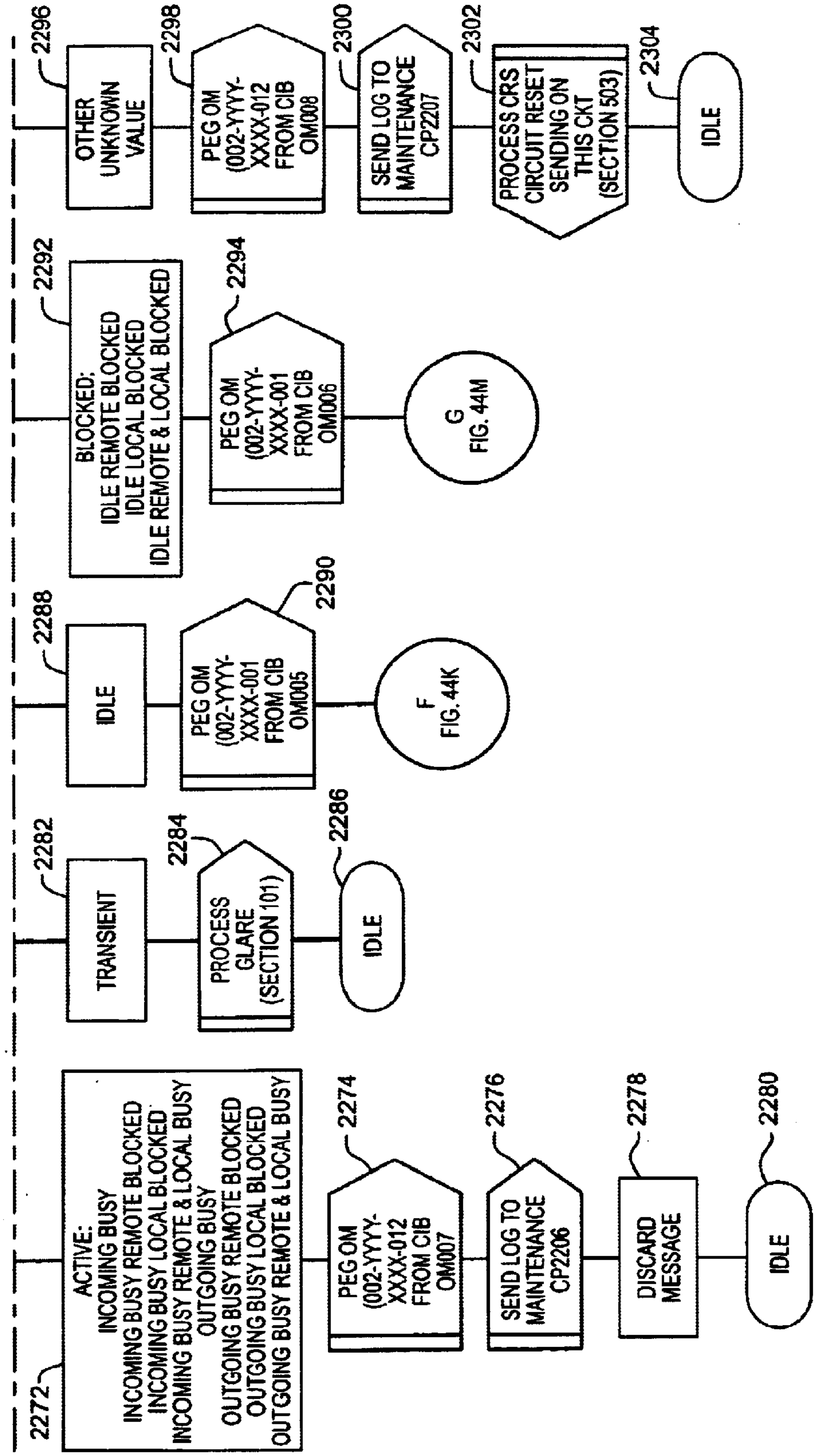
Figure 44K:
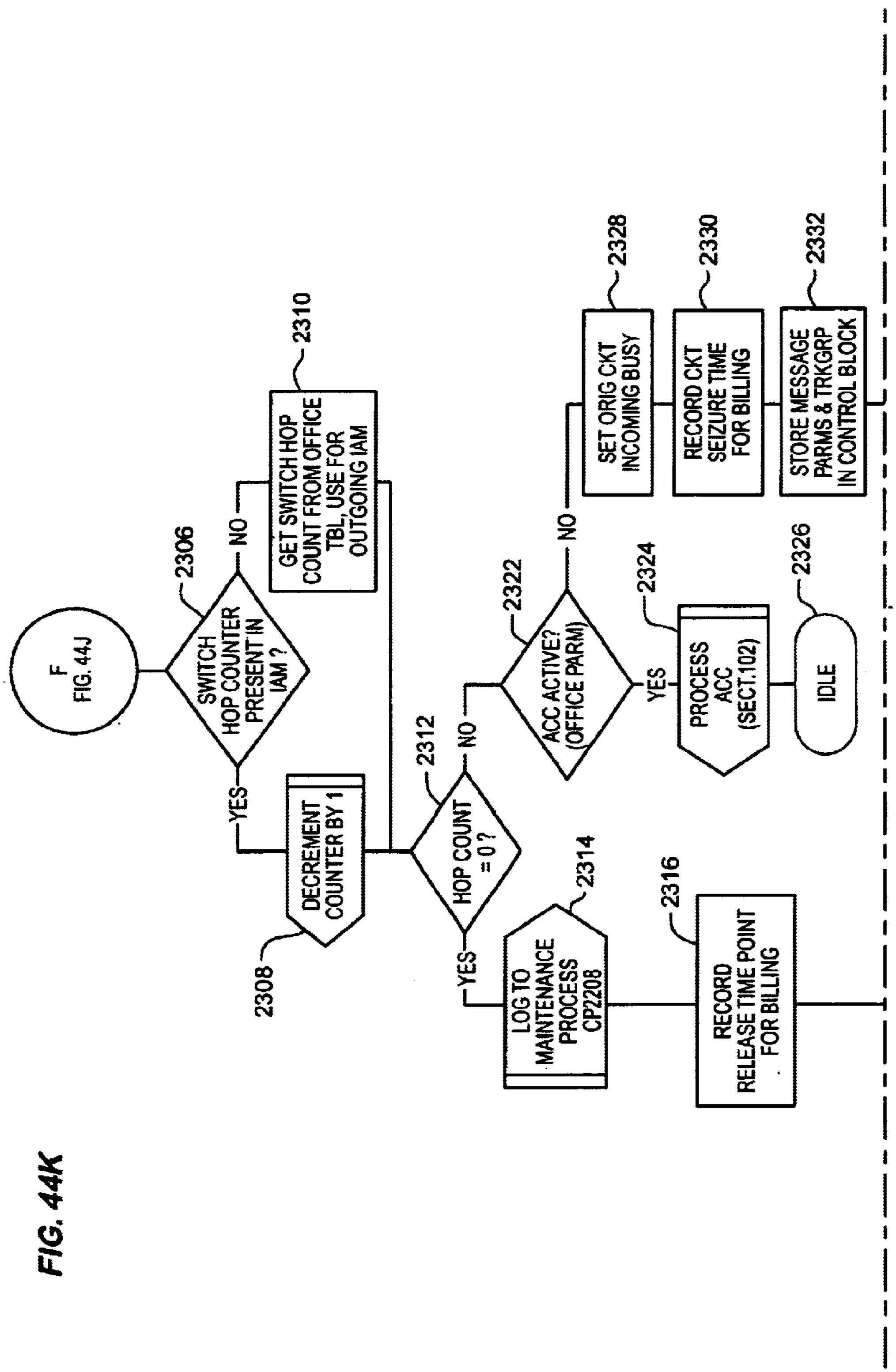
Figure 44L:
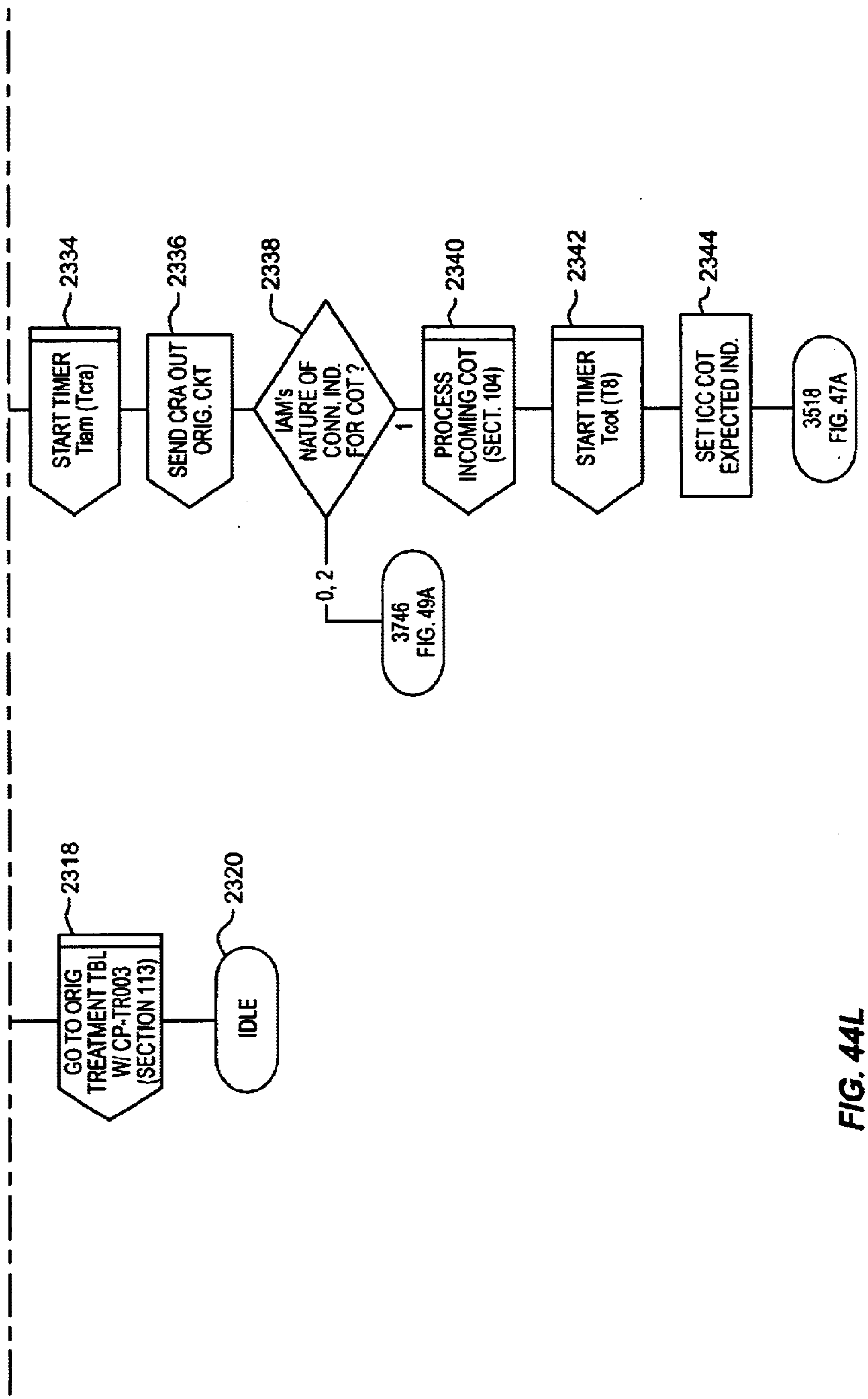
Figure 44M:
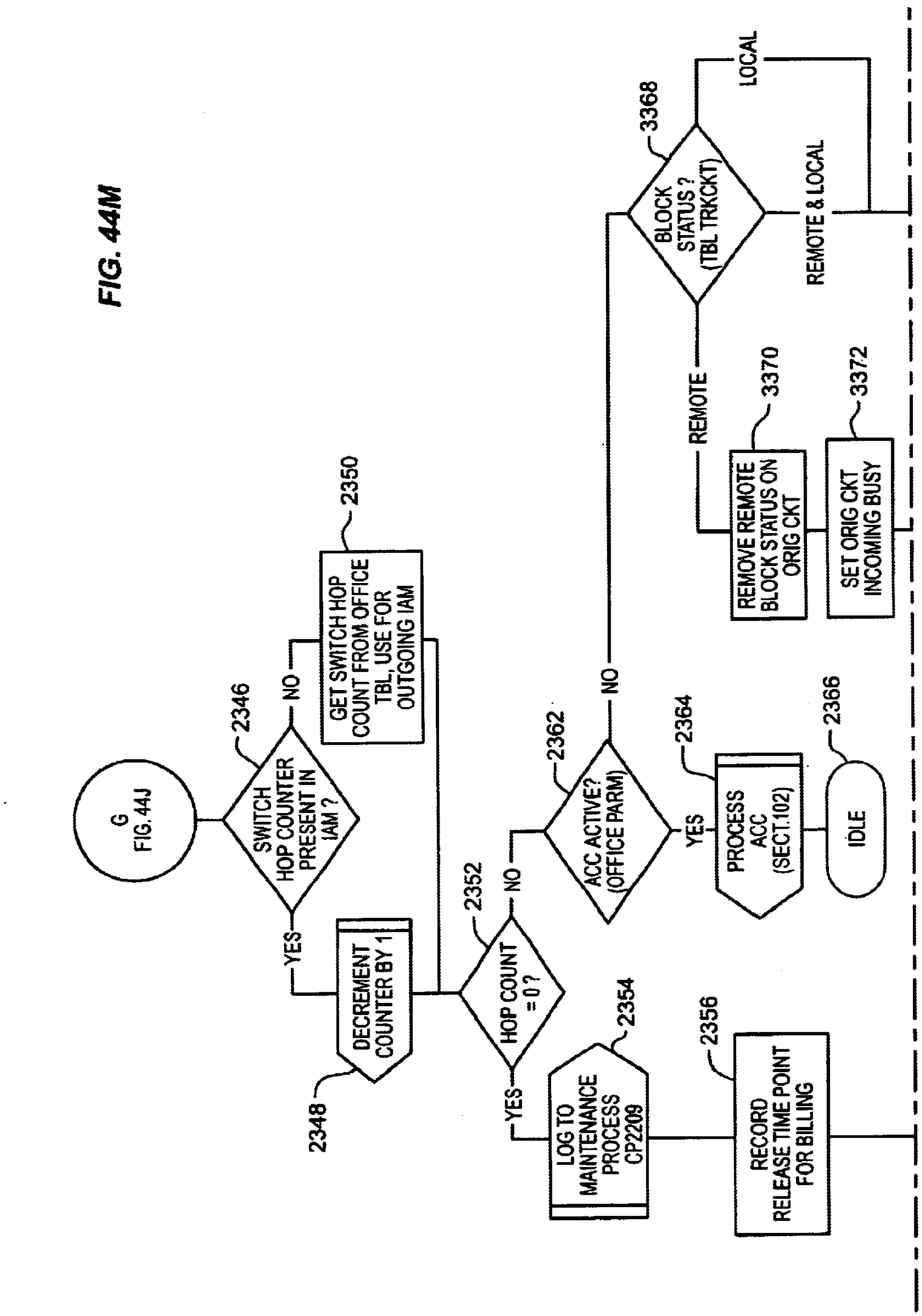
Figure 44N:
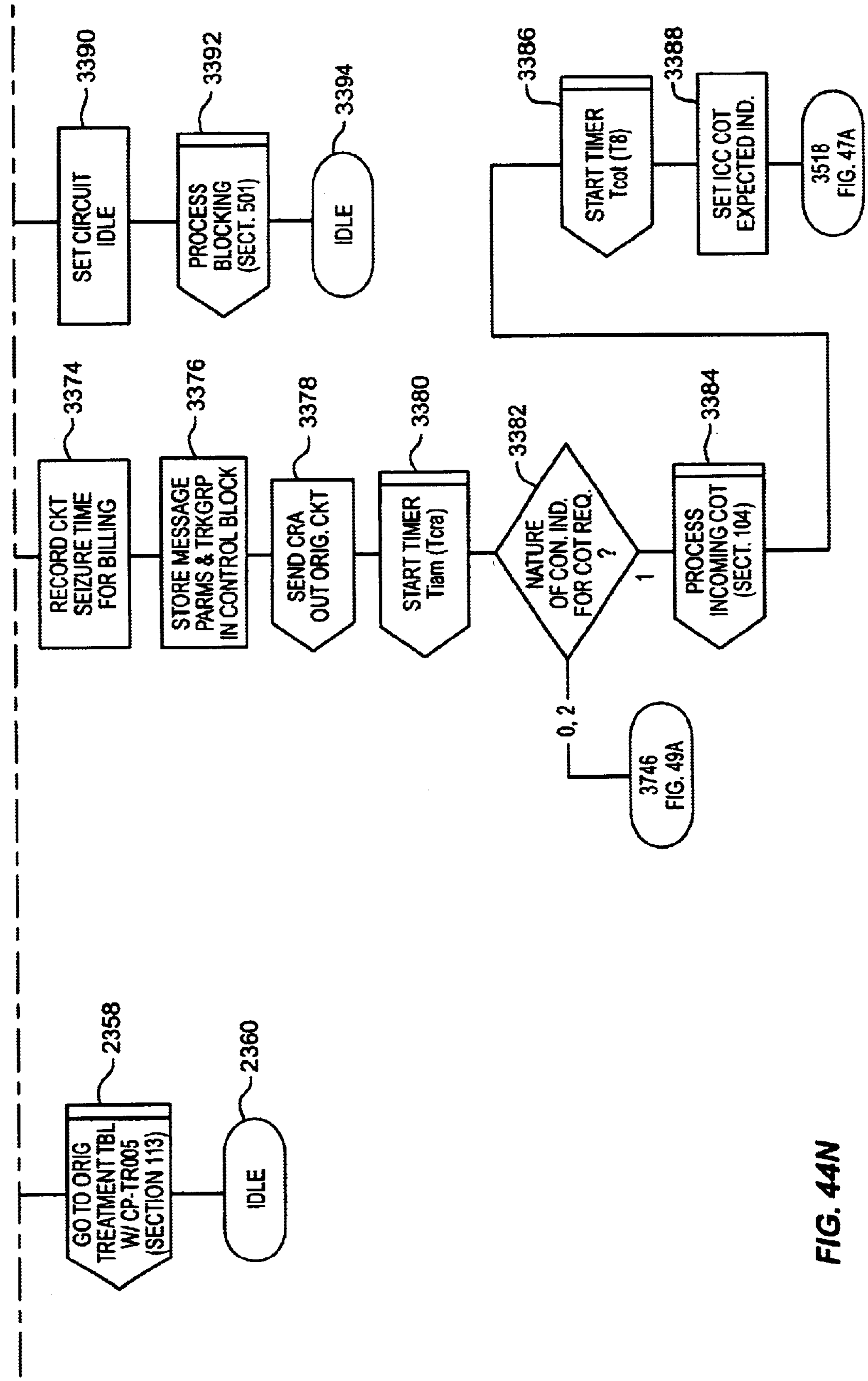
Figure 44O:
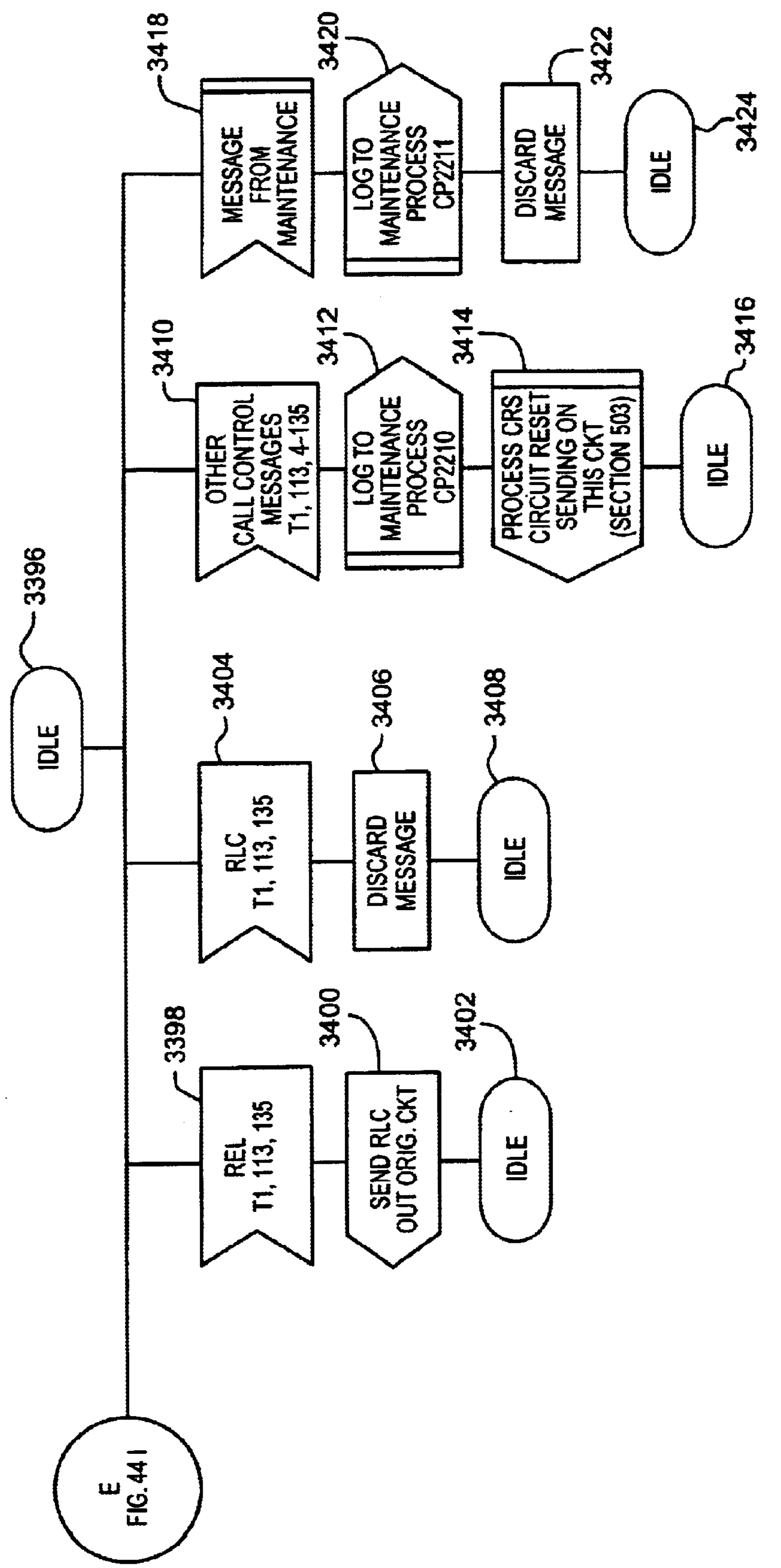

FIGS. 44A–44O depict the use of the trunk circuit table and the trunk group table by the origination process. The BCSM is in the idle state at 2084. If an IAM is received from the continuity recheck incoming (CRI) maintenance process at 2086, if an IAM is received from an external source of 2088, or if an IAM is received from the termination call process at 2090, the circuit status is determined at 2092.

If the circuit is active at 2094, the operational measurement (OM) is pegged from the CIB at 2096. A log is sent to maintenace at 2098, and the message is discarded at 2100. Idle is attained at 2102. If the circuit status is transient at 2104, the glare process is started at 2106. Idle is attained at 2108.

If the circuit status is idle at 2110, the OM is pegged from the CIB at 2112. The process continues at step 2128.

If the circuit status is blocked at 2114, the OM is pegged from the CIB at 2116. The circuit status can be blocked-if it is idle and remotely blocked, idle and locally blocked, or idle and remotely and locally blocked. The process continues at step 2168.

If the circuit status is another unknown value at 2118, the OM is pegged from the CIB at 2120. A log is sent to maintenance at 2122. The circuit reset sending (CRS) process is started for this circuit at 2124, and idle is attained at 2126.

If a switch hop counter is present in the IAM at 2128, the hop counter is decremented by one at 2130. If a switch hop counter is not present in the IAM at 2128, the switch hop count is obtained from the office table and used for the outgoing IAM at 2132. If the hop count equals zero at 2134, a log is sent to the maintenance process at 2136. The release time point is recorded at 2138, and the process goes to the treatment table for the origination process at 2140. Idle is attained at 2142.

If the hop counter equals zero at 2134, and if the automatic congestion control (ACC) office parameter is active at 2144, the ACC process is started at 2146. Idle is attained at 2148.

If the ACC office parameter is not active at 2144, then a called or calling party test call is checked at 2150. If a test call is found at 2150, then it is marked as a test call in the CIB and in billing at 2152. If the call is not a test call at 2150, or after the call is marked as a test call at 2152, the originating circuit is set as incoming busy at 2154. The circuit seizure time is recorded for billing at 2156, and the message parameters and the trunk group are stored in the control .block (ECDB) at 2158.

The nature of connection indicator is checked for continuity (COT) requirements at 2160. The nature of connection indicator indicates if an incoming COT is being performed by the previous switch. If the indicator is equal to zero, a COT is not required. If the indicator is equal to one,l a COT is required on the circuit. If the indicator is equal to two, the COT is required on the previous circuit.

At 2160, if the COT is required for this circuit, the incoming COT process is started at 2162. The Tcot timer (T8) is started at 2164. The incoming trunk circuit (ICC) expected indicator for the COT is set at 2166. The process then continues for the trunk group next function at step 2218.

If a COT is required on the previous circuit at 2160, then the Tcot timer (T8) is started at 2164. The ICC expected indicator for the COT is set at 2166, and the process continues at step 2218. If a COT is not required, then the ICC expected indicator for the COT is set at 2166, and the process continues for the trunk group next function at step 2218.

At 2168, it is determined if the switch hop counter is present in the IAM. If the switch hop counter is not present at 2168, the switch hop count is obtained from the office table for use in the outgoing IAM at 2170. If the switch hop counter is present in the IAM at 2168, the switch hop counter is decremented by one at 2172.

If the switch hop count equals zero at 2174, a log is sent to maintenance at 2176, and the release time point is recorded for billing at 2178. The process is sent to the treatment table for the origination process at 2180, and idle is attained at 2182.

If the hop count does not equal zero at 2174, and if the ACC office parameter is active at 2184, the ACC process is started at 2186. Idle is attained at 2188.

If the ACC office parameter is not active at 2184, and if the call is a called or calling party test call at 2190, the call is marked as a test call in the CIB and in billing at 2192. The originating circuit is set to incoming busy at 2194, and the circuit seizure time is recorded for billing at 2196. The message parameters and the trunk group are stored in the control block at 2198.

The nature of connection indicator in the IAM is checked for COT requirements at 2200. If a COT is required for this circuit, the incoming COT process is started at 2202. Thus, a loop is established between the transmitting and receiving side of the circuit so that the COT tone sent by a preceding switch or call processor is returned to the preceding switch or call processor. The Tcot timer (T8) is started at 2204. The ICC COT expected indicator is set at 2206. The trunk group next function is implemented at 2218.

If a COT is required on the previous circuit, the Tcot timer (T8) is started at 2204. After step 2204 or if a COT is not required at 2200, the ICC COT expected indicator is set at 2206. The trunk group next function then is processed at step 2218.

If the call is not a called or calling party test call at 2190, the blocking status from the trunk circuit table is checked at 2208. If the blocking status is remote at 2208, the remote blocking status is removed from the originating circuit at 2210. The process then continues at step 2194.

If the blocking status at 2208 is either local or remote and local, then the circuit is set to idle at 2212. The blocking process is implemented at 2214, and idle is attained at 2216.

The trunk group next function begins at 2218. The trunk group table's next function and next label value are obtained so that the process may step to the next table with the next label at 2220. If at 2222, the trunk group next function is the carrier table at 2224, the call is sent to the carrier table at 2226. The process then steps to 3824.

If the trunk group next function at 2222 is the day of year at 2228, the call is sent to the day of your table at 2230. The process then continues at step 3824.

If the trunk group next function at 2222 is the time of day at 2236, the call is sent to the time of day table at 2238. The process then continues at step 3824.

If the trunk group next function at 2222 is the exception at 2240, the call is sent to the exception table at 2242. The process then continues at step 3824.

If the trunk group next function at 2222 is the originating line information (OLI) at 2248, the call is sent to the OLI table at 2250. The process continues at step 3824.

If the trunk group next function at 2222 is treatment at 2252, the call is sent to the treatment table at 2254. The process continues at step 3824.

If the trunk group next function at 2222 is the automatic number identification (ANI) at 2256, the call is sent to the ANI table at 2258. The process then continues at step 3824.

If the trunk group next function at 2222 is the called number at 2260, the call is sent to the called number table at 2262. The process then continues at step to 3824.

If the trunk group next function at 2222 is the called number screening at 2264, the call is sent to the called number screening table at 2266. The process then continues at step 3824.

FIG. 44E illustrates a continuation of the trunk circuit and trunk group table origination processes. The process is idle at 2264. If a CRM is received from the CRI maintenance process at 2266 or if a CRM is received as an external message at 2268, the circuit status is determined at 2270. If the circuit status is active at 2272, the OM is pegged at 2274. A log is sent to maintenance at 2276, and the message is discarded at 2278. Idle is attained at 2280.

If the circuit status at 2270 is transient at 2282, the glare process is started at 2284. Idle is attained at 2286.

If the circuit status at 2270 is idle at 2288, the OM is pegged at 2290. The process continues at step 2306.

If the circuit status at 2270 is blocked at 2292, the OM is pegged at 2294. A circuit can be blocked if it is idle and remotely blocked, idle and locally blocked, or idle and remotely and locally blocked. The process continues at step 2346.

If the circuit status at 2270 is another unknown value at 2296, the OM is pegged at 2298. A log is sent to maintenance at 2300, and the CRS process is started for the circuit at 2302. Idle is attained at 2304.

At 2306, it is determined if the switch hop counter is present in the IAM. If the switch hop counter is present, the switch hop counter is decremented by one at 2308. If the switch hop counter is not present in the IAM at 2306, the switch hop count is obtained from the office table for use in the outgoing IAM at 2310.

If the switch hop count equals zero at 2312, a log is sent to maintenance at 2314. The release time point is recorded for billing at 2316. The call is sent to the treatment table for the origination process at 2318, and idle is attained at 2320.

If the switch hop count is not equal to zero at 2312, and if the ACC office parameter is active at 2322, the ACC process is started at 2324. Idle then is attained at 2326.

If the ACC office parameter is not active at 2322, the originating circuit is set for incoming busy at 2328. The circuit seizure time is recorded for billing at 2330, and the message parameters in the trunk group are stored in the control block at 2332. The Tiam timer (Tcra) is started at 2334, and a CRA is sent out for the originating circuit at 2336.

The nature of connection indicator for a COT is determined at 2338. If a COT is required for this circuit at 2338, the incoming COT process is started at 2340. The Tcot timer is started at 2342, and the ICC COT expected indicator is set at 2344. The process then continues at step 3518. If either a COT is not required or a COT is required on a previous circuit at 2338, the process continues at step 3746.

At step 2346, it is determined if the switch hop counter is present in the IAM. If the switch hop counter is present in the IAM at 2346, the switch hop counter is decremented by one at 2348. If the switch hop counter is not present in the IAM at 2346, the switch hop count i's obtained from the office table for use in the outgoing IAM at 2350.

If the switch hop count equals zero at 2352, a log is sent to maintenance at 2354. The release time point is recorded for billing at 2356, and the call is sent to the treatment table for the origination process at 2358. Idle is attained at 2360.

If the switch hop count does not equal zero at 2352, and if the ACC office parameter is active at 2362, the ACC process is started at 2364. Idle is attained at 2366.

If the ACC office parameter is not active at 2362, and if the blocking status is remote at 3368, the remote blocking status is removed from the originating circuit at 3370. The originating circuit is set to incoming busy at 3372, and the circuit seizure time is recorded for billing at 3374. The message parameters and the trunk group are stored in the control block at 3376, and a CRA is sent out the originating circuit at 3378. The Tiam timer is started at 3380.

The nature of connection indicator for the COT requirements is determined at 3382. If a COT is required on this circuit at 3382, an incoming COT is processed for the circuit at 3384. The Tcot timer is started at 3386, and the ICC COT expected indicator is set at 3388. The process then continues at step 3518. If either a COT is not required or a COT is required for the previous circuit at 3382, the process continues at step 3746.

If the blocking status at 3368 is local or remote and local, the circuit is set to idle at 3390. The blocking process is started at 3392, and idle is attained at 3394.

FIG. 44H is a continuation of the trunk circuit and trunk group table processing. The process is idle at 3396 If an REL is received at 3398, an RLC is sent out the originating circuit at 3400. Idle is attained at 3402. If an RLC is received at 3404, the message is discarded at 3406, and idle is attained at 3408.

If other call control messages are received at 3410, a log is sent to maintenance at 3412. The CRS process is started for the circuit at 3414, and idle is attained at 3416. If a message is received from maintenance at 3418, a log is sent to maintenance at 3420. The message is discarded at 3422, and idle is attained at 3424.

Glare Processing for the Origination Process

Figure 45A:
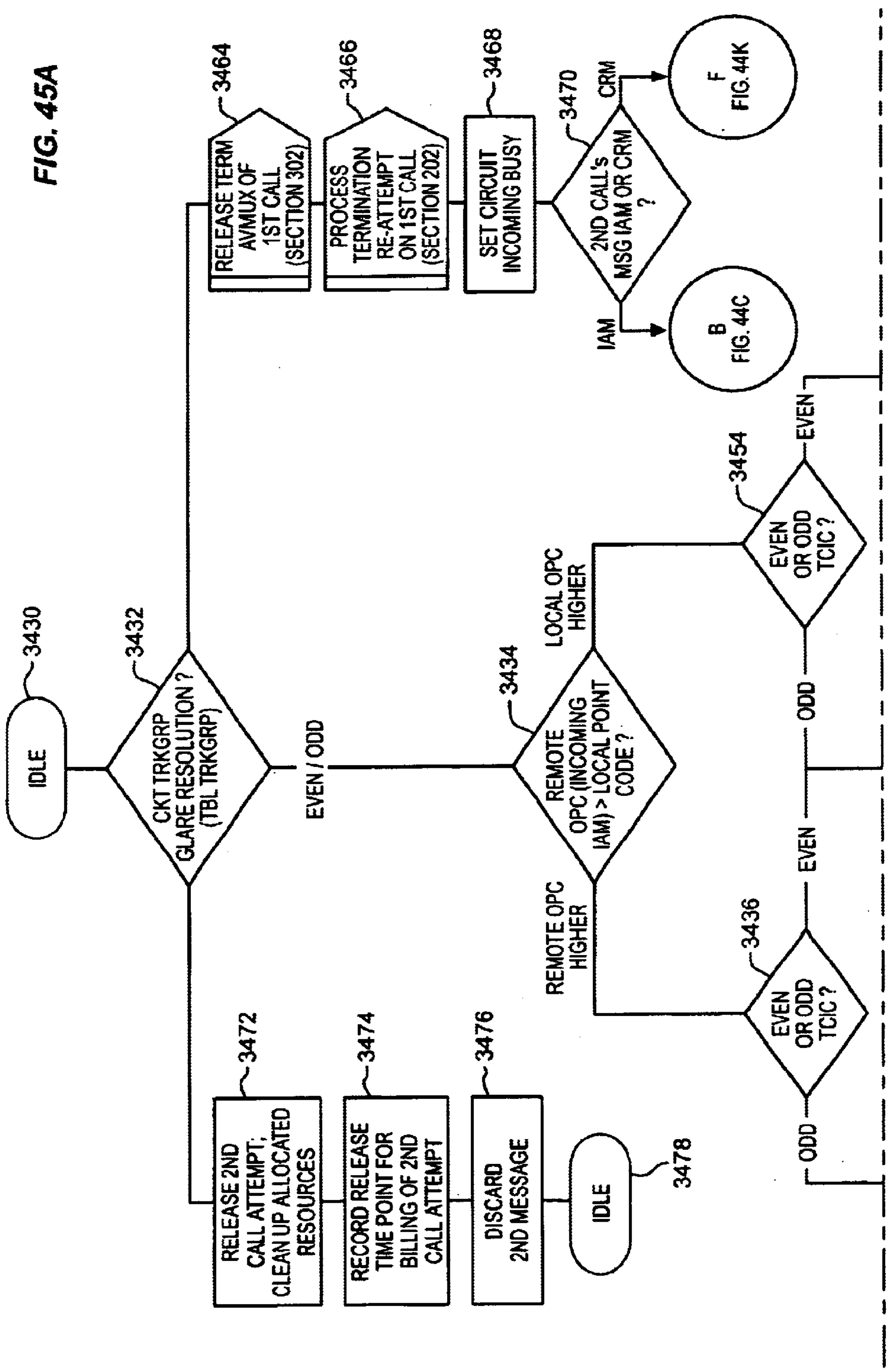
FIGS. 45A–45B are SDL diagram of logic used in a version of the invention for glare processing for an origination process.
Figure 45B:
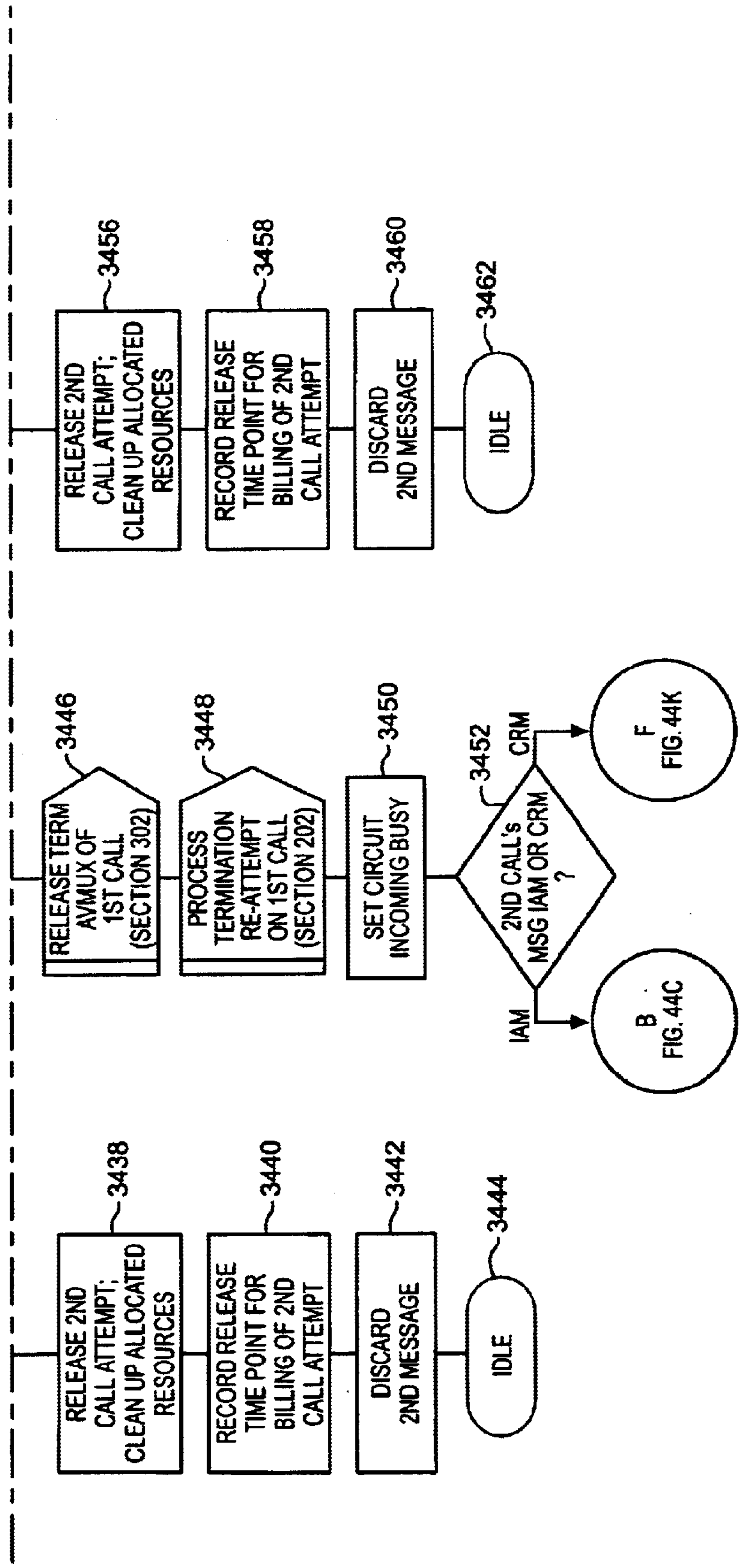

FIGS. 45A–45B depicts an example of a glare process. The process is idle at 3430. If the glare resolution entry is set to even/odd at 3432, and if the remote switch OPC is higher than the local switch OPC at 3434, it is determined if the TCIC is even or odd at 3436. If the TIC is odd at 3436, the second call attempt is released, and the allocated resources are cleaned up at 3438. In this situation, the local switch has control and does not yield to glare. The first call attempt is processed and terminates to this circuit. The release time point is recorded for billing of the second call attempt at 3440, and the second message is discarded at 3442. Idle is attained at 3444.

If the TCIC is even at 3436, the termination connection for the interworking unit multiplexer (mux) is released for the first call at 3446. The termination re-attempt for the first call is processed at 3448. The circuit is set to incoming busy at 3450. If the second call's message is an IAM at 3452, the process continues at step 2128. If the second call's message is a CRM at 3452, the process continues at step 2306.

If the local switch OPC is higher than the remote switch OPC at step 3434, and if the TIC is even at 3454, the second call attempt is released, and the allocated resources are cleaned up at 3456. In this situation, the local switch has control and does not yield to glare. The first call attempt is processed and terminates to this circuit. The release time point for the second call attempt is recorded for billing at 3458. The second message is discarded at 3460, and idle is attained at 3462. If the TIC is odd at 3454, the process continues at step 3446.

If the trunk group glare resolution at 3432 is none, the terminating circuit for the mux of the first call is released at 3464. In this case, the remote switch has control, and the local switch yields to glare. The second call attempt is processed on the origination side of this circuit. Termination of the first call attempt is re-attempted with another circuit member or circuit trunk group. The termination re-attempt is processed for the first call at 3466. The circuit is set to incoming busy at 3468. If the second call's message is an IAM at 3470, the process continues at step 2128. If the second call's message is a CRM at 3470, the process continues at step 2306.

If the trunk group glare re solution at 3432 is all, the second call attempt is released, and the allocated resources are cleaned up at 3472. In this situation, the local switch has control and does not yield to glare. The first call attempt is processed and terminates to this circuit. The release time point is recorded for billing of the second call attempt at 3474, and the second message is discarded at 3476. Idle is attained at 3478.

Automatic Congestion Control for the Origination Process

Figure 46A:
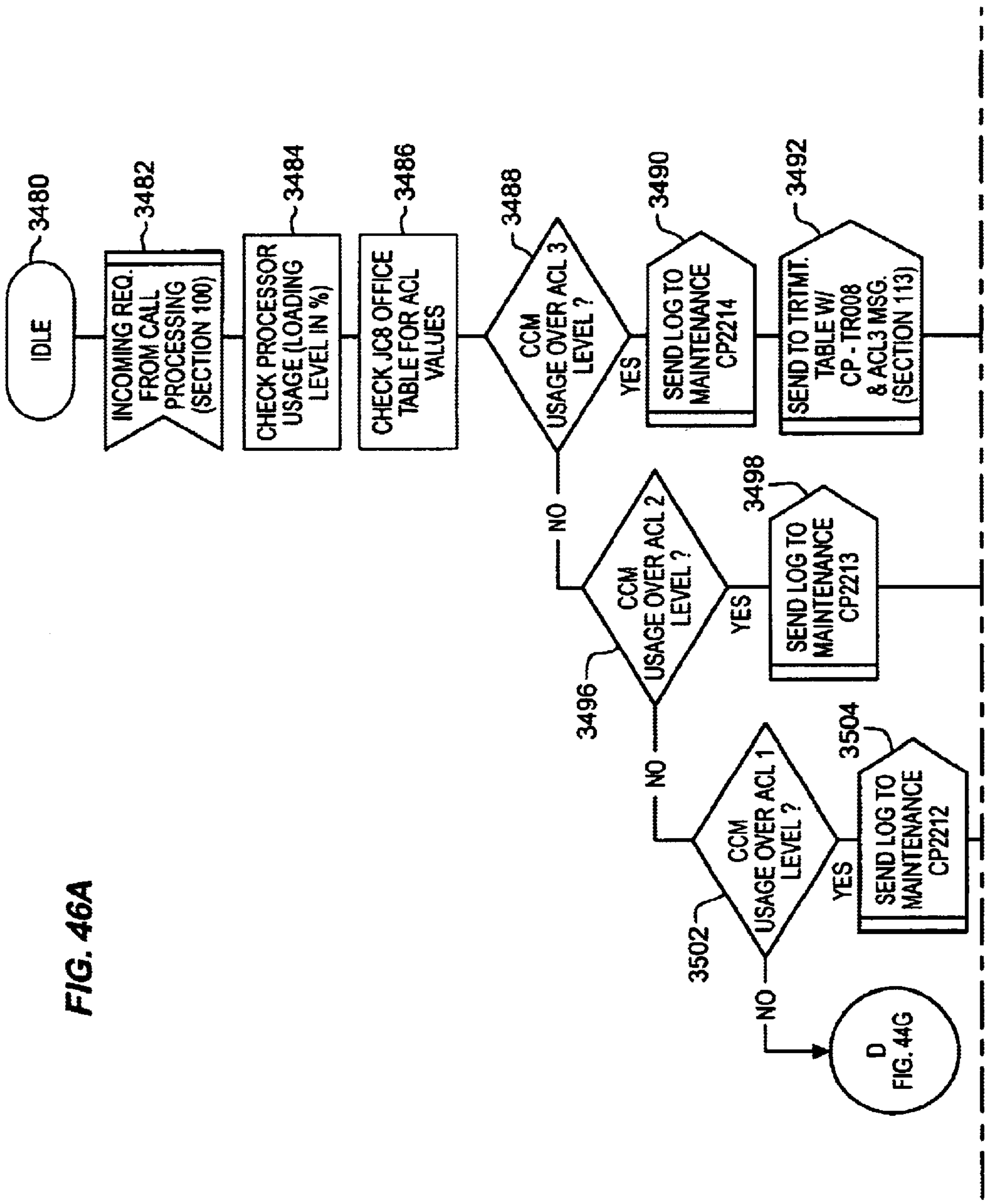
FIGS. 46A–46B are SDL diagram of logic used in a version of the invention for automatic congestion control for an origination process.
Figure 46B:
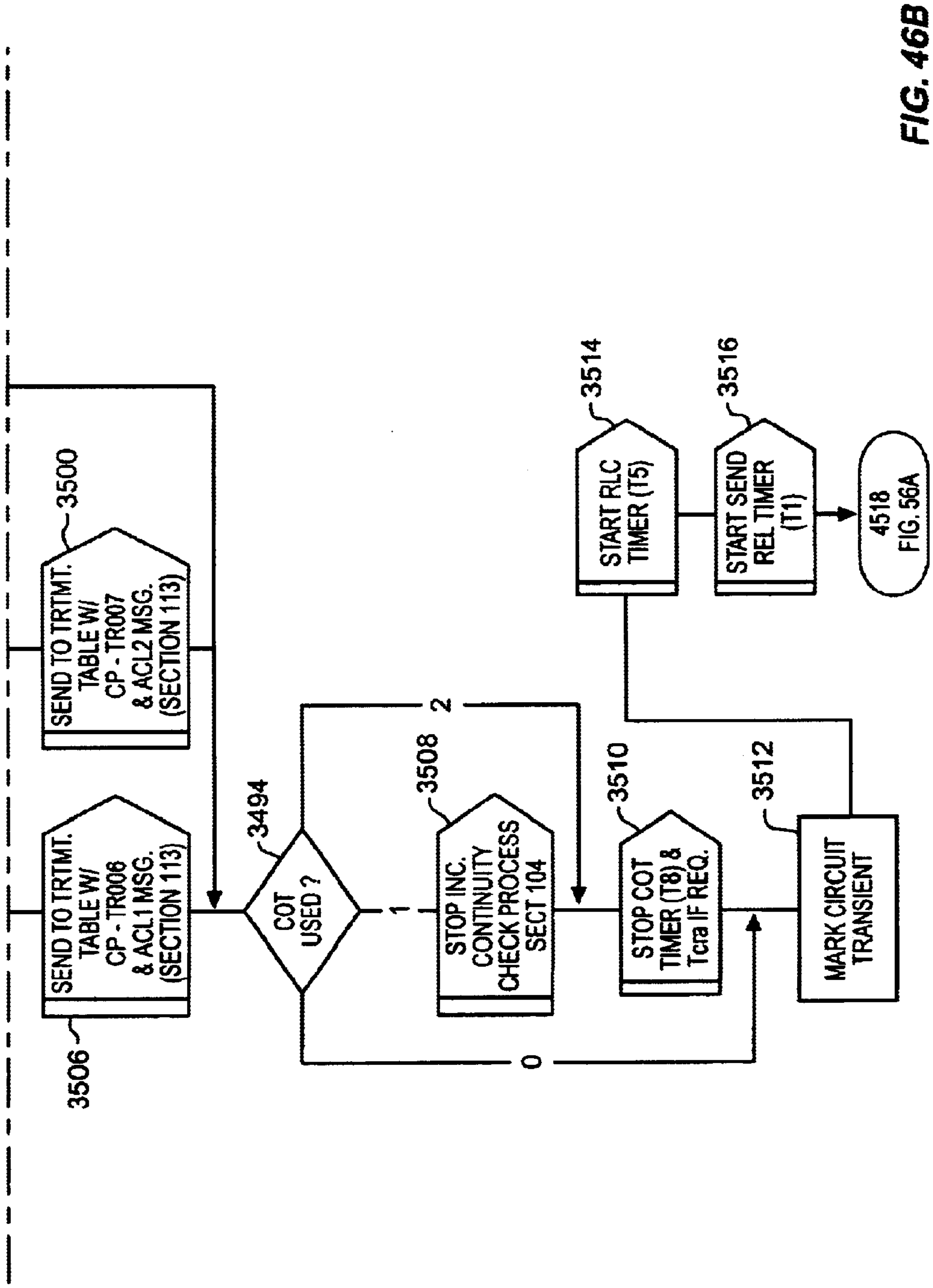

FIGS. 46A–46B depicts an example of the ACC process. The ACC process is idle at 3480. If an ACC request is received from call processing at 3482, the call processor usage loading level is checked at 3484. The office table is checked for the automatic congestion control level (ACL) value at 3486. If the call processor usage level is over ACL 3 at 3488, a log is sent to maintenance at 3490. The call is sent to the treatment table at 3492, and it is determined if a COT is used at 3494.

If the call processor usage level is not over ACL 3 at 3488, but it is over the ACL 2 level at 3496, a log is sent to maintenance at 3498. The call is sent to the treatment table at 3500, and it is determined if a COT is used at 3494.

If the call processor usage level is not over ACL 2 at 3496, but it is over the ACL 1 level at 3502, a log is sent to maintenance at 3504. The call is sent to the treatment table at 3506, and it is determined if a COT is used at 3494. If at 3502, the call processor usage is not over the ACL 1 level, the process continues at step 2218.

If a COT is used for the circuit at 3494, the incoming continuity check process is stopped at 3508, and the Tcot timer and the Tcra timer are stopped, if required, at 3510. The circuit is marked as transient at 3512, and the RLC timer (T5) is started at 3514. The send REL timer (T1) is started 3516, and the process continues at step 4518.

If at 3494 a COT is use d on a previous circuit, the process continues at step 3510. If a COT is not used at 3494, the process continues at step 3512.

Cot Processing for the Origination Process

Figure 47A:
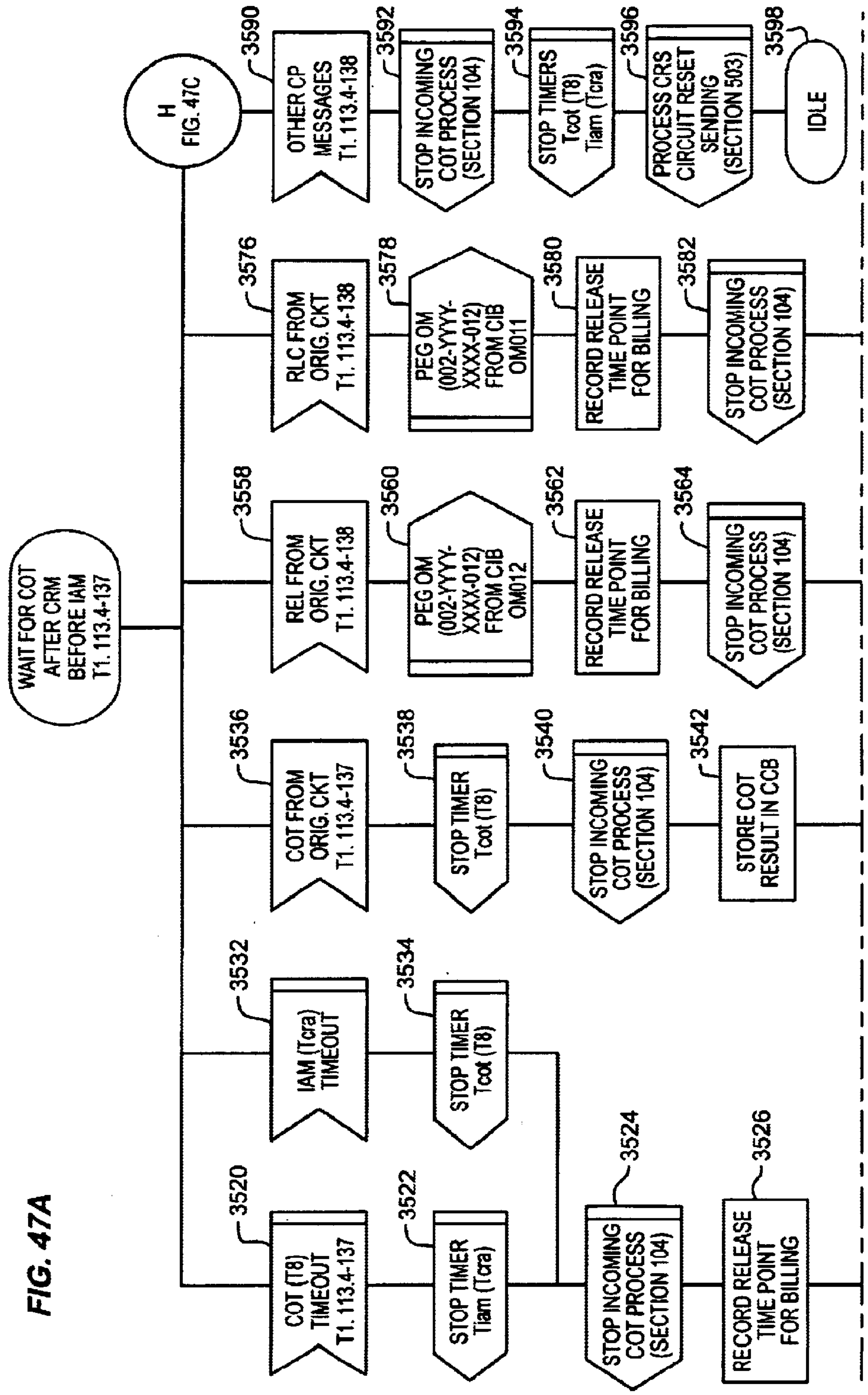
FIGS. 47A–47C are SDL diagrams of logic used in a version of the invention for COT processing after a CRM is received and before an IAM is received for an origination process.
Figure 47B:
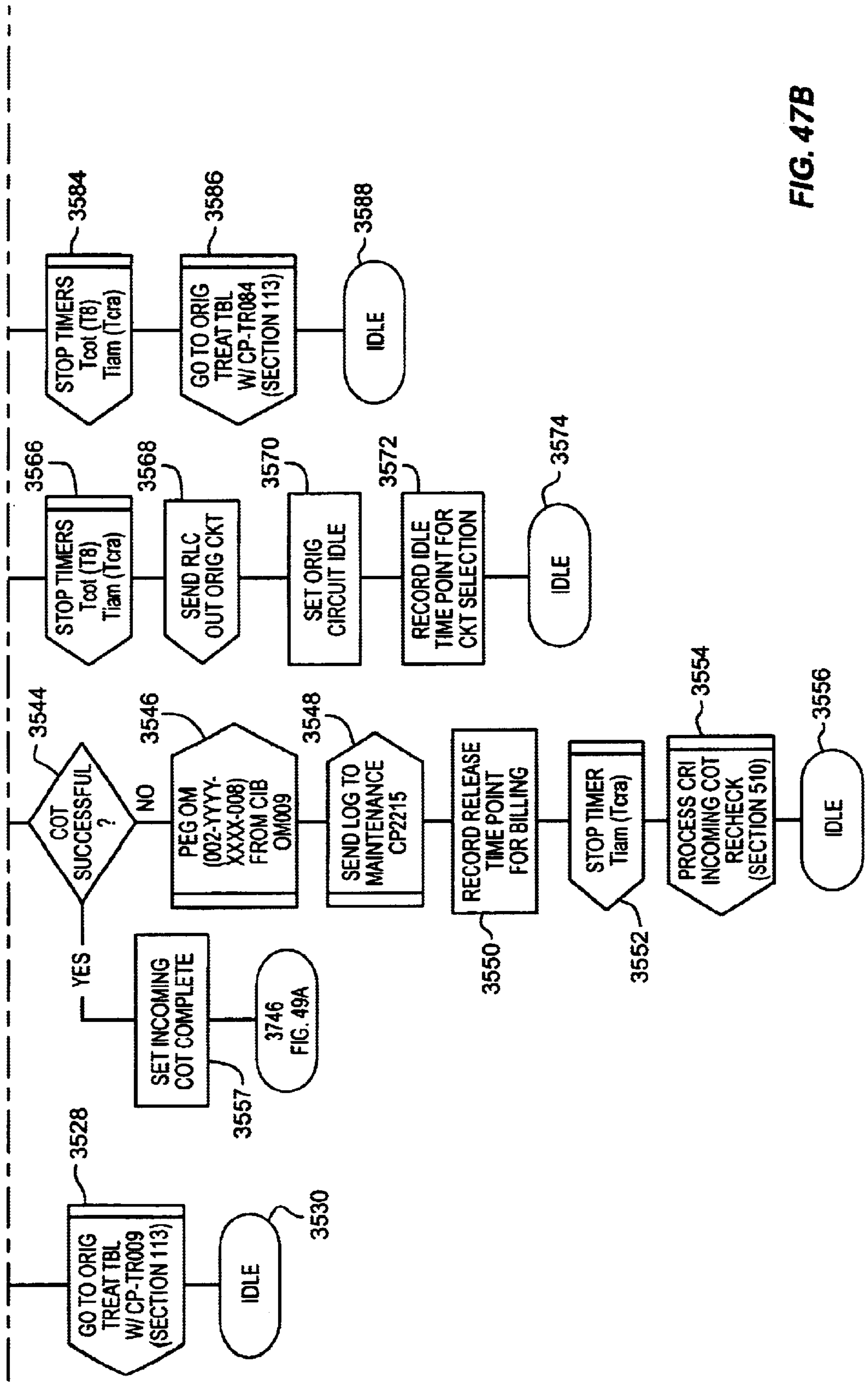
Figure 47C:
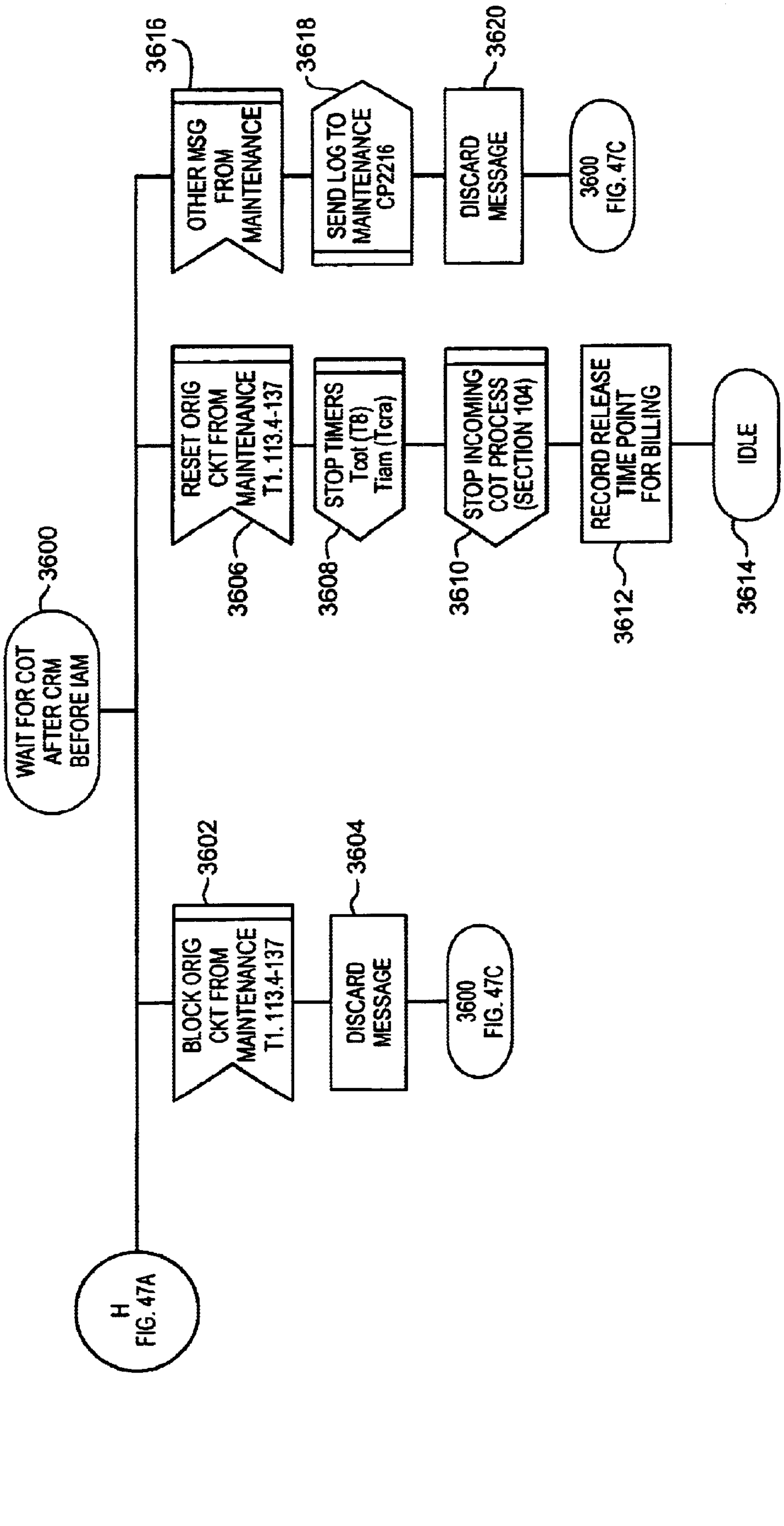
Figure 48A:
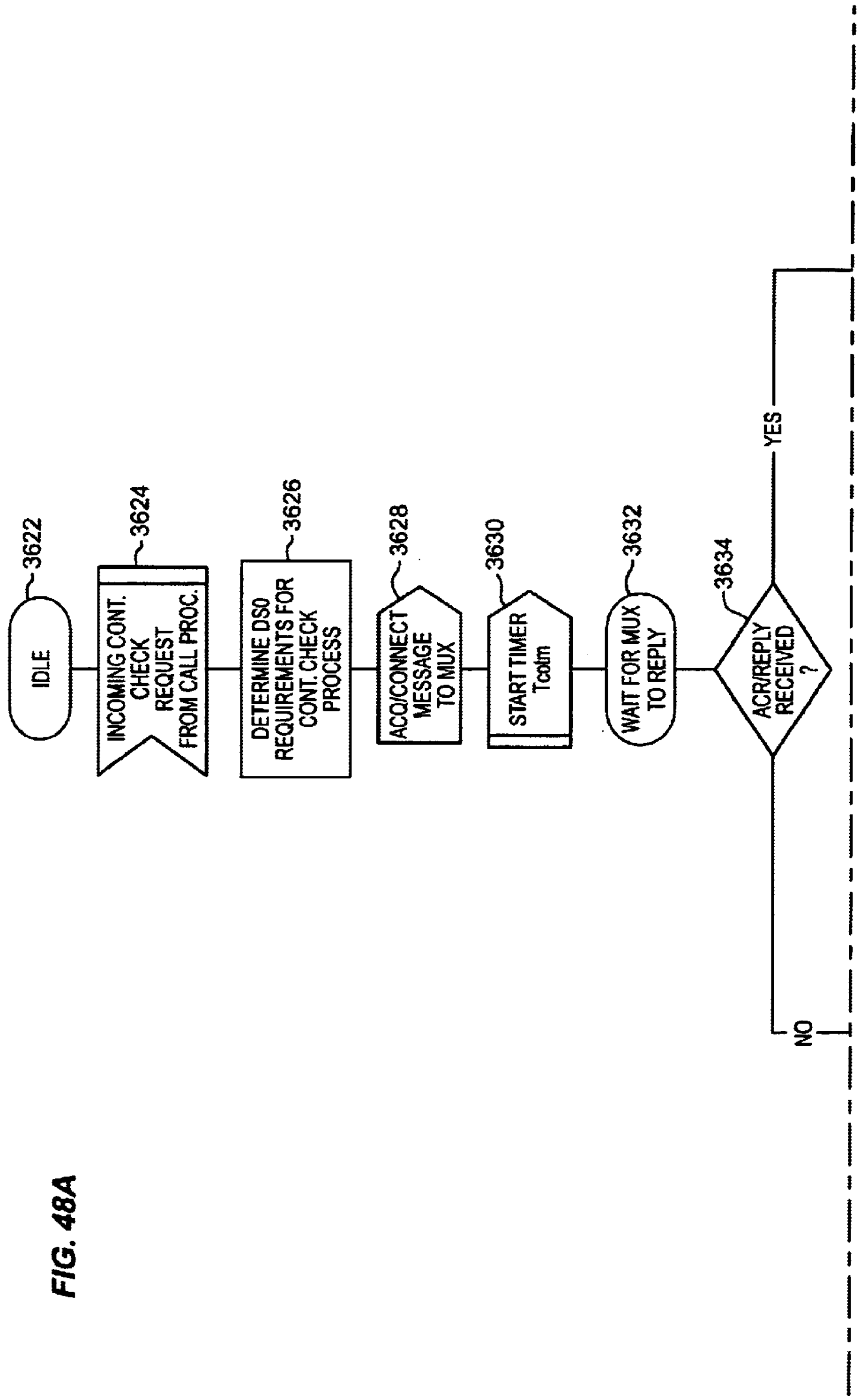
FIGS. 48A–48E are SDL diagrams of logic used in a version of the invention for COT processing for an origination process.
Figure 48B:
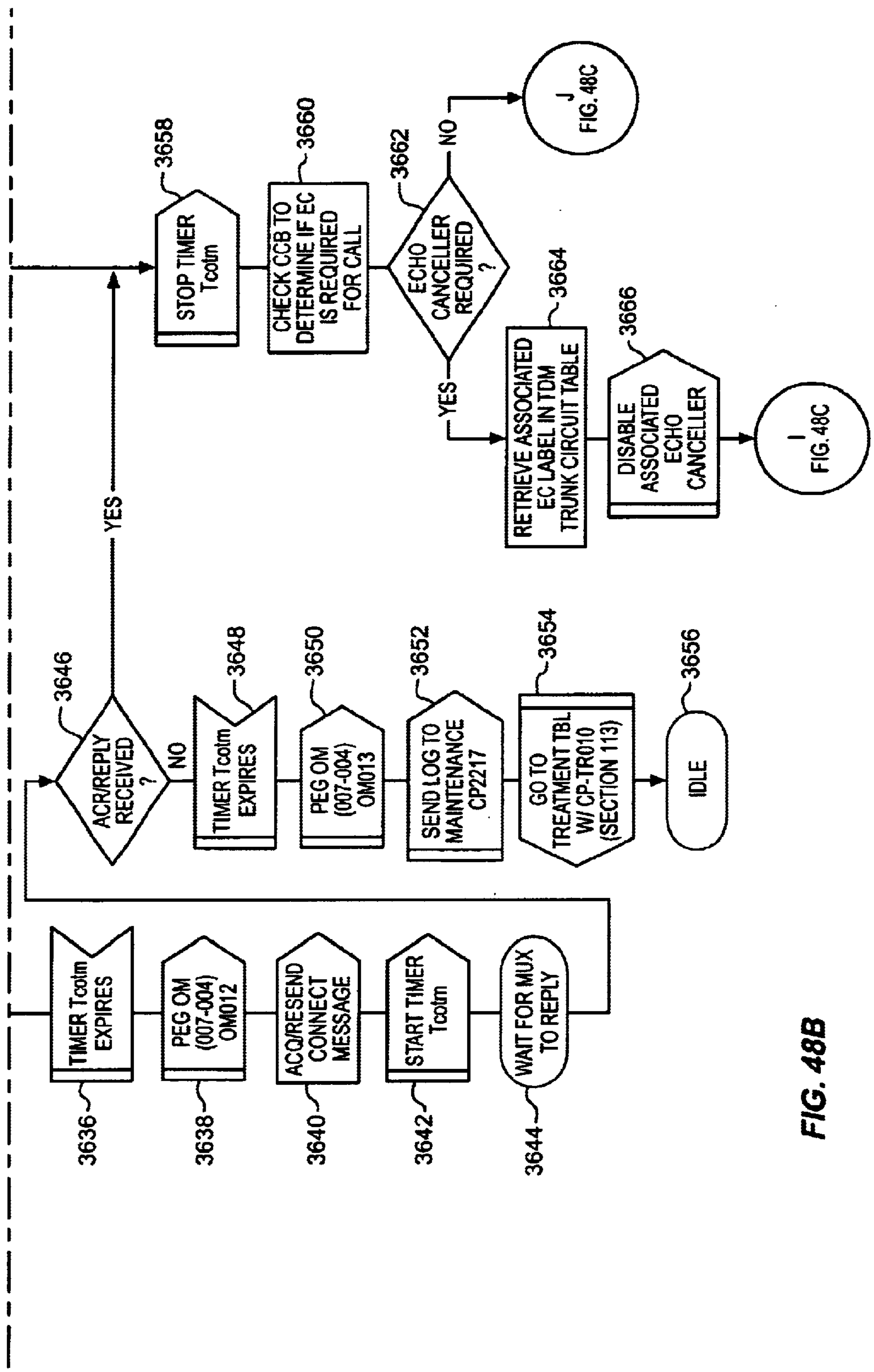
Figure 48C:
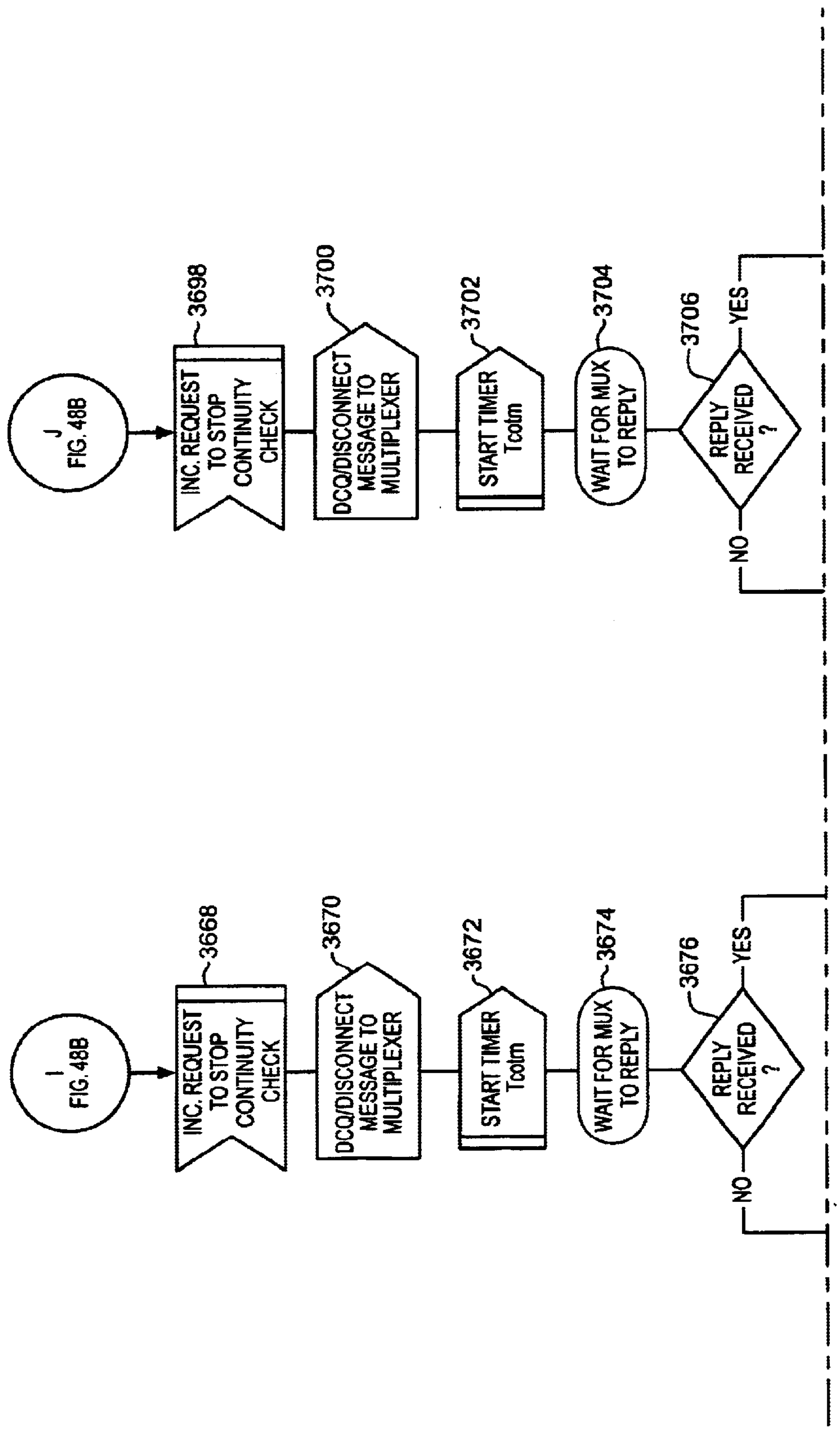
Figure 48D:
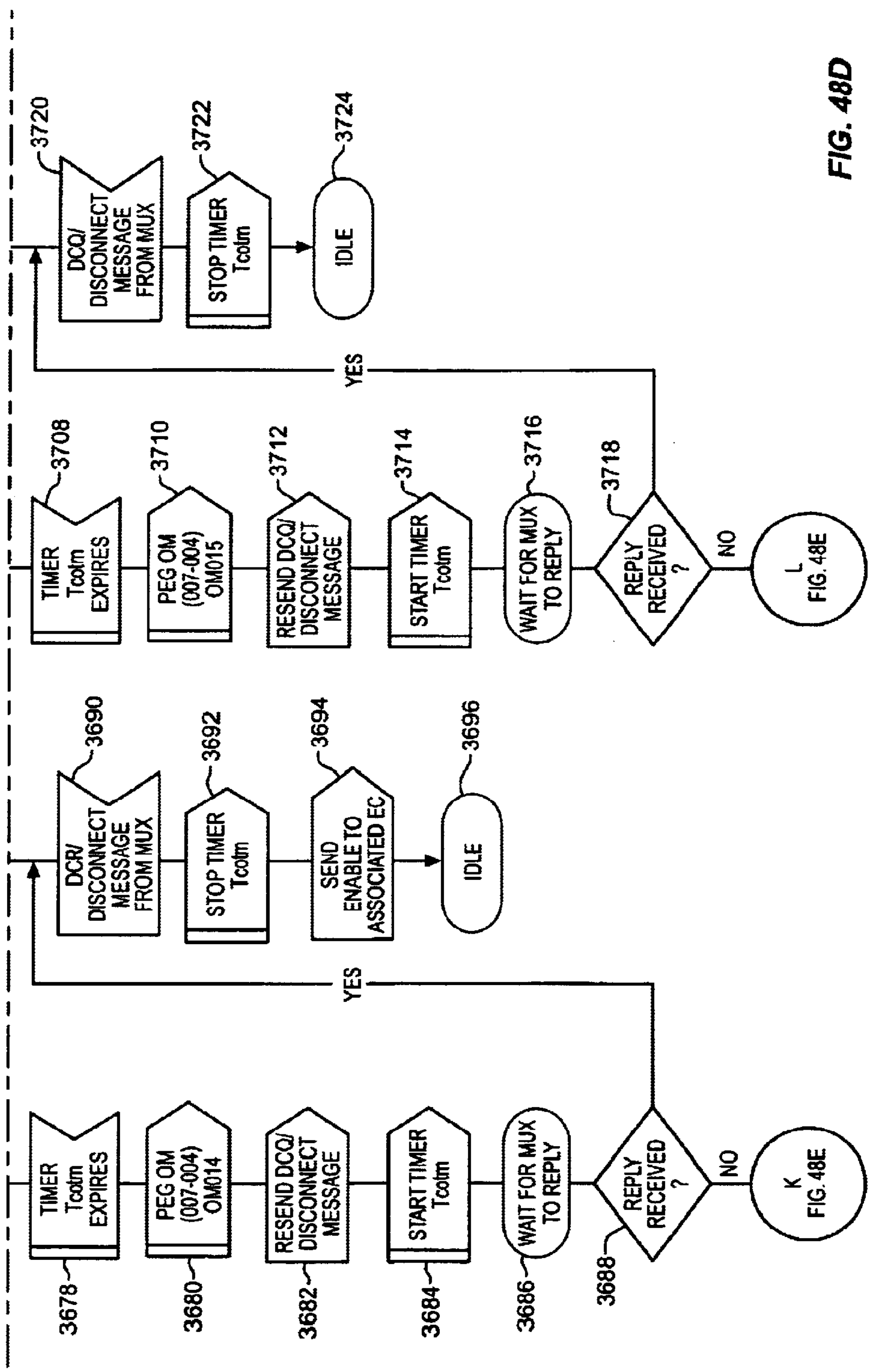
Figure 48E:
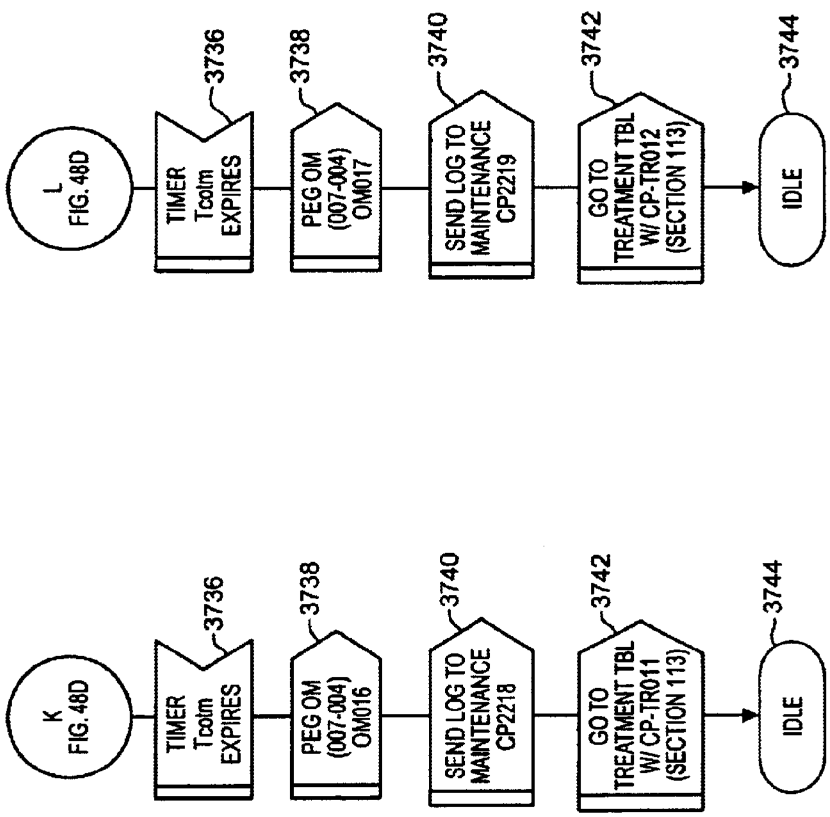

FIGS. 47A–47C depict COT processing after a CRM is received and before an IAM is received for the origination process. The process begins at 3518. If the Tcot timer (T8) times out at 3520, the Tiam timer (Tcra) is stopped at 3522. The incoming COT process is stopped at 3524, and the release time point is recorded for billing at 3526. The process continues with the treatment table for the origination process at 3528, and idle is attained at 3530.

If the Tiam timer (Tcra) times out at 3532, the Tcot timer (T8) is stopped at 3534. The incoming COT process is stopped at 3524, and the release time point is recorded for billing at 3526. The process continues with the treatment table for the origination process at 3528, and idle is attained at 3530.

If a COT is received froth the originating circuit at 3536, the Tcot timer is stopped at 3538. The incoming COT process is stopped at 3540, and the COT result is stored in the CIB at 3542.

If the COT was not successful at 3544, the OM is pegged at 3546. A log is sent to maintenance at 3548, and the release time point is recorded for billing at 3550. The Tiam timer (Tcra) is stopped at 3552, and the CRI process is stopped at 3554. Idle is attained at 3556.

If the COT was successful at 3544, the incoming COT parameter is set to completed at 3557. The process continues at step 3746.

If an REL is received from the originating circuit at 3558, the OM is pegged at 3560. The release time point is recorded for billing at 3562, and the incoming COT process is stopped at 3564. The Tcot timer (T8) and the Tiam timer (Tcra) are stopped at 3566. An RLC is sent out for the originating circuit at 3568, and the originating circuit is set to idle at 3570. The idle time point is recorded for the circuit selection at 3572, and idle is attained at 3574.

If an RLC is received from the originating circuit at 3576, the OM is pegged at 3578. The release time point is recorded for billing at 3580, and the incoming COT process is stopped at 3582. The Tcot timer (T8) and the Tiam timer (Tcra) are stopped at 3584. The process continues with the treatment table for the origination process at 3586. Idle is attained at 3588.

If another call processing message is received at 3590, such as an IAM, an ACM, an AMM, an INF, or another message, the incoming COT process is stopped at 3592. The Tcot timer (T8) and the Tiam timer (Tcra) are stopped at 3594. The CRS process is started at 3596, and idle is attained at 3598.

The process continues at step 3600. If maintenance blocks the originating circuit at 3602, the message is discarded at 3604. The process continues at step 3600.

If maintenance sends a reset for the originating circuit at 3606, the Tcot timer (T8) and the Tiam timer (Tcra) are stopped at 3608. The incoming COT process is stopped at 3610. The release time point is recorded for billing at 3612, and idle is attained at 3614.

If another message is received for maintenance at 3616, a log is sent to maintenance 3618. The message is discarded at 3620, and the process continues at step 3600.

Continuity Check Processing for the Origination Process

FIGS. 48A–48E depict continuity check processing for the origination process. The process is idle at 3622. If an incoming continuity check request is received from call processing at 3624, the DS0 requirements are determined for the continuity check processing at 3626. An activate connection query (ACQ) message is sent to the mux at 3628. The Tcotm timer for the mux COT is started at 3630. The process waits for the mux to reply at 3632.

If an activate connection response (ACR) is not received at 3634, and if the Tcotm timer expires at 3636, the OM is pegged at 3638. The ACQ connect message is resent at 3640, and the Tcotm timer is restarted at 3642. The mux waits for a reply at 3644.

If an ACR is not received at 3646, and if the Tcotm timer expires at 3648, the OM is pegged at 3650. A log is sent to maintenance at 3652. The call is sent to the treatment table at 3654, and idle is attained at 3656.

If an ACR is received at 3634 or 3646, the Tcotm timer is stopped at 3658. The CIB is checked to determine if echo cancellation (EC) is required for the call at 3660. If the echo canceller is required at 3662, the EC label is retrieved from the TDM trunk circuit table at 3664. The associated echo canceller is disabled at 3666, and the process continues at step 3668. If the echo canceller is not required at 3662, the process continues at step 3698.

At 3668, a request to stop the continuity check is received. A de-activate connection query message (DCQ) is sent to the mux at 3670, and the Tcotm timer is started at 3672. The mux waits for a reply at 3674.

If a reply is not received at 3676, and if the Tcotm timer expires at 3678, the OM is pegged at 3680. The DCQ is resent at 3682, and the Tcotm timer is again started at 3684. The mux waits for a reply at 3686. If a reply is not received at 3688, the process continues at step 3726.

If a reply is received at 3676 or 3688, and the message is a de-activate connection response (DCR) at 3690, the Tcotm timer is stopped at 3692. An enable message is sent to the associated echo canceller at 3694, and idle is attained 3696.

At 3698, a request to stop-the continuity check is received. A DCQ is sent to the mux at 3700. The Tcotm timer is started at 3702, and the mux waits for a response at 3704. If a reply is not received at 3706, and if the Tcotm timer expires at 3708, the OM is pegged at 3710. A DCQ is resent to the mux at 3712, and the Tcotm timer is started at 3714. The process waits for the mux to reply at 3716. If the mux reply is not received at 3718, the process continues at step 3736.

If a reply is received at. 3706 or 3718, and if a DCQ is the message received from the mux at 3720, the Tcotm timer is stopped at 3722. Idle is attained at 3724.

At 3726 the Tcotm timer expires. The OM is pegged at 3728, and a log is sent to maintenance at 3730. The call is sent to the treatment table at 3732, and idle is attained at 3734.

At 3736, the Tcotm timer expires. The OM is pegged at 3738, and a log is sent to maintenance at 3740. The call is sent to the treatment table at 3742, and idle is attained at 3744.

IAM Processing for the Origination Process

Figure 49A:
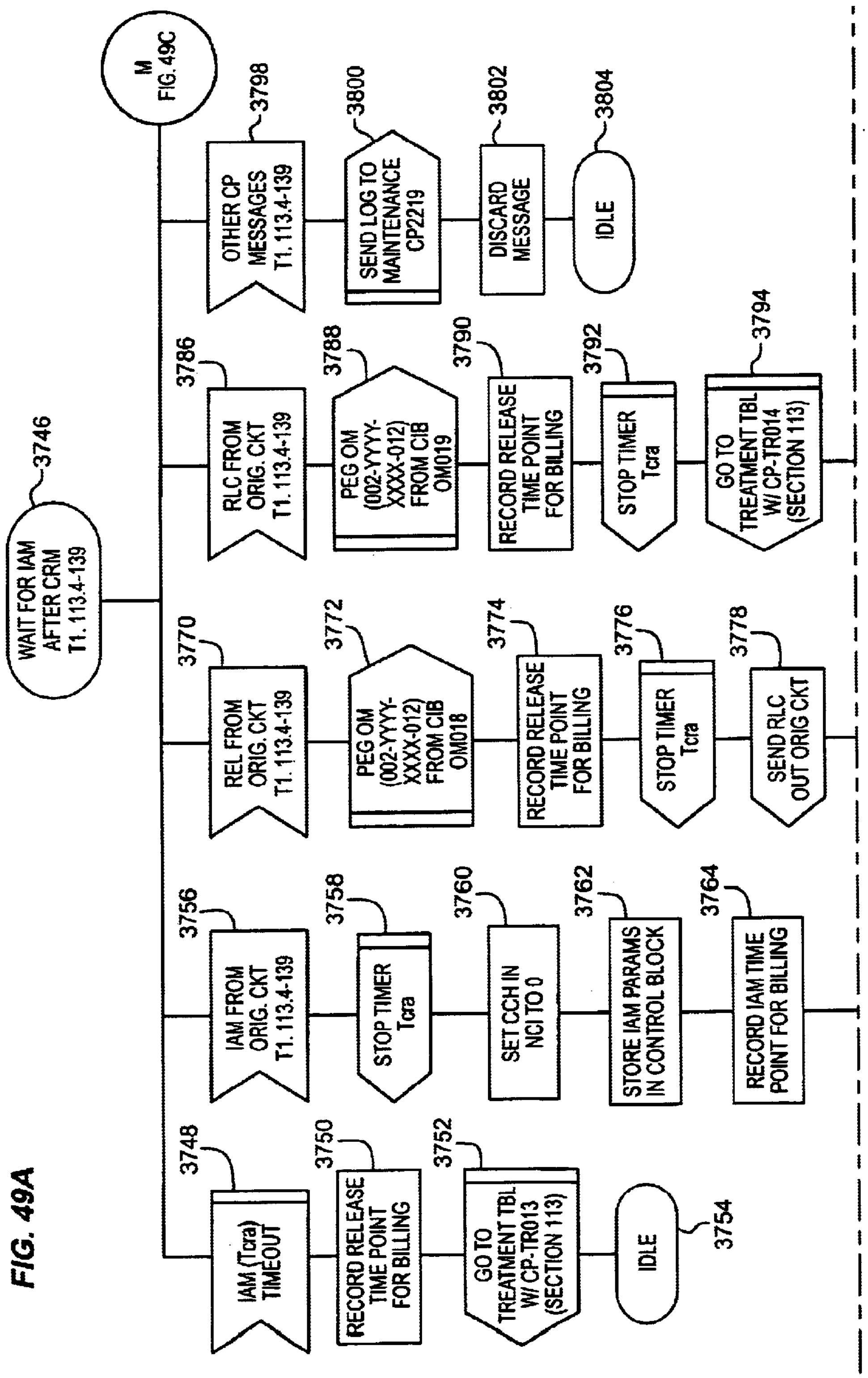
FIGS. 49A–49C are SDL diagrams of logic used in a version of the invention for IAM processing after a CRM is received for an origination process.
Figure 49B:
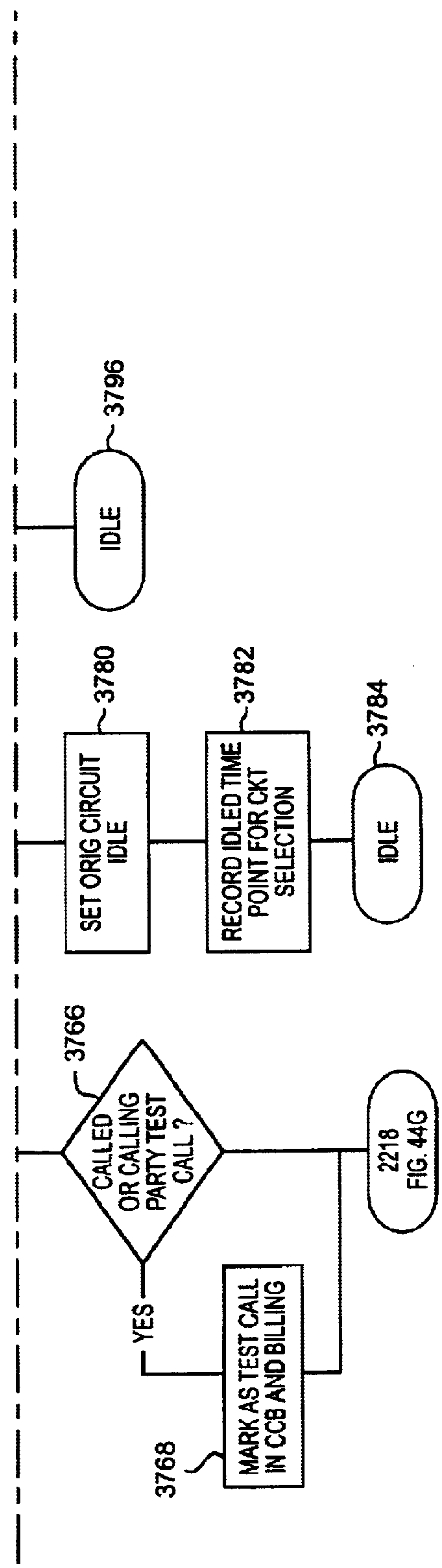
Figure 49C:
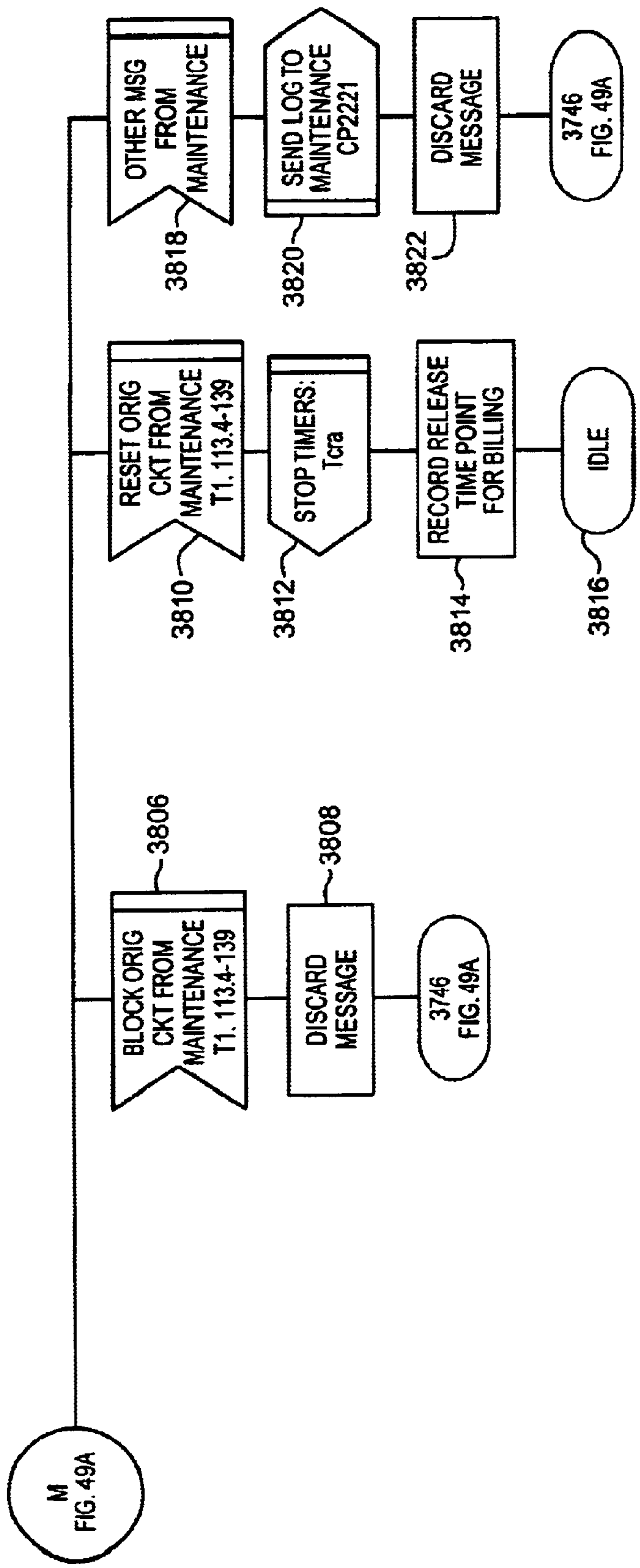
Figure 50A:
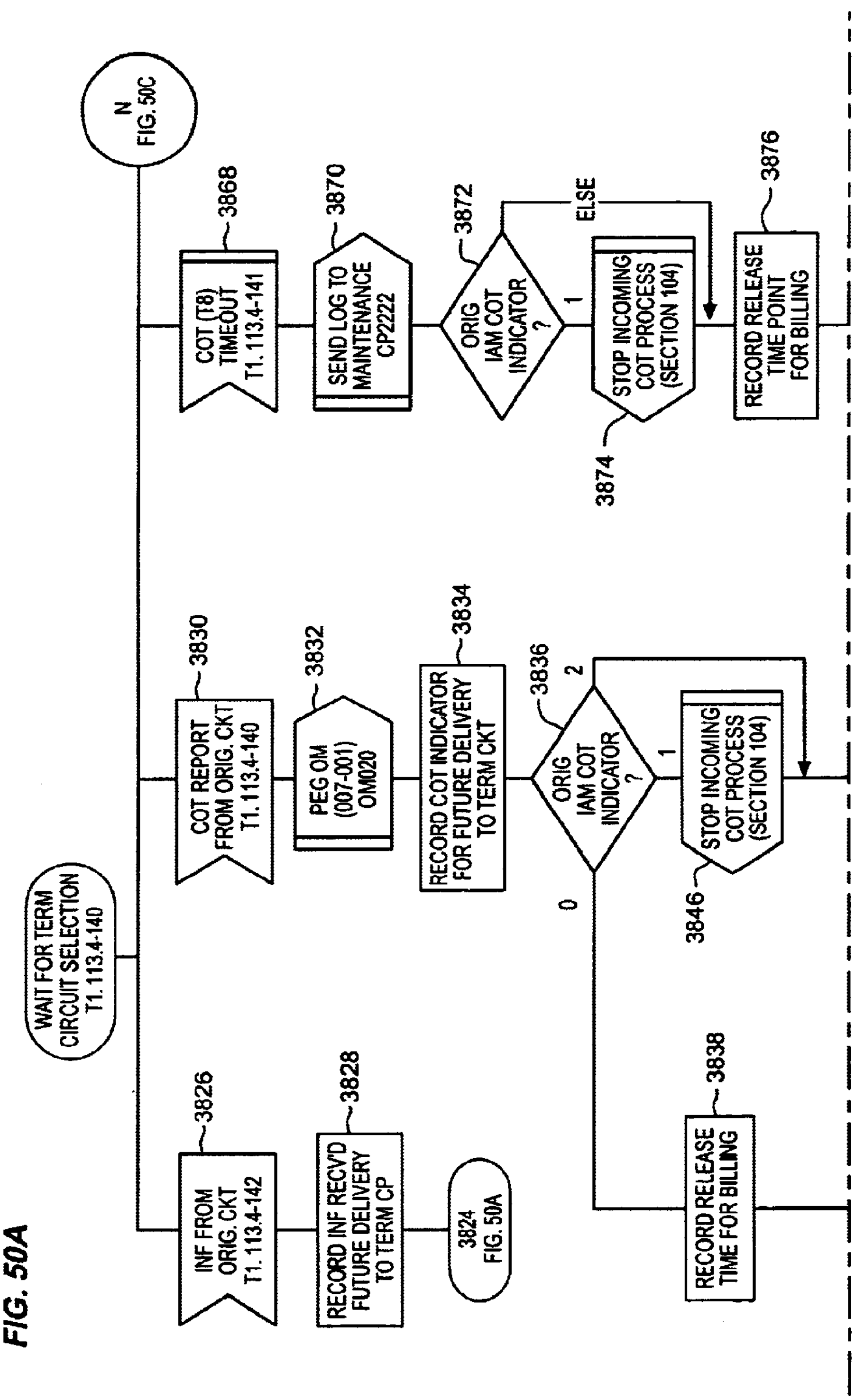
FIGS. 50A–50F are SDL diagrams of logic used in a version of the invention for terminating circuit selection and COT processing for the originating process.
Figure 50B:
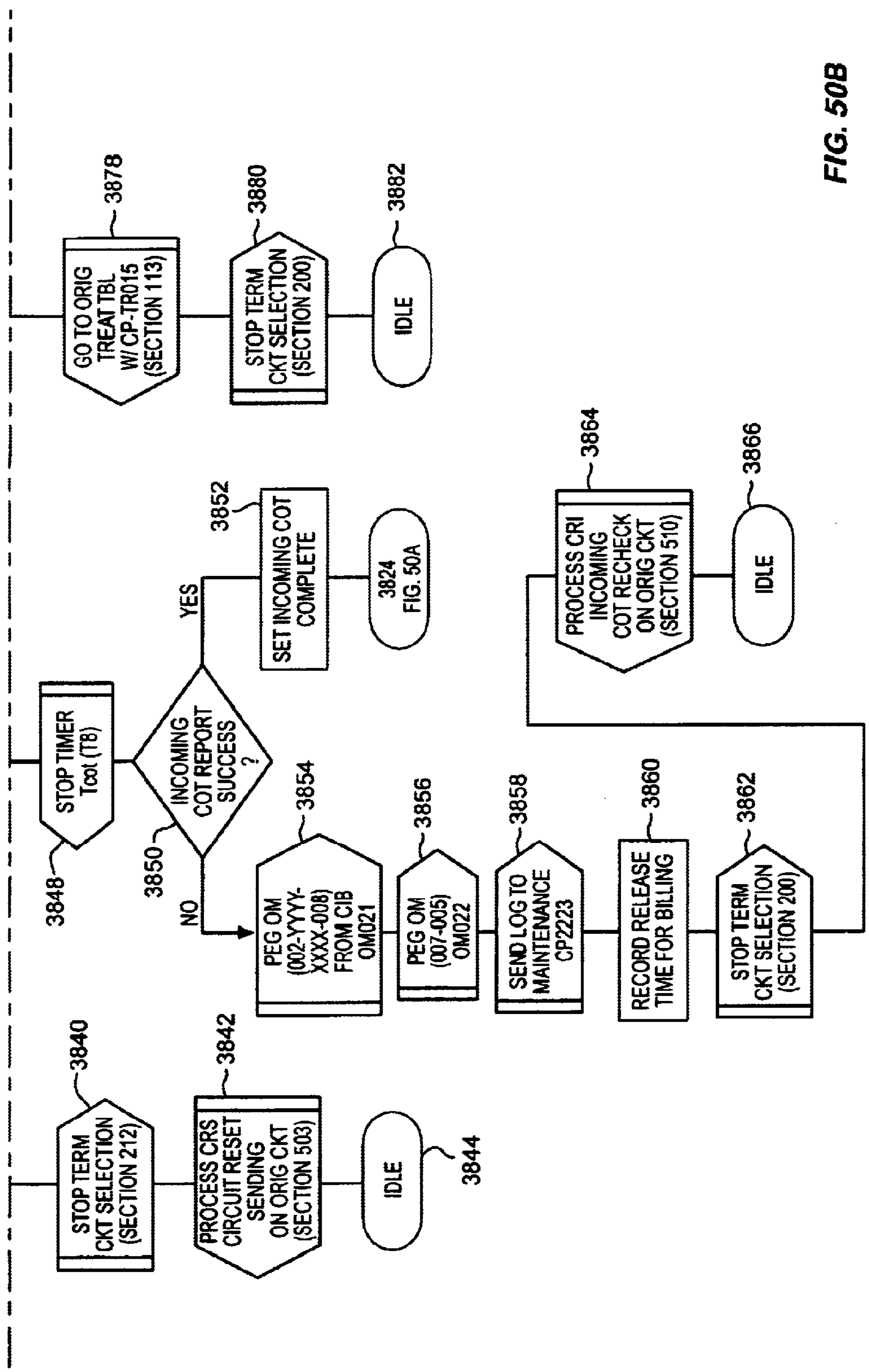
Figure 50C:
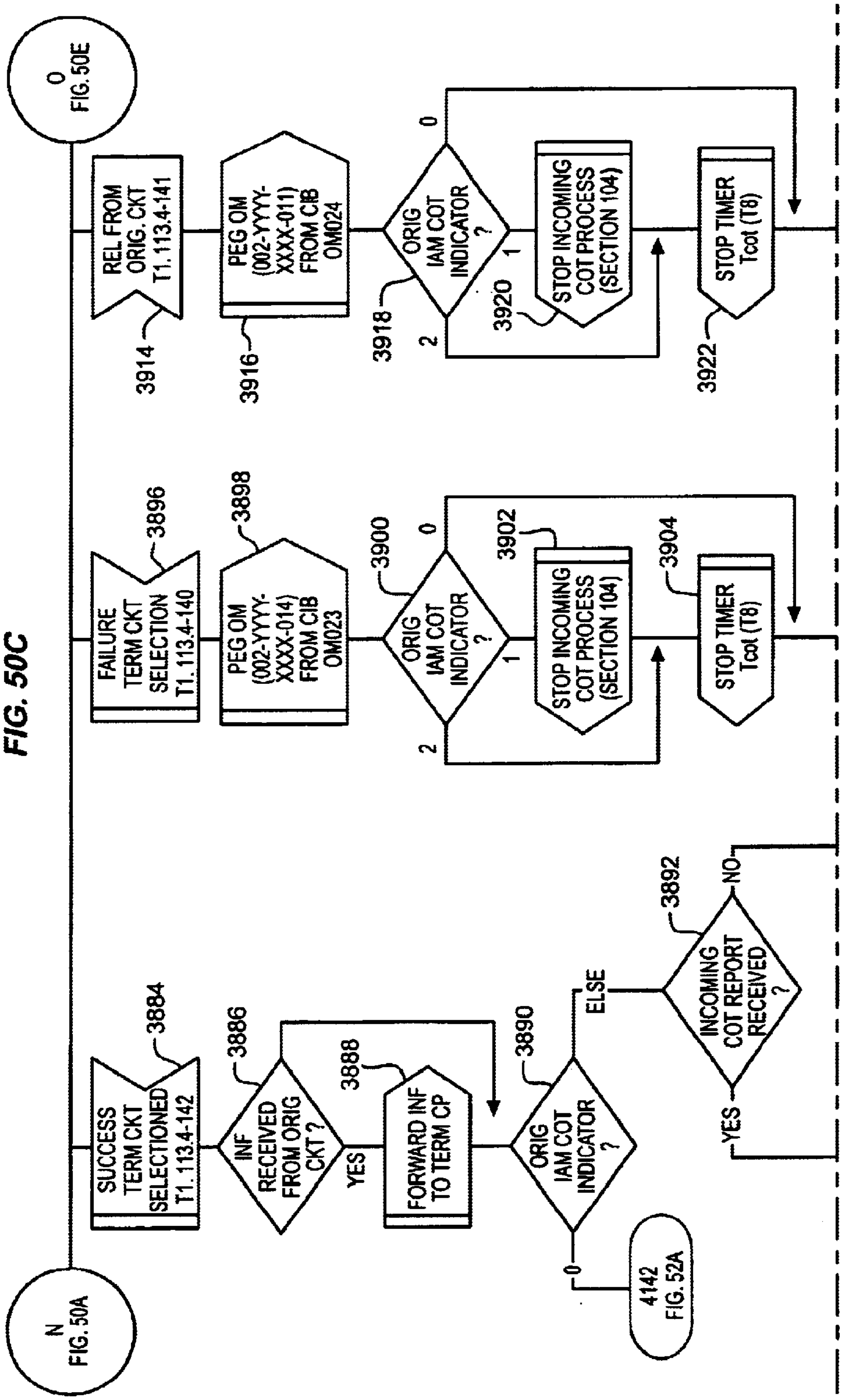
Figure 50D:
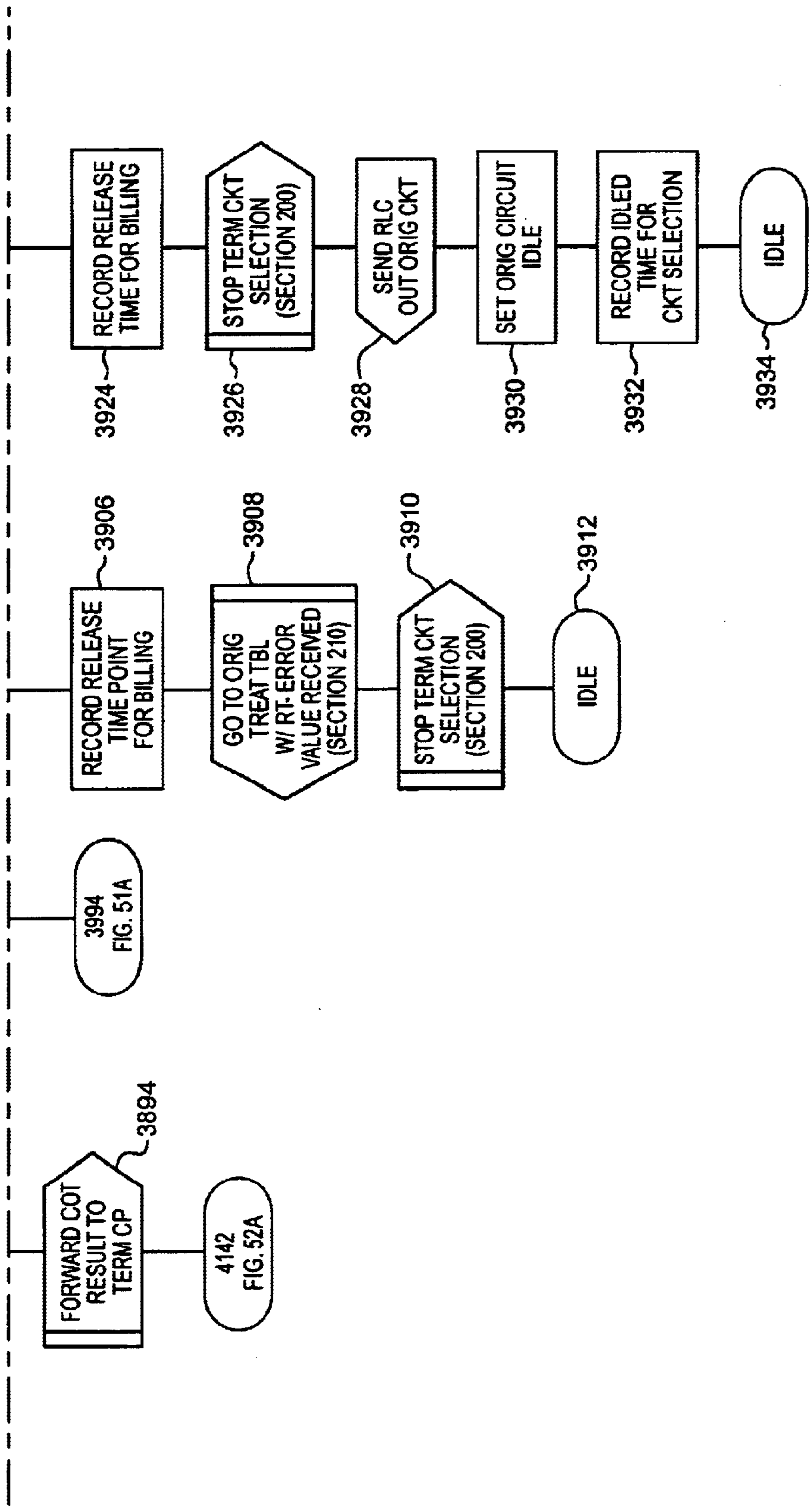
Figure 50E:
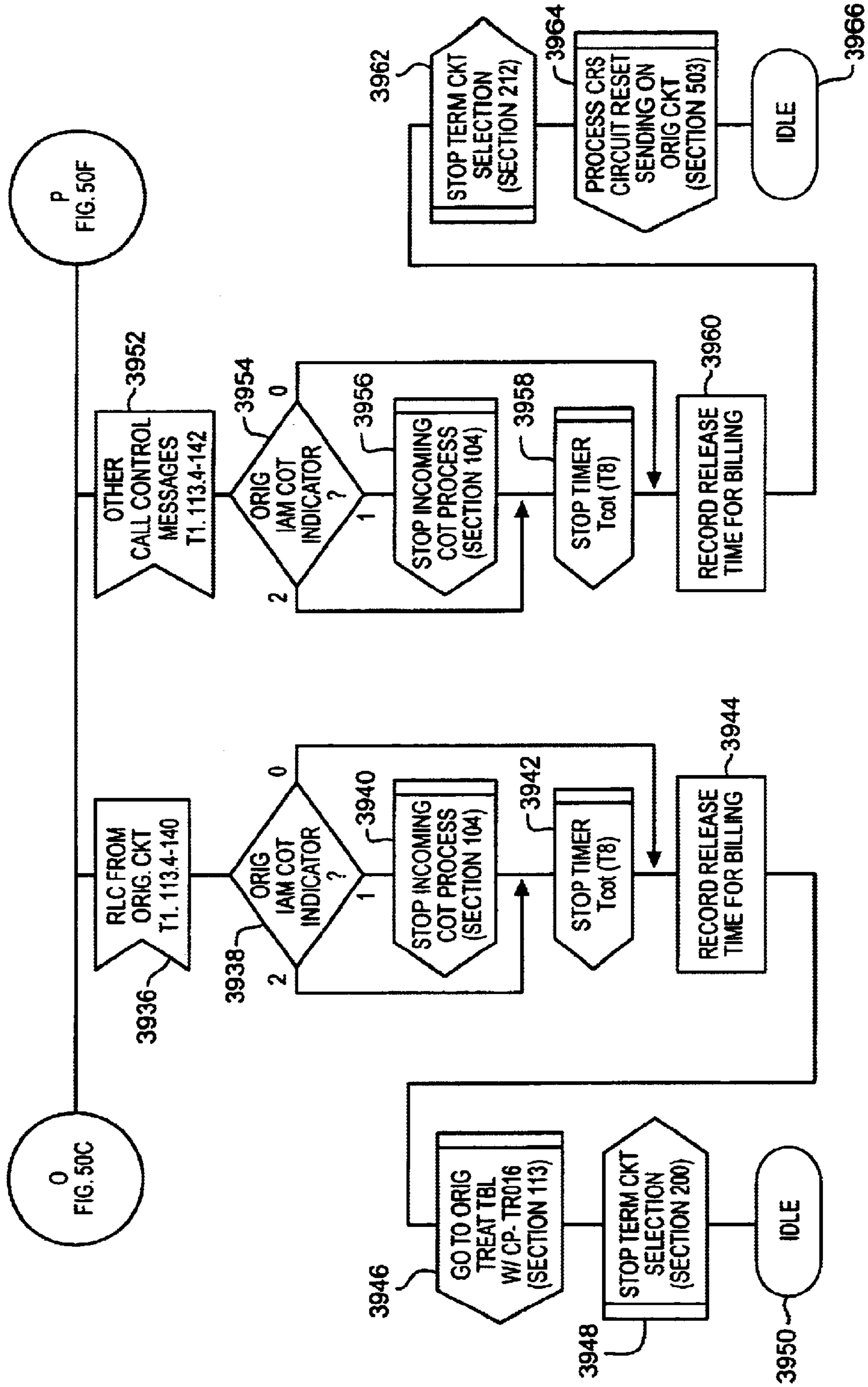
Figure 50F:
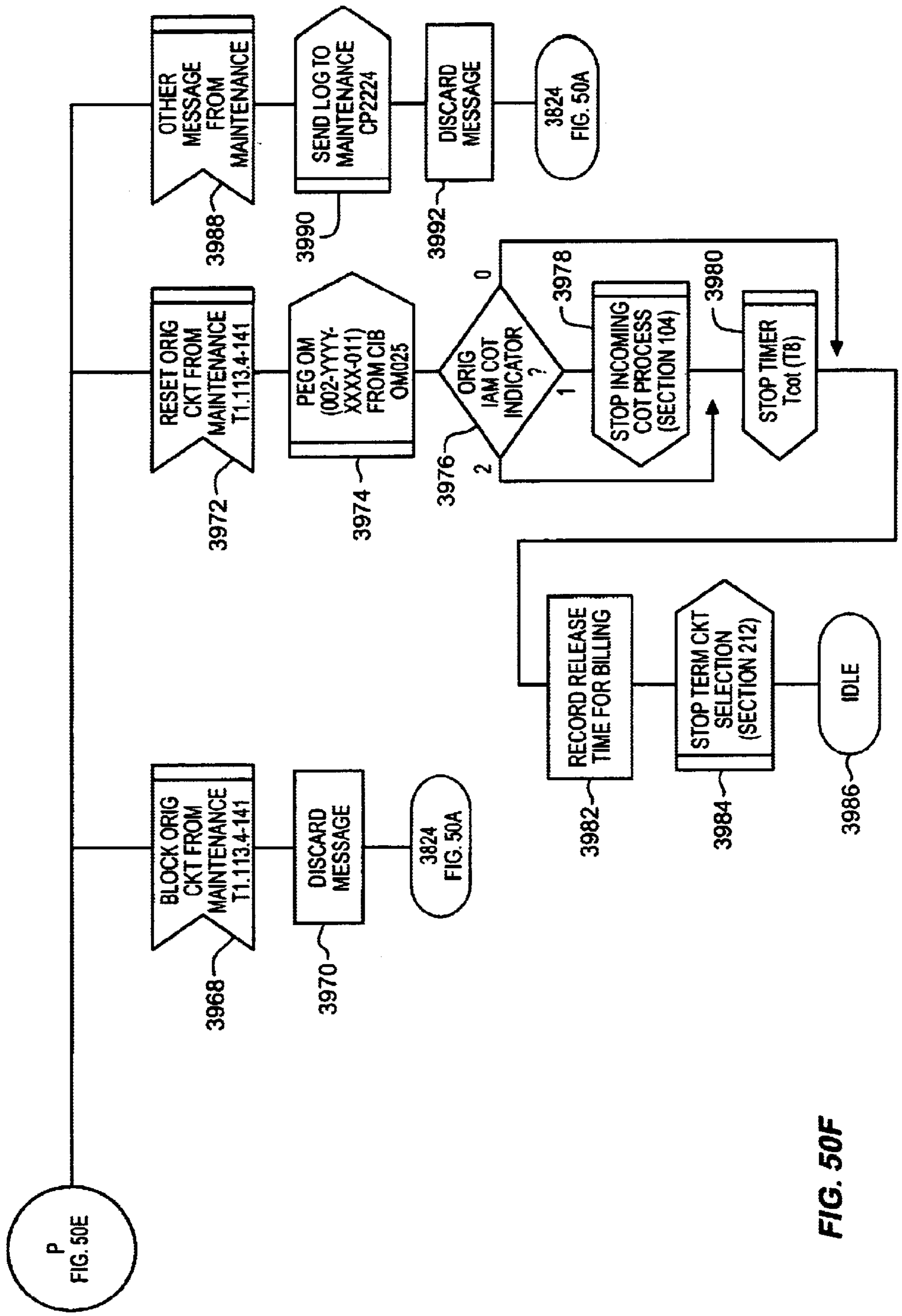
Figure 51A:
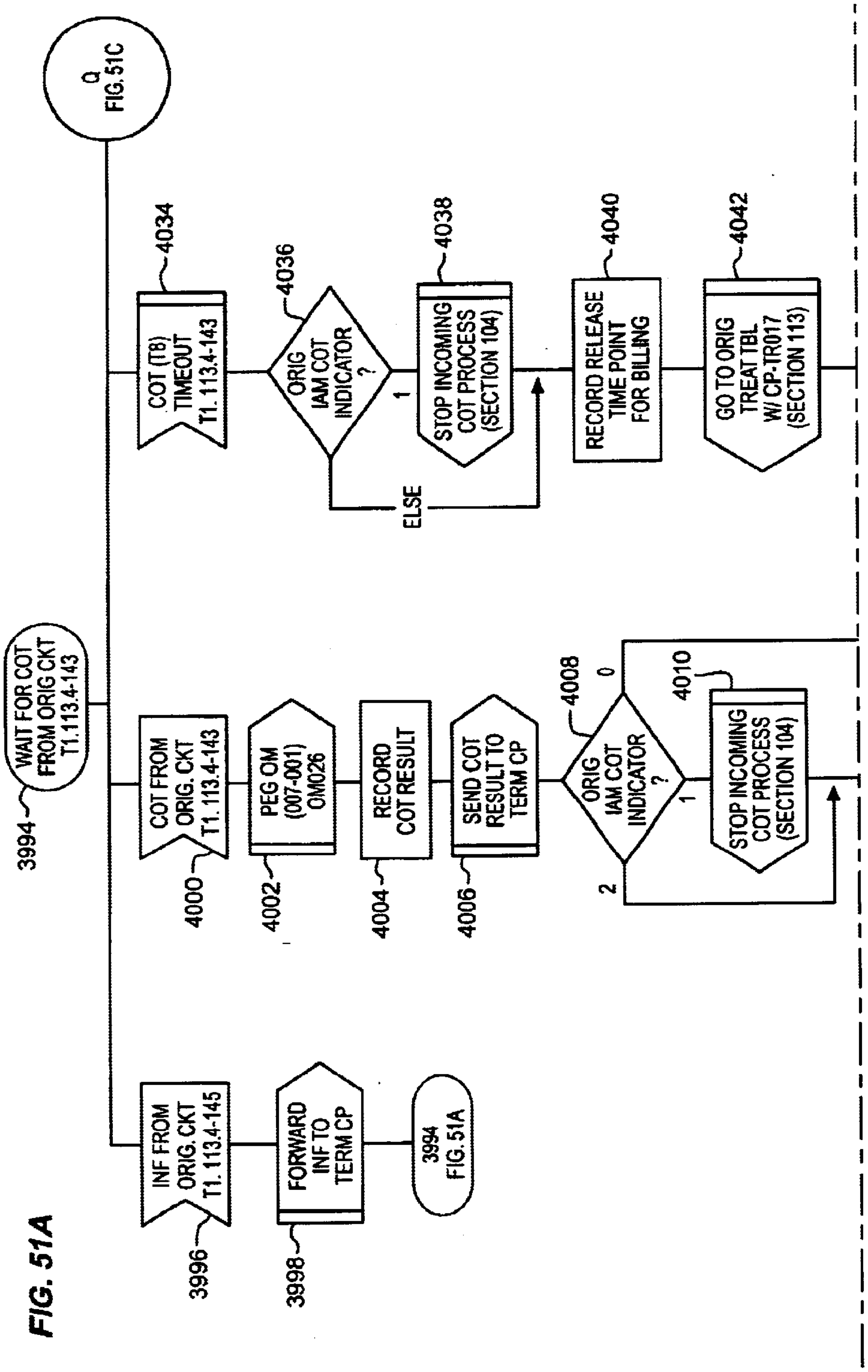
FIGS. 51A–51E are SDL diagrams of logic used in a version of the invention for COT processing after a terminating circuit is selected.
Figure 51B:
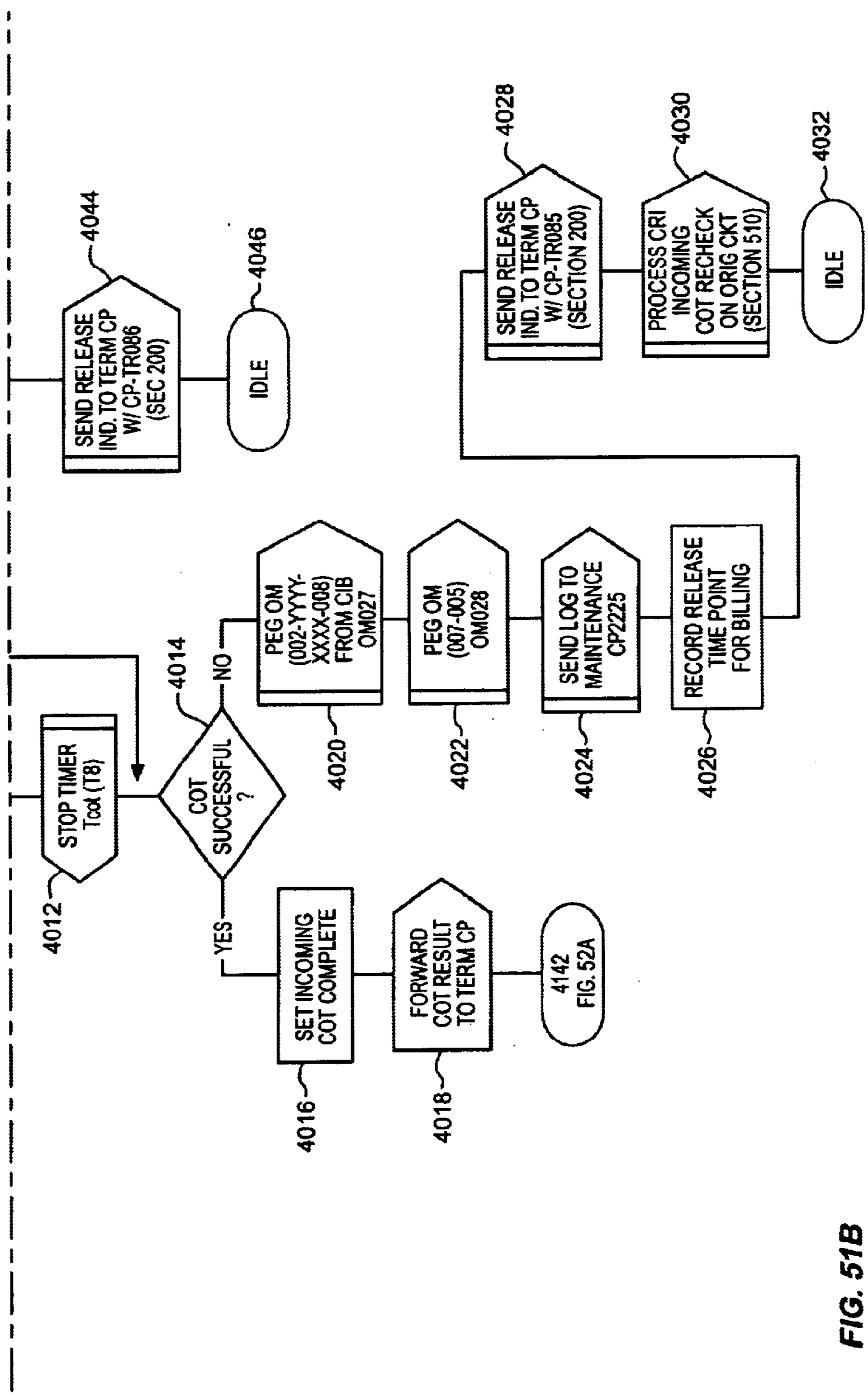
Figure 51C:
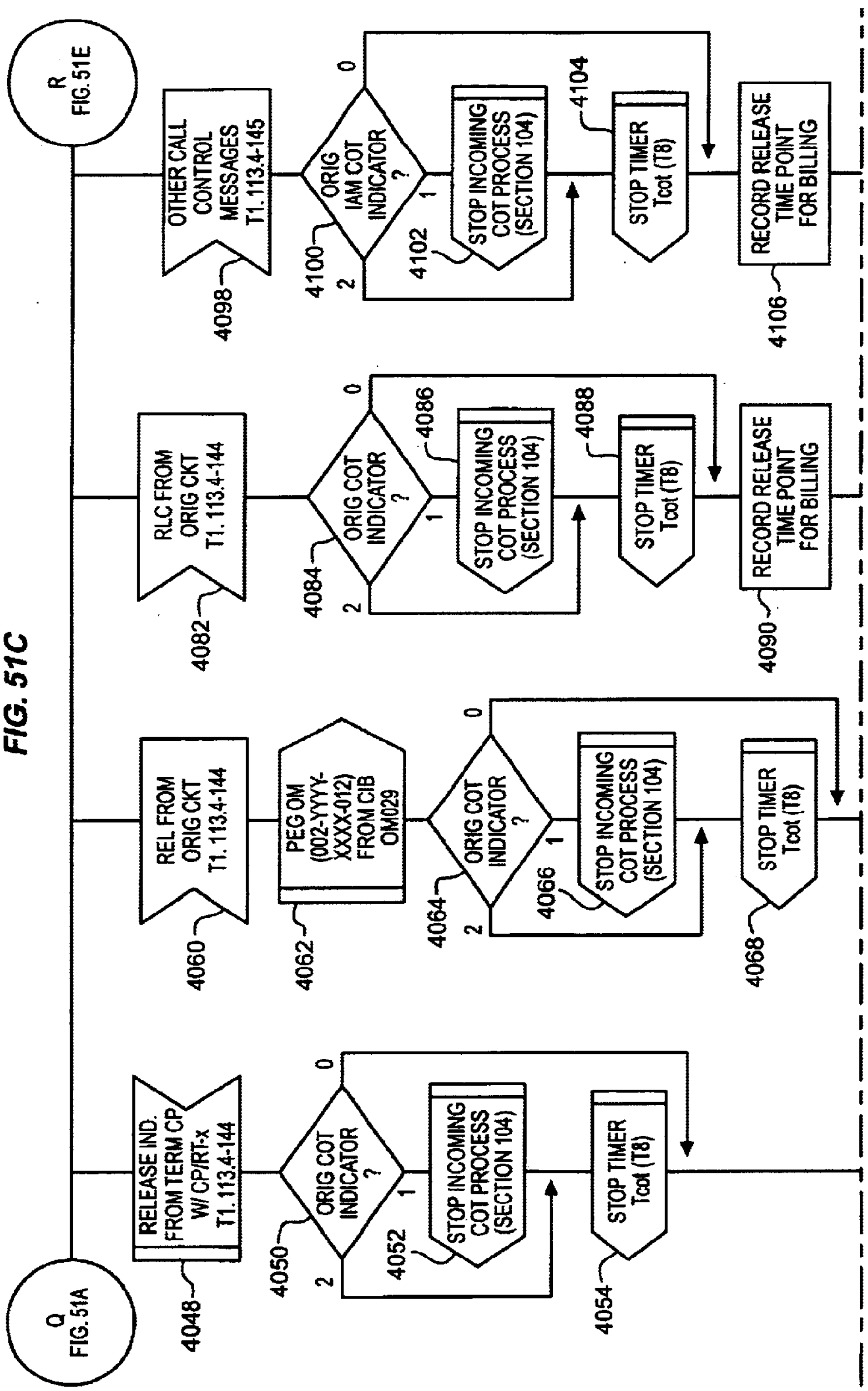
Figure 51D:
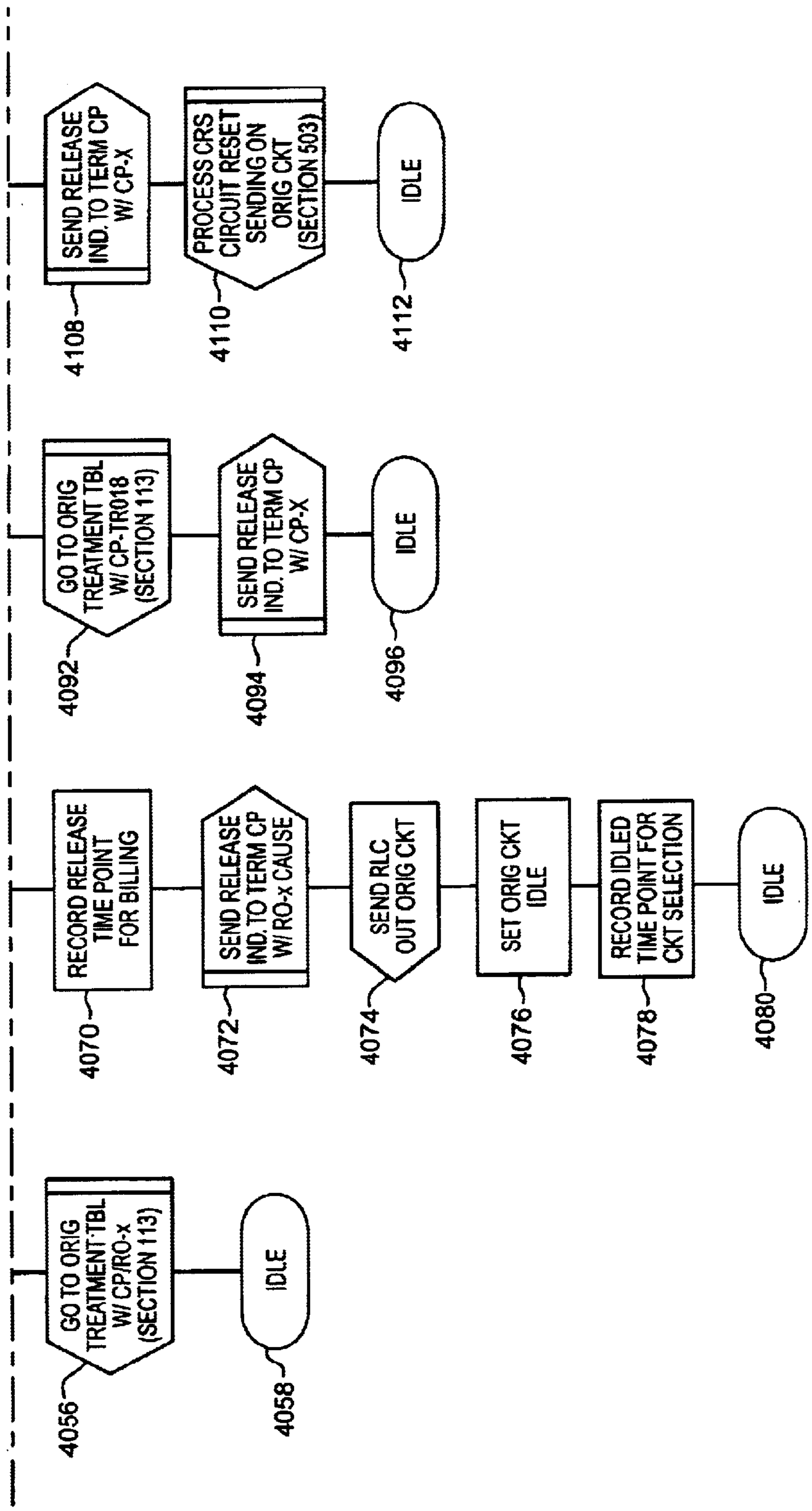
Figure 51E:
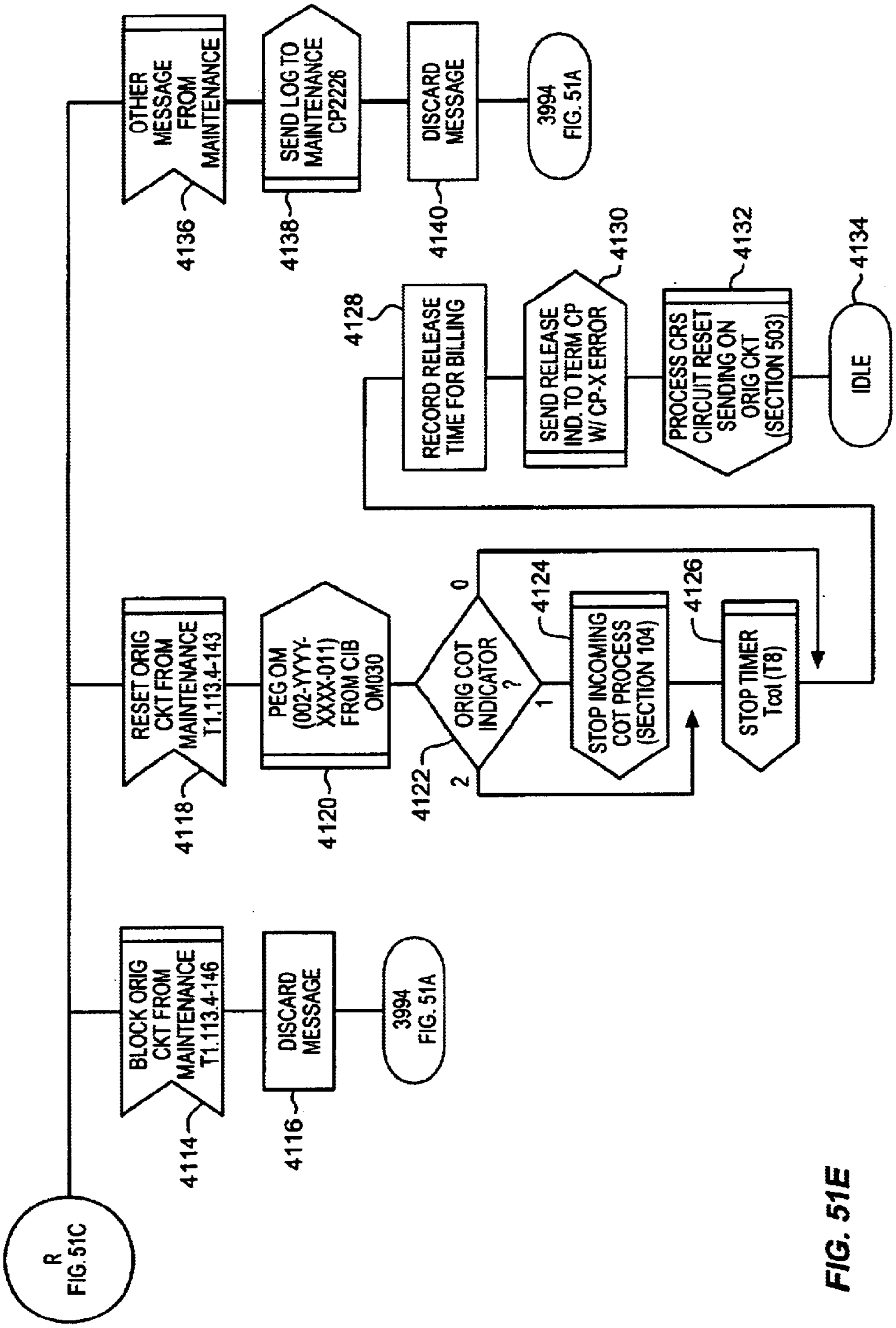

FIGS. 49A–49C depict processing for an IAM after a CRM is received. The process waits for an IAM at 3746. If the Tiam timer (Tcra) times out at 3748, the release time point is recorded for billing at 3750, and the process is sent to the treatment table at 3752. Idle is attained at 3754.

If an IAM is received from the originating circuit at 3756, the Tiam timer (Tcra) is stopped at 3758. The continuity check indicator (CCH) in the NCI is set to zero at 3760. The IAM parameters are stored in the control block at 3762, and the IAM time point is recorded for billing at 3764. If the called party or the calling party is a test call at 3766, the call is marked as a test call in the CIB and in billing at 3768. After step 3768 or if neither party is a test call at 3766, the process continues at step 2218.

If an REL is received from the originating circuit at 3770, the OM is pegged at 3772. The release time point is recorded for billing at 3774, and the Tiam timer (Tcra) is stopped at 3776. An RLC is sent out the originating circuit at 3778, and the originating circuit is set to idle at 3780. The idled time point for the circuit selection is recorded at 3782, and idle is attained at 3784.

If an RLC is received from the originating circuit at 3786, the OM is pegged at 3788. The release time point is recorded for billing at 3790, and the Tiam timer (Tcra) is stopped at 3792. The call is sent to the treatment table for the originating call process at 3794, and idle is attained at 3796.

If other call processing messages are received at 3798, a log is sent to maintenance at 3800. The message is discarded at 3802, and idle is attained at 3804.

If maintenance blocks the originating circuit at 3806, the message is discarded at 3808. The process continues at step 3746.

If maintenance resets the originating circuit at 3810, the Tiam timer (Tcra) is stopped at 3812. The release time point is recorded for billing at 3814, and idle is attained at 3816.

If other messages are received for maintenance at 3818, a log is sent to maintenance at 3820. The message is discarded at 3822, and the process continues at step 3746.

Terminating Circuit Selection and COT Processing

FIGS. 50A–50F depict the origination process for terminating circuit selection and COT processing. The process is in the wait state at 3824. If information is received from the originating circuit at 3826, the information is recorded for future delivery to the termination call process or at 3828. The process continues at step 3824.

If a COT report is received from the originating circuit at 3830, the OM is pegged at 3832. The COT indicator is recorded for future delivery to the terminating circuit at 3834. The originating COT indicator is checked at 3836.

If a COT is not required at 3836, the release time is recorded for billing at 3838. The terminating circuit selection process is stopped at 3840, and the CRS process is started for the originating circuit at 3842. Idle is attained at 3844.

If a COT is required at 3836, the incoming COT process is stopped at 3846. After step 3846 or if a COT is required for the previous circuit at 3836, the Tcot timer (T8) is stopped at 3848.

If an incoming COT reports success at 3850, the incoming COT is set to complete at 3852. The process continues at step 3824.

If the incoming COT does not report success at 3850, the OM is pegged at 3854 and 3856, a log is sent to maintenance at 3858, and the release time is recorded for billing at 3860. The terminating circuit selection is stopped at 3862, and the CRI process is started on the originating circuit at 3864. Idle is attained at 3866.

If the Tcot timer (T8) times out at 3868 while waiting for terminating circuit selection at 3824, a log is sent to maintenance at 3870. If a COT indicator indicates that a continuity check is required for the circuit at 3872, the incoming COT process is stopped at 3874. After step 3874 or if a COT is not required or was required for the previous circuit at 3872, the release time point is recorded for billing at 3876. The process continues with the treatment table at 3878, and the terminating circuit selection is stopped at 3880. Idle is attained at 3882.

If the terminating circuit selection process is successful at 3884, and if information is received from the originating circuit at 3886, the INF is forwarded to the termination call processor at 3888. After step 3888 or if an INF is not received from the originating circuit at 3886, the COT requirements are determined at 3890.

If a COT is not required for this circuit, the process continues at step 4142. If a COT is required on this circuit or the previous circuit at 3890, and if an incoming COT report is received at 3892, the COT result is forwarded to the termination call process at 3894. The process then continues at step 4142. If an incoming COT report is not received at 3892, the process continues at step 3994.

If while waiting for a terminating circuit selection, a terminating circuit selection fails at 3896, the OM is pegged at 3898. If a COT is required for this circuit at 3900, the incoming COT process is stopped at 3902. The Tcot (T8) timer is stopped at 3904, and the release time point is recorded for billing at 3906. If a COT is required for the previous circuit at 3900, the process continues with step 3904. If a COT is not required at 3900, the process continues with step 3906.

At 3908, the process is sent to the treatment table. The terminating circuit selection process is stopped at 3910, and idle is attained at 3912.

If while waiting for the terminating circuit selection an REL is received from the originating circuit at 3914, the OM is pegged at 3916. The COT requirements are checked at 3918. If a COT is required for this circuit at 3918, the incoming COT process is stopped at 3920. The Tcot timer (T8) is stopped at 3922, and the release time is recorded for billing at 3924. If the COT is required for a previous circuit at 3918, the process continues at step 3922. If no COT is required at 3918, the process continues at step 3924.

At 3926, the terminating circuit selection process is stopped. An RLC is sent for the outgoing originating circuit at 3928. The originating circuit is set to idle at 3930, and the idled time for the circuit selection is recorded at 3932. Idle is attained at 3934.

An RLC is received from the originating circuit at 3936 while waiting for the terminating circuit selection. If a COT is required at 3938, the incoming COT process is stopped at 3940. The Tcot timer (T8) is stopped at 3942, and the release time is recorded for billing at 3944. If the COT is required for a previous circuit at 3938, the process continues at step 3942. If no COT is required at 3938, the process continues at step 3944.

The process is sent to the treatment table for the origination process 3946. The terminating circuit selection process" is stopped at 3948, and idle is attained at 3950.

If other call control messages are received at 3952 while waiting for the terminating circuit selection, and if a COT is required for the circuit at 3954, the incoming COT process is stopped at 3956. The Tcot timer (T8) is stopped at 3958, and the release time is recorded for billing at 3960. If the COT is required for the previous circuit at 3954, the process continues at step 3958. If no COT is required at 3954, the process continues at step 3960.

The terminating circuit selection is stopped at 3962, and the CRS process is started for the originating circuit at 3964. Idle is attained at 3966.

If an originating circuit block message is received from maintenance at 3968 while waiting for a terminating circuit selection, the message is discarded at 3970. The process continues at step 3824.

If an originating circuit reset message is received for maintenance at 3972, the OM is pegged at 3974. If a COT is required for this circuit at 3976, the incoming COT process is stopped at 3978. The Tcot timer (T8) is stopped at 3980, and the release time is recorded for billing at 3982. The terminating circuit selection is stopped at 3984, and idle is attained at 3986. If a COT is required for the previous circuit at 3976, the process continues at step 3980. If no COT is required at 3976, the process continues at step 3982.

If another message is received from maintenance at 3988, a log is sent to maintenance at 3990. The message is discarded at 3992, and the process continues at step 3824.

COT Processing After a Terminating Circuit is Selected

FIGS. 51A–51E depict processing for a COT after a terminating circuit is selected. The process waits for a COT from the originating circuit at 3994. If an INF is received from the originating circuit at 3996, the INF is forwarded to the termination call process at 3998. The process continues with step 3994.

If a COT is received from the originating circuit at 4000, the OM is pegged at 4002. The COT result is recorded at 4004, and the COT result is sent to the termination call process at 4006. If a COT is required at 4008, the incoming COT process is stopped at 4010. The Tcot timer (T8) is stopped at 4012, and the success of the COT is determined at 4014. If a COT is required for the previous circuit at 4008, the process continues at step 4012. If no COT is required at 4008, the process continues at step 4014.

If the COT was successful at 4014, the incoming COT parameter is set to complete at 4016. The COT report is forwarded to the termination call process at 4018, and the process continues at step 4142.

If the COT was not successful at 4014, the OM is pegged at 4020 and at 4022. A log is sent to maintenance at 4024, and the release time point is recorded for billing at 4026. A release indicator is sent to the termination call process at 4028, and the CRI process is started for the originating circuit at 4030. Idle is attained at 4032.

If the Tcot timer (T8) times out at 4034, and if a COT is required for the circuit at 4036, the incoming COT process is stopped at 4038. The release time point is recorded for billing at 4040. If a COT is required for the previous circuit or if no COT is required at 4036, the process continues at step 4040. The call is sent to the treatment table for the originating process at 4042, and the release indicator is sent to the termination call process at 4044. Idle is attained at 4046.

If a release indicator is received from the termination call process at 4048 while waiting for a COT from the originating circuit, and if a COT is required for this circuit at 4050, the incoming COT process is stopped at 4052. The Tcot timer (T8) is stopped at 4054, and the call is sent to the treatment table for the originating call process at 4056. Idle is attained at 4058. If the COT is required for the previous circuit at 4050, the process continues at step 4054. If no COT is required at 4050, the process continues at step 4056.

If an REL is received from the originating circuit at 4060, the OM is pegged at 4062. If a COT is required at 4064, the incoming COT process is stopped at 4066. The Tcot timer (T8) is stopped at 4068, and the release time point is recorded for billing at 4070. If the COT is required for the previous circuit at 4064, the process continues at step 4068. If no COT is required at 4064, the process continues at step 4070.

A release indicator is sent to the termination call process at 4072, and an RLC is sent for the outgoing originating circuit at 4074. The originating circuit is set to idle at 4076, and the idled time point for the circuit selection is recorded at 4078. Idle is attained at 4080.

If an RLC is received from the originating circuit at 4082, and if a COT is required at 4084, the incoming COT process is stopped at 4086. The Tcot timer (T8) is stopped at 4088, and the release time point is recorded for billing at 4090. If the COT is required for a previous circuit at 4084, the process continues at step 4088. If no COT is required at step 4084, the process continues at step 4090.

At 4092, the call is sent to the treatment table for the originating process. A release indicator is sent to the termination call process at 4094, and idle is attained at 4096.

If another call control message is received at 4098, and if a COT is required at 4100, the incoming COT process is stopped at 4102. The Tcot timer (T8) is stopped at 4104, and the release time point is recorded for billing at 4106. If the COT is required for the previous circuit at 4100, the process continues at step 4104. If no COT is required at 4100, the process continues at step 4106.

A release indicator is sent to the termination call process at 4108. The CRS process is started for the originating circuit at 4110, and idle is attained at 4112.

If a block for the originating circuit is received from maintenance at 4114, the message is discarded at 4116. The process continues at step 3994.

If a reset is received for the originating circuit from maintenance at 4118, the OM is pegged at 4120. If a COT is required for the circuit at 4122, the incoming COT process is stopped at 4124. The Tcot timer (T8) is stopped at 4126, and the release time is recorded for billing at 4128. If the COT is required for the previous circuit at 4122, the process continues at step 4126. If no COT is required at 4122, the process continues at step 4128.

A release indicator is sent to the termination call process at 4130. The CRS process is started for the originating circuit at 4132, and idle is attained at 4134.

If other messages are received from maintenance at 4136, a log is sent to maintenance at 4138. The message is discarded at 4140, and the process continues at step 3994.

ANM Processing for the Origination Process

Figure 52A:
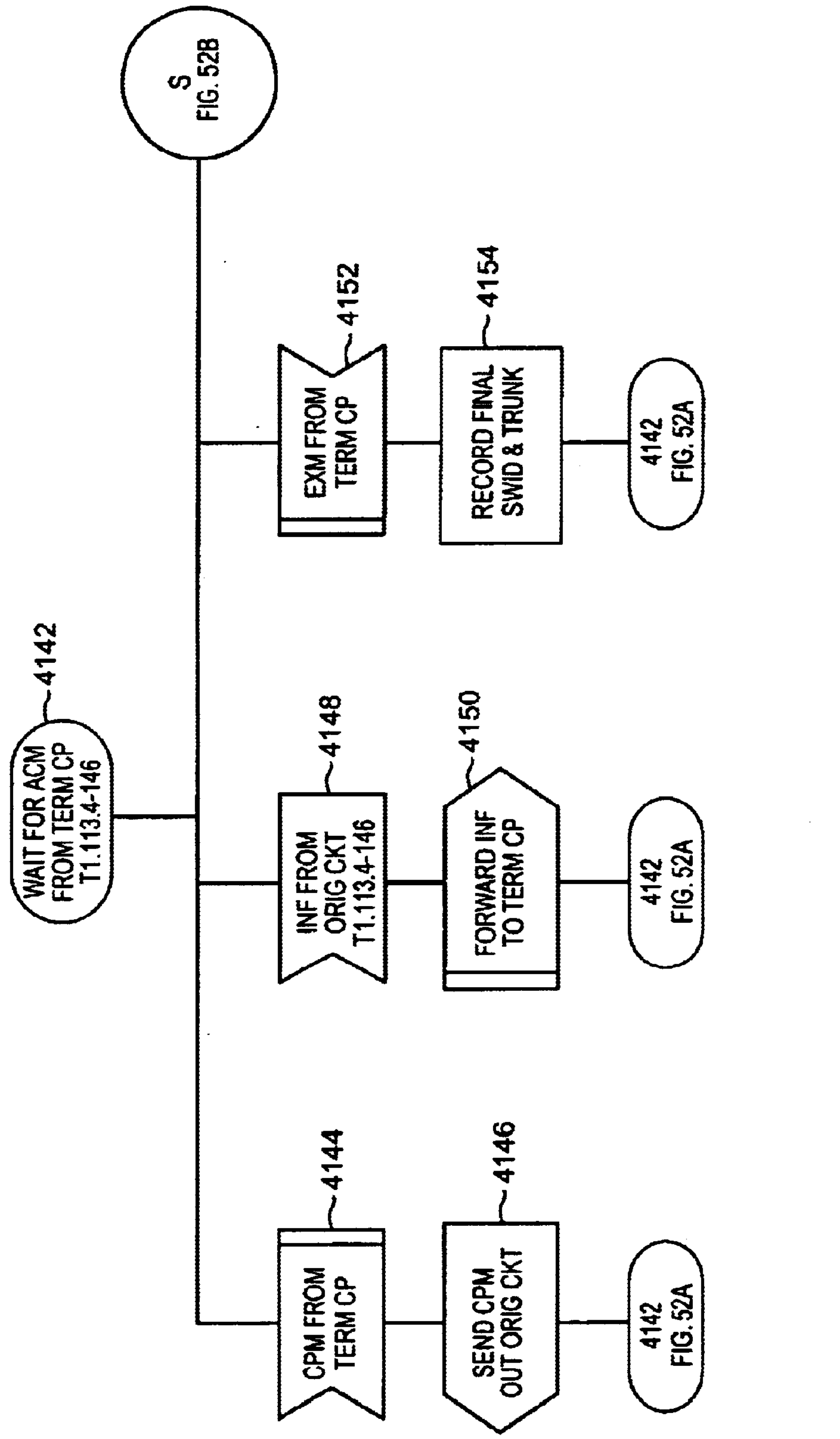
FIGS. 52A–52E are SDL diagrams of logic used in a version of the invention for ANM processing for the origination process.
Figure 52B:
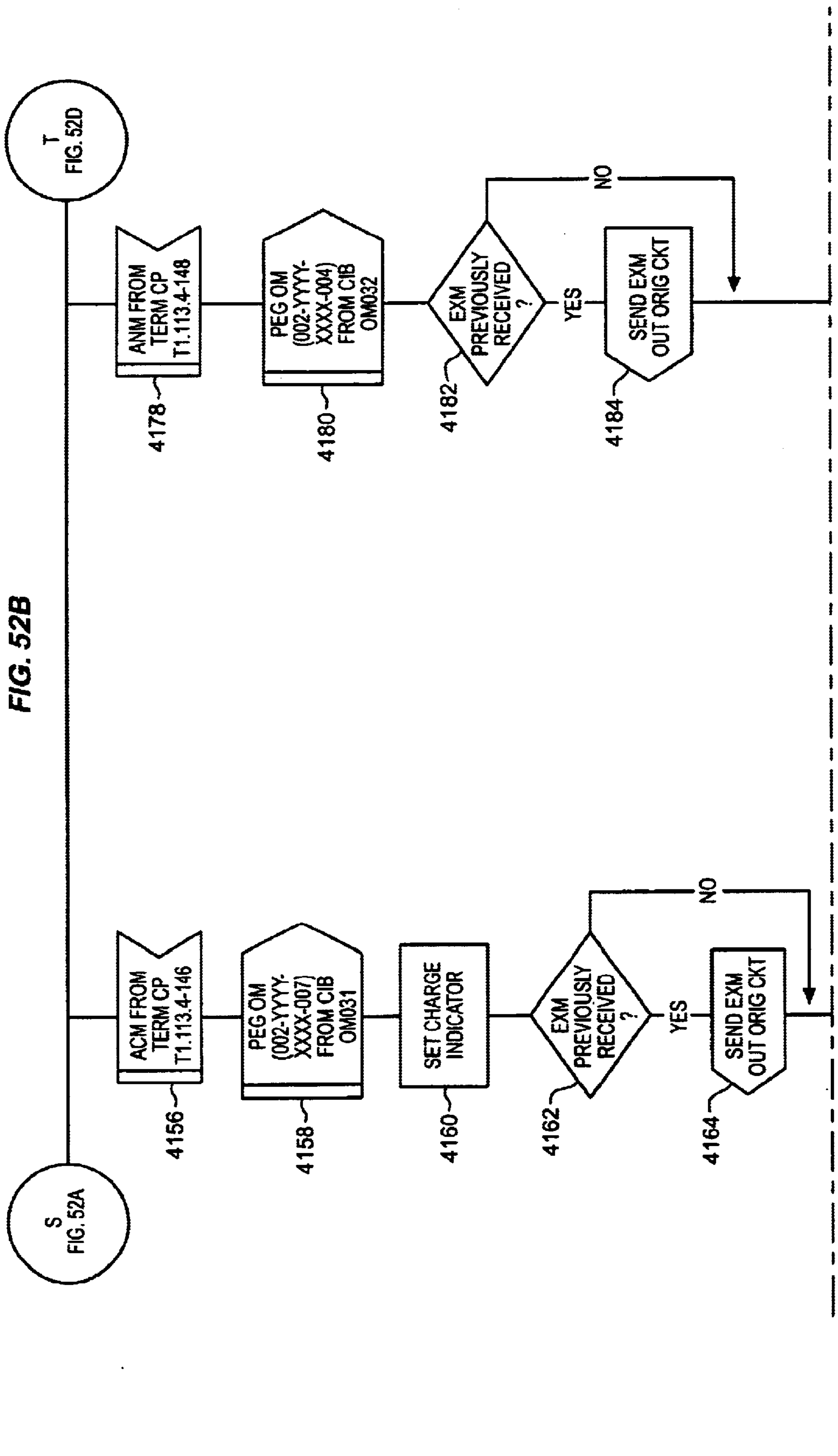
Figure 52C:
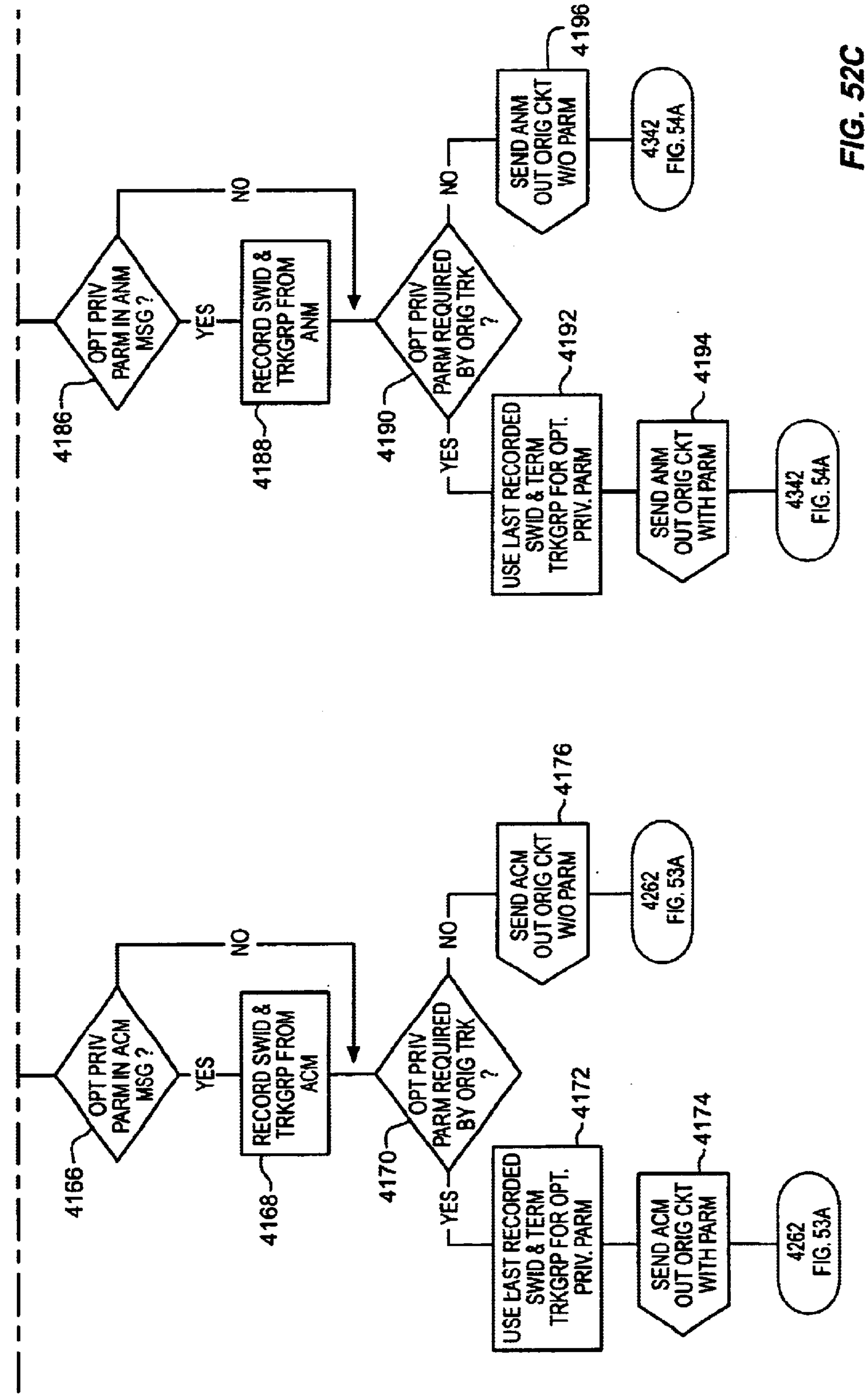
Figure 52D:
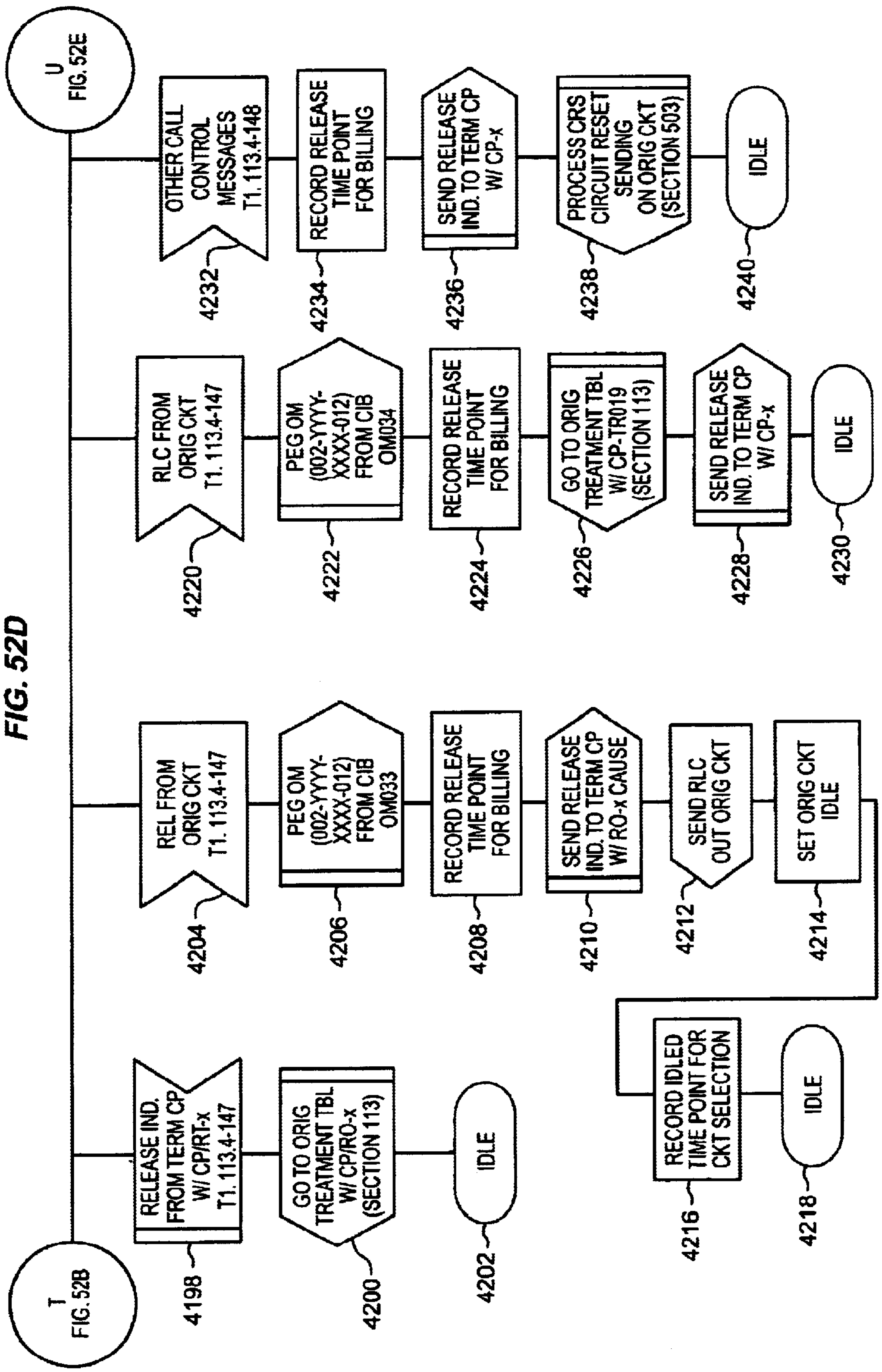
Figure 52E:
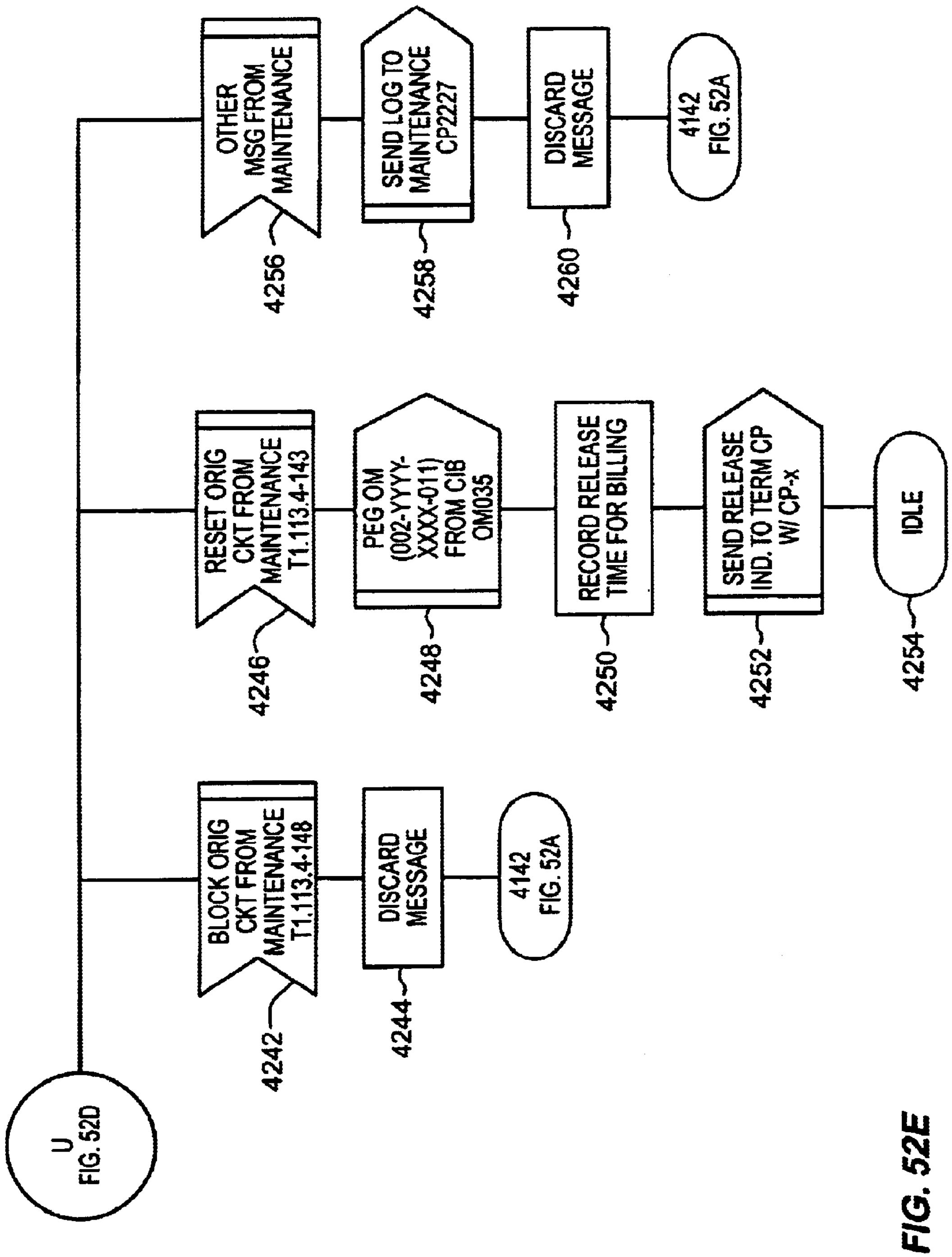

FIGS. 52A depict an example of ANM processing. The process waits for an ACM from the termination call process at 4142. If a call progress message (CPM) is received from the termination call process at 4144, the CPM is sent out the originating circuit at 4146. The process then continues at step 4142.

If an INF is received from the originating circuit at 4148, the INF is forwarded to the termination call process at 4150. The process continues at step 4142.

If an exit message (EXM) is received from the termination call process at 4152, the switch identification (SWID) and the trunk group are recorded at 4154. The process then continues at 4142.

If an ACM is received from the termination call process at 4156, then the OM is pegged at 4158. The charge indicator is set at 4160. If an EXM has been received previously at 4162, the EXM is sent out the originating circuit at 4164. If an EXM has not been received previously at 4162, step 4164 is skipped.

If the optional private parameter is present in the ACM at 4166, the SWID and the trunk group are recorded from the ACM at 4168. After step 4168 or if an optional private parameter is not present in the ACM at 4166, it is determined if an optional private parameter is required by the originating trunk at 4170.

If the optional private parameter is required at 4170, the last recorded SWID and the terminating trunk group are used for the optional private parameters at 4172. An ACM is sent out the originating circuit with the optional private parameters at 4174, and the process continues at step 4262.

If the optional private parameter is not required by the originating trunk at 4170, and ACM is sent out the originating circuit without the optional private parameters at 4176. The process then continues at step 4262.

If an ANM is received from the termination call process at 4178, the OM is pegged at 4180. If an EXM previously has been received at 4182, the EXM is sent out the originating circuit at 4184. After step 4184 or if an EXM previously has not been received at 4182, it is determined if an optional private parameter is present in the ANM at 4186. If an optional private parameter is present in the ANM at 4186, the SWID and the trunk group are recorded from the ANM at 4188. After step 4188 or if the optional private parameter is not present in the ANM at 4186, it is determined if the optional private parameter is required by the originating trunk at 4190.

If the optional private parameter is required at 4190, the last recorded SWID and the terminating trunk group are used for the optional private parameter at 4192. An ANM is sent out the originating circuit with the optional private parameter at 4194. The process then continues at step 4342.

If the optional private parameter is not required at 4190, an ANM is sent out the originating circuit without the optional private parameter at 4196. The process then continues at step 4342.

If a release indicator is received from the termination call process at 4198, the process is sent to the treatment table at 4200. Idle then is attained at 4202.

If an REL is received from the originating circuit at 4204, the OM is pegged at 4206. The release time point is recorded for billing at 4208, and a release indicator is sent to the termination call process at 4210. An RLC is sent out the originating circuit at 4212, and the originating circuit is set to idle at 4214. The idled time point for the circuit selection is recorded at 4216, and idle is attained at 4218.

If an RLC is received from the originating circuit at 4220, the OM is pegged at 4222. The release time point is recorded for billing at 4224, and the process is sent to the treatment table at 4226. A release indicator is sent to the termination call process at 4228, and idle is attained at 4230.

If other call control messages are received at 4232, the release time point is recorded for billing at 4234. A release indicator is sent to the termination call process at 4236. The CRS process is started on the originating circuit at 4238, and idle is attained at 4240.

If a block for the originating circuit is received from maintenance at 4242, the message is discarded at 4244. The process then continues at step 4142.

If a reset for the originating circuit is received from maintenance at 4246, the OM is pegged at 4248. The release time is recorded for billing at 4250, and a release indicator is sent to the termination call process at 4252 so that that the termination call process will release the mux. Idle then is attained at 4254.

If other messages are received from maintenance at 4256, a log is sent to maintenance at 4258. The message is discarded at 4260. The process then continues at step 4142.

ANM Processing for the Origination Process

Figure 53A:
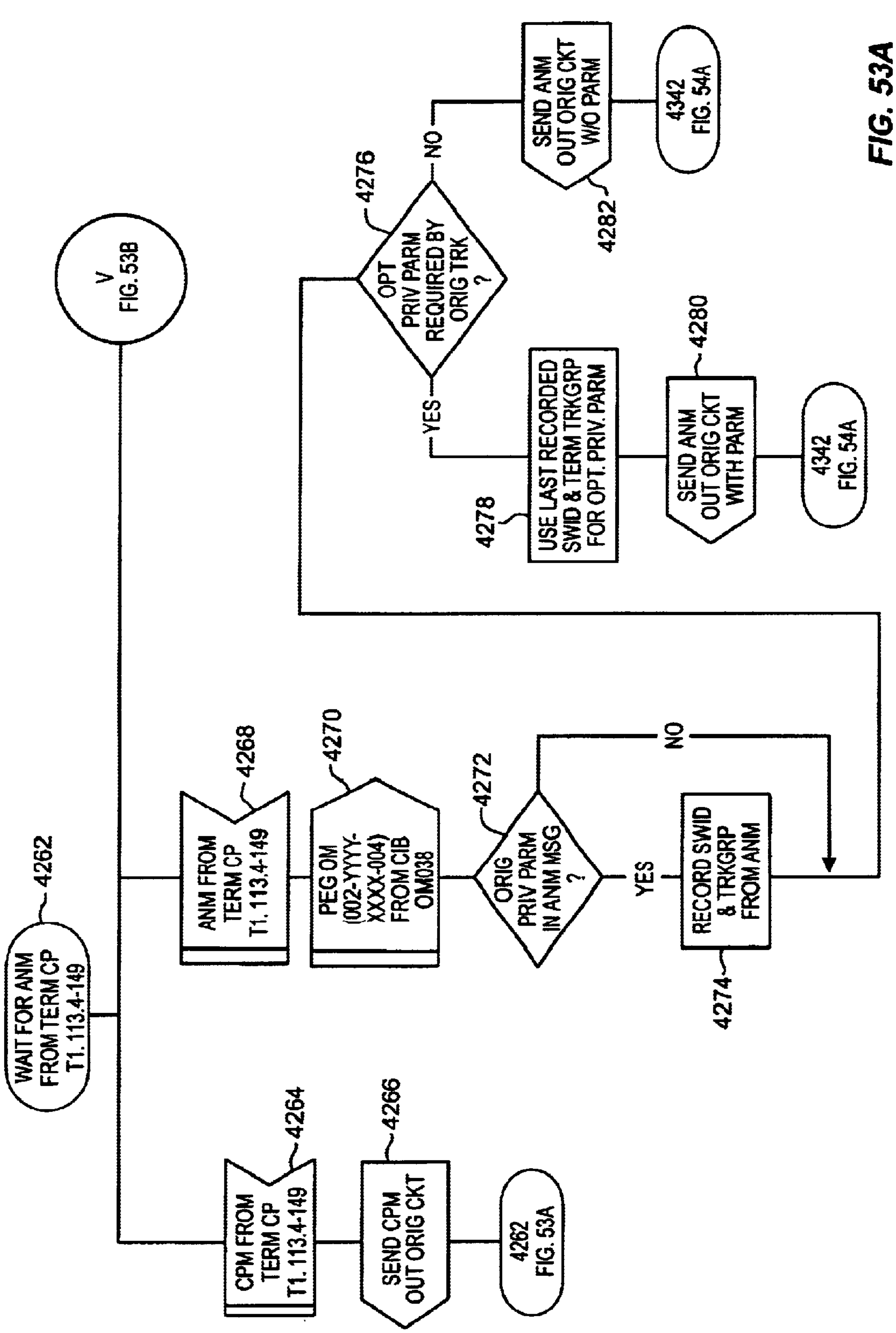
FIGS. 53A–53C are SDL diagrams of logic used in a version of the invention for processing ANM from the termination process.
Figure 53B:
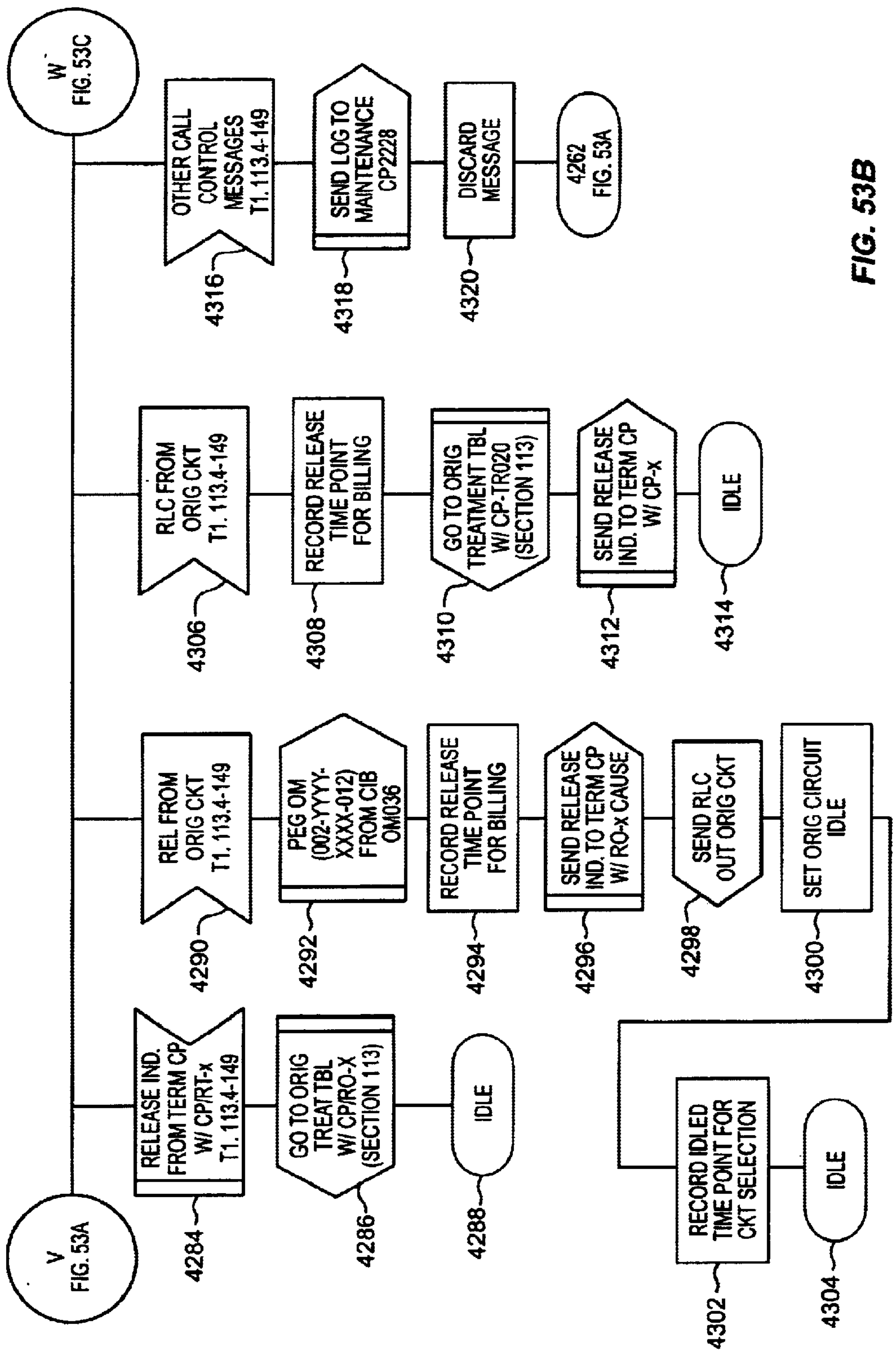
Figure 53C:
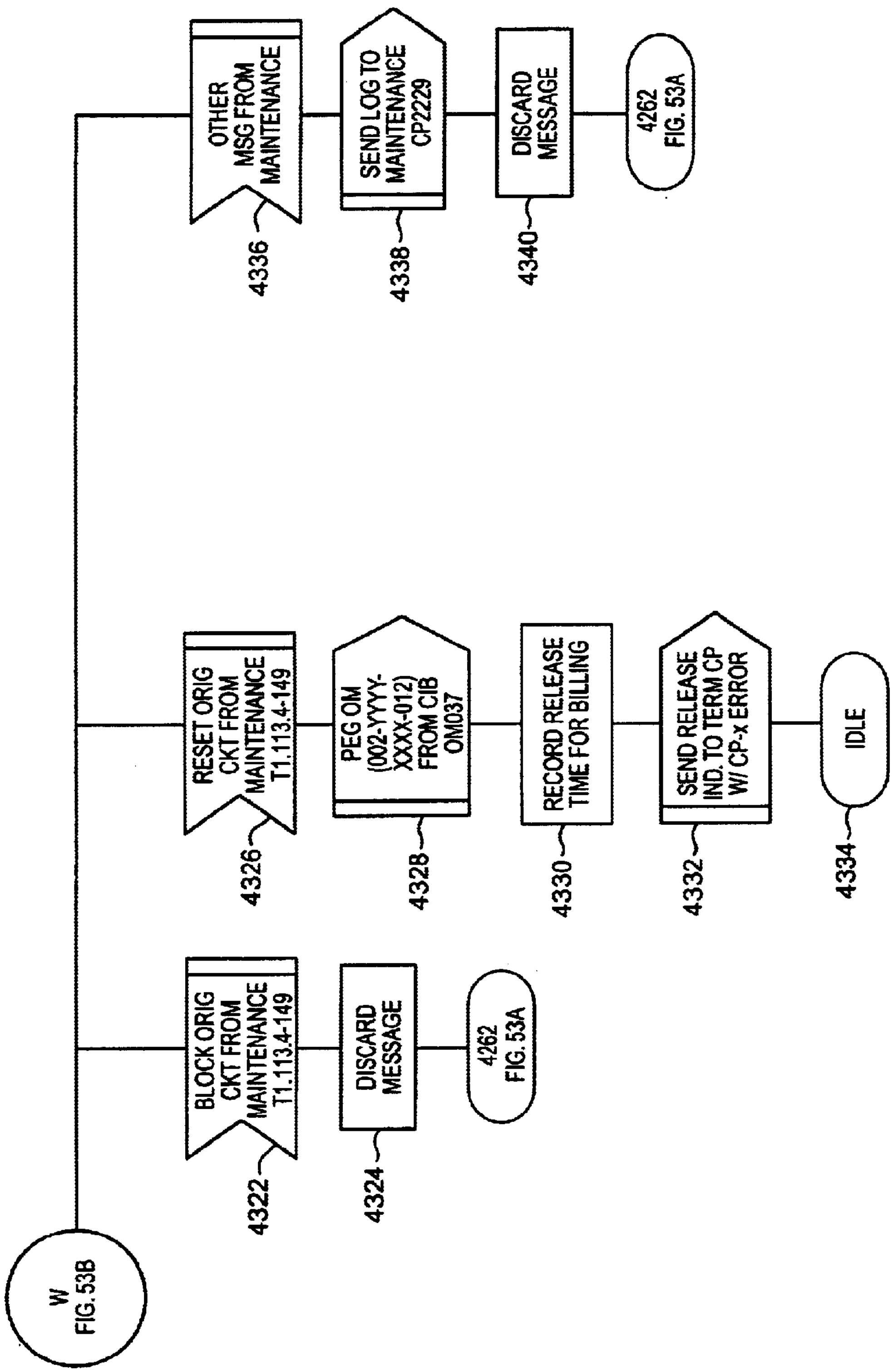

FIGS. 53A–53C depict an example of processing an ANM from the termination call process. At 4262, the process is waiting for an ANM from the termination call process. If a CPM is received from the termination call process at 4264, the CPM is sent out the originating circuit at 4266. The process then continues at step 4262.

If an ANM is received from the termination call process at 4268, the OM is pegged at 4270. If an optional private parameter is present in the ANM at 4272, the SWID and the trunk group from the ANM are recorded at 4274. After step 4274 or if the optional private parameter is not present in the ANM at 4272, it is determined if the optional private parameter is required by the originating trunk at 4276. At this point, the message mapping of the originating trunk group is checked to see if the optional private parameter is required in the message sent or forwarded by the origination call process. If the optional private parameter is required at 4276, the last recorded SWID and the terminating trunk group are used for the optional private parameter at 4278. An ANM is sent out the originating circuit with the optional private parameters at 4280. The process then continues at step 4342.

If the optional private parameter is not required at 4276, an ANM is sent out the originating circuit without the optional private parameters at 4282. The process then continues at step 4342.

If a release indicator is received from the termination call process at 4284, the process is sent to the treatment table at 4286. Idle then is attained at 4288.

If an REL is received from the originating circuit at 4290, the OM is pegged at 4292. The release time point is recorded for billing at 4294, and the release indicator is sent to the termination call process at 4296. At this point, the termination call process releases the mux. An RLC is sent out the originating circuit at 4298, and the originating circuit is set to idle at 4300. The idle time point for the circuit selection is recorded at 4302, and idle is attained at 4304.

If an RLC is received from the originating circuit at 4306, the release time point is recorded for billing at 4308. The process is sent to the treatment table at 4310. A release indicator is sent to the termination call process at 4312 so that the termination call process will release the mux. Idle is attained at 4314.

If other call control messages are received at 4316, a log is sent to maintenance at 4318. The message is discarded at 4320. The process then continues at step 4262.

If a block for the originating circuit is received from maintenance at 4322, the message is discarded at 4324. The process then continues at step 4262.

If a reset is received for the originating circuit from maintenance at 4326, the OM is pegged at 4328. The release time point is recorded for billing at 4330. A release indicator is sent to the termination call process at 4332 so that the termination call process releases the mux. Idle then is attained at 4334.

If other messages are received from maintenance at 4336, a log is sent to maintenance at 4338. The message is discarded at 4340, and the process continues at step 4262.

Originating Call Answered Processing

Figure 54A:
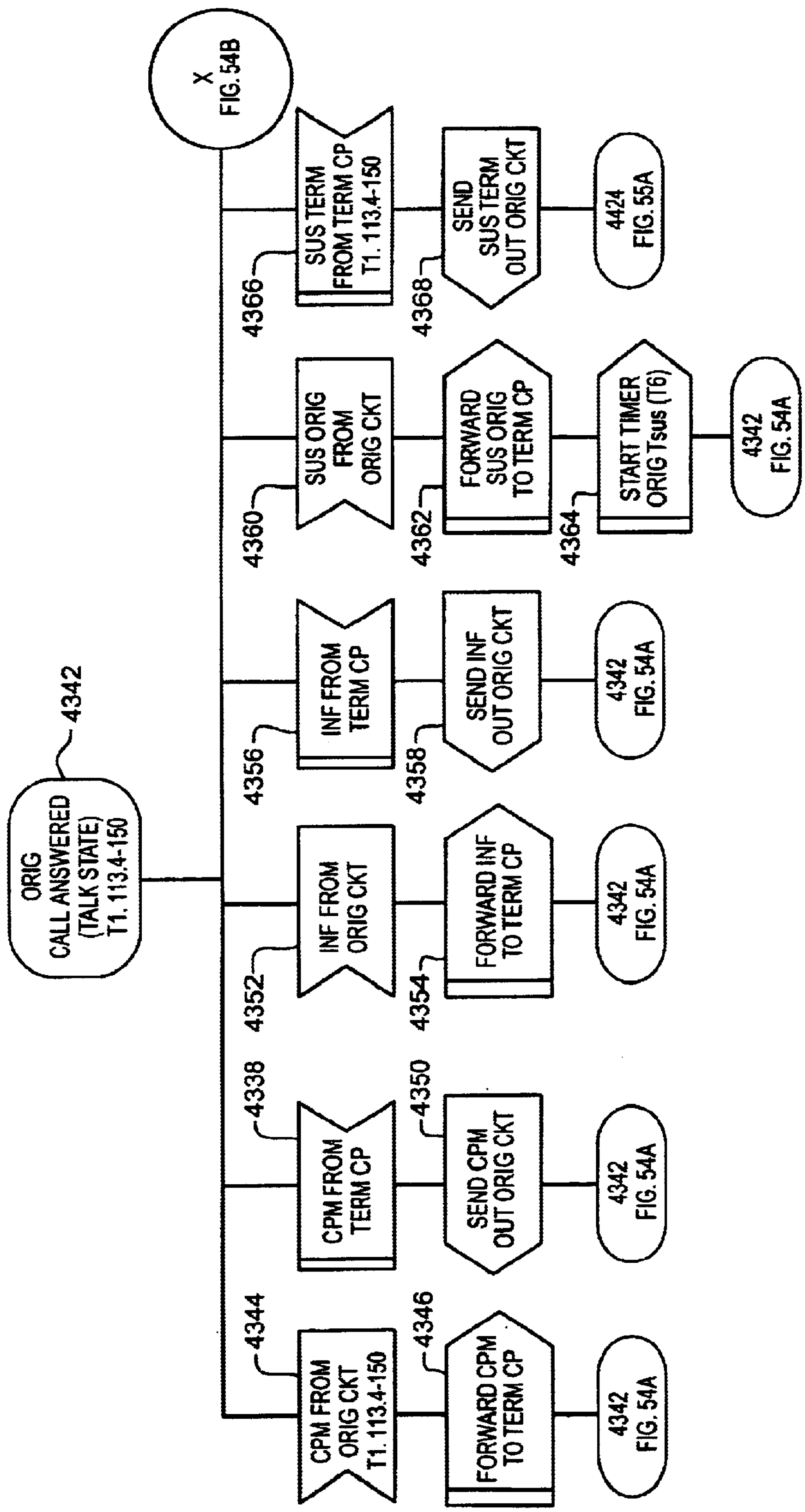
FIGS. 54A–54C are SDL diagrams of logic used in a version of the invention for originating call answered processing.
Figure 54B:
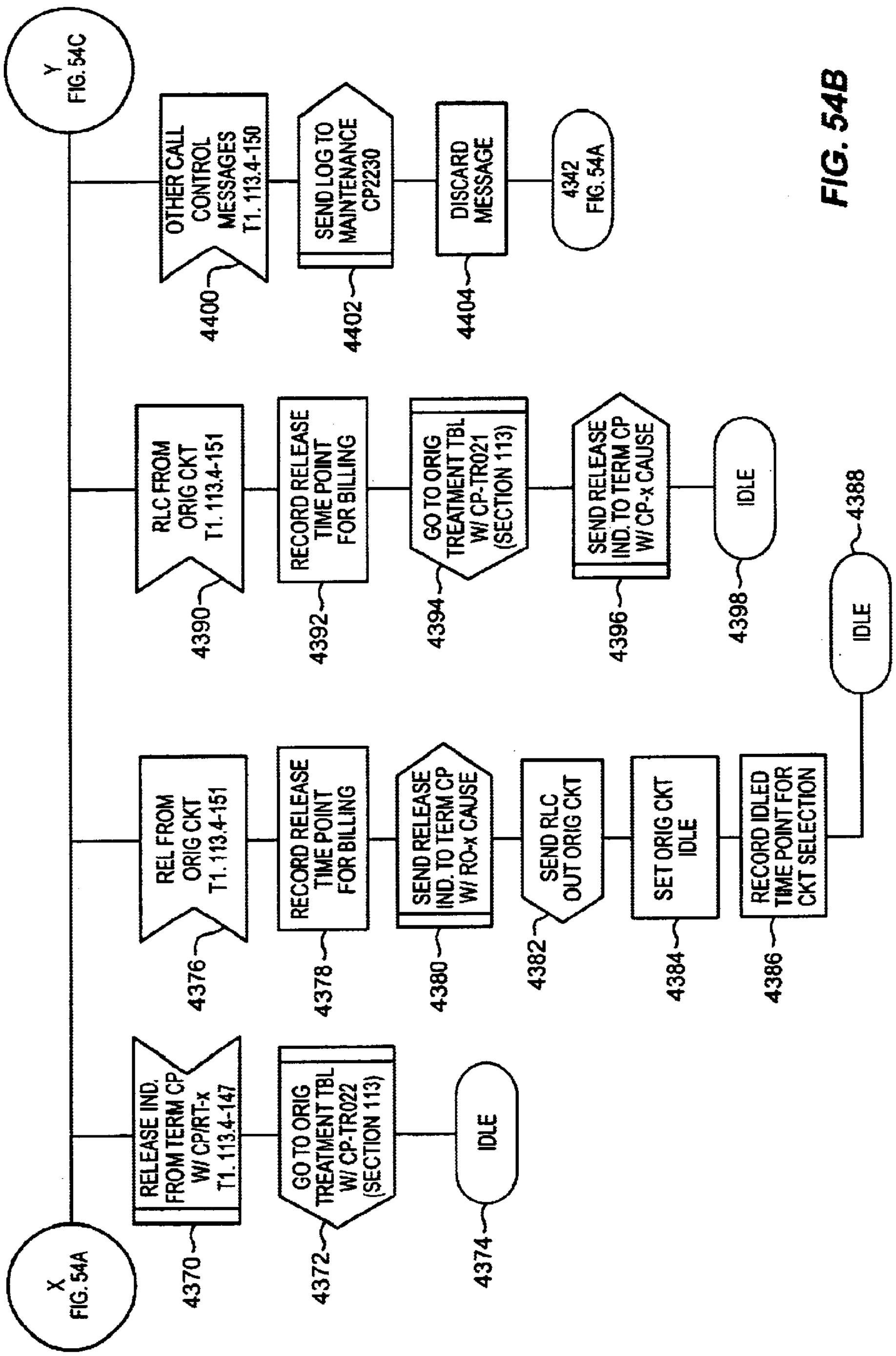
Figure 54C:
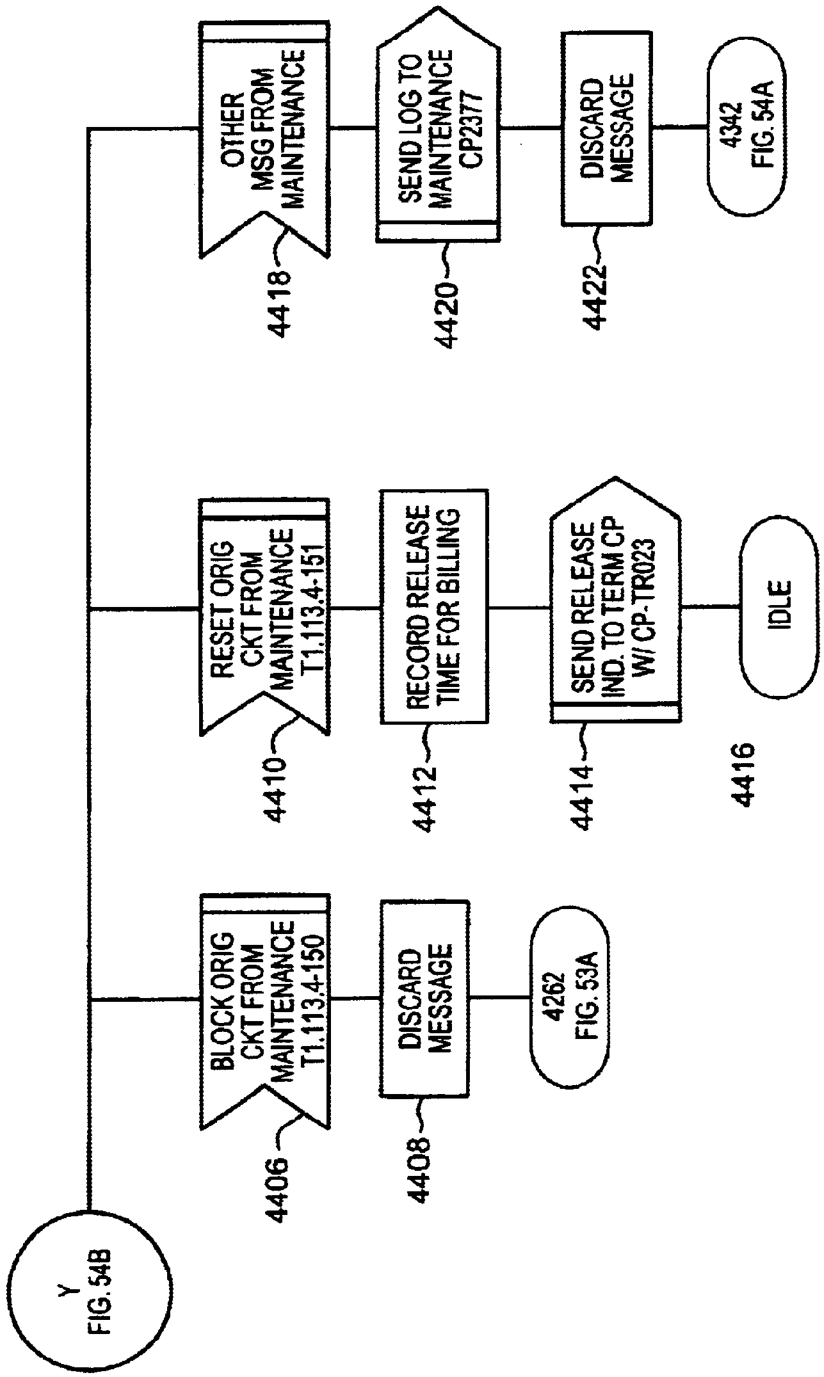

FIGS. 54A–54C depict an example of processing when the originating call is answered. At step 4342 the originating call is answered so that the call is in the talk state. If a CPM is received from the originating circuit at 4344, the CPM is forwarded to the termination call process at 4346. The process then continues at step 4342.

If a CPM is received from the termination call process at 4348, the CPM is sent out the originating circuit at 4350. The process then continues at 4342.

If an INF is received from the originating circuit at 4352, the INF is forwarded to the termination call process at 4354. The process then continues at 4342.

If an INF is received from the termination call process at 4356, the INF is sent out the originating circuit at 4358. The process then continues at step 4342.

If an SUS is received from the originating circuit at 4360, the SUS is forwarded to the termination call process at 4362. The originating suspend timer Tsus (T6) is started at 4364, and the process continues at step 4342.

If an SUS for the terminating circuit is received from the termination call process at 4366, the SUS for the terminating circuit is sent out the originating circuit at 4368. The process then continues at step 4424.

If a release indicator is received from the termination call process at 4370, the process is sent to the treatment table at 4372. Idle then is attained at 4374.

If an REL is received from the originating circuit at 4376, the release time point is recorded for billing at 4378. A release indicator is sent to the termination call process at 4380 so that the termination call process releases the mux. An RLC is sent out the originating circuit at 4382, and the originating circuit is set to idle at 4384. The idled time point for circuit selection is recorded at 4386, and idle is attained at 4388.

If an RLC is received from the originating circuit at 4390, the release time point is recorded for billing at 4392. The process is sent to the treatment table at 4394. The release indicator is then sent to the termination call process at 4396, and idle is attained at 4398.

If other call control messages are received at 4400, a log is sent to maintenance at 4402. The message is discarded at 4404, and the process continues at step 4342.

If a block for the originating circuit is received from maintenance at 4406, the message is discarded at 4408. The process then continues at step 4342.

If a reset for the originating circuit is received from maintenance at 4410, the release time is recorded for billing at 4412. A release indicator is sent to the termination call process at 4414 so that the termination call process releases the mux. Idle then is attained at 4416.

If other messages are received from maintenance at 4418, a log is sent to maintenance at 4420. The message is discarded at 4422, and the process continues at step 4342.

Originating Circuit Suspended Processing

Figure 55A:
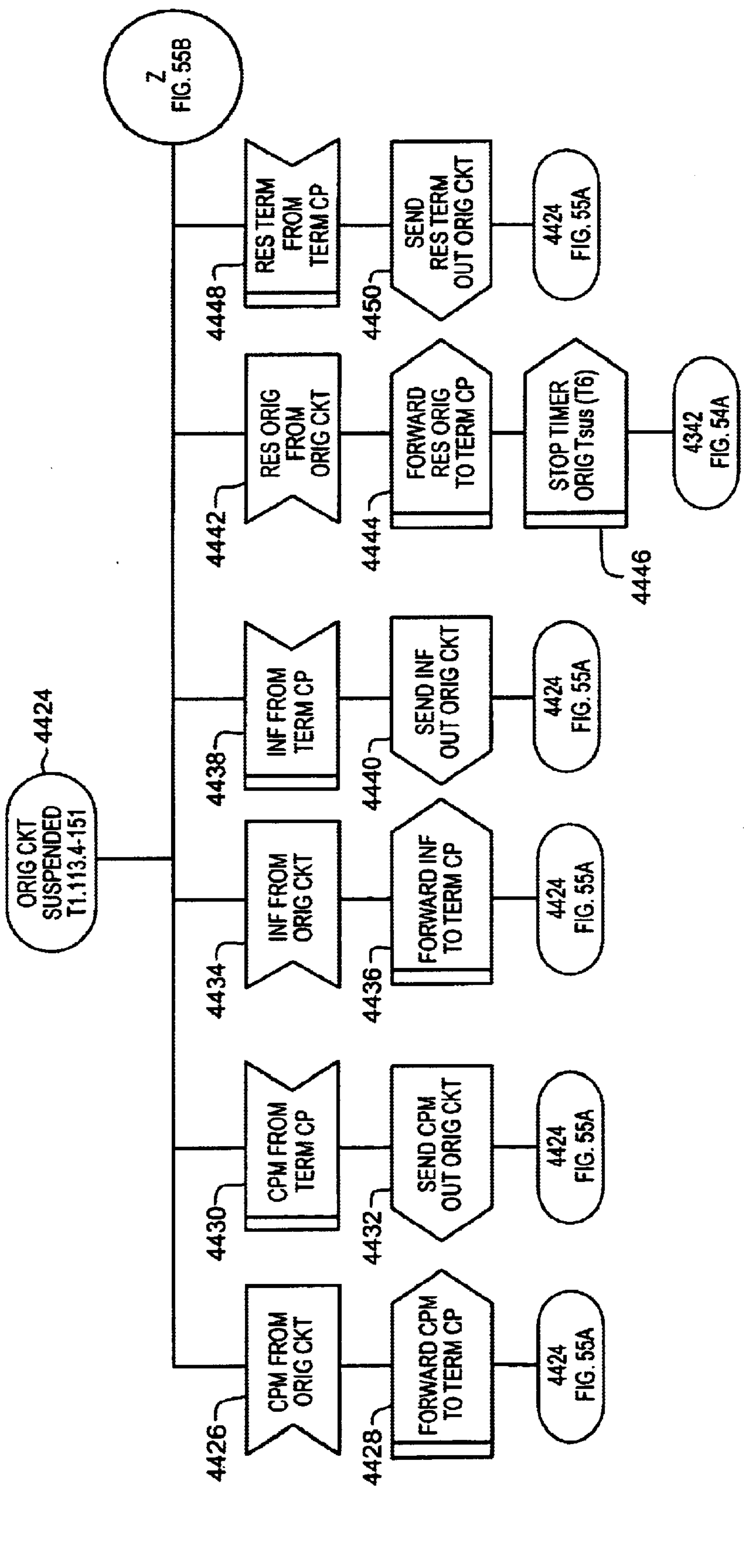
FIGS. 55A–55C are SDL diagrams of logic used in a version of the invention for originating circuit suspended processing.
Figure 55B:
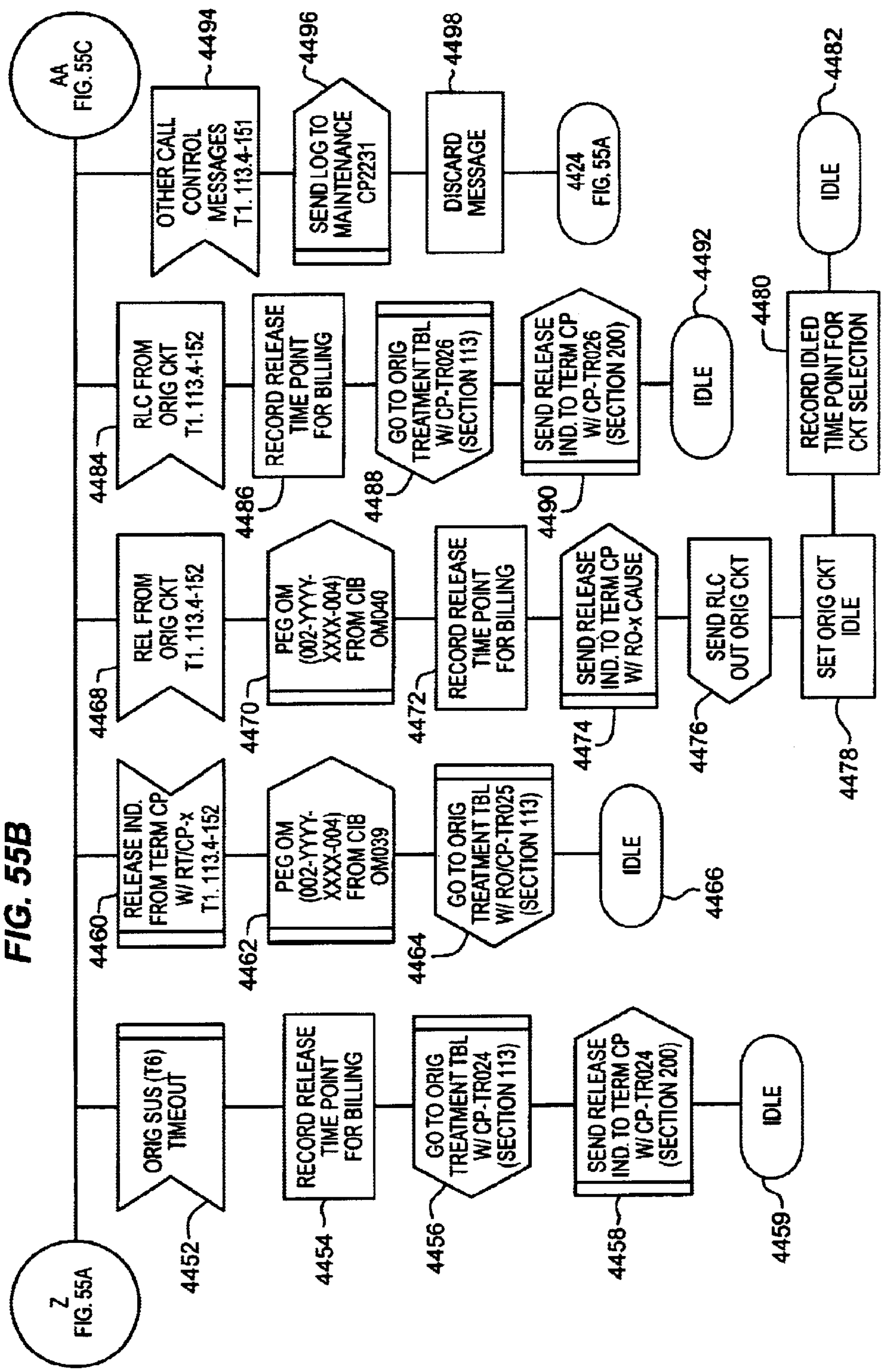
Figure 55C:
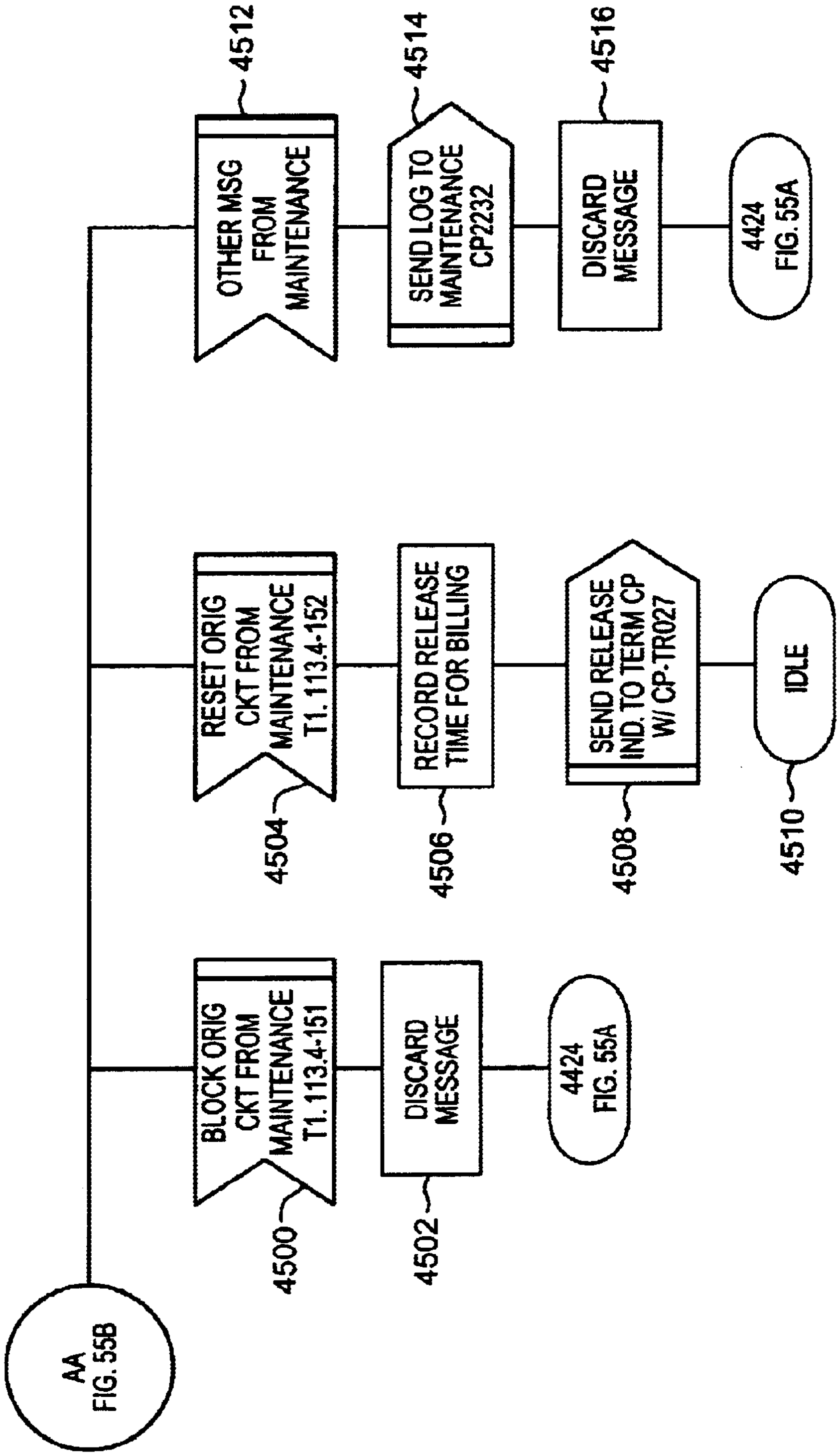

FIGS. 55A–55C depict an example of processing when the originating circuit is suspended. At step 4424, the originating circuit is suspended. If a CPM is received from the originating circuit at 4426, the CPM is forwarded to the termination call process at 4428. The process then continues at step 4424.

If a CPM is received from the termination call process at 4430, the CPM is sent out the originating circuit at 4432. The process then continues at step 4424.

If an INF is received from the originating circuit at 4434, the INF is forwarded to the termination call process at 4436. The process then continues at step 4424.

If an INF is received from the termination call process at 4438, the INF is sent out the originating circuit at 4440. The process then continues at step 4424.

If an RES for the originating circuit is received from the originating circuit at 4442, the RES for the originating circuit is forwarded to the termination call process at 4444. The origination process suspend timer Tsus (T6) is stopped at 4446. The process then continues at step 4342.

If an RES for the terminating circuit is received from the termination call process at 4448, the RES for the terminating circuit is sent out the originating circuit at 4450. The process then continues at step 4424.

If an SUS timer for the originating process times out at 4452, the release time point is recorded for billing at 4454. The process is sent to the treatment table at 4456, and a release indicator is sent to the termination call process at 4458. Idle then is attained at 4459.

If a release indicator is received from the termination call process at 4460, the OM is pegged at 4462. The process is sent to the treatment table at 4464, and idle is attained at 4466.

If an REL is received from the originating circuit at 4468, the OM is pegged at 4470. The release time point is recorded for billing at 4472, and the release indicator is sent to the termination call process at 4474. An RLC is sent out the originating circuit at 4476, and the originating circuit is set to idle at 4478. The idle time point for circuit selection is recorded at 4480. Idle then is attained at 4482.

If an RLC is received from the originating circuit at 4484, the release time point is recorded for billing at 4486. The process is sent to the treatment table at 4488. The release indicator is sent to the termination call process at 4490, and idle is attained at 4492.

If other call control messages are received at 4494, a log is sent to maintenance at 4496. The message is discarded at 4498. The process then continues at step 4424.

If a blocking message for the originating circuit is received for maintenance at 4500, the message is discarded at 4502. The process then continues at 4424.

If a reset for the originating circuit is received from maintenance at 4504, the release time is recorded for billing at 4506. A release indicator is sent to the termination call process at 4508, and idle is attained at 4510.

If other messages are received for maintenance at 4512, a log is sent to maintenance at 4514. The message is discarded at 4516, and the process continues at step 4424.

Processing an RLC from the Originating Circuit

Figure 56A:
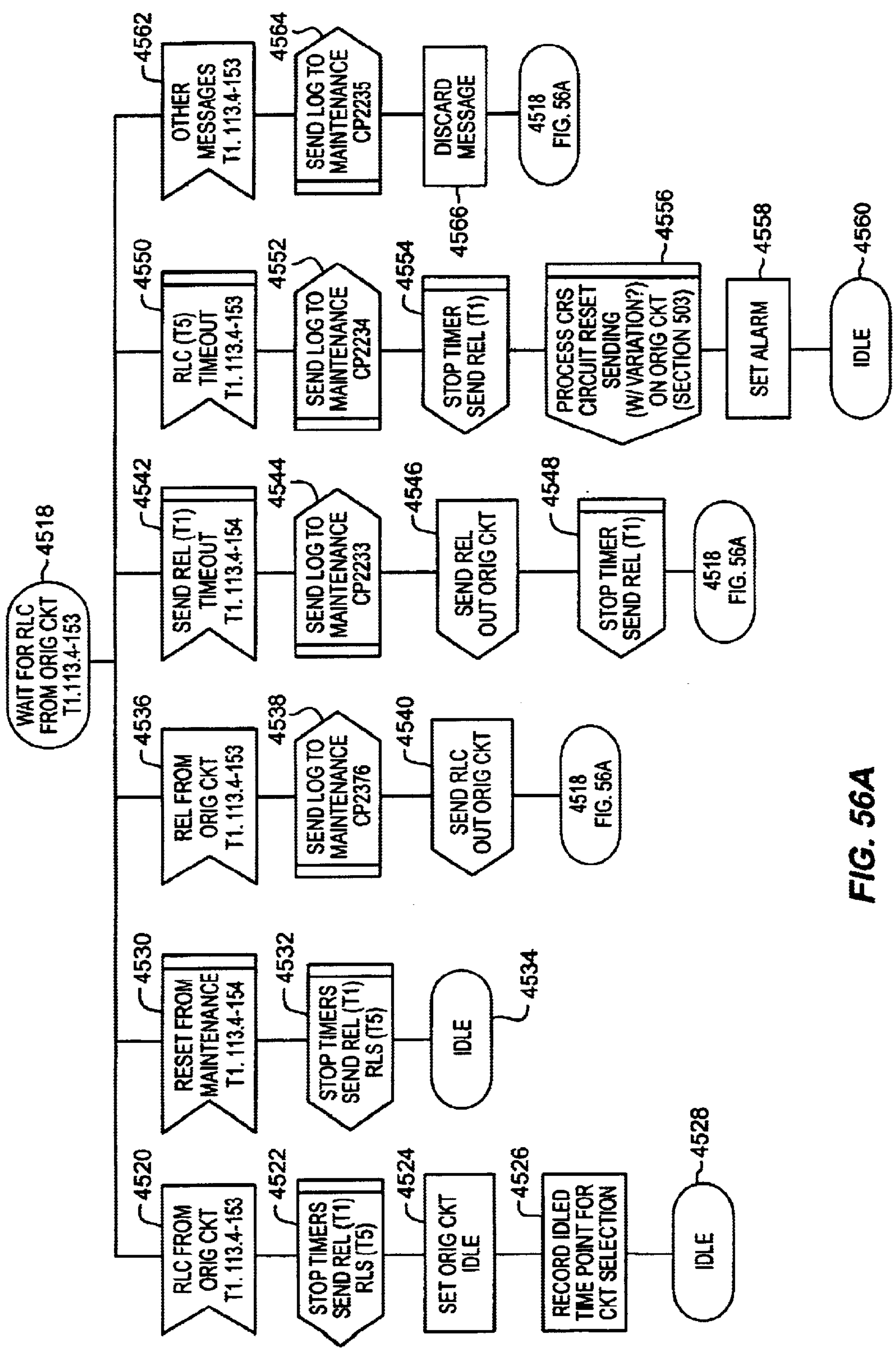
FIGS. 56A–56C are SDL diagrams of logic used in a version of the invention for processing an RLC for the origination process.
Figure 56B:
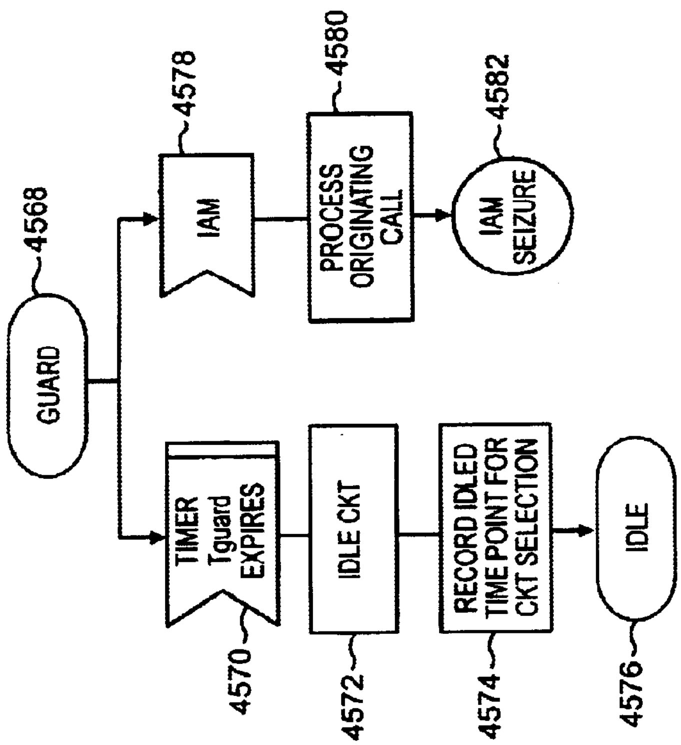
Figure 56C:
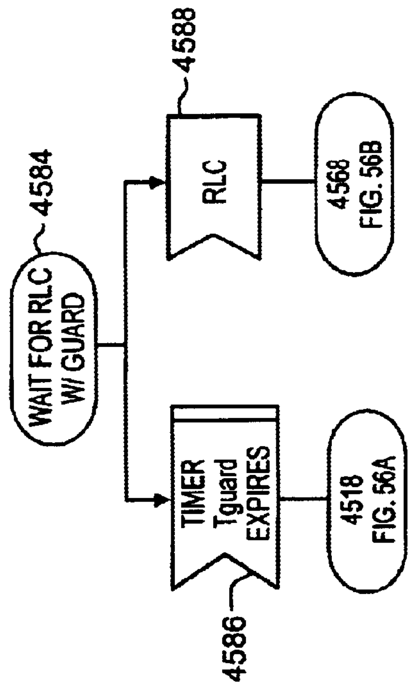

FIGS. 56A–56C depict processing an RLC from the originating circuit. At step 4518, the process is waiting for an RLC from the originating circuit. If an RLC is received from the originating circuit at 4520, the send REL timer (T1) and the RLS timer (T5) are stopped at 4522. The originating circuit is set to idle at 4524, and the idle time point for circuit selection is recorded at 4526. Idle then is attained at 4528.

If a reset is received from maintenance at 4530, the REL timer (T1) and the RLS timer (T5) are stopped at 4532. Idle then is attained at 4534.

If an REL is received from the originating circuit at 4536, a log is sent to maintenance at 4538. An RLC is sent out the originating circuit at 4540. The process then continues at 4518.

If the send REL timer (T1) times out at 4542, a log is sent to maintenance at 4544. A REL is sent out the originating circuit at 4546, and the send REL timer (T1) is started at 4548. The process then continues at step 4518.

If the RLC timer (T5) times out at 4550, then a log is sent to maintenance at 4552. If the send REL timer (T1) times out at 4554, the CRS process is started for the originating circuit at 4556. An alarm is set at 4558, and idle is attained at 4560.

If other messages are received at 4562, a log is sent to maintenance at 4564. The message is discarded at 4566. The process then continues at step 4518.

The guard process for the RLC processing starts at 4568. If the guard tinier Tguard expires at 4570, the circuit is idle at 4572. The idle time point for circuit selection is recorded at 4574, and idle is attained at 4576. If an IAM is received at 4578, the origination call process is started at 4580. The IAM seizure process is started at 4582.

At step 4584, the process is waiting for an RLC while using the guard process. If the guard timer Tguard expires at 4586, the process continues at 4518. If while waiting for an RLC with a guard at 4584, an RLC is received at 4588, the guard process is started at 4568.

Treatment and Release Tables for the Origination Call Process

Figure 57A:
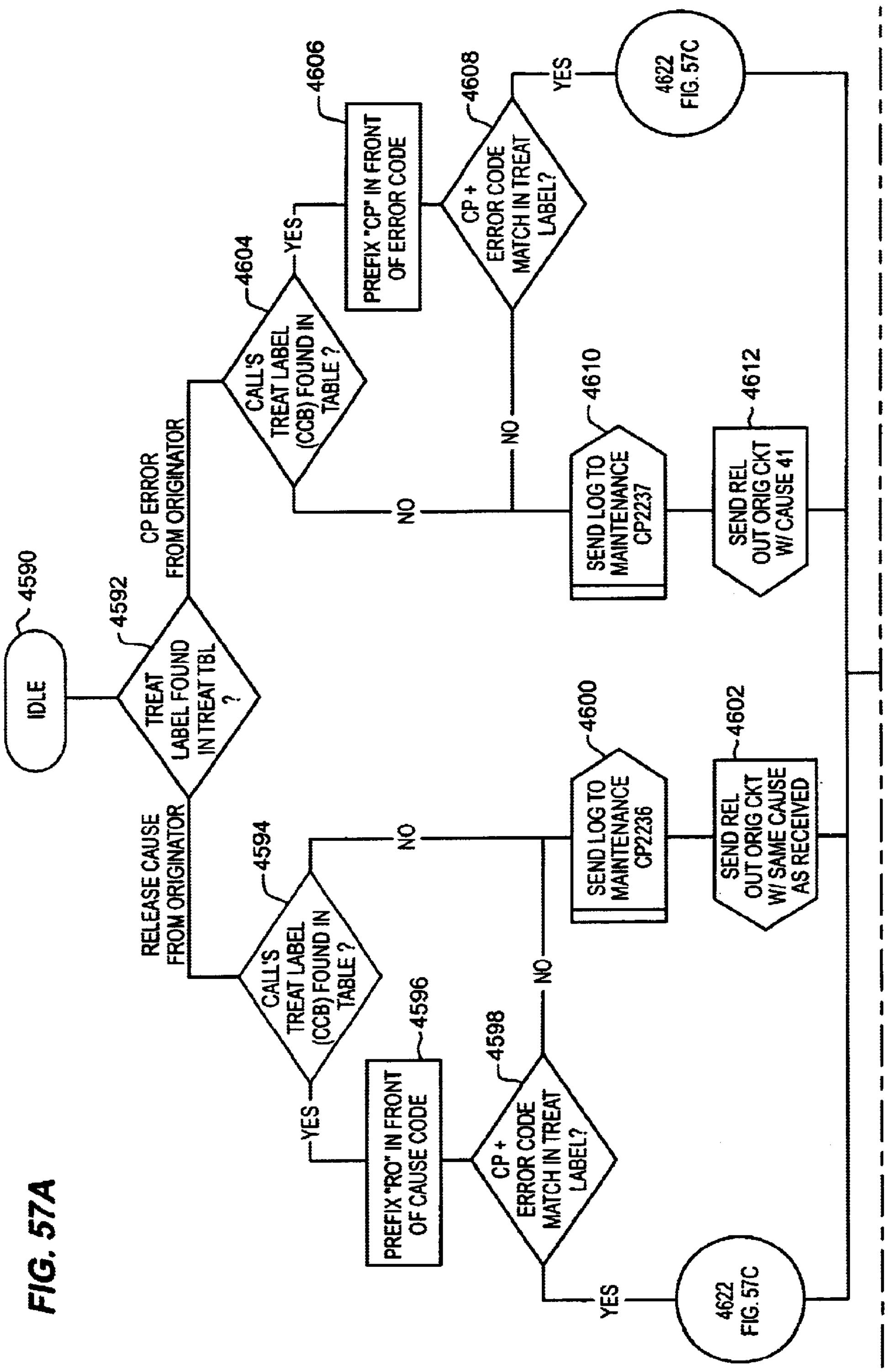
FIGS. 57A–57C are SDL diagrams of logic used in a version of the invention for treatment and release tables for the origination process.
Figure 57B:
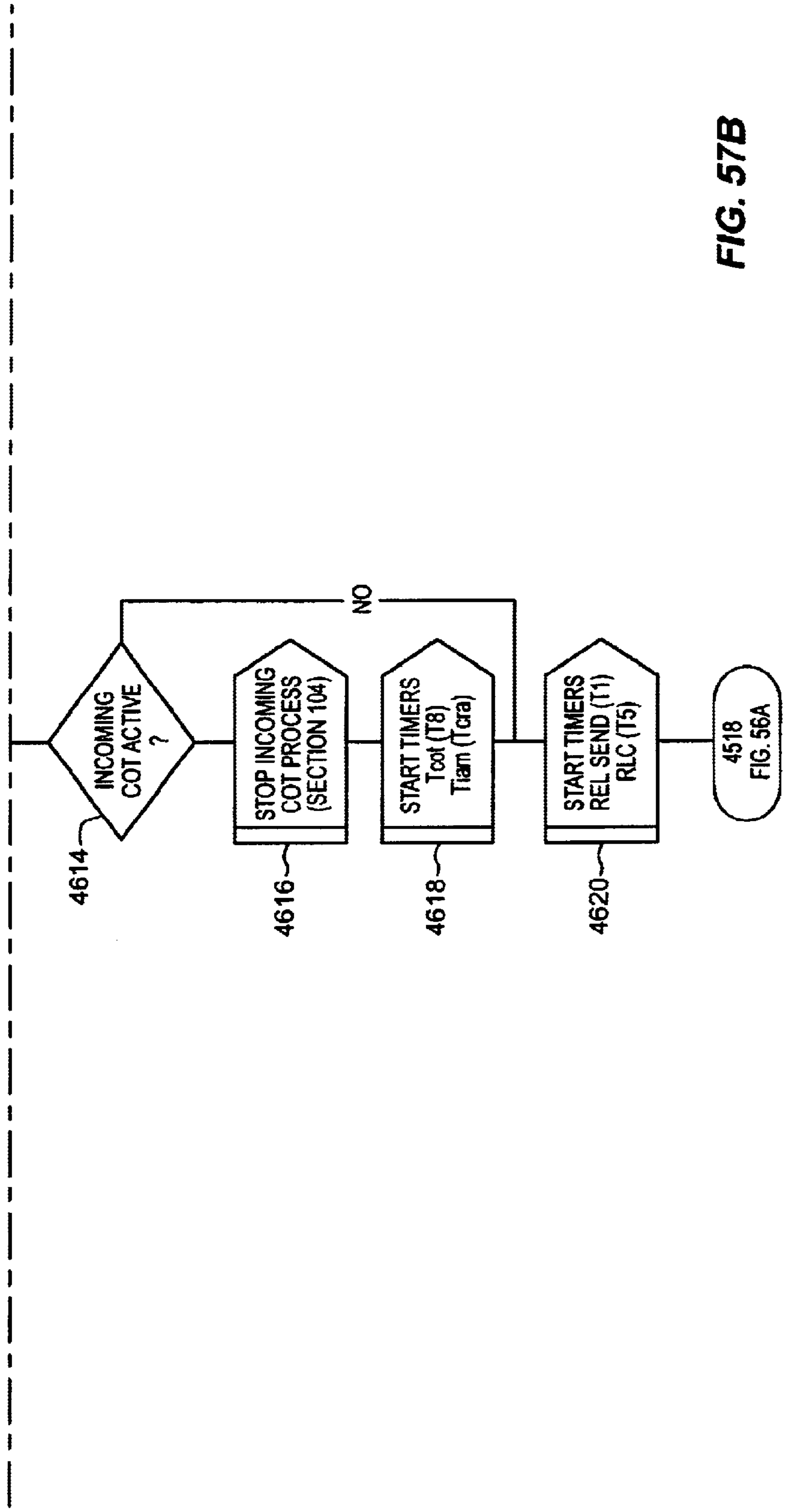
Figure 57C:
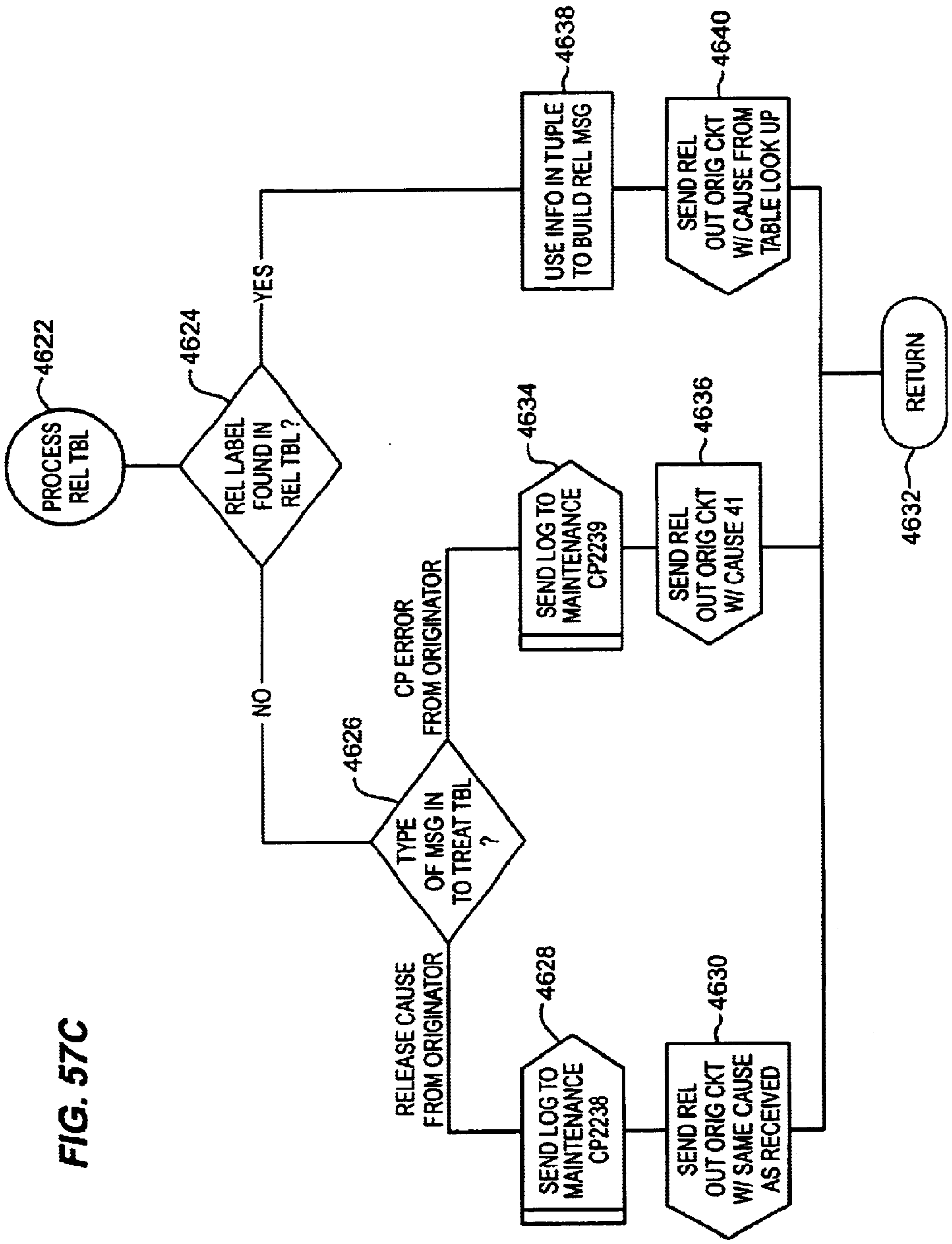
Figure 58A:
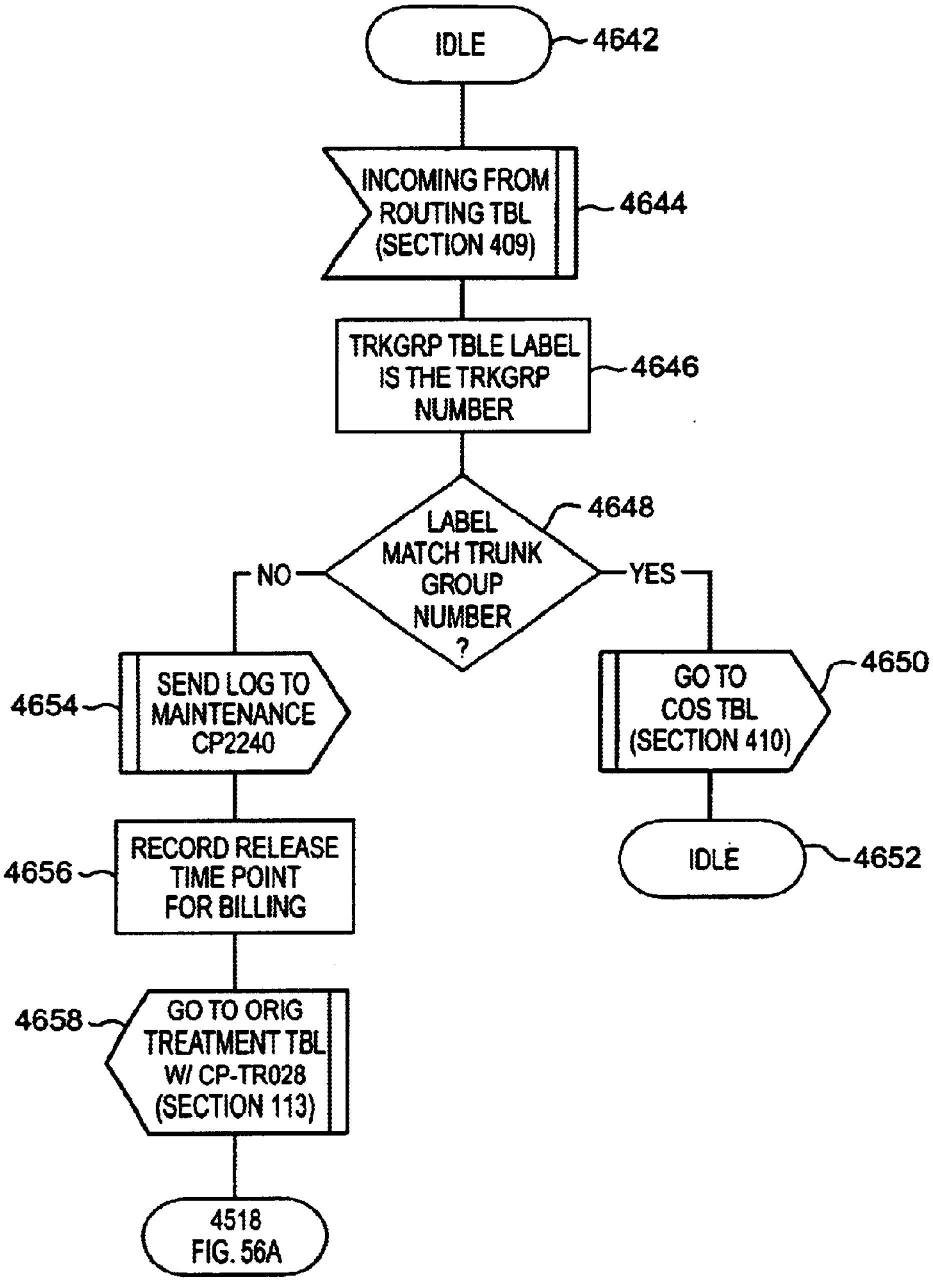
FIGS. 58A–58D are SDL diagrams of logic used in a version of the invention for terminating trunk group selection processing.
Figure 58B:
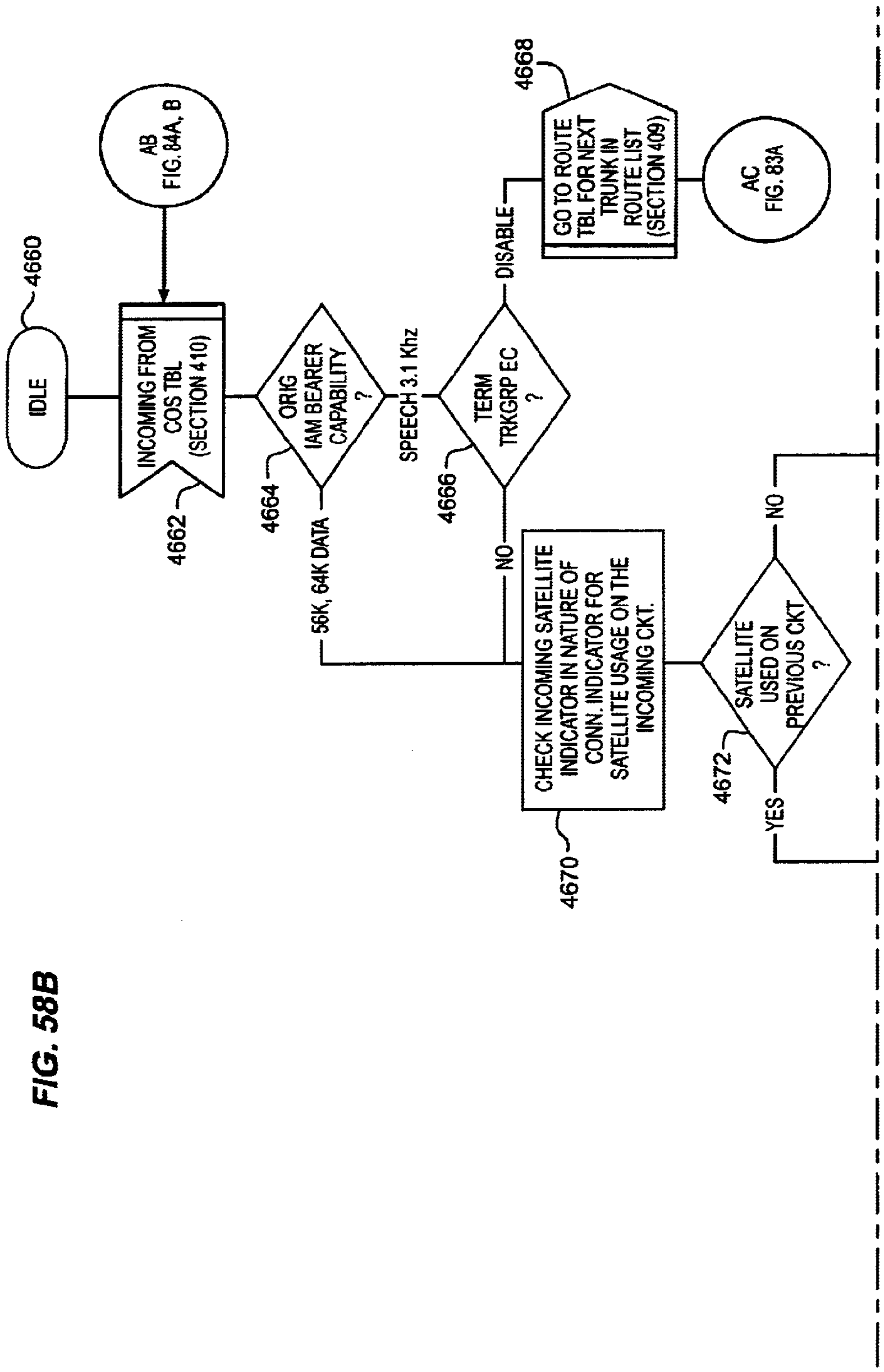
Figure 58C:
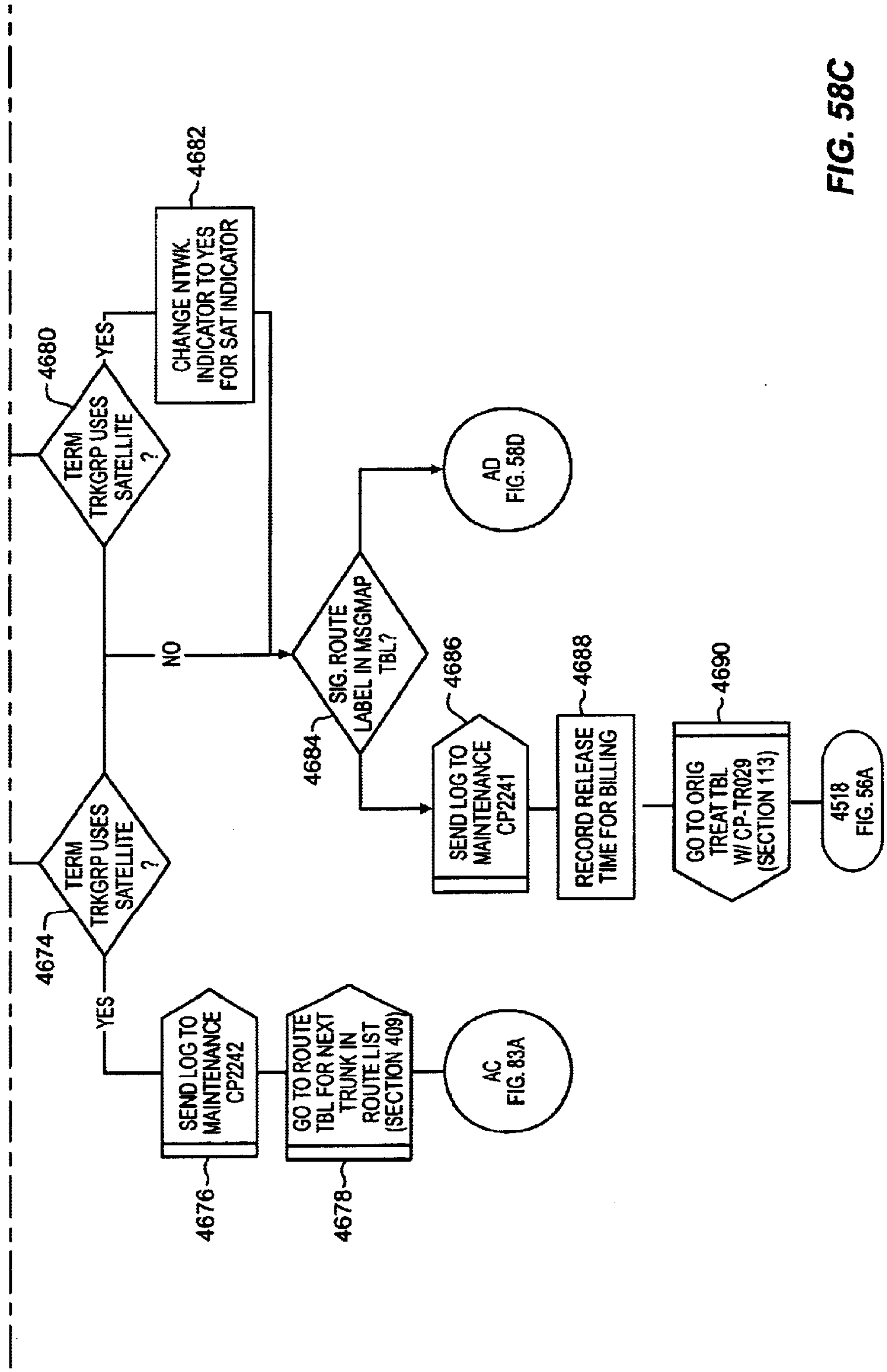
Figure 58D:
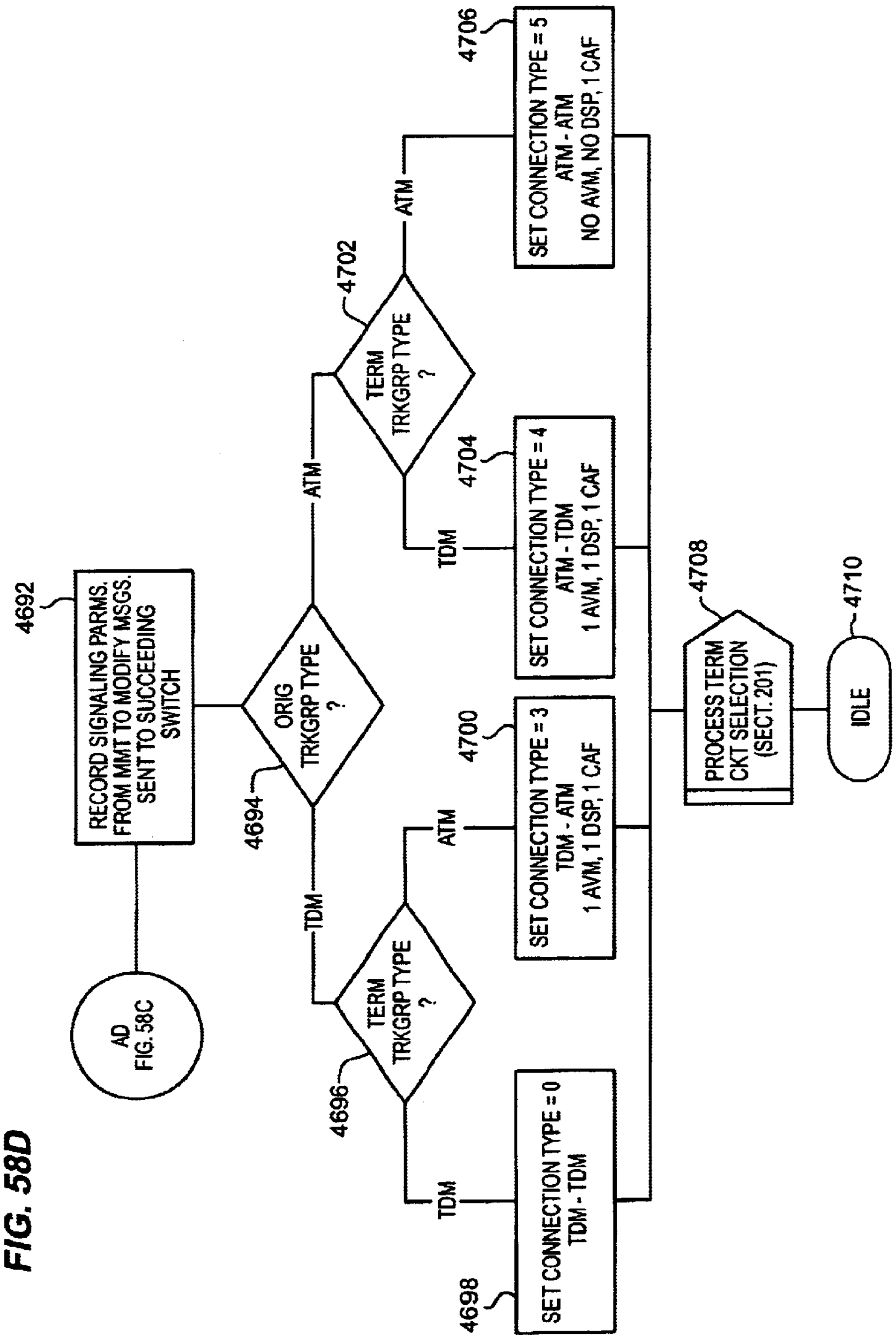

FIGS. 57A–57C depict the originating process for the treatment and release tables. The process is idle at 4590. If the treatment label from the treatment table is a release cause from the originator at 4592, and if the treatment label for the call is found in the table at 4594, the prefix "RO" is added to the front of the call code at 4596. If the RO plus the call code does not match the treatment label at 4598, a log is sent to maintenance at 4600. An REL is sent out the originating circuit with the same cause code value as the value received in the call at 4602. If the RO plus the cause code matches the treatment label at 4598, the release table process is started at 4622. If at 4594 the treatment label for the call is not found in the treatment table, a log is sent to maintenance at 4600, and an REL is sent out the originating circuit with the same cause code value as the value received from the call at 4602.

If at 4592 the treatment label is a call processing error from the originator, and if the treatment label for the call is found in the table at 4604, the prefix "CP" is added to the front of the error code at 4606. If the CP plus the error code does not match the treatment label at 4608, or if the treatment label for the call is not found in the table in 4604, a log is sent to maintenance at 4610. An REL is sent out the originating circuit with a cause value of 41 at 4612. If the CP plus the error code matches the treatment label at 4608, the release table process is started at 4622.

After steps 4602 or 4612 or after the return from the release table process at step 4622, it is determined if the incoming COT is active at 4614. The COT is checked to determine if a terminating circuit has not been successfully selected. If the incoming COT is active at 4614, the incoming COT process is stopped at 4616. The Tcot timer (T8) and the Tiam timer (Tcra) are started at 4618. After step 4618 or if the incoming COT is not active at 4614, the send REL timer (T1) and the RLC timer (T5) are started at 4620. The process then continues at step 4518.

FIG. 57B depicts the release table processing. The process for the release table starts at 4622. If the release label is not found in the release table at 4624, and if the type of the message in the treatment table is a release cause from the originator at 4626, a log is sent to maintenance at 4628. An REL is sent out the originating circuit with the same cause code value as the value received at 4630, and the process returns to the calling process at 4632. If the type of message in the treatment table is a CP error from the originator at 4626, a log is sent to maintenance at 4634. An REL is sent out the originating circuit with the cause value of 41 at 4636. The process returns to the implementing process at 4632.

If the release label is found in the release table at 4624, the information found in the release label of the release table is used to build the REL message at 4638. The REL is sent out the originating circuit with a cause code value from the table look up at 4640. The process returns to the implementing process at 4632.

Terminating Trunk Group Selection For the Trunk Group Table

FIGS. 58A–58D depict the termination process for the trunk group selection for the trunk group table. The process is idle at 4642. If the terminating trunk group information is received from the routing table at 4644, the trunk group table label is set to the trunk group number at 4646. If the label matches the trunk group number at 4648, the process is sent to the COS table at 4650. Idle then is attained at 4652. If the label does not match the trunk group number at 4648, a log is sent to maintenance at 4654. The release time point is recorded for billing 4656, and the process is sent to the treatment table at 4658. The process continues with step 4518.

The process for screening a terminating trunk group's features. The process is idle at 4660. The process is called from the COS table at 4662. At 4664, if the originating IAM bearer capability is for speech or for 3.1 kilo-hertz (Khz), and if the terminating trunk group echo cancellation is disabled at 4666, the process is sent to the routing table for the next trunk in the routing list at 4668. If the bearer capability is 56 Khz or 64 Khz data at 4664, or if the terminating trunk group is set for no echo cancellation at 4666, the incoming satellite indicator in a nature of connection indicator is checked for satellite usage on the incoming circuit at 4670.

If a satellite was used on the previous circuit at 4672, and if the terminating trunk group uses a satellite at 4674, a log is sent to maintenance at 4676. The process is sent to the routing table for the next trunk in the routing list at 4678.

If a satellite was not used on the previous circuit at 4672, and if the terminating trunk group uses a satellite at 4680, the network (NTWK) indicator for the outgoing IAM satellite indicator is set to yes at 4682. After step 4682 or if the terminating trunk group does not use a satellite at 4674 or 4680, the signal routing label in the message mapping table is determined at 4684.

If the signal routing label is not in the message mapping table at 4684, a log is sent to maintenance at 4686. A release time is recorded for billing at 4688, and the process is sent to the treatment table at 4690. The process then continues at step 4518. If the signal routing label is in the message mapping table at 4684, the process continues to step 4692.

At 4692, the signaling parameters from the message mapping table are recorded to modify the messages sent to the succeeding switch. If the originating trunk group type is TDM at 4694, and if the terminating trunk group type is TDM at 4696, the connection type is set to equal zero for a TDM to TDM connection 4698. If the trunk group type is ATM at 4696, the connection type is set to equal three for a TDM to ATM connection that includes one multiplexer (AVM), one digital signal processor (DSP), and one ATM matrix (CAF) 4700.

If the originating trunk group type is ATM at 4694, and if the terminating trunk group type is TDM at 4702, the connection type is set to equal four for an ATM to TDM connection that includes one nultiplexer (AVM), one DSP, and one ATM matrix (CAF) 4704. If the terminating trunk group type is ATM at 4702, the connection type is set to equal five for an ATM to ATM connection at 4706. This connection will not include a mux or a DSP, but will include the ATM matrix (CAF). After the connection types are set, the terminating circuit selection process is started at 4708. Idle then is attained at 4710.

Terminating Trunk Circuit Selection Process

Figure 59A:
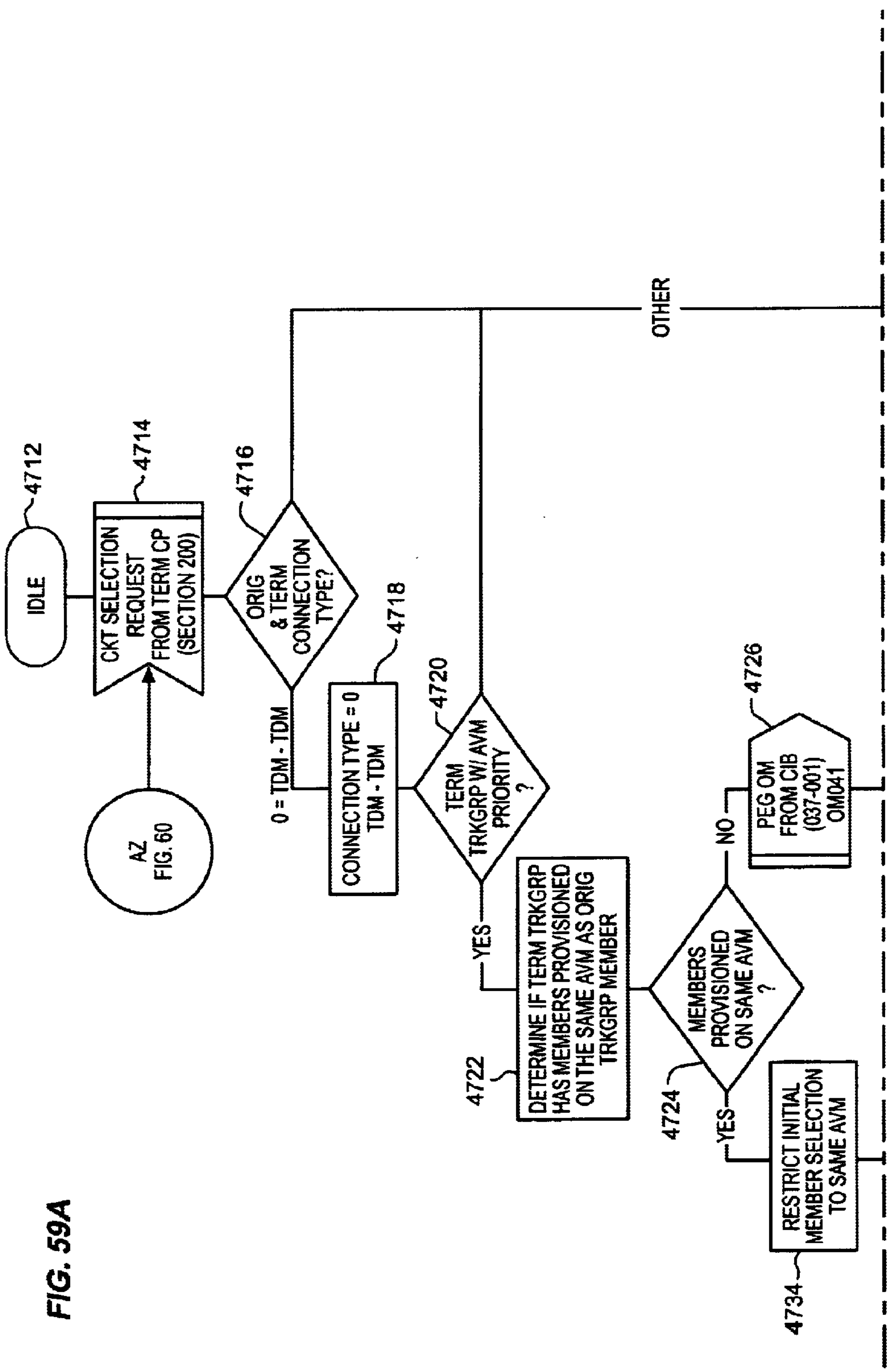
FIGS. 59A–59AA are SDL diagrams of logic used in a version of the invention for the terminating trunk group selection process.
Figure 59B:
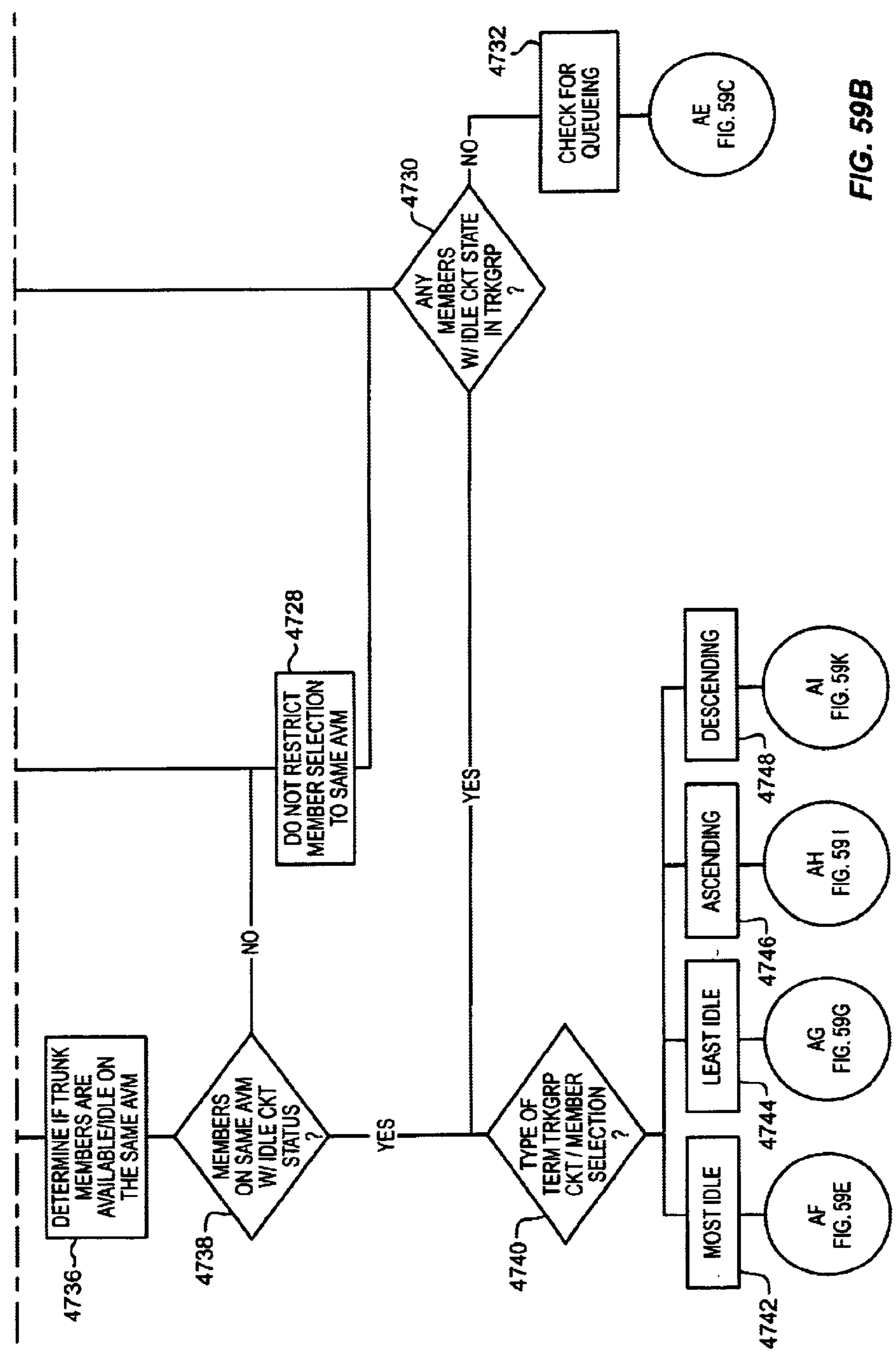
Figure 59C:
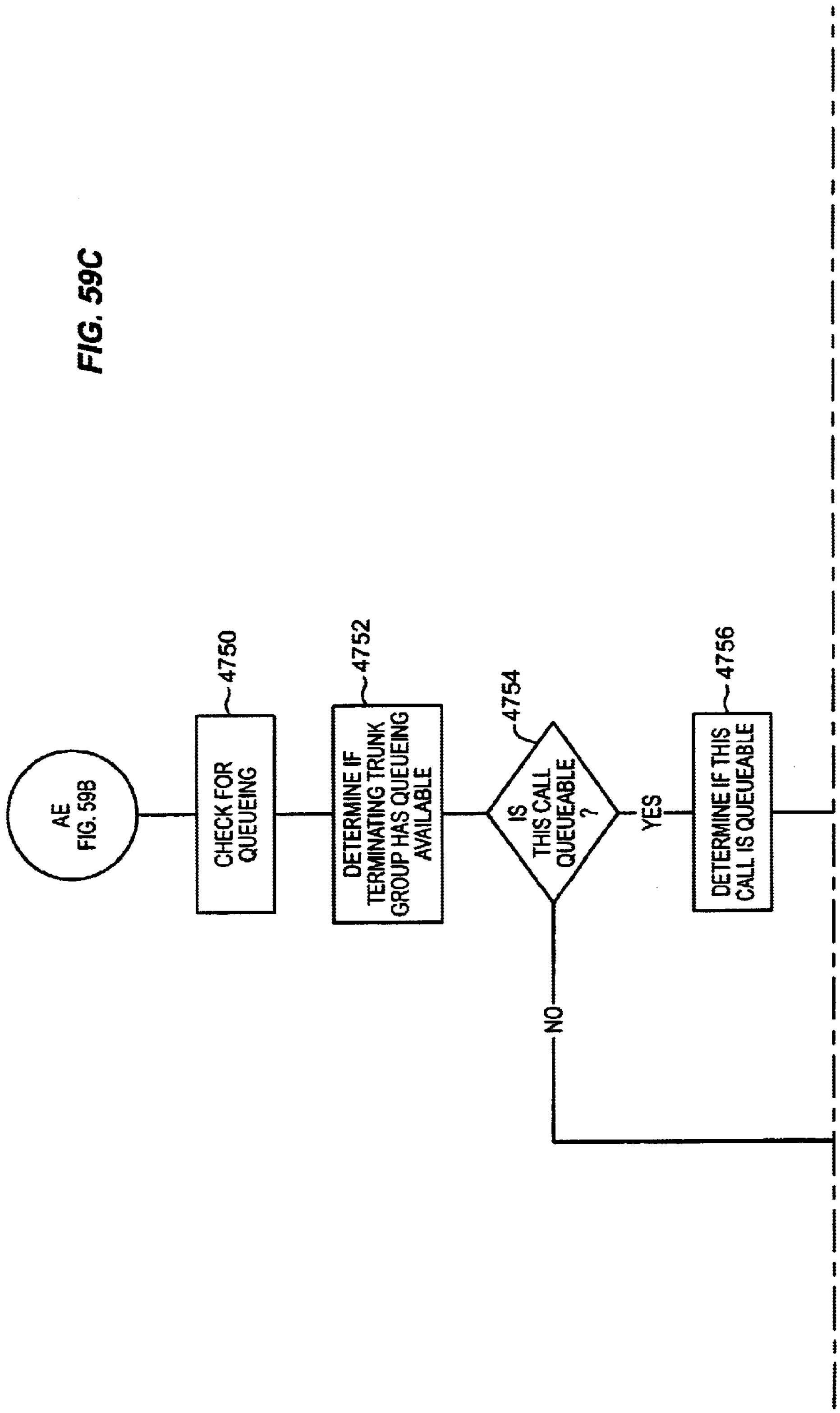
Figure 59D:
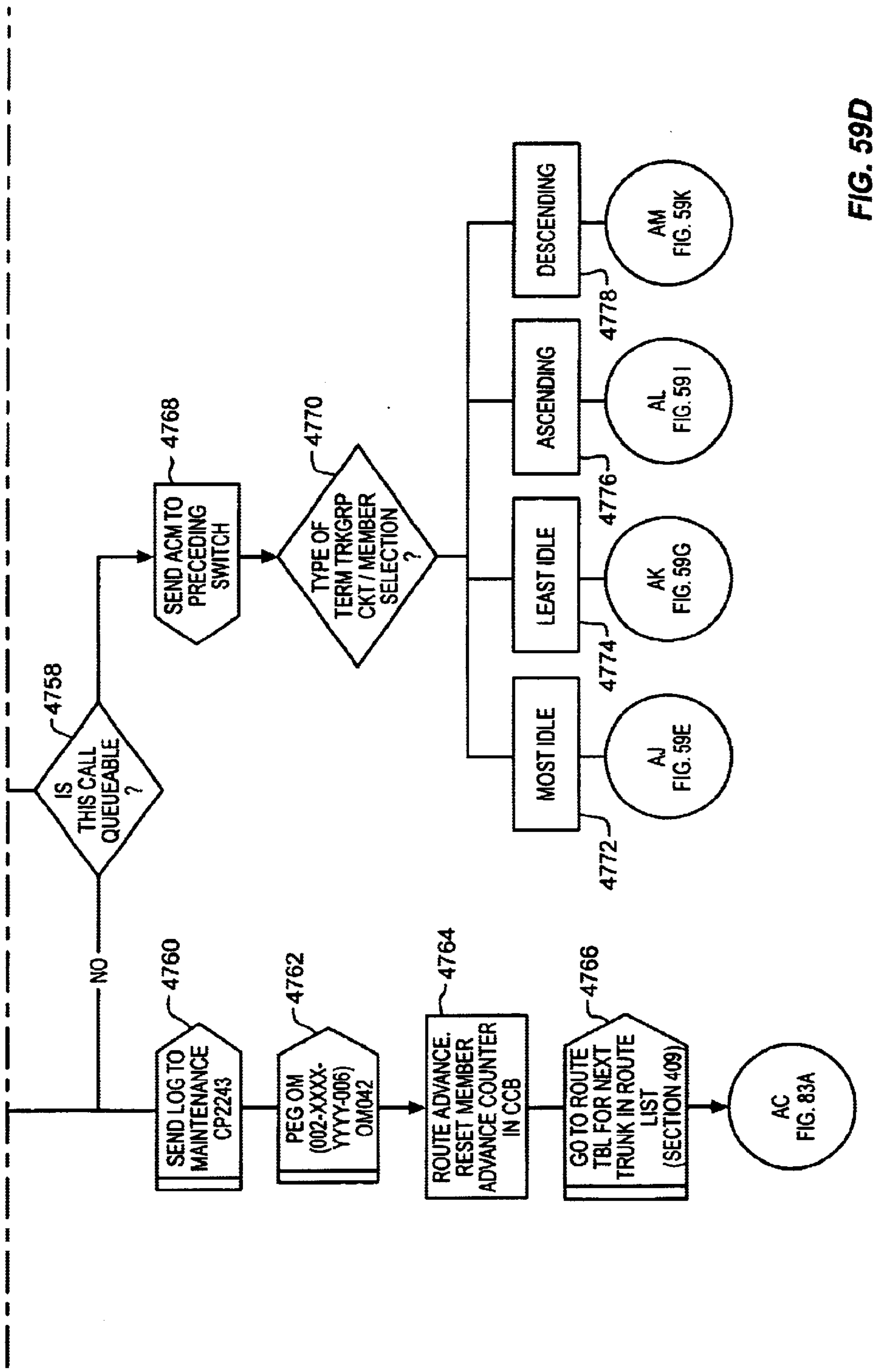
Figure 59E:
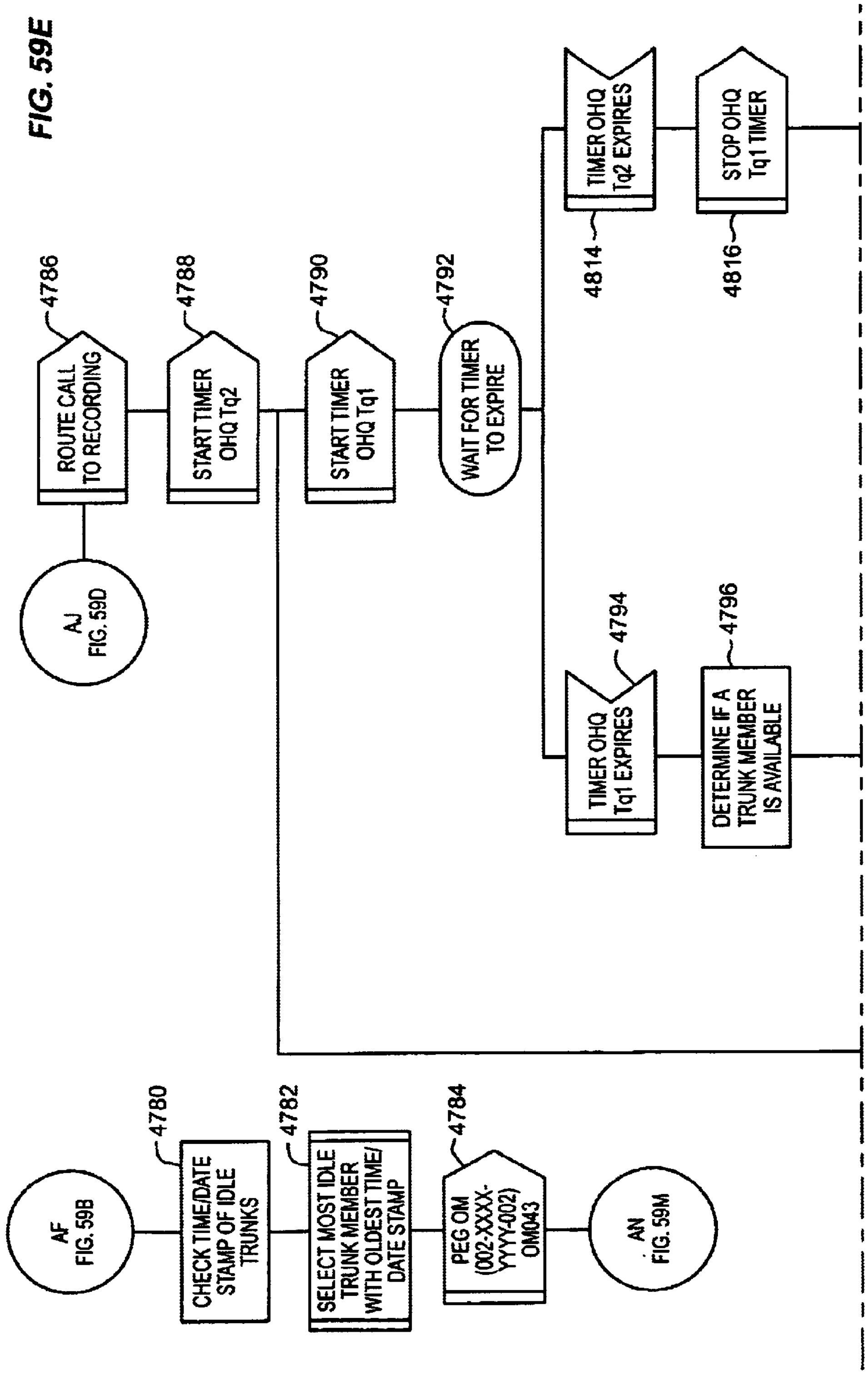
Figure 59F:
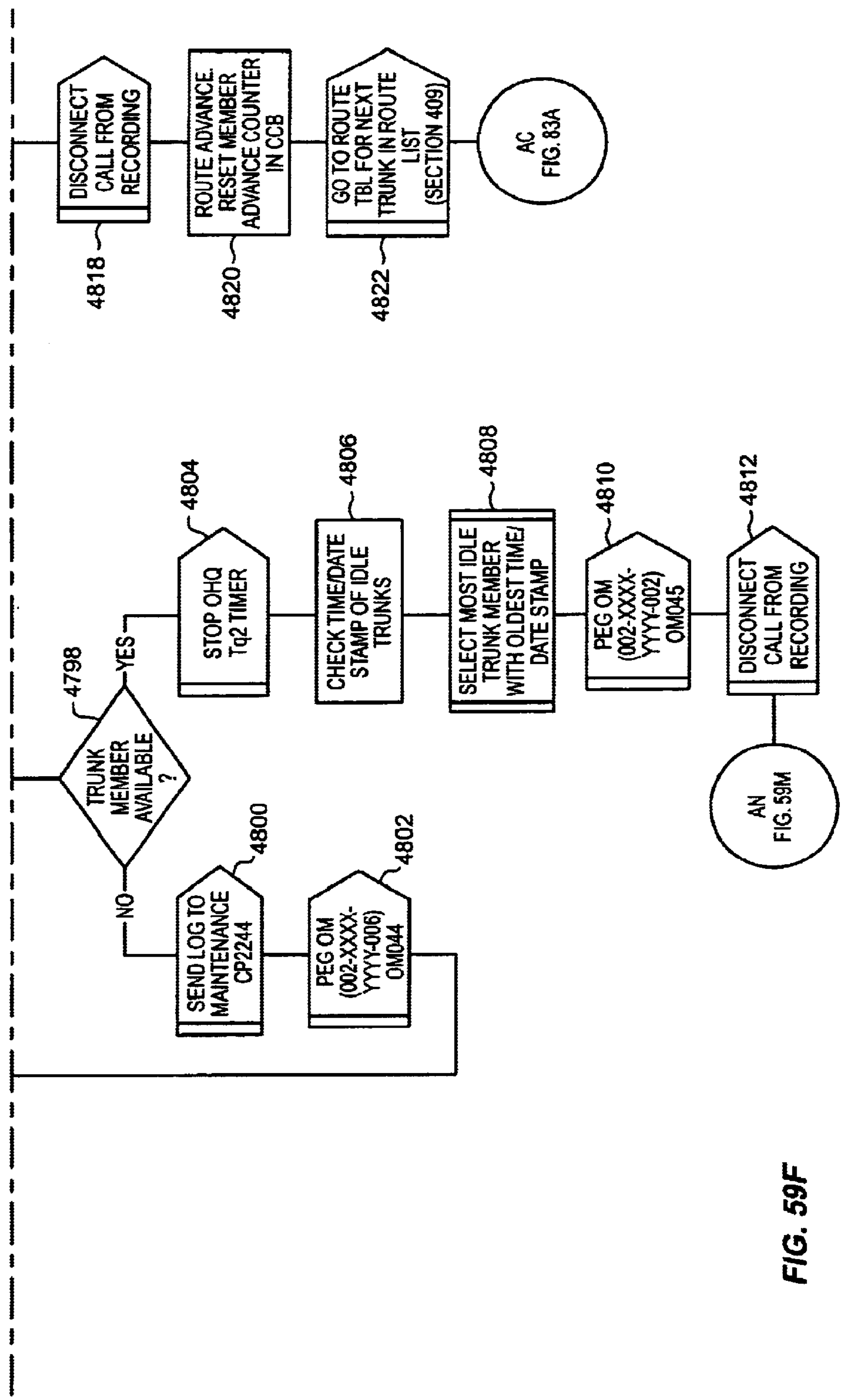
Figure 59G:
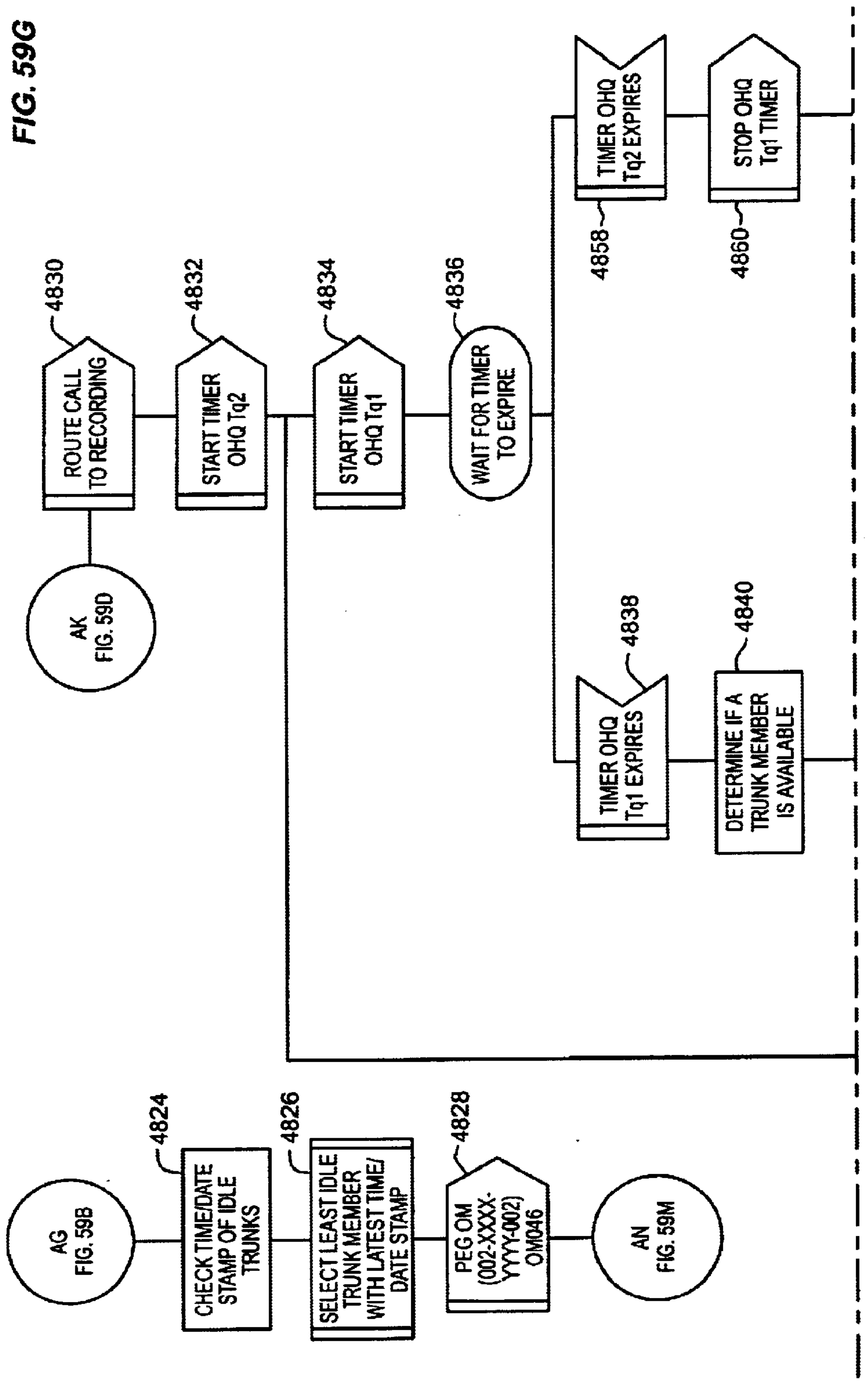
Figure 59H:
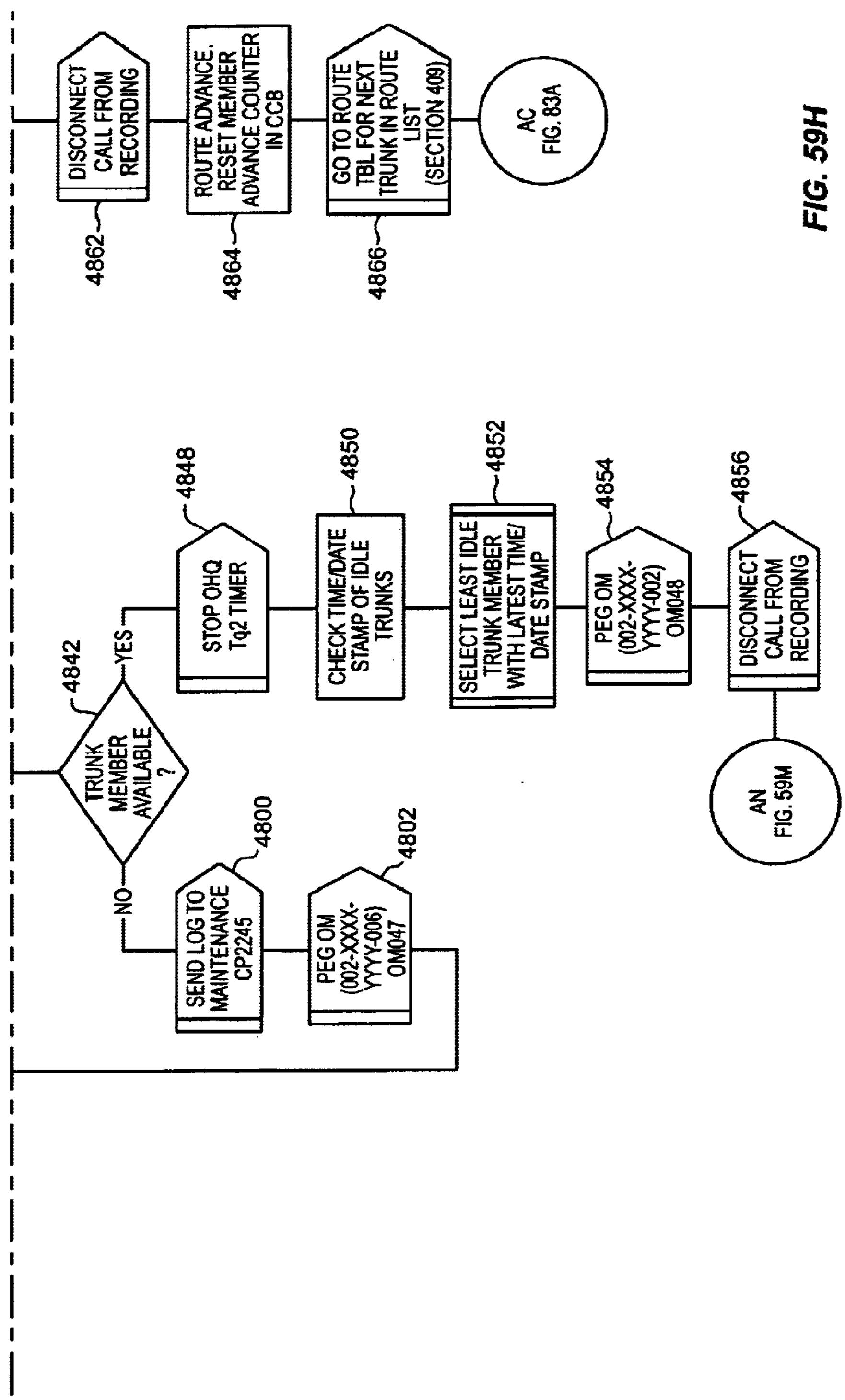
Figure 59I:
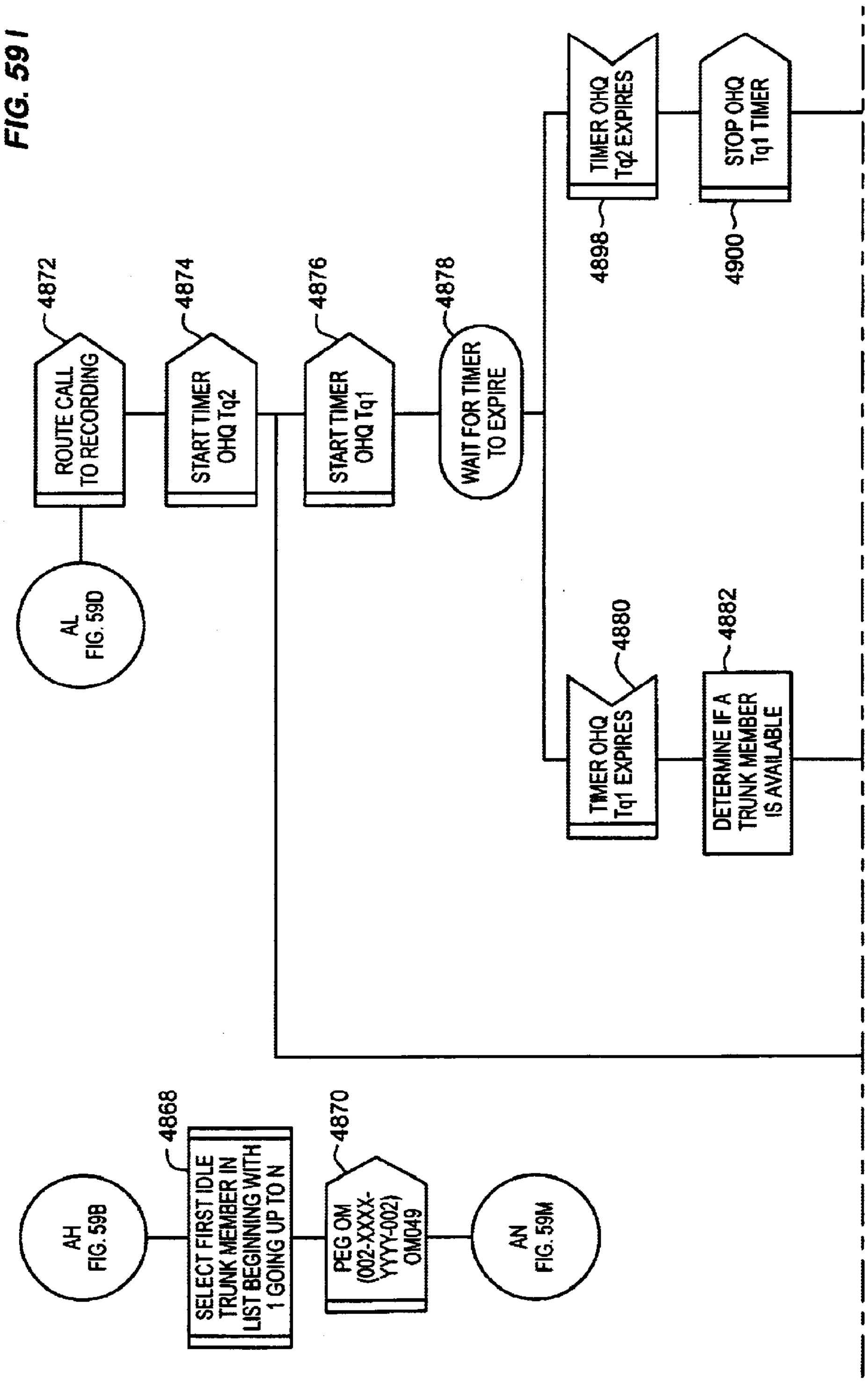
Figure 59J:
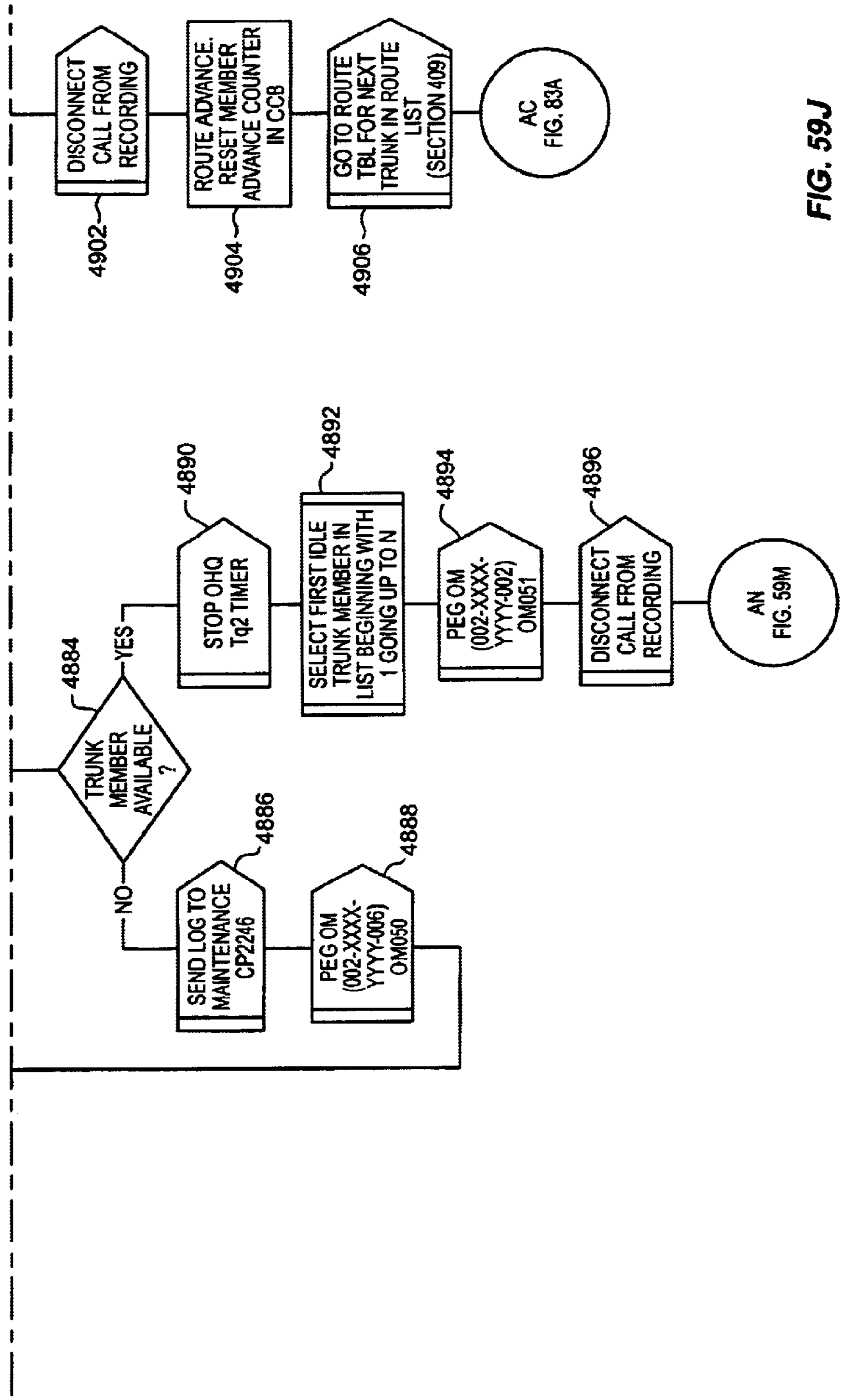
Figure 59K:
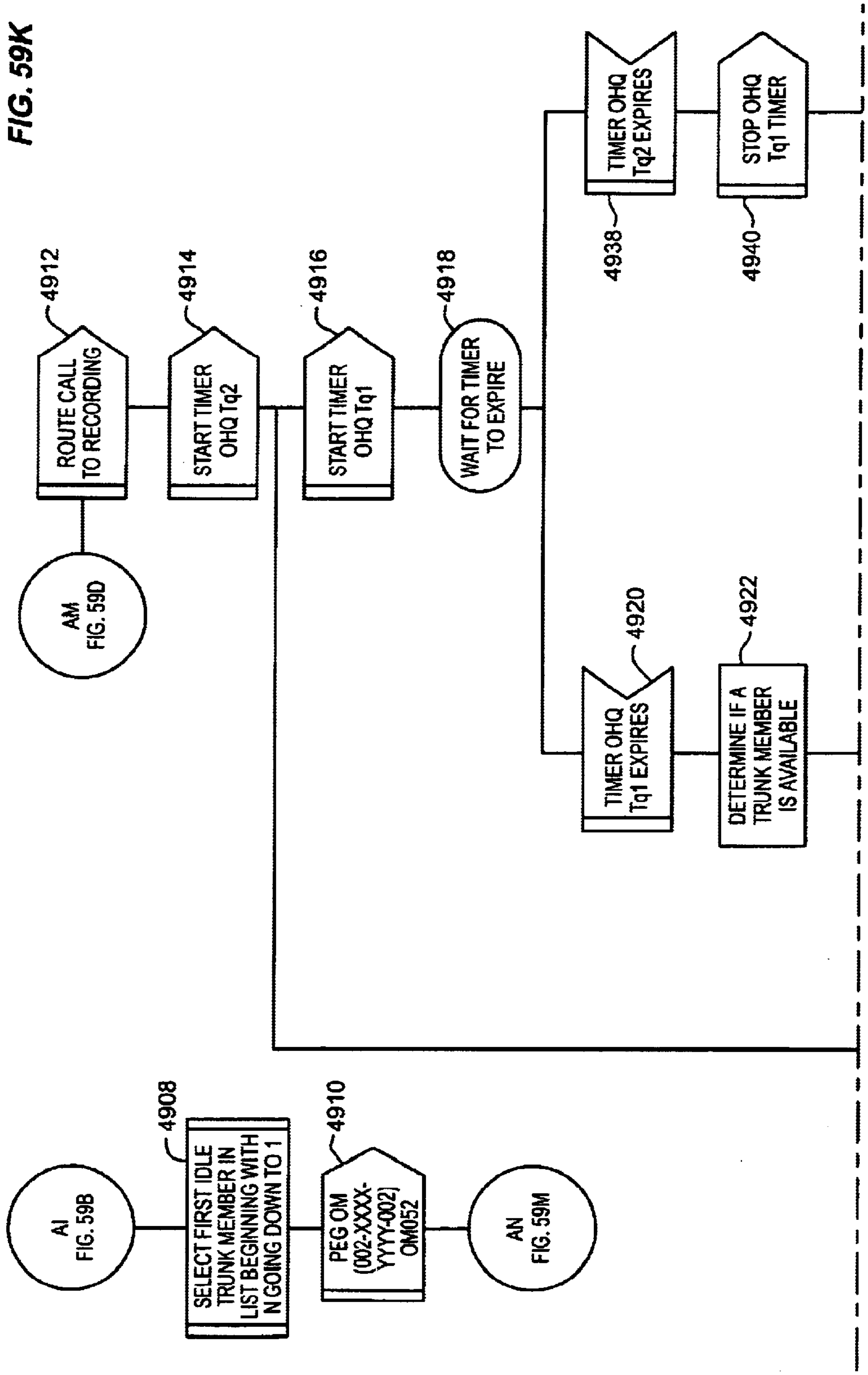
Figure 59L:
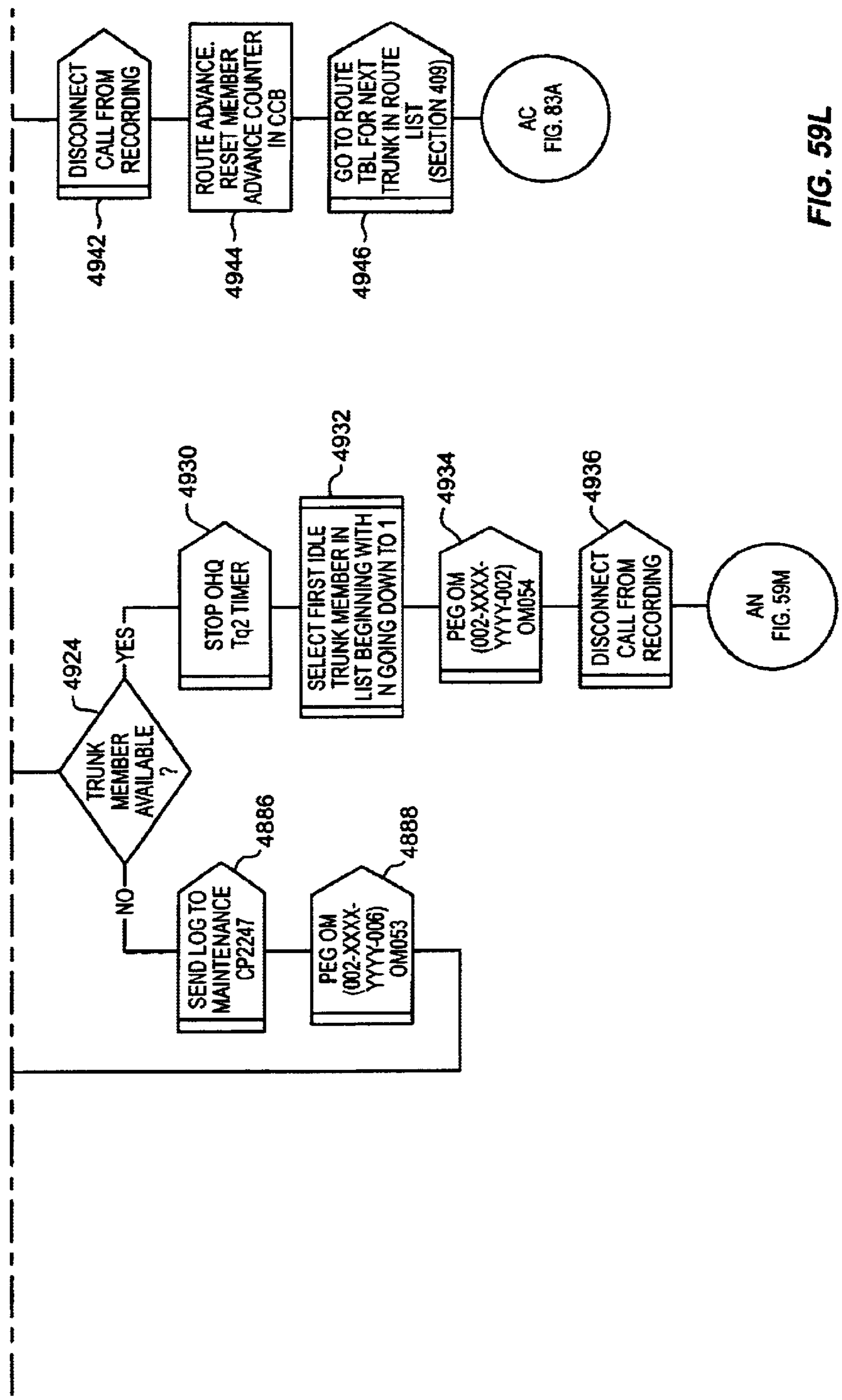
Figure 59M:
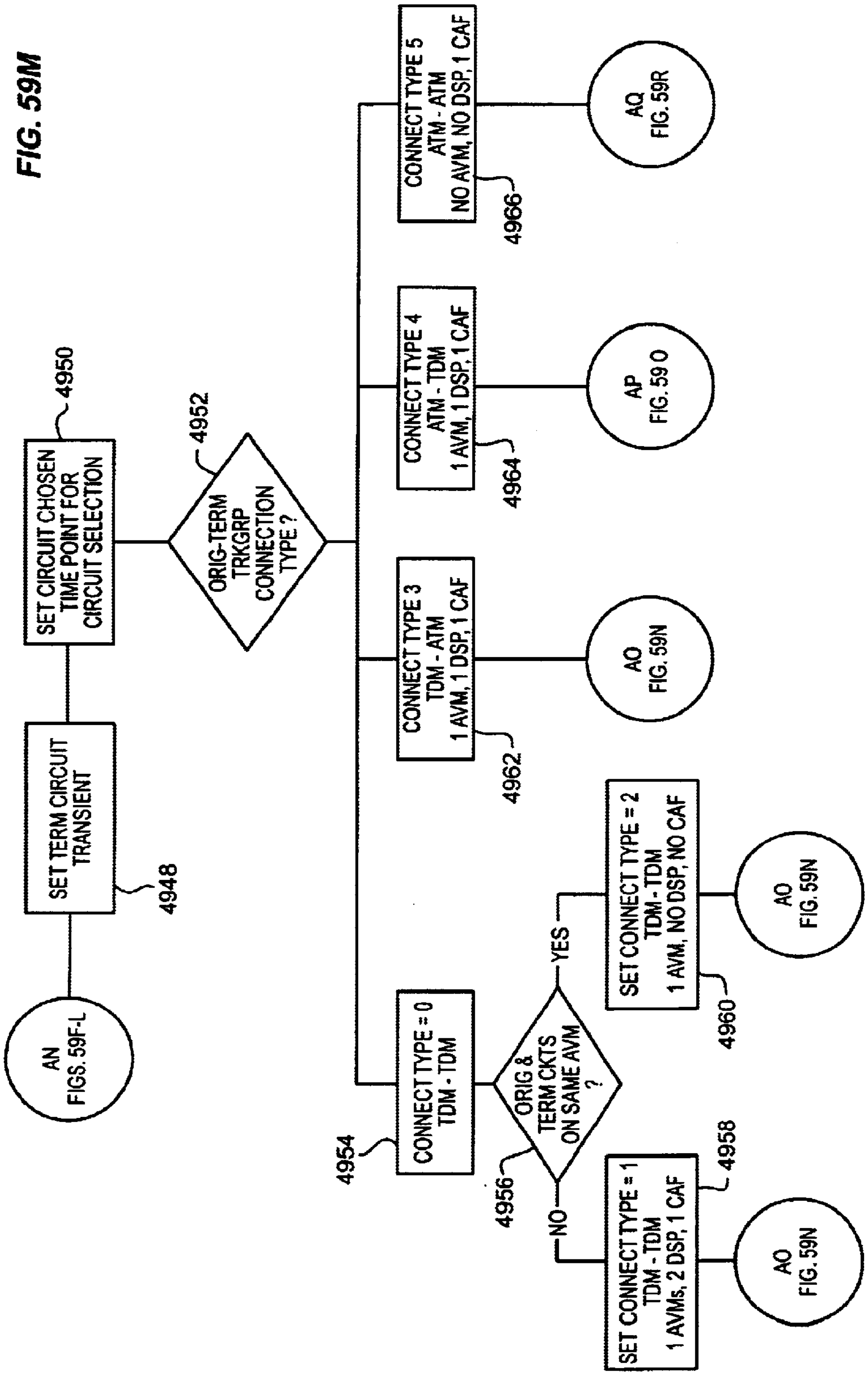
Figure 59N:
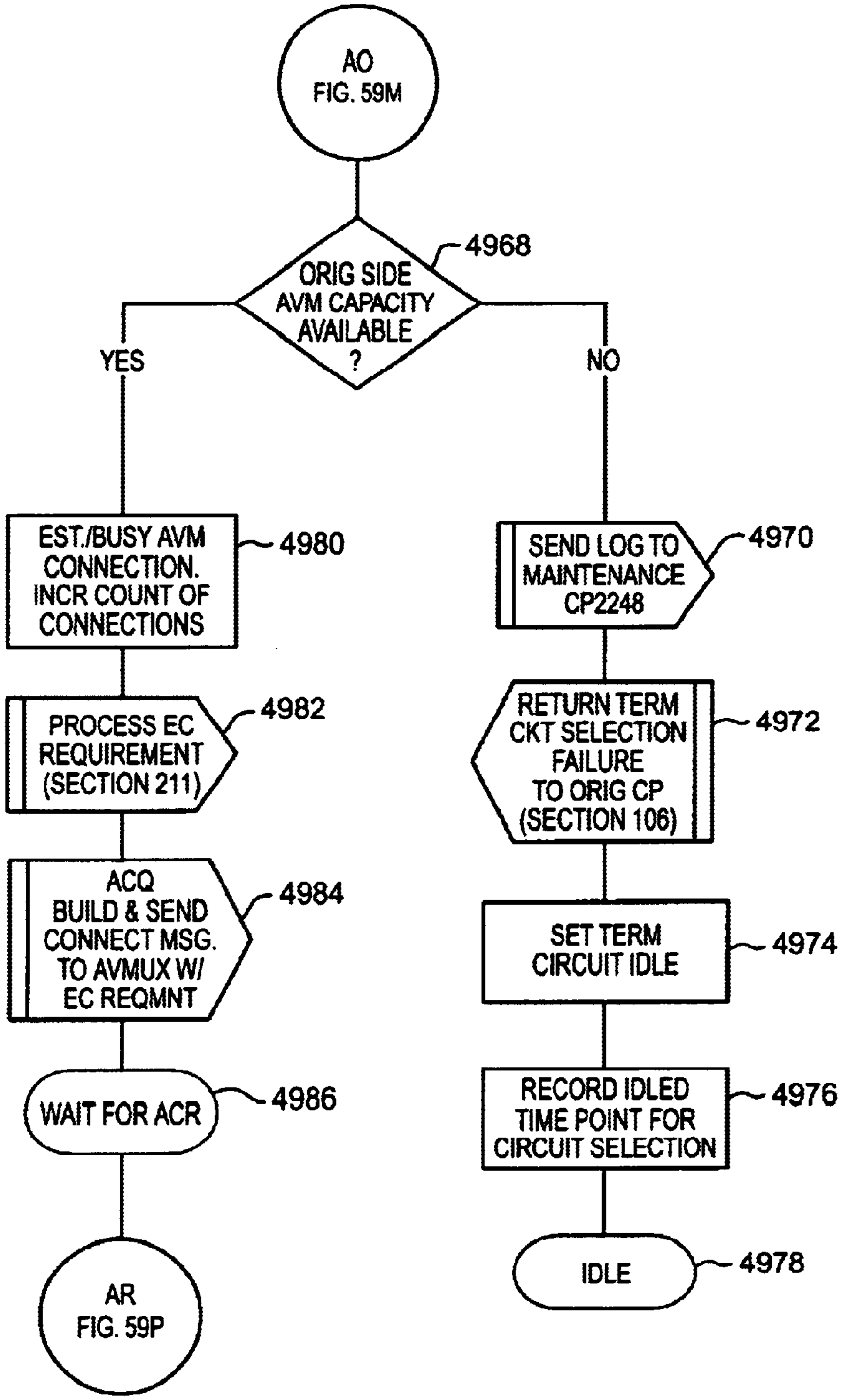
Figure 59:
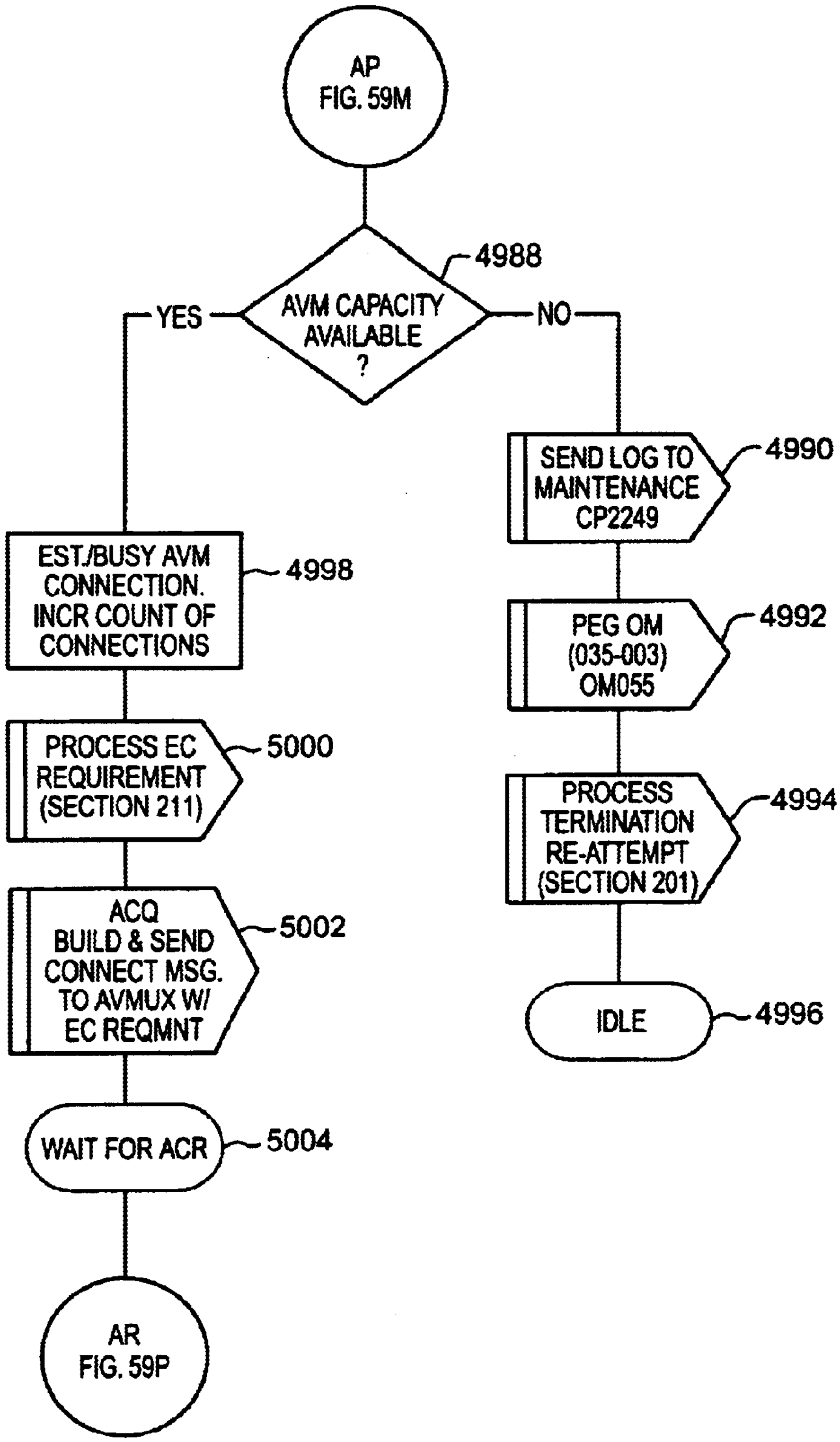
Figure 59P:
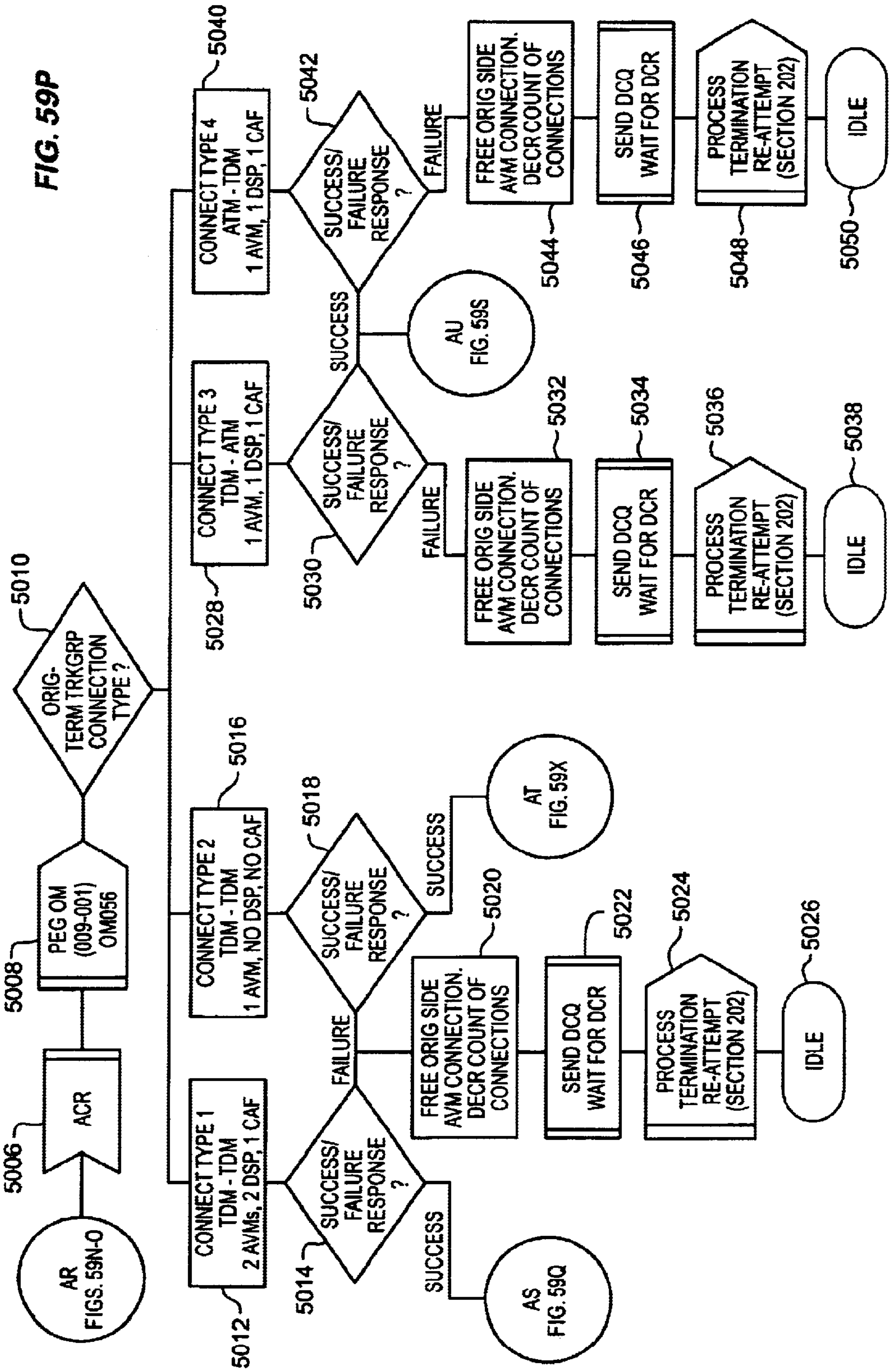
Figure 59Q:
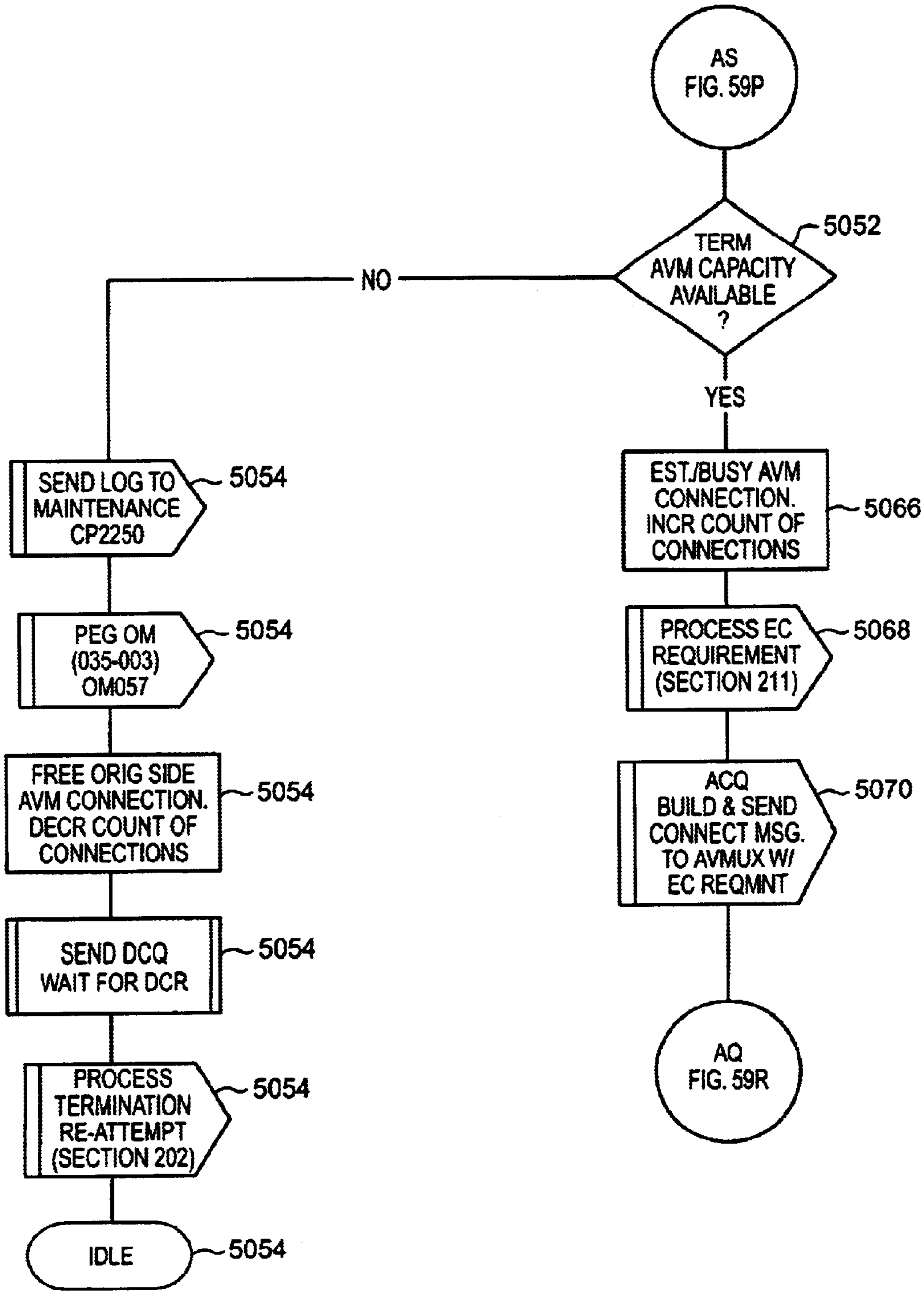
Figure 59R:
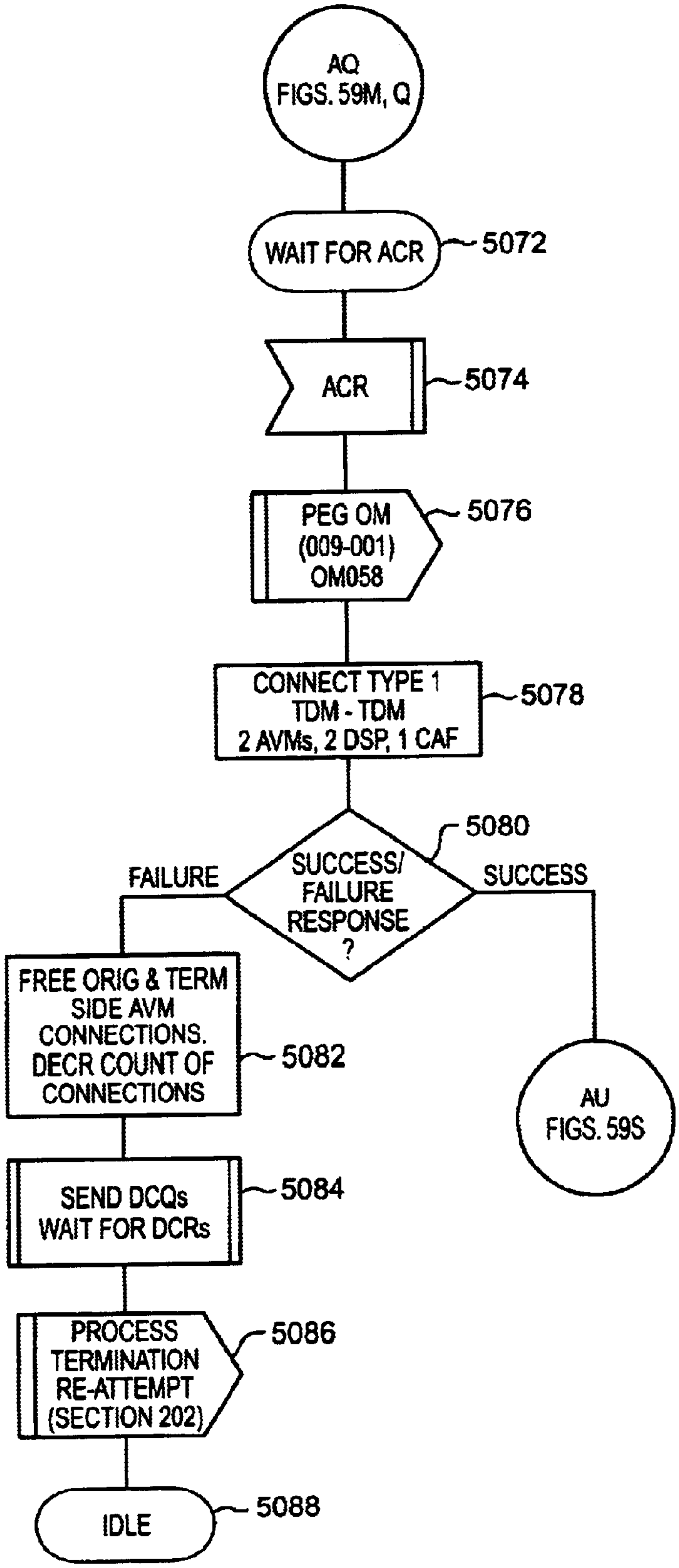
Figure 59S:
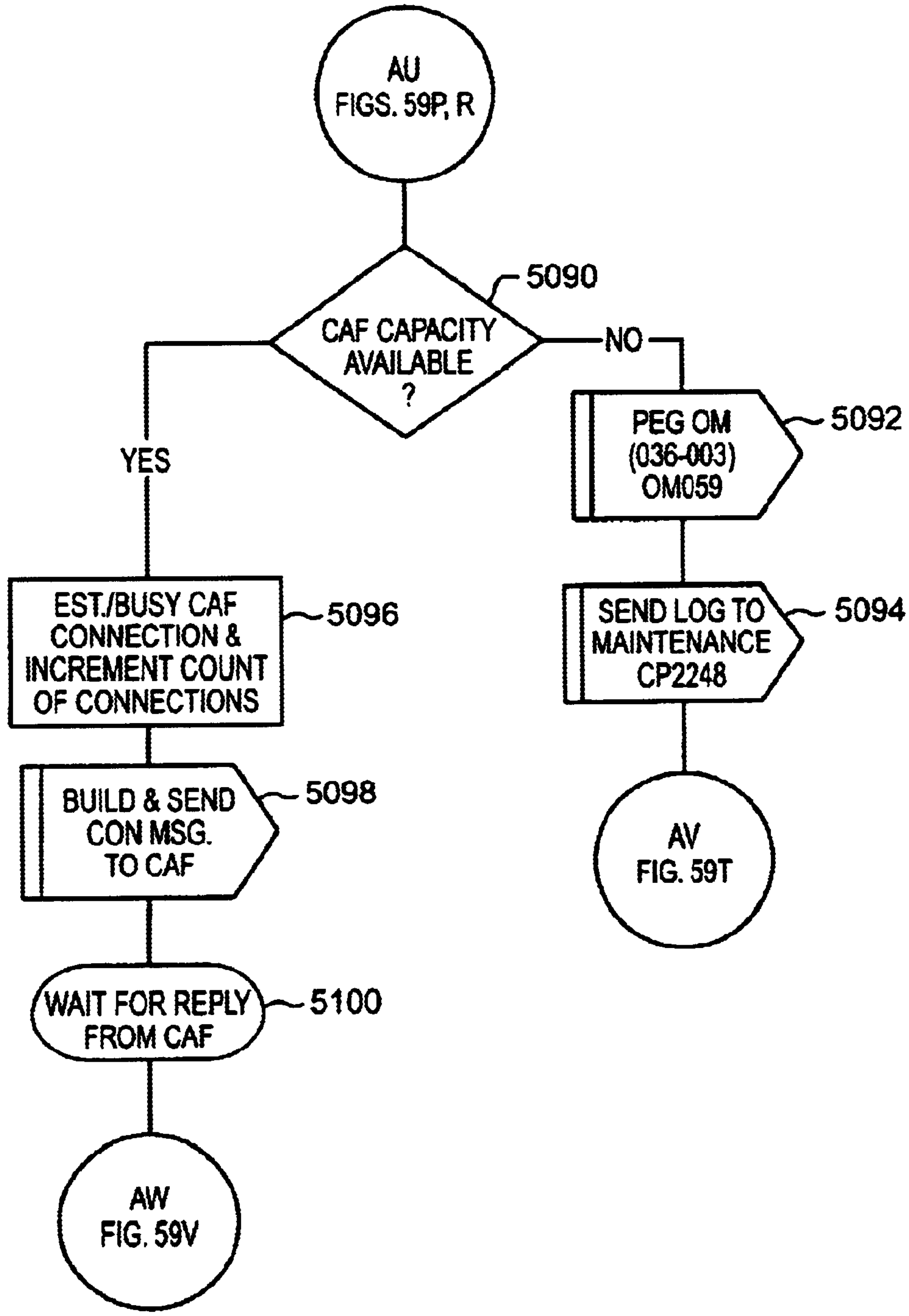
Figure 59T:
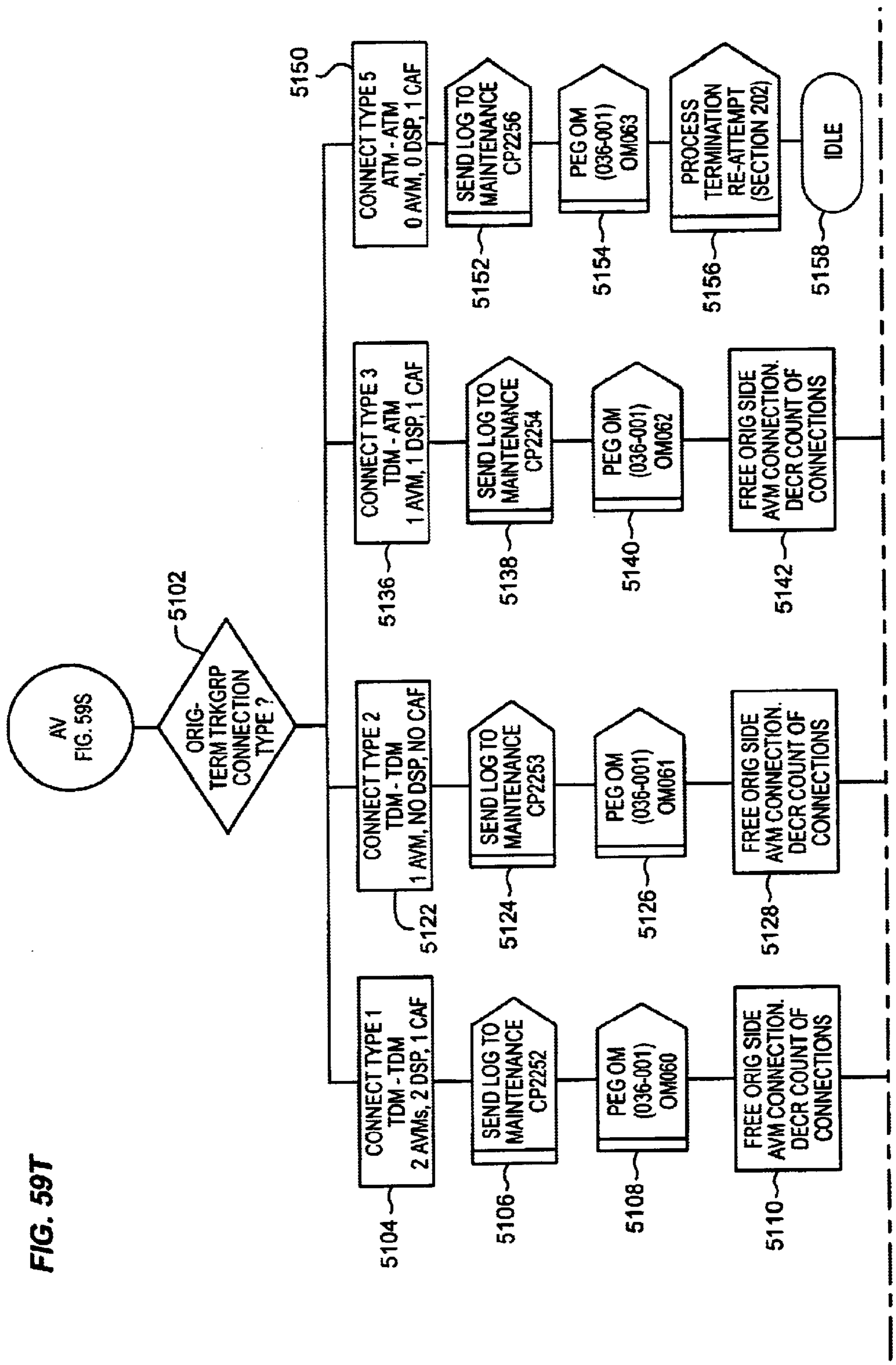
Figure 59U:
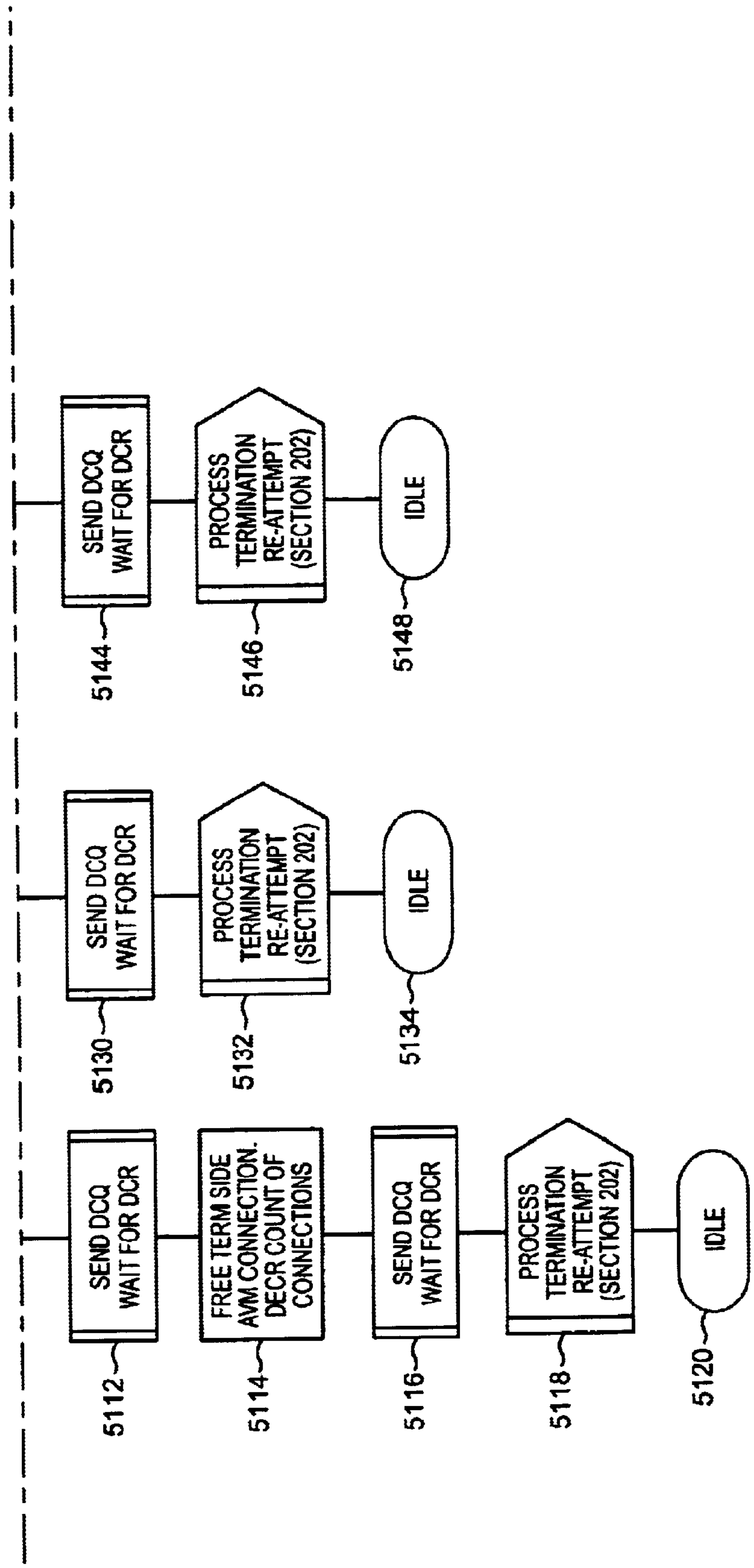
Figure 59V:
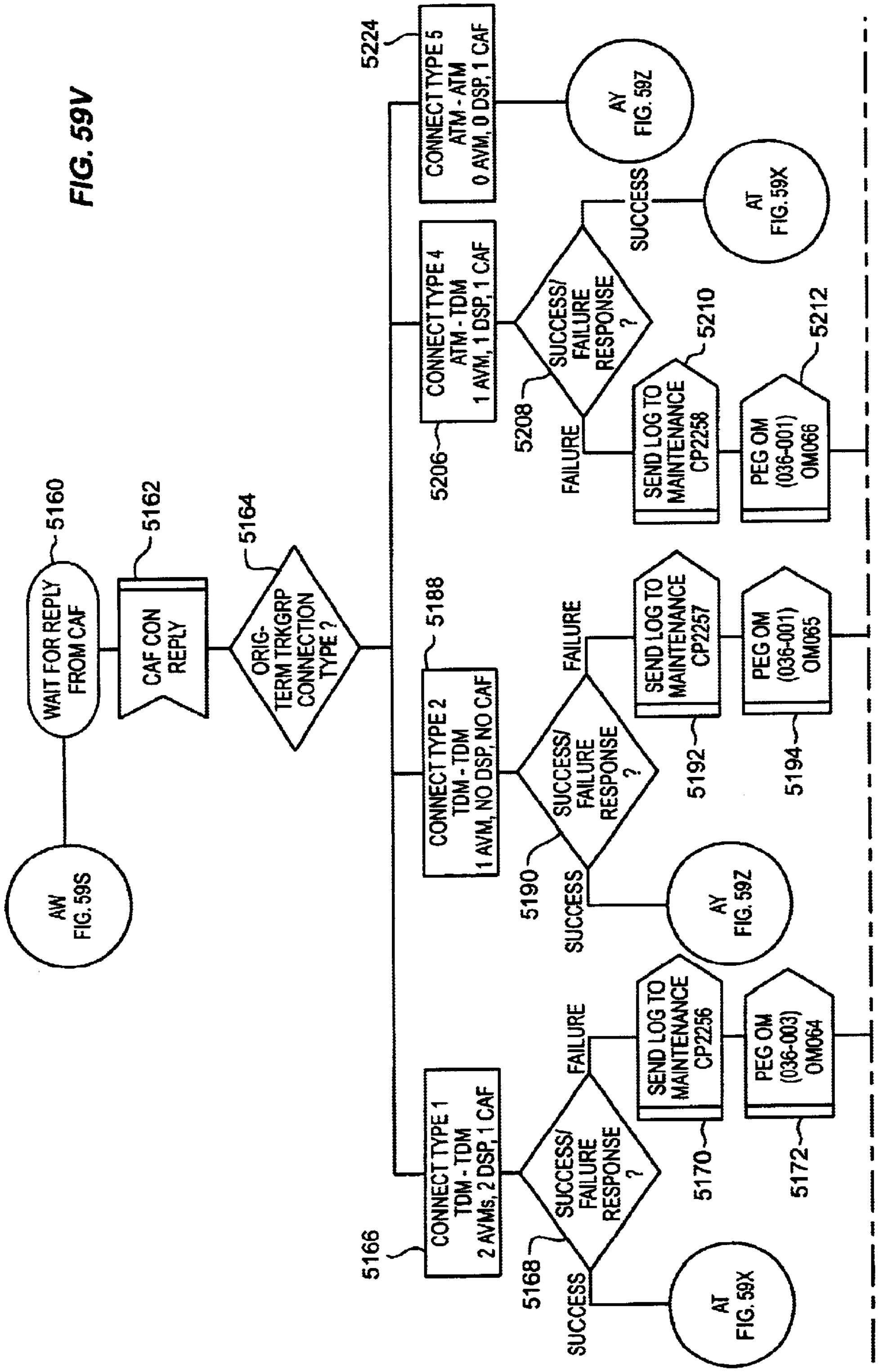
Figure 59W:
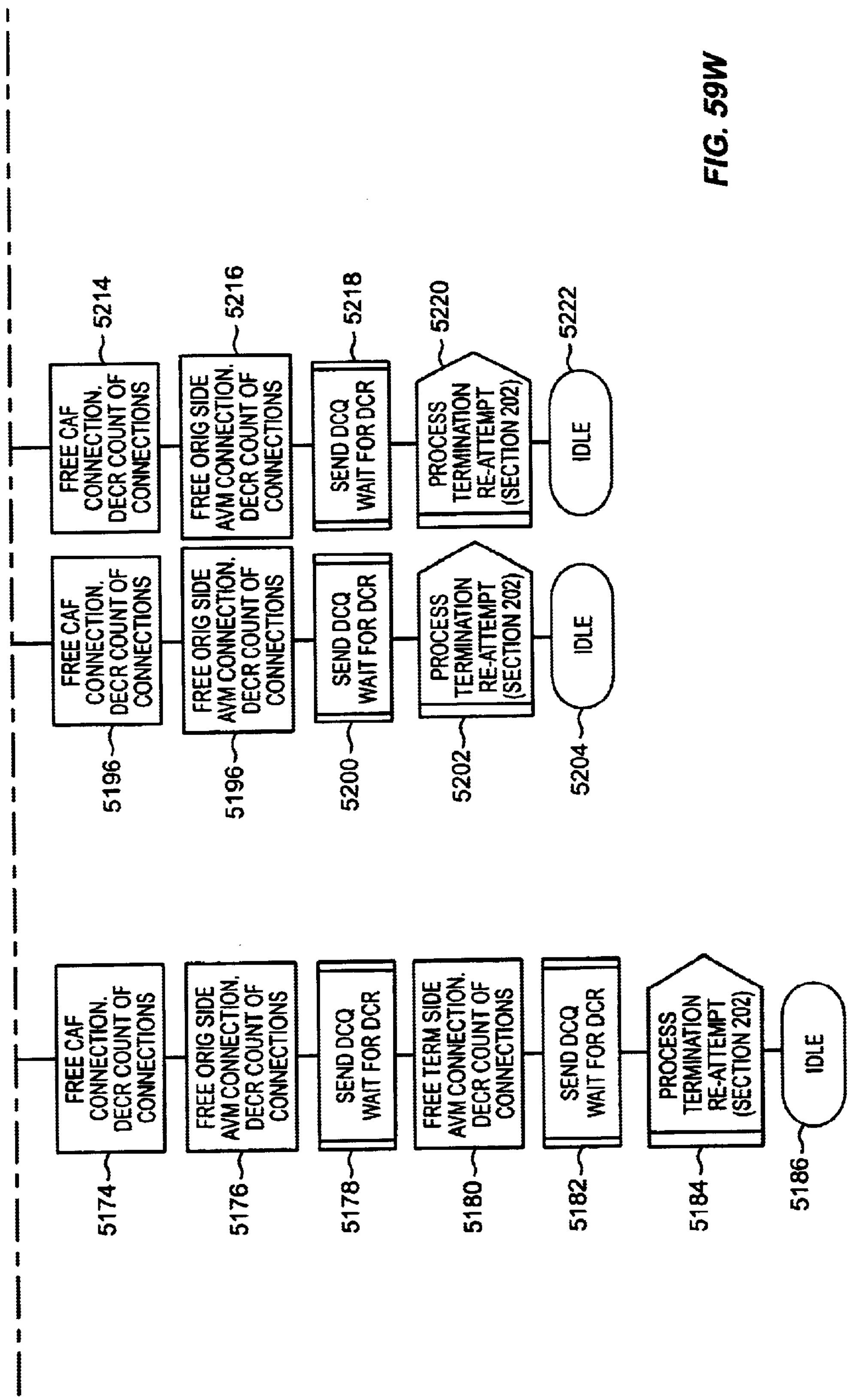
Figure 59X:
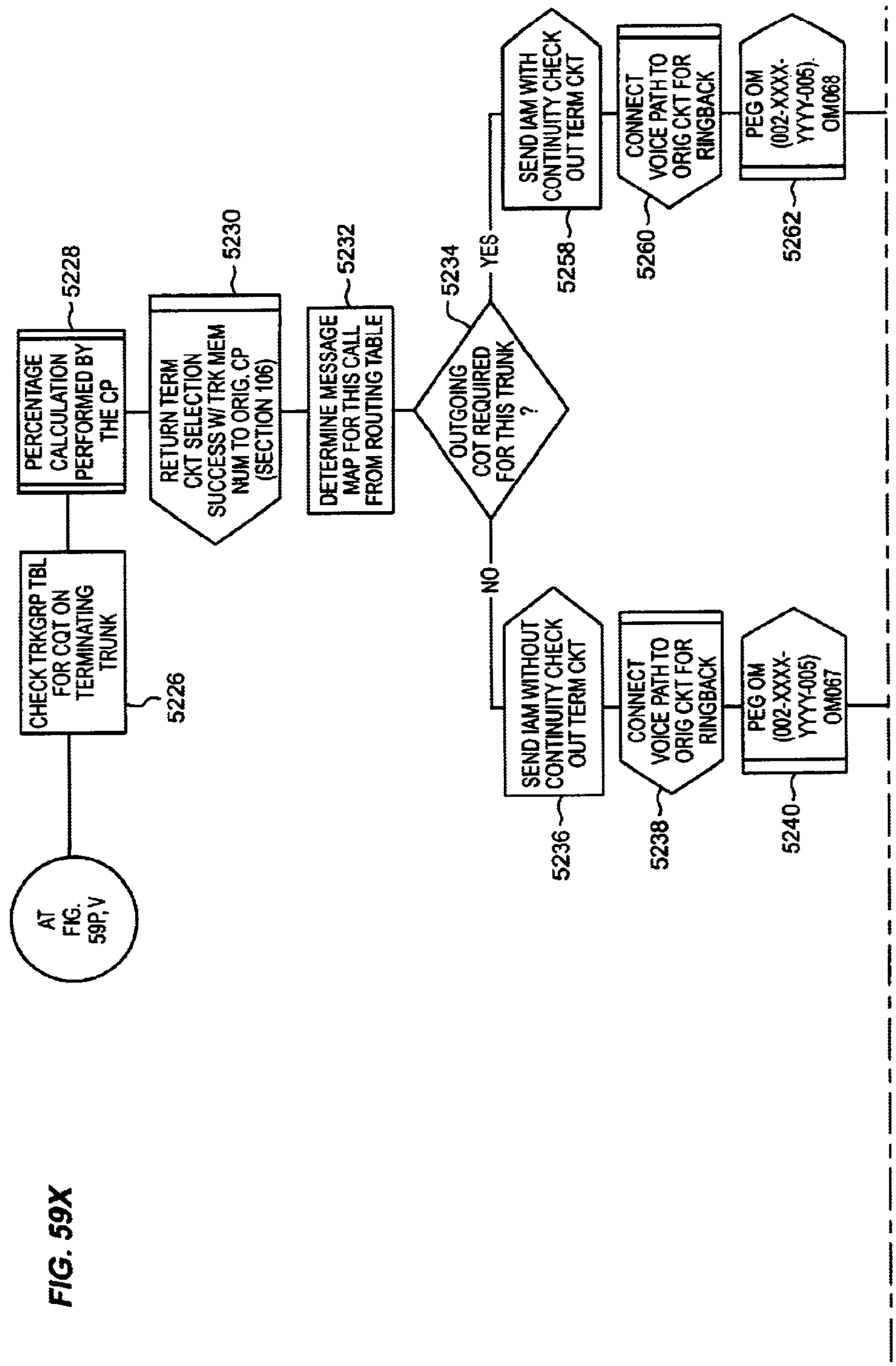
Figure 59Y:
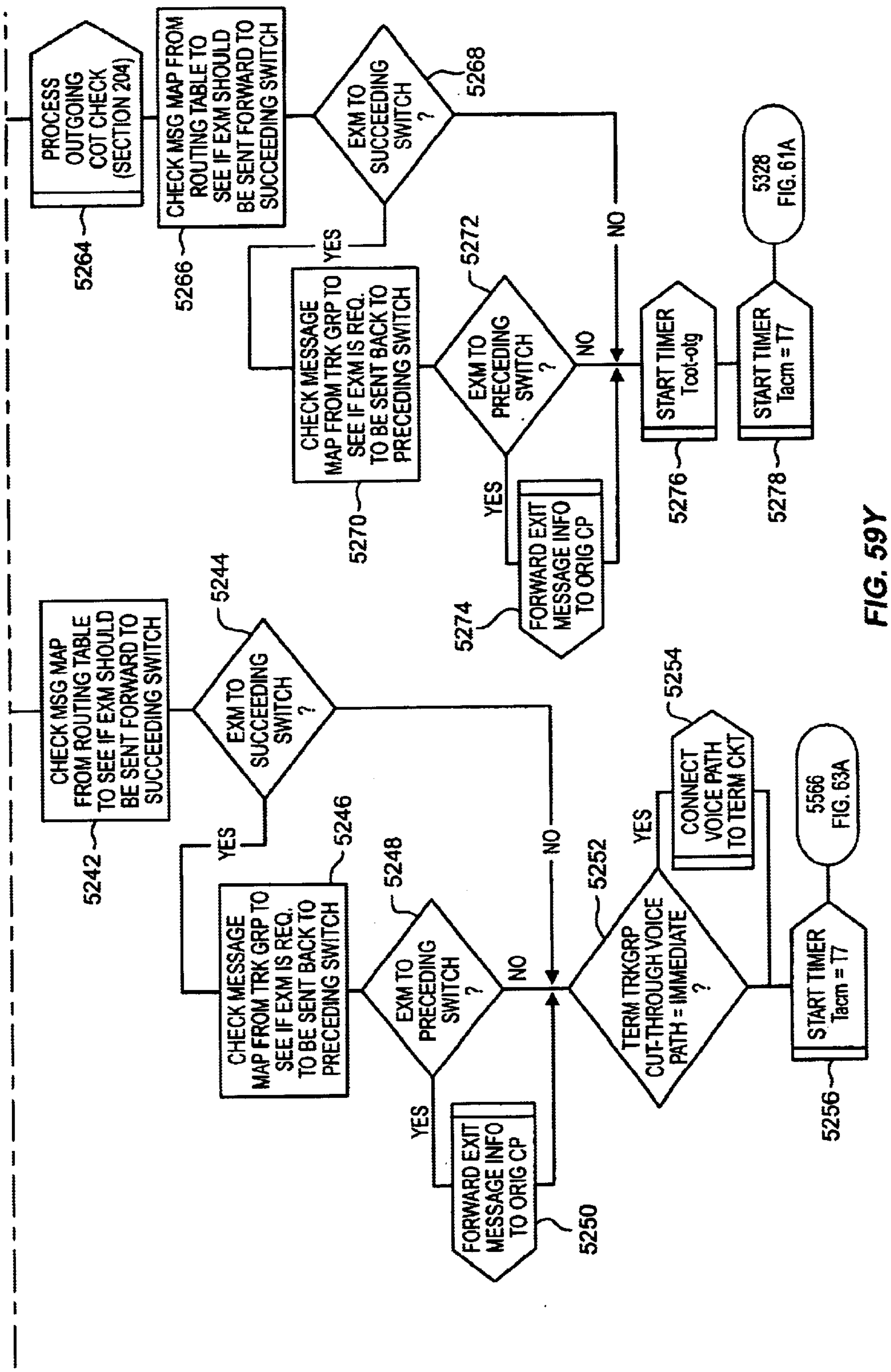
Figure 59Z:
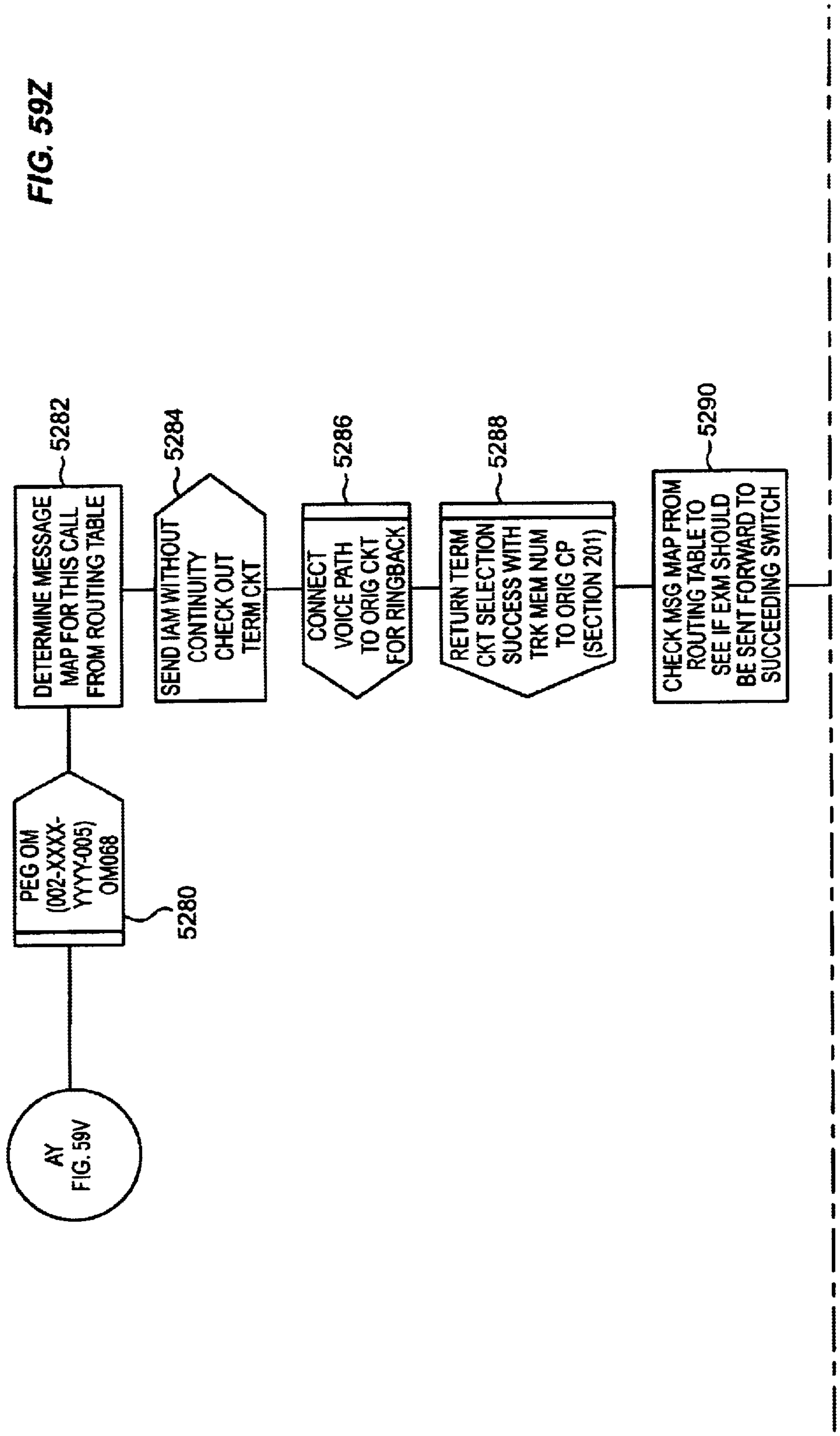
Figure 59A:
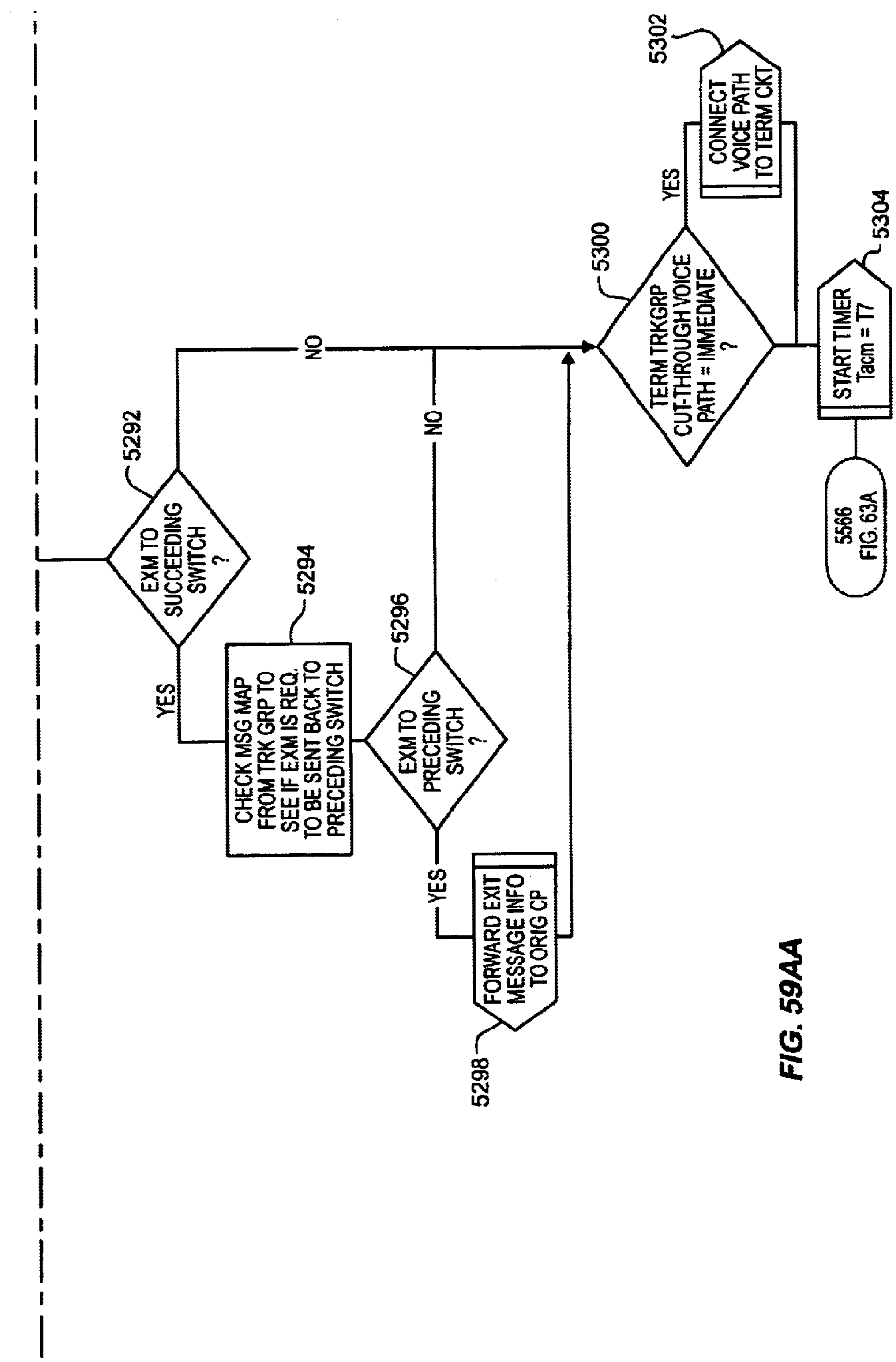

FIGS. 59A–59AA depict the terminating trunk circuit selection processing by the termination process. The process is idle at 4712. A circuit selection request is received from the termination call process at 4714. If the originating connection type and the terminating connection type are both TDM at 4716, the connection type is set to zero for the TDM to TDM connection at 4718. If the terminating trunk group has multiplexer (AVM) priority at 4720, it is determined if the trunk group has members provisioned on the same AVM as the originating trunk group member at 4722. If the members are not provisioned on the same AVM at 4724, the OM is pegged at 4726. The member selection is not restricted to the same AVM at 4728. If no members in the trunk group are idle at 4730, the members are checked for queing at 4732. The process continues at 4750.

If the members are provisioned on the same AVM at 4724, the initial member selection is restricted to the same AVM at 4734. It is determined if the trunk group members are available/idle on the same AVM at 4736. If there are no idle members on the same AVM at 4738, the member selection is not restricted to the same AVM 4728. If there are idle members on the same AVM at 4738, the type of the terminating trunk group circuit and member selection are determined at 4740. In addition, at 4730, if there are no idle members in the trunk group, the type of the terminating trunk group circuit and member selection are determined at 4740. If the originating and terminating connection types are anything other than both TDM at 4716, or if the terminating trunk group does not have AVM priority at 4720, it is determined if any of the members in the trunk group are idle at 4730.

If the terminating trunk group circuit and member selection at 4740 is most idle at 4742, the process continues at step 4780. If the termination trunk group circuit and member selection type at 4740 are least idle at 4744, the process continues at step 4824. If the termination trunk group circuit and member selection at 4740 are ascending at 4746, the process continues at step 4868. If the termination trunk group circuit and member selection at 4740 are descending at 4748, the process continues at step 4908.

Queing is checked at 4750. It is determined if the terminating trunk group has queing available at 4752 and 4754. If queing is available at 4754, it is determined if this call is queuable at 4756 and 4758. If this call is not queuable at 4758, or if this trunk group does not have queing availability at 4754, a log is sent to maintenance at 4760. The OM is pegged at 4762. The route is advanced so that the member advance counter in the CIB is reset at 4764. The process is sent to the routing table for the next trunk group in the routing list at 4766.

If this call is queuable at 4758, an ACM is sent to the preceding switch at 4768. If the type of the terminating trunk group circuit and member selection at 4770 is most idle at 4772, the process continues at step 4786. If the terminating trunk group circuit and member selection at 4770 is least idle at 4774, the process continues at step 4830. If the terminating trunk group circuit and member selection at 4770 is ascending at 4776, the process continues at step 4872. If the terminating trunk group circuit and member selection at 4770 is descending at 4778, the process continues at step 4912.

At step 4780, the time/date stamp of the idle trunks is checked. The most idle trunk member with the oldest time/date stamp is selected at 4782. The OM is pegged at 4784. The process then continues at step 4948.

At step 4786, the call is routed to a recording in which a tone or an announcement is placed for the calling party to identify the call as being queued. The off-hook queuing (OHQ) Tq2 timer is started at 4788. The OHQ Tq2 timer is a large increment timer. The OHQ Tq1 timer is started at 4790. The OHQ Tq1 timer is a small increment timer. The process waits for the timers to expire at 4792.

If the OHQ Tq1 timer expires at 4794, it is determined if the trunk member is available at 4796 and 4798. If a trunk member is not available at 4798, a log is sent to maintenance at 4800 identifying all of the trunk members as not available. The OM is pegged at 4802, and the process continues at step 4790.

If a trunk member is available at 4798, the OHQ Tq2 timer is stopped at 4804. The time/date stamp of idle trunks is checked at 4806. The most idle trunk member with the oldest time/date stamp is selected at 4808. If more than one trunk has the same time/date stamp, then any one of the trunks may be selected. The OM is pegged at 4810, and the call is disconnected from the recording at 4812. The process then continues at step 4948.

If, while waiting for the timer to expire at 4792, the OHQ Tq2 timer expires at 4814, the OHQ Tq1 timer is stopped at 4816. The call is disconnected from the recording at 4818. The route is advanced 4820 so that the member advance counter in the CIB is reset at 4800. The process is sent to the routing table for the next trunk in the routing list at 4822.

At step 4824, the time/date stamp of the idle trunks is checked. The least idle trunk member with the latest time/date stamp is selected at 4826. The OM is pegged at 4828, and the process continues at step 4948.

At 4830, the call is routed to a recording so that a tone or other announcement may be played to identify the call as being queued. The OHQ Tq2 timer is started at 4832, and the OHQ Tq1 timer is started at 4834. The process waits for the timers to expire at 4836.

If the OHQ Tq1 timer expires at 4838, it is determined if a trunk member is available at 4840 and 4842. If a trunk member is not available at 4842, a log is sent to maintenance identifying all the members as unavailable at 4844. The OM is pegged at 4846, and the process continues at step 4834.

If a trunk member is available at 4842, the OHQ Tq2 timer is stopped at 4848. The time/date stamp of the idle trunks is checked at 4850. The least idle trunk member with the latest time/date stamps is selected at 4852. The OM is pegged at 4854, and the call is disconnected from the recording at 4856. The process then continues at step 4948.

If, while waiting for the timer to expire at 4836, the OHQ Tq2 timer expires at 4858, the OHQ Tq1 timer is stopped at 4860. The call is disconnected from the recording at 4862. The route is advanced so that the member advance counter in the CIB is reset at 4864. The process is sent to the routing table for the next trunk in the routing list at 4866.

At step 4868, the first idle trunk member in the list beginning with one and going up to N is selected. The OM is pegged at 4870. The process then continues at step 4948.

At step 4872, the call is routed to a recording so that a tone or other announcement may be played to signify that the call has been queued. The OHQ Tq2 timer is started at 4874, and the OHQ Tq1 timer is started at 4876. The process waits for the timers to expire at 4878.

If the OHQ Tq1 timer expires at 4880, it is determined if the trunk member is available at 4882 and 4884. If a trmk member is not available at 4884, a log is sent to maintenance to signify that no members of the trunk are available 4886. The OM is pegged at 4888, and the process continues to step 4876.

If the trunk member is available at 4884, the OHQ Tq2 timer is stopped at 4890. The first idle trunk member in the list beginning with number 1 and going to N is selected at 4892. The OM is pegged at 4894, and the call is disconnected from the recording at 4896. The process continues with step 4948.

If while waiting for the timer to expire at 4878, the OHQ Tq2 timer expires at 4898, the OHQ Tq1 timer is stopped at 4900. The call is disconnected from the recording at 4902. The route is advanced so that the member advance counter in the CIB is reset at 4904. The process is sent to the routing table for the next trunk in the routing list at 4906.

At step 4908, the first idle trunk member in the list beginning with N and going down to 1 is selected. The OM is pegged at 4910, and the process continues at step 4948.

The call is routed to a recording so that a tone or other announcement may be played at 4912. The OHQ Tq2 timer is started at 4914, and the OHQ Tq1 timer is started at 4916. The process waits for the timers to expire at 4918.

If the OHQ Tq1 timer expires at 4920, it is determined if a trunk member is available at 4922 and 4924. If a trunk member is not available at 4924, a log is sent to maintenance at 4926. The OM is pegged at 4928, and the process continues at step 4916. If a trunk member is available at 4924, the OHQ Tq2 timer is stopped at 4930. The first idle trunk member in the list beginning with N and going down to 1 is selected at 4932. The OM is pegged at 4934, and the call is disconnected from the recording at 4936. The process then continues at step 4948.

If the OHQ Tq2 timer expires at 4938, the OHQ Tq1 timer is stopped at 4940. The call is disconnected from the recording at 4942. The route is advanced so that the member advance counter in the CIB is reset at 4944. The process is sent to the routing table for the next trunk group in the routing list at 4946. The process then continues at step 7734.

At step 4948, the terminating circuit is set to transient. The terminating trunk group member and circuit have been selected, and the connections for the mux (AVM) and/or the ATM matrix (CAF) are to be established. The circuit chosen time point for circuit selection is set at 4950. If the originating to terminating trunk group connection type at 4952 is equal to zero for a TDM to TDM connection at 4954, and if the originating and terminating circuits are not on the same AVM at 4956, the connection type is set to equal one for a TDM to TDM connection in which two muxes (AVMs), two DSPs, and one ATM matrix (CAF) are used at 4958. The process continues at 4968. If the originating and terminating circuits are on the same AVM at 4956, the connection type is set to equal two for a TDM to TDM connection in which one AVM, no DSPs, and no CAF are used at 4960. The process then continues at step 4968.

If the originating and terminating trunk group connection type at 4952 is connection type three for a TDM to ATM connection in which one AVM, one DSP, and one CAF are used at 4962, the process continues at step 4968. If the originating and terminating trunk group connection type at 4952 is connection type for an ATM to TDM connection in which one AVM, one DSP, and one CAF are used at 4964, the process continues at step 4988. If the originating and trunk group connection type at 4952 is connection type five for an ATM to ATM connection in which no AVM, no DSP, and one CAF are used at 4966, the process continues at step 5072.

It is determined if the originating side AVM has available capacity at 4968. Virtual trunk circuit selection is done on an ascending order. Call processing keeps track of all virtual circuits within a VP, including both transmit and receive VPs within a trunk group, and provides call processing with the lowest number VC that is idle. Call processing uses idle, transient, and busy as designators for the status of VCs within a trunk group.

If the originating side AVM does not have available capacity at 4968, a log is sent to maintenance at 4970. The terminating circuit selection failure is returned to the origination call process at 4972. The terminating circuit is set to idle at 4974, and the idled time point for circuit selection is recorded at 4976. Idle is attained at 4978.

If the originating side AVM has available capacity at 4968, a busy AVM connection is established, and the count of connections is incremented at 4980. The echo cancellation (EC) requirements are processed at 4982, and an ACQ is built and sent to the AVM with the EC requirements at 49841. The process waits for an ACR at 4986, and the process continues at step 5006.

It is determined if the AVM has available capacity at 4988. If the AVM does not have available capacity 4988, a log is sent to maintenance at 4990. An OM is sent at 4992, and the termination re-attempt process is started at 4994. Idle is attained at 4996.

If the AVM has capacity at 4988, a busy AVM connection is established, and the count of connections is incremented at 4998. The EC requirements are processed at 5000. An ACQ is built and sent to the AVM with the EC requirements at 5002. The process waits for an ACR at 5004, and the process continues at step 5006.

An ACR is received at 5006. The OM is pegged at 5008. If the originating and terminating trunk group connection type at 5010 is connection type one at 5012 for a TDM to TDM connection in which two AVMs to DSPs, and one CAF are used, the success/failure response is determined at 5014. If the originating trunk group connection type at 5010 is connection type two at 5016 for a TDM to TDM connection in which one AVM, no DSPs, and no CAFs are used, the success/failure response is determined at 5018. If the response at 5014 or 5018 is a failure, the originating side AVM connection is freed, and the count of connections is decremented at 5020. A DCQ is sent, and the process waits for a DCR at 5022. The termination re-attempt process is started at 5024, and idle is attained at 5026. If the response at 5014 is a success, the process continues at step 5052. If the response is a success at 5018, the process continues at step 5226.

If the originating and terminating trunk group connection type at 5010 is connection type three at 5028 for a TDM to ATM connection in which one AVM, one DSP, and one CAF are used, the success/failure response is determined at 5030.

If the response is a success at 5030, the process continues at step 5090. If the response is a failure at 5030, the originating side AVM connection is freed, and the count of connections is decremented at 5032. A DCQ is sent, and the process waits for a DCR at 5034. The termination re-attempt process is started at 5036, and idle is attained at 5038.

If the originating and terminating trunk group connection type at 5010 is connection type 4 at 5040 for an ATM to TDM connection in which one AVM, one DSP, and one CAF are used, the success and failure response is determined at 5042. If the response is a success at 5042, the process continues with step 5090. If the response is a failure at 5042, the terminating side AVM connection is freed, and the count of connections is decremented at 5044. A DCQ is sent, and the process waits for a DCR at 5046. The termination re-attempt process is started at 5048, and idle is attained at 5050.

The terminating AVM available capacity is determined at 5052. If no capacity is available at 5052, a log is sent to maintenance at 5054. The OM is pegged at 5056. The originating side AVM connection is freed, and the count of connection is decremented at 5058. A DCQ is sent, and the process waits for a DCR at 5060. The termination re-attempt process is started 5062, and idle is attained at 5064.

If the terminating AVM has available capacity at 5052, a busy AVM connection is established, and the count of connection is incremented at 5066. The EC requirements are processed at 5068. An ACQ is built and sent to the AVM with the EC requirements at 5070.

The process waits for an ACR at 5072. An ACR is received at 5074, and the OM is pegged at 5076. The connection type is type one for a TDM to TDM connection in which two AVMs, two DSPs, and one CAF are used at 5078. If the response is a success at 5080, the process continues at step 5090. If the response is a failure at 5080, the originating and terminating side AVM connections are freed, and the count of connections is decremented at 5082. The DCQs are sent for the originating and terminating connections, and the process waits for DCRs at 5084. The termination re-attempt process is started at 5086, and idle is attained at 5088.

The CAF available capacity is determined at 5090. If the CAF does not have available capacity at 5090, the OM is pegged at 5092. A log is sent to maintenance at 5094. The process continues at step 5102.

If the CAF has available capacity at 5090, a busy CAF connection is established, and the count of connections is incremented at 5096. A connection message (CON) is sent to the CAF at 5098. The process waits for a reply from the CAF at 5100.

The originating and terminating trunk group connection type are determined at 5102. If the connection type is equal to one at 5104 for a TDM to TDM connection in which two AVMs, two DSPs, and one CAF are used, a log is sent to maintenance at 5106. The OM is pegged at 5108. The originating side AVM connection is freed, and the count of connections is decremented at 5110. A DCQ is sent, and the process waits for a DCR at 5112. The terminating side AVM connection is freed, and the count of connections is decremented at 5114. A DCQ is sent, and the process waits for a DCR at 5116. The termination re-attempt process is started at 5118, and idle is attained at 5120.

If the connection type at 5102 is connection type three at 5122 for a TDM to ATM connection in which one AVM, one DSP, and one CAF are used, a log is sent to maintenance at 5124. The OM is pegged at 5126. The originating side AVM connection is freed, and the count of connections is decremented at 5128. The DCQ is sent, and the process waits for a DCR at 5130. The termination re-attempt process is started at 5132, and idle is attained at 5134.

If the connection type at 5102 is connection type four at 5136 for an ATM to TDM connection in which one AVM, one DSP, one CAF are used, a log is sent to maintenance at 5138. The OM is pegged at 5140. The terminating side AVM connection is freed, and the count of connections is decremented at 5142. A DCQ is sent, and the process waits for a DCR at 5144. The termination re-attempt process is started at 5146, and idle is attained at 5148.

If the connection type at 5102 is connection type five at 5150 for an ATM to ATM connection in which no AVMs, no DSPs, and one CAF are used, a log is sent to maintenance at 5152. The OM is pegged at 5154. The termination re-attempt process is started at 5156, and idle is attained at 5158.

The process waits for a reply from the CAF at 5160. A CAF CON reply is received at 5162. If the originating and terminating trunk group connection type at 5164 is connection type one at 5 166 for a TDM to TDM connection in which two AVMs, two DSPs, and one CAF are used, the success or failure for the response is determined at 5168.

If the response is a success at 5168, the process continues at step 5226. If the response is a failure at 5168, a log is sent to maintenance at 5170. The OM is pegged at 5172. The CAF connection is freed, and the count of connections is decremented at 5174. The originating side of the AVM connection is freed, and the count of connections is decremented at 5176. A DCQ is sent, and the process waits for a DCR at 5178. The terminating side AVM connection is freed, and the count of connections is decremented at 5180. A DCQ is sent, and the process waits for a DCR at 5182. The termination re-attempt process is started at 5184, and idle is attained at 5186.

If the connection type at 5164 is connection type three at 5188 for a TDM to ATM connection in which one AVM, one DSP, and one CAF are used, the success or failure for the response is determined at 5190. If the response is a success at 5190, the process continues at step 5280. If the response is a failure at 5190, a log is sent to maintenance at 5192. The OM is pegged at 5194. The CAF connection is freed, and the count of connections is decremented at 5196. The originating side AVM connection is freed, and the count of connections is decremented at 5198. A DCQ is sent, and the process waits for a DCR at 5200. The termination re-attempt process is started at 5202, and idle is attained at 5204.

If the connection type at 5164 is connection type four at 5206 for an ATM to TDM connection in which one AVM, one DSP, and one CAF are used, the success or failure of the response is determined at 5208. If the response is a success at 5208, the process continues at step 5226. If the response is a failure at 5208, a log is sent to maintenance at 5210. The OM is pegged at 5212. The CAF connection is freed, and the count of connections is decremented at 5214. The terminating side of the AVM connection is freed, and the count of connections is decremented at 5216. A DCQ is sent, and the process waits for a DCR at 5218. The termination re-attempt process is started at 5220, and idle is attained at 5222.

If the connection type at 5164 is connection type five at 5224, the connection is an ATM to ATM connection in which no AVMs, no DSPs, and one CAF are used. The process continues with step 5280.

At step 5226, the terminating trunk is a TDM trunk, and the trunk group table is checked for the COT requirements on the terminating trunk. Call processing performs a percentage calculation at 5228. Call processing counts the number of calls that have been made between the last continuity check and this call on a per trunk group basis. Depending on the value placed in the trunk group table for the continuity check requirements, the count will determine when the next continuity check needs to be made. The value in the trunk group table identifies the percentage of calls in the trunk group that will require a continuity check.

A terminating circuit selection success is returned to the origination call process with the trunk group number at 5230. The message mapping requirements for this call are determined at 5232.

If an outgoing COT is not required for this trunk at 5234, an IAM is sent out the terminating circuit without the continuity check at 5236. The voice path is connected to the originating circuit for ring back at 5238. The OM is pegged at 5240. The message mapping table is checked from the routing table to determine if an EXM should be sent forward to the succeeding switch at 5242. If an EXM should be sent to the succeeding switch at 5244, the message mapping is checked from the trunk group table to see if the EXM is required to be sent back to the preceding switch at 5246. If the EXM is to be sent to the preceding switch at 5248, the EXM information is forwarded to the origination call process at 5250.

After step 5250 or if an EXM is not to be sent to the succeeding switch at 5244 or to the preceding switch at 5248, it is determined if the terminating trunk group voice path cut through is immediate at 5252. If the voice path cut through is immediate at 5252, the voice path is connected to the terminating circuit at 5254. After step 5254 or if the voice path cut through is not immediate at 5252, the Tacm timer (T7) is started at 5256. The process then continues at step 5556.

If an outgoing COT is required for this trunk at 5234, an IAM is sent out the terminating circuit with a continuity check at 5258. The voice path is connected to the originating circuit for ring back at 5260. The OM is pegged at 5262, and the outgoing COT check process is started at 5264. The message mapping is checked from the routing table to see if an EXM should be sent forward to the succeeding switch at 5266. If an EXM is to be sent to the succeeding switch at 5268, the message mapping is checked from the trunk group table to see if the EXM is required to be sent back to the preceding switch at 5270. If the EXM is to be sent to the preceding switch at 5272, the EXM information is forwarded to the origination call process at 5274. After step 5274 or if the EXM is not to be sent to the succeeding switch at 5268 or the preceding switch at 5272, the Tcot-otg timer for the outgoing COT is started at 5276. The Tacm (T7) timer is started at 5278. The process then continues at step 5328.

At 5280, the OM is pegged. The message mapping for this call is determined from the routing table at 5282. An IAM is sent out the terminating circuit without a continuity check at 5284. The voice path is connected to the originating circuit for ring back at 5286. The terminating circuit selection success is returned with a trunk group member number to the origination call process at 5288. Message mapping is checked from the routing table to determine if the EXM should be sent forward to the succeeding switch at 5290.

If the exit message is to, be sent to the succeeding switch at 5292, the message mapping is checked from the trunk group table to determine if the EXM is required to be sent back to the preceding switch at 5294. If the EXM is to be sent back to the preceding switch at 5296, the EXM information is forwarded to the origination call process at 5298. After step 5298 or if the EXM is not to be sent to the succeeding switch at 5292 or the preceding switch at 5296, it is determined if the terminating trunk group voice path cut through is immediate at 5300. If the voice path cut through is immediate at 5300, the voice path is connected to the terminating circuit at 5302. After step 5302 or if the voice path cut through is not immediate at 5300, the Tacm timer (T7) is started at 5304. The process continues at step 5566.

Termination Re-attempt Process

Figure 60:
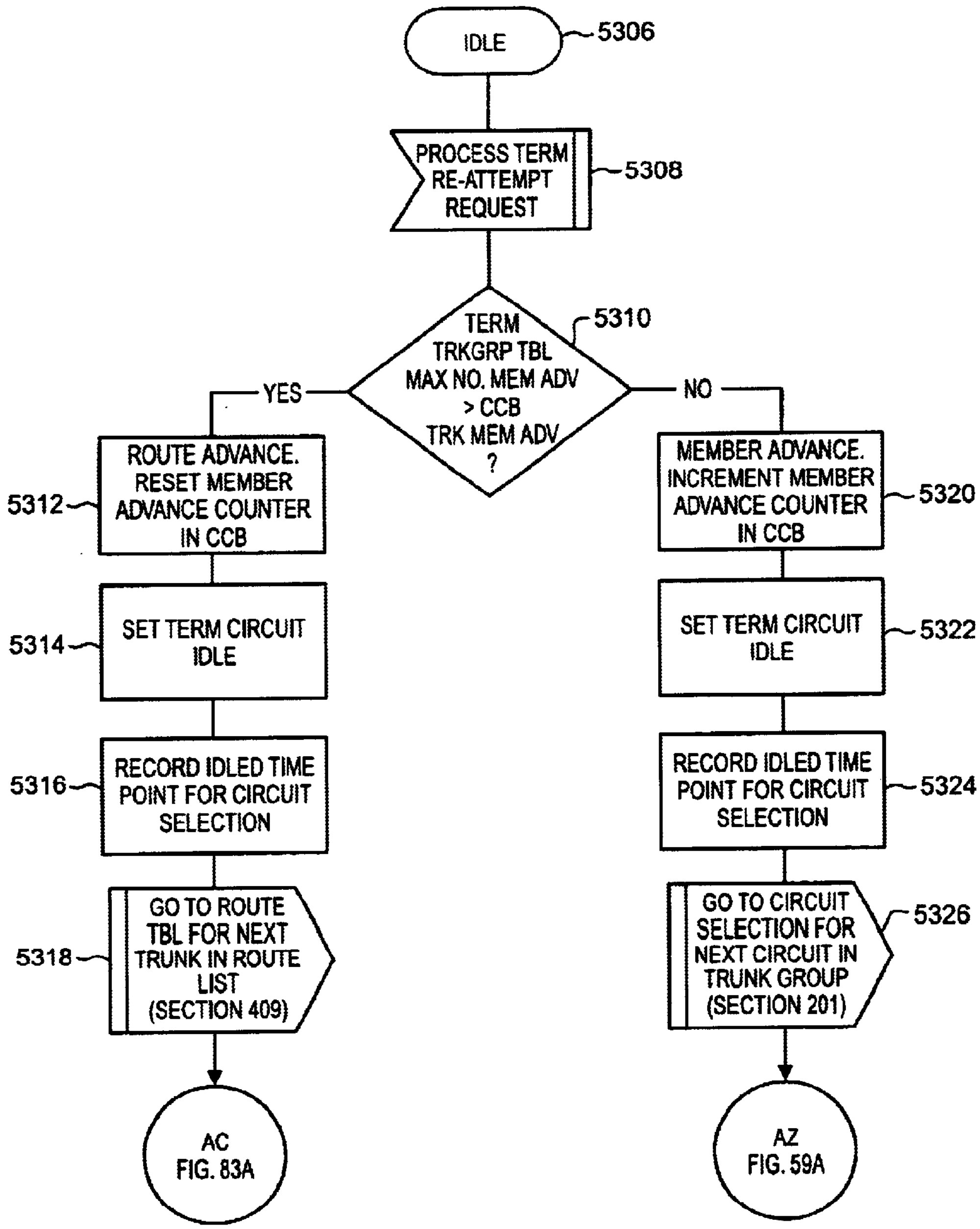
FIG. 60 is an SDL diagram of logic used in a version of the invention for the termination re-attempt process.
Figure 61A:
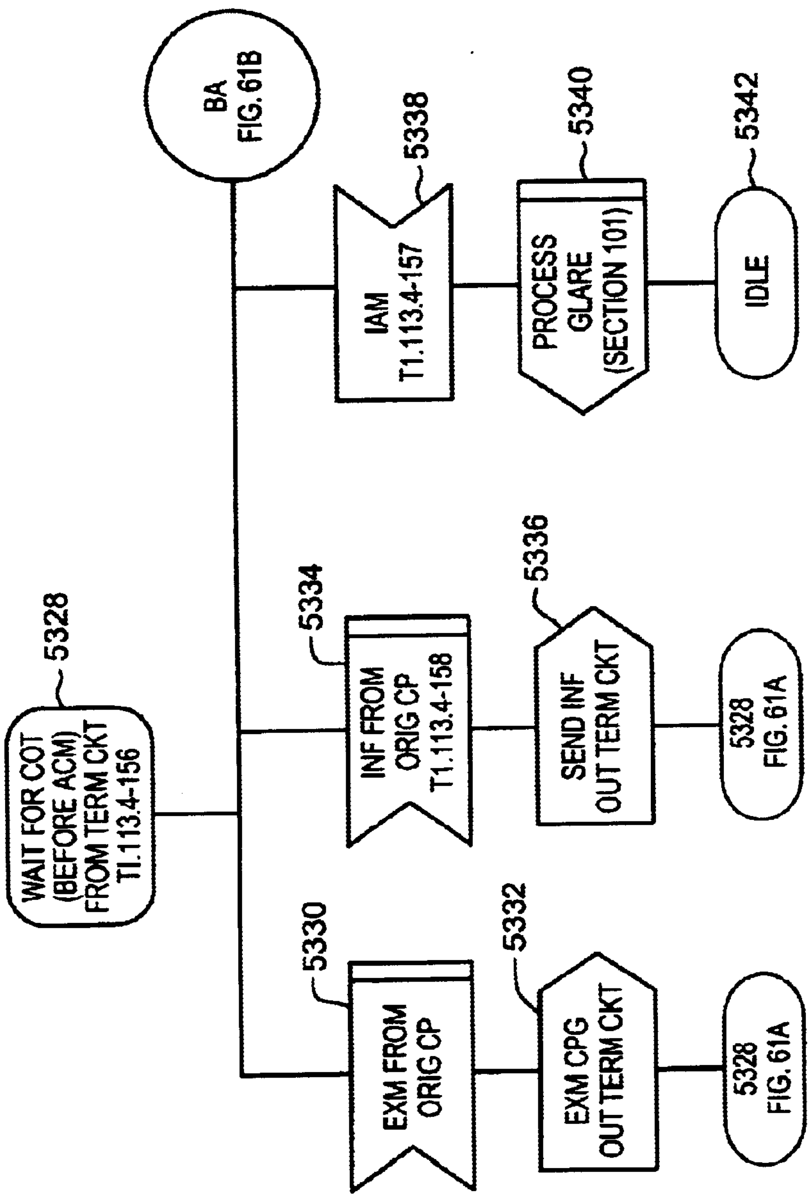
FIGS. 61A–61G are SDL diagrams of logic used in a version of the invention for processing a COT from a terminating circuit.
Figure 61B:
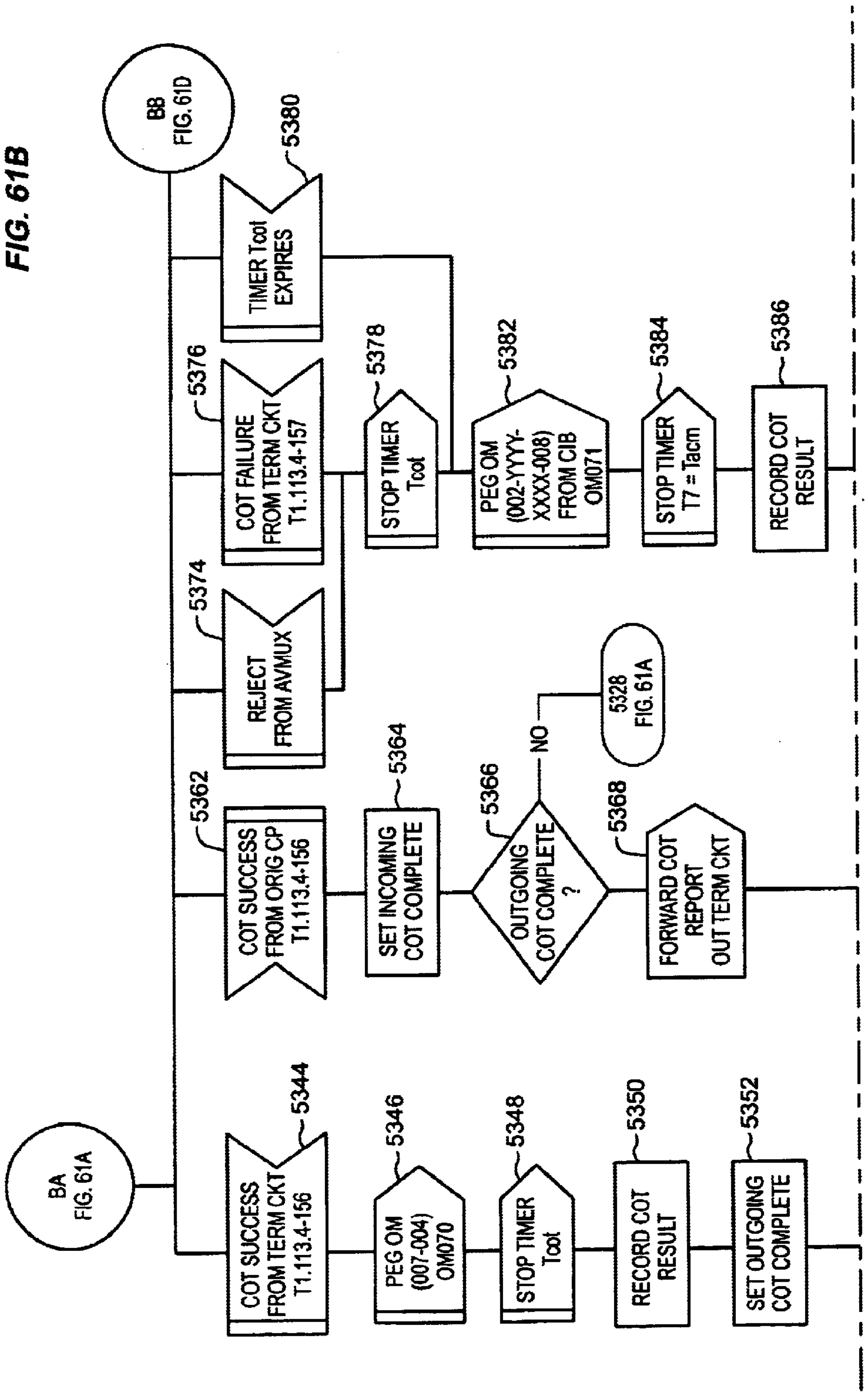
Figure 61C:
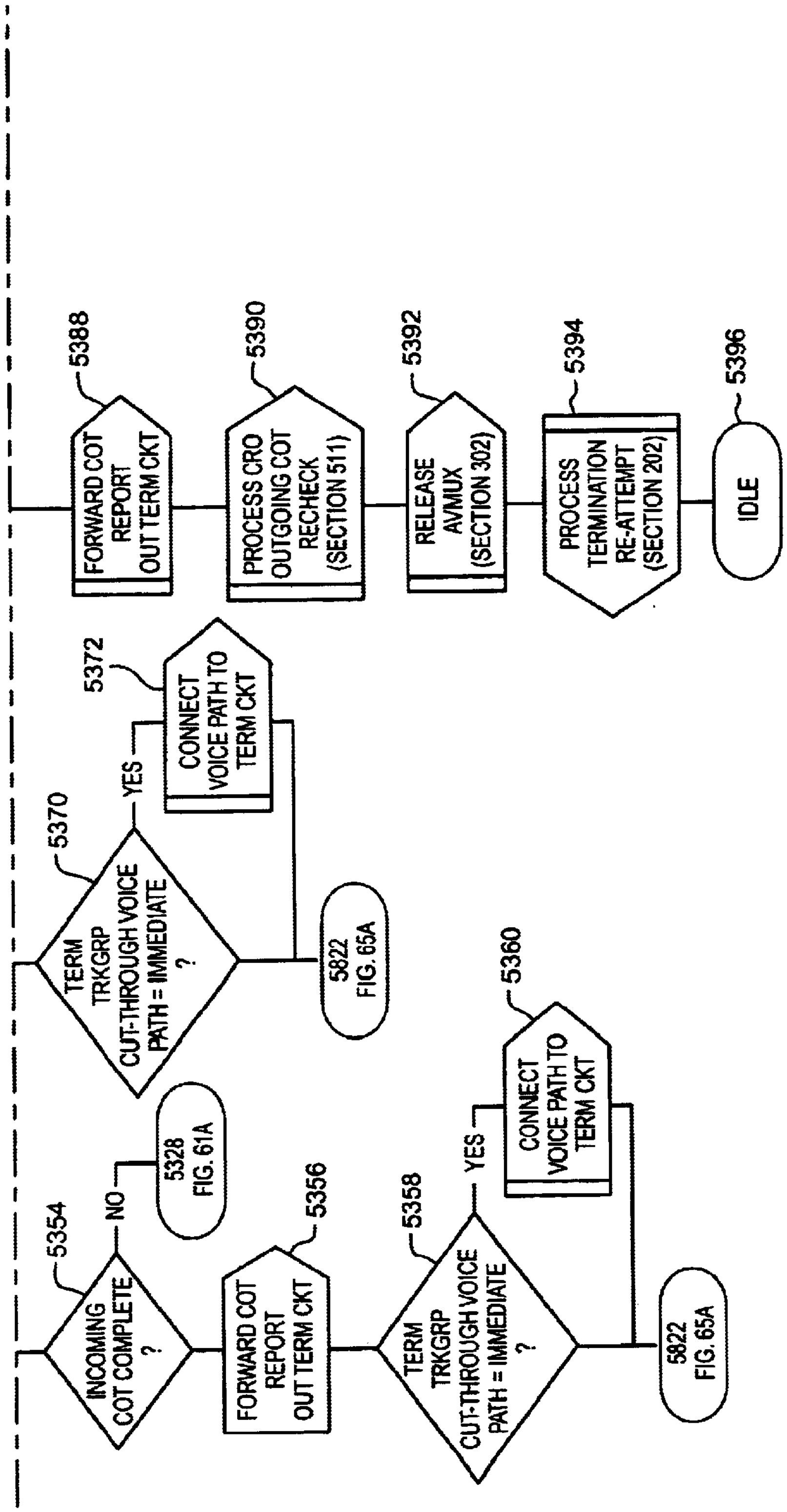
Figure 61D:
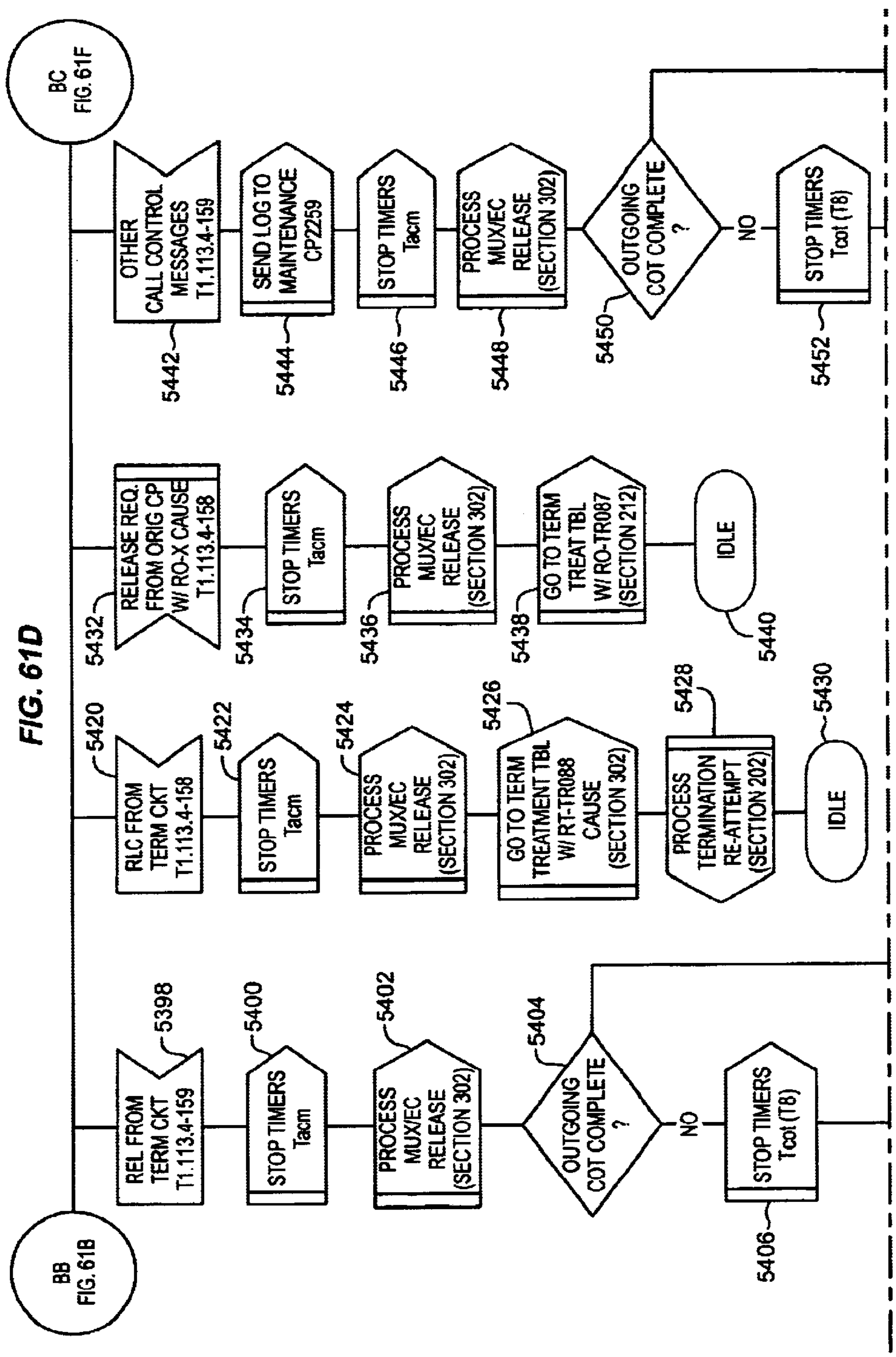
Figure 61E:
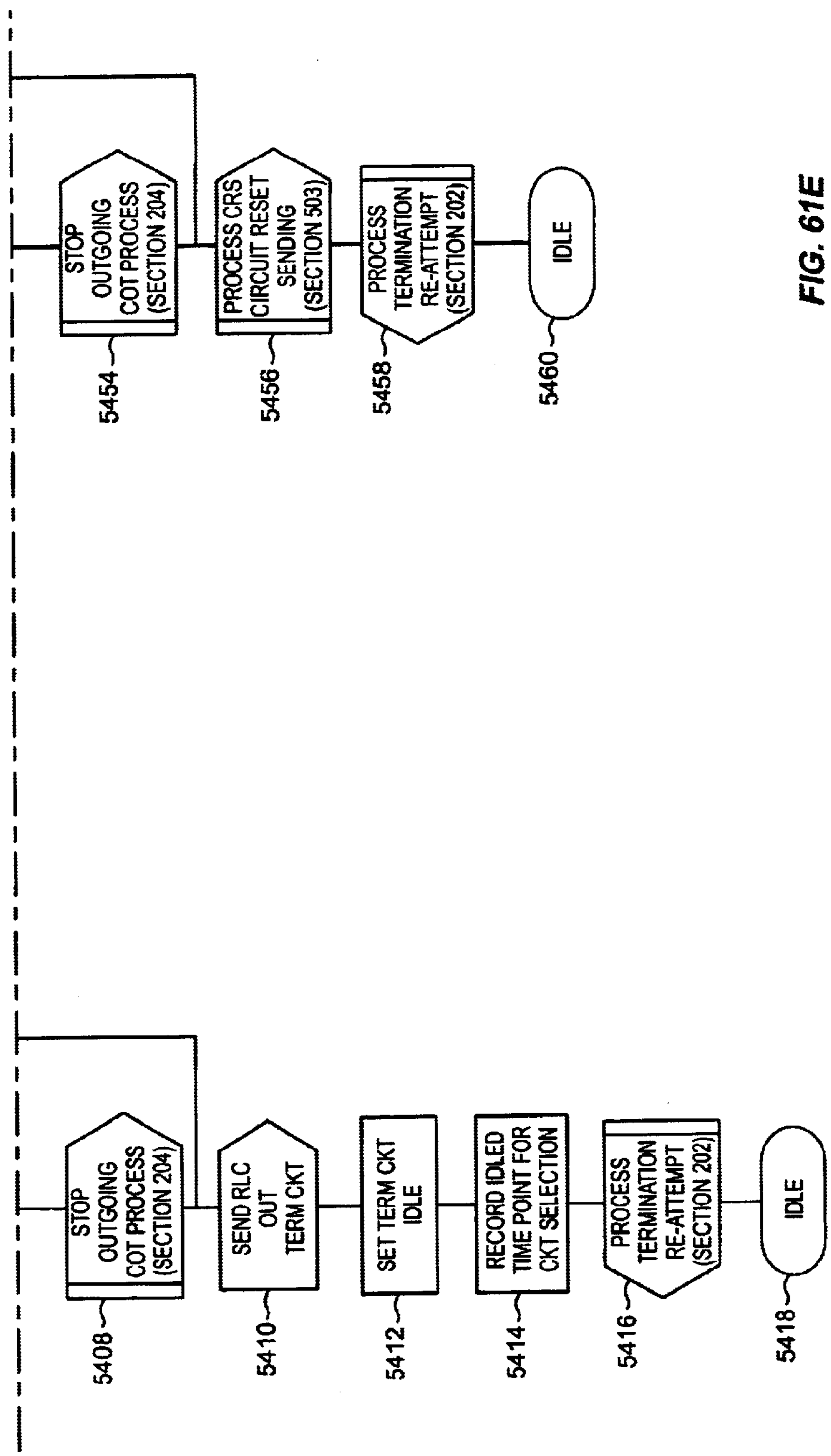
Figure 61F:
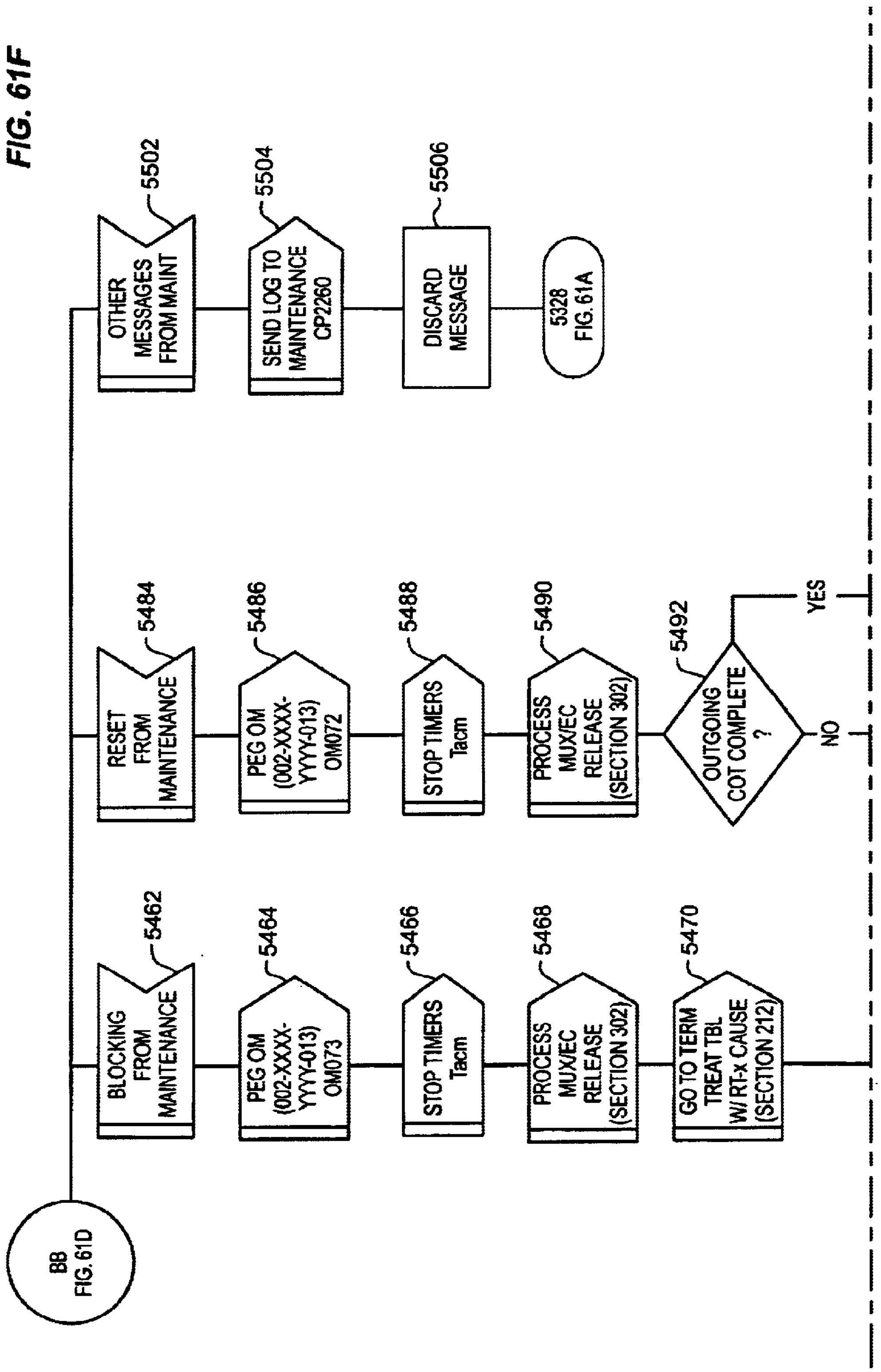
Figure 61G:
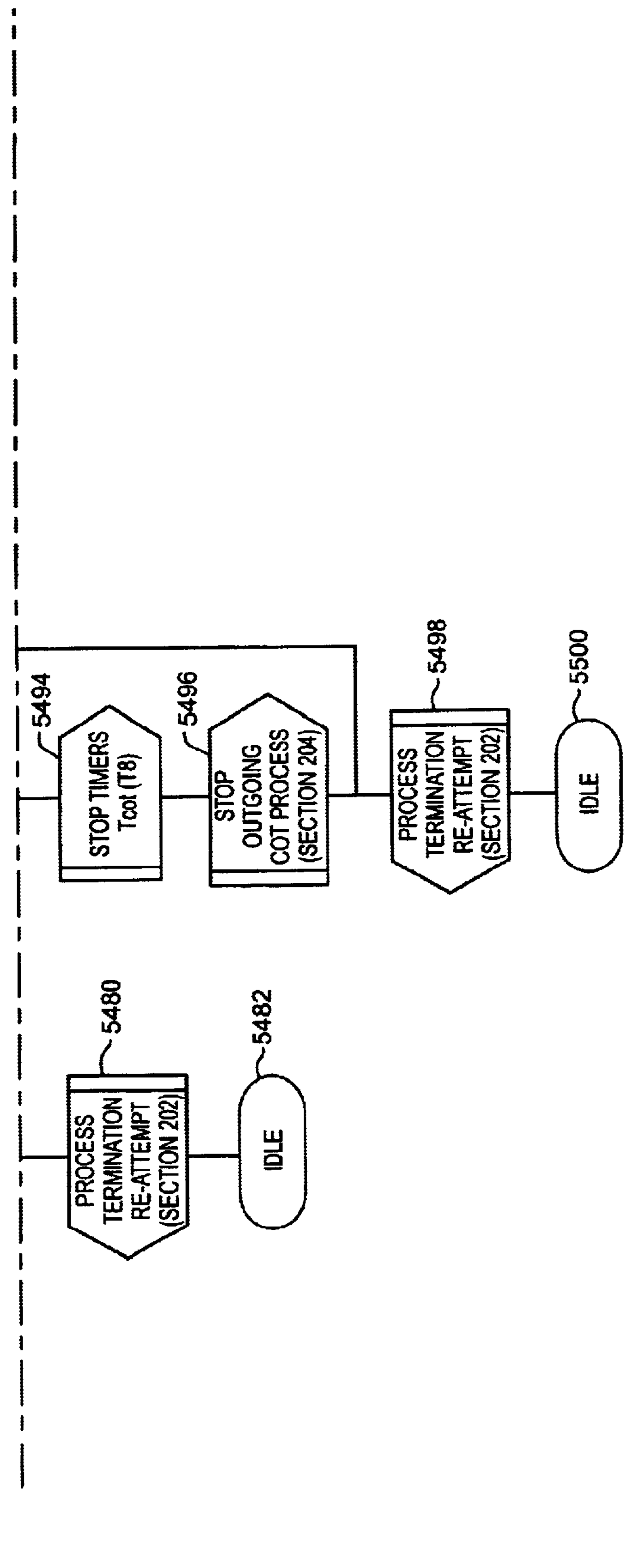

FIG. 60 depicts an example of the termination re-attempt processing for the termination call process. The process is idle at 5306. A termination re-attempt request is received at 5308. If the maximum number of member advances in the trunk group table for the terminating connection is greater than the trunk group member advance in the CIB control block at 5310, the route is advanced at 5312 so that the member advance counter in the CIB control block is reset. The terminating circuit is set to idle at 5314. The idle time point for circuit selection is recorded at 5316. The process then is sent to the routing table for the next trunk group in the routing list of 5318. The process continues at step 7632.

If the maximum number, of member advances in the trunk group table for the terminating circuit is less than the ,trunk group member advance in the CIB control block at 5310, the member is advanced so that the member advance counter in the CIB is incremented at 5320. The terminating circuit is set to idle at 5322. The idle time point for circuit selection is required at 5324, and the process is sent to the circuit selection for the next circuit in the trunk group at 5326. The process continues at step 4712.

COT Processing for the Termination Call Process

FIGS. 61A–61G depict an example of processing a COT from a terminating circuit before an ACM is received. At step 5328, the process is waiting for a COT from the terminating circuit before al ACM is received. In this state, the originating circuit is incoming busy, and the terminating circuit is transient. If an EXM is received from the origination call process at 5330, an RXM call progress message (CPG) is sent out the terminating circuit 5332. The process continues at step 5328.

If an INF is received from the origination call process at 5334, an INF is sent out the terminating circuit at 5336. The process continues at step 5328.

If an IAM is received at 5338, the glare process is started at 5340. Idle is attained at 5342.

If a COT success is received from the terminating circuit at 5344, the OM is pegged at 5346. The Tcot timer is stopped at 5348, and the COT result is recorded at 5350. The outgoing COT is set to complete at 5352. If the incoming COT is not complete at 5354, the process continues at step 5328. If the incoming COT is complete at 5354, a forward COT report is sent out the terminating circuit at 5356. If the terminating trunk group voice path cut through is immediate at 5358, the voice path is connected to the terminating circuit at 5360. After step 5360 or if the terminating trunk group voice path cut through is not immediate at 5358, the process continues at step 5822.

If a COT success is received from the origination call process at 5362, the incoming COT is set for complete at 5364. If the outgoing COT is not complete at 5366, the process continues at step 5328. If the outgoing COT is complete at 5366, the COT report is forwarded out the terminating circuit at 5368. If the terminating trunk group voice path cut through is immediate at 5370, the voice path is connected to the terminating circuit at 5372. After step 5372 or if the terminating trunk group voice path cut through is not immediate at 5370, the process continues at step 5822.

If a rejection is received from the AVM at 5374 or if a COT failure is received from the terminating circuit at 5376, the Tcot timer is stopped at 5378. After step 5378 or if the Tcot timer expires at 5380, the OM is pegged at 5382. The Tacm timer (T7) is stopped at 5384. The COT result is recorded at 5386, and the COT report is forwarded out the terminating circuit at 5388. The continuity re-check outgoing (CRO) process is started at 5390. A release is sent to the mux at 5392, and the termination re-attempt process is started at 5394. Idle is attained at 5396.

If an REL is received from the terminating circuit at 5398, the Tacm timer is stopped at 5400. The mux/echo cancellation release process is started at 5402. If the outgoing COT process is not complete at 5404, the Tcot timer (T8) is stopped at 5406. The outgoing COT process is stopped at 5408. After step 5408 or if the outgoing COT process is complete at 5404, an RLC is sent out the terminating circuit at 5410. The terminating circuit is set to idle at 5412, and the idle time point for circuit selection is recorded at 5414. The termination re-attempt process is started at 5416, and idle is attained at 5418.

If an RLC is received from the terminating circuit at 5420, the Tacm timer is stopped at 5422. The mux/echo cancellation release process is started at 5424, and the process is sent to the treatment table for the terminating process at 5426. The termination re-attempt process is started at 5428, and idle is attained at 5430.

If a release request is received from the origination call process at 5432, the Tacm timer is stopped at 5434. The mux/echo cancellation release process is started at 5436, and the process is sent to the treatment table for the termination call process at 5438. Idle is attained at 5440.

If other call control messages are received at 5442, a log is sent to maintenance at 5444. The Tacm timer is stopped at 5446, and the mux/echo cancellation release process is started at 5448. If the outgoing COT process is not complete at 5450, the Tcot timer (T8) is stopped at 5452. The outgoing COT process is stopped at 5454. After step 5454 or if the outgoing COT process is complete at 5450, the CRS process is started at 5456. The termination re-attempt process is started at 5458, and idle is attained at 5460.

If blocking message is received from maintanance at 5462, the OM is pegged at 5464. The Tacm timer is stopped at 5466, and the mux/echo cancellation release process is started at 5468. The process is sent to the treatment table at 5470. The termination re-attempt process is started at 5480, and idle is attained at 5482.

If a reset is received for maintenance at 5484, the OM is pegged at 5486. The Tacm timer is stopped at 5488, and the mux/echo cancellation release process is started at 5490. If the outgoing COT process is not complete at 5492, the Tcot timer (T8) is stopped at 5494. The outgoing COT process is stopped at 5496. After step 5496 or if the outgoing COT process is complete at 5492, the termination re-attempt process is started at 5498. Idle is attained at 5500.

If other messages are received for maintenance at 5502, a log is sent to maintenance at 5504. The message is discarded at 5506. The process continues at step 5328.

Continuity Check Processing for the Termination Call Process

Figure 62A:
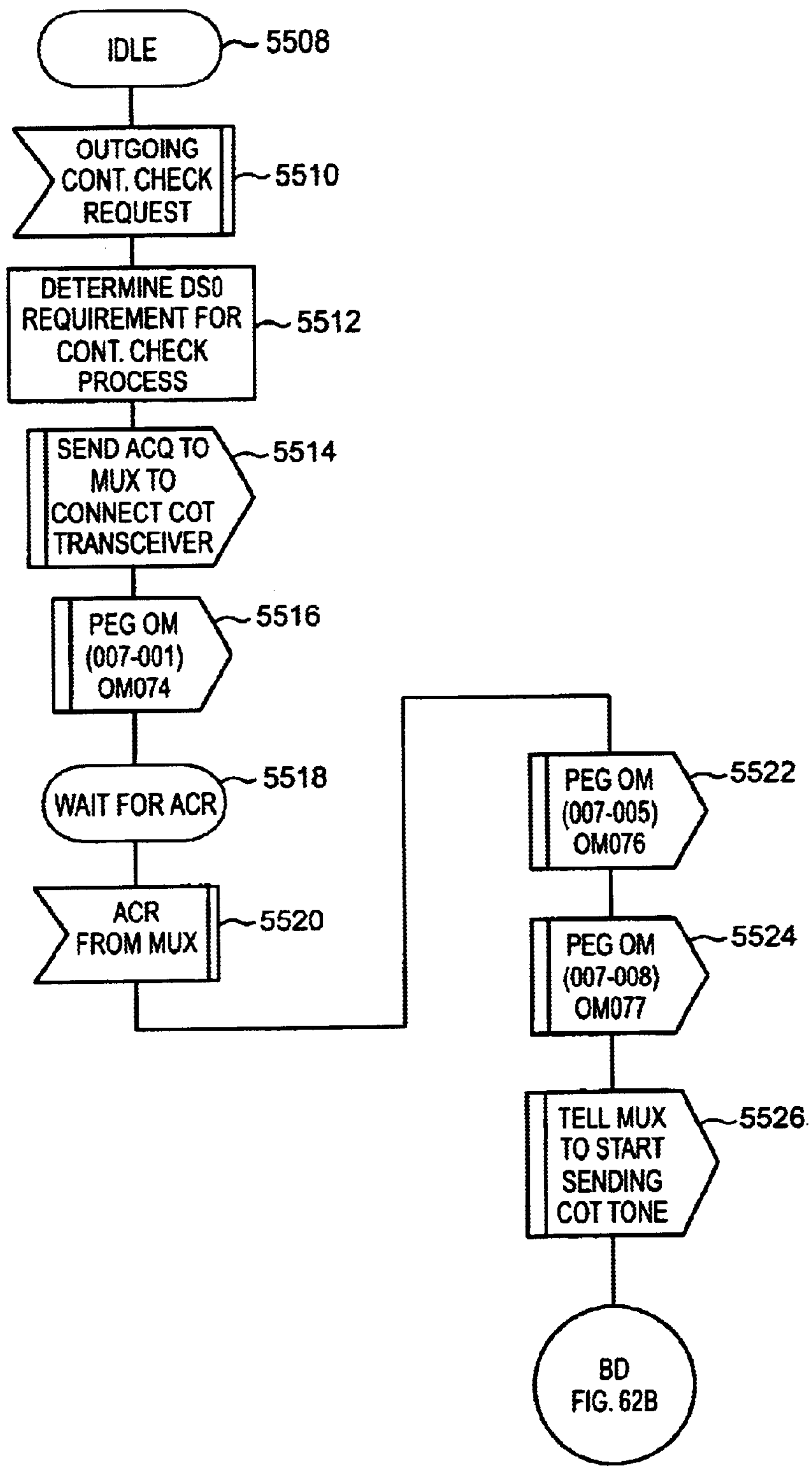
FIGS. 62A–62B are SDL diagrams of logic used in a version of the invention for COT processing for the termination process.
Figure 62B:
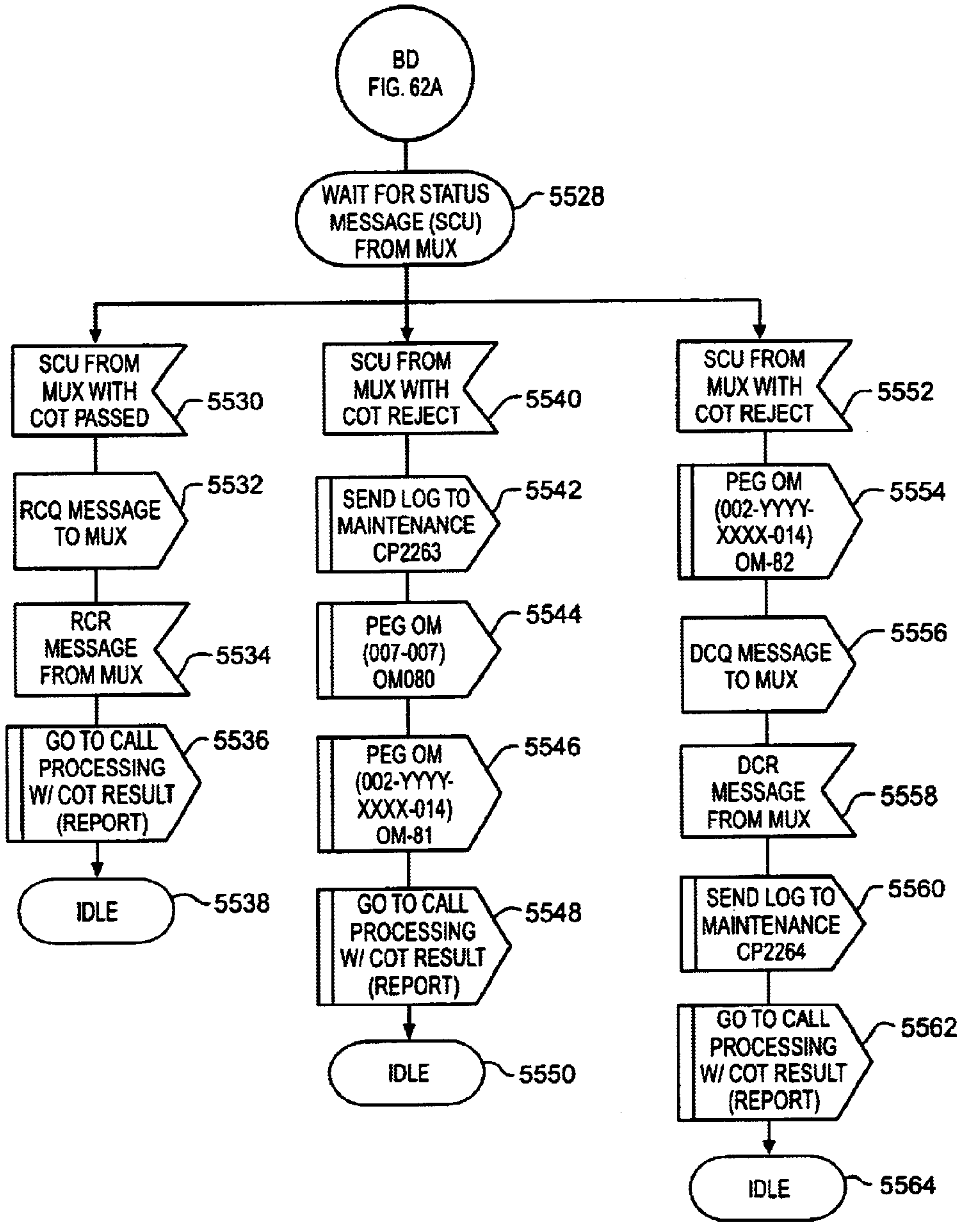
Figure 63A:
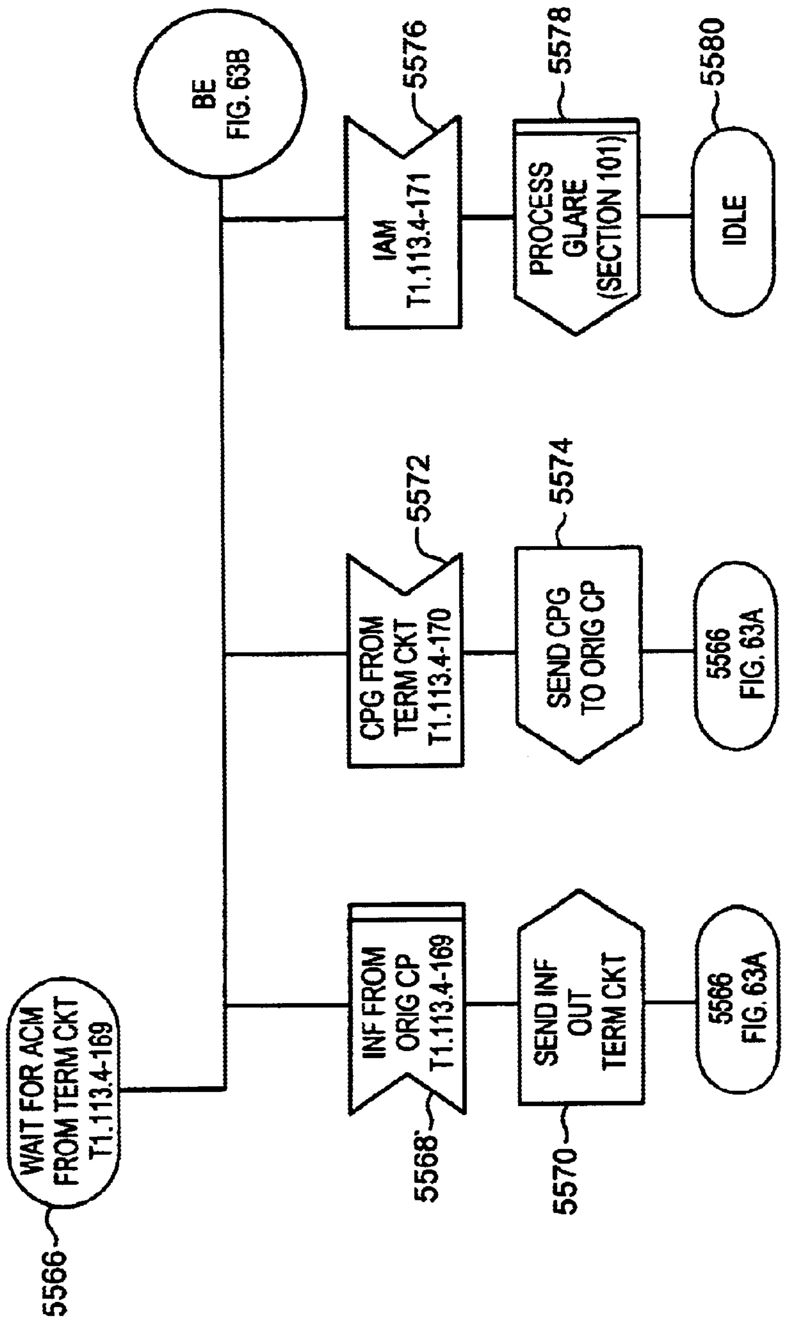
FIGS. 63A–63F are SDL diagrams of logic used in a version of the invention for ACM processing for the termination process.
Figure 63B:
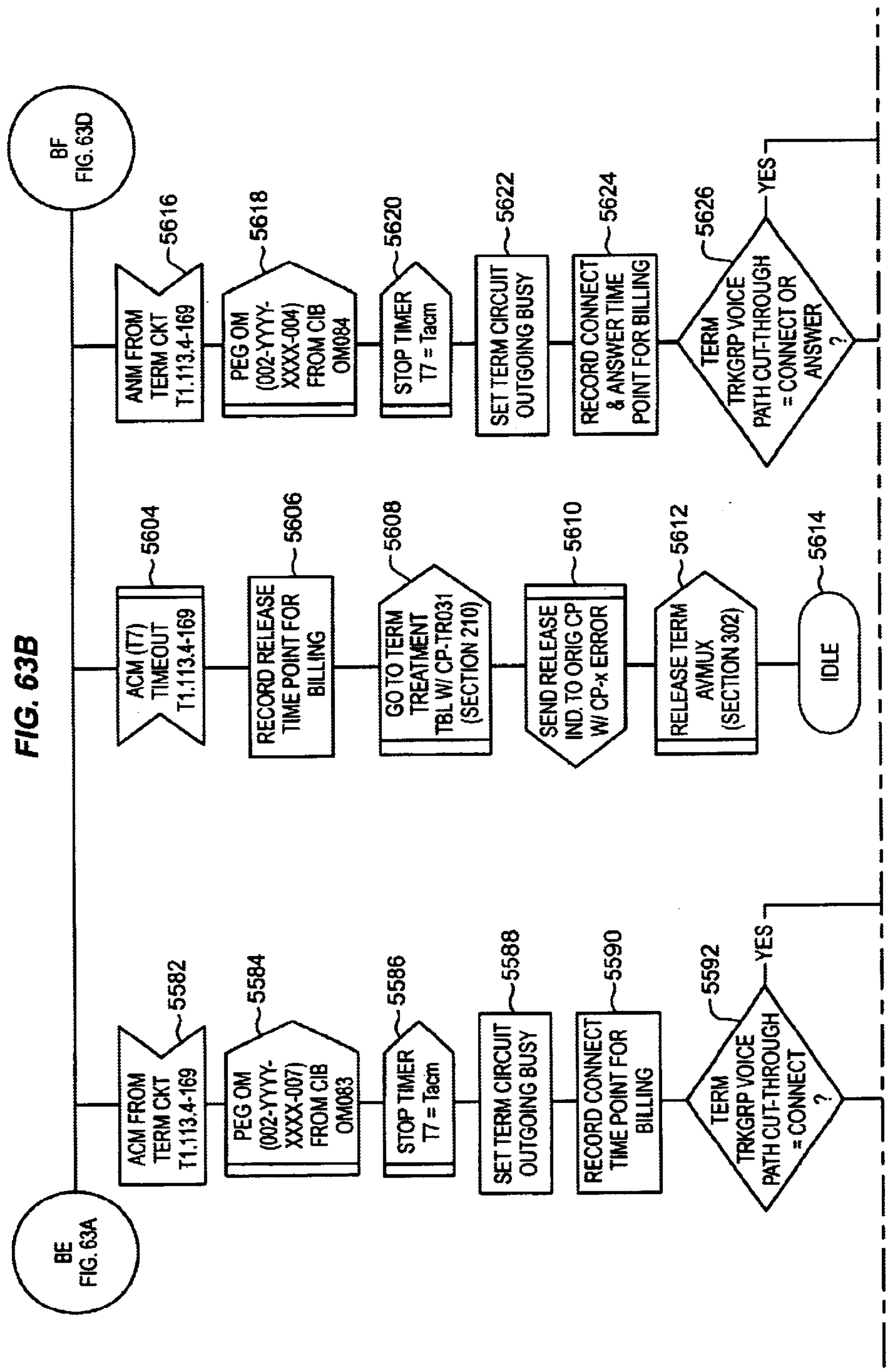
Figure 63C:
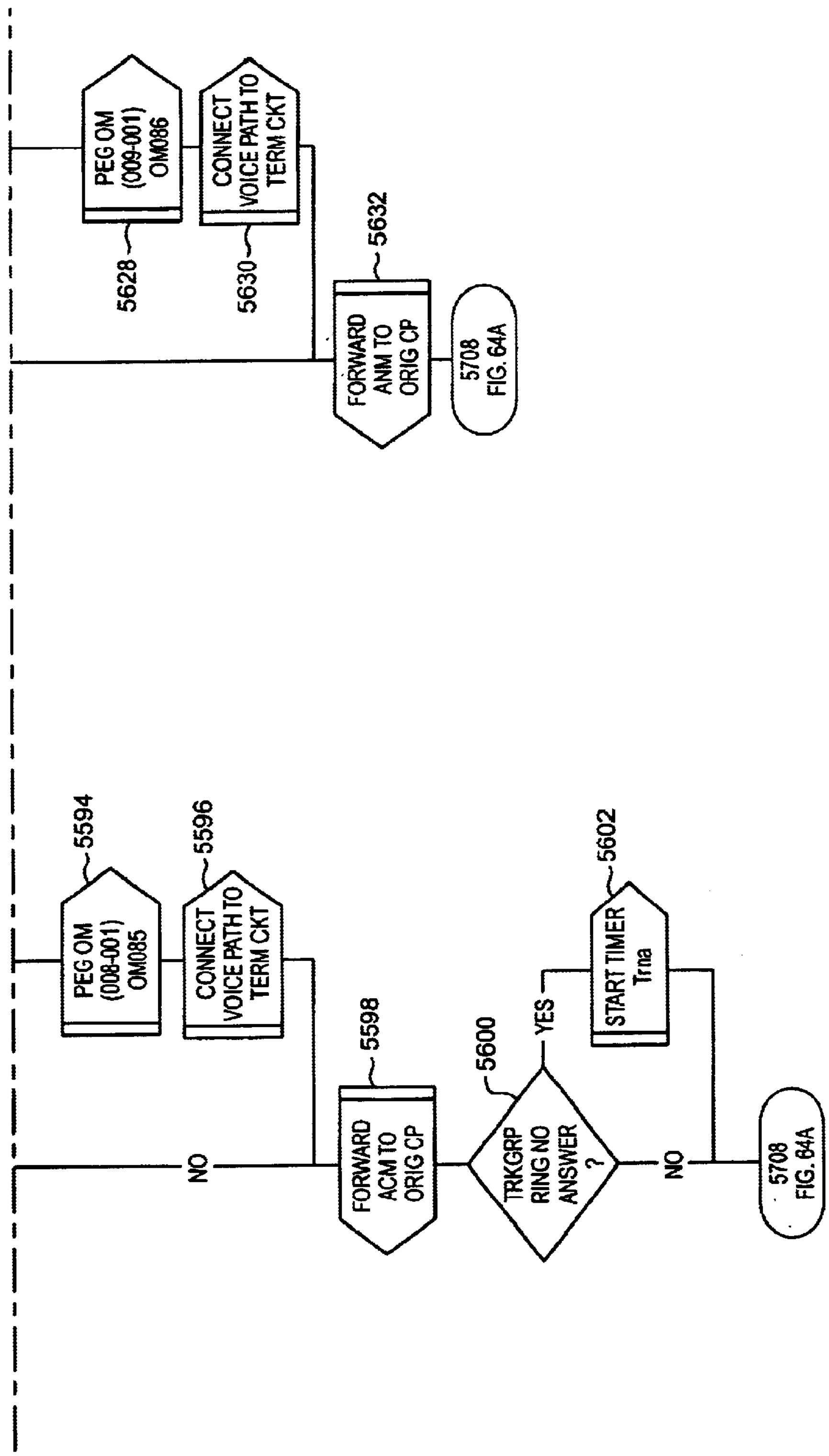
Figure 63D:
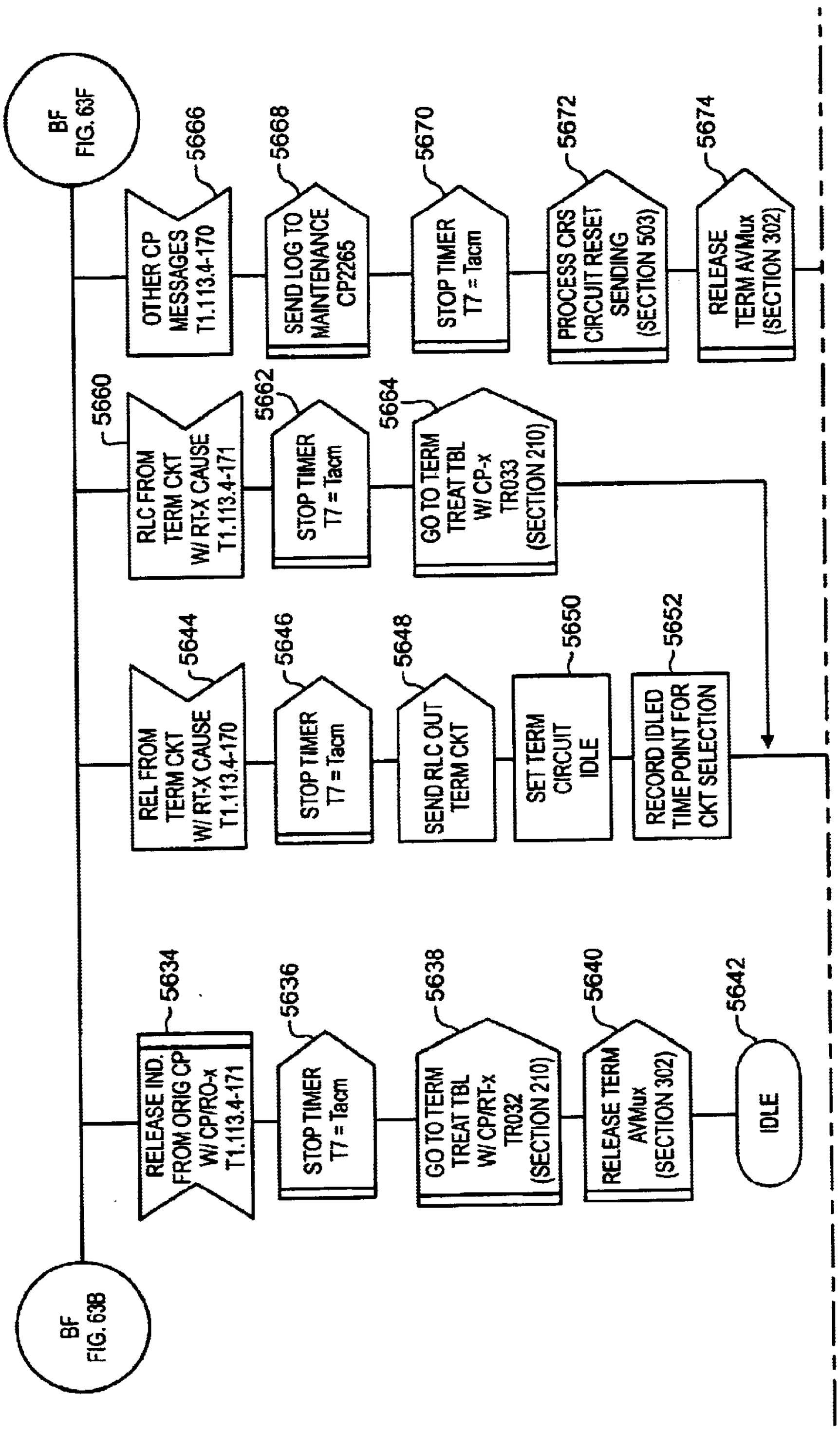
Figure 63E:
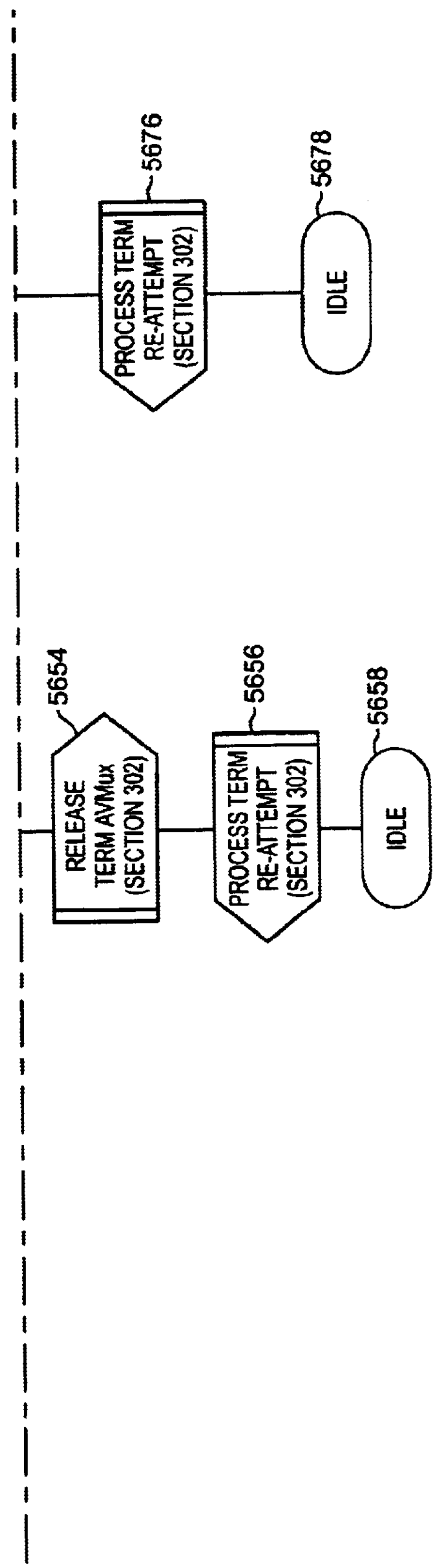
Figure 63F:
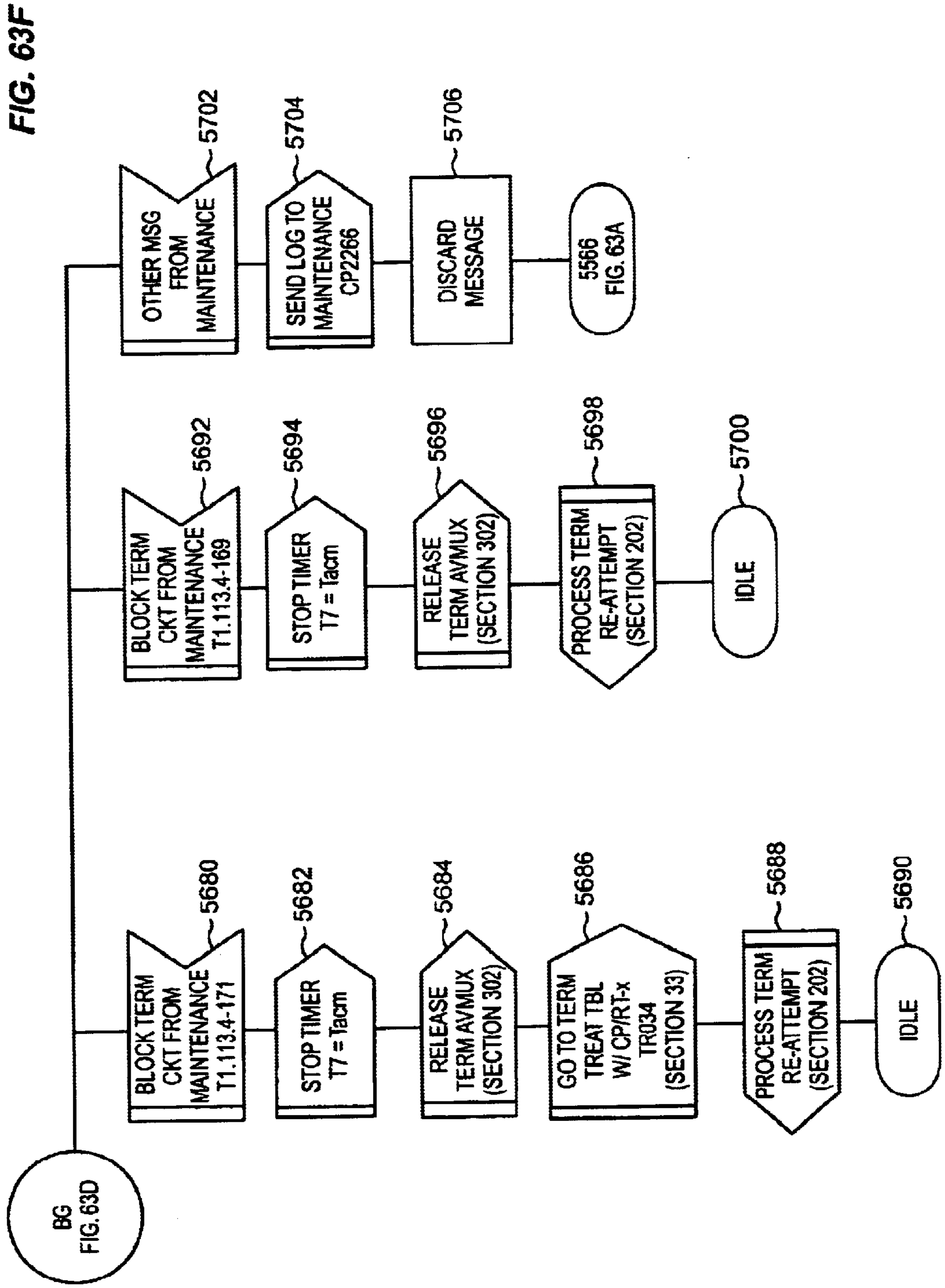
Figure 64A:
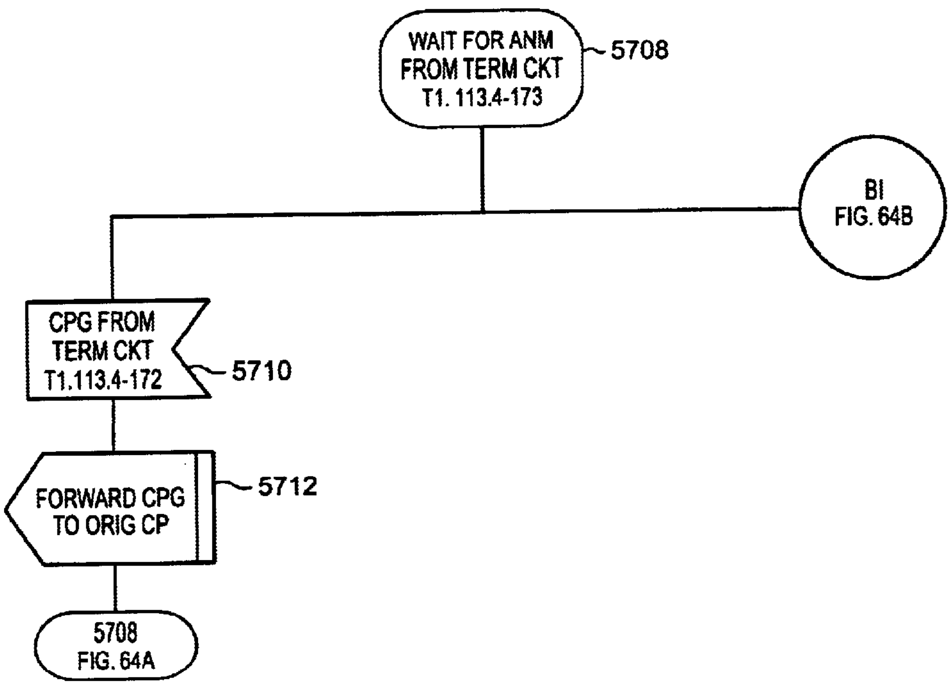
FIGS. 64A–64E are SDL diagrams of logic used in a version of the invention for ANM processing for the termination process.
Figure 64B:
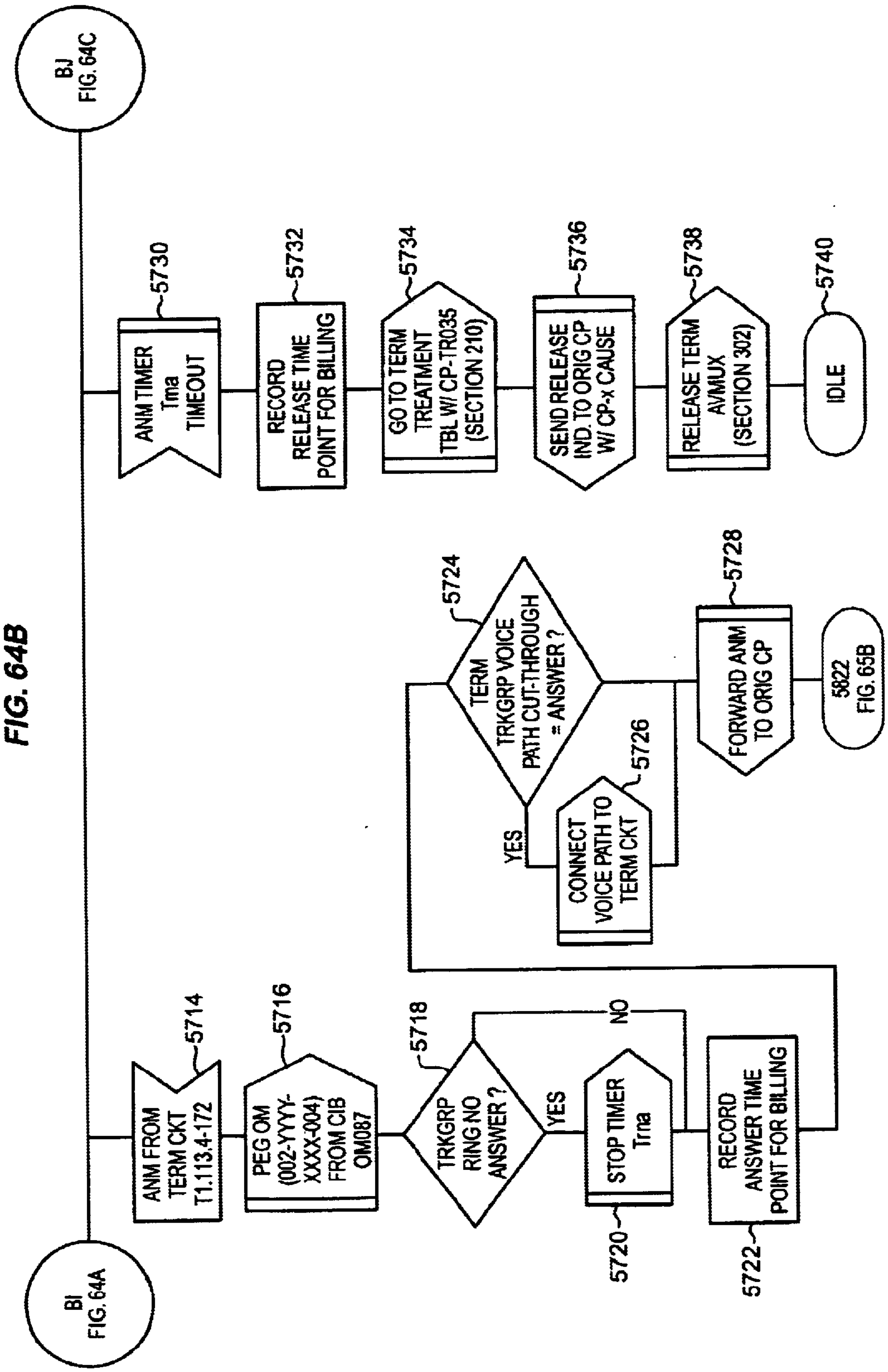
Figure 64C:
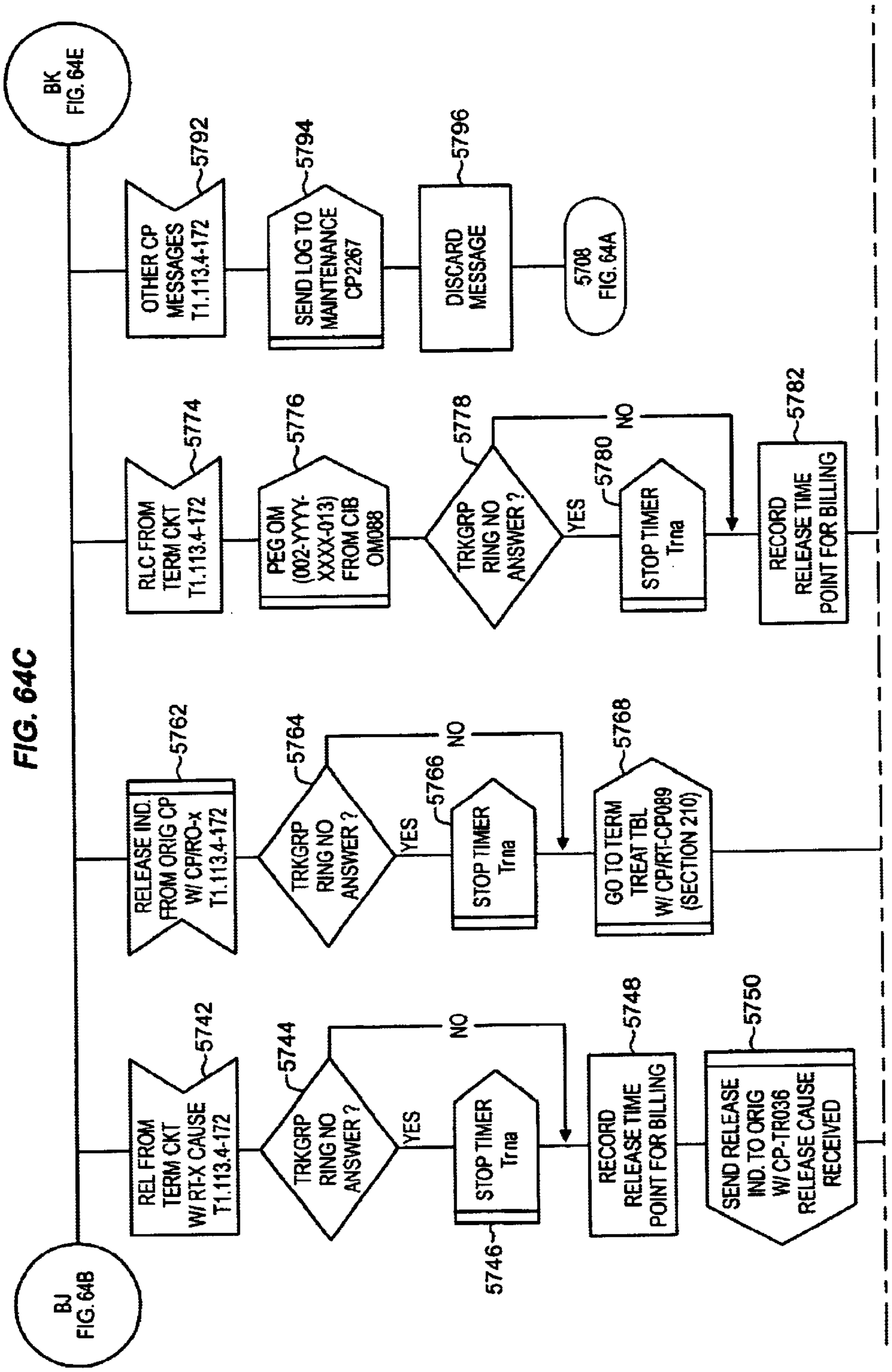
Figure 64D:
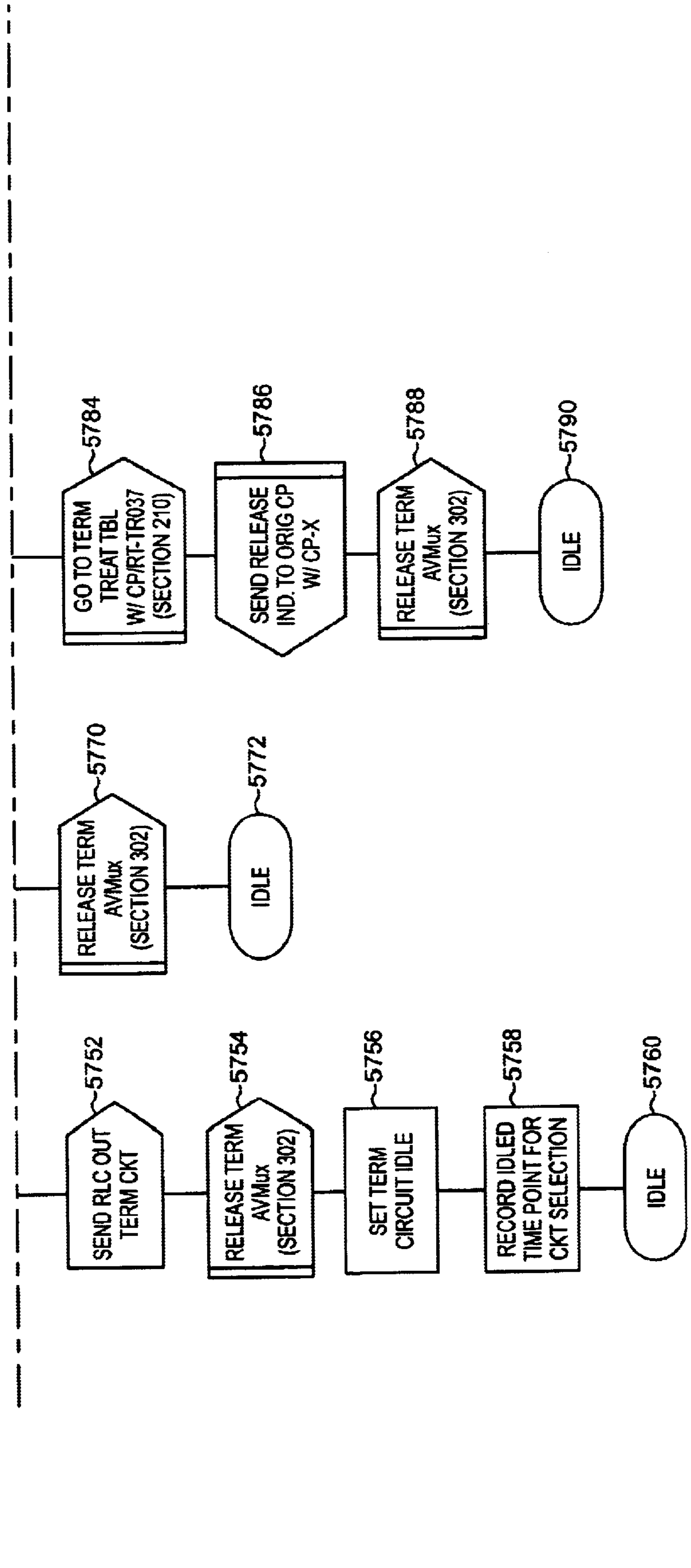
Figure 64E:
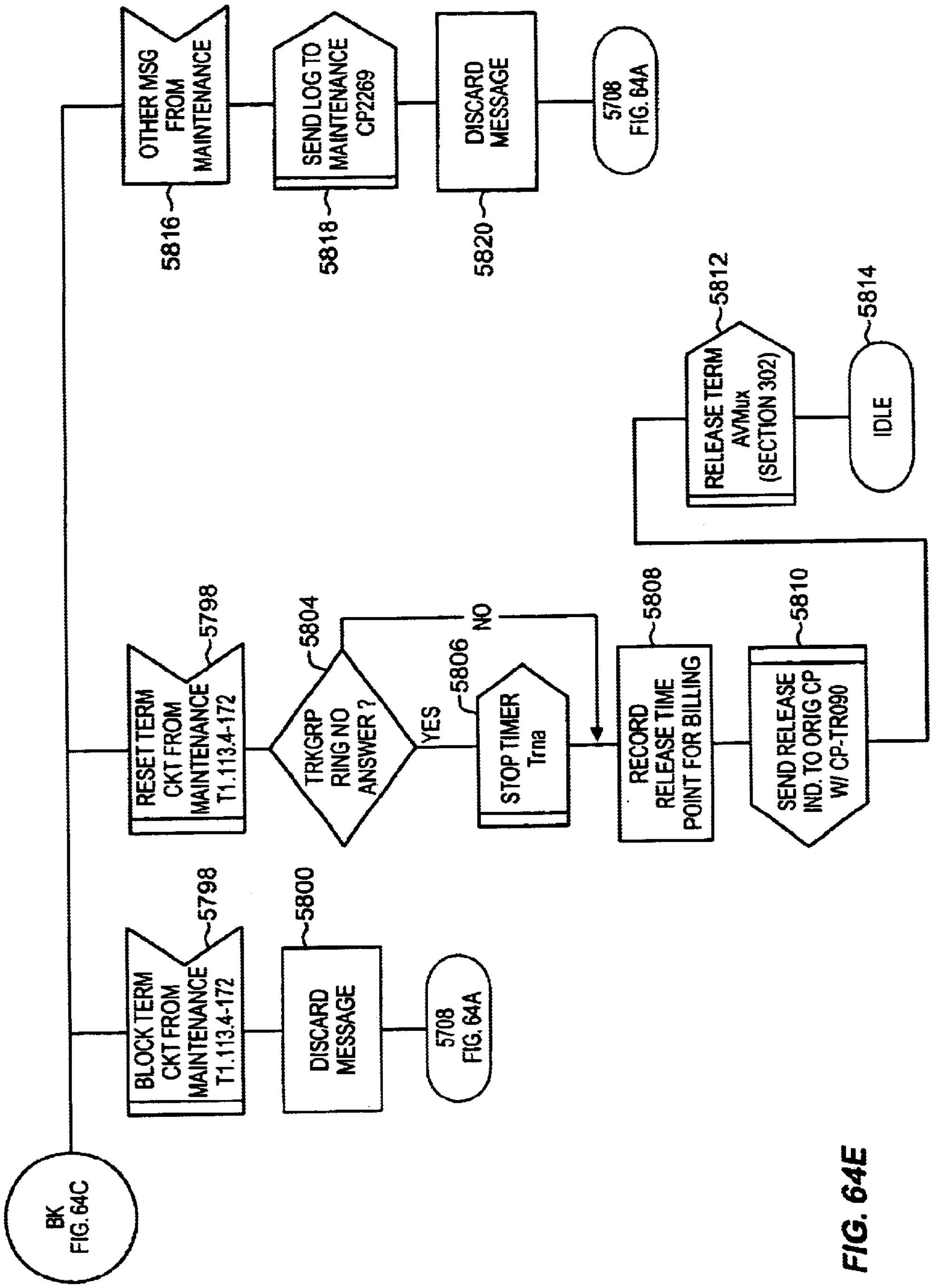

FIGS. 62A–62B depict continuity check processing for the termination call process. The process is idle at 5508. If an outgoing continuity check request is received at 5510, the DS0 requirement for the continuity check process is determined at 5512. An ACQ is sent to the mux to connect the COT transceiver to the outgoing circuit at 5514. In addition, this will result in the EC being turned off in the mux for the time that the COT process is used. The OM is pegged at 5516, and the process waits for an ACR at 5518.

The ACR is received from the mux at 5520, and the OM is pegged at 5522 and 5524. A message is sent to the mux instructing it to start sending the COT tone at 5526.

The process waits for a status message (SCU) from the mux at 5528. If an SCU is received from the mux specifying that the COT passed at 5530, a reconfigure connection query message (RCQ) is sent to the mux at 5532. If a reconfigure connection response message (RCR) is received from the mux at 5534, the process is sent to call processing with the COT result at 5536. Idle is attained at 5538.

If an SCU is received from the mux specifying that the COT was rejected at 5540, a log is sent to maintenance at 5542. The OM is pegged at 5544 and 5546, and the call is sent to call processing with the COT result at 5548. Idle is attained at 5550.

If an SCU is received from the mux signifying that the COT failed at 5552, the OM is pegged at 5554. A DCQ is sent to the mux at 5556, and a DCR is received from the mux at 5558. A log is sent to maintenance at 5560. The process is sent to call processing with the COT result at 5562, and idle is attained at 5564.

ACM Processing for the Termination Call Process

FIGS. 63A–63F depict ACM processing for the termination call process. At step 5566, the process is waiting for an ACM from the terminating circuit. If an INF is received from the origination call process at 5568, the INF is sent out the terminating circuit at 5570. The process then continues at 5566.

If a CPG is received from the terminating circuit at 5572, the CPG is sent to the origination call process at 5574. The process then continues at step 5566. If an IAM is received at 5576, the glare process is started at 5578. Idle then is attained at 5580.

If an ACM is received from the terminating circuit at 5582, the OM is pegged at 5584. The Tacm timer (T7) is stopped at 5586. The terminating circuit is set to outgoing busy at 5588, and the connect time point is recorded for billing at 5590. If the terminating trunk group voice path cut through is connected at 5592, the OM is pegged at 5594. The voice path is cut through to the terminating circuit at 5596. After step 5596 or if the terminating trunk group voice path cut through is not connected at 5592, the ACM is forwarded to the origination call process at 5598. If the trunk group is set for ring no answer at 5600, the Trna timer is started at 5602. After step 5602 or if the trunk group is not set for ring no answer at 5600, the process continues at step 5708.

If the Tacm timer (T7) times out at 5604, the release time point is recorded for billing at 5606. The process is sent to the treatment table for the termination call process at 5608. A release indicator is sent to the origination call process at 5610, and a release is sent to the terminating mux at 5612. Idle is attained at 5614.

If an ANM is received from the terminating circuit at 5616, the OM is pegged at 5618. The Tacm timer (T7) is stopped at 5620. The terminating circuit is set to outgoing busy at 5622, and the connection and the answer time points are recorded for billing at 5624. If the terminating trunk group voice path cut through is either connected or answered at 5626, the OM is pegged at 5628. The voice path is connected to the terminating circuit at 5630. After step 15630 or if the terminating trunk group voice path cut through is not connected and not answered at 5626, the ANM is forwarded to the origination call process at 5632. The process then continues at step 5708.

If a release indicator is received from the origination call process at 5634, the Tacm timer (T7) is stopped at 5636. The call is sent to the treatment table at 5638, and the release is sent to the terminating mux at 5640. Idle is attained at 5642.

If an REL is received from the terminating circuit at 5644, the Tacm timer (T7) is stopped at 5646. An RLC is sent out the terminating circuit at 5648, and the terminating circuit is set to idle at 5650. The idled time point for circuit selection is recorded at 5652. A release is sent to the terminating mux at 5654, and the termination re-attempt process is started at 5656. Idle is attained at 5658.

If an RLC is received from the terminating circuit at 5660, the Tacm timer (T7) timer is stopped at 5662. The call is sent to the treatment table for the termination call process at 5664, and a release is sent to the terminating mux at 5654. The termination re-attempt process is started at 5656, and idle is attained at 5658.

If other call processing messages are received at 5666, a log is sent to maintenance at 5668. The Tacm timer (T7) is stopped at 5670. The CRS process is started at 5672, and a release is sent to the terminating mux at 5674. The termination re-attempt process is started at 5676, and idle is attained at 5678.

If a block for the terminating circuit is received for maintenance at 5680, the Tacm timer (T7) is stopped at 5682. A release is sent to the terminating mux at 5684, and the call is sent to the treatment table for the termination call process at 5686. The termination re-attempt process is started at 5688, and idle is attained at 5690.

If a reset for the terminating circuit is received for maintenance at 5692, the Tacm timer (T7) is stopped at 5694. A release is sent to the terminating mux at 5696, and the termination re-attempt process is started at 5698. Idle is attained at 5700.

If other messages are received from maintenance at 5702, a log is sent to maintenance at 5704. The message is discarded at 5706. The process then continues at step 5566.

ANM Processing for the Termination Call process

FIGS. 64A–64E depict processing an ANM for the termination call process. At step 5708 the process is waiting for an ANM from the terminating circuit. If a CPG is received from the terminating circuit at 5710, the CPG is forwarded to the origination call process at 5712. The process then continues at step 5708.

If a ANM is received from the terminating circuit at 5714, the OM is pegged at 5716. If the trunk group is set for ring no answer at 5718, the Trna timer is stopped at 5720. After step 5720 or if the trunk group is not set for ring no answer at 5718, the answer time point is recorded for billing at 5722. If the trunk group voice path cut through is answered at 5724, the voice path is connected to the terminating circuit at 5726. After step 5726 or if the terminating trunk group voice path cut through is not answered at 5724, the ANM is forwarded to the origination call process at 5728. The process then continues at step 5822.

If the Trna timer for the ANM times out at 5730, the release time point is recorded for billing at 5732. The process is sent to the treatment table for the termination call process at 5734. A release indicator is sent to the origination call process at 5736, and the terminating mux is released at 5738. Idle is attained at 5740.

A REL is received from the terminating circuit at 5742. If the trunk group is set for ring no answer at 5744, the Trna timer is stopped at 5746. After step 5746 or if the trunk group is not set for ring no answer at 5744, the release time point is recorded for billing at 5748. A release indicator is sent to the origination call process with a release cause receive value at 5750. An RLC is sent out the terminating circuit at 5752, and the terminating mux is released at 5754. The terminating circuit is set to idle at 5756, and the idled time point for circuit selection is recorded at 5758. Idle is attained at 5760.

If a release indicator is received from the origination call process at 5762, ring no answer is determined at 5764. If the trunk group is set for ring no answer at 5764, the Trna timer is stopped at 5766. After step 5766 or if the trunk group is not set for ring no answer at 5764, the process is sent to the treatment table for the termination call process at 5768. The terminating mux is released at 5770, and idle is attained at 5772.

If an RLC is received from the terminating circuit at 5774, the OM is pegged at 5776. If the trunk group is set for ring no answer at 5778, the Trna timer is stopped at 5780. After step 5780 or if the trunk group is not set for ring no answer at 5778, the release time point is recorded for billing at 5782. The process is sent to the treatment table for the termination call process at 5784, and a release indicator is sent to the origination call process at 5786. The terminating mux is released at 5788, and idle is attained at 5790.

If other call processing messages are received at 5792, a log is sent to maintenance at 5794. The message is discarded at 5796, and the process continues at step 5708.

If a block for the terminating circuit is received for maintenance at 5798, the message is discarded at 5800. The process then continues at step 5708.

If a reset is received for the terminating circuit from maintenance at 5802, ring no answer is determined at 5804. If, the trunk group is set for ring no answer at 5804, the Trna timer is stopped at 5806. After step 5806 or if the trunk group is not set for ring no answer at 5804, the release time point is recorded for billing at 5808. A release indicator is sent to the origination call process at 5810, and the terminating mux is released at 5812. Idle is attained at 5814.

If other messages are received for maintenance at 5816, a log is sent to maintenance at 5818. The message is discarded at 5820, and the process continues at step 5708.

Answered Call Processing for the Termination Call Process

Figure 65A:
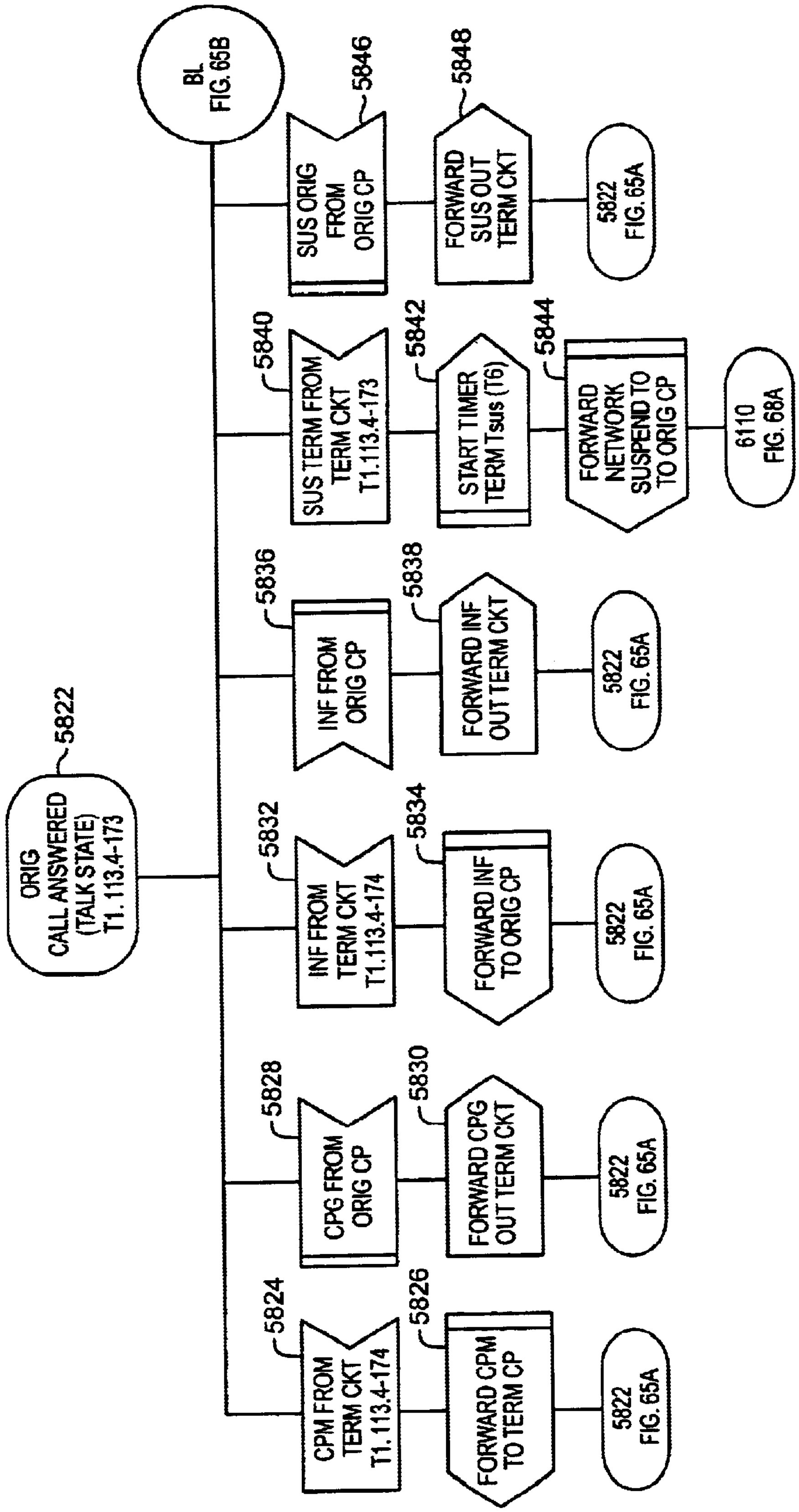
FIGS. 65A–65C are SDL diagrams of logic used in a version of the invention for answered call processing for the terminating call process.
Figure 65B:
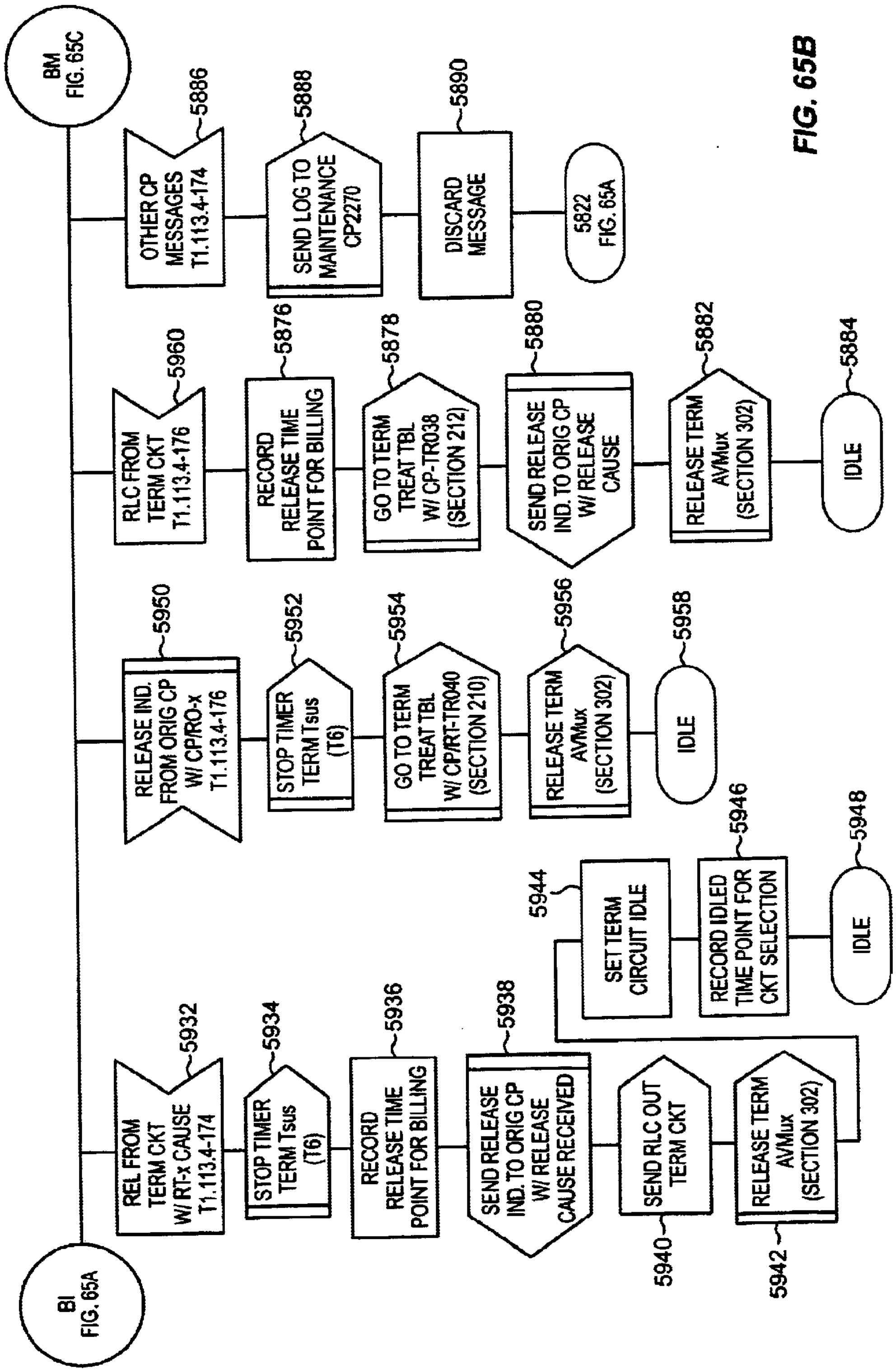
Figure 65C:
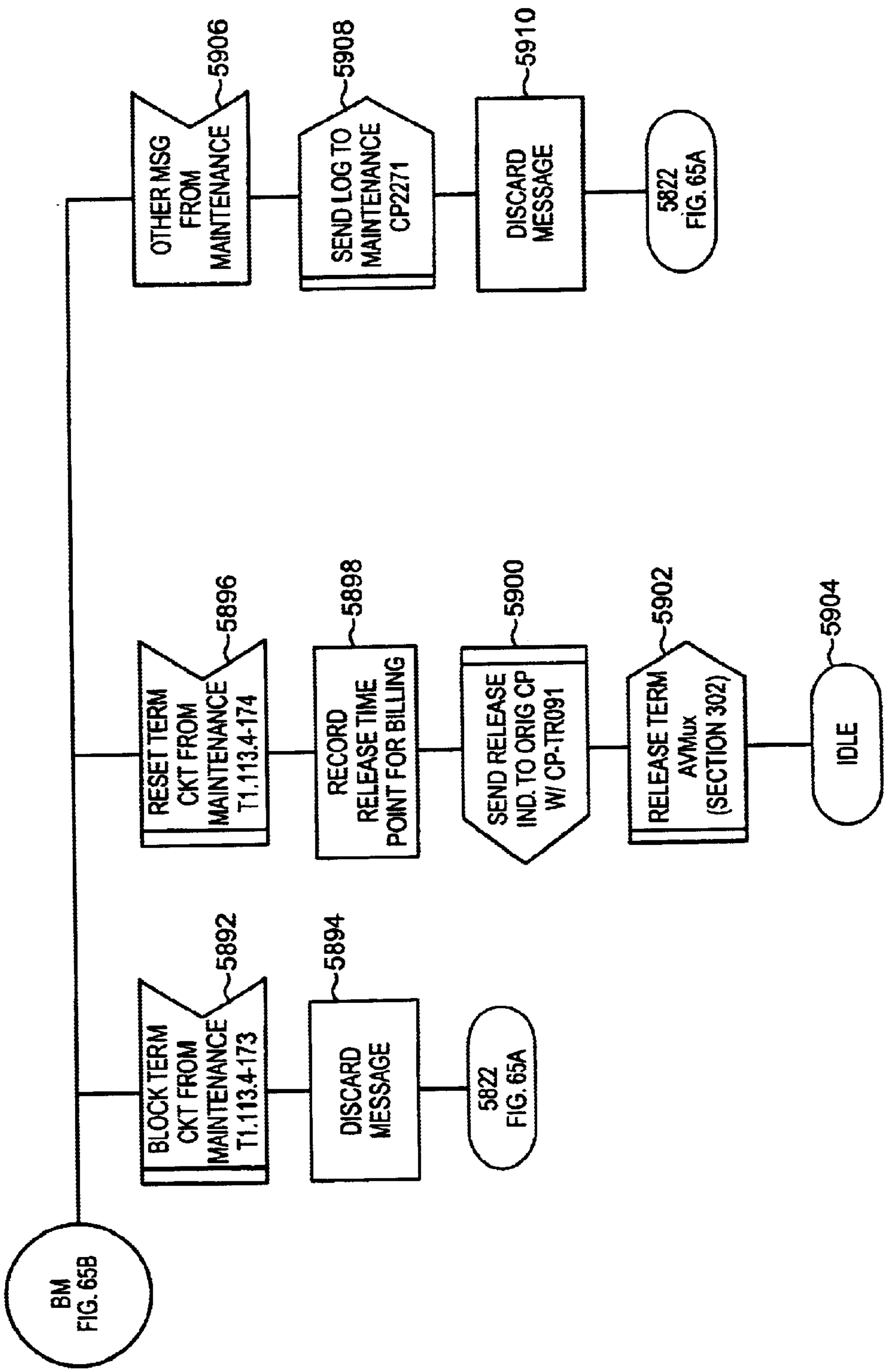

FIGS. 65A–65C depict, the processing of an answered call for the termination call process. The call for the termination call process is in the answered/talk state at 5822. If a CPG is received from the terminating circuit at 5824, the CPG is forwarded to the origination call process at 5826. The process continues at step 5822.

If a CPG is received from the origination call process at 5828, the CPG is forwarded out the terminating circuit at 5830. The process then continues at step 5822.

If an INF is received from the terminating circuit at 5832, the INF is forwarded to the origination call process at 5834. The process then continues at step 5822.

If an INF is received from the origination call process at 5836, the INF is forwarded out the terminating circuit at 5838. The process then continues at step 5822.

If an SUS is received for the terminating circuit from the terminating circuit at 5840, the terminating circuit Tsus timer (T6) is started at 5842. The SUS is forwarded to the origination call process at 5844. The process then continues at step 6110.

If an SUS for the originating circuit is received from the origination call process at 5846, the SUS is forwarded out the terminating circuit at 5848. The process then continues at step 5822.

If an REL is received from the terminating circuit at 5850, the release time point is recorded for billing at 5852. A release indicator is sent to the origination call process with a release cause received at 5854. An RLC is sent out the terminating circuit at 5856, and a release is sent to the terminating mux at 5858. The terminating circuit is set to idle at 5860, and the idled time point for circuit selection is recorded at 5862. Idle is attained at 5864.

If a release indicator is received from the origination call process at 5866, the release indicator is sent to the termination call process with a release cause receive value at 5868. A release is sent to the terminating mux at 5870, and idle is attained at 5872.

If an RLC is received at 5874, the release time point for billing is recorded at 5876. The process is sent to the treatment table at 5878, and a release indicator is sent to the origination call process with a release cause value at 5880. The terminating mux is released at 5882, and idle is attained at 5884.

If other call processing messages are received at 5886, a log is sent to maintenance at 5888. The messages are discarded at 5890. The process then continues at step 5822.

If a block for the terminating circuit is received from maintenance at 5892, the message is discarded at 5894. The process then continues at step 5822.

If a reset for the terminating circuit is received from maintenance at 5896, the release time point for billing is recorded at 5898. A release indicator is sent to the origination call process at 5900. A relelase is sent to the terminating mux at 5902, and idle is attained at 5904.

If other messages are received from maintenance at 5906, a log is sent to maintenance at 5908. The message is discarded at 5910. The process then continues at step 5822.

Terminating Circuit Suspend for the Termination Call Process

Figure 66A:
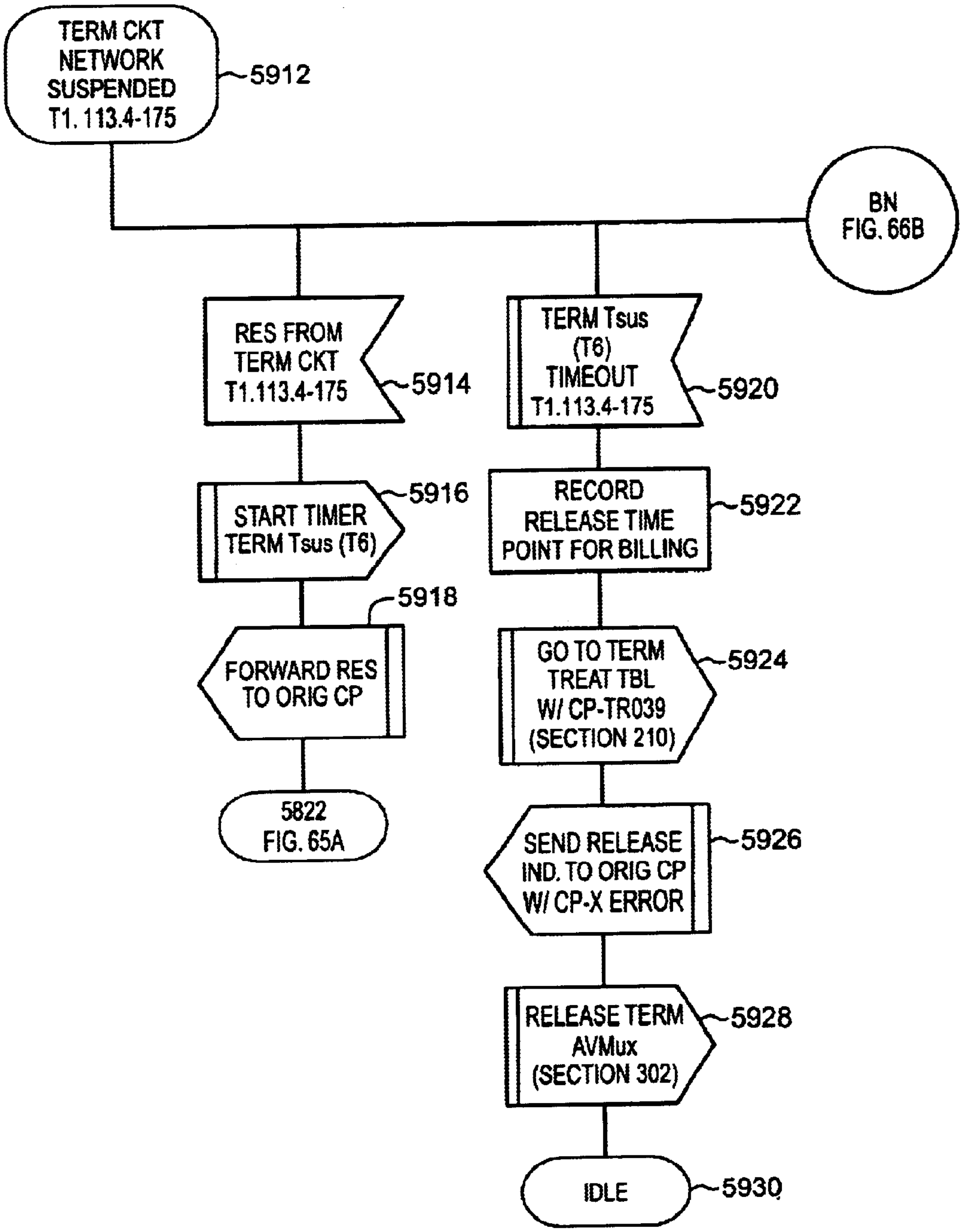
FIGS. 66A–66C are SDL diagrams of logic used in a version of the invention for terminating circuit suspended processing.
Figure 66B:
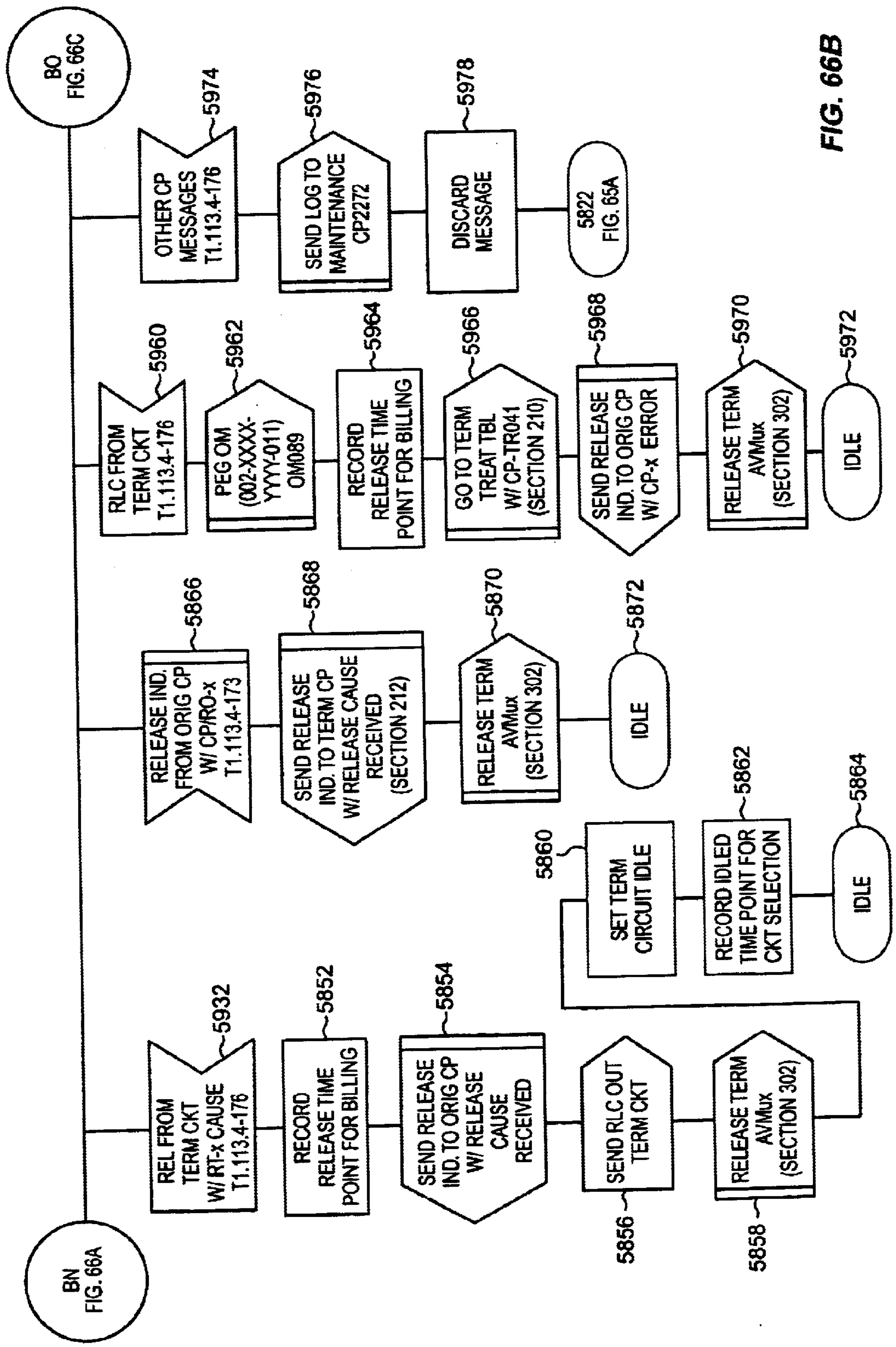
Figure 66C:
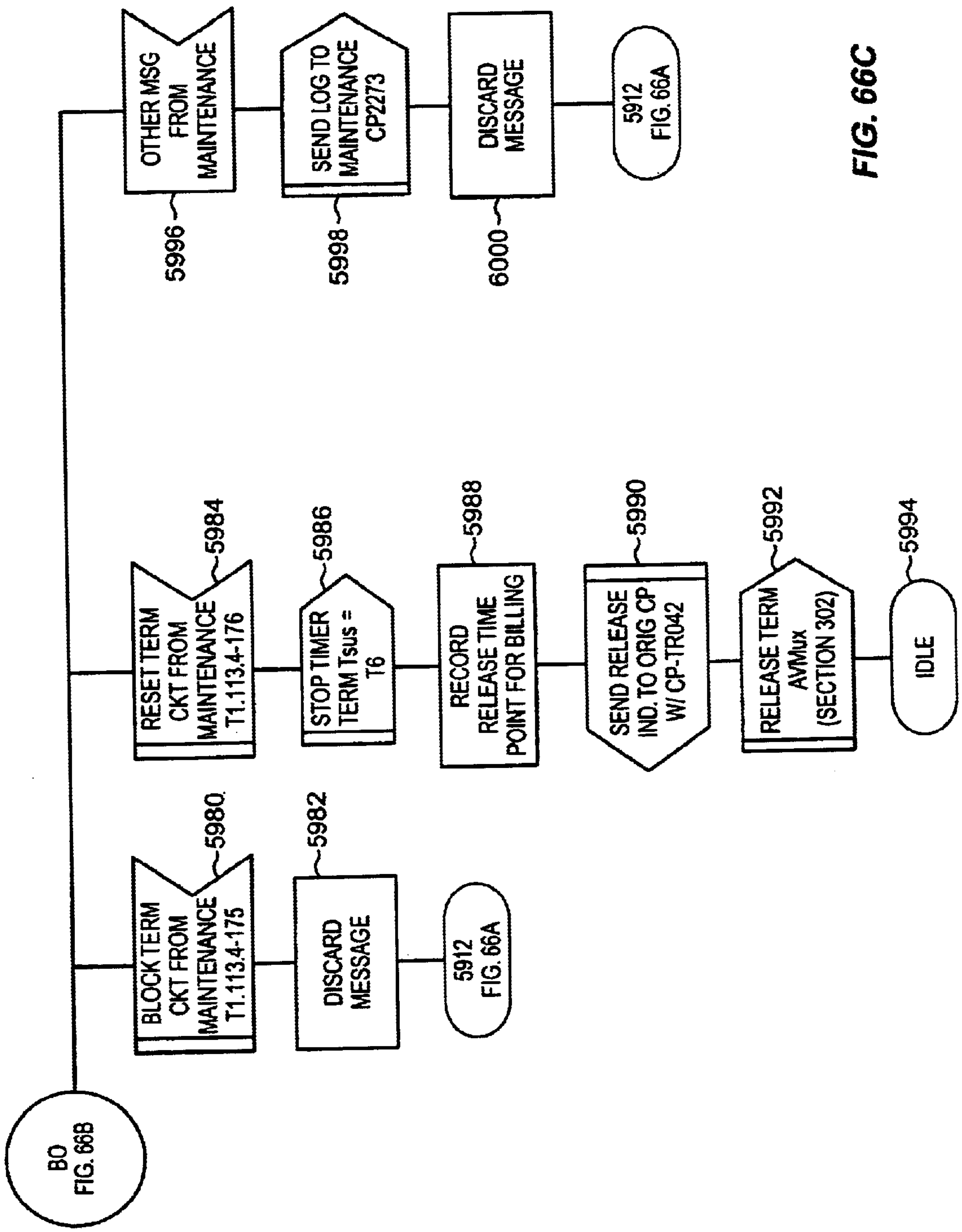

FIGS. 66A–66C depict an example of processing for a suspended terminating circuit for the termination call process. At 5912, the terminating circuit network is suspended. If an RES is received from the terminating circuit at 5914, the terminating Tsus timer (T6) is stopped at 5916. The RES is forwarded to the origination call process at 5918. The process then continues at step 5822.

If the terminating Tsus timer (T6) times out at 5920, the release time point for billing is recorded at 5922. The process is sent to the treatment table for the termination call process at 5924. A release indicator is sent to the origination call process at 5926, and a release is sent to the terminating mux at 5928. Idle is attained at 5930.

If an REL is received from the terminating circuit at 5932, the terminating Tsus timer (T6) is stopped at 5934. A release time point for billing is recorded at 5936, and a release indicator is sent to the origination call process with a release cause value received at 5938. An RLC is sent out the terminating circuit at 5940. A release is sent to the terminating mux at 5942, and the terminating circuit is set to idle at 5944. The idle time point for circuit selection is recorded at 5946, and idle is attained at 5948.

If a release indicator is received from the origination call process at 5950, the terminating Tsus timer (T6) is stopped at 5952. The process is sent to the treatment table for the termination call process at 5954. A release is sent to the terminating mux at 5956, and idle is attained at 5958.

If an RLC is received from the terminating circuit at 5960, the OM is pegged at 5962. The release time point is recorded for billing at 5964, and the process is sent to the treatment table for the termination process at 5966. A release indicator is sent to the origination call process at 5968, and a release is sent to the terminating mux at 5970. Idle is attained at 5972.

If other call processing messages are received at 5974, a log is sent to maintenance at 5976. The message is discarded at 5978. The process then continues at step 5912.

If a block for the terminating circuit is received from maintenance at 5980, the message is discarded at 5982. The process then continues at step 5912.

If a reset for the terminating circuit is received from maintenance at 5984, the terminating Tsus timer (T6) is stopped at 5986. A release time point is recorded for billing at 5988, and a release indicator is sent to the origination call process at 5990. A release is sent to the terminating mux at 5992, and idle is attained at 5994.

If other messages are received from maintenance at 5996, a log is sent to maintenance at 5998. The message is discarded at 6000. The process then continues at step 5912.

RLC Processing for the Termination Call Process

FIGS. 67A–67E depict processing an RLC from a terminating circuit for the termination call process. At step 6002, the process is waiting for an RLC from the terminating circuit. If a CPM is received from the terminating circuit at 6004, the CPM is forwarded to the origination call process at 6006. The process then continues at step 6002.

If an INF is received from the terminating circuit at 6008, the INF is forwarded to the origination call process at 6010. The process then continues at step 6002.

If an INF is received from the origination call process at 6012, the INF is sent out the terminating circuit at 6014. The process then continues at step 6002.

If an EXM is received from the termination call process at 6016, the EXM is forwarded to the origination call process at 6018. The process then continues at step 6006.

If an RLC is received from the terminating circuit at 6030, the Trel send timer (T1) and the Trlc timer (T5) are stopped at 6032. The terminating circuit is set to idle at 6034, and the idle time point for circuit selection is recorded at 6036. Idle is attained at 6038.

If an REL is received from the terminating circuit at 6040, a release indicator is sent to the origination call process at 6042. An RLC is sent out the terminating circuit at 6044. The process then continues at step 6002.

If the Trel send timer (T1) times out at 6046, a log is sent to maintenance at 6048. An REL is sent out the terminating circuit at 6050. The Trel send timer (T1) is started at 6052. The process then continues at step 6002.

If the Trlc timer (T5) times out at 6054, a log is sent to maintenance at 6056. The Trel send timer (T1) and the Tguard timer (Ta) are stopped at 6058. The CRS process for the terminating circuit is started at 6060, and maintenance is alerted at 6062. Idle is attained at 6064.

If other call processing messages are received at 6066, a log is sent to maintenance at 6068. The message is discarded at 6070. The process then continues at step 6002.

If a blocking message for the terminating circuit is received from maintenance at 6072, the message is discarded at 6074. The process then continues at step 6002.

If a reset for the terminating circuit is received from maintenance at 6076, the Trel send timer (T1) and the Trlc timer (T5) are stopped at 6078. Idle is attained at 6080.

If other messages are received at 6082, a log is sent to maintenance at 6084. The message is discarded at 6086. The process then continues at step 6002.

Figure 67A:
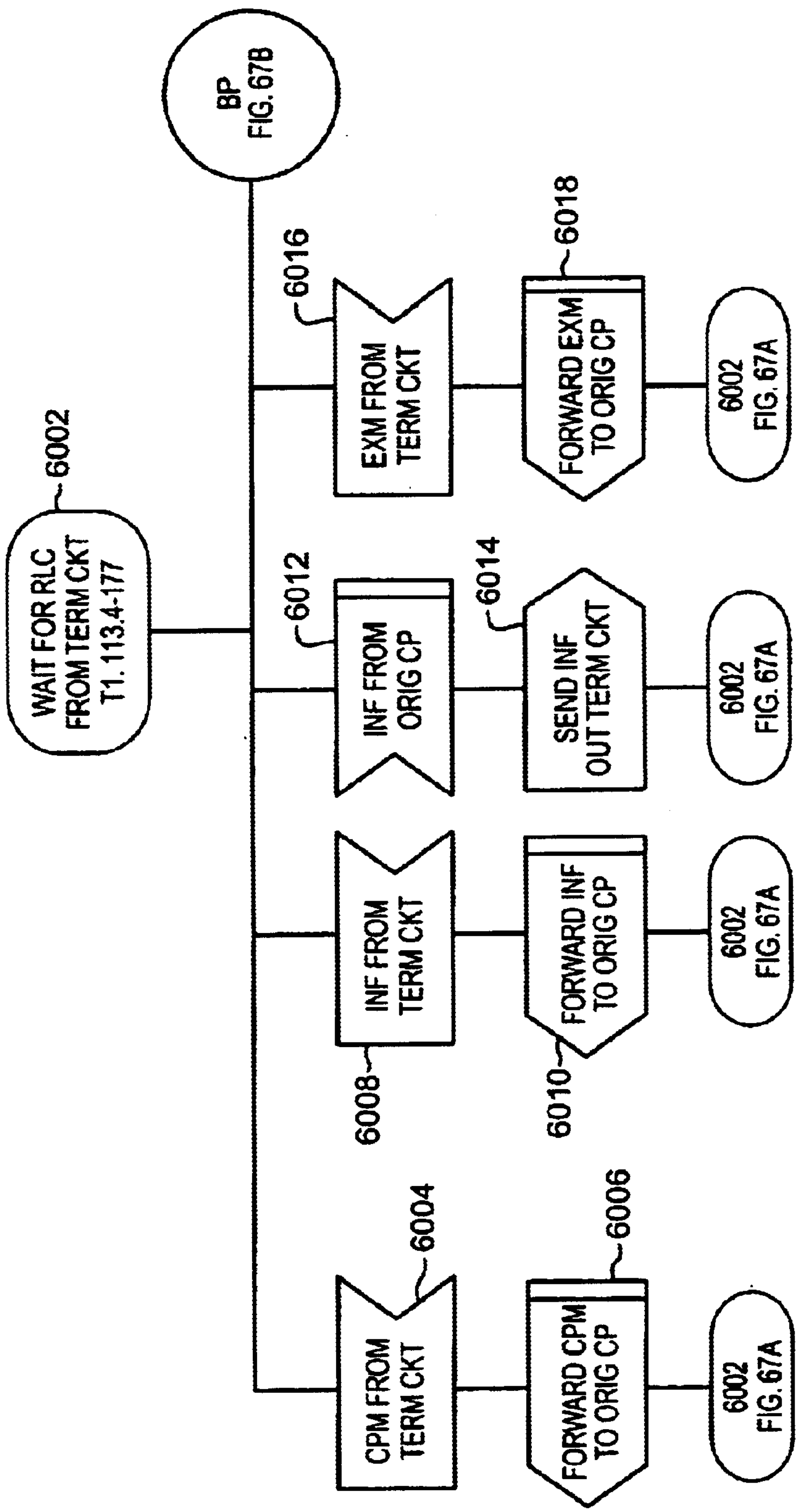
FIGS. 67A–67E are SDL diagrams of logic used in a version of the invention for processing an RLC for the termination process.
Figure 67B:
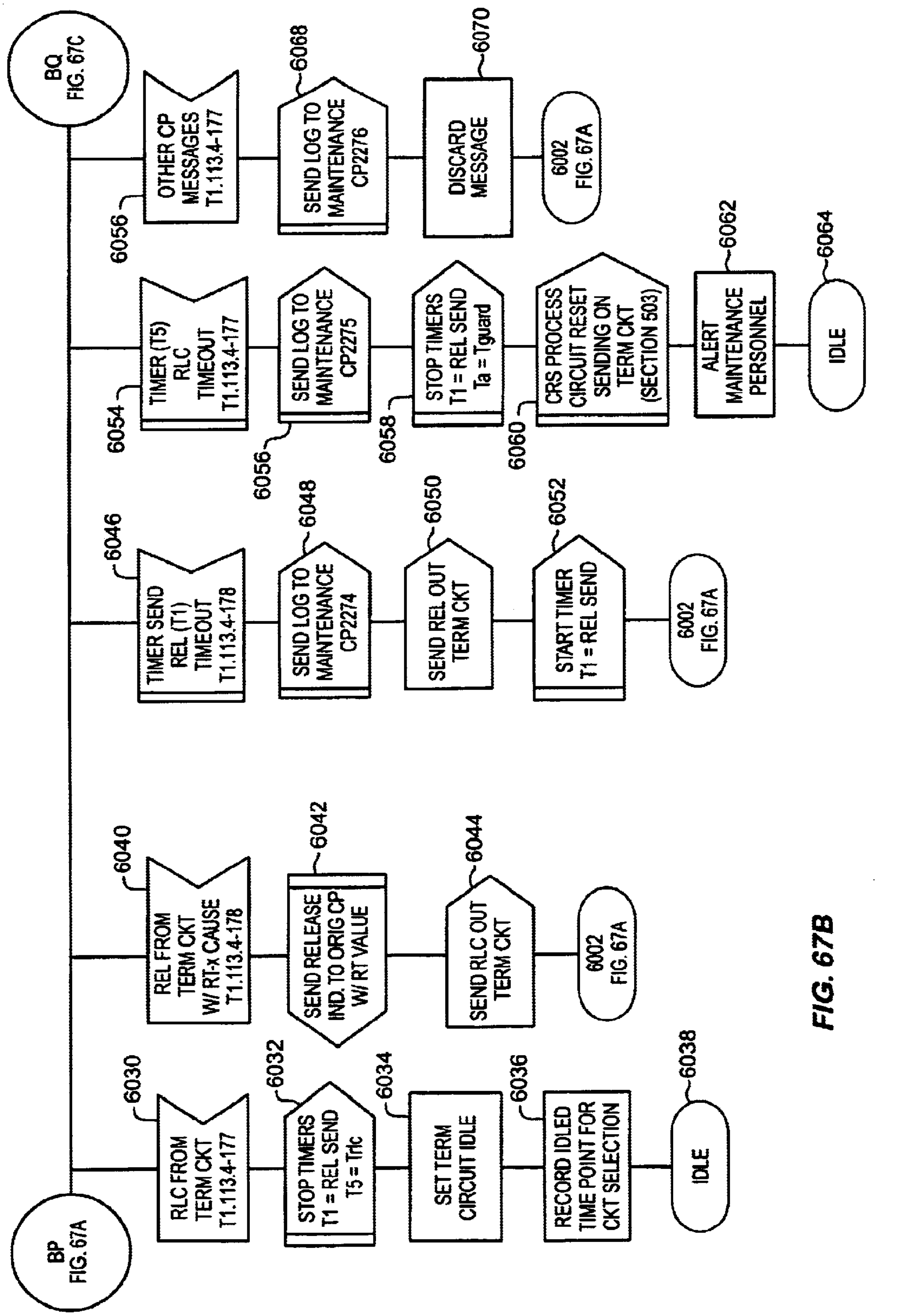
Figure 67C:
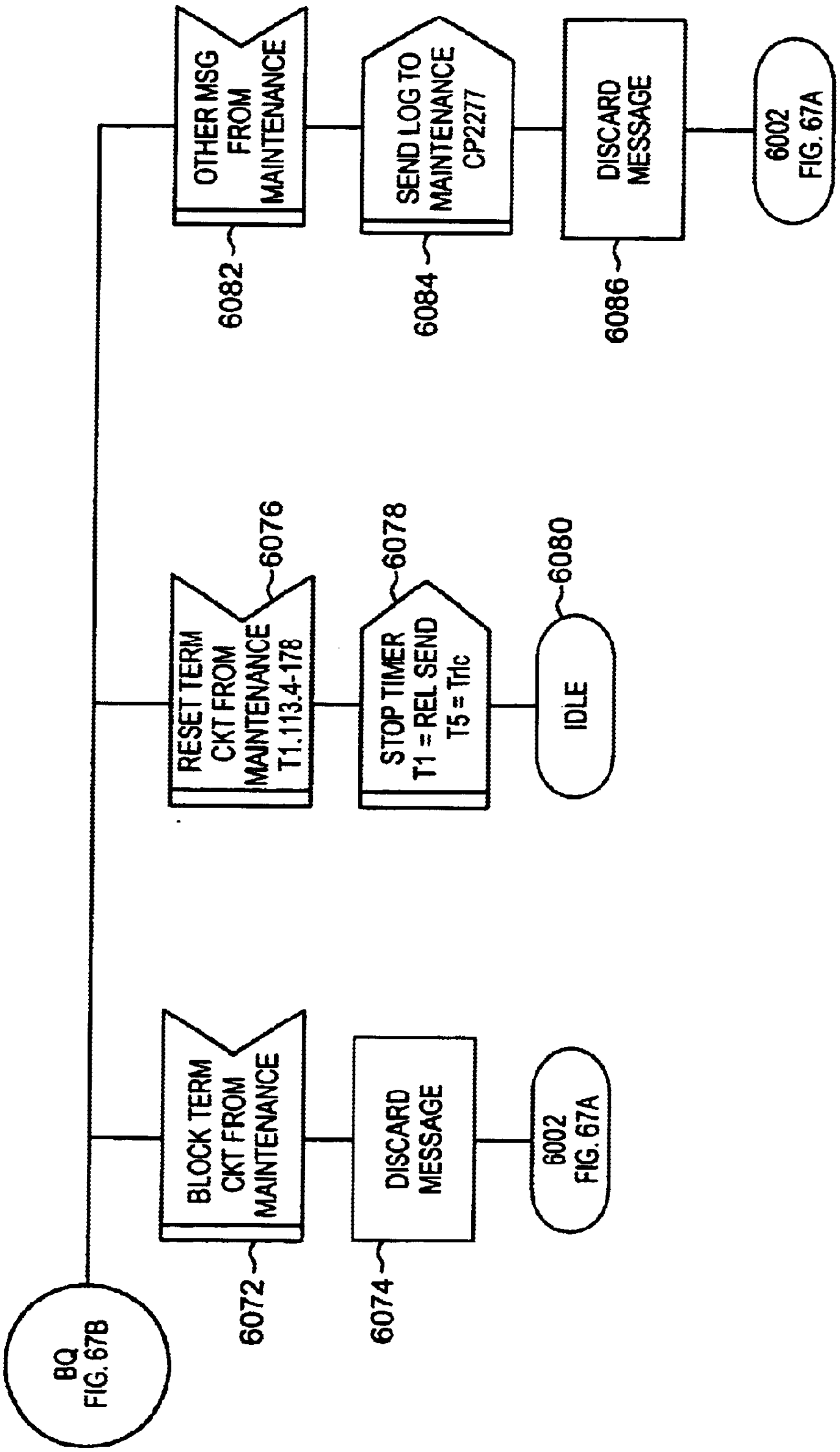
Figure 67E:
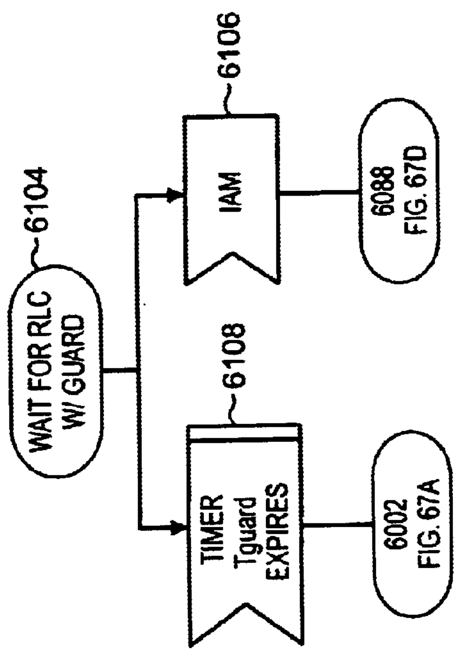
Figure 67D:
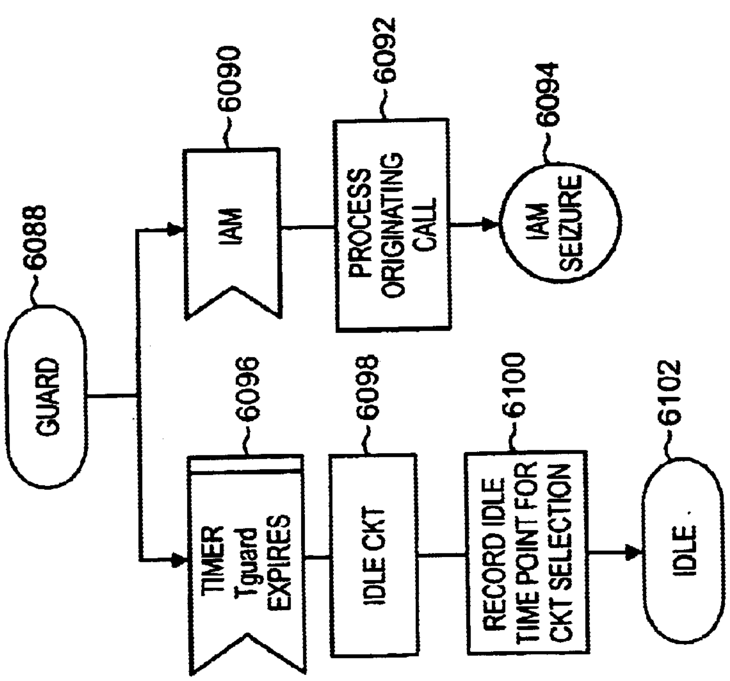

FIG. 67D depicts an example of RLC processing using guard. The guard process begins at 6088. If an IAM is received at 6090, the origination call process is started at 6092. IAM seizure is implemented at 6094. If the Tguard timer expires at 6096, the circuit is idle at 6098. The idle time point for circuit selection is recorded at 6100, and idle is attained at 6102.

At step 6104, the process is waiting for an RLC with guard. If an RLC is received at 6106, the process continues at 6088. If the Tguard timer expires at 6108, the process continues at step 6002.

Treatment and Release Table for the Termination Call Process

Figure 68A:
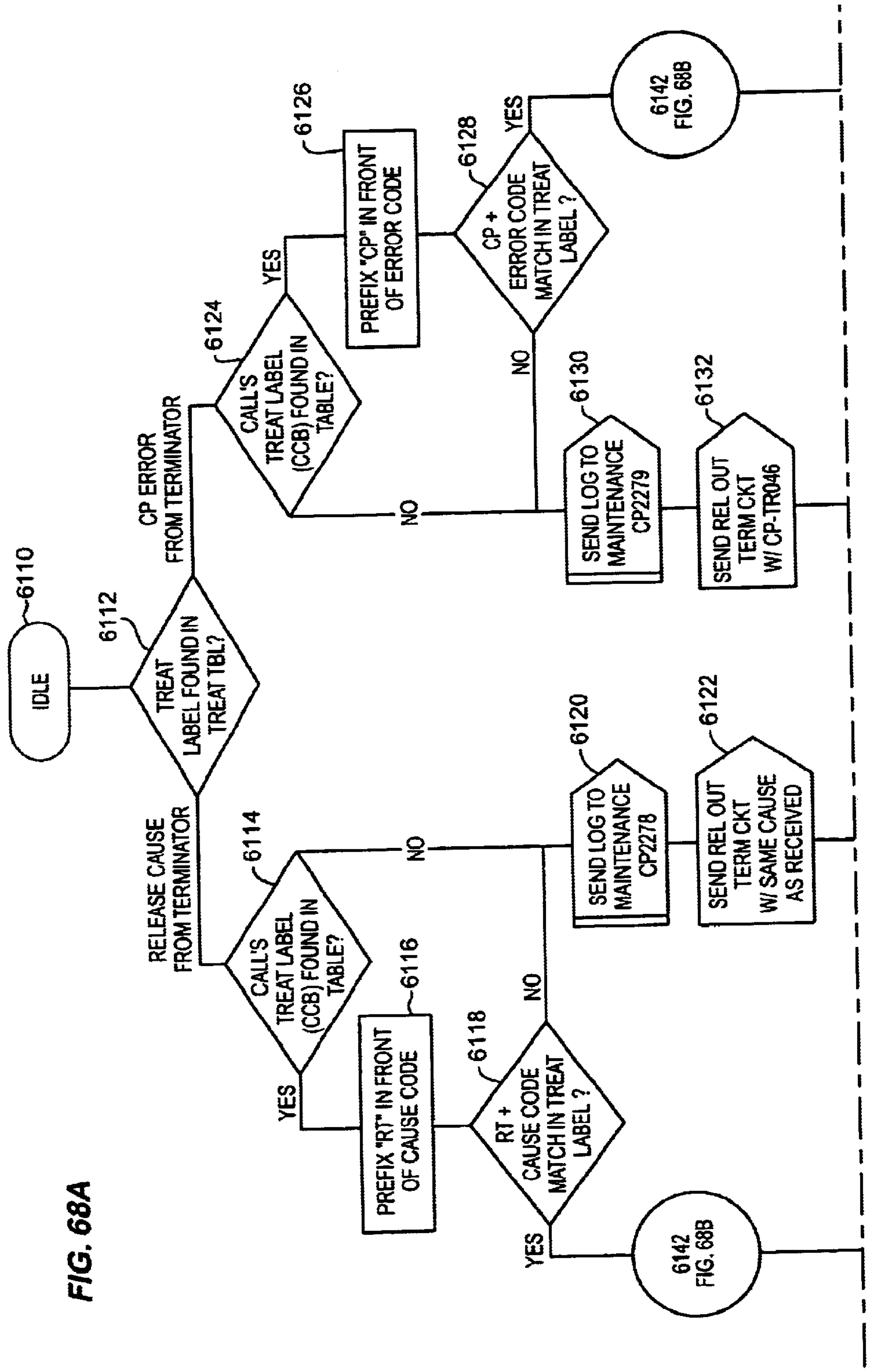
FIGS. 68A–68C are SDL diagrams of logic used in a version of the invention for treatment and release tables for the termination process.
Figure 68B:
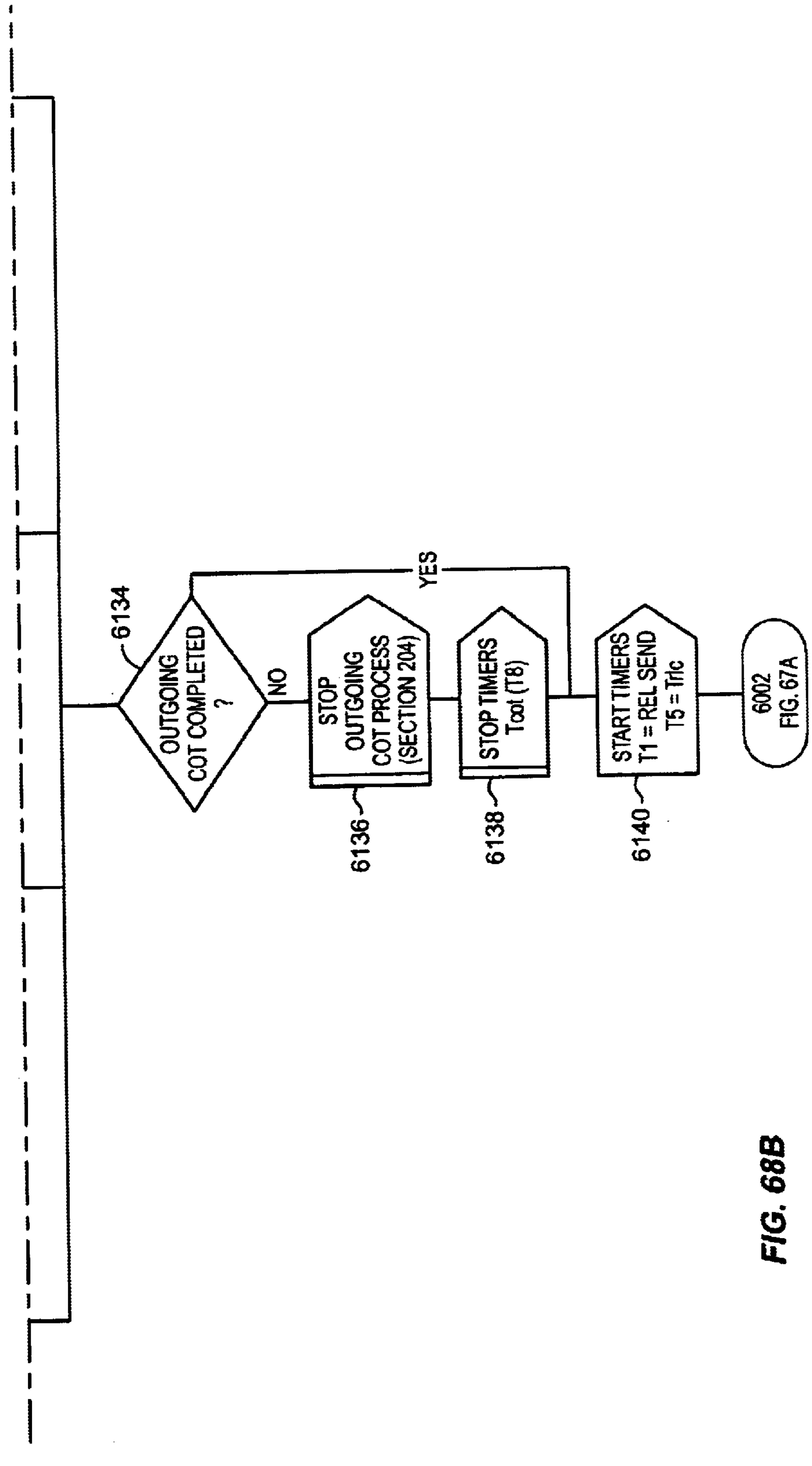
Figure 68C:
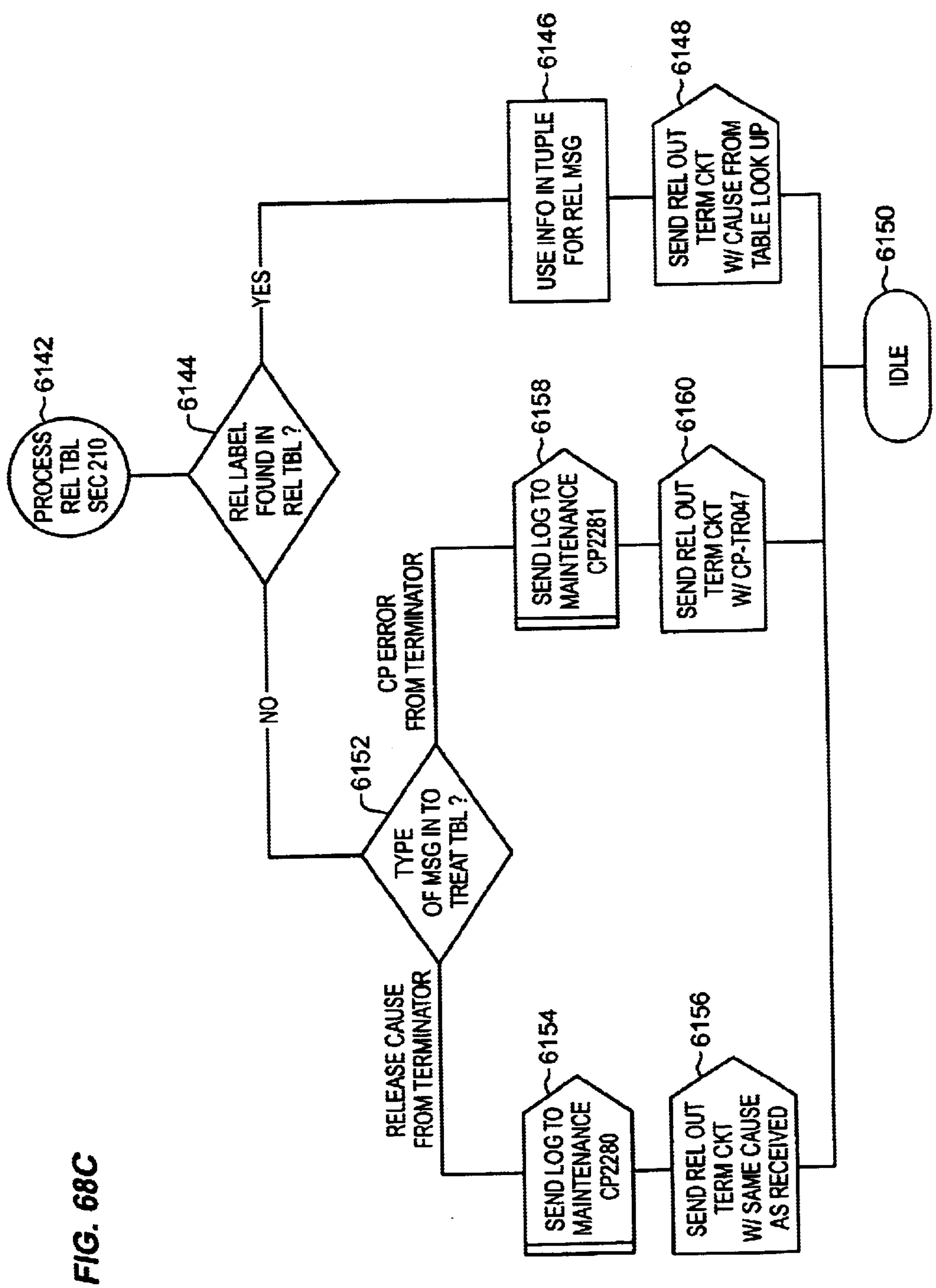

FIGS. 68A–68C depict processing for the treatment table and the release table for the termination call process. The treatment table call process is idle at 6110. If the treatment label in the treatment label is a release cause from the terminating end at 6112, and if the treatment label for the call from the CIB is found in the table at 6114, the "RT" prefix is added to the front of the cause code at 6116. If the RT plus the cause code matches a treatment label at 6118, the process is sent to the release table at step 6142. If the treatment label for the call is not found in the table at 6114 or if the RT plus the cause code does not match a treatment label at 6118, a log is sent to maintenance at 6120. An REL is sent out the terminating circuit with the same cause code value as the value received from the origination call process at 6122.

If the treatment label found in the treatment table is a call processing error from the terminating end at 6112, and if the treatment label for the call from the CIB is found in the table at 6124, the "CP" prefix is added to the front of the error code at 6126. If the CP plus the error code matches a value in a treatment label at 6128, the process is sent to the release table at step 6142. If the treatment label for the call is not found in the table at 6124 or if the CP plus the error code does not match a treatment label at 6128, a log is sent to maintenance at 6130. An REL is sent out the terminating circuit at 6132.

Upon return from the release table at step 6142 or after steps 6122 or 6132, if the outgoing COT process has not completed at 6134, the outgoing COT process is stopped at 6136. The Tcot timer (T8) is stopped at 6138. After step 6138 or if the outgoing COT process has completed at 6134, the Trel send timer (T1) and the Trlc timer (T5) are started at 6140. The process then continues at 6002.

The release table process for the termination call process starts at 6142. If a release label is found in the release table at 6144, the information from that row in the release table with the release label is used for the REL message at 6146. The REL is sent out the terminating circuit with a cause code value from the look up found in the release table at 6148. The process then returns to the calling process at 6150.

If a release label is not found in the release table at 6144, and if the type of message in the treatment table is a release cause from the terminating end at 6152, a log is sent to maintenance at 6154. An REL is sent out the terminating circuit with the same cause code value as the cause code value received at 6156. The process then returns to the implementing process at 6150.

If the type of message in the treatment table is a call processing error from the terminating end at 6152, a log is sent to maintenance at 6158. An REL is sent out the terminating circuit at 6160. The process then returns to the implementing process at 6150.

Echo Control for the Termination Call Process

Figure 69A:
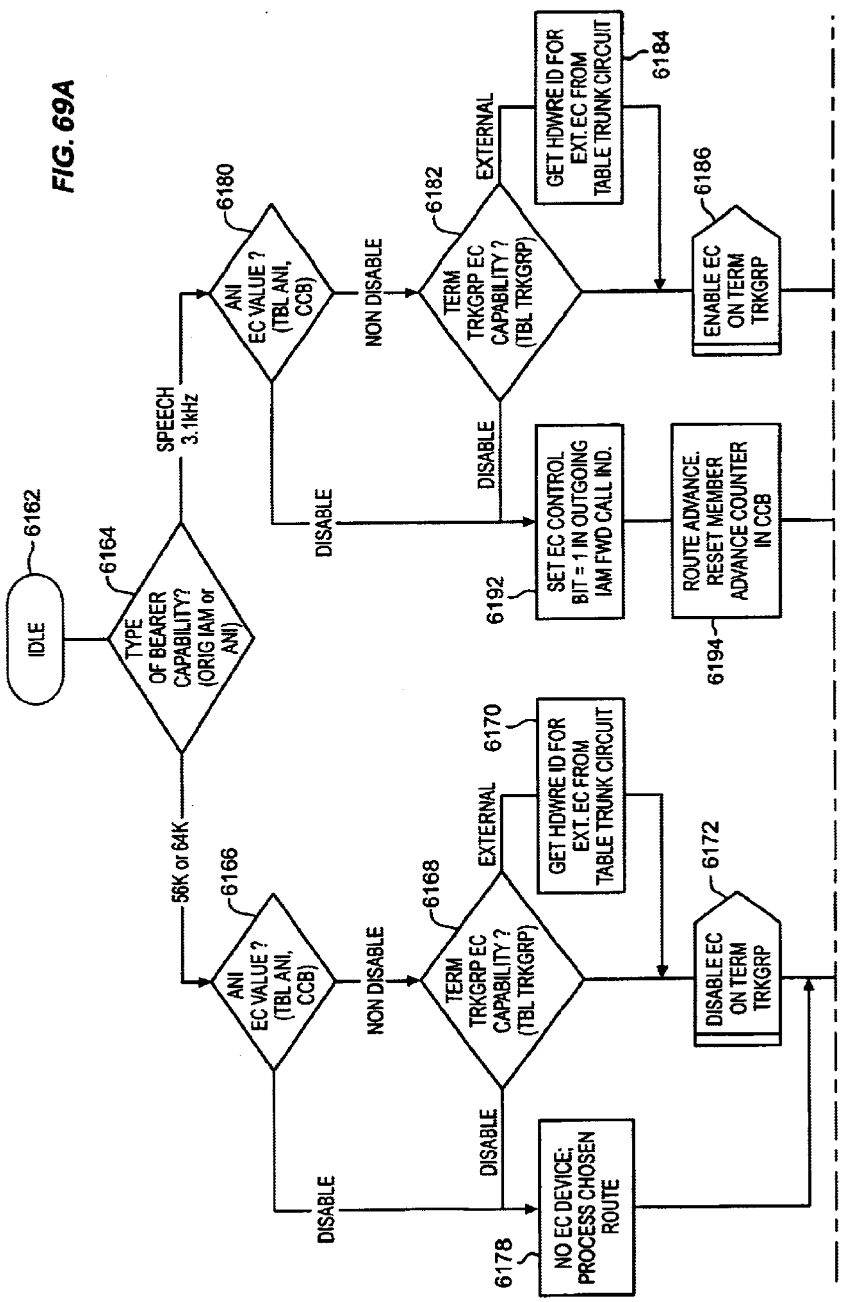
FIGS. 69A–69B are SDL diagram of logic used in a version of the invention for echo control for the termination call process.
Figure 69B:
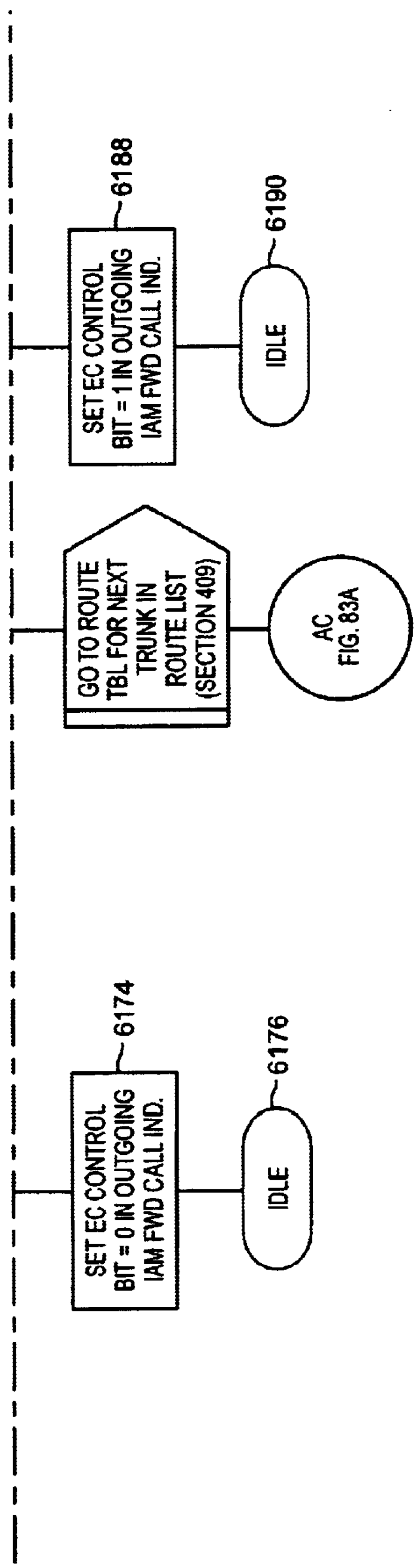

FIGS. 69A–69B depict echo control processing for the termination call process. The echo control process is idle at 6162; If the bearer capability type is either 56 Khz or 64 Khz at 6164, if the automatic number identification (ANI) EC value is non-disabled at 6166, and if the terminating trunk group EC capability is set to external at 6168, the hardware identification (ID) for the external EC is obtained from the trunk circuit table at 6170. After step 6170 or if the terminating trunk group EC capability is internal at 6168, the EC is disabled from the terminating trunk group at 6172. The EC control bit is set to equal zero in the outgoing IAM for the forward call indicator (FCI) at 6174. Idle is attained at 6176.

If the ANI EC value is disabled at 6166, or if the terminating trunk group EC capability is disabled at 6168, no EC device is available, and the chosen route is processed at 6178. The EC control bit is set to equal zero in the outgoing IAM FCI at 6174. Idle then is attained at 6176.

If the bearer capability type is either speech or 3.1 Khz at 6164, if the ANI EC value is set to non-disable at 6180, and if the trunk group EC capability is external at 6182, the hardware ID is obtained for the external EC from the trunk circuit table at 6184. After step 6184 or if the terminating trunk group EC capability is set to internal at 6182, the EC is enabled on the terminating trunk group at 6186. The EC control bit is set to equal one in the outgoing IAM FCI at 6188. Idle then is attained at 6190.

If the ANI EC value is set to disable at 6180 or if the terminating trunk group EC capability is set to disable at 6182, the EC control bit is set to equal one in the outgoing IAM FCI at 6192. The route is advanced at 6194 so that the member advance counter in the CIB is reset. The process is sent to the routing table for the next trunk in the routing list at 6196. The process then continues at step 7774.

Outgoing SCCP Routing

Figure 70A:
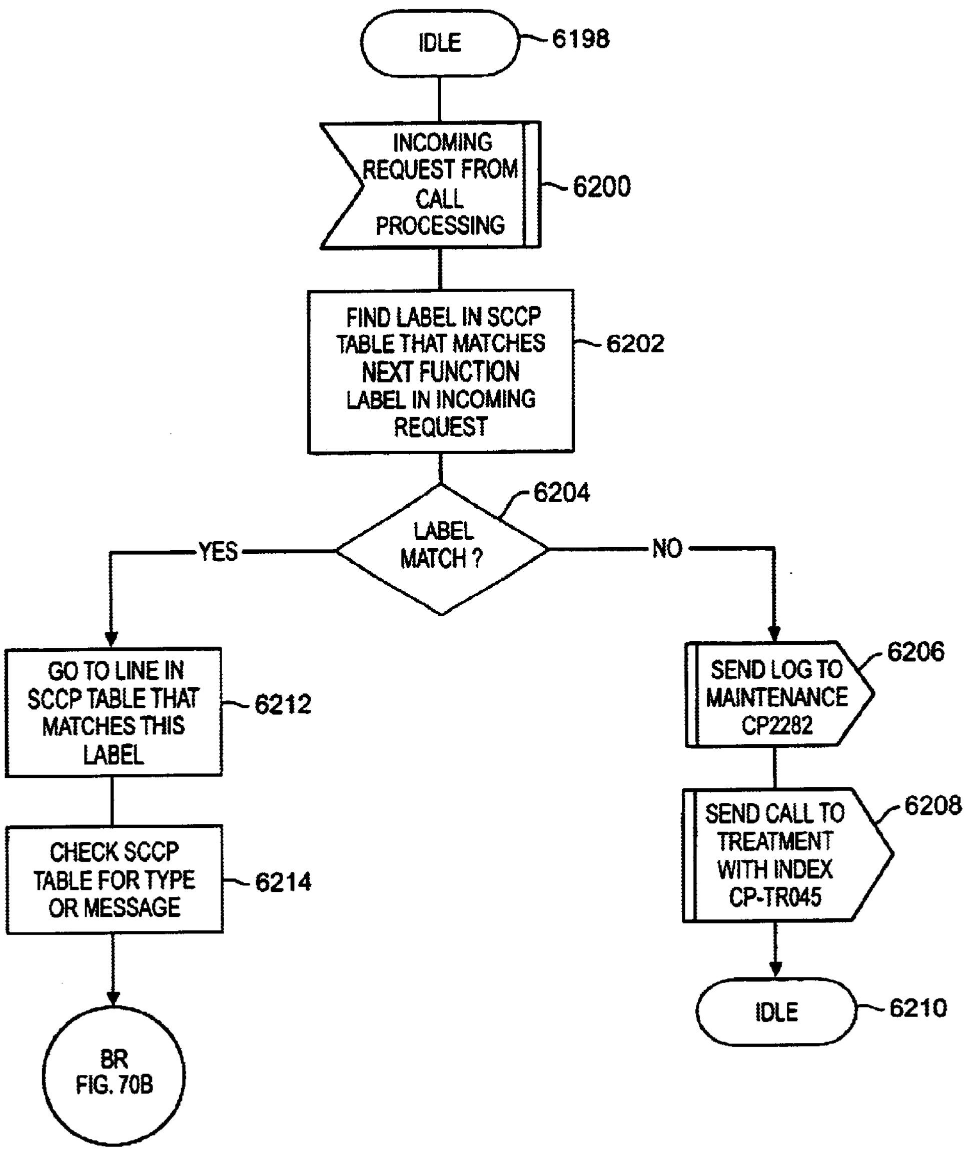
FIGS. 70A–70T are SDL diagrams of logic used in a version of the invention for outgoing SCCP routing.
Figure 70B:
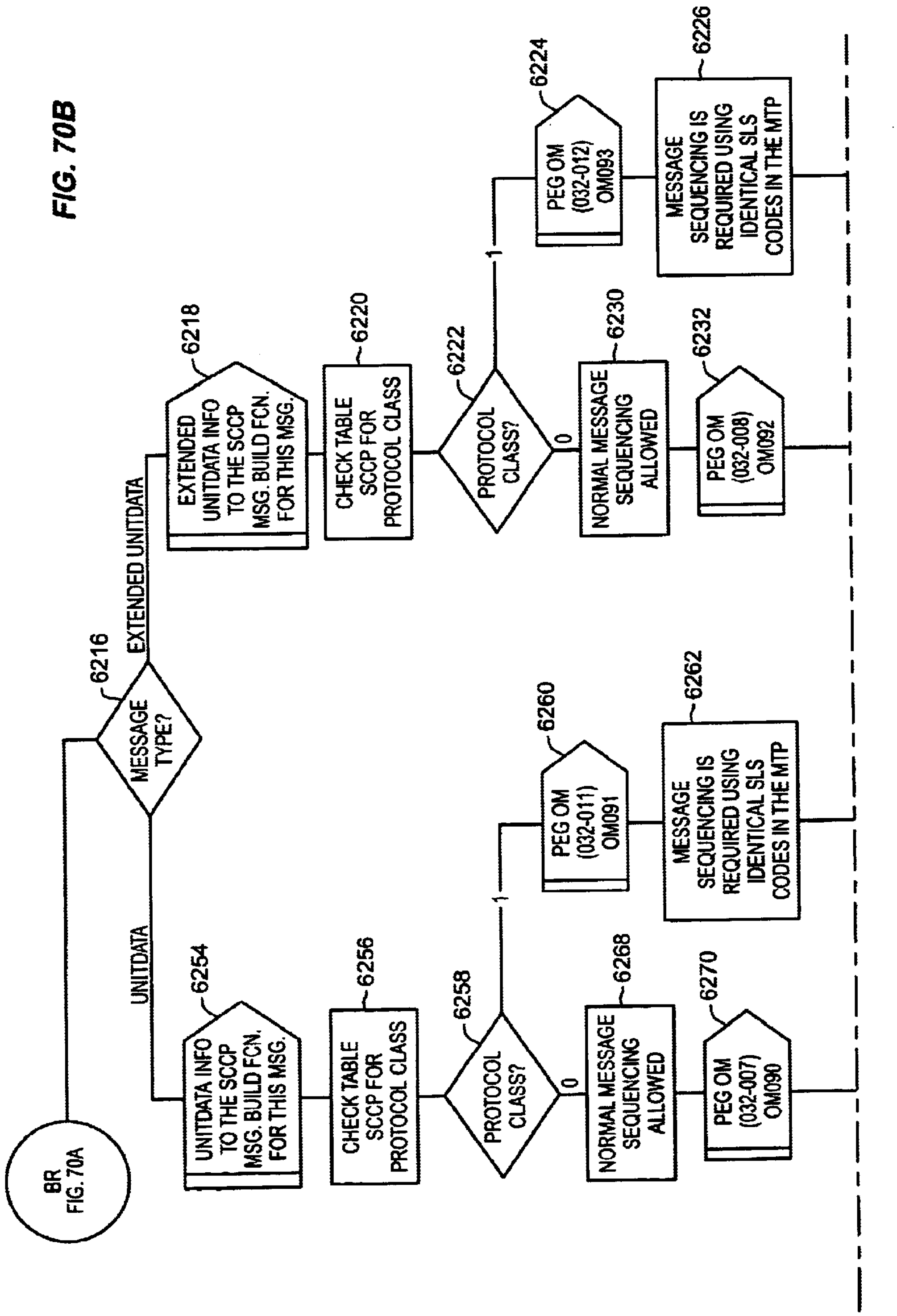
Figure 70C:
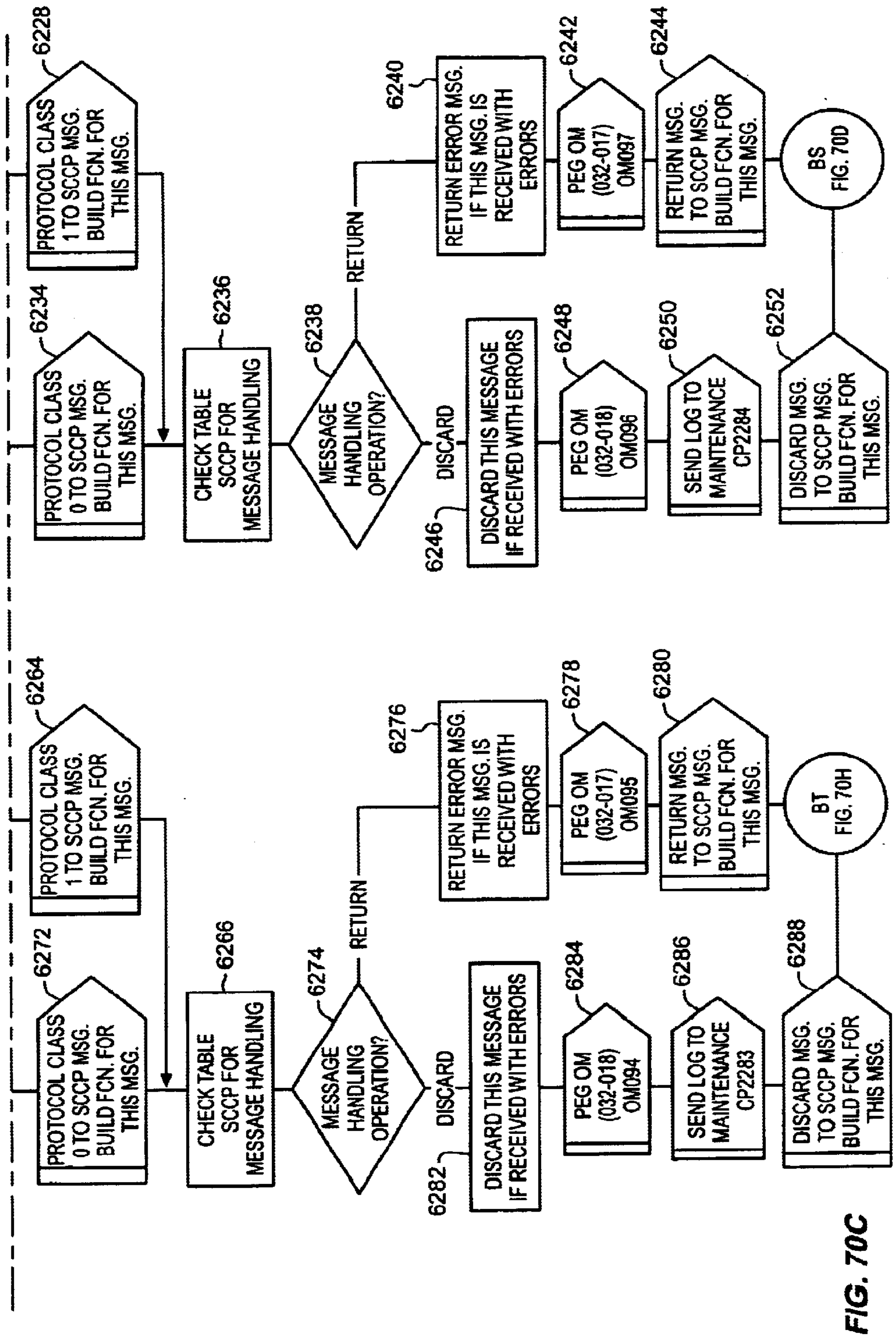
Figure 70D:
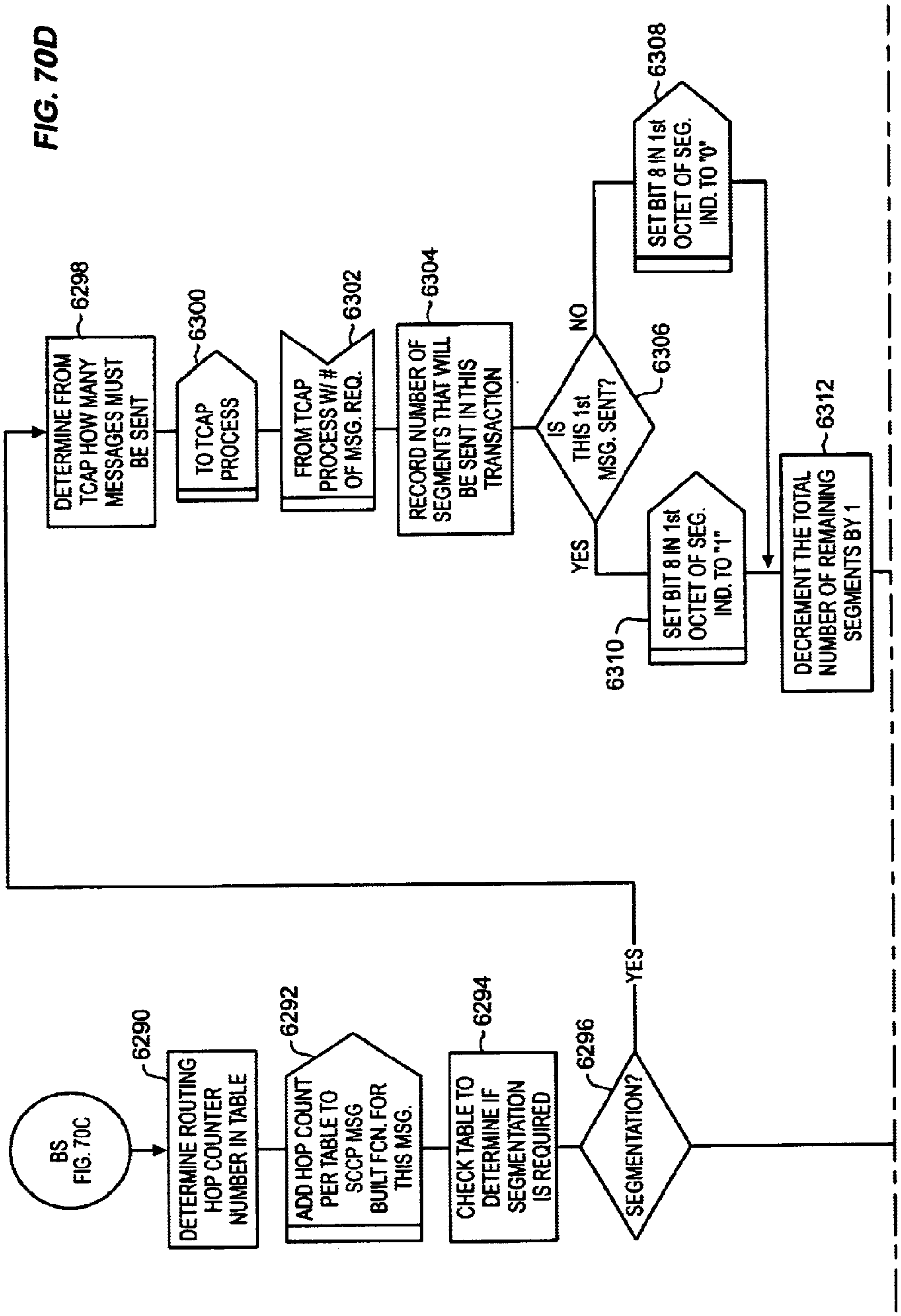
Figure 70E:
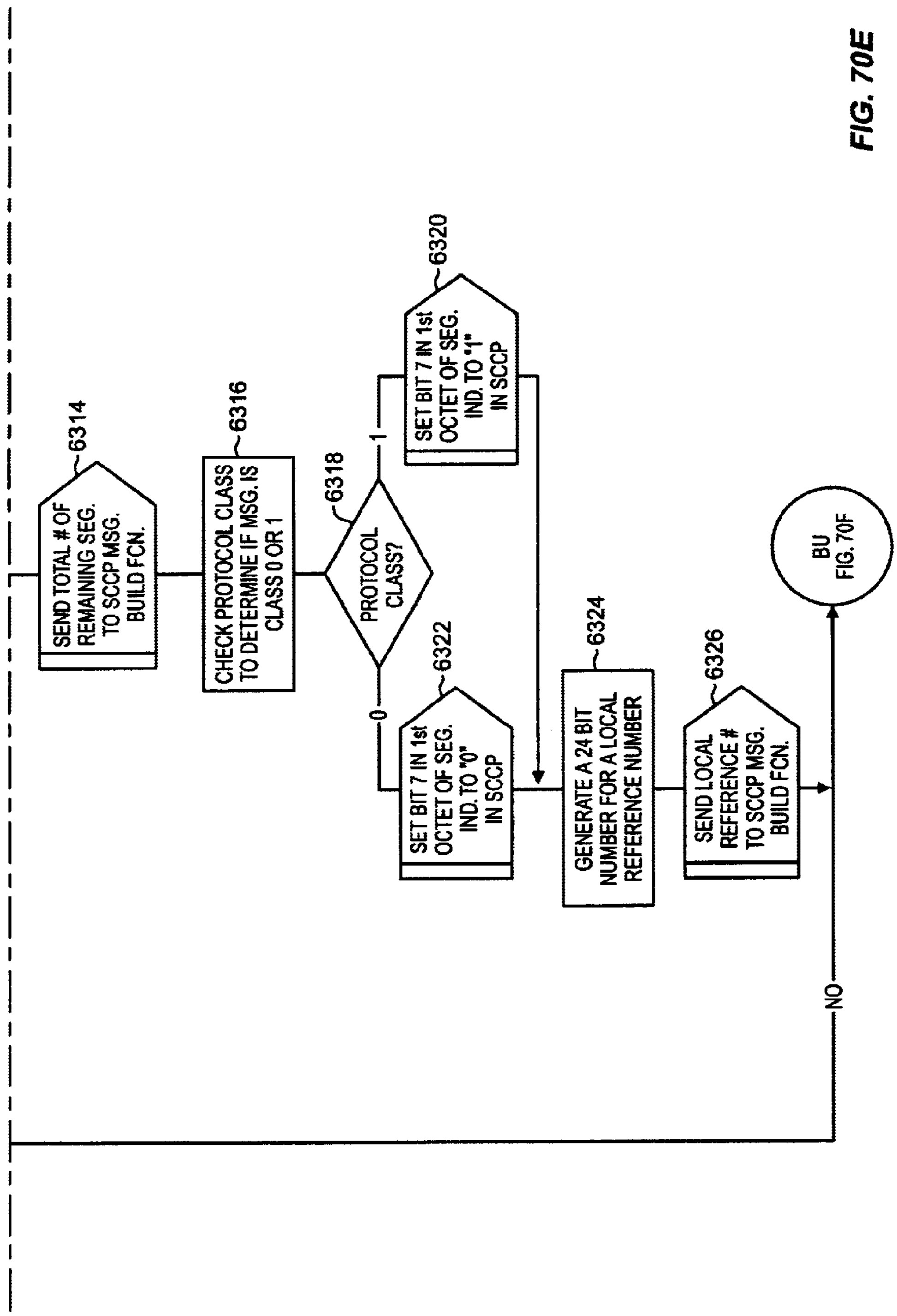
Figure 70F:
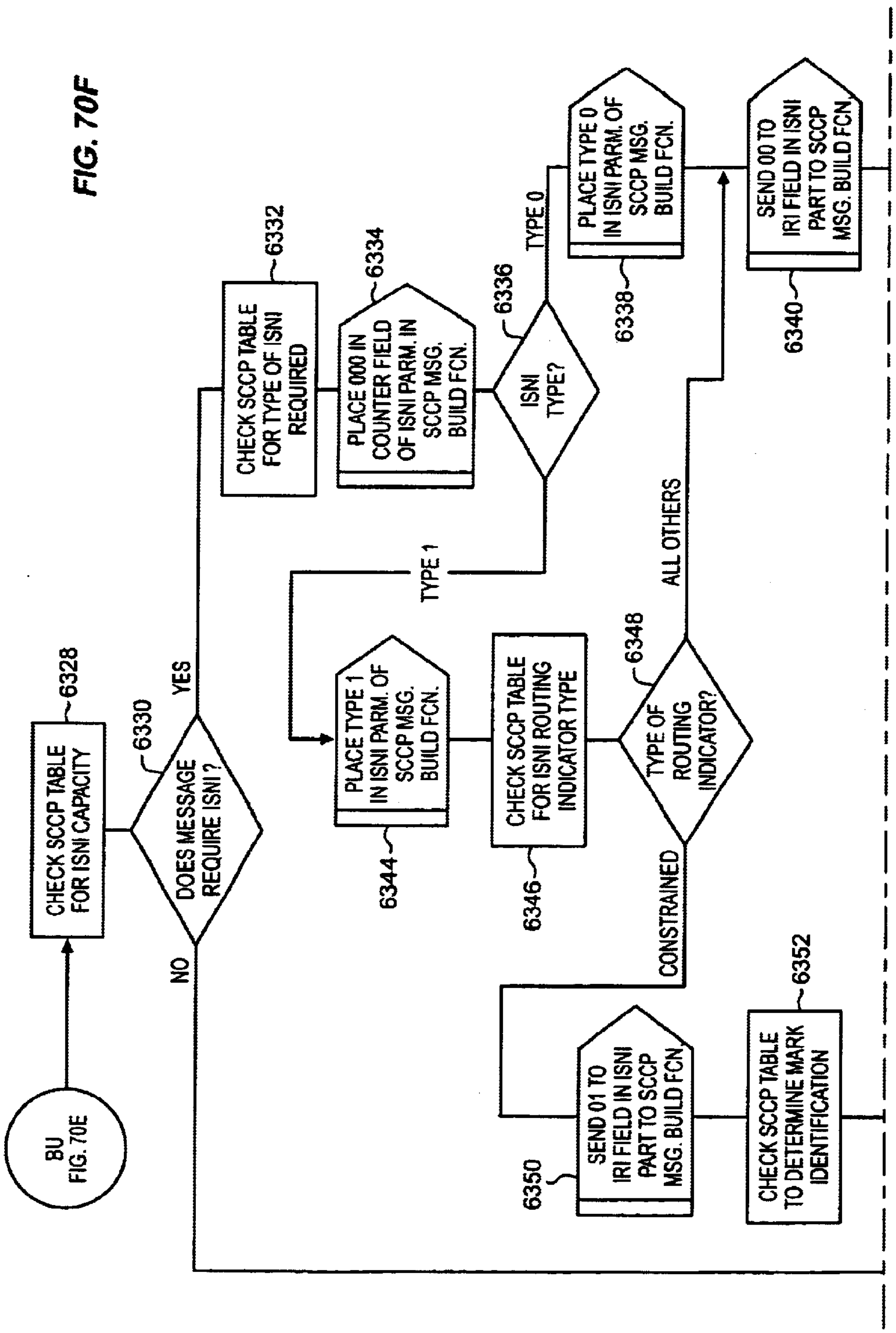
Figure 70G:
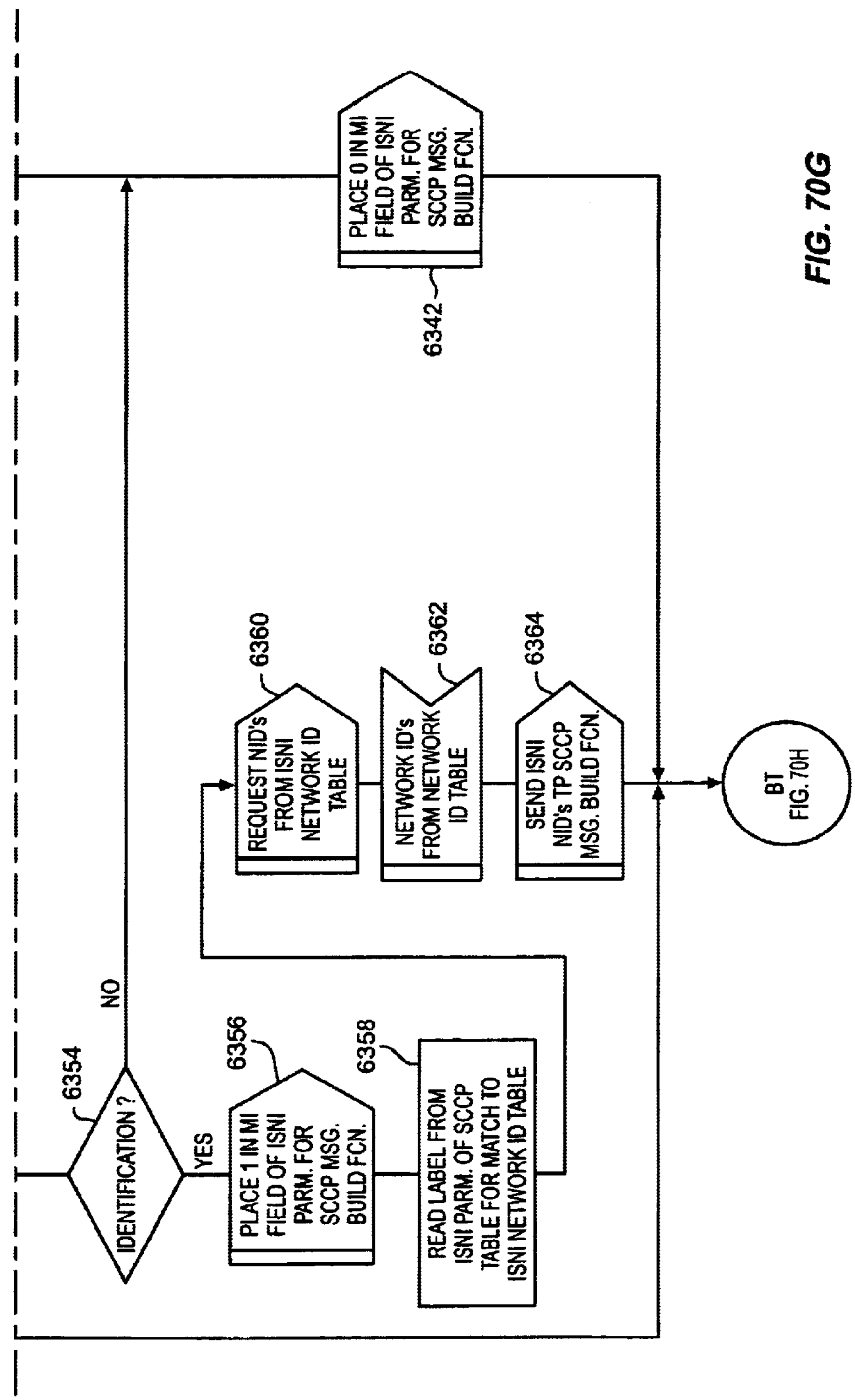
Figure 70H:
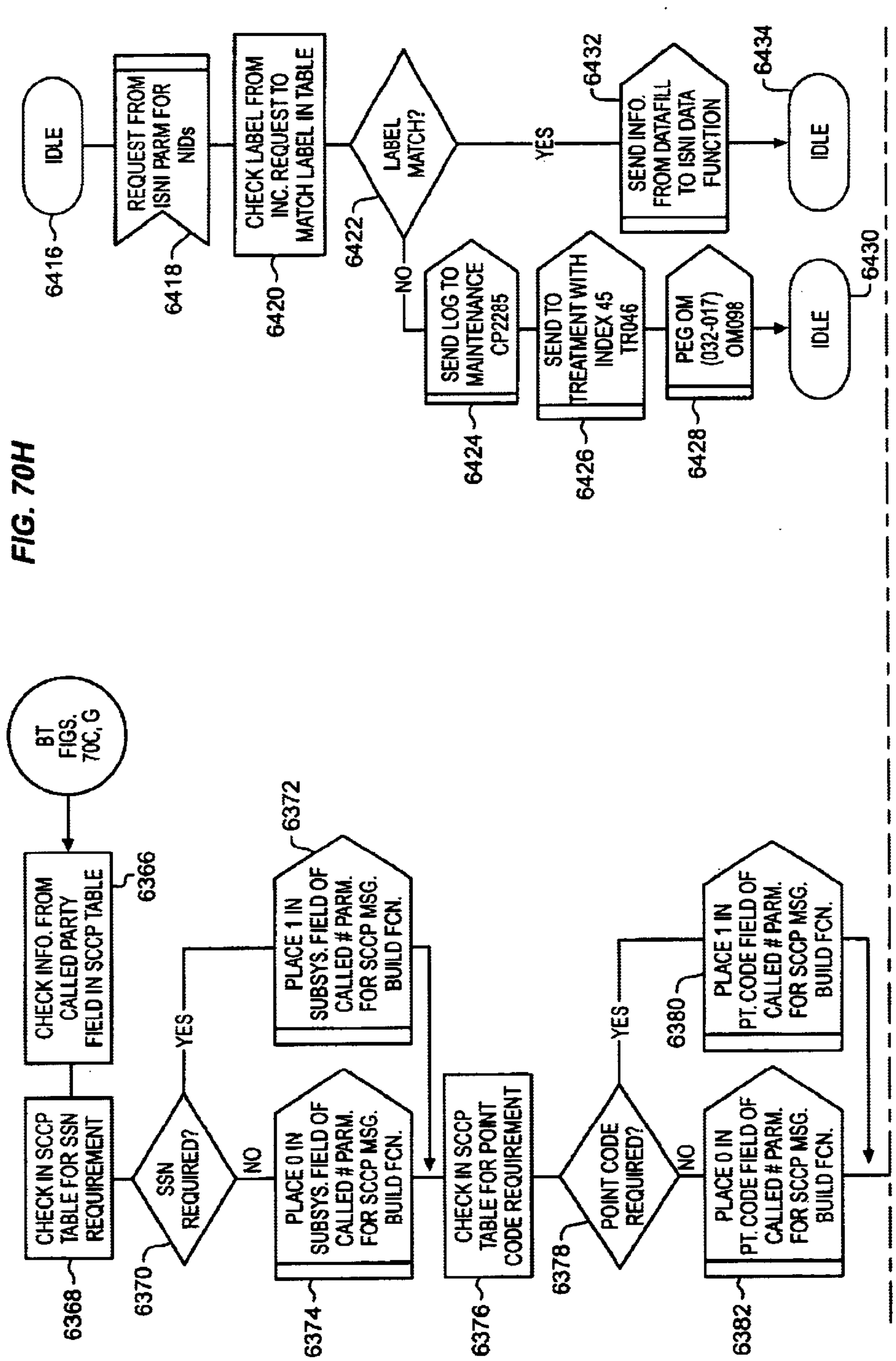
Figure 70:
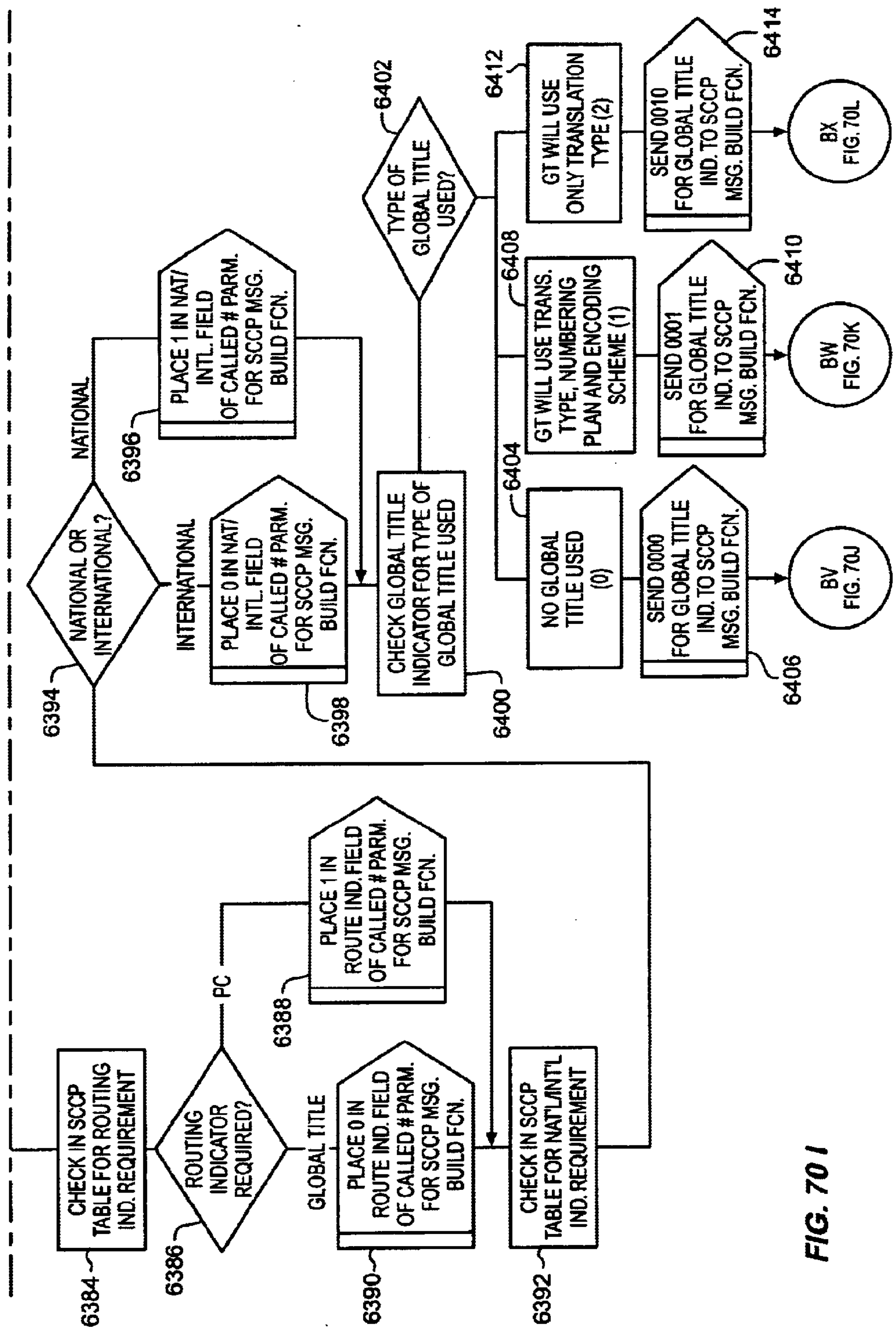
Figure 70J:
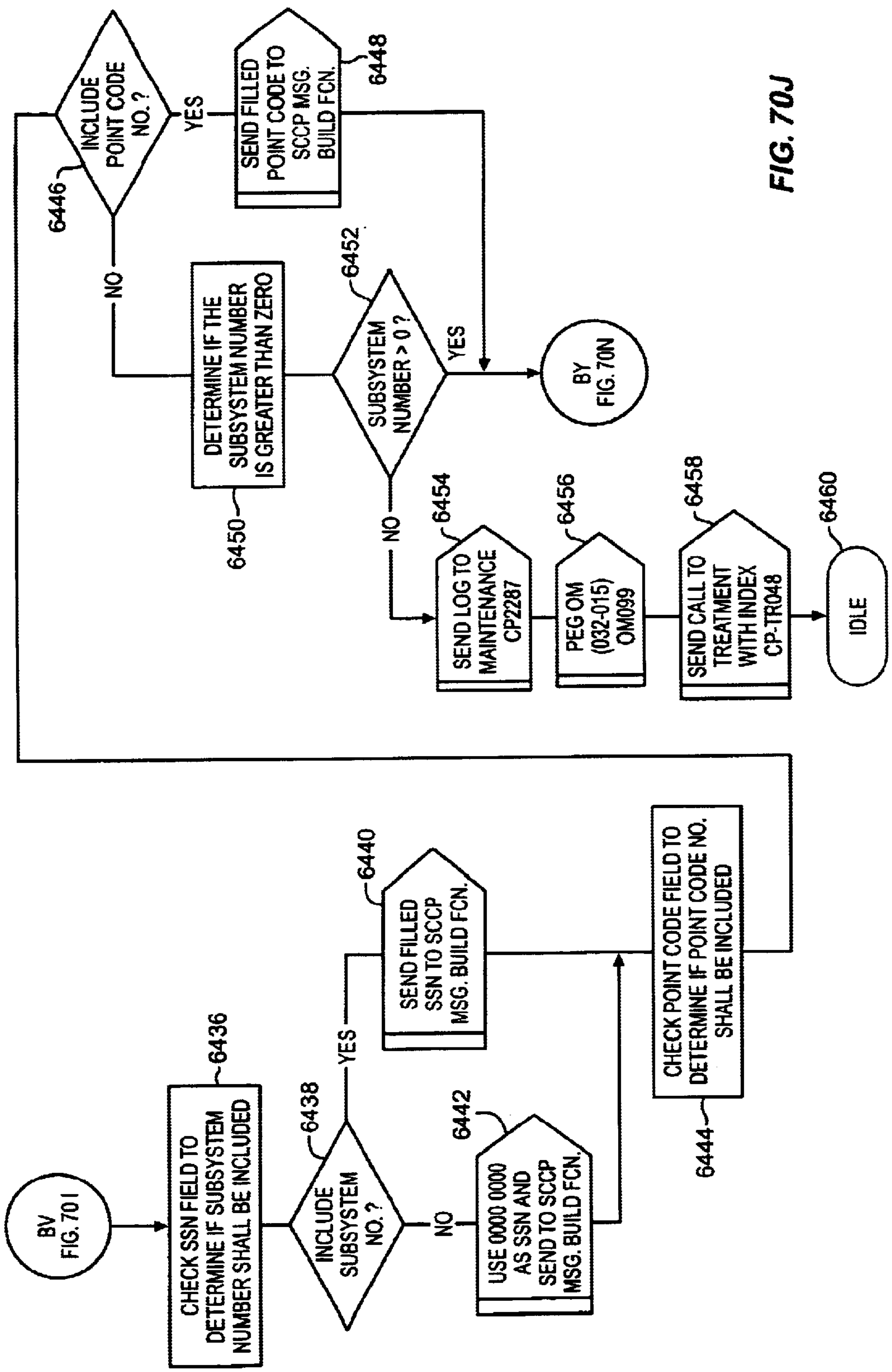
Figure 70K:
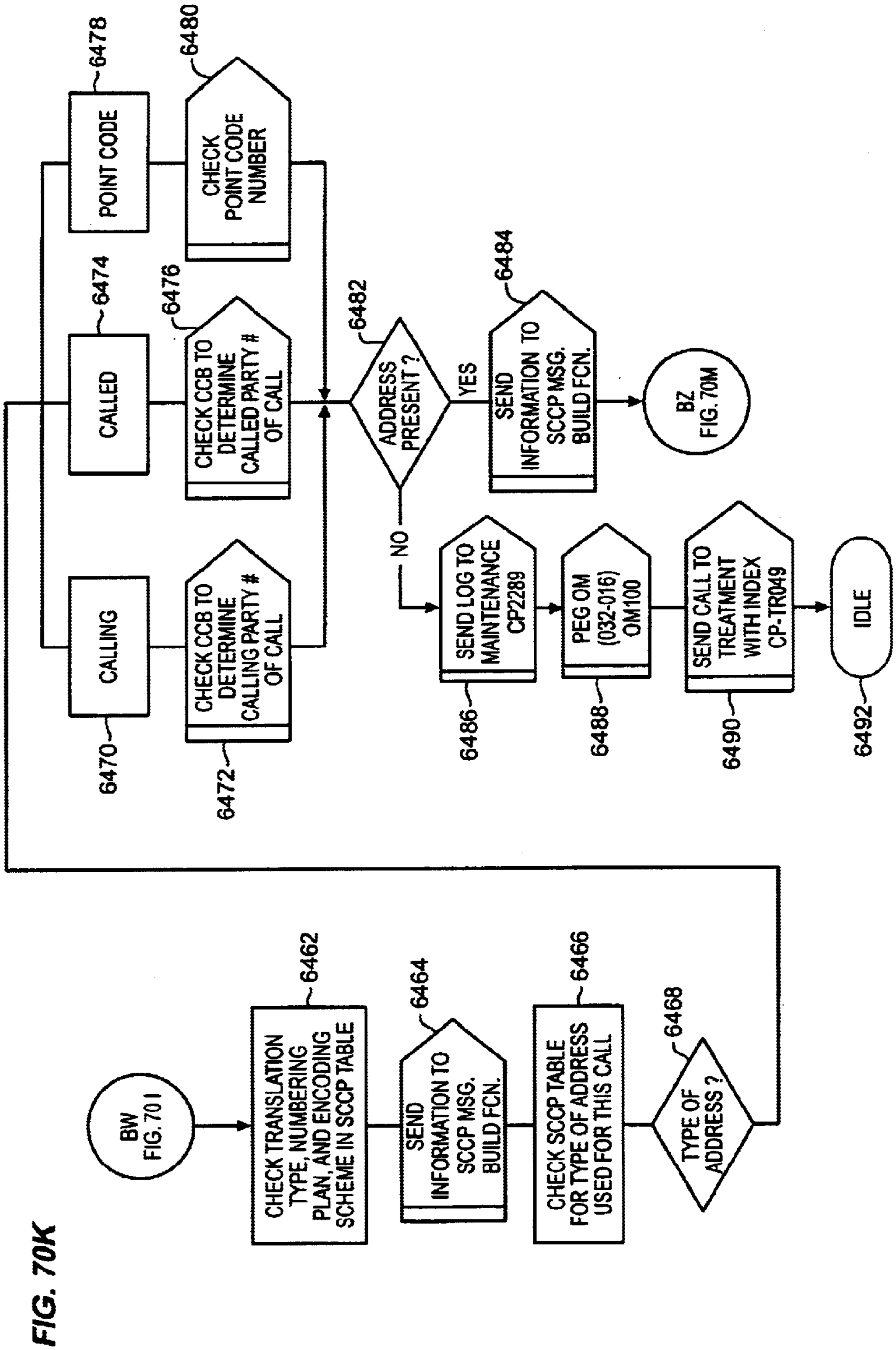
Figure 70L:
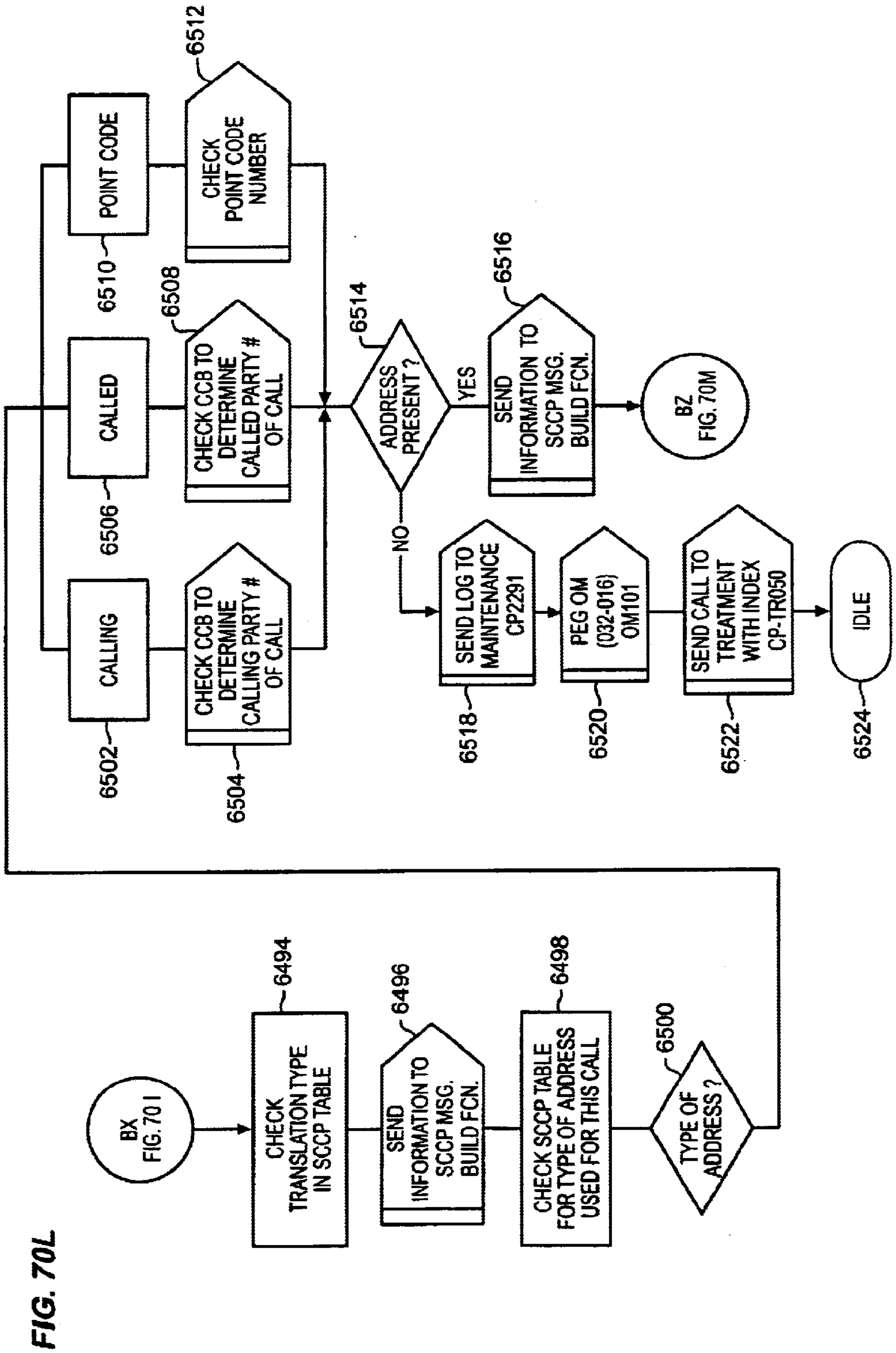
Figure 70M:
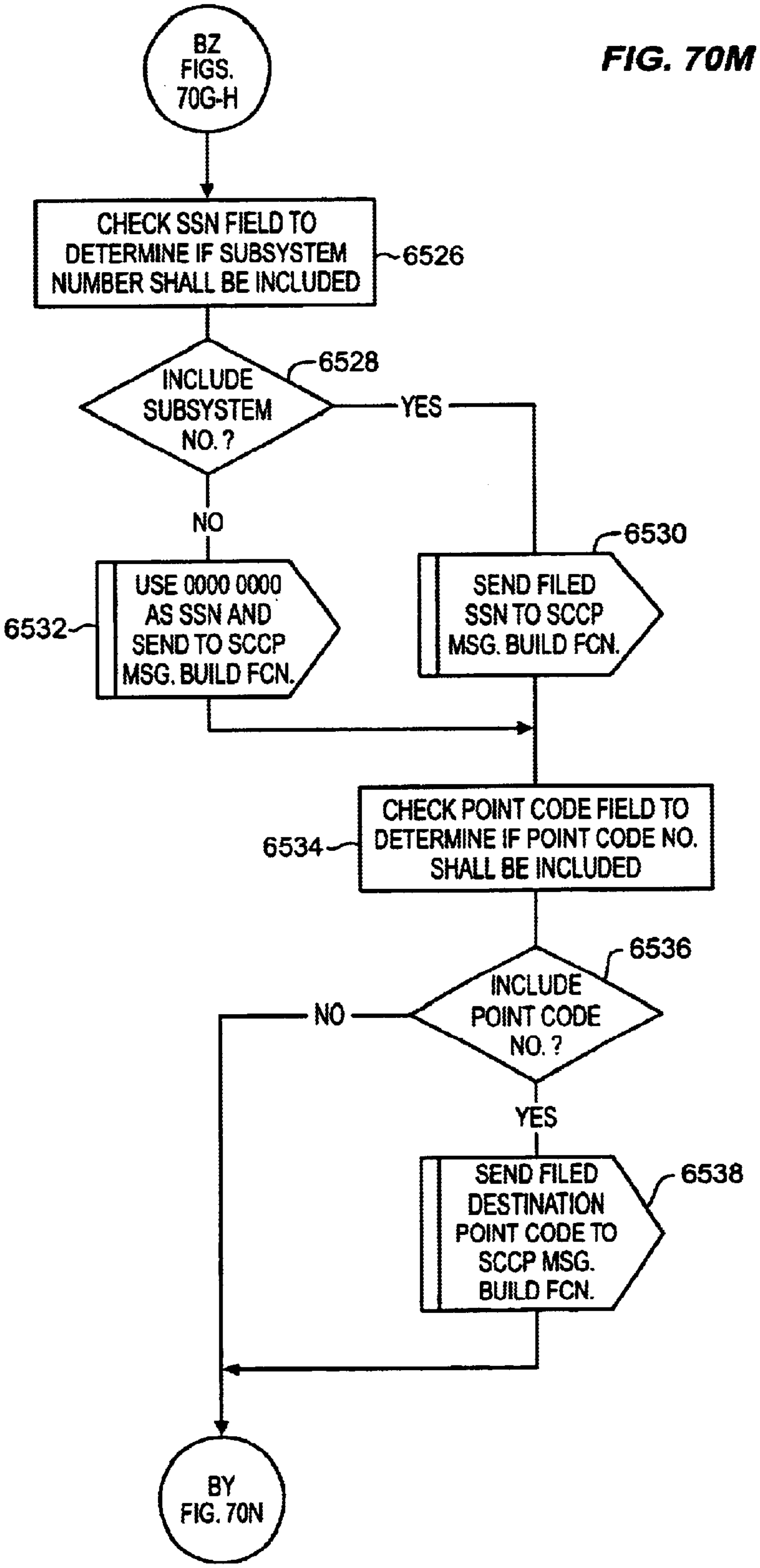
Figure 70N:
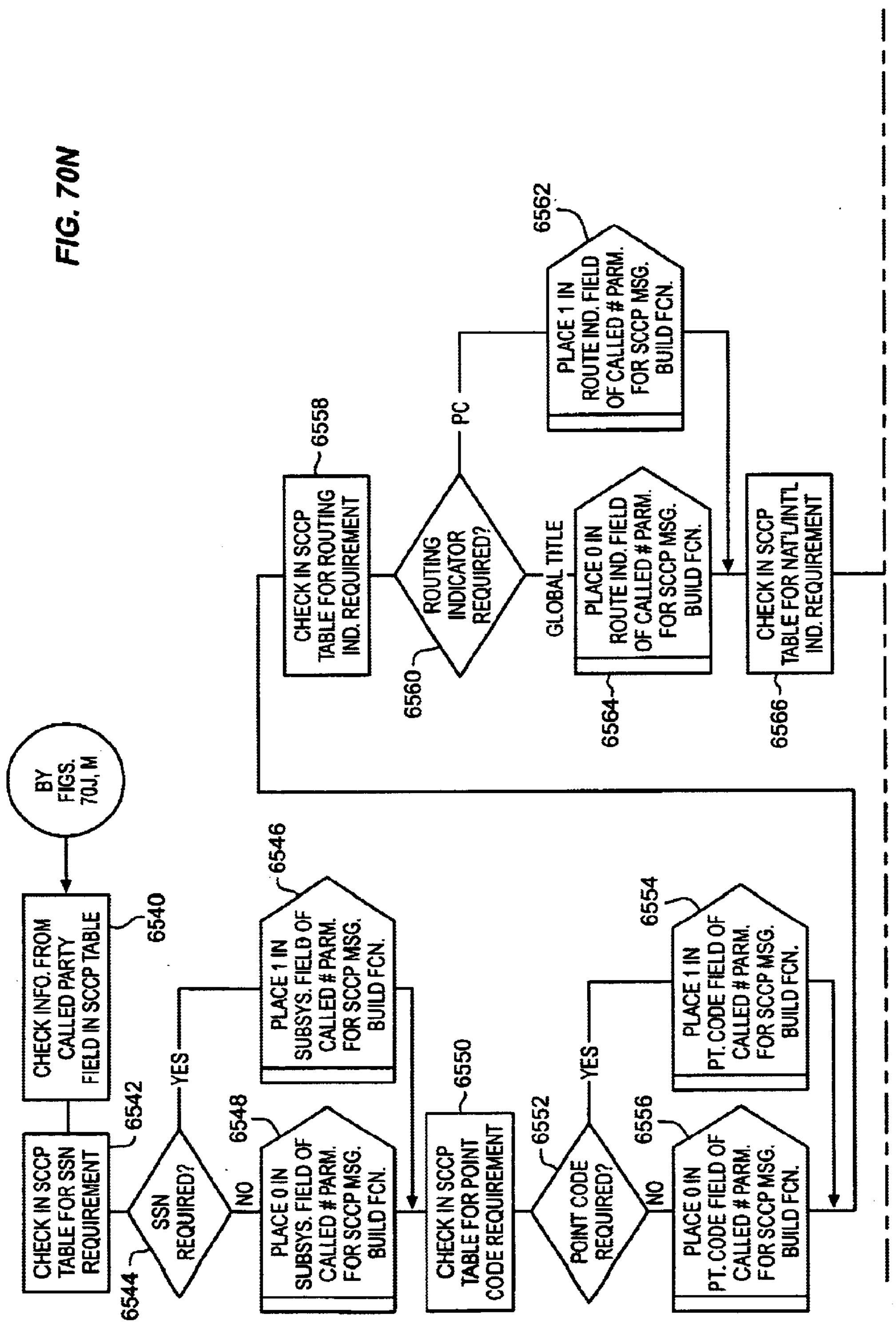
Figure 70:
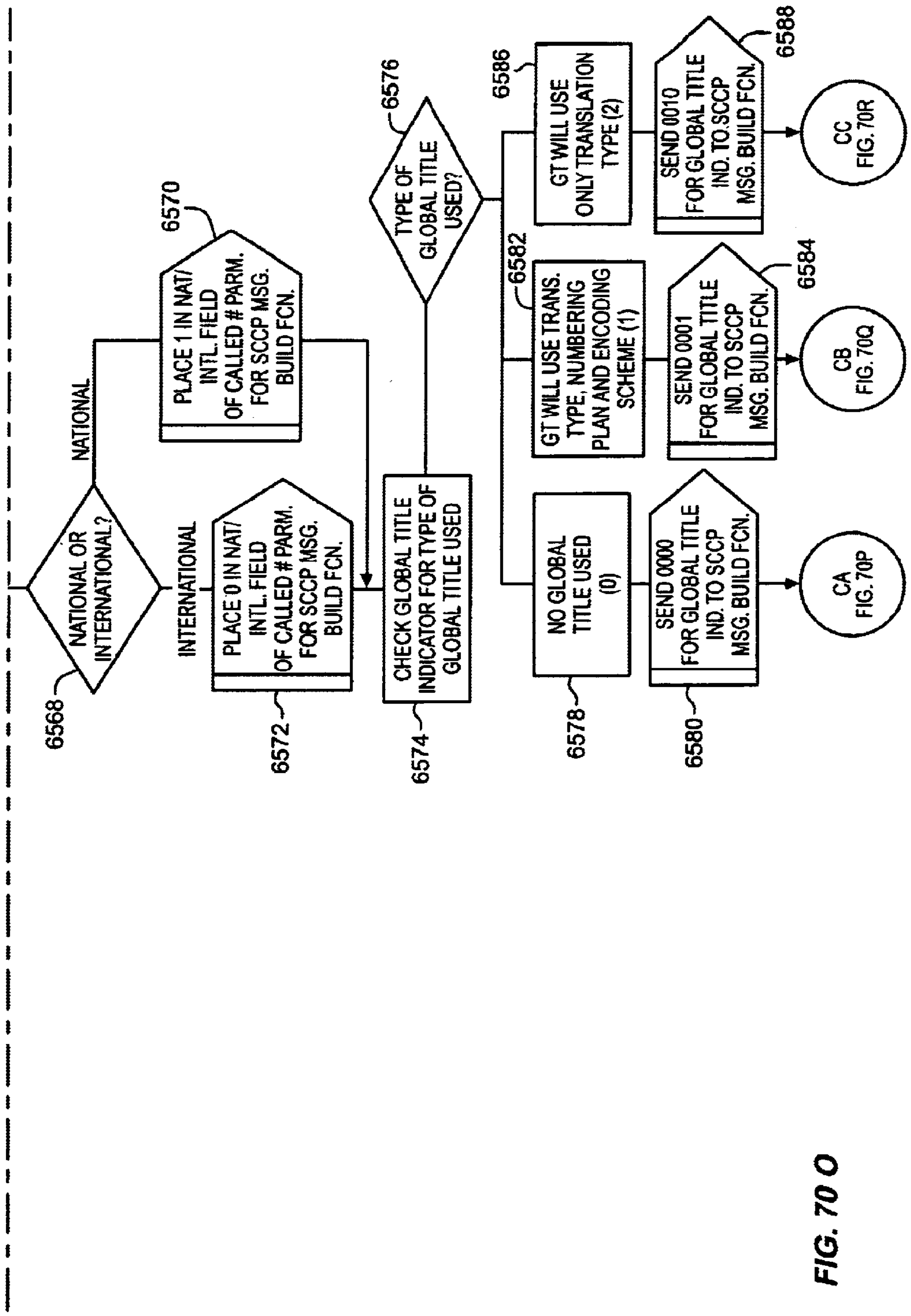
Figure 70P:
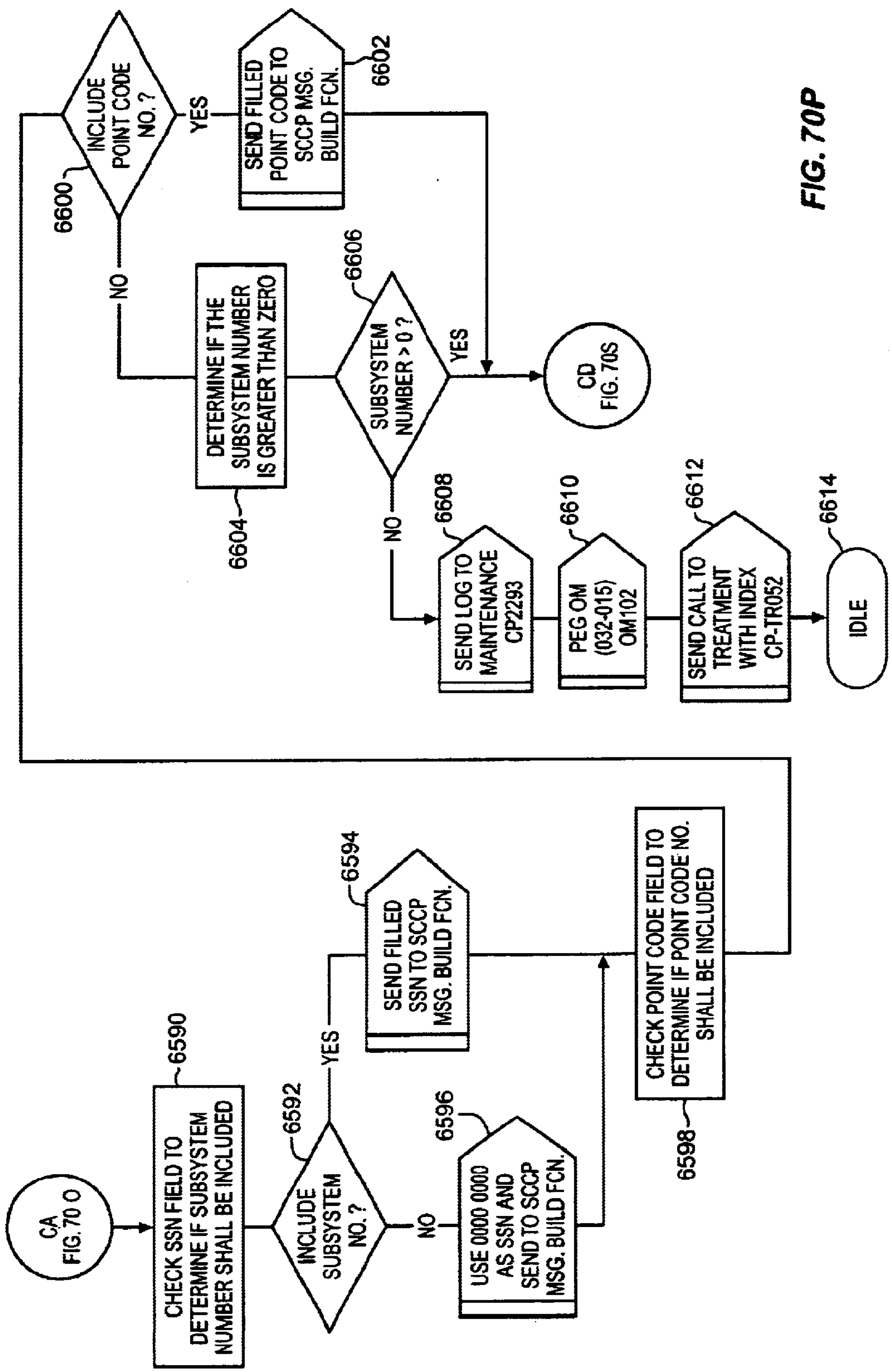
Figure 70Q:
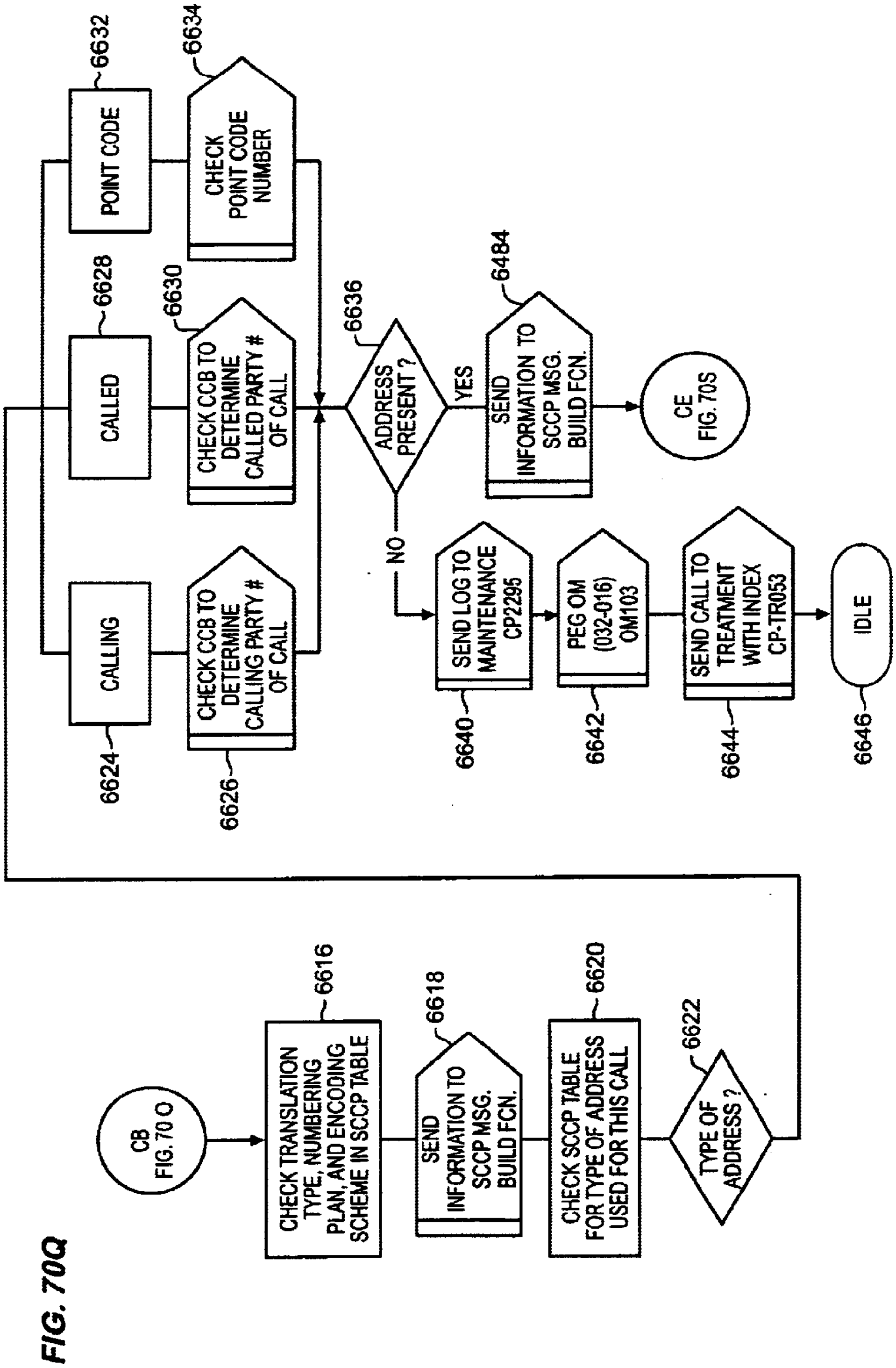
Figure 70R:
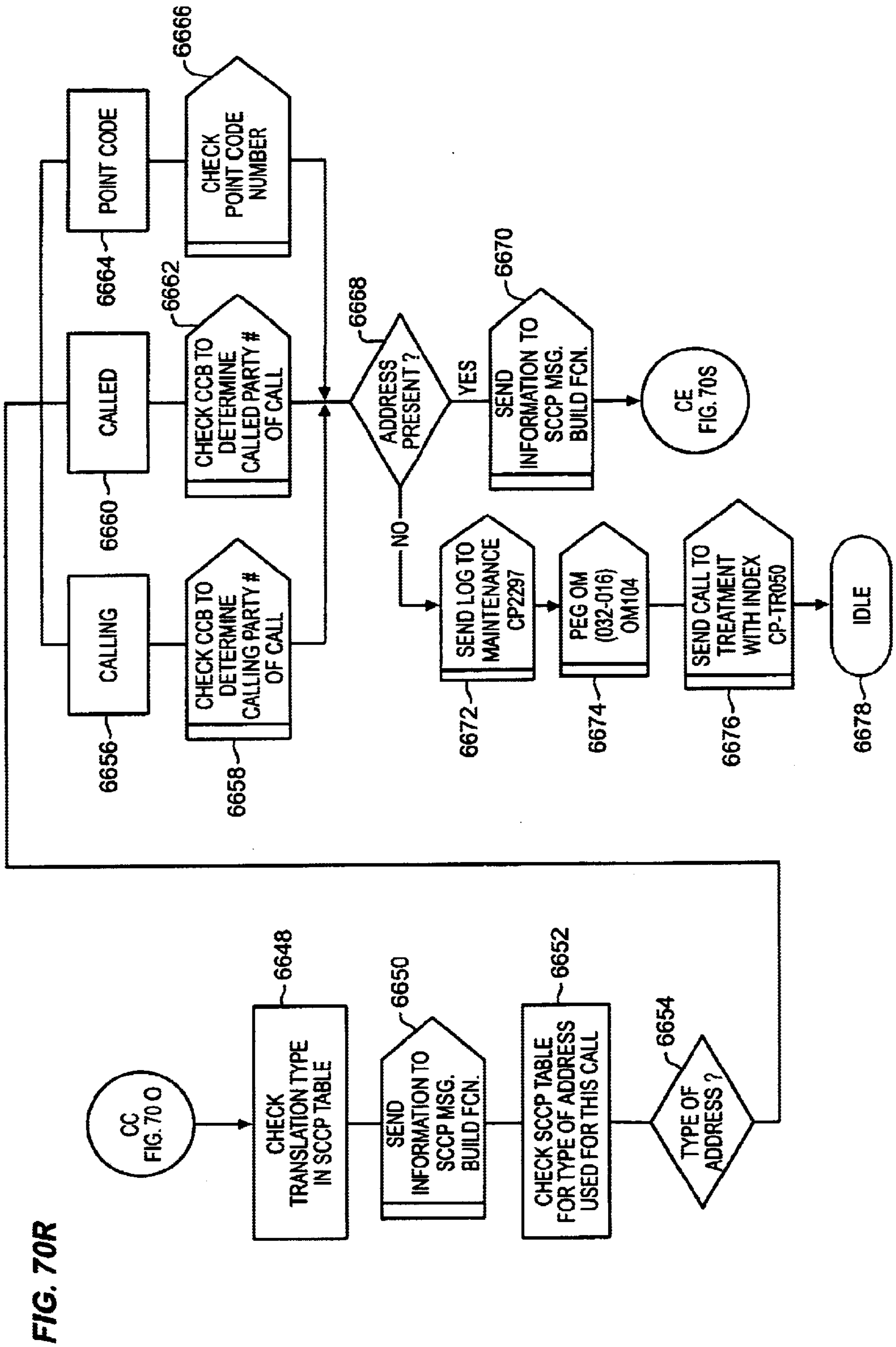
Figure 70S:
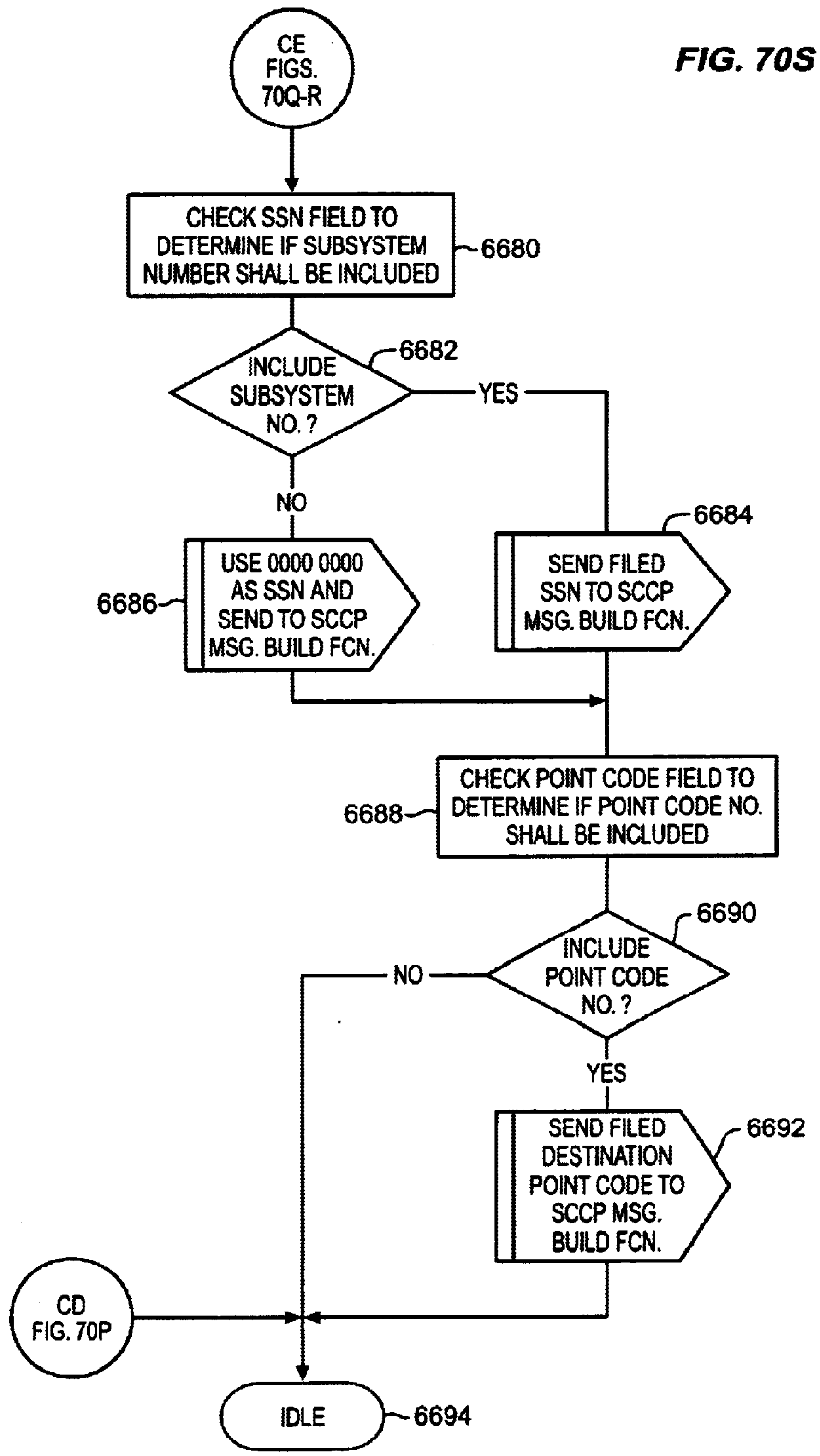
Figure 70T:
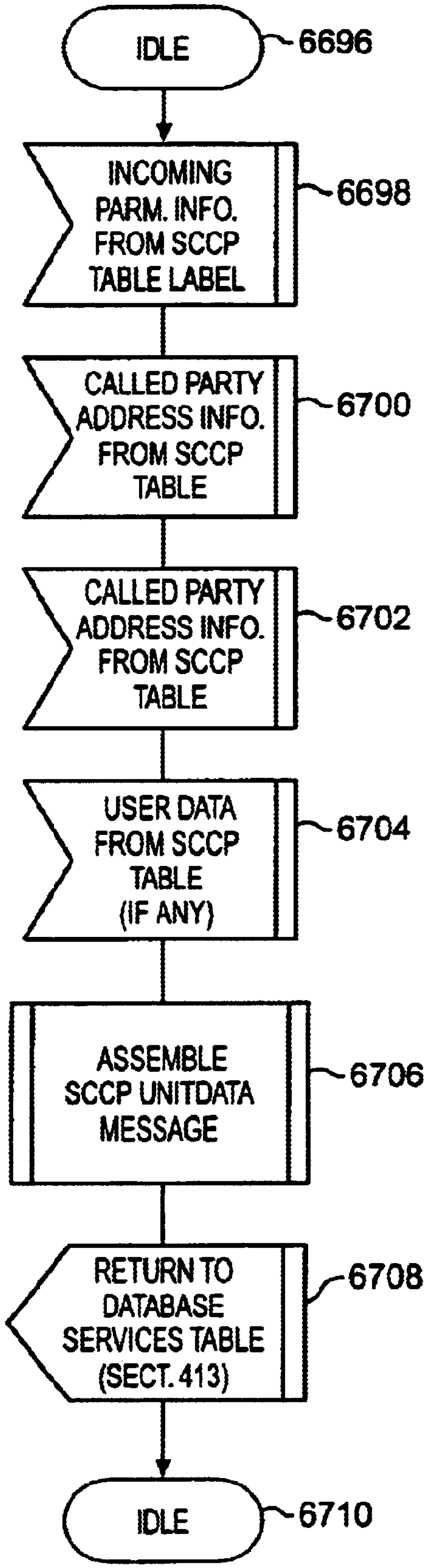

FIGS. 70A–70T depict processing for outgoing SCCP routing. The process is idle at 6198. An incoming request is received from call processing at 6200. The SCCP table is checked to find a label that matches the next function label from the incoming request at 6202. If a label match is not found at 6204, a log is sent to maintenance at 6206. The call is sent to the treatment table at 6208, and idle is attained at 6210. If a match is found at 6204, the process goes to the line in the SCCP table at which the label match was found at 6212. The SCCP table is checked for the type of message at 6214.

If the message is a unitdata message at 6216, the unitdata information is sent to the SCCP message building function for this message at 6254. The SCCP table is checked for the protocol class at 6256. This process handles protocol classes 0 and 1. If the protocol class equals 0, it is a basic connectionless class. If the protocol class is set to 1, it is a sequenced (MTP) connectionless class.

If the protocol class is set to 1 at 6258, the OM is pegged at 6260. Message sequencing is required for this class using the identical signaling link selection (SLS) codes that are in the MTP at 6262. The protocol class 1 is sent to the SCCP message building function for this message at 6264.

If the protocol class is set to 0 at 6258, normal message sequencing is allowed at 6268. The OM is pegged at 6270, and the protocol class of 0 is sent to the SCCP message building function for this message at 6272.

The SCCP table is checked for the message handling at 6266 and 6274. The message handling operation returns an error message if this message is received with errors at 6274 and 6276. The OM is pegged at 6278. A return message is sent to the SCCP message building function for this message at 6280.

The message handling operation discards the message if it is received with errors at 6274 and 6282, the OM is pegged at 6284. A log is sent to maintenance at 6286, and a discard message is sent to the SCCP message building function for this message at 6288.

If the message is an extended unitdata message at 6216, the extend unitdata information is sent to the SCCP message building function for this message at 6218. The SCCP table is checked for the protocol class at 6220. This process handles protocol classes 0 and 1. If the protocol class equals 0, it is a basic connectionless class. If the protocol class is set to 1, it is a sequenced (MTP) connectionless class.

If the protocol class is set to 1 at 6222, the OM is pegged at 6224. Message sequencing is required for this class using the identical signaling link selection (SLS) codes that are in the MTP at 6226. The protocol class 1 is sent to the SCCP message building function for this message at 6228.

If the protocol class is set to 0 at 6222, normal message sequencing is allowed at 6230. The OM is pegged at 6232, and the protocol class of 0 is sent to the SCCP message building function for this message at 6234.

The SCCP table is checked for the message handling at 6236 and 6238. The message handling operation returns an error message if this message is received with errors at 6238 and 6240. The OM is pegged at 6242. A return message is sent to the SCCP message building function for this message at 6244.

The message handling operation discards the message if it is received with errors at 6238 and 6246, the OM is pegged at 6248. A log is sent to maintenance at 6250, and a discard message is sent to the SCCP message building function for this message at 6252.

The routing hop counter number is determined at 6290. The hop count is added to the SCCP message building function for this message at 6292. The SCCP table is checked to determine if segmentation is required for this message at 6294. If segmentation is not required at 6296, the process continues at step 6328. If segmentation is required at 6296, the TCAP table is checked to determine how many messages must be sent at 6298. The TCAP process is called at 6300, and a response is received from the TCAP process with the required number of messages at 6302. The number of segments that will be sent in this transaction is recorded at 6304.

If this is not the first message sent at 6306, the $8^{th}$ bit in the first octet of the segment indicator is set to "0" at 6308. If this is the first message sent at 6306, the $8^{th}$ bit of the first octet of the segment indicator is set to "1". After either step 6308 or 6310, the total number of remaining segments i s decremented by one at 6312. The total number of remaining segments is sent to the SCCP message building function at 6314. The number of remaining segments is calculated and placed in the SCCP segmentation parameter.

The protocol class is checked at 6316 and 6318. If the protocol class is class 1 at 6318, the $7^{th}$ bit in the first octet of the segmentation indicator is set to "1" at 6320. If the protocol class is 0 at 6318, the $7^{th}$ bit in the first octet of the segmentation indicator is set to "0" at 6322. After step 6320 or step 6322, a twenty-four bit number is generated for a local reference number at 6324. This number will be used for each of the segments for this transaction. The local reference number is sent to the SCCP message building function at 6326.

The SCCP table is checked for the ISNI capability at 6328. If the message does require the ISNI at 6330, the SCCP table is checked to determine the type of ISNI required at 6332. A 000 is placed in the counter field of the ISNI parameter in the SCCP message building function at 6334. If the ISNI type is 0 at 6336, type 0 is placed in the ISNI parameter of the SCCP message building function at 6338. A 00 is sent to the ISNI routing indicator (IRI,) field in the ISNI part of the SCCP message building function at 6340. A 0 is placed in the mark for identification indicator (MI) field of the ISNI parameter for the SCCP message building function at 6342. The process then continues at step 6366.

If the ISNI type is type 1 at 6336, type 1 is placed in the ISNI parameter of the SCCP message building function at 6344. The SCCP table is checked for the IRI type at 6346. If the IRI is set to anything other than constrained, such as neither or suggested or another value, the process continues at step 6340. If the IRI is constrained at 6348, a 01 is sent to the IRI field in the ISNI part of the SCCP message building function at 6350. The SCCP table is checked to determine the MI at 6352. If the MI is set to 0 for do not identify networks at 6354, the process proceeds to 6342. If the MI is set to 1 for identify networks at 6354, a 1 is placed in the MI field of the ISNI parameter for the SCCP message building function at 6356. The label from the ISNI parameter of the SCCP table is read for a match to the ISINI network identification (NID) at 6358. The NIDs are requested from the ISNI network ID table at 6360. The NIDs are received from the network ID table at 6362, and the, NIDs are sent to the SCCP message building function at 6364.

The information from the called party number (CdPN) field in the SCCP table is checked at 6366. In addition, the SCCP table is checked for the SSN requirements at 6368. If the SSN is required at 6370, a 1 is placed in the subsystem field of the called party parameter for the SCCP message building function at 6372. If the SSN is not required at 6370, a 0 is placed in the subsystem field of the called number parameter for the SCCP message building function at 6374. The SCCP table is checked for the point code requirements at 6376. If the point code is required at 6378, a 1 is placed in the point code field of the called number parameter for the SCCP message building function at 6380. If the point code is not required at 6378, a 0 is placed at the point code field of the called number parameter for the SCCP message building function at 6382.

After step 6380 or step 6382, the SCCP table is checked for the routing indicator requirements at 6384. If the routing indicator requires a point code (PC) at 6386, a 1 is placed in the routing indicator field of the called number parameter of the SCCP message building function at 6388. If the routing indicator requires a global title translation (GTT) at 6386, a 0 is placed in the routing indicator field of the called number parameter for the SCCP message building function at 6390.

After step 6388 or step 6390, the SCCP table is checked for the national and international indicator requirements at 6392. If national routing and setup are required at 6394, a 1 is placed in the national/international field of the called number parameter for the SCCP message building function at 6396. If international routing and setup are required at 6394, a 0 is placed in the national/international field of the called number parameter for the SCCP message building function at 6398. After step 6396 or step 6398, the global title indicator is checked to determine the type of the global title used at 6400. If the global title type is set at 0 at 6402 so that no global title is used at 6404, a 0000 is sent for the global title indicator to the SCCP message building function at 6406. If the global title type is 1 at 6402 so that the global title will use a translation type, a numbering plan, and an encoding scheme at 6408, a 0000 is sent for the global title indicator to the SCCP message building function at 6410. If the global title type is 2 at 6402 so that the global title will use only a translation type at 6412, a 0010 is sent for the global title indicator to the SCCP message building function at 6414.

The ISNI network identification (NID) table logic for the extended unitdata is depicted at steps 6416–6434. The process is idle at 6416. If a request is received from the ISNI parameter for the NIDs at 6418, the label from the incoming request is checked to match a label in the ISNI table at 6420. If a label match is not found at 6422, a log is sent to maintenance at 6424. The call is sent to treatment at 6426, and the OM is pegged at 6428. Idle is attained at 6430. If a label match is found at 6422, the information from the data fill His sent to the ISNI data function at 6432. Idle is attained at 6434.

The SSN field is checked to determine if the subsystem number is to be included in this message at 6436. If the subsystem number is to be included at 6438, the filled SSN is sent to the SCCP message building function at 6440. If the subsystem number is not to be included at 6438, 0000 0000 is to be used at the SSN and sent to the SCCP message building function at 6442. After step 6440 or 6442, the point code field is checked to determine if the point code number is to be included in this message at 6444. If the point code number is to be included at 6446, the filled point code is sent to the SCCP message building function at 6448. The process then continues at step 6540. If the point code is not to be included at 6446, it is determined if the subsystem number is greater than 0 at 6450. If the subsystem number is greater than 0 at 6452, the process continues at step 6540. If the subsystem number is not greater than 0 at 6452, a log is sent to maintenance at 6454. The OM is pegged at 6456, and the call is sent to treatment at 6458. Idle is attained at 6460.

The translation type, the numbering plan, and the encoding scheme are checked in the SCCP table at 6462. The information is sent to the SCCP message building function at 6464. The SCCP table is checked for the type of address used for this call at 6466 and 6468. If the type of address is a calling address at 6470, the CIB is checked to determine the calling party number of the call at 6472. If the type of address is a called address at 6474, the CIB is checked to determine the called party number of the call at 6476. If the type of address is a point code at 6478, the point code number is checked at 6480.

Next, it is determined if an address is present at 6482. If the address is present at 6482, the information is sent to the SCCP message building function at 6484. The process then continues at step 6526. If the address is not present at 6482, a log is sent to maintenance at 6486. The OM is pegged at 6488, and the call is sent to treatment at 6490. Idle is attained at 6492.

The translation type is checked in the SCCP table at 6494. The information for the translation type is "sent to the SCCP message building function at 6496. The SCCP table is checked for the type of address used for this call at 6498 and 6500. If the type of address is a calling address at 6502, the CIB is checked to determine the calling party number of the call at 6504. If the type of address is a called address at 6506, the CIB is checked to determine the called party number of the call at 6508. If the type of address is a point code at 6510, the point code number is checked at 6512.

Next, the address is determined at 6514. If an address is present at 6514, the information for the address type is sent to the SCCP message building function at 6516. The process then continues at step 6526. If an address is not present at 6514, a log is sent to maintenance at 6518. The OM is sent to maintenance at 6520, and the call is sent to treatment at 6522. Idle is attained at 6524.

At step 6526, the SSN field is checked to determine if the subsystem number shall be included with this call. If the subsystem number is to be included at 6528, the filled SSN is sent to the SCCP message building function at 6530. If the subsystem number is not to be included at 6528, a 0000 0000 is used as the SSN and sent to the SCCP message building function at 6532. Next, the point code field is checked to determine if the point code number shall be included in this call at 6534. If the point code is to be included at 6536, the filled destination point code (DPC) is sent to the SCCP message building function at 6538. After step 6538 or if the point code is not to be included at 6536, the process continues at step 6540.

At step 6540, the information from the called party field in the SCCP table is checked. The SSN requirements are checked in the SCCP table at 6542. If the SSN is required at 6544, a 1 is placed in the subsystem field of the called number parameter for the SCCP message building function at 6546. If the SSN is not required at 6544, a 0 is placed in the subsystem field of the called number parameter of the SCCP message building function at 6548. Next, the SCCP table is checked for the point code requirements at 6550. If a point code is required at 6552, a 1 is placed in the point code field of the called number parameter for, the SCCP message building function at 6554. If a point code is not required at 6552, a 0 is placed in the point code field of the called number parameter for the SCCP message building function at 6556.

Next, the SCCP table is checked for the routing indicator requirement at 6558. If the RIR requires a point code at 6560, a 1 is placed in the routing indicator field of the called number parameter for the SCCP message building function at 6562. If the RIR requires a global title translation at 6560, a 0 is placed in the routing indicator field of the called number parameter for the SCCP message building function at 6564. The SCCP table then is checked for the national/international indicator requirements at 6566. If national routing and setup are required at 6568, a 1 is placed in the national/international field of the called number parameter for the SCCP message building function at 6570. If international routing and setup are required at 6568, a 0 is placed in the national/international field of the called number parameter for the SCCP message building function at 6572.

Next, the global title indicator is checked for the type of global title to be used for this call at 6574 and 6576. If the type of the global title is set to 0 at 6576 so that no global title is used 6578, a 0000 is sent for the global title indicator to the SCCP message building function at 6580. If the global title type is 1 at 6576, the global title will use a translation type, a numbering plan, and an encoding scheme at 6582. A 0001 is sent for the global title indicator to the SCCP message building function at 6584. If the global title type is 2 at 6576 so that the global title will use only a translation type at 6586, a 0010 is sent for the global title indicator to the SCCP message building function at 6588.

The SSN field is checked to determine if the subsystem number shall be included in this call at 6590. If the subsystem number is to be included at 6592, the filled SSN is sent to the SCCP message building function at 6594. If the subsystem number is not to be included at 6592, a 0000 0000 is used as the SSN and sent to the SCCP message building function at 6596.

The point code field is checked to determine if the point code number shall be included in this call at 6598. If the point code is to be included at 6600, a filled point code is sent to the SCCP message building function at 6602. The process then continues at step 6694. If a point code is not to be included at 6600, it is determined if the subsystem number is greater than 0 at 6604. If the subsystem number is greater than 0 at 6606, the process continues at step 6694. If the subsystem number is not greater than 0 at 6606, a log is sent to maintenance at 6608. The OM is pegged at 6610, and the call is sent to treatment at 6612. Idle then is attained at 6614.

At step 6616, the translation type, the numbering plan, and the encoding scheme are checked in the SCCP table. The information gained from the SCCP table is sent to the SCCP message building function at 6618. The SCCP table is checked to determine the type of address used for this call at 6620 and 6622. If the type of address is a calling address at 6624, the CIB is checked to determine the calling party number of the call at 6626. If the type of address is a called address at 6628, the CIB is checked to determine the called party number of the call at 6630. If the type of address is a point code at 6632, the point code number is checked at 6634. If the address is present at 6636, the address information is sent to the SCCP message building function at 6638. The process then continues at step 6680. If an address is not present at 6636, a log is sent to maintenance at 6640. The OM is pegged at 6642, and the call is sent to treatment at 6644. Idle then is attained at 6646.

The translation type is checked in the SCCP table at 6648. The translation type information is sent to the SCCP message building function at 6650. The SCCP table is checked for the address type used for this call at 6652 and 6654. If the type of address is a calling address at 6656, the CIB is checked to determine the calling party number of the call at 6658. If the type of address is a called address at 6660, the CIB is checked to determine the called Party number of the call at 6662. If the type of address is a point code at 6664, the point code number is checked at 6666.

If the address is present at 6668, the address information is sent to the SCCP message building function at 6670. The process then continues at step 6680. If an address is not present at 6668, a log is sent to maintenance at 6672. The OM is pegged at 6674, and the call is sent to treatment at 6676. Idle is attained at 6678.

The SSN field is checked to determine if the subsystem number shall be included for this call at 6680. If the subsystem number is to be included at 6682, the filled SSN is sent to the SCCP message building function at 6684. If the subsystem number is not to be included at 6682, a 0000 0000 is used as the SSN and sent to the SCCP message building function at 6686. Next, the point code filled is checked to determine if a point code number shall be included for this call at 6688. If the point code is to be included at 6690, a field destination point code is sent to the SCCP message building function at 6692. After step 6692 or if a point code is not to be included at 6690, idle is attained at 6694.

The SCCP message building function process is idle at 6696. An incoming parameter information is received from the SCCP table label at 6698. This information includes the routing label, such as the DPC, OPC, and SLS, and the message type. The called party address information is received from the SCCP table at 6700. The calling party address information is received from the SCCP table at 6702. User data from the SCCP table, if any, is received at 6704. The SCCP unitdata message is assembled at 6706. The process returns to the database services table at 6708, and idle is attained at 6710.

Outgoing TCAP Routing

FIGS. 71A–71D depict outgoing TCAP routing. The process is idle at 6712. An incoming request is received from the call processing at 6714. The process finds the label in the TCAP table that matches the next function label in the incoming request at 6716. If the label does not match at 6718, a log is sent to maintenance at 6720. The call is sent to treatment at 6722, and idle is attained at 6724. If a label match is found at 6718, the tag class is checked at 6726, and the tag class is recorded at 6728. The tag class may be universal, private, application wide, or context specific. The tag class is sent to the TCAP message building function at 6730.

The package type is checked at 6732. The package type is recorded at 6734. The transaction data is sent to the TCAP message building function at 6736. The component type is checked at 6738 and recorded at 6740. The component data is sent to the TCAP message building function at 6742.

The type of TCAP is checked at 6744 and recorded at 6746. If the TCAP is a distributed intelligence network architecture (DINA) type TCAP at 6748, future implementations will provide the process. If the TCAP is an advanced intelligent network (AIN) type TCAP at 6748, the message type is checked at 6750 and recorded at 6752. The service type and the message type are determined at 6754.

The type of service and message at 6756 is a local number portability (LNP) information analyzed type at 675$8, the calling party number is placed in the user identification parameter at 6760. The called party number is placed in the called party identification parameter at 6762. "Speech" is placed in the bearer capability parameter at 6764. The message data is sent to the TCAP message building function at 6766, and idle is attained at 6768.

If the type of service and message at 6756 is an AIN event parameter, the AIN event parameter's table is checked for a match of the message type at 6770. If a match is not found at 6772, a log is sent to maintenance at 6774. The call is sent to treatment at 6776, and idle is attained at 6778. If a match is found at 6772, the message data is sent to the TCAP message building function at 6780. Idle is attained at 6782.

Figure 71A:
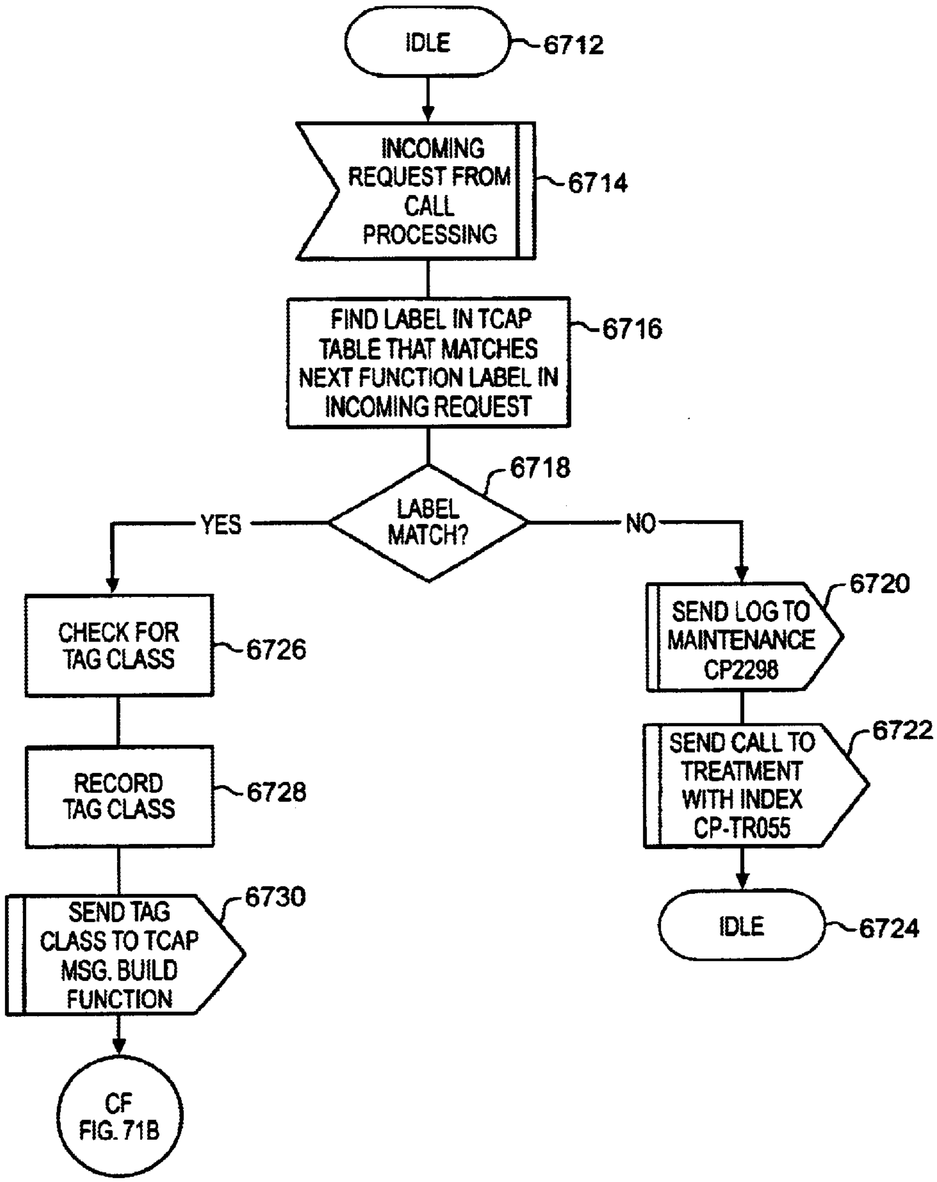
FIGS. 71A–71D are SDL diagrams of logic used in a version of the invention for outgoing TCAP routing.
Figure 71B:
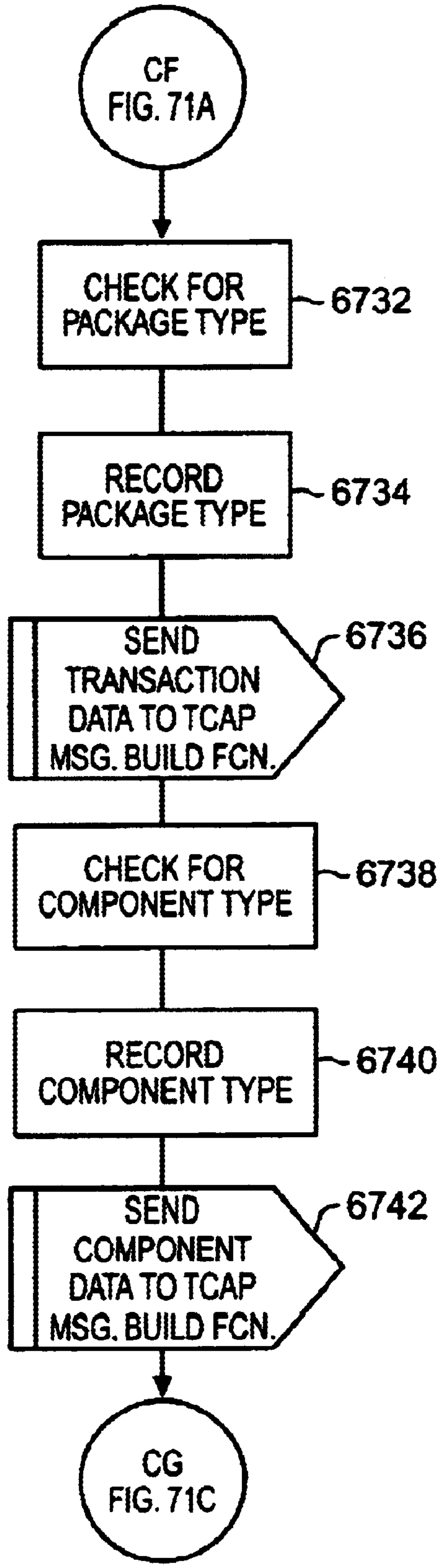
Figure 71C:
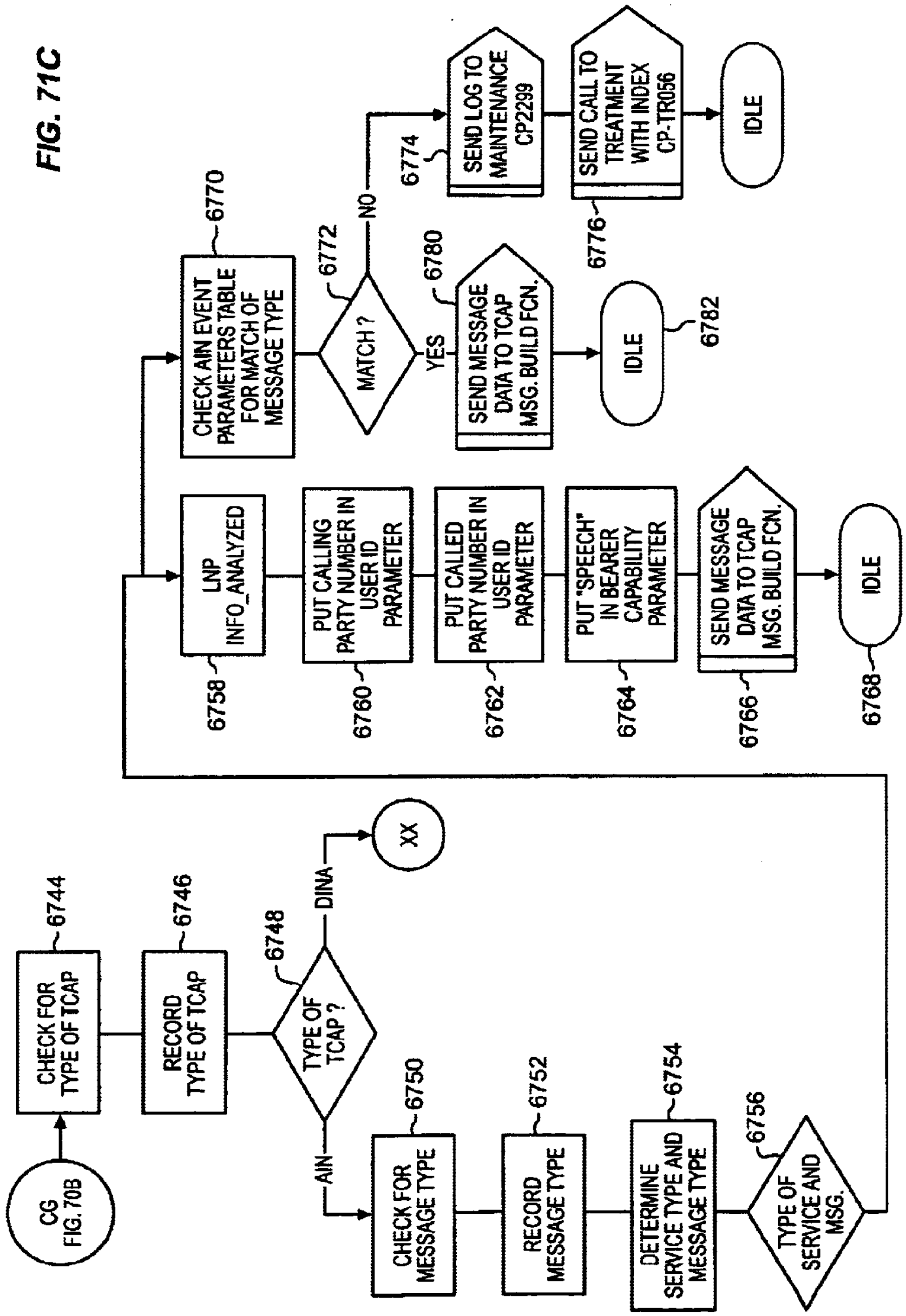
Figure 71D:
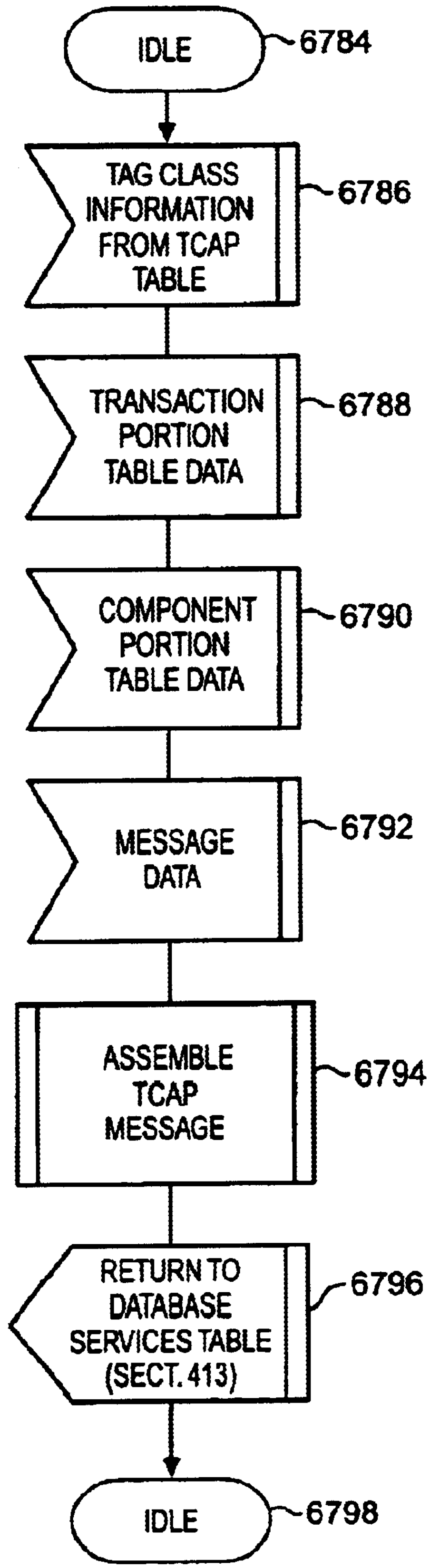

FIG. 71D depicts an example of the TCAP message building function. The process is idle at 6784. The tag class information is received from the TCAP table at 6786. The transaction portion table data is received at 6788, and the component portion table data is received at 6790. Message data is received at 6792. The TCAP message is assembled at 6794. The process is returned to the database services table at 6796, and idle is attained at 6798.

Mux/Echo Canceller Release, Process

Figure 72A:
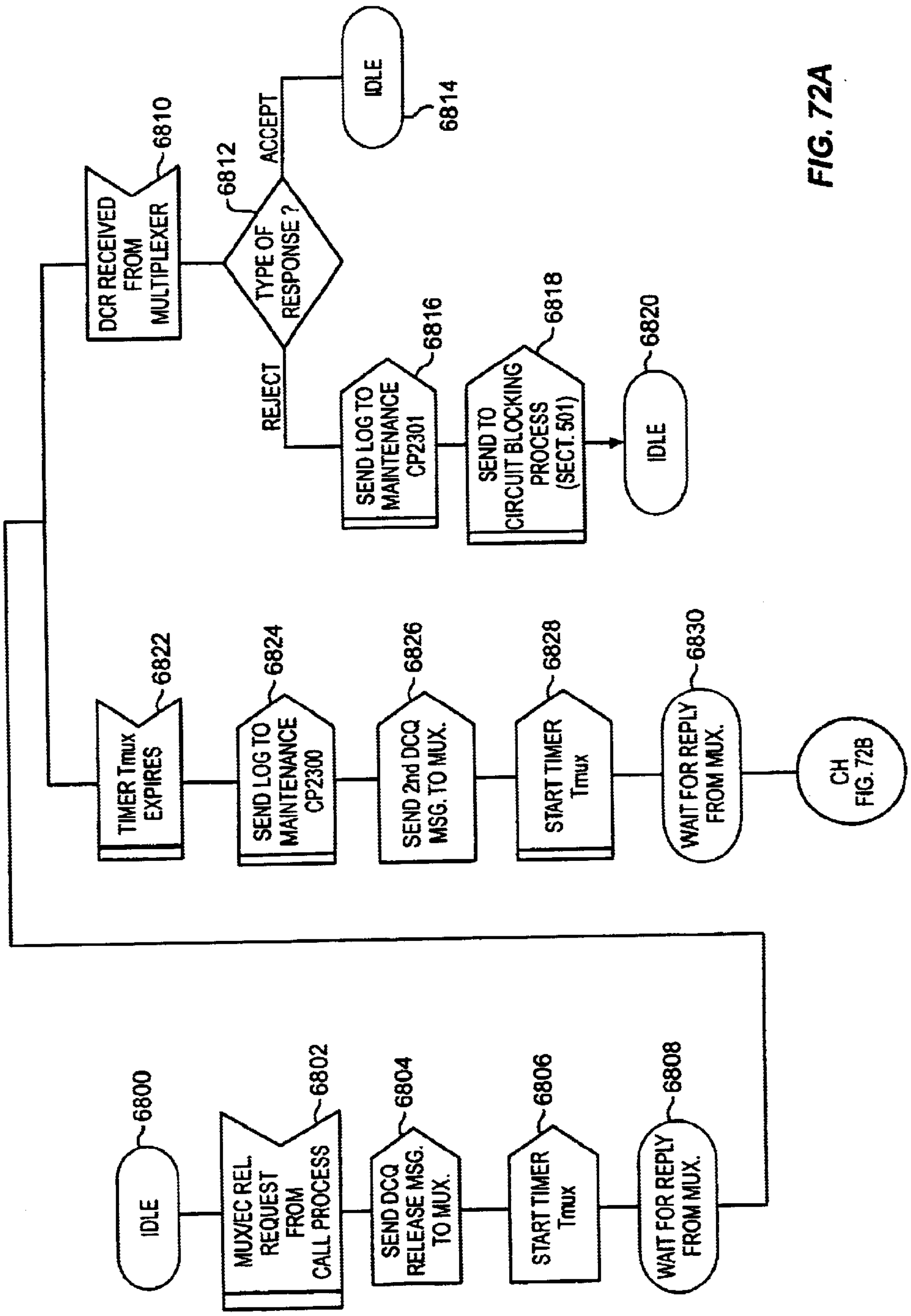
FIGS. 72A–72B are SDL diagrams of logic used in a version of the invention for the mux/echo canceller release process.
Figure 72B:
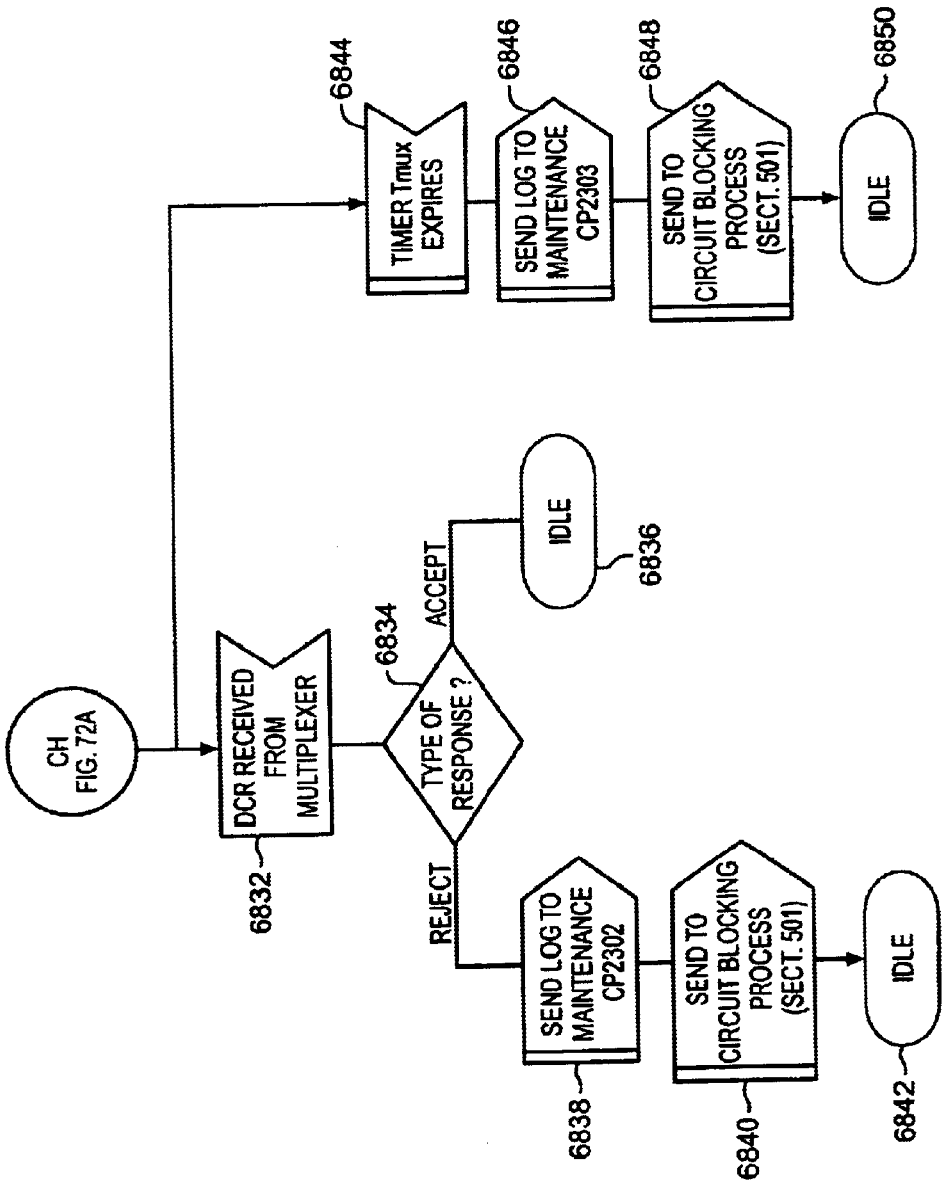

FIGS. 72A–72B depict the mux/echo canceller release process. The process is idle at 6800. The mux/echo canceller (EC) release request is received from the call process at 6802. A DCQ release message is sent to the mux to release the VPNVC to circuit connection and to reset the echo canceller at 6804. The Tmux timer is started at 6806, and the process waits for a reply from the mux at 6808.

If a DCR is received from the mux at 6810, and if the type of response is an accept at 6812, idle is attained at 6814. If the type of response is a reject at 6812, a log is sent to maintenance at 6816. The call is sent to the circuit blocking process at 6818, and idle is attained at 6820.

If while waiting for a reply from the mux at 6808, the Tmux timer expires at 6822, a log is sent to maintenance at 6824. A second DCQ is sent to the mux at 6826, and the Tmux timer is started at 6828. The process again waits for a reply from the mux at 6830.

If while waiting for a reply a DCR is received from the mux at 6832, and if the type of response is an accept at 6834, idle is attained at 6836. If the type of response is a reject at 6834, a log is sent to maintenance at 6838. The call is sent to the circuit blocking process at 6840, and idle is attained at 6842.

If while waiting for a reply, the Tmux timer expires at 6844, a log is sent to maintenance at 6846. The call is sent to the circuit blocking process at 6848, and idle is attained at 6850.

Hop Counter Table

Figure 73:
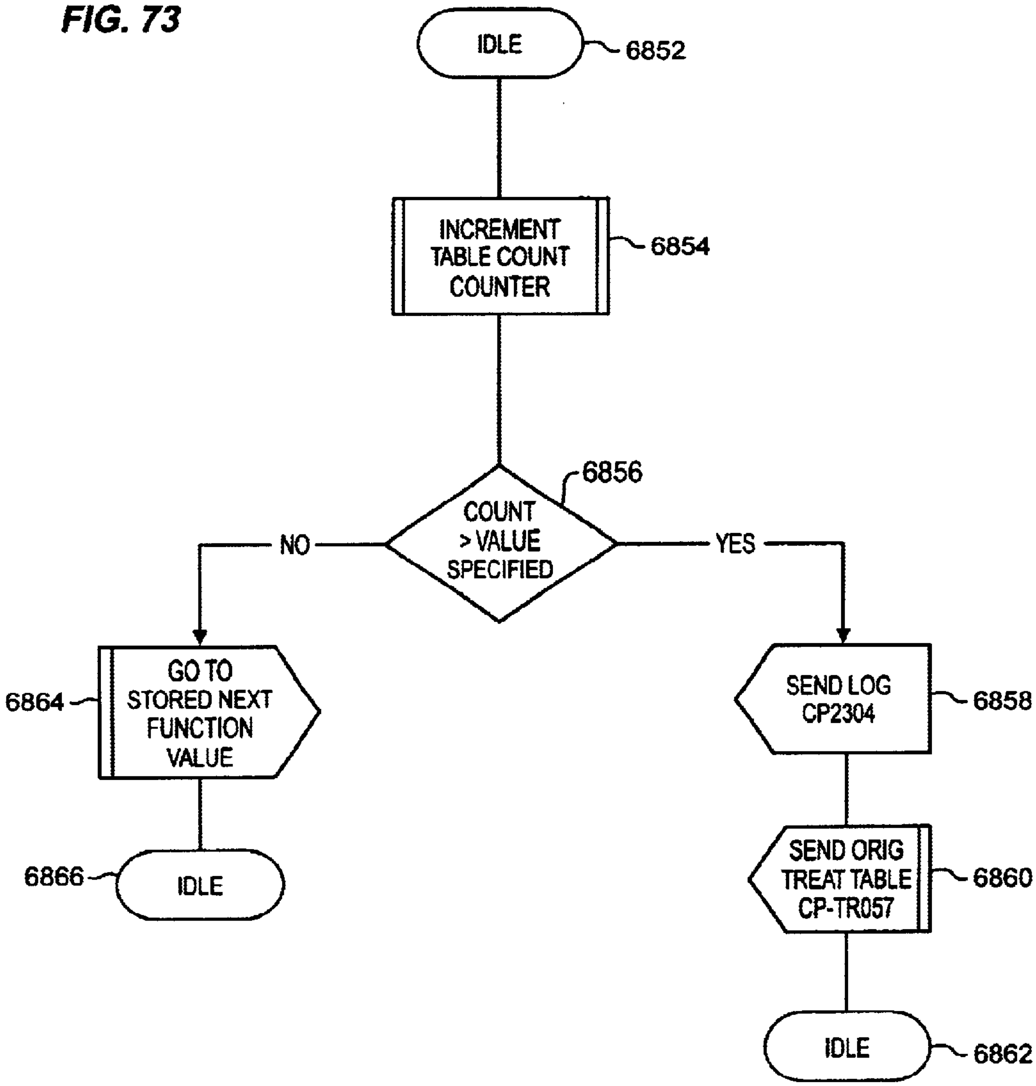
FIG. 73 is an SDL diagram of logic used in a version of the invention for hop counter table processing.
Figure 74A:
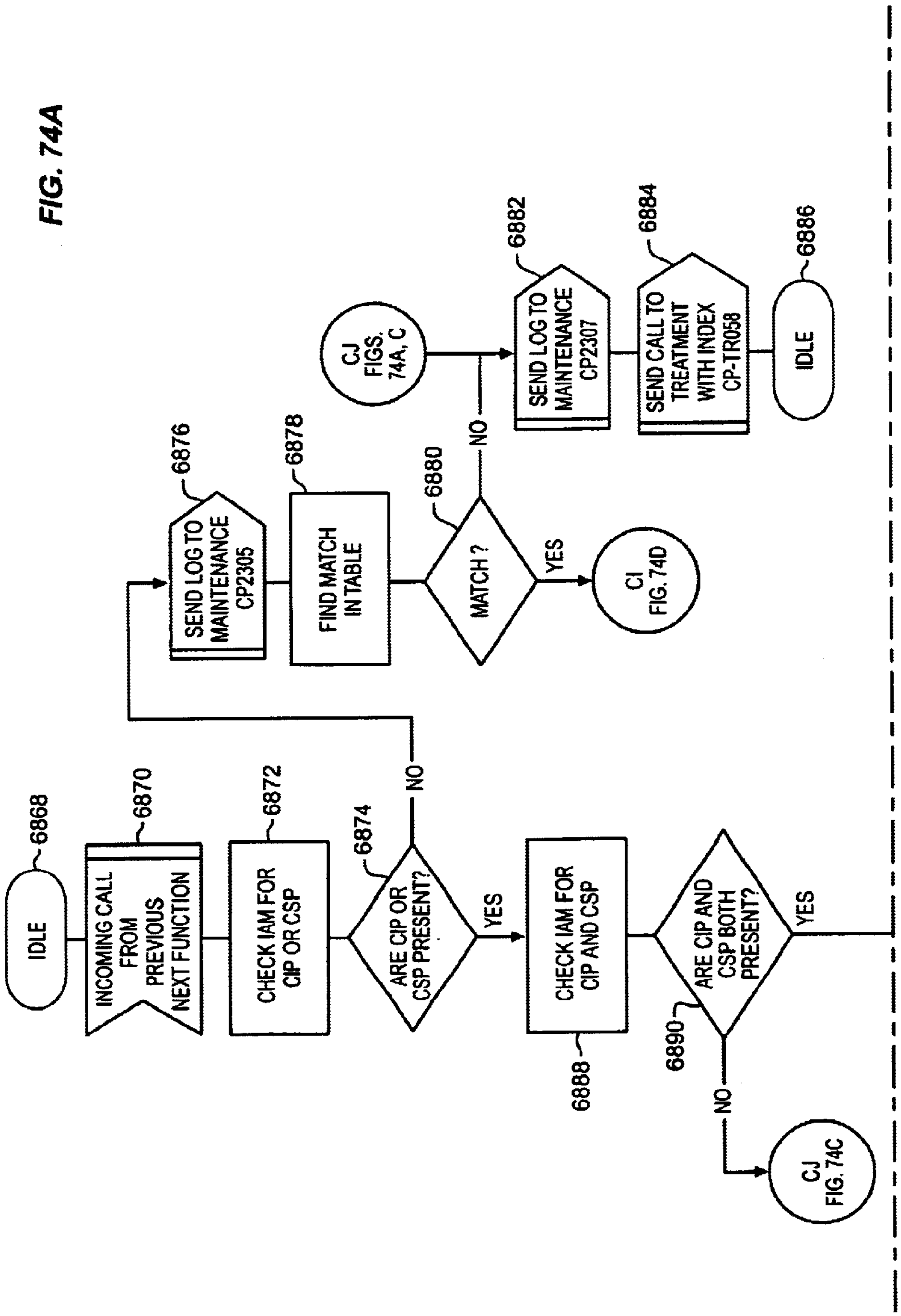
FIGS. 74A–74E are SDL diagrams of logic used in a version of the invention carrier table processing.
Figure 74B:
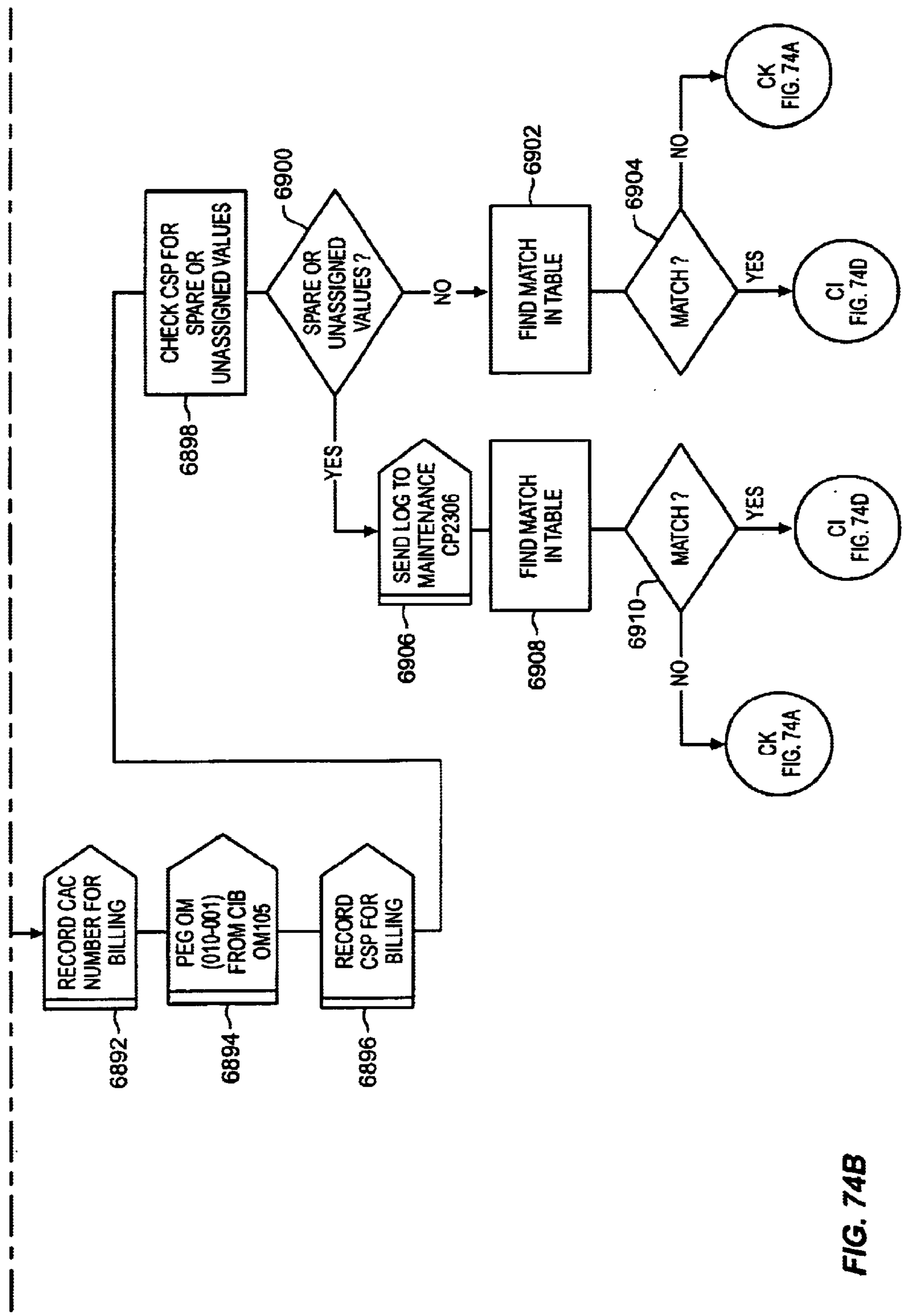
Figure 74C:
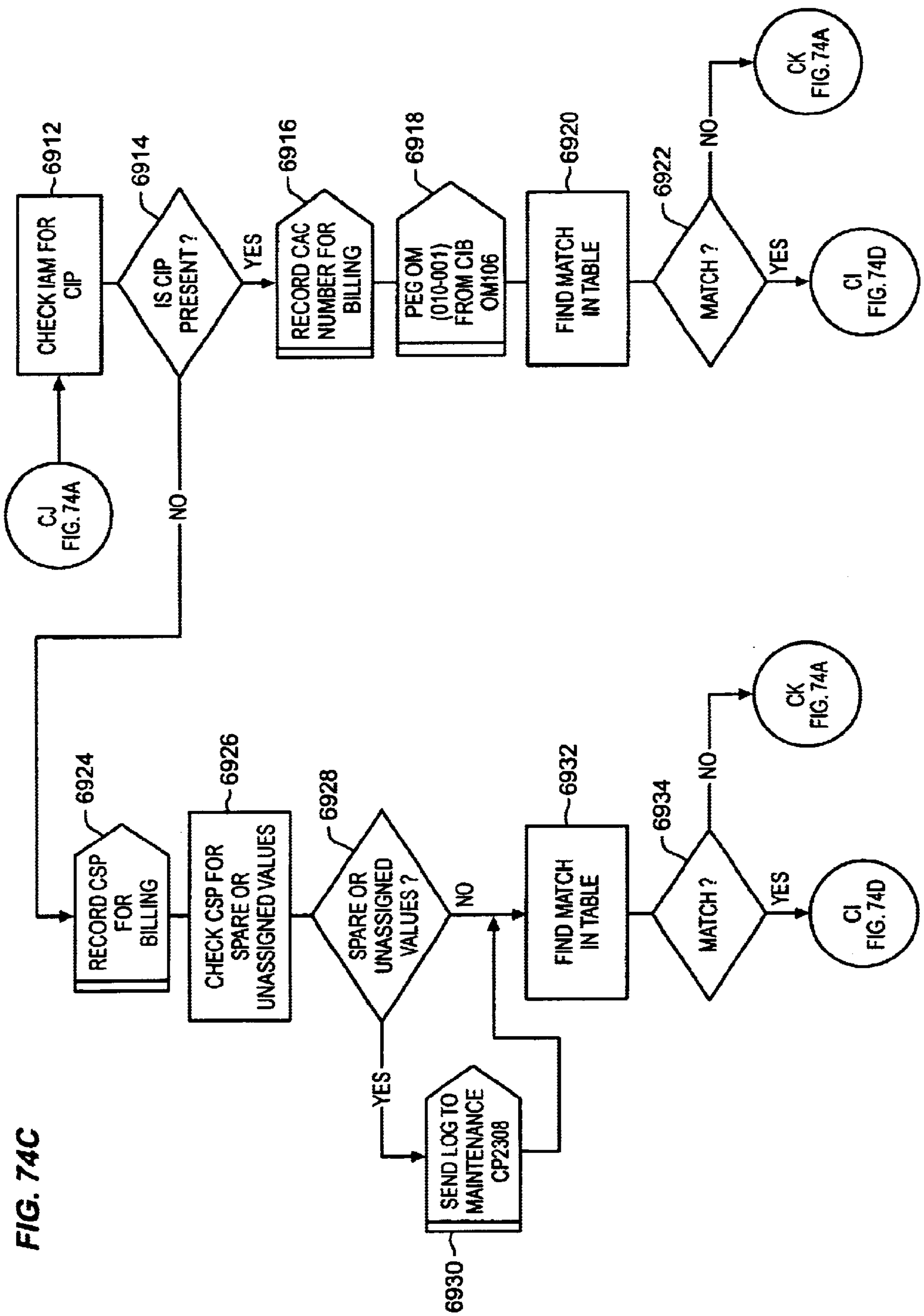
Figure 74D:
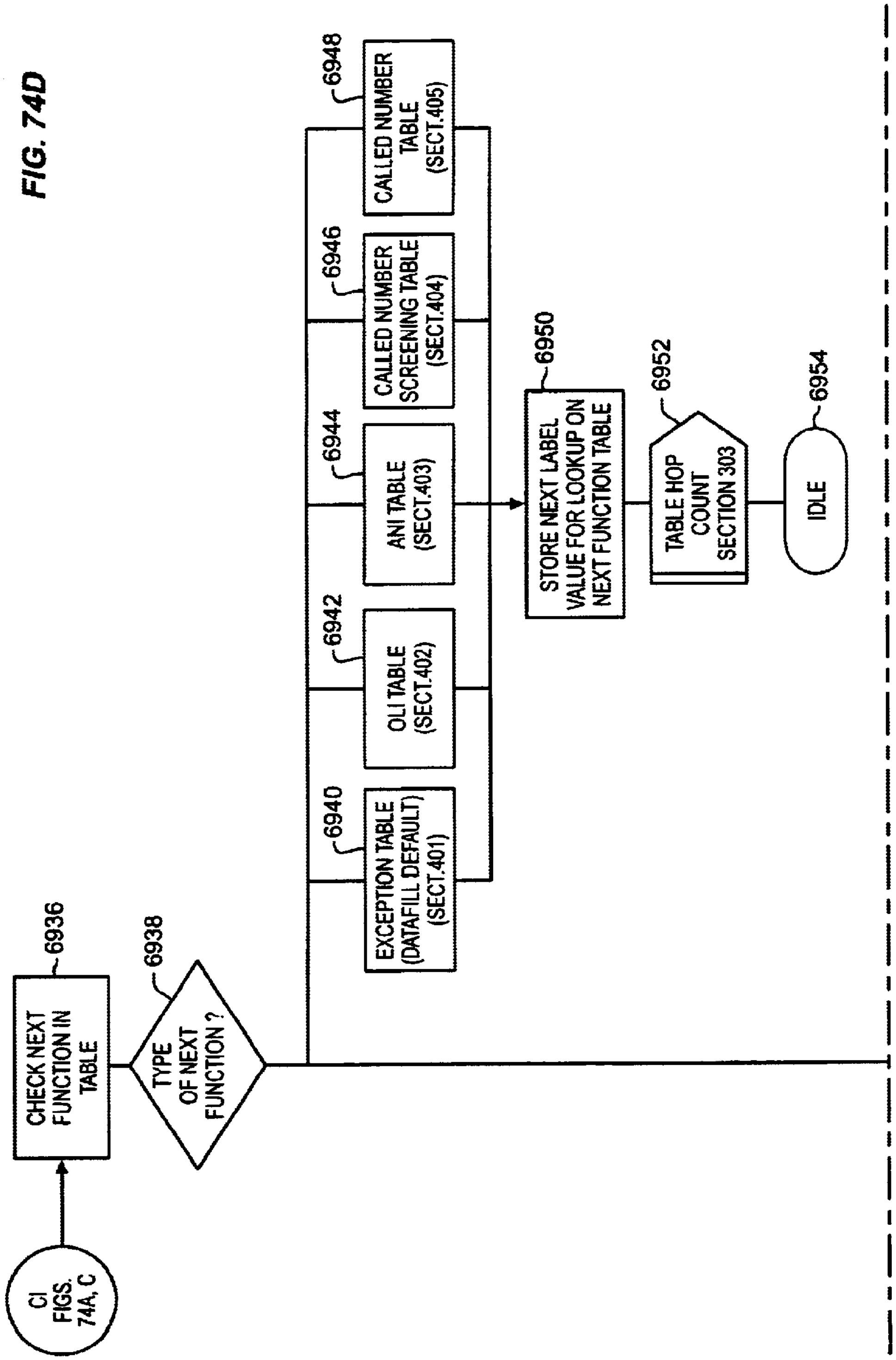
Figure 74E:
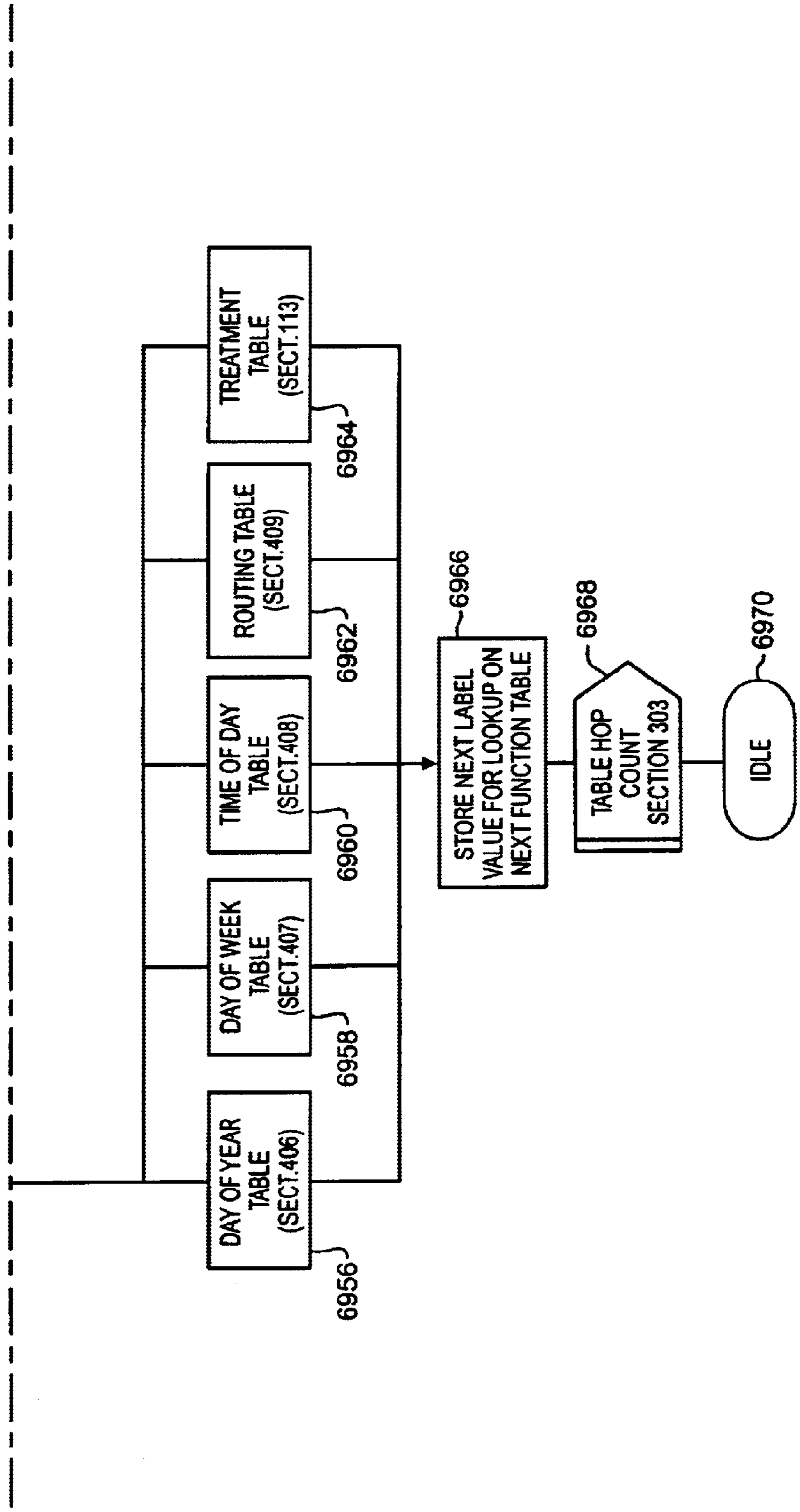
Figure 75A:
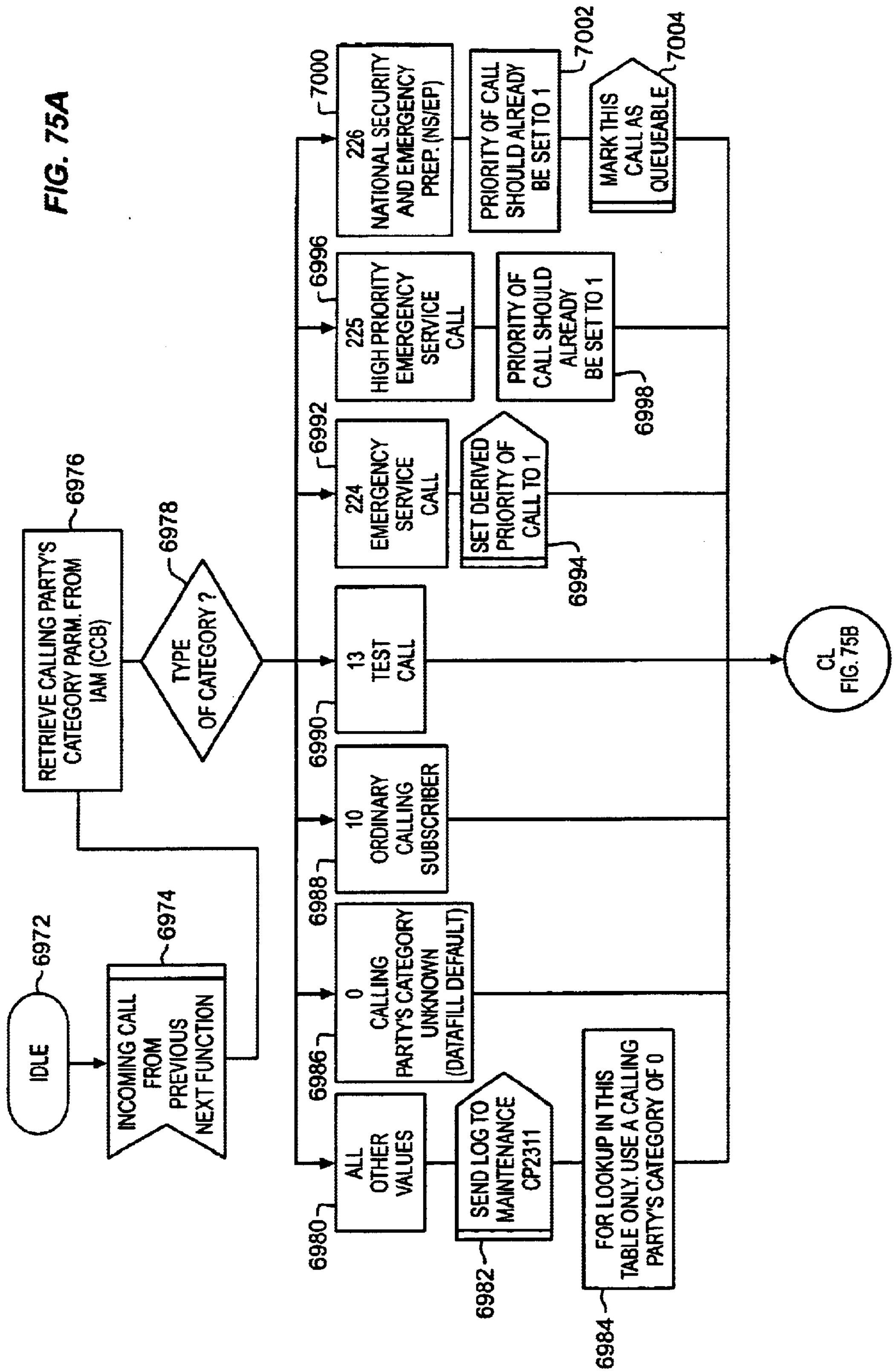
FIGS. 75A–75G are SDL diagrams of logic used in a version of the invention for exception table processing.
Figure 75B:
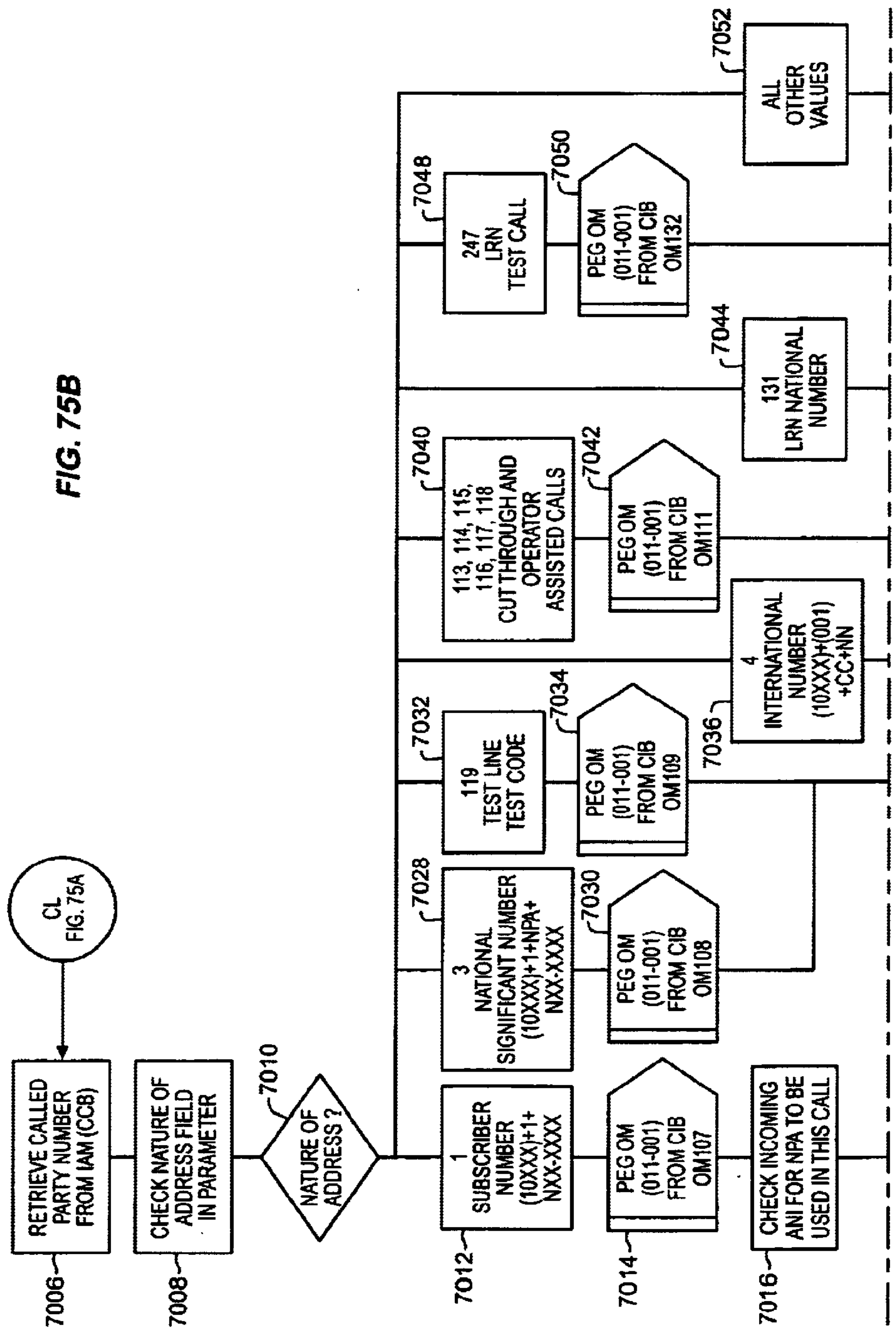
Figure 75C:
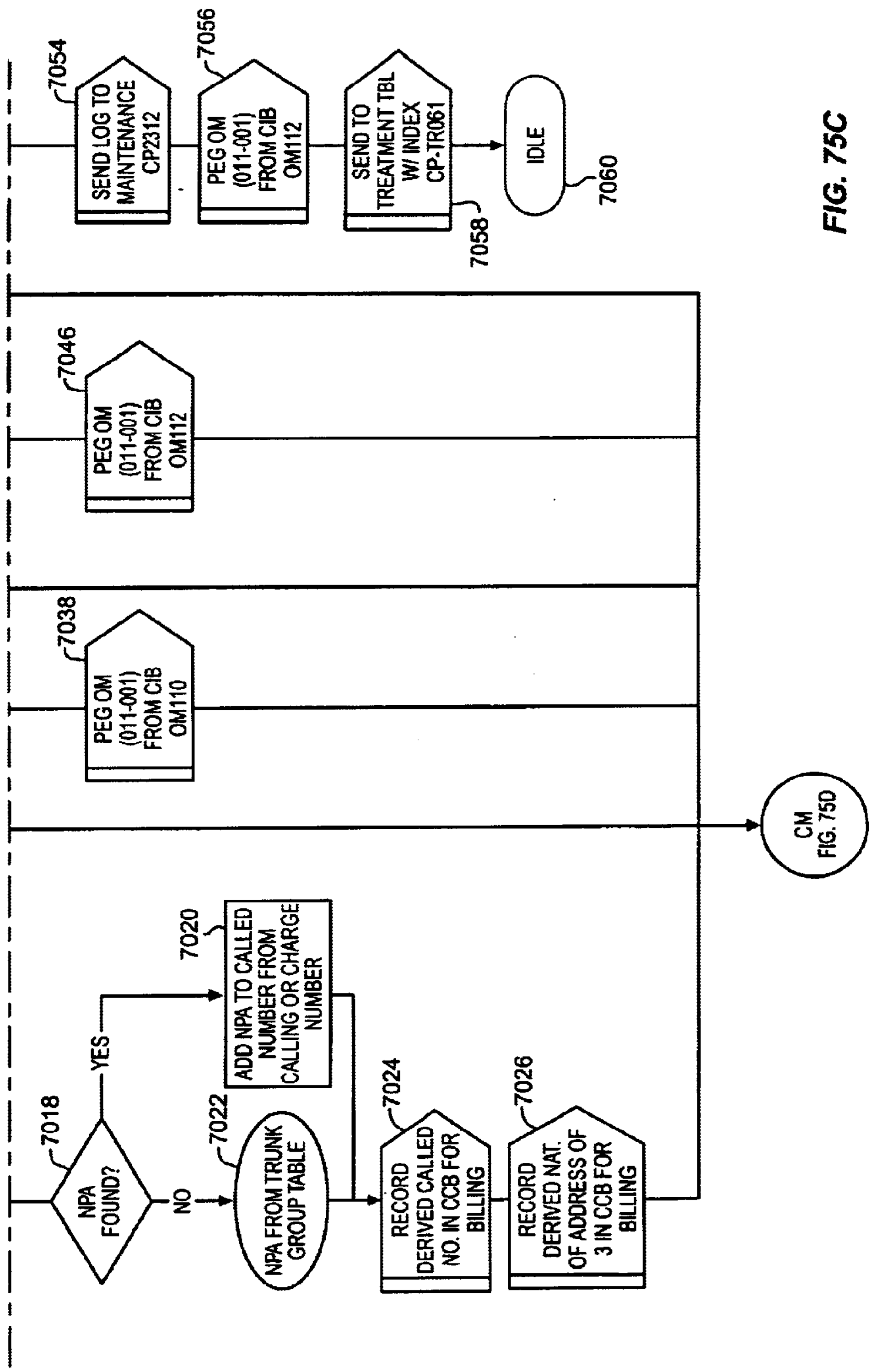
Figure 75D:
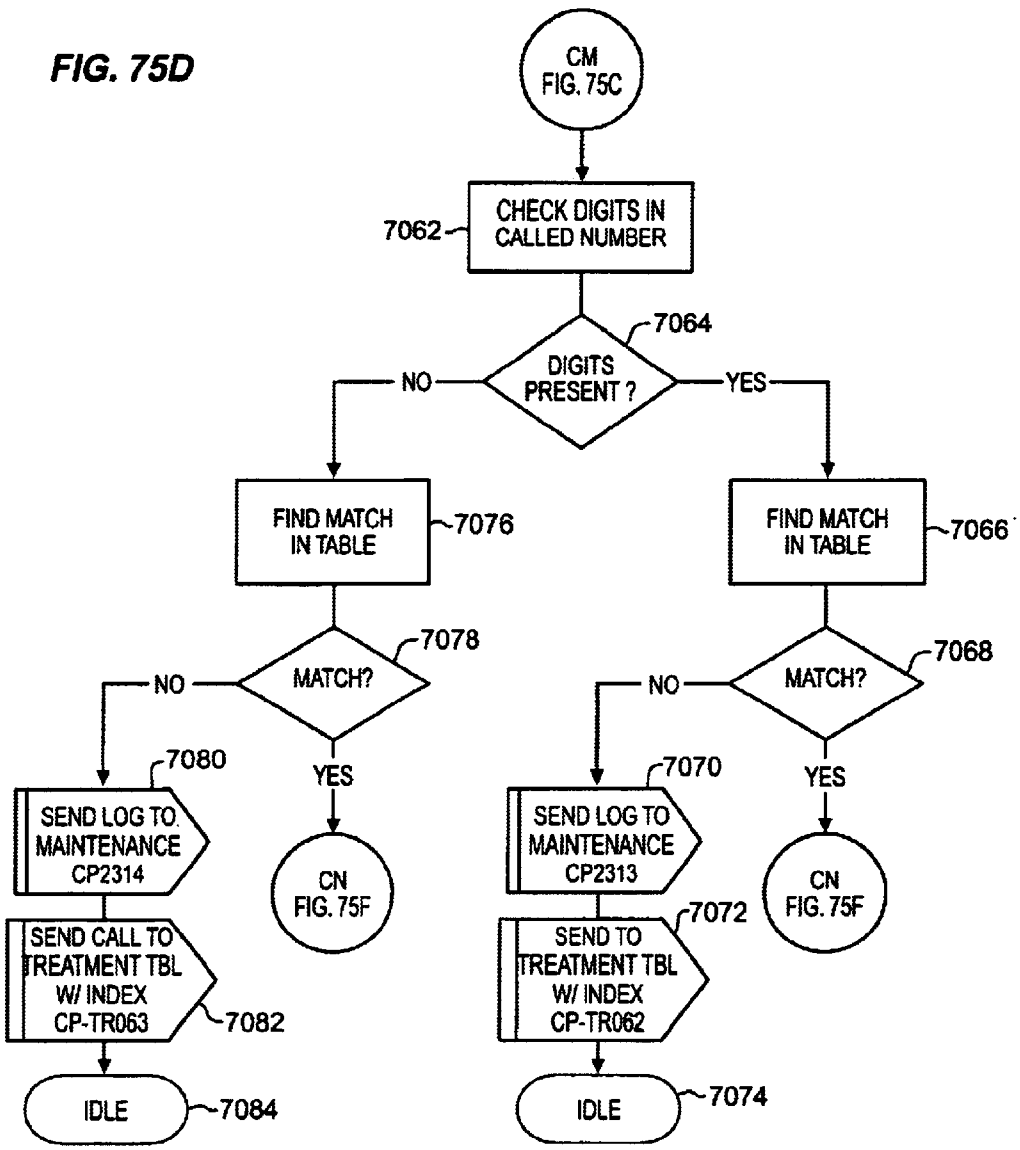
Figure 75E:
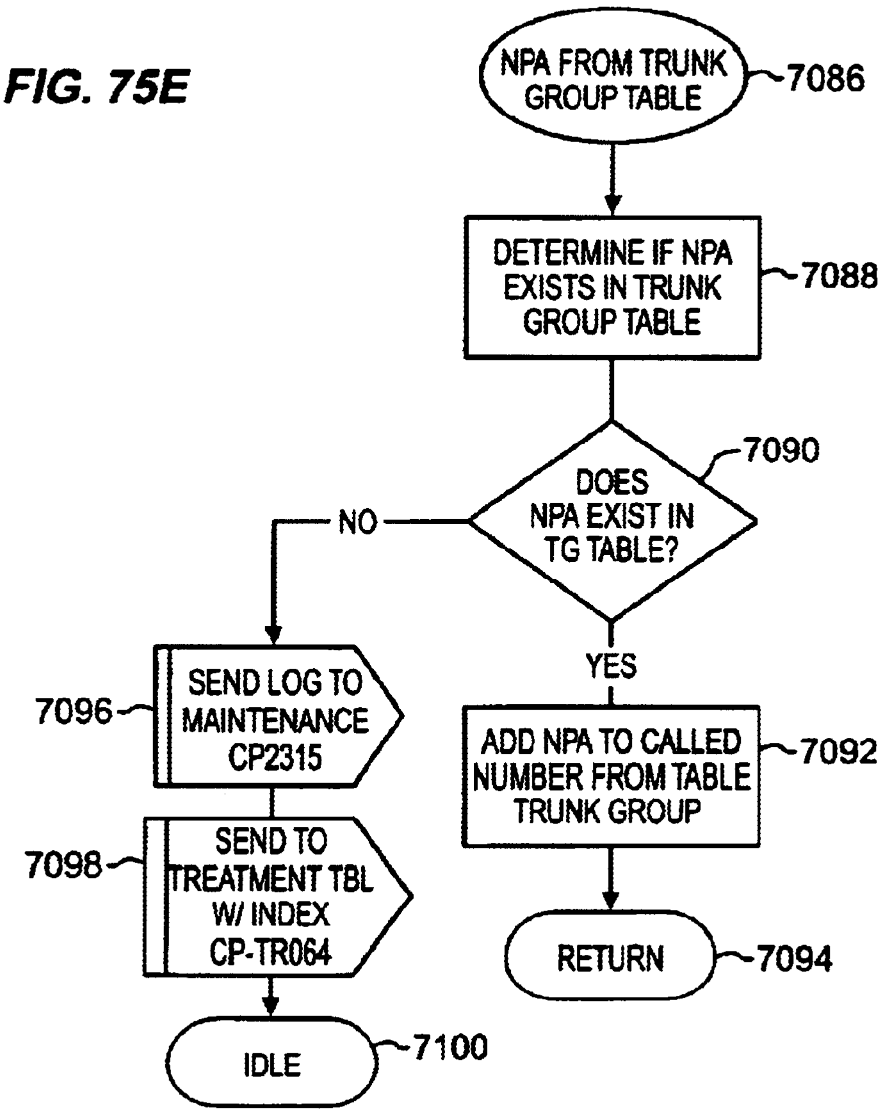
Figure 75F:
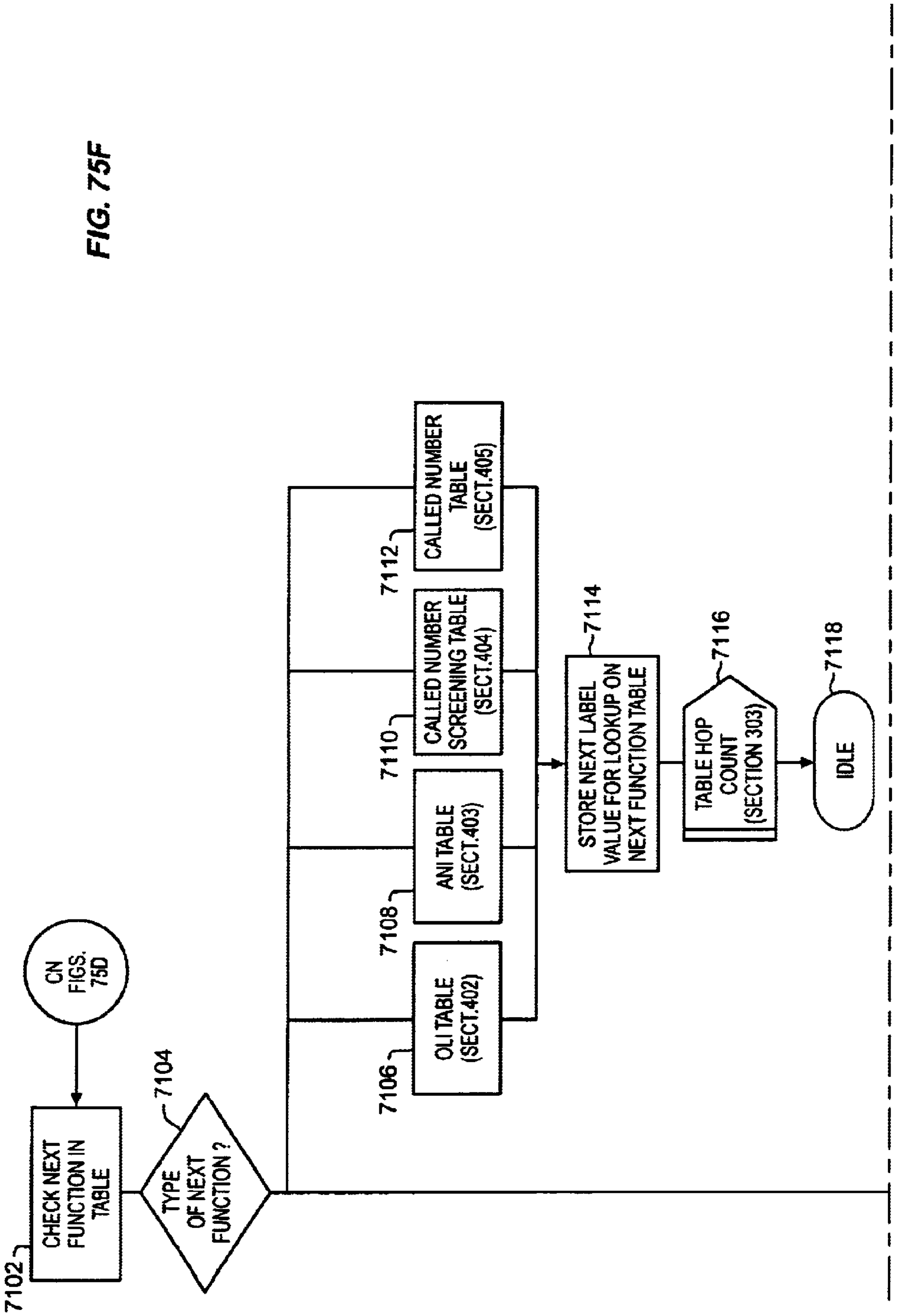
Figure 75G:
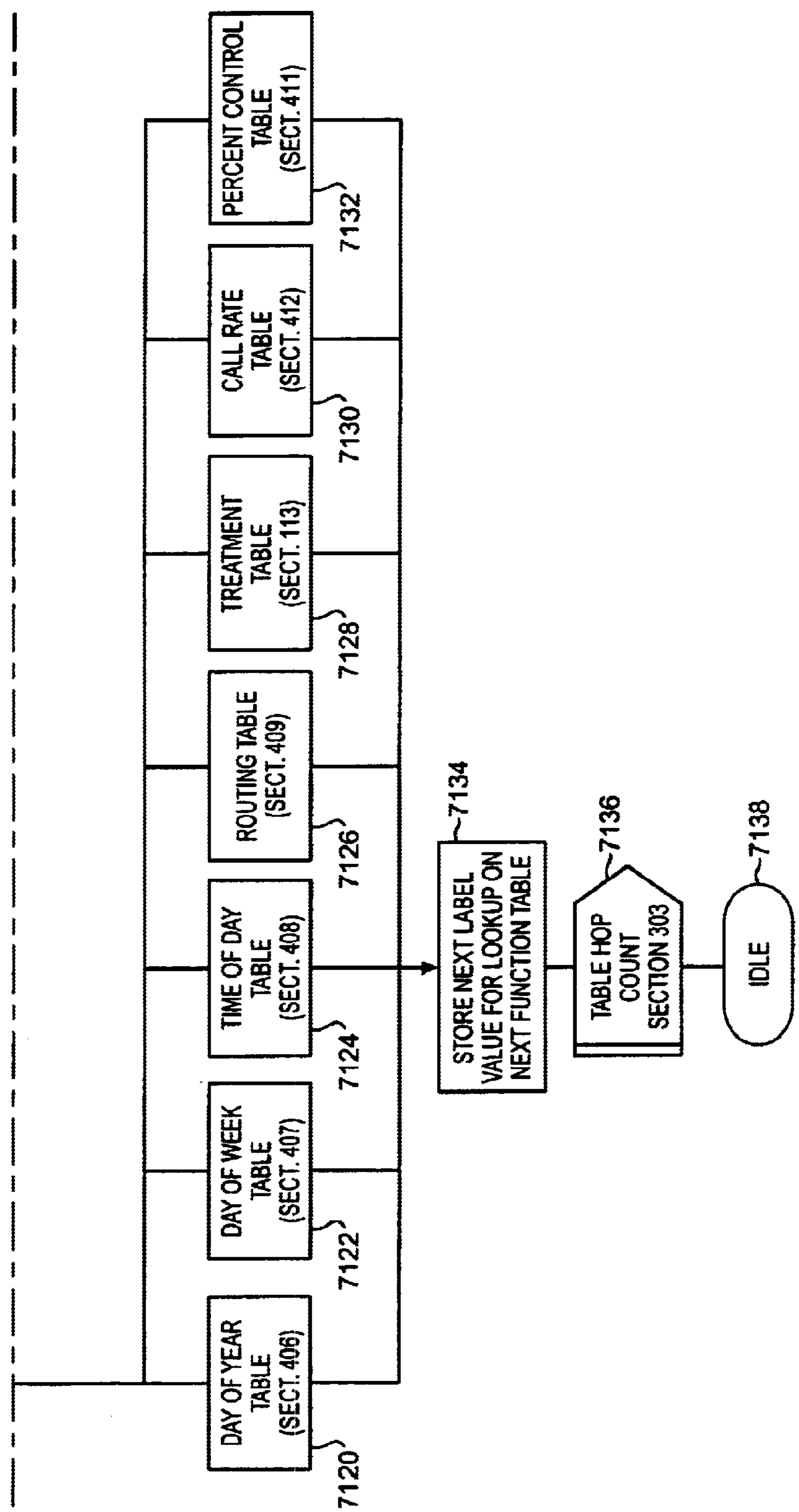

FIG. 73 depicts a hop counter table processing. The process is idle at 6852. The table count counter is incremented at 6854. If the count is greater than the value specified at 6856, a log is sent to maintenance at 6858. The call is sent to the treatment table at 6860, and idle is attained at 6862. If the count is not greater than the specified value at 6856, the process goes to the next function value at 6864. Idle is attained at 6866.

Carrier Table

FIGS. 74A–74E depict carrier table processing. The process is idle at 6868. An incoming call from a previous next function is received at 6870. The IAM is checked for a carrier identification parameter (CIP) or a carrier selection parameter (CSP) at 6872. If neither the CIP nor the CSP are present at 6874, a log is sent to maintenance at 6876. The carrier table is checked to determine if a CIP wild card or a CSP wild card match can be located at 6878. If a match is not found at 6880, a log is sent to maintenance at 6882. The call is sent to treatment at 6884, and idle is attained at 6886. If a match is found at 6880, the process continues at step 6936.

At step 6874, if a CIP or a CSP is present, the IAM is checked for a CIP and a CSP at 6888. If both the CIP and the CSP are not present at 6890, the process continues at step 6912. If both the CIP and the CSP are present at 6890, the carrier access code (CAC) is recorded for billing at 6892. The OM is pegged at 6894, and the CSP is recorded for billing at 6896.

The CSP is checked for: spare or unassigned values at 6898. Spare or unassigned values are from 0000 0101 to 1111 1111. If there are no spare or unassigned values at 6900, the carrier table is checked to find a match at 6902. The following order is used for the entry search: (1) CIP value and CSP value; (2) CIP value and CSP wild card; and (3) CIP wild card and CSP wild card. If a match is not found at 6904, the process continues at step 6882. If a match is found at 6904, the process continues at step 6936.

If the CSP has spare or unassigned values at 6900, a log is sent to maintenance at 6906. The carrier table is checked to find a match for the spare or unassigned values at 6908. The following order is used for the entry search: (1) CIP value and CSP wild card; and (2) CIP wild card and CSP wild card. If a match is not found at 6910, the process continues at step 6882. If a match is found at 6910, the process continues at step 6936.

The IAM is checked for the CIP at 6912. If the CIP is present at 6914, then the CSP is not present, and the CAC number is recorded for billing at 6916. The OM is pegged at 6918. The carrier table is checked to locate a match for the CIP and the CSP at 6920. The following order is used for the search: (1) CIP value and CSP wild card; and (2) CIP wild card and CSP wild card. If a match is not found at 6922, the process continues at step 6882. If a match is found at 6922, the process continues at step 6936.

If the CIP is not present at 6914, then only the CSP is present, and the CSP is recorded for billing at 6924. The CSP is checked for spare or unassigned values at 6926. The spare or unassigned values are 0000 0101 to 1111 1111. If there are spare or unassigned values at 6928, a log is sent to maintenance at 6930. After step 6930 or if there are no spare or unassigned values at 6928, the carrier table is searched to find a match for the CIP wild card and the CSP wild card at 6932. If no match is found at 6934, the process continues at step 6882. If a match is found at 6934, the process continues at step 6936.

The next function in the carrier table is checked at 6936 and 6938. If the type of next function at 6938 is a exception table at 6940, an OLI table at 6942, an ANI table at 6944, a called number screening table at 6946, or a called number table at 6948, the next label value for the look up on the next function table is stored at 6950. The table hop count process is started at 6952, and idle is attained at 6954. If the type of next function at 6938 is a day of year table at 6956, a day of week table at 6958, a time of day table at 6960, a routing table at 6962, or a treatment table at 6964, the next label value is stored for look up on the next function table at 6966. The table hop count process is started at 6968, and idle is attained at 6970.

Exception Table

FIGS. 75A–75G depict exception table processing. The process is idle at 6972. If an incoming call is received from a previous next function at 6974, the calling parties category parameter is retrieved from the IAM at 6976. The type of category of call is determined at 6978. If the call is other than a calling party call, an ordinary calling subscriber, a test call, an emergency service call, a high priority emergency service call, or a national security emergency call at 6980, a log is sent to maintenance at 6982. The calling parties category of 0 is used for the table look up at 6984. If the type of category is 0, the calling parties category is unknown at 6986. If the type of category is 10, the category is an ordinary calling subscriber at 6988. If the type of category is 13, the call is a test call at 6990. If the type of category is 224, the call is an emergency service call at 6992. The derived priority of call is set to 1 at 6994. If the type of call is 225, the call is a high priority emergency service call at 6996. The priority of the call should already be set to 1 at 6998. If the type of call is 226, the call is a national security and emergency preparation call (NSEP) at 7000. The priority of the call should already be set at 7002. This call is marked at queuable at 7004.

The called party number is retrieved from the IAM at 7006. The nature of address field is checked at 7008 and 7010. If the nature of address at 7010 is a subscriber number at 7012, the OM is pegged at 7014. The incoming ANI for the NPA to be used in this call is checked at 7016. If the NPA is found at 7018, the NPA is added to the called number from the calling number or the charge number at 7020. If the NPA is not found at 7018, the NPA is obtained from the trunk group table at 7022, calling the process at 7086. After steps 7020 or 7022, the derived call number is recorded in the CIB for billing at 7024. The derive nature of address of 3 is recorded in the CIB for billing at 7026.

If the nature of address at 7010 is the national significant number (10XXX)+1+NPA+NXX–XXXX at 7028, the OM is pegged at 7030. If the nature of address at 7010 is a test line or test code at 7032, the OM is pegged at 7034. If the nature of address at 7010 is an international number (10XXX)+(001)+CC+NN at 7036, the OM is pegged at 7038. If the nature of address at 7010 is a cut through or operator assisted call in which the nature of address is 113, 114, 115, 116, 117, or 118 at 7040, the OM is pegged at 7042. If the nature of address at 7010 is a location routing number (LRN) national number of 131 at 7044, the OM is pegged at 7046. If the nature of address at 7010 is an LRN test call of 247 at 7048, the OM is pegged at 7050.

If the nature of address at 7010 is some other value at 7052, a log is sent to maintenance at 7054. The OM is pegged at 7056, and the call is sent to the treatment table at 7058. Idle is attained at 7060.

At step 7062, the digits in the called number are checked at 7062. If the digits are present at 7064, a search is made to locate a match of the called number digits in the exception table at 7066. If a match is found at 7068, the process continues at step 7102. If a match is not found at 7068, a log is sent to maintenance at 7070. The call is sent to the treatment table at 7072, and idle is attained at 7074.

If the called number digits are not present at 7064, the exception table is searched using all zeros to determine if a match of all zeros is present at 7076. If a match is present at 7078, the process continues, at step 7102. If a match is not present at 7078, a log is sent to maintenance at 7080. The call is sent to the treatment table at 7082, and idle is attained at 7084.

At step 7086, the NPA: is obtained from the trunk group table. It is determined if the NPA exists in the trunk group table at 7088. If the NPA does exist in the trunk group table at 7090, the NPA is added to the called number from the trunk group table at 7092. The process returns to the implementing process at 7094. If the NPA does not exist in the trunk group table at 7090, a log is sent to maintenance at 7096. The call is sent to the treatment table at 7098, and idle is attained at 7100.

The next function in the table is checked at 7102. The type of next function is determined at 7104. If the type of next function at 7104 is either the OLI table at 7106, the ANI table at 7108, the called number screening table at 7110, or the called number table at 7112, then the next label value is stored for the look up on the next function table at 7114. The table hop count process is started at 7116. Idle is attained at 7118.

If the type of next function at 7104 is the date of year table at 7120, the day of week table at 7122, the time of day table at 7124, the routing table at 7126, the treatment table at 7128, the call rate table at 7130, or the percent control table at 7132, then the next label is stored for the look up on the next function table at 7134. The table hop count process is started at 7136, and idle is attained at 7138.

OLI Table Processing

Figure 76A:
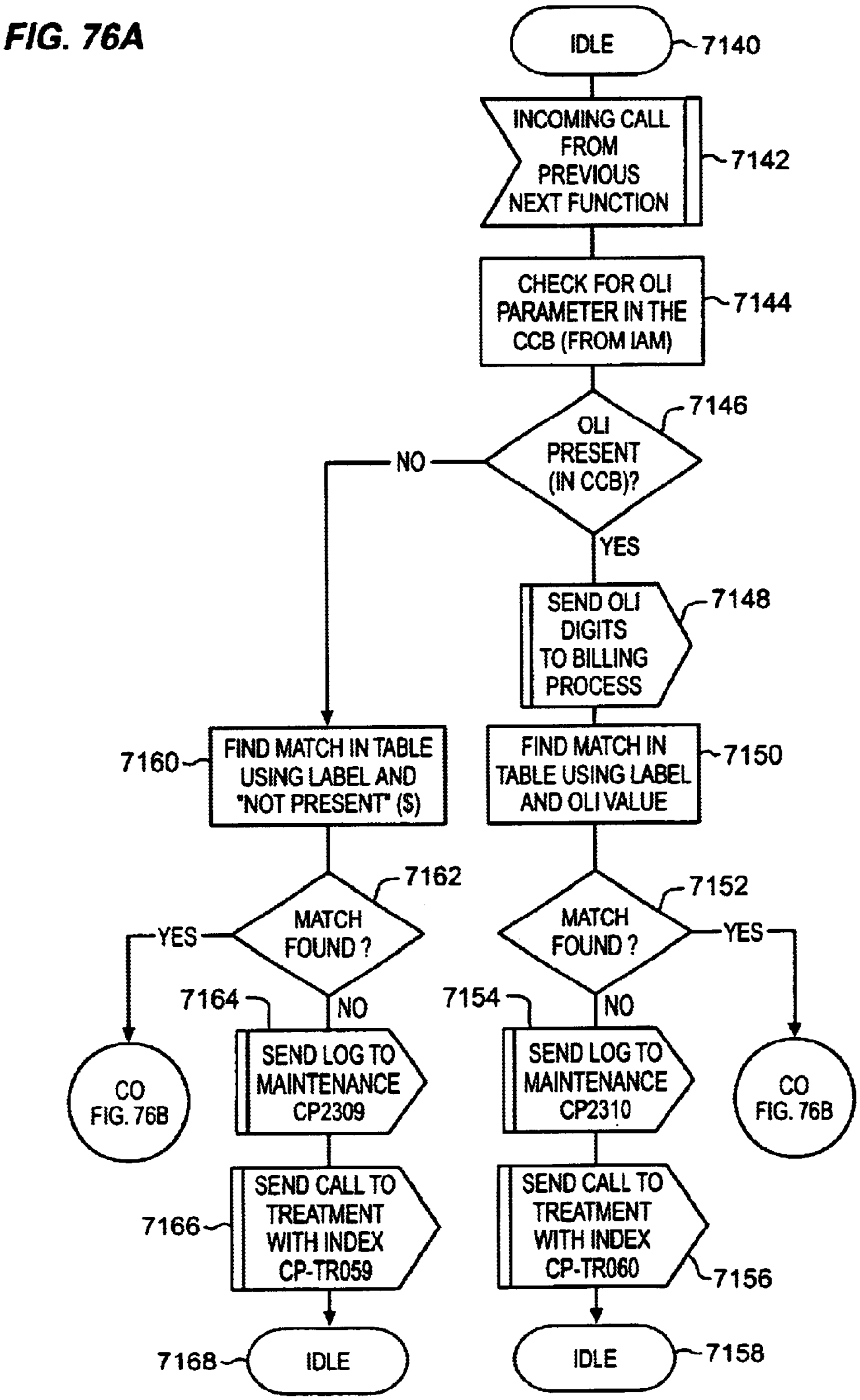
FIGS. 76A–76C are SDL diagrams of logic used in a version of the invention for OLI table processing.
Figure 76B:
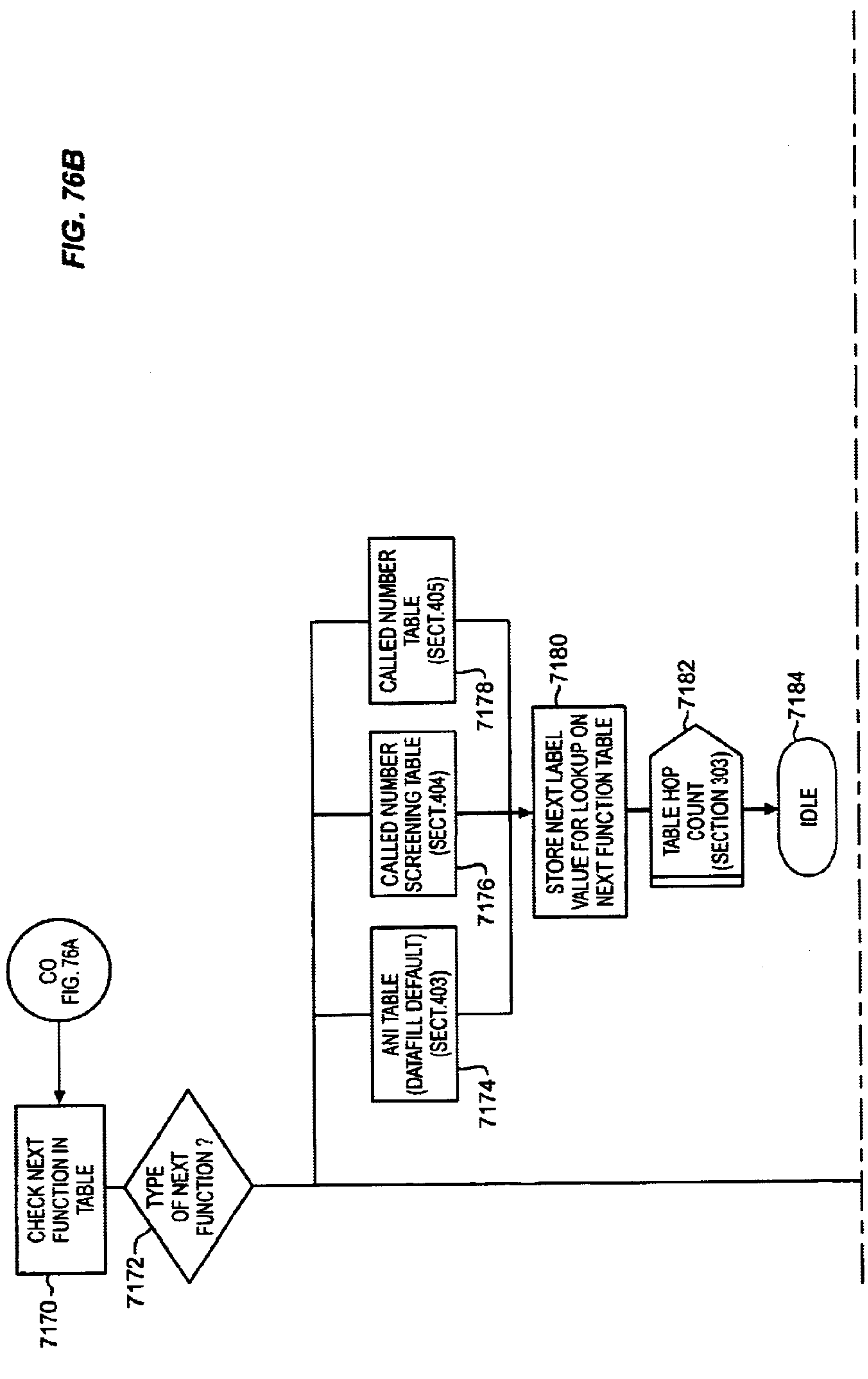
Figure 76C:
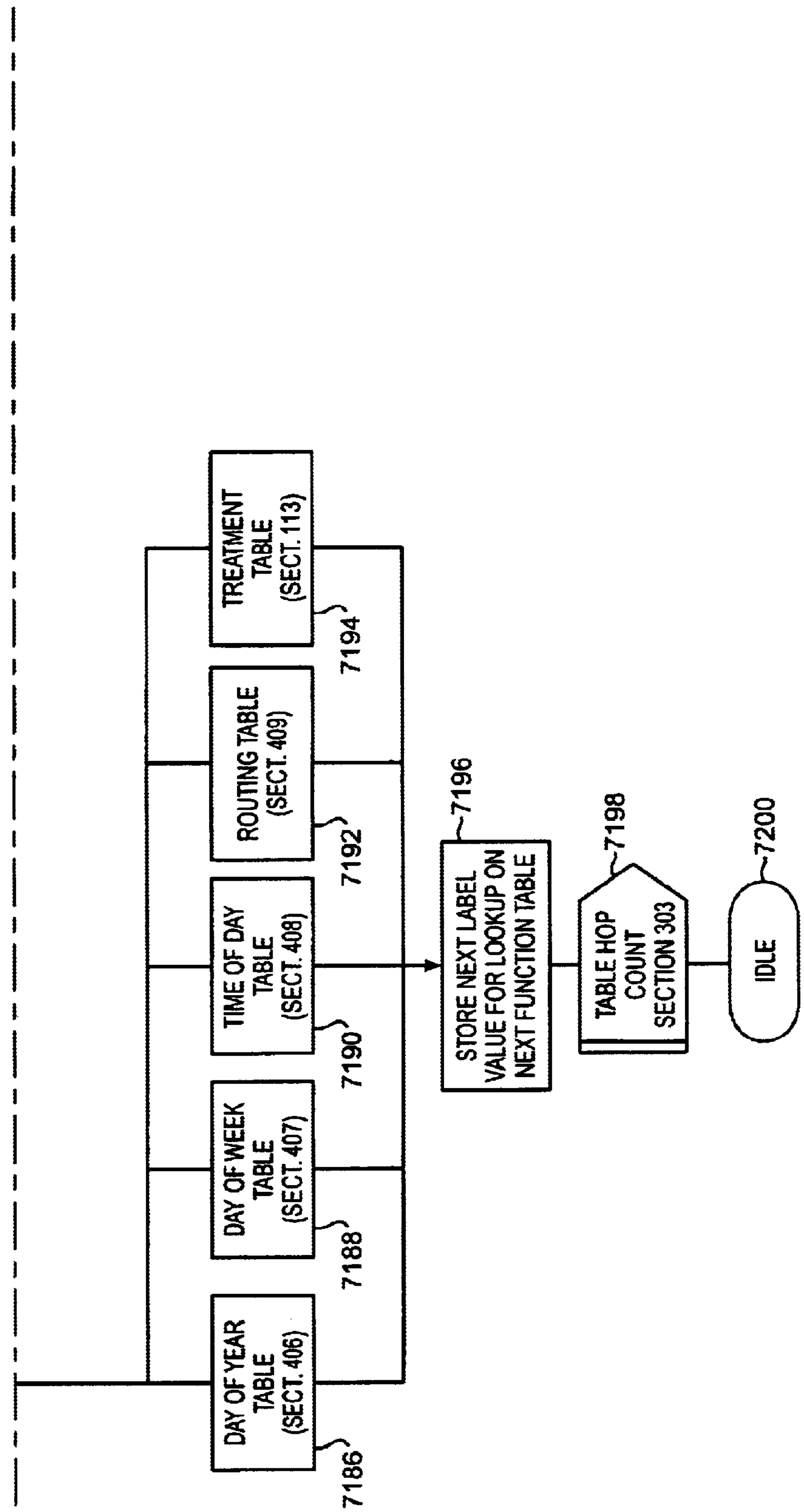

FIGS. 76A–76C depict the OLI table processing. The process is idle at 7140. An incoming call is received from a previous next function at 7142, and the OLI parameter in the CIB is checked at 7144. If the OLI is present in the CIB at 7146, the OLI digits are sent to billing at 7148. A search is made in the OLI table for the OLI digits using the label and OLI value at 7150. If a match is found at 7152, the process continues at step 7170.

If a match is not found at 7152, a log is sent to maintenance at 7154. The call is sent to treatment at 7156, and idle is attained at 7158.

If the OLI is not present in the CIB at 7146, a search is made at 7160 in the OLI table for the OLI digits using the label and the "not present" value at 7146. If a match is found at 7162, the process continues at step 7170. If a match is not found at 7162, a log is sent to maintenance at 7164. The call is sent to the treatment table at 7166, and idle is attained at 7168.

The next function is checked in the OLI table at 7170. If the type of next function at 7172 is the ANI table at 7174, the called number screening table at 7176, or the called number table at 7178, the next label value is stored for look up on the next function table at 7180. The table hop count process is started at 7182, and idle is attained at 7184. If the type of next function at 7172 is the day of year table at 7186, the day of week table at 7188, the time of day table at 7190, the routing table at 7192, or the treatment table at 7194, the next label value is stored for look up on the next function table at 7196. The table hop count process is started at 7198, and idle is attained at 7200.

ANI Table Procssing

FIGS. 77A–77I depict the ANI table processing. The process is idle at 7202. If an incoming call is received from the previous next function at 7204, the calling number and the charge number are retrieved from the IAM at 7206. If the calling party's number does not exist at 7208, it is determined if the charge number is included at 7210 and 7212. If the charge number is not included at 7212, a log is sent to maintenance at 7214. The process is sent to the treatment table at 7216, and idle is attained at 7218.

If the charge number is included at 7212, the charge number is used for the ANI digits in the ANI table look up at 7220. The charge number is recorded as the ANI, and the charged number is recorded as the calling number for billing at 7222. The nature of address is checked in the charge parameter at 7224 and 7226. The process then continues at step step 7244.

If the calling party's number does exist at 7208, it is determined if the charge number also exists at 7228 and 7230. If the charge number does exist at 7230, the charge number is used for the ANI digits in the ANI table look up at 7232. The charge number is recorded as the ANI, and the calling number is recorded as the calling number for billing at 7234. The nature of address is checked in the charge parameter at 7224 and 7226. The process then continues at step 7244.

If the charge number does not exist at 7230, the calling number is used for the ANI digits in the ANI table look up at 7236. The calling number is recorded as the ANI, and the calling number is recorded as the calling number for billing at 7238. The nature of address in the calling number parameter is checked at 7240 and 7242. The process then continues at step 7272.

Figure 77A:
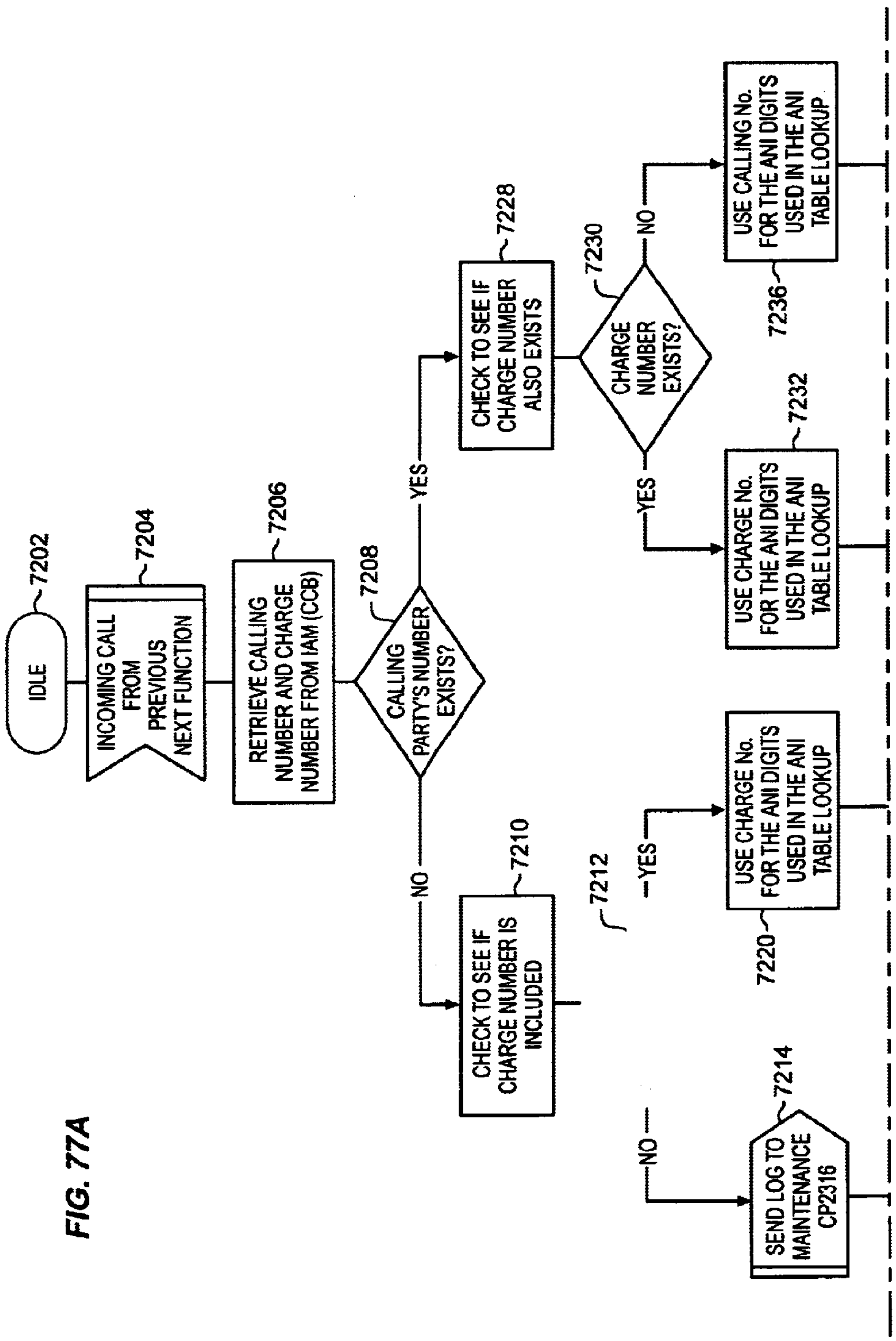
FIGS. 77A–77I are SDL diagrams of logic used in a version of the invention for ANI table processing.
Figure 77B:
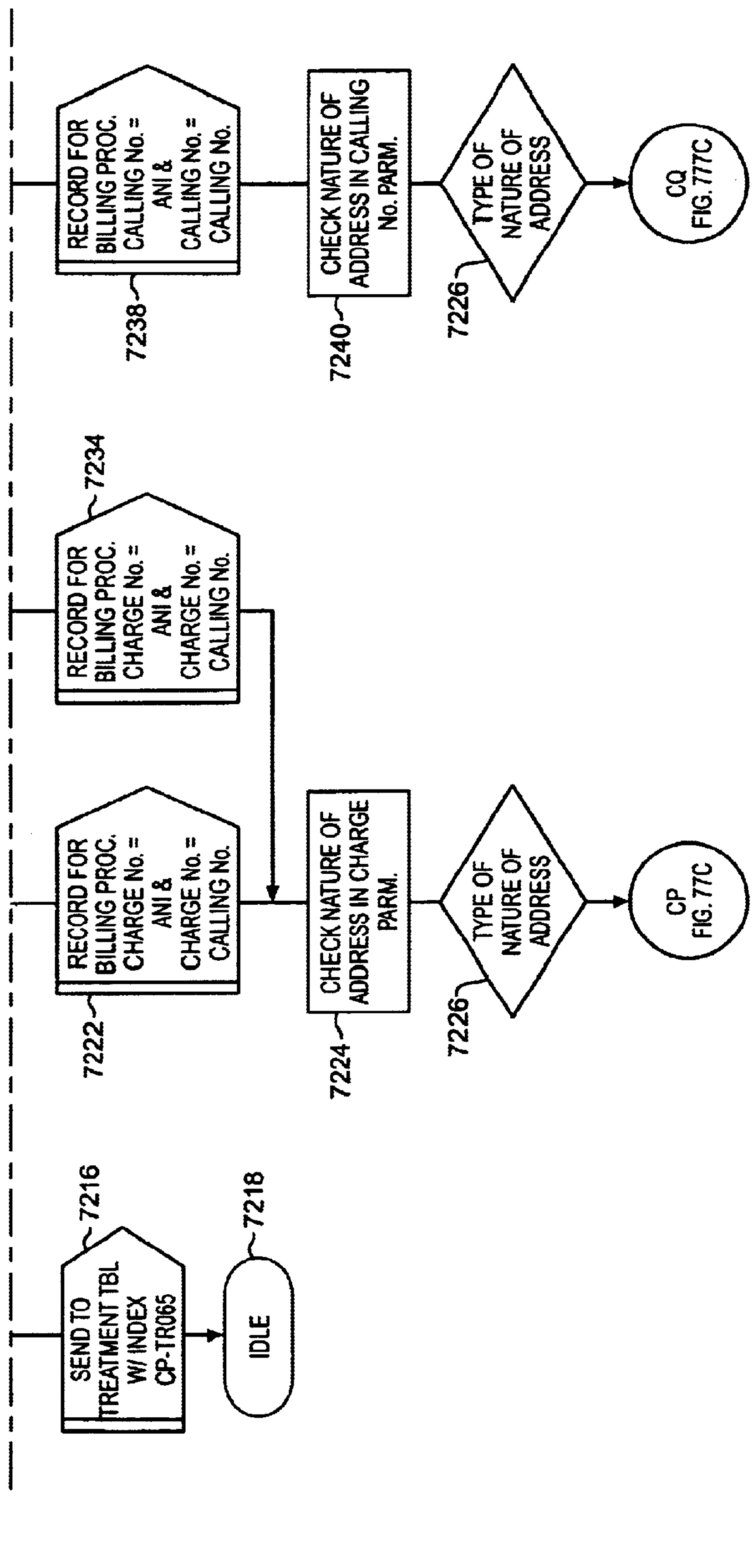
Figure 77C:
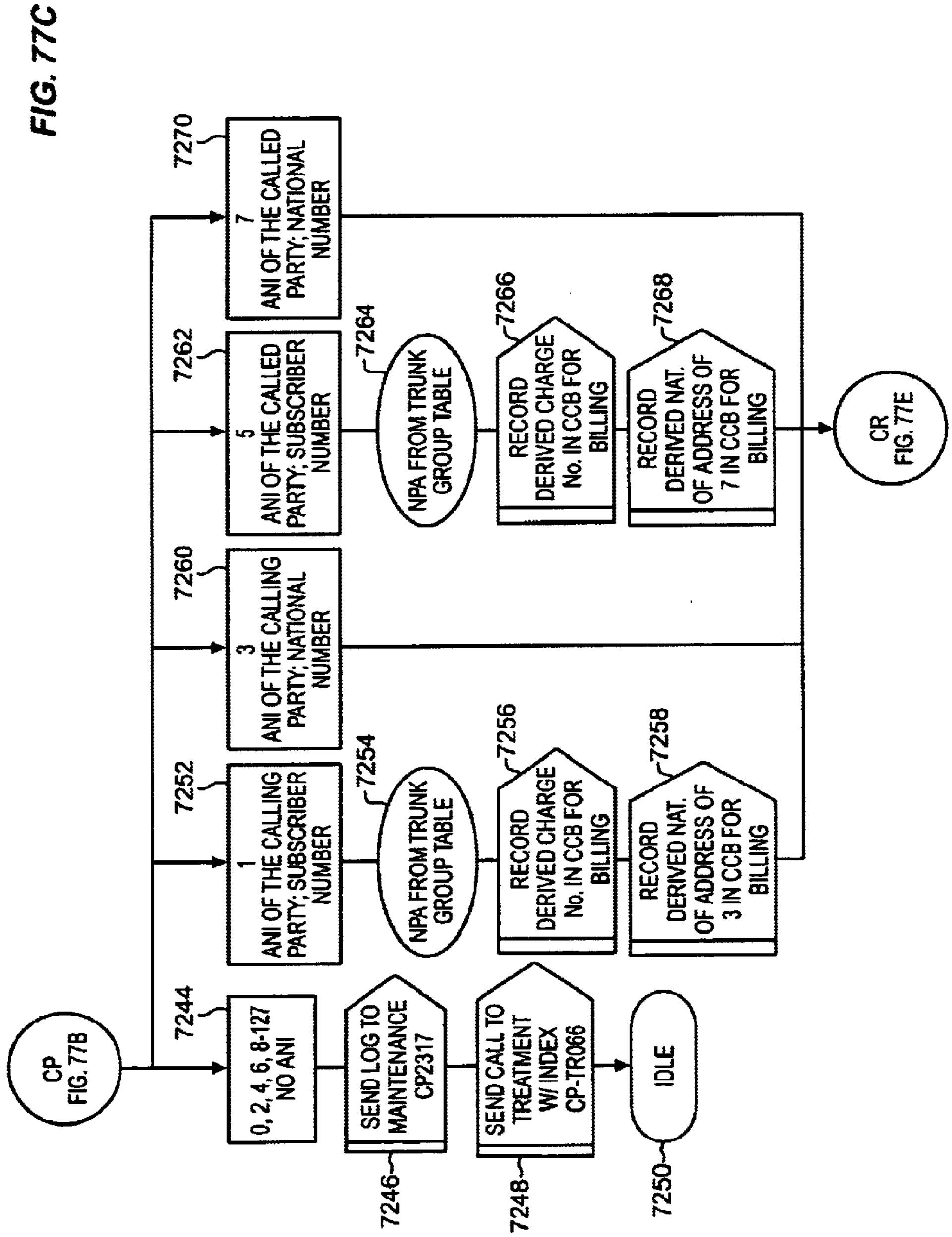
Figure 77D:
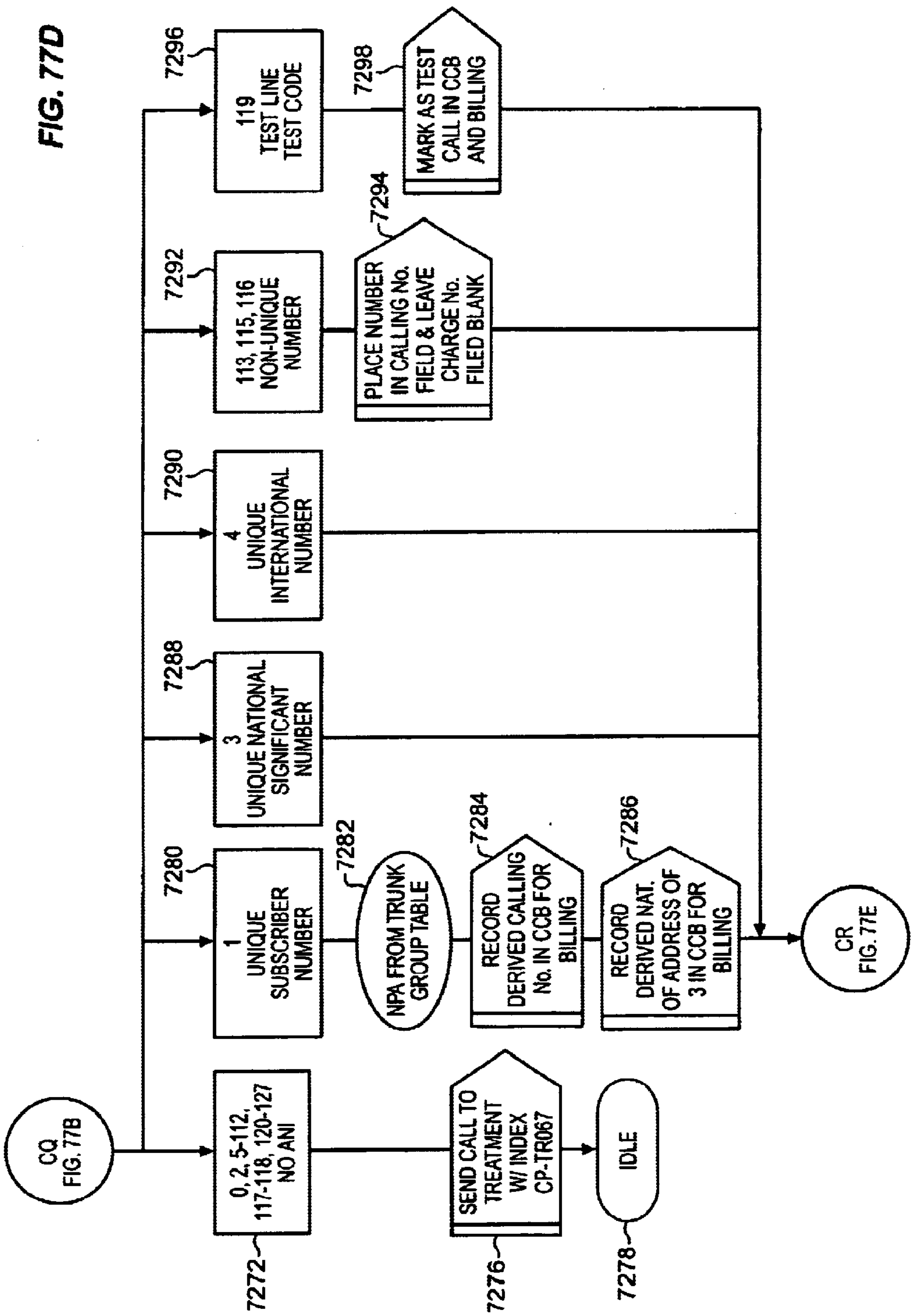
Figure 77E:
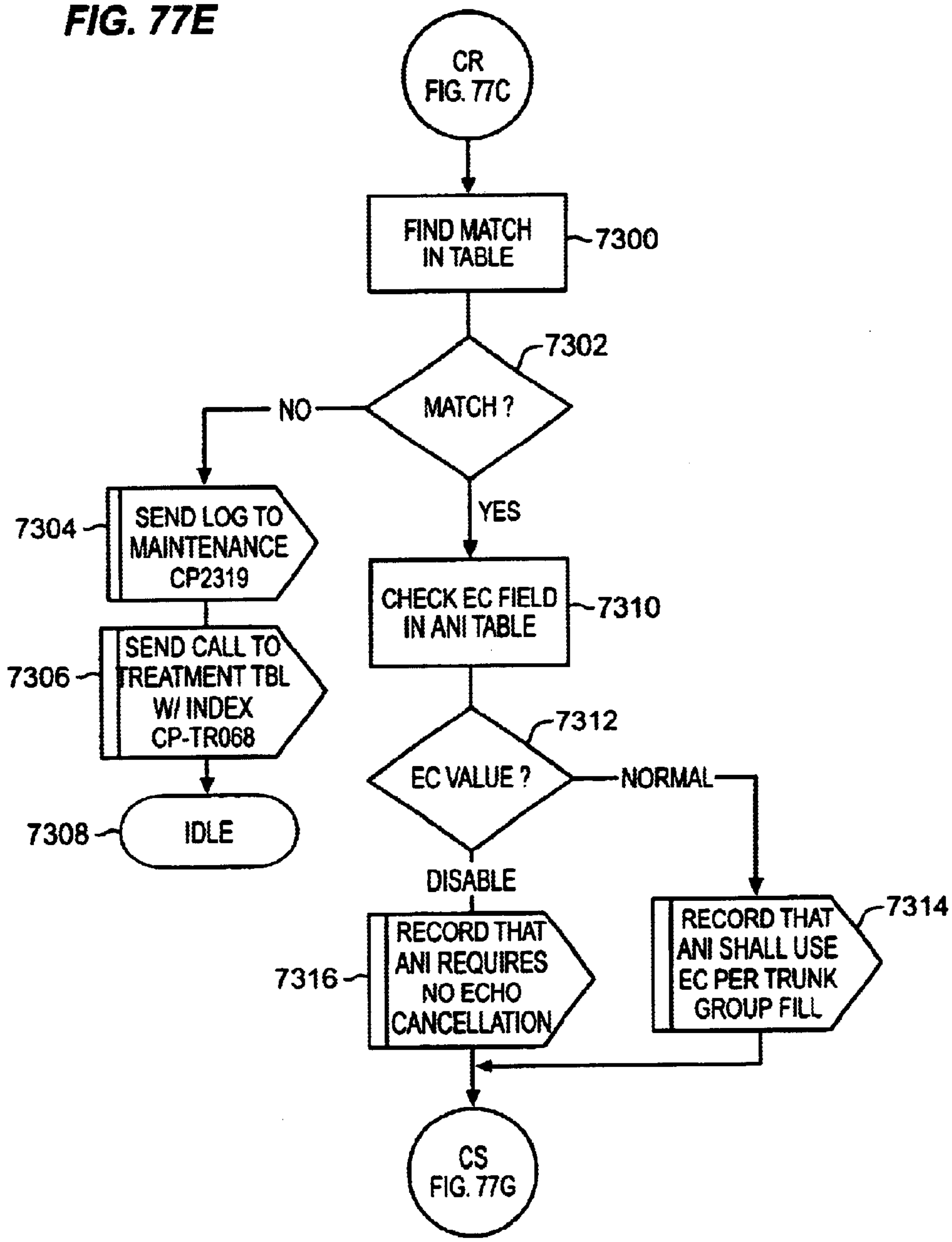
Figure 77F:
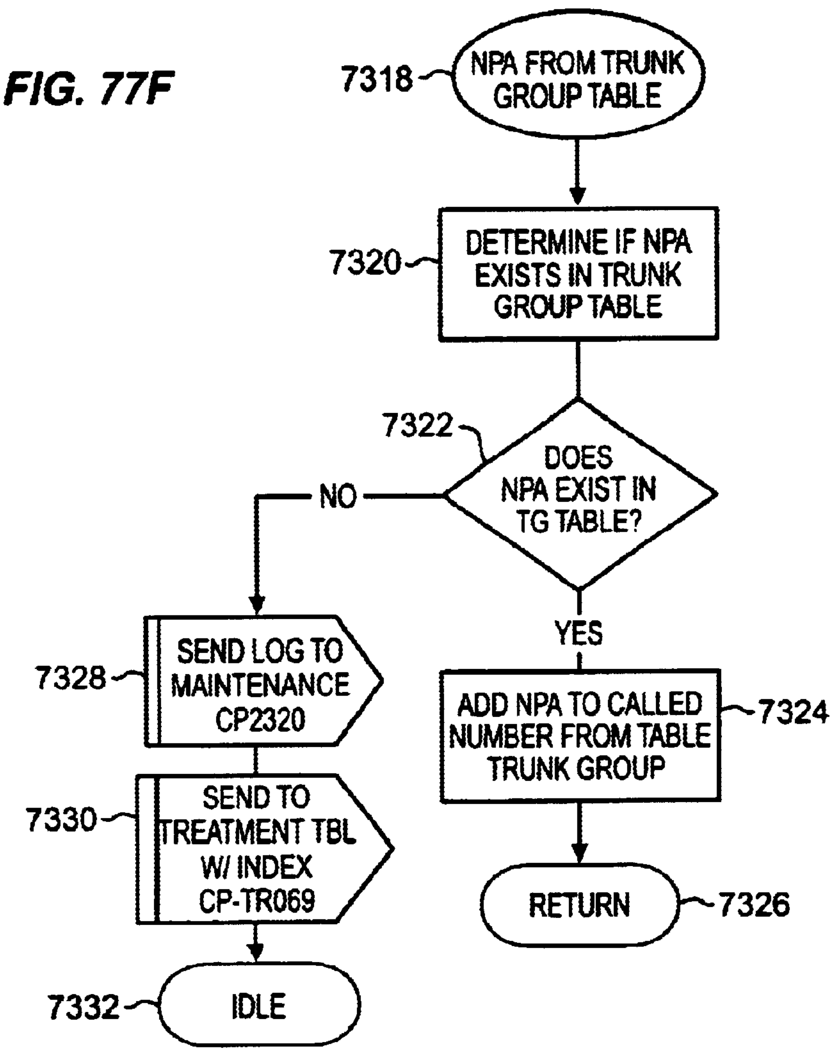
Figure 77G:
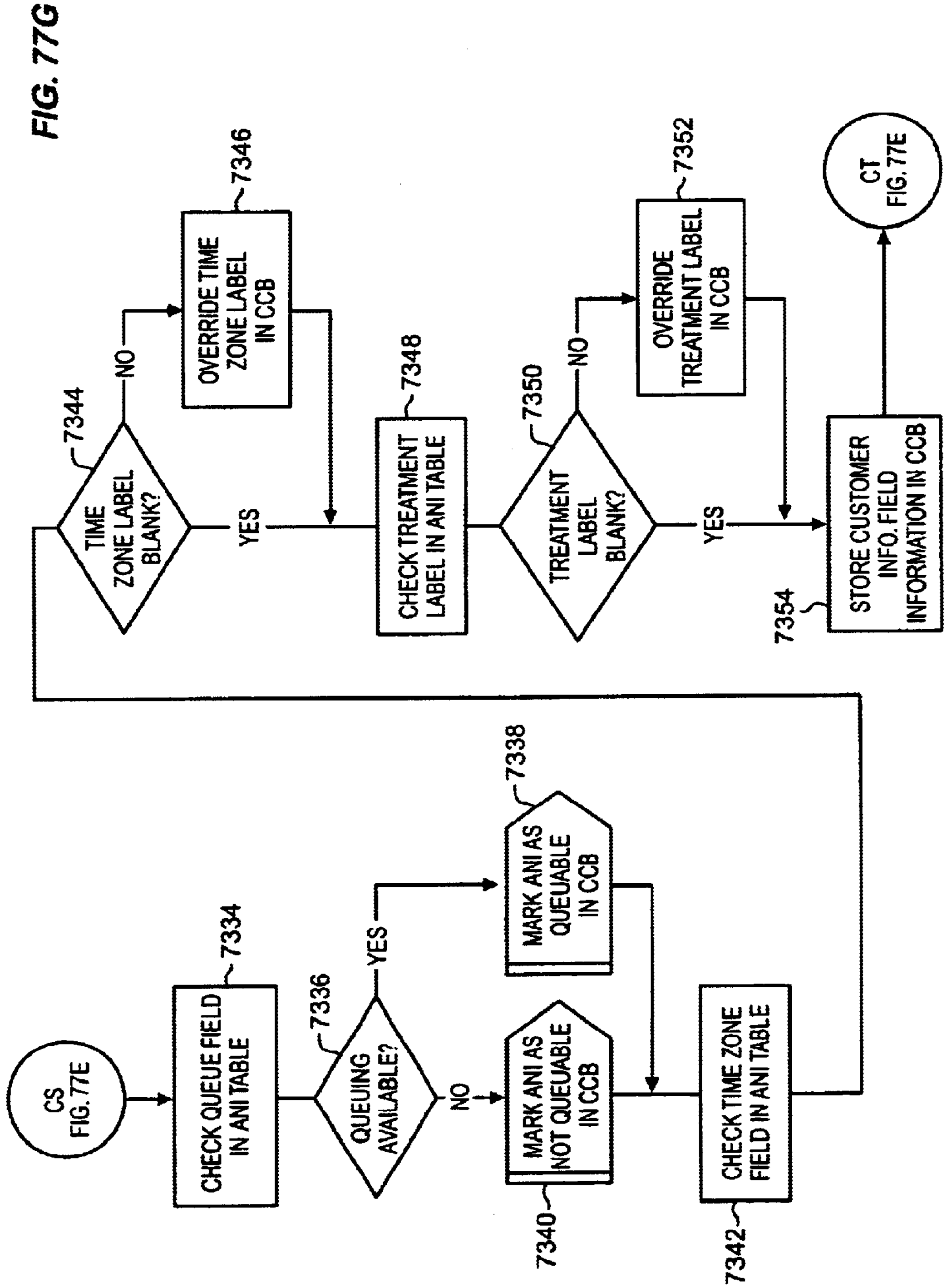
Figure 77H:
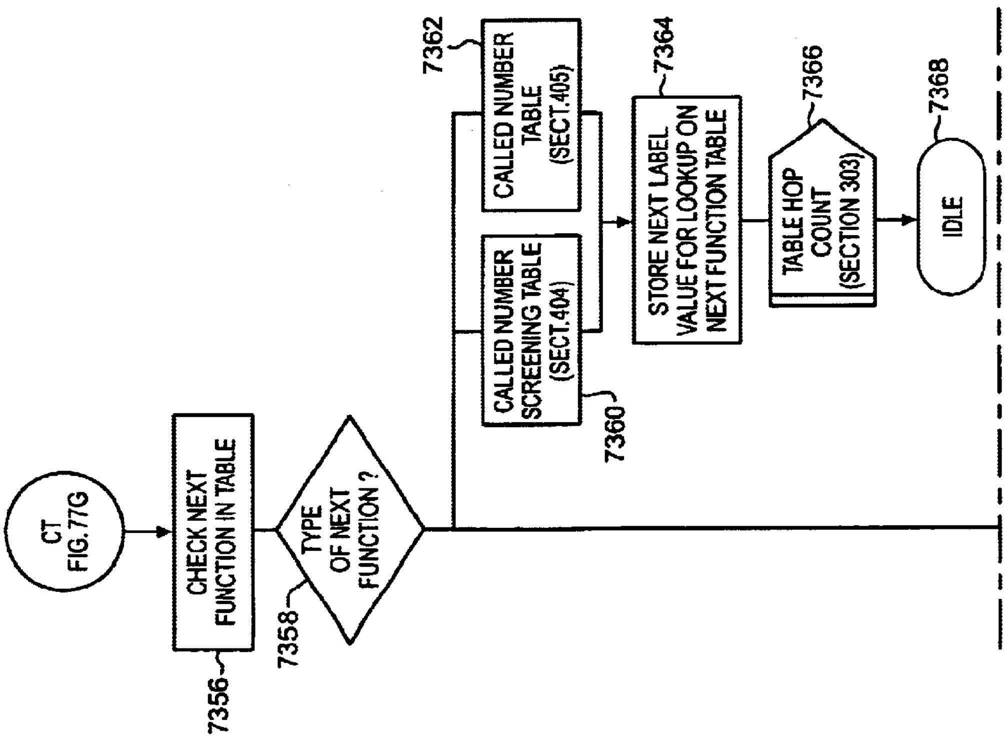
Figure 77:
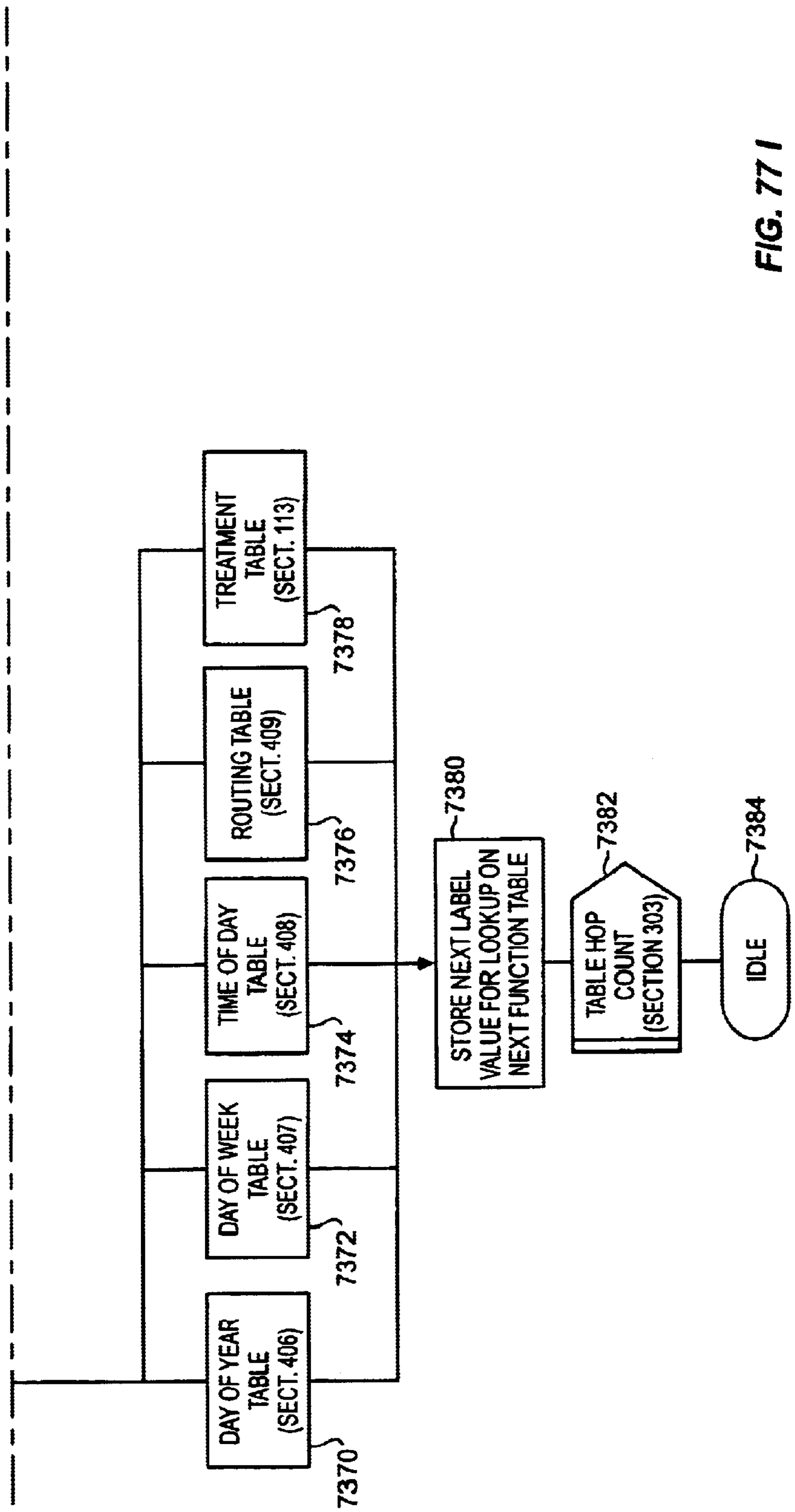
Figure 78A:
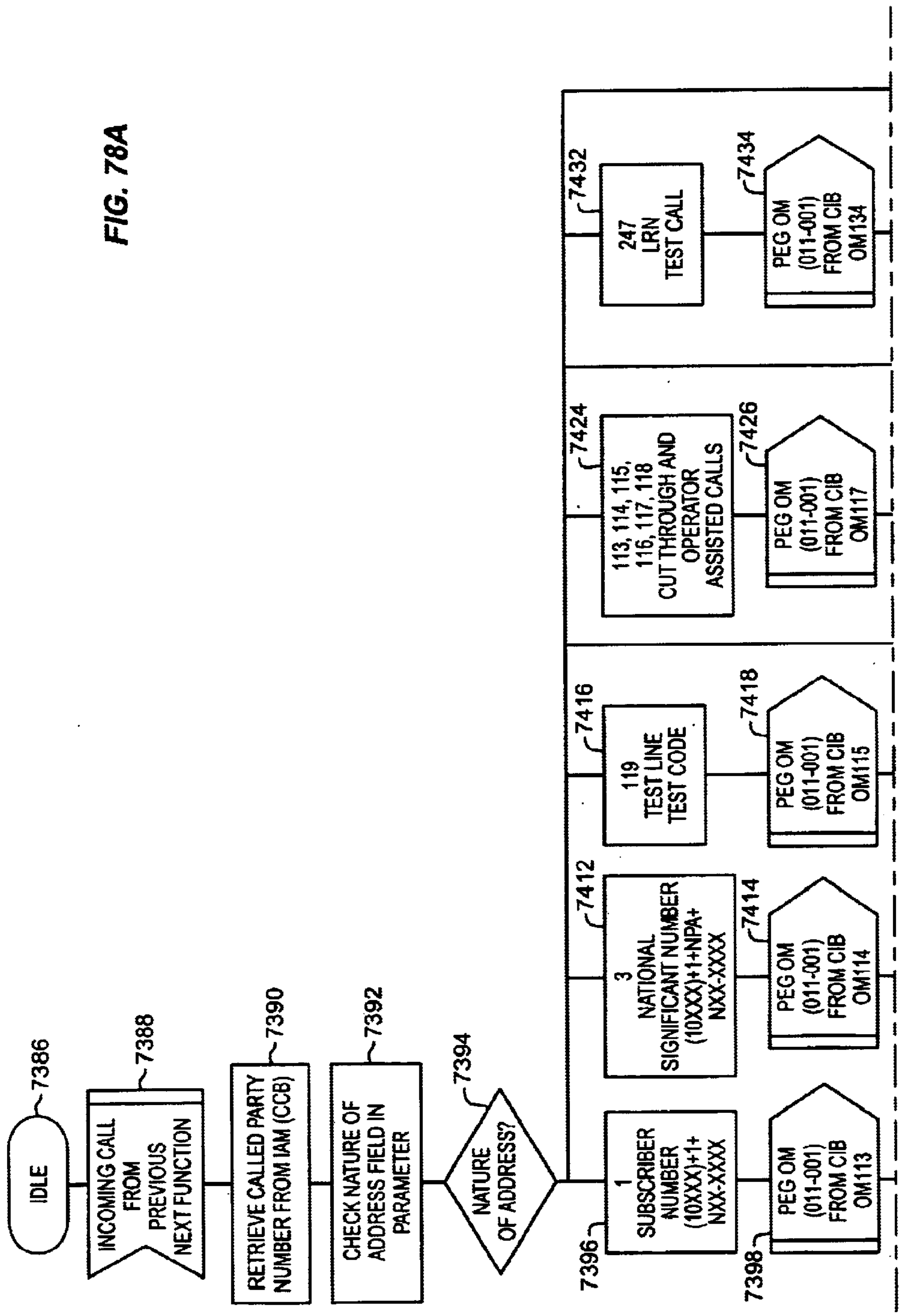
FIGS. 78A–78F are SDL diagrams of logic used in a version of the invention for called number screening table processing.
Figure 78B:
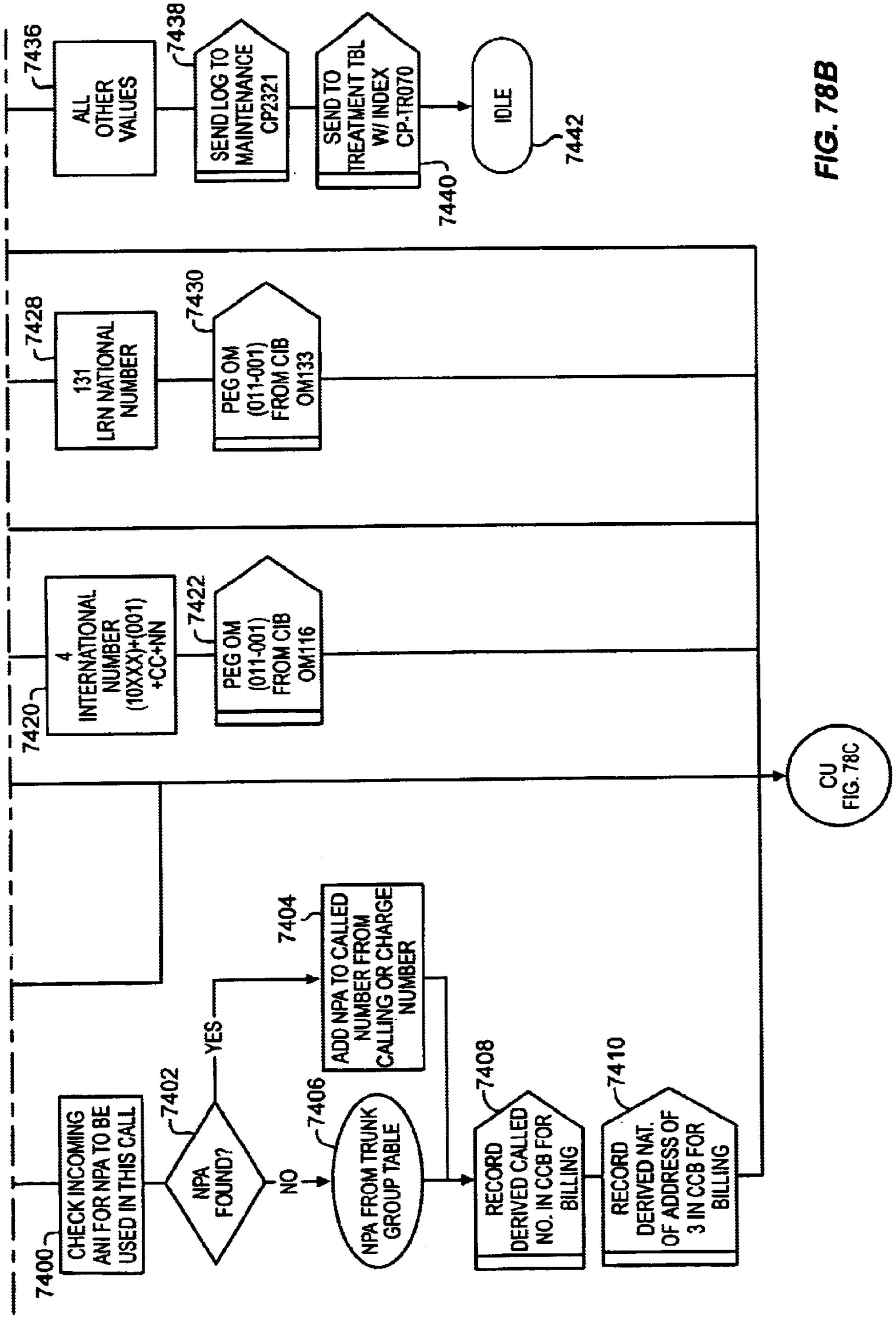
Figure 78C:
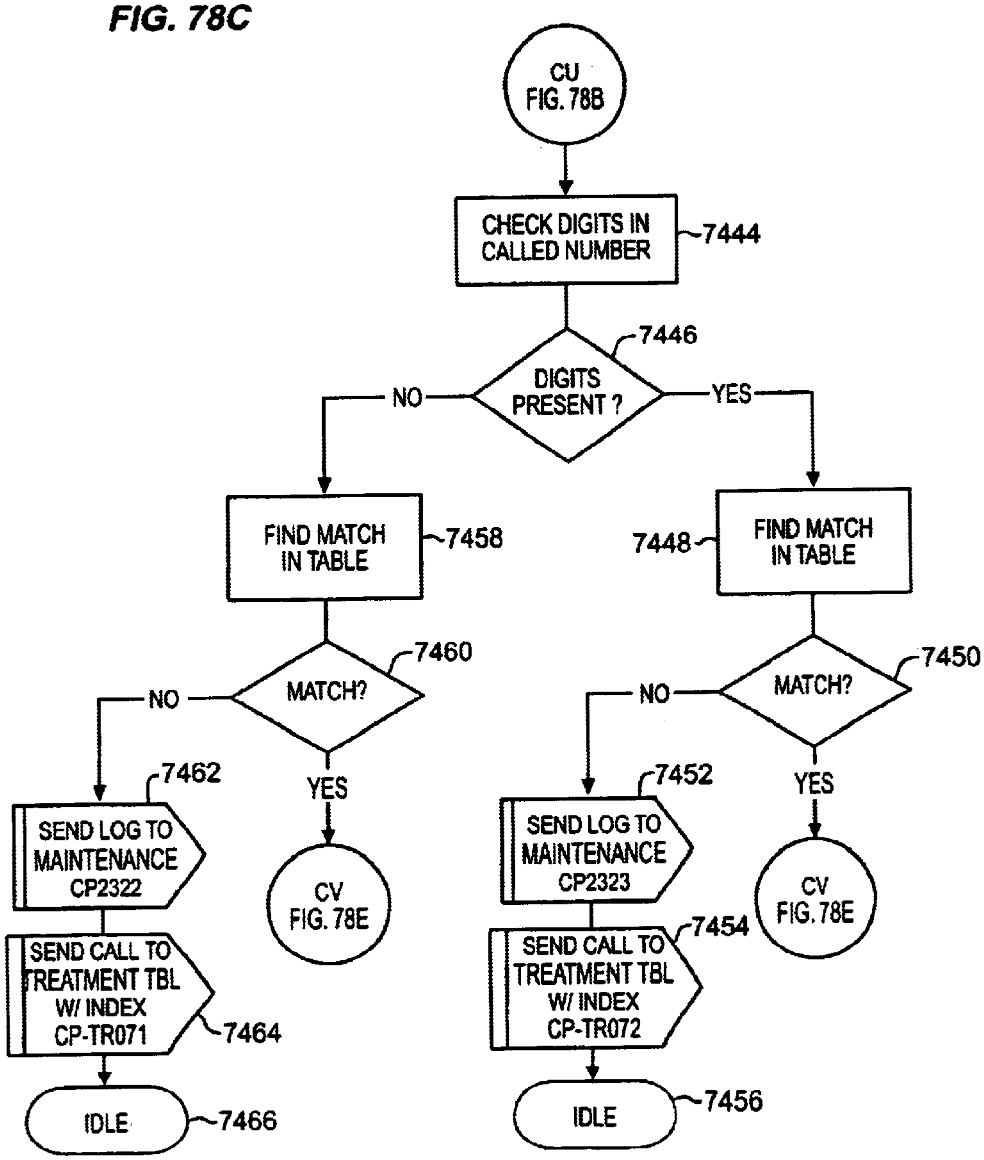
Figure 78D:
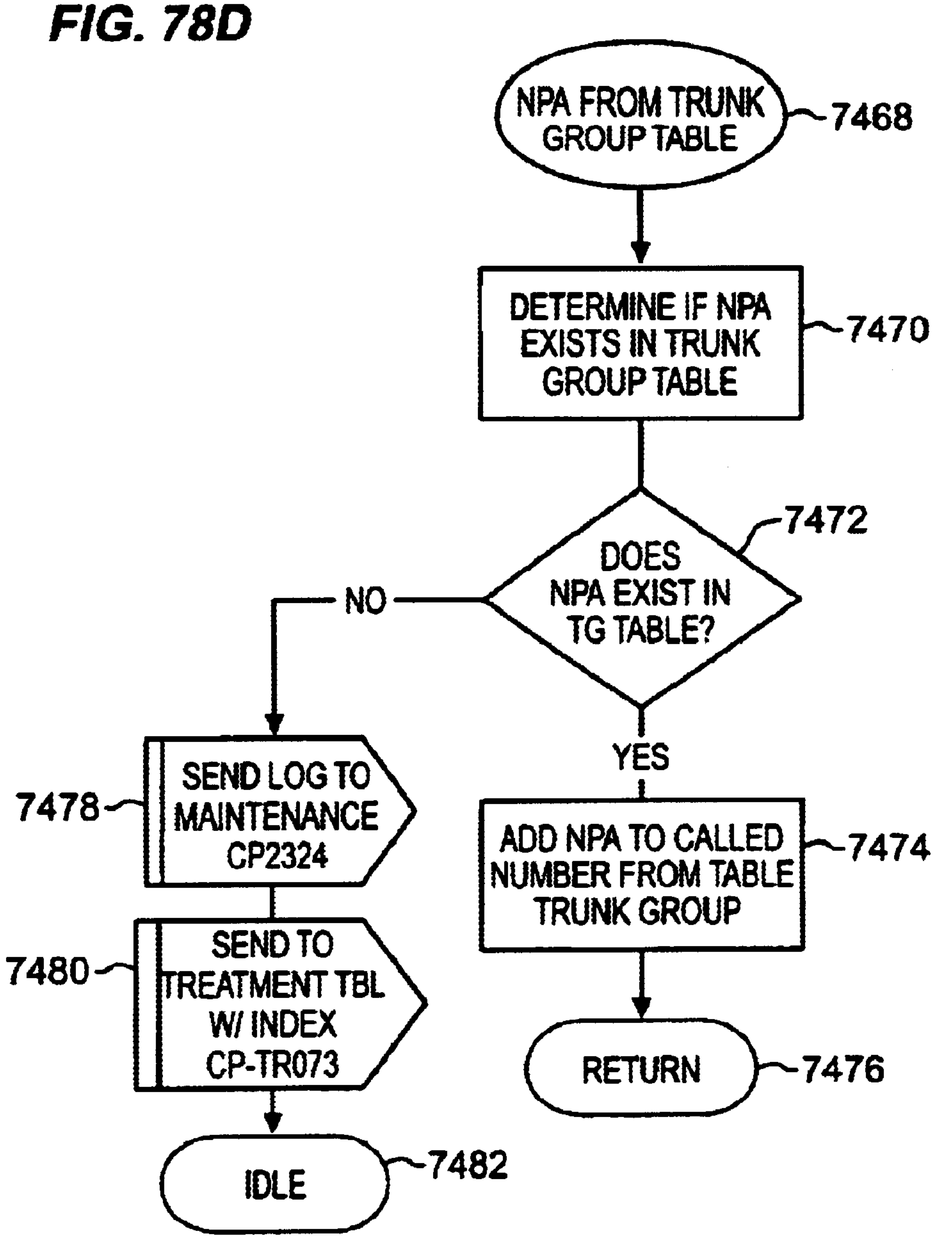
Figure 78E:
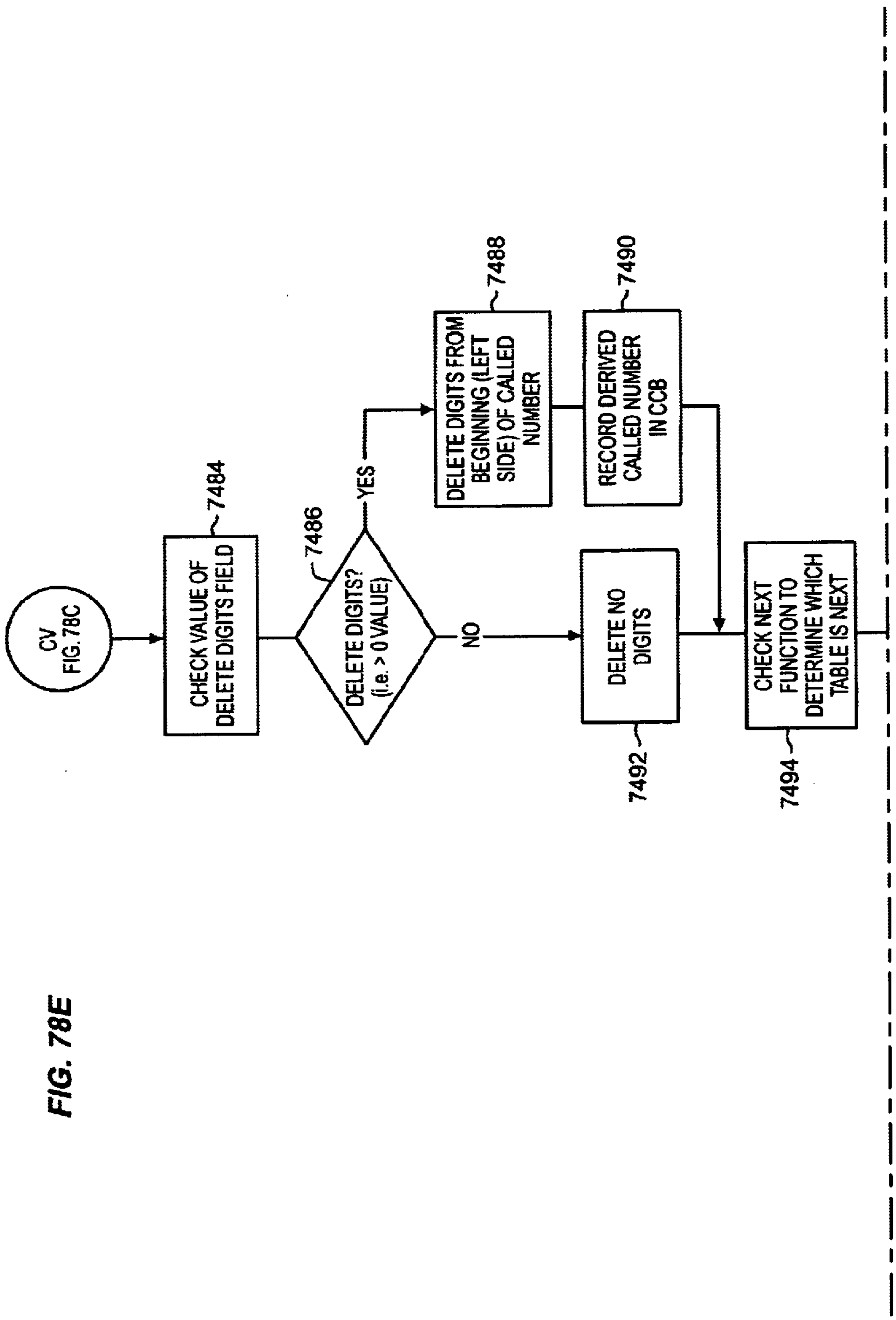
Figure 78F:
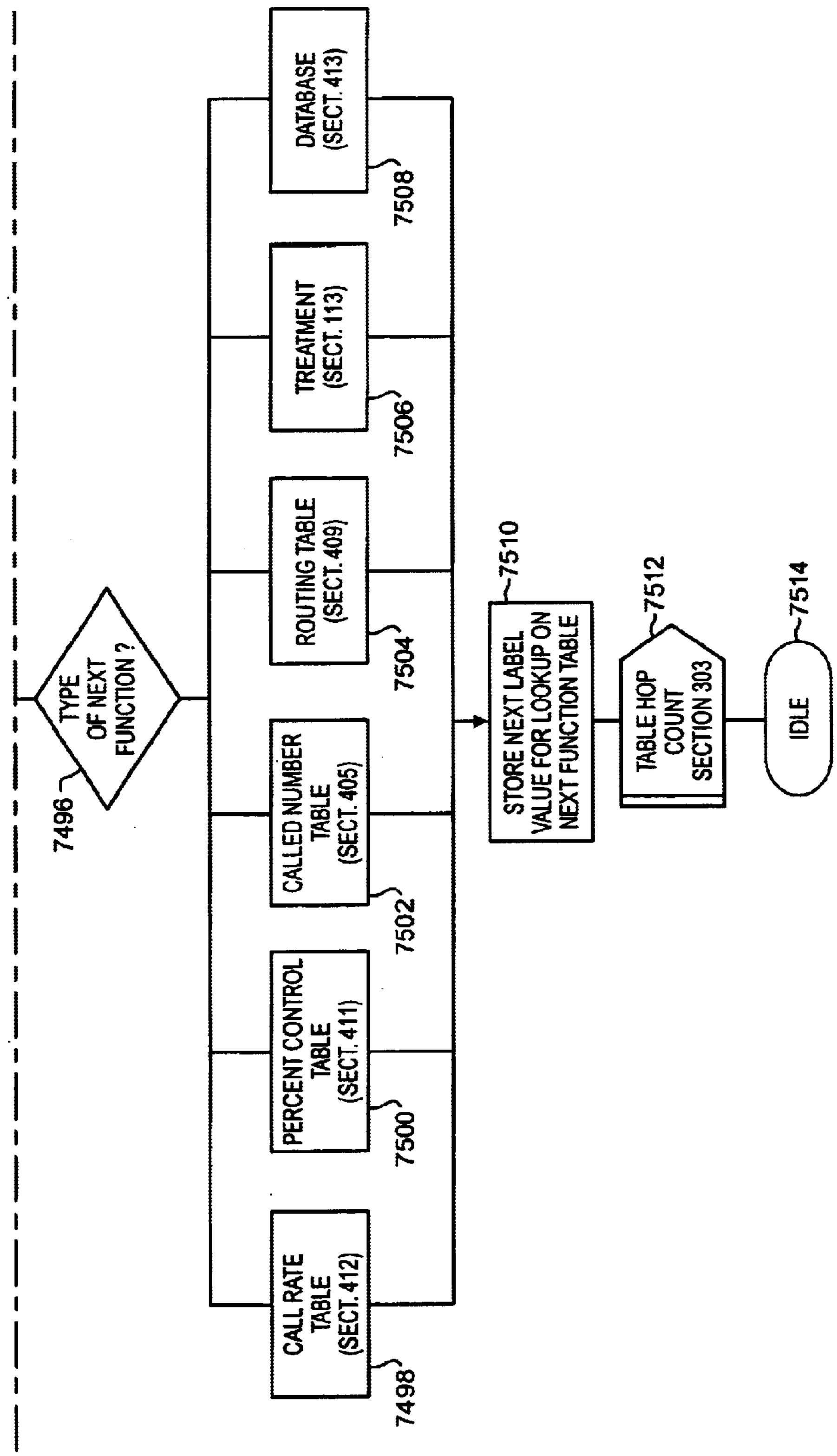
Figure 79A:
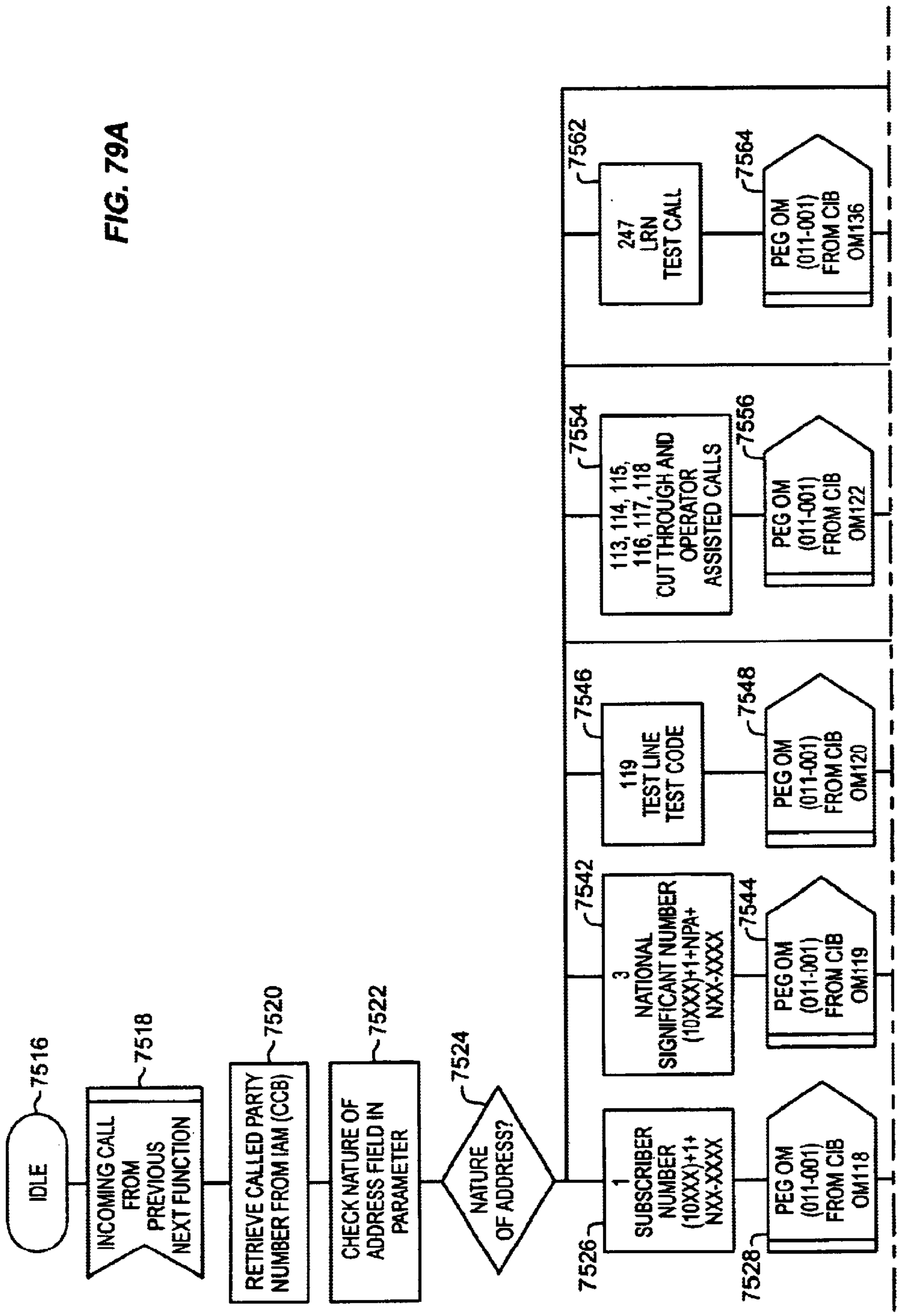
FIGS. 79A–79E are SDL diagrams of logic used in a version of the invention for called number table processing.
Figure 79B:
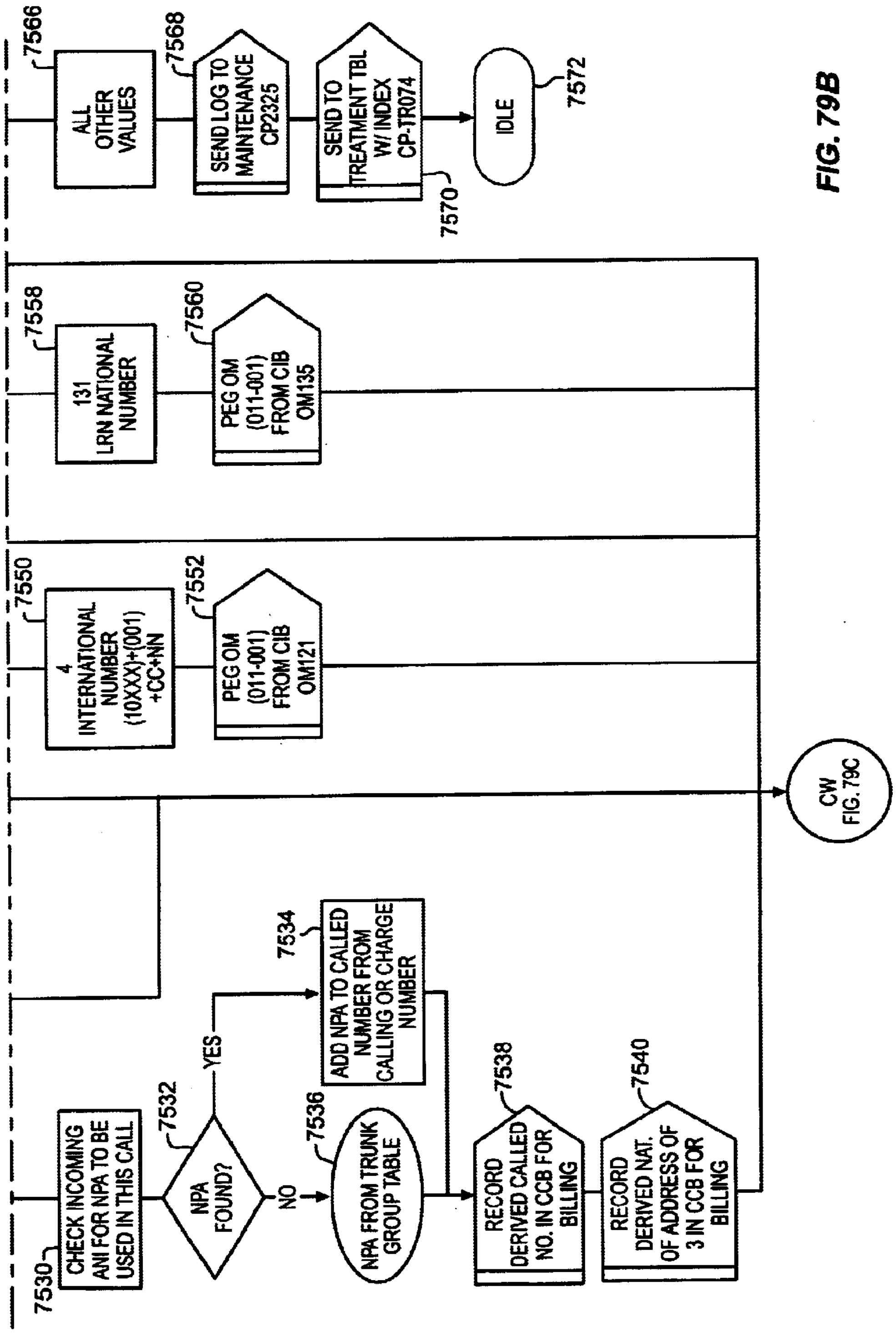
Figure 79C:
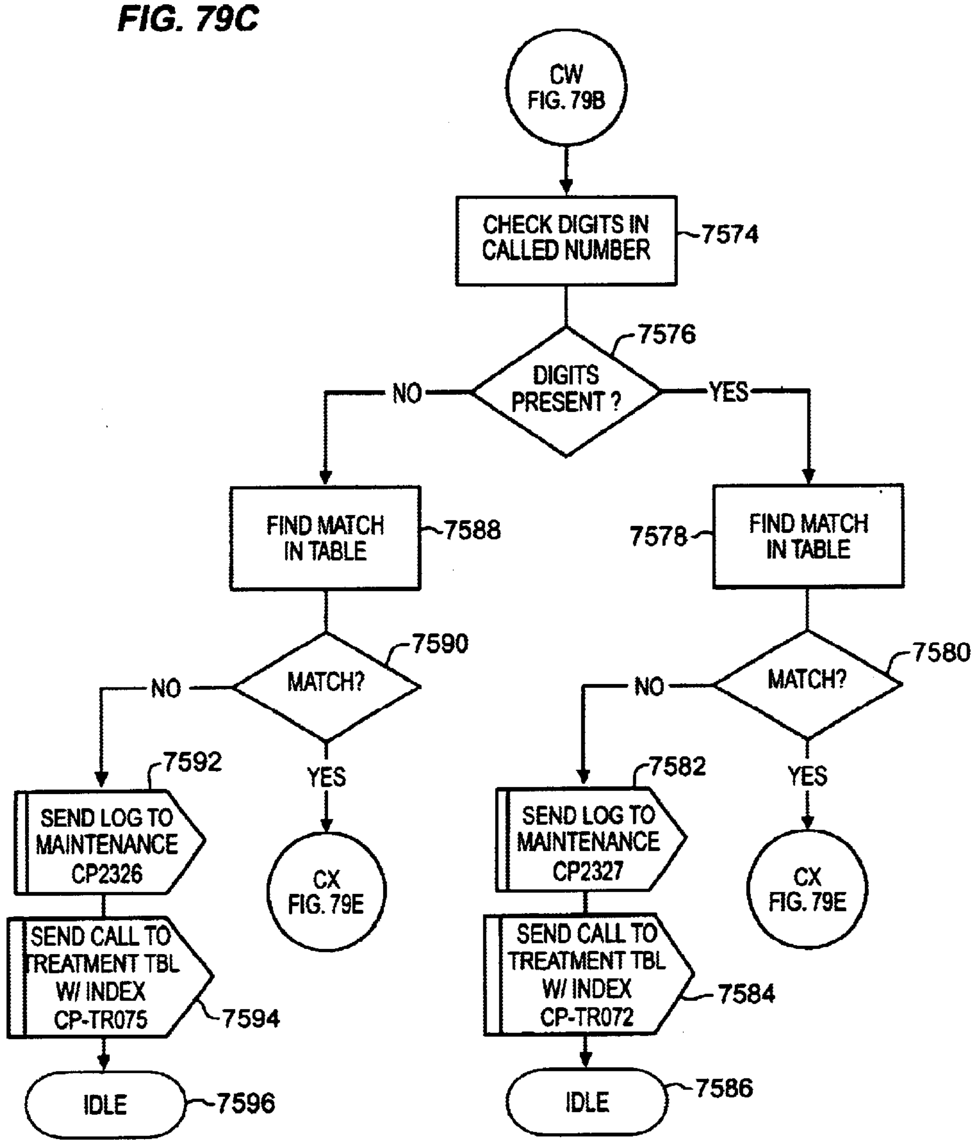
Figure 79D:
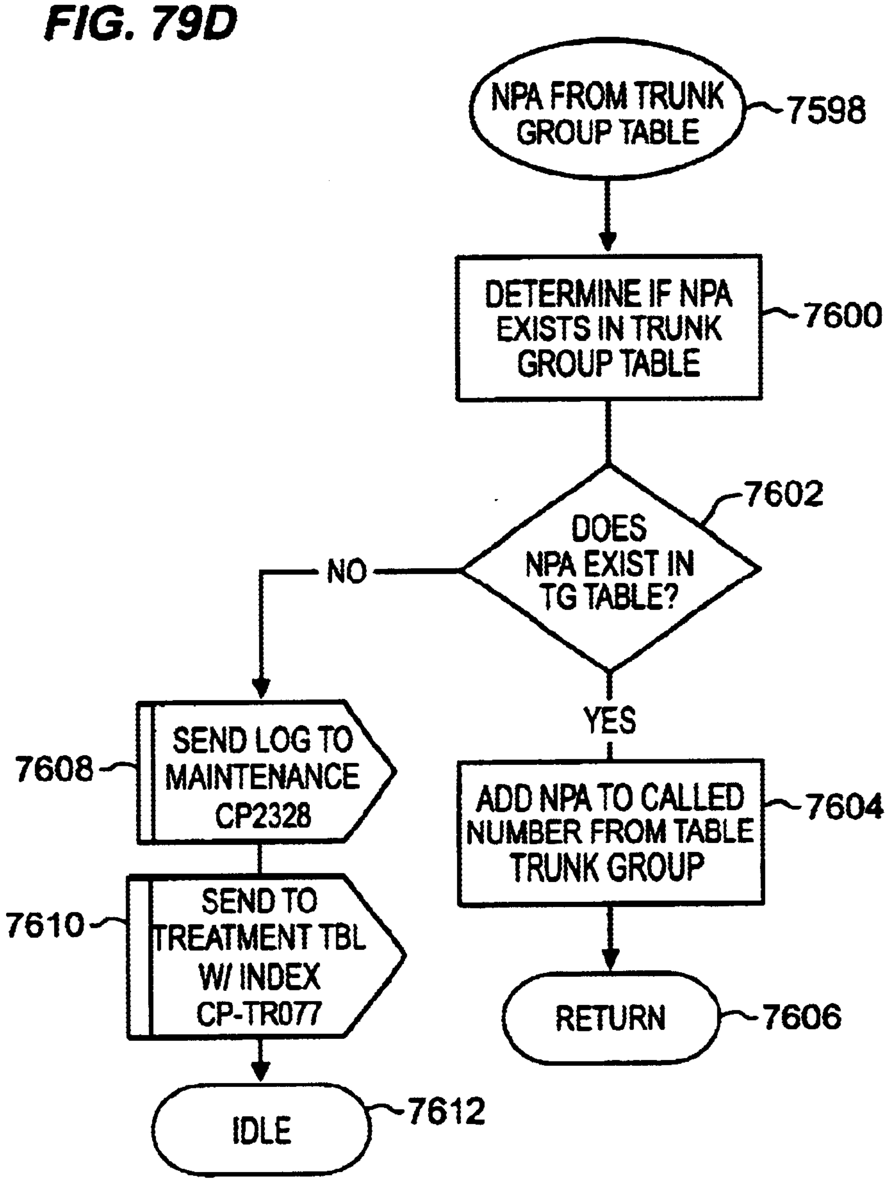
Figure 79E:
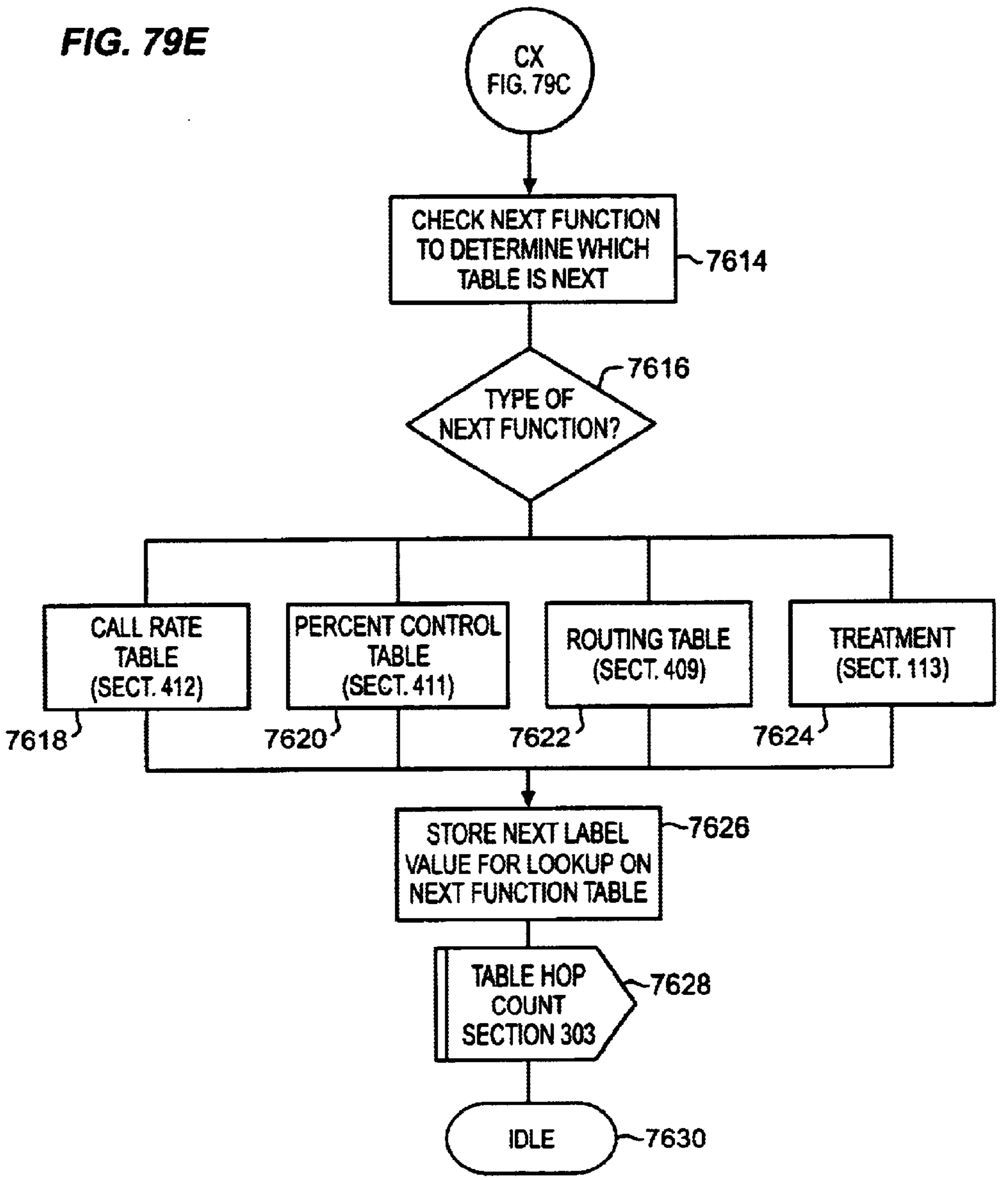

The nature of address type is determined at FIG. 77B. If the nature of address is a 0, 2, 4, 6, or 8–127 for no ANI at 7244, a log is sent to maintenance at 7246. The call is sent to the treatment table at 7248, and idle is attained at 7250.

If the nature of address is a 1 for an ANI of the calling party for the subscriber number at 7252, the NPA is obtained from the trunk group table at 7254, calling the process at step 7318, and the derived charge number is recorded in the CIB for billing at 7256. The derived nature of address of 3 is recorded in the CIB for billing at 7258. The process then continues at step 7300. If the nature of address type is 3 for an ANI of the calling party with a national number at 7260, the process continues at step 7300.

If the nature of address type is a 5 for an ANI of the called party with a subscriber number at 7262, the NPA is obtained from the trunk group table at 7264, calling the process at 7318. The derived charge number is recorded in the CIB for billing at 7266, and the derived nature of address of 7 is recorded in the CIB for billing at 7268. The process then continues at step 7300. If the nature of address is 7 for an ANI of the called party with the national number at 7270, the process continues at step 7300.

If the nature of address type is a 0, 2, 5–112, 117–118, or 120–127 for no ANI at 7272, a log is sent to maintenance at 7274. The call is sent to the treatment table at 7276, and idle is attained at 7278.

If the nature of address type is 1 for a unique subscriber number at 7280, the NPA is obtained from the trunk group table at 7282, calling the process at step 7318. The derived calling number is recorded in the CIB for billing at 7284, and the derived nature of address of 3 is recorded in the CIB for billing at 7286. The process continues at step 7300.

If the nature of address type is 3 for a unique national significant number at 7288, the process continues at step 7300. If the nature of address type is 4 for a unique international number at 7290, the process continues at step 7300.

If the nature of address type is 113, 115, or 116, for a non-unique number at 7292, the number is disclosed in the calling number field, and the charge number field is left blank at 7294. The process continues at step 7300.

If the nature of address type is 119 for a test line or a test code at 7296, the call is marked as a test call in the CIB and in billing at 7298. The process continues at step 7300.

At step 7300, the ANI table is searched to find a match for the nature of address. If a match is not found at 7302, a log is sent to maintenance at 7304. The call is sent to the treatment table at 7306, and idle is attained at 7308. If a match is found at 7302, the EC field in the ANI table is checked at 7310. If the EC value is normal at 7312, the ANI shall use the EC from the trunk group data fill at 7314. The process continues at step 7334. If the EC value is disabled at 7312, the ANI requires no echo cancellation at 7316. The process continues at step 7334.

The process to obtain the, NPA from the trunk group table begins at 7318. It is determined if the NPA exists in the trunk group table at 7320. If the NPA does exist in the trunk group table at 7322, the NPA is added to the called number from the trunk group table at 7324. The process returns to the implementing process at 7326. If the NPA does not exist in the trunk group table at 7322, the log is sent to maintenance at 7328. The call is sent to the treatment table at 7330, and idle is attained at 7332.

The queue field is checked in the ANI table at 7334. If queuing is available at 7336, the ANI is marked as queuable in the CIB at 7338. If queuing is not available at 7336, the ANI is marked as not queuable in the CIB at 7340.

Next, the time zone field is checked in the ANI table at 7342. If the time zone label is not blank at 7344, the time zone label is over ridden in the CIB at 7346. The time zone label in the ANI table will overide the value already stored in the CIB from the trunk group table. After step 7346 or if the time zone label is blank at 7344, the treatment label is checked in the ANI table at 7348. If the treatment label is not blank at 7350, the treatment label is over ridden in the CIB at 7352. The treatment label in the ANI table will override the value already stored in the CIB from the trunk group table. After step 7352 or if the treatment label is blank at 7350, the customer information field is stored in the CIB at 7354. The process then continues at step 7356.

The next function in the ANI table is checked at 7356. The next function type is checked at 7358. If the next function type at 7358 is the called number screening table at 7360 or the called number table at 7362, the next label value is stored for the look up on the next function table at 7364. The table hop count process is started at 7366. Idle is attained at 7368.

If the next function type at 7358 is the day of year table at 7370, the day of week table at 7372, the time of day table at 7374, the routing table at 7376, or the treatment table at 7378, the next label value is stored for look up on the next function table at 7380. The table hop count process is started at 7382. Idle is attained at 7384.

Called Number Screening Table

FIGS. 78A–78F depict the processing for a called number screen table. The process is idle at 7386. An incoming call from a previous next function is received at 7388. The called party number is retrieved from the IAM in the CIB at 7390. The nature of address field is checked at 7392 and 7394. If the nature of address at 7394 is 1 for a subscriber number (10XXX)+1+NXX−XXXX at 7396, the OM is pegged at 7398. The incoming ANI is checked for the NPA to be used for this call at 7400 and 7402. If the NPA is found at 7402, the NPA is added to the called number from the calling number or the charge number at 7404. If the NPA is not found at 7402, the NPA is obtained from the trunk group table at 7406, calling the process at 7468. Next, the derived calling number is recorded in the CIB for billing at 7408, and the derived nature of address of 3 is recorded in the CIB for billing at 7410. The process continues at step 7444.

If the nature of address at 7394 is 3 for a national significant number (10XXX)+1+NPA+NXX−XXXX at 7412, the OM is pegged at 7414. The process then continues at step 7444.

If the nature of address at 7394 is 119 for a test line or a test code at 7416, the OM is pegged at 7418. The process then continues at step 7444.

If the nature of address at 7394 is 4 for an international number (10XXX)+(001)+CC+NN at 7420, the OM is pegged at 7422. The process then continues at step 7444.

If the nature of address at 7394 is 113, 114, 115, 116, 117, or 118 or a cut through or an operator assisted call at 7424, the OM is pegged at 7426. The process then continues at step 7444.

If the nature of address at 7394 is 131 for an LRN national number at 7428, the OM is pegged at 7430. The process then continues at step 7444.

If the nature of address at 7394 is 247 for an LRN test call at 7432, the OM is pegged at 7434. The process then continues at step 7444.

If the nature of address at 7394 is any other value at 7436, a log is sent to maintenance at 7438. The call is sent to the treatment table at 7440, and idle is attained at 7442.

The digits are checked in the called number parameter at 7444. If the digits are present at 7446, the process searches for a match for the digits in the called number screening table at 7448. If a match is found at 7450, the process continues at step 7484. If a match is not found at 7450, a log is sent to maintenance at 7452. The call is sent to the treatment table at 7454, and idle is attained at 7456.

If the digits are not present at 7446, the process searches the called number screening table for a match using a called number of all zeros at 7458. If a match is found at 7460, the process continues at step 7484. If a match is not found at 7460, a log is sent to maintenance at 7462. The call is sent to the treatment table at 7464, and idle is attained at 7466.

The process to obtain the NPA from the trunk group table starts at 7468. It is determined if the NPA exists in the trunk group table at 7470. If the NPA does exist in the trunk group table at 7472, the NPA is added to the called number from the trunk group table at 7474. The process returns to the implementing process at 7476. If the NPA does not exist in the trunk group table at 7472, a log is sent to maintenance at 7478. The call is sent to the treatment table at 7480, and idle is attained at 7482.

The value of the delete digits field is checked at 7484. If the delete digits have a field greater than 0 at 7486, digits are deleted from the beginning of the called number at 7488. The derived called number is recorded in the CIB at 7490. If the delete digits field has a value that is not greater than 0 at 7486, no digits are deleted at 7492.

After step 7490 or step 7492, the next function is checked to determine which table is next at 7494 and 7496. If the next function type at 7496 is the call rate table at 7498, the percent control table at 7500, the called number table at 7502, the routing table at 7504, the treatment table at 7506, or the database table at 7508, the next label value is stored for look up in the next function table at 7510. The table hop count process is started at 7512. Idle is attained at 7514.

Called Number Table

FIGS. 79A–79E depict the processing for the called number table. The process is idle at 7516. An incoming call from a previous next function is received at 7518. The called party number is retrieved from the IAM at 7520. If the database services table logic has determined that the called party number has ported, then the table look up shall use those derived values for the ported called party number. The nature of address field is checked at 7522 and 7524.

If the nature of address at 7524 is 1 for a subscriber number (10XXX)+1+NXX−XXXX at 7526, the OM is pegged at 7528. The incoming ANI is checked for the NPA to be used for this call at 7530. If the NPA is found at 7532, the NPA is added to the called number from the calling or charge number at 7534. If the NPA is not found at 7532, the NPA is obtained from the trunk group table at 7536, calling the process at 7598. The derived called number is recorded in the CIB for billing at 7538. The derived nature of address of 3 is recorded in the CIB for billing at 7540. The process then continues at step 7574.

If the nature of address at 7524 is 3 for a national significant number (10XXX)+1+NPA+NXX–XXXX at 7542, the OM is pegged at 7544. The process then continues at 7574.

If the nature of address is 119 for a test line or a test code at 7546, the OM is pegged at 7548. The process then continues at 7574.

If the nature of address at 7524 is for an international number (10XXX)+(001)+CC+NN at 7550, the OM is pegged at 7552. The process then continues at 7574.

If the nature of address at 7524 is 113–118 for a cut through or an operator assisted call at 7554, the OM is pegged at 7556. The process then continues at step 7574.

If the nature of address at 7524 is 131 for an LRN national number at 7558, the OM is pegged at 7560. The process then continues at step 7574.

If the nature of address at 7524 is 247 for an LRN test call at 7526, the OM is pegged at 7564. The process then continues at step 7574.

If the nature of address at 7524 is any other value at 7566, a log is sent to maintenance at 7568. The call is sent to the treatment table at 7570. Idle is attained at 7572.

The digits in the called number are checked at 7574. If the digits are present at 7576, the called number table is searched to find a match using the label, the nature of address, and the digits from and the digits to at 7578. If a match is found at 7580, the process continues at step 7614. If a match is not found at 7580, a log is sent to maintenance at 7582. The call is sent to the treatment table at 7584, and idle is attained at 7586.

If the digits are not present at 7576, a search is made of the called number table using a called number of all zeros at 7588. If a match is found at 7590, the process continues at step 7614. If a match is not found at 7590, a log is sent to maintenance at 7592. The call is sent to the treatment table at 7594, and idle is attained at 7596.

The process for obtaining the NPA from the trunk group table starts at 7598. It is determined if the NPA exists in the trunk group table at 7600. If the NPA does exist in the trunk group table at 7602, the NPA is added to the called number from the trunk group table at 7604. The process returns to the implementing process at 7606. If the NPA does not exist in the trunk group table at 7602, a log is sent to maintenance at 7608. The call is sent to the treatment table at 7610, and idle is attained at 7612.

The next function is checked to determine which table is next at 7614. The type of next function is checked at 7616. If the next function type at 7616 is the call rate table at 7618, the percent control table at 7620, the routing table at 7622, or the treatment table at 7624, the next label value is stored for the look up on the next function table at 7626. The table hop count process is started at 7628, and idle is attained at 7630.

Day of Year Table

Figure 80A:
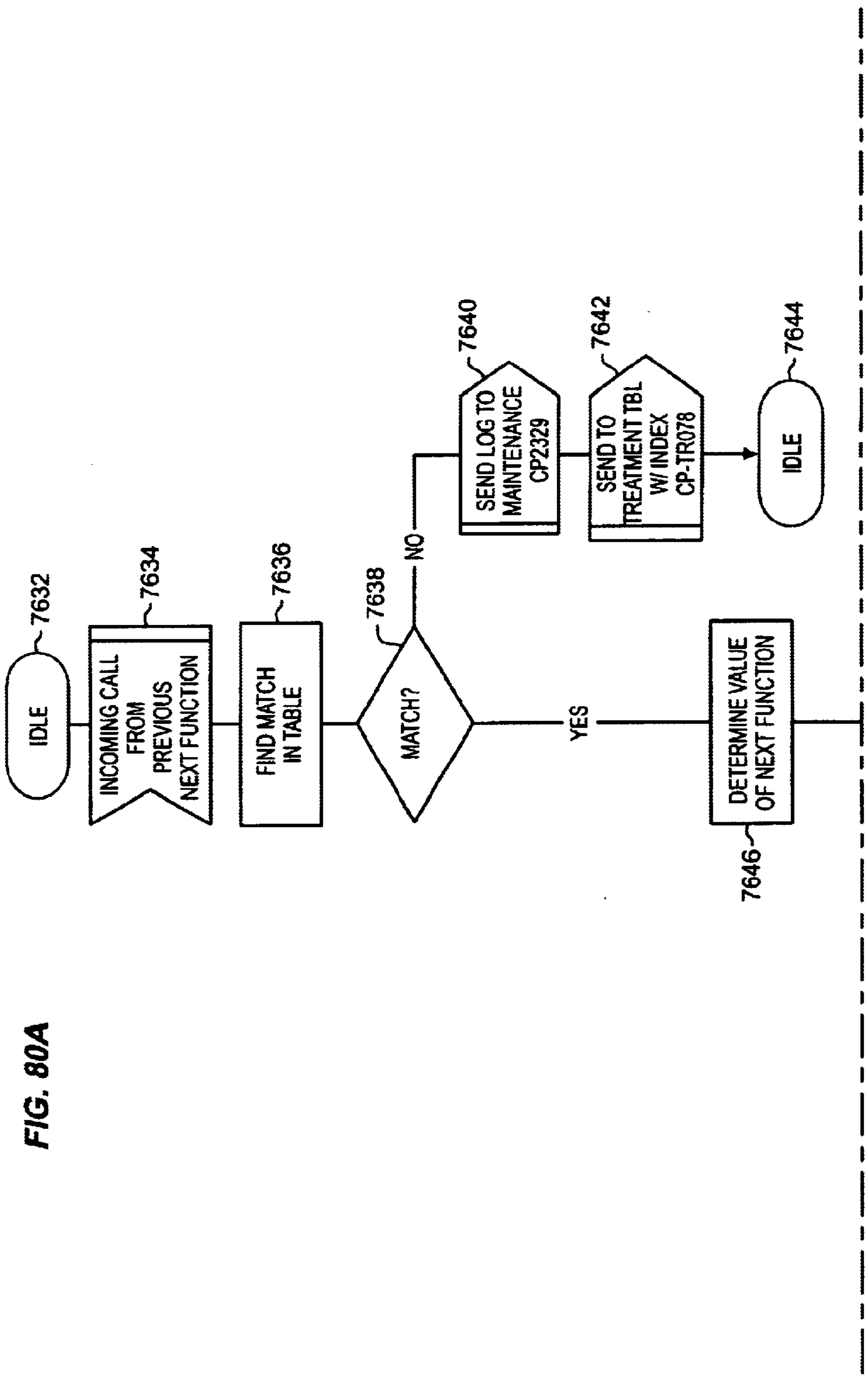
FIGS. 80A–80B are SDL diagram of logic used in a version of the invention for day of year table processing.
Figure 80B:
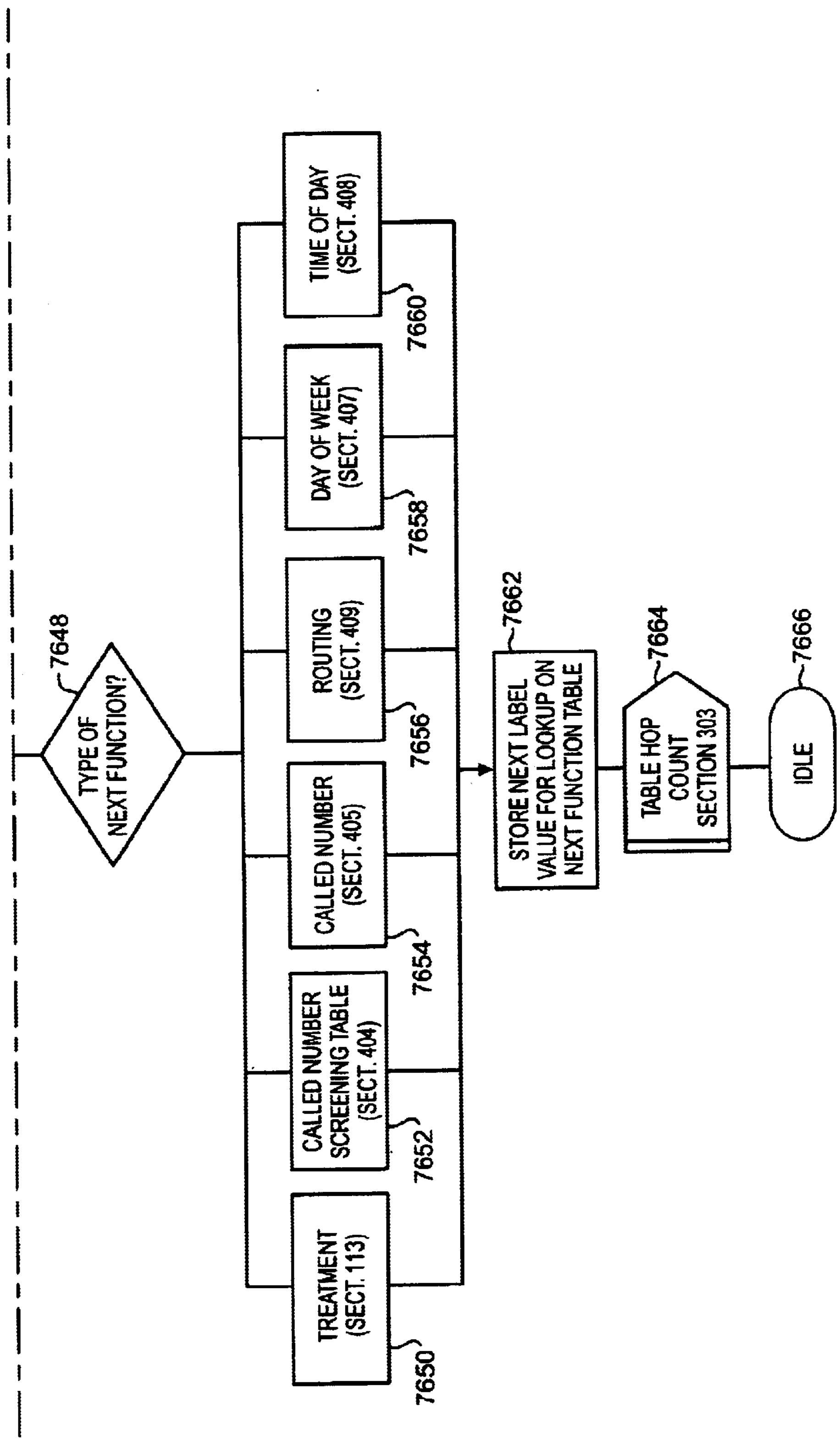

FIGS. 80A–80B depict all processing for the day of year table. The process is idle at 7632. An incoming call from a previous next function is received at 7634. The day of year table is searched to find a match for the label at 7636. The following order is used for the entry search: (1) label and current date; and (2) label and wild card value. Time zone offsets are included. If a match is not found at 7638, a log is sent to maintenance at 7640. The call is sent to the treatment table at 7642, and idle is attained at 7644.

If a match is found at 7638, the value of the next function is determined at 7646 and 7648. If the type of the next function at 7648 is a treatment table at 7650, a called number screening table at 7652, a called number table at 7654, a routing table at 7656, a day of week table at 7658, or a time of day table at 7660, then the next label value is stored for the look up on the next function table at 7662. The table hop count process is started at 7664. Idle is attained at 7666.

Day of Week Table

Figure 81A:
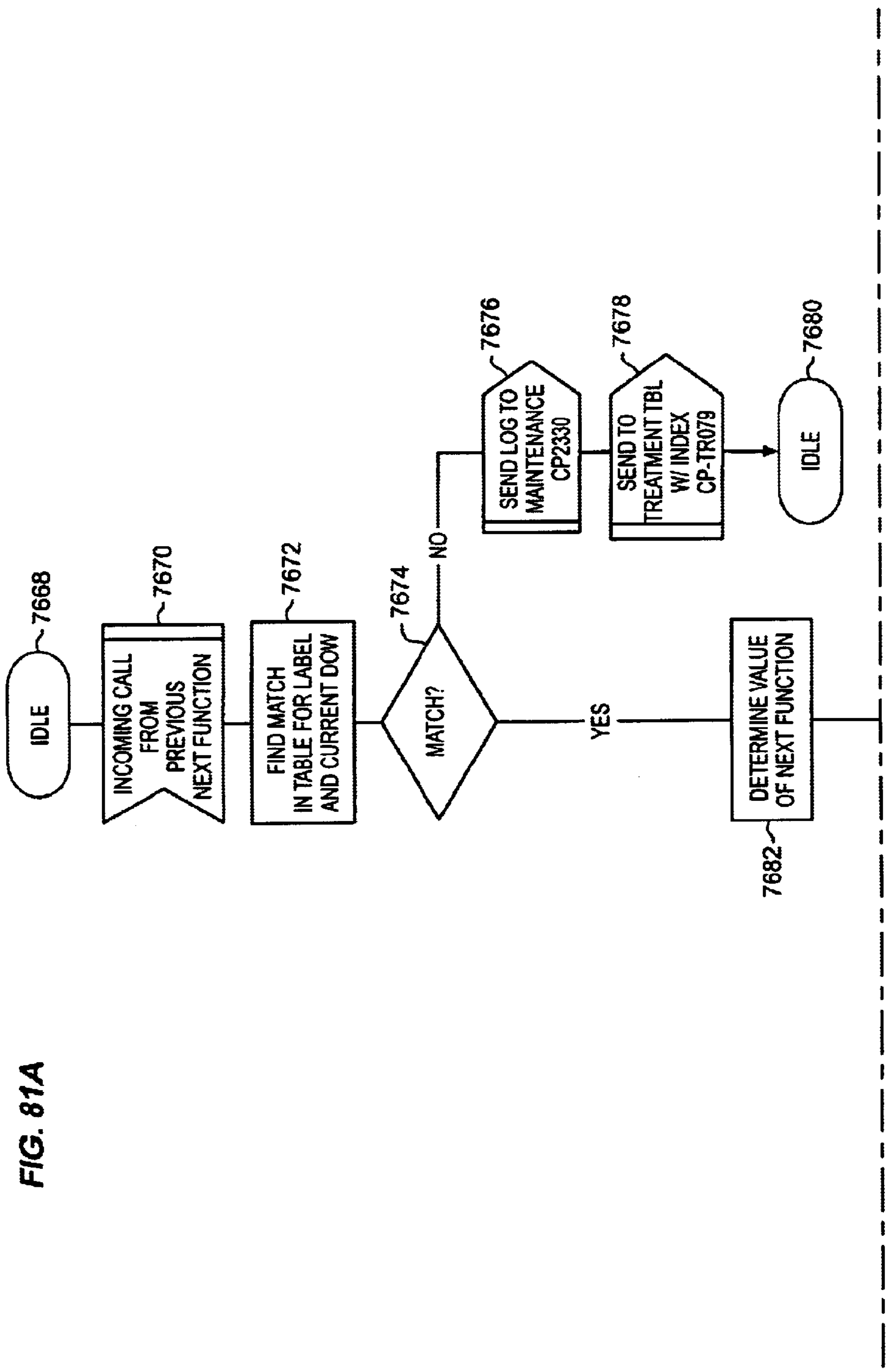
FIGS. 81A–81B are SDL diagram of logic used in a version of the invention for day of week table processing.
Figure 81B:
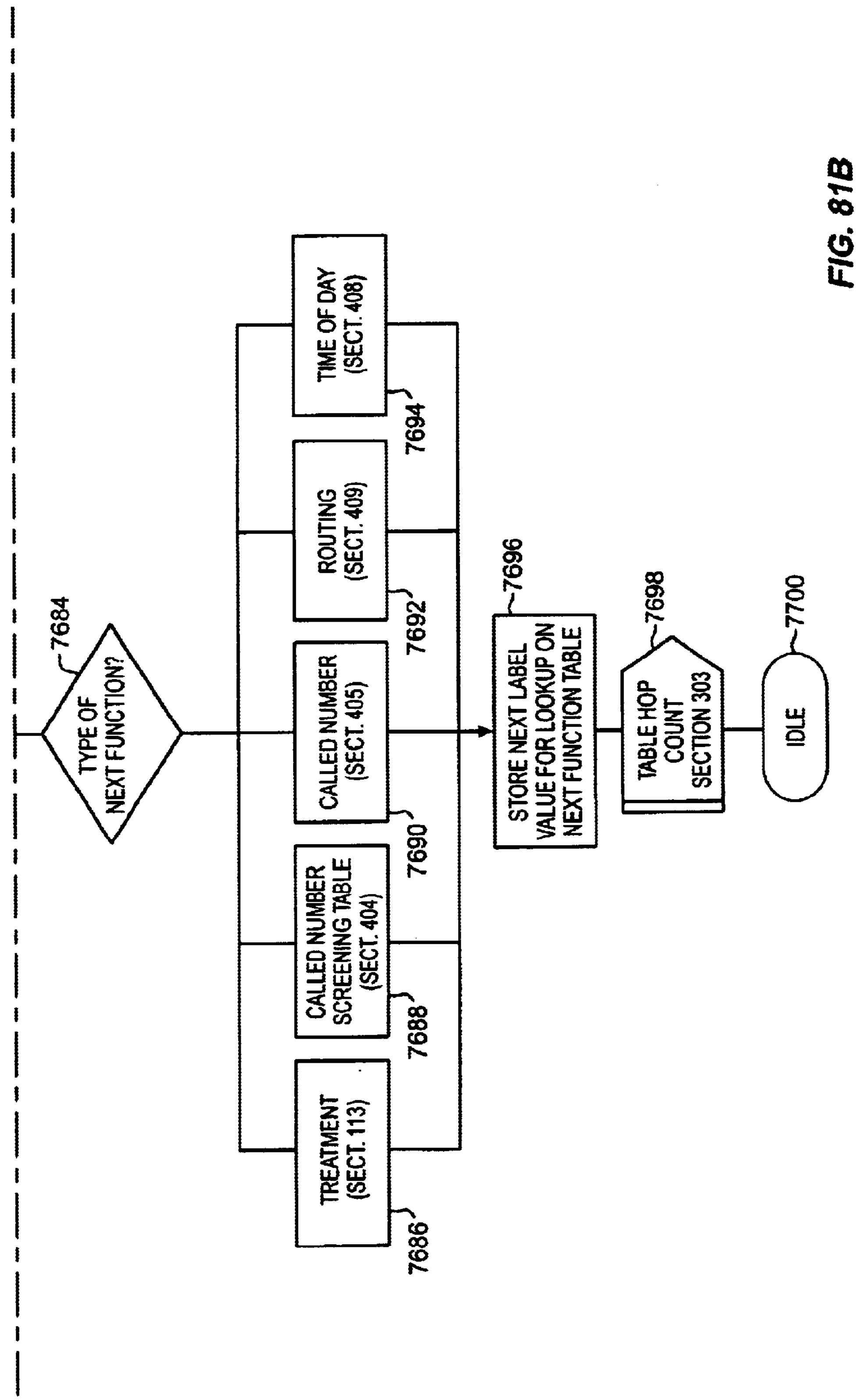

FIGS. 81A–81B depict processing for the day of week table. The process is idle at 7668. An incoming call is received from a previous next function at 7670. The day of week table is searched to find a match for the label and the current day of week at 7672. If a match is not found at 7674, a log is sent to maintenance at 7676. The call is sent to the treatment table at 7678, and idle is attained at 7680.

If a match is found at 7674, the value of the next function is determined at 7682 and 7684. If the type of the next function at 7684 is a treatment at 7686, a called number screening table at 7688, a called number table at 7690, a routing table at 7692, or a time of day table at 7694, the next label value is stored for the look up on the next function table at 7696. The table hop count process is started at 7698, and idle is attained at 7700.

Time of Day Table

Figure 82A:
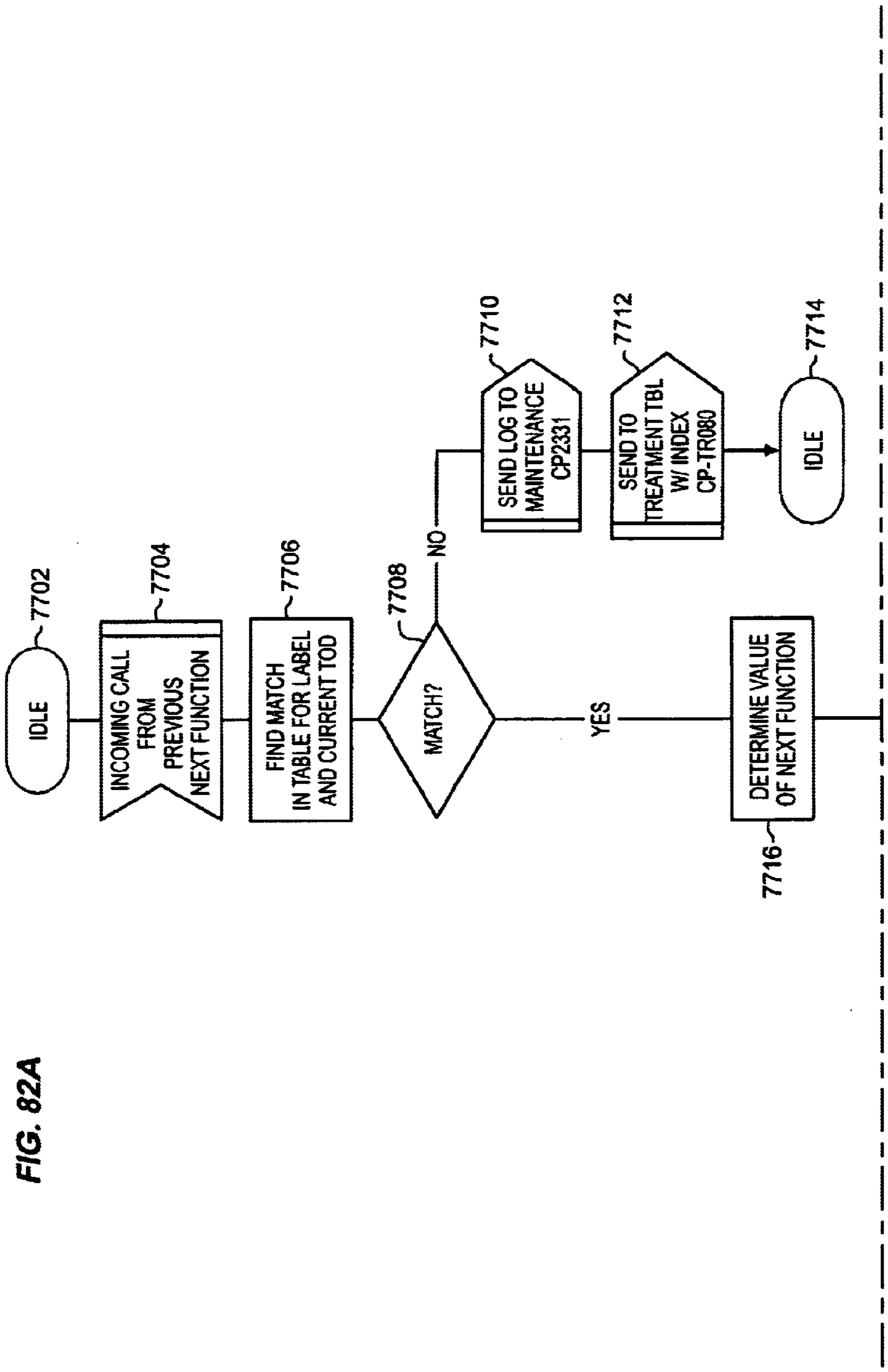
FIGS. 82A–82B are SDL diagram of logic used in a version of the invention for time of day table processing.
Figure 82B:
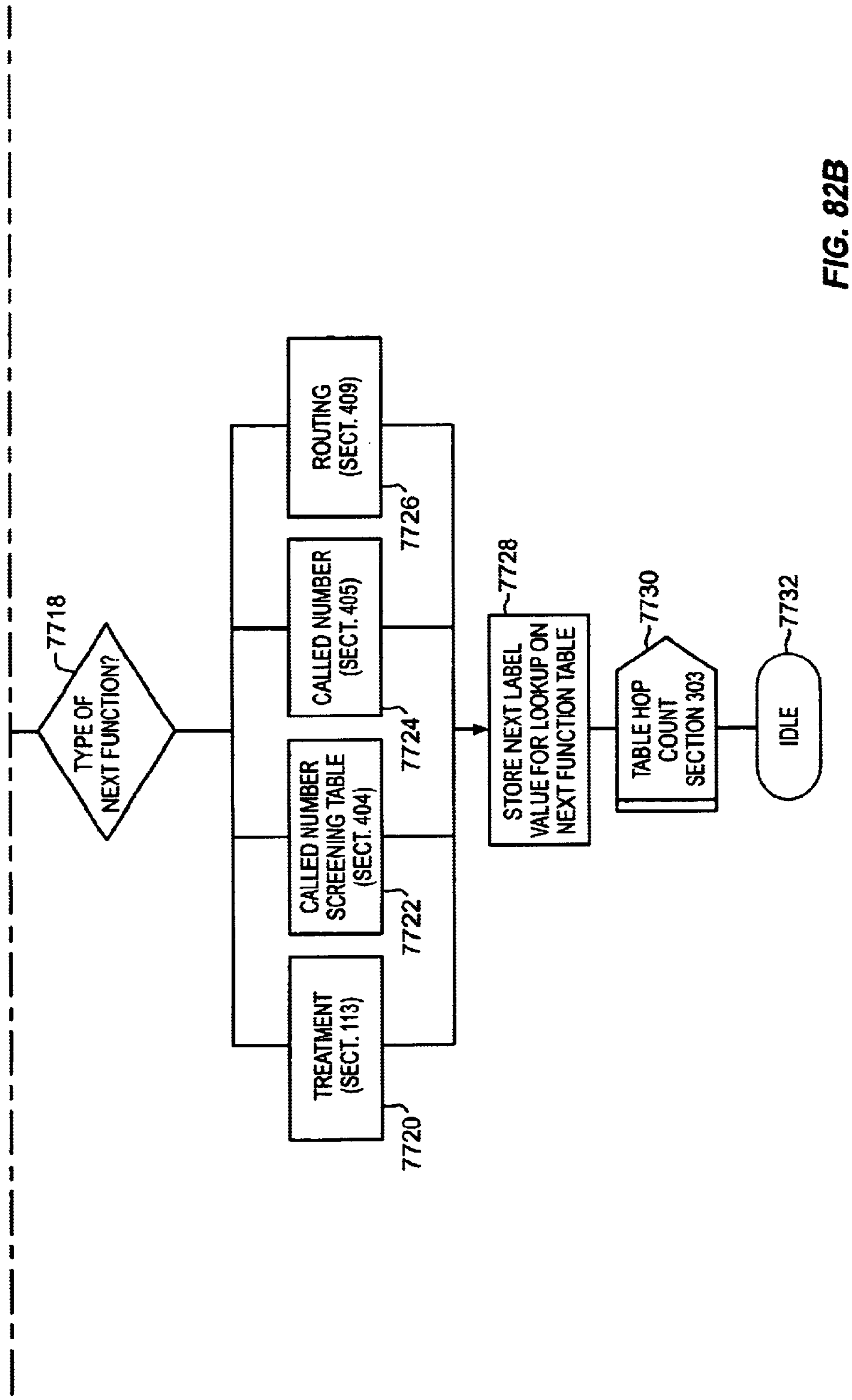

FIGS. 82A–82B depict processing for the time of day table. The process is idle at 7702. An incoming call from a previous next function is received at 7704. The time of day table is searched to find a match in the table for the label and the current time of day at 7706. Time zone offsets are to be included. If a match is not found at 7708, a log is sent to maintenance at 7710. The call is sent to the treatment table at 7712, and idle is attained at 7714.

If a match is found at 7708, the next value of the next function is determined at 7716 and 7718. If the type of next function at 7718 is a treatment table at 7720, a called number screening table at. 7722, a called number table at 7724, or a routing table at 7726, the next label value is stored for look up on the next function table at 7728. The table hop count process is started at 7730, and idle is attained at 7732.

Routing Table

Figure 83A:
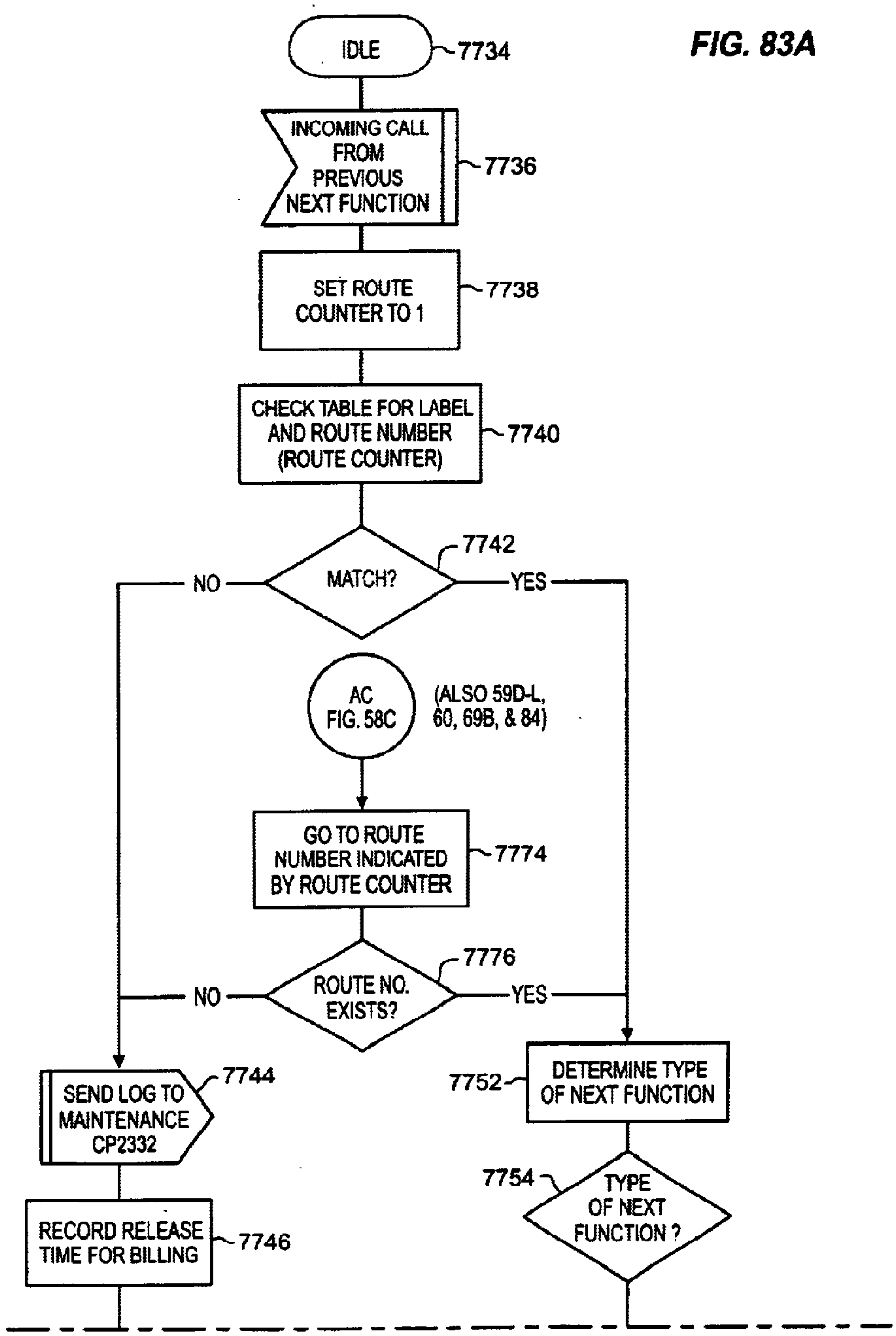
FIGS. 83A–83B are SDL diagram of logic used in a version of the invention for routing table processing.
Figure 83B:
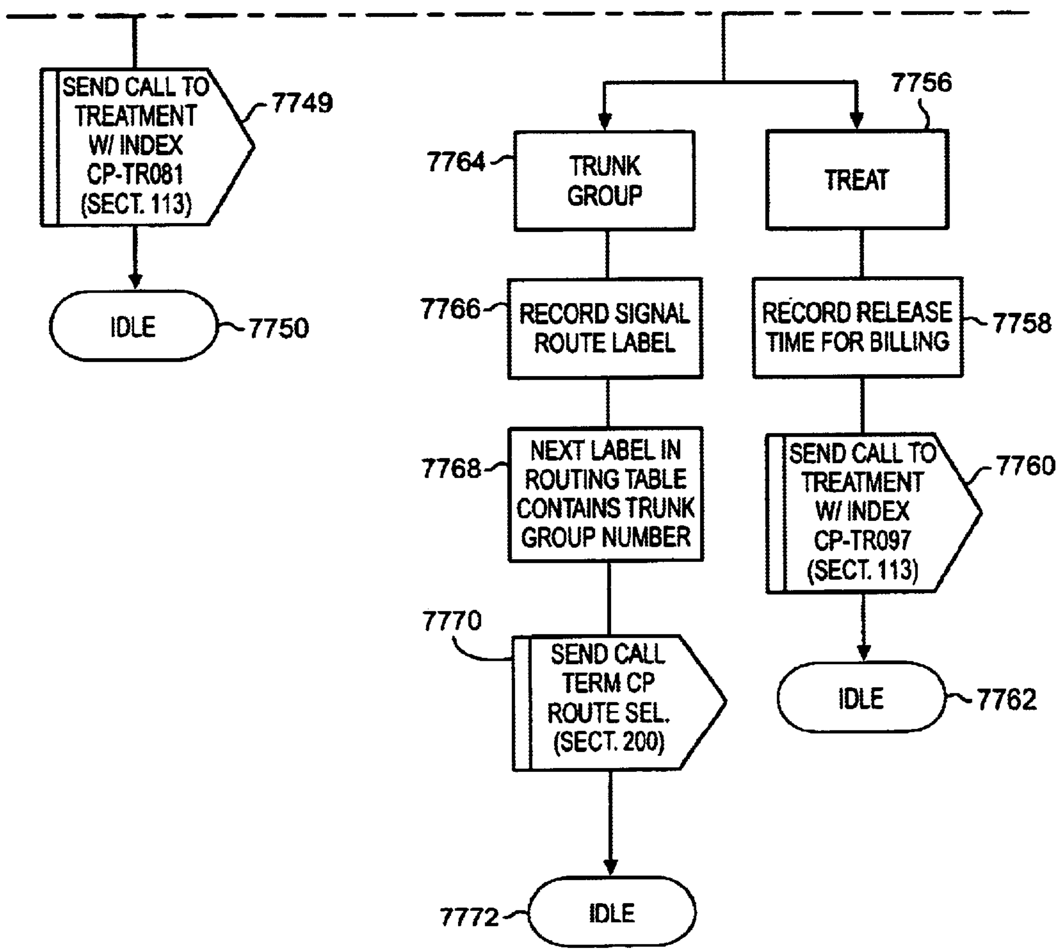

FIGS. 83A–83B depict the processing for the routing table. The process is idle at 7734. An incoming call is received from the previous next function at 7736. The route counter is set to 1 at 7738. The routing table is checked for the label and the route number from the route counter at 7740. If a match is not found at 7742, a log is sent to maintenance at 7744. The release time is recorded for billing at 7746, and the call is sent to treatment at 7748. Idle is attained at 7750.

If a match is found at 7742, the type of next function is determined at 7752 and 7754. If the type of next function at 7754 is a treatment table at 7756, the release time is recorded for billing at 7758. The call is sent to treatment at 7760, and idle is attained at 7762.

If the type of next function at 7754 is the trunk group table at 7764, the signal route label is recorded at 7766. The next label in the routing table contains the trunk group number at 7768. The call is sent to the termination call process route selection at 7770, and idle is attained at 7772.

At step 7774, the call goes to the route number indicated by the route counter. If the route member does not exist at 7776, a log is sent to maintenance at 7744. The release time is recorded for billing at 7746, and the call is sent to treatment at 7748. Idle is attained at 7750.

If the route number exists at 7776, the process continues at step 7752 and 7754 to determine the next function type.

If the next function type is the treatment table at 7756, the release time is recorded for billing at 7758. The call is sent to treatment at 7760, and idle is attained at 7762. If the next function type is the trunk group table at 7764, the signal route label is recorded at 7766. The next label in the routing table contains the trunk group number at 7768, and the call is sent to the termination call process route selection at 7770. Idle is attained at 7772.

Trunk Group Class of Service Table

Figure 84A:
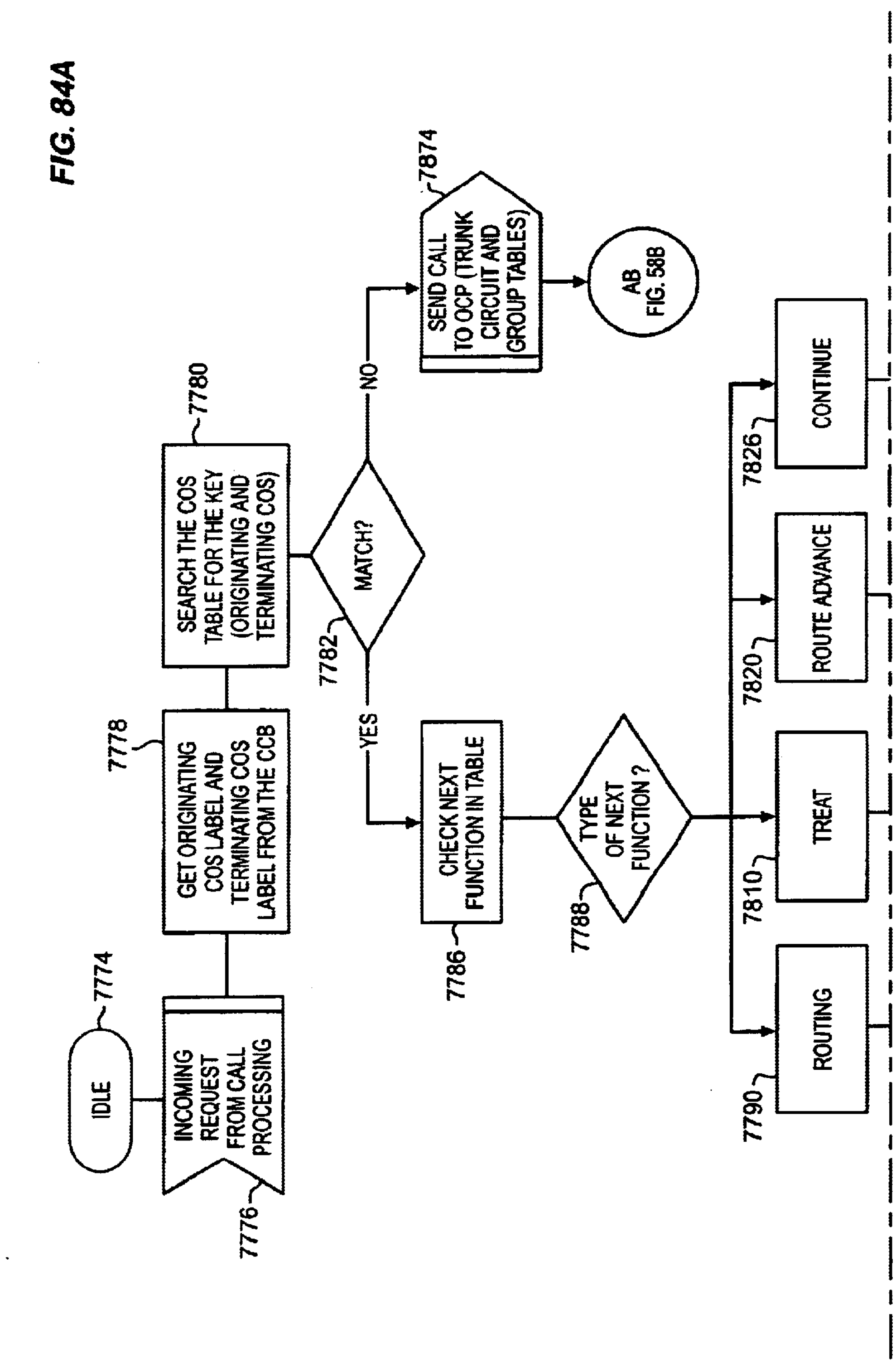
FIGS. 84A–84B are SDL diagram of logic used in a version of the invention for trunk group class of service table processing.
Figure 84B:
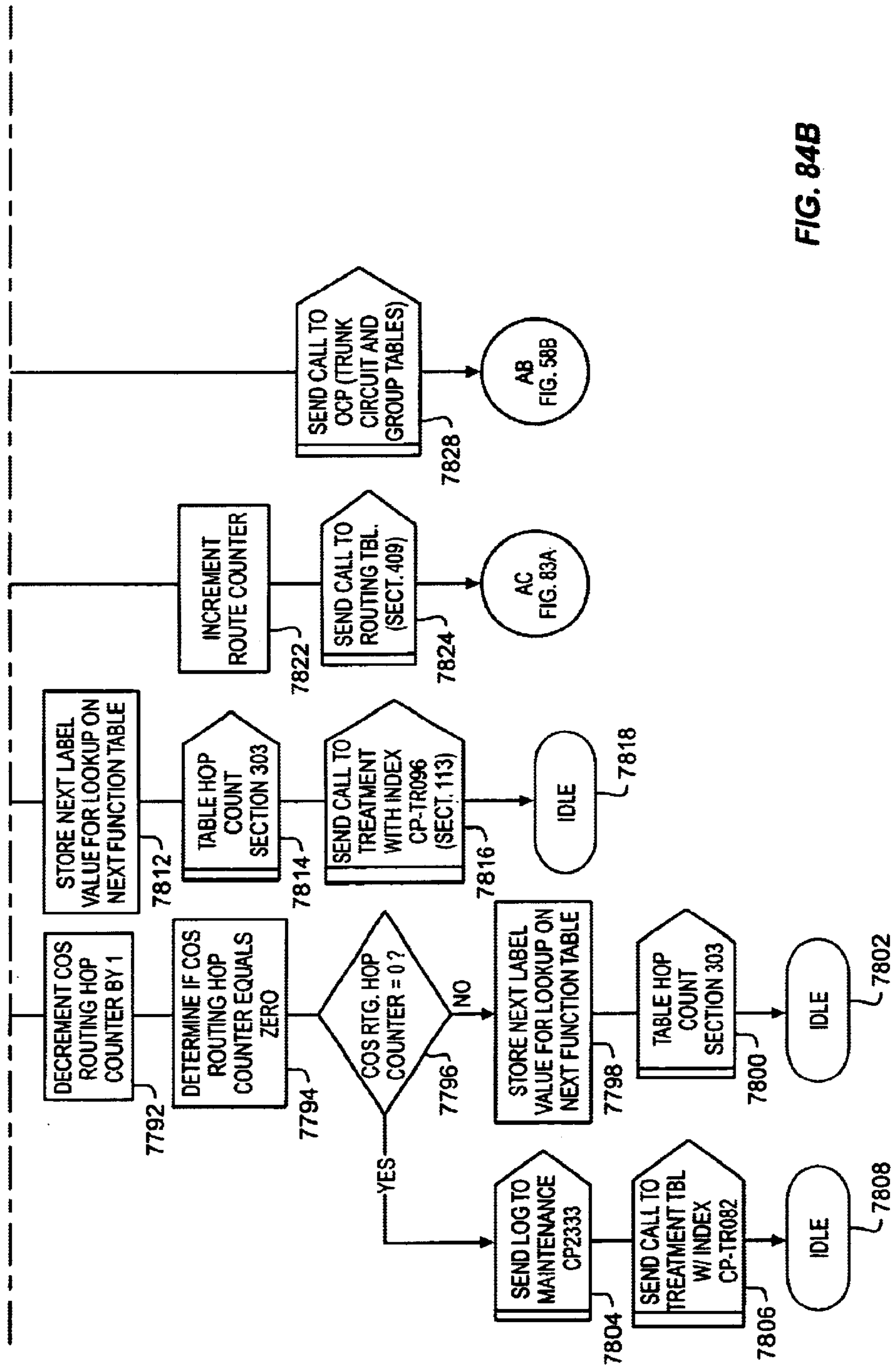

FIGS. 84A–84B depict the processing for the trunk group class of service table. The process is idle at 7774. An incoming request is received from call processing at 7776. The originating class of service (COS) label and the terminating COS label are obtained from the CIB at 7778. The COS table is searched for the key, including the originating COS and the terminating COS, at 7780. If a match is not found at 7782, the call is sent to the origination call process (OCP) for the trunk circuit table and the trunk group table at 7784. The process then continues with step 4660. If a match is found at 7782, the next function in the table is checked at 7786 and 7788.

If the type of the next function at 7788 is routing at 7790, the COS routing hop counter is decremented by 1 at 7792. It is determined if the COS routing hop counter equals 0 at 7794. For each new call, the COS routing hop counter is set to two. If the COS routing hop counter is not equal to 0 at 7796, the next label value is stored for look up on the next function table at 7798. The table hop count process is started at 7800, and idle is attained at 7802. If the COS routing hop counter is equal to 0 at 7796, a log is sent to maintenance at 7804. The call is sent to the treatment table at 7806, and idle is attained at 7808.

If the type of next function at 7788 is treatment at 7810, the next label value is stored for look up on the next function table at 7812. The table hop count process is started at 7814, and the call is sent to treatment at 7816. Idle is attained at 7818.

If the type of next function at 7788 is route advance at 7820, the route counter is incremented at 7822. Thus, the current trunk group is skipped, and the process goes to the next route in the routing list. The call is sent to the routing table at 7824, and the process continues at step 7774.

If the type of next function at 7888 is continue at 7826, the next label field is blank. Therefore, the call is sent to the OCP for the trunk circuit table and the trunk group table at 7828. The process then continues at step 4660.

Percent Table

Figure 85:
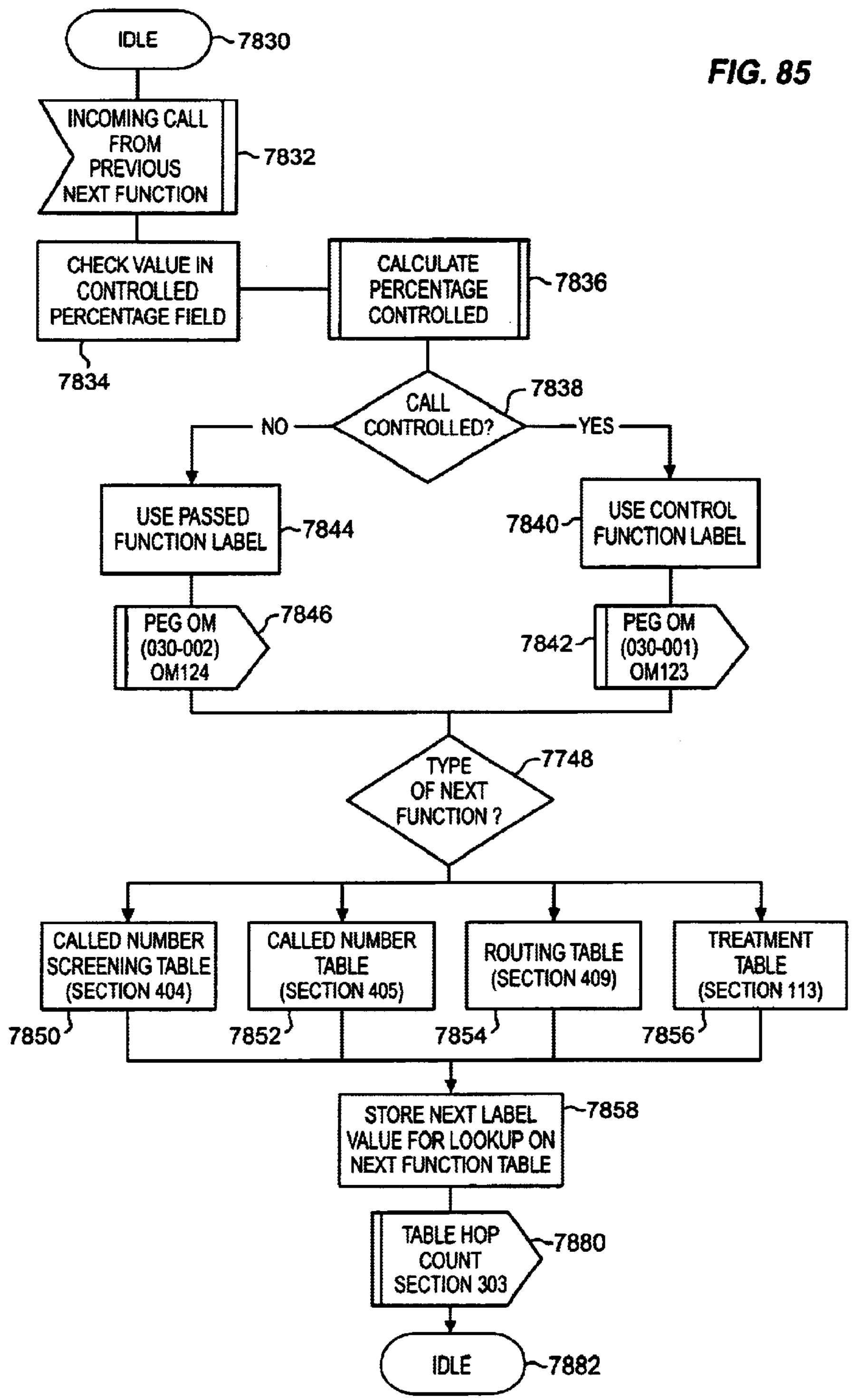
FIG. 85 is an SDL diagram of logic used in a version of the invention for percent table processing.

FIG. 85 depicts the processing for the percent table. The process is idle at 7830. An incoming call is received from the previous next function at 7832. The value in the controlled percentage field is checked at 7834. The percentage of calls that are controlled are calculated at 7836. If this call is controlled at 7838, the control function label is used at 7840, and the OM is pegged at 7842. If this call is not controlled at 7838, the passed function is used at 7844, and the OM is pegged at 7846.

After the OM is pegged at either step 7842 or step 7846, the type of next function is determined at 7248. If the type of next function at 7848 is the called number screening table at 7850, the called number table at 7852, the routing table at 7854, or the treatment table at 7856, the next label value is stored for look up on the next function table at 7858. The table hop count process is started at 7860, and idle is attained at 7862.

Call Rate Table

Figure 86:
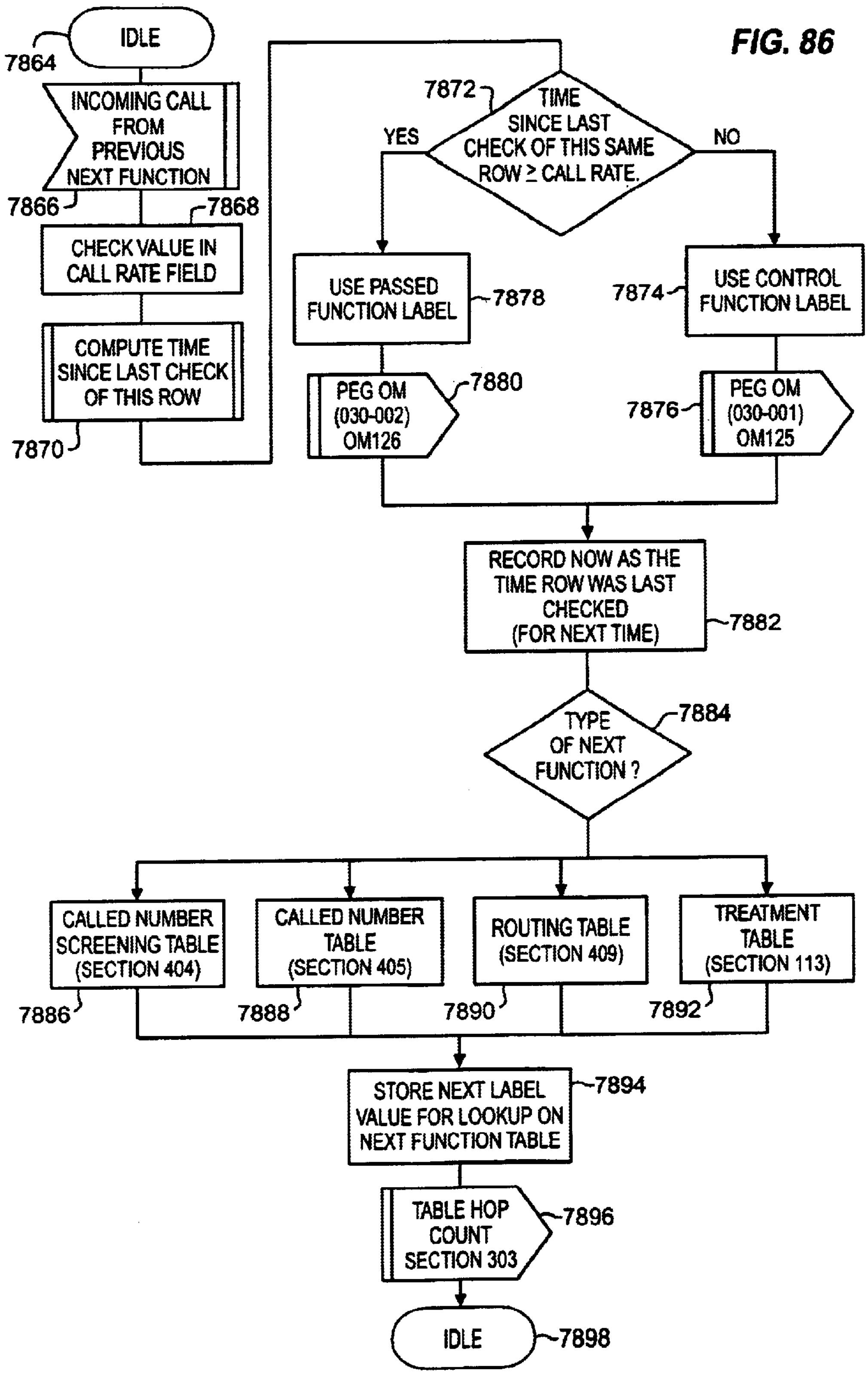
FIG. 86 is an SDL diagram of logic used in a version of the invention for call rate table processing.
Figure 87A:
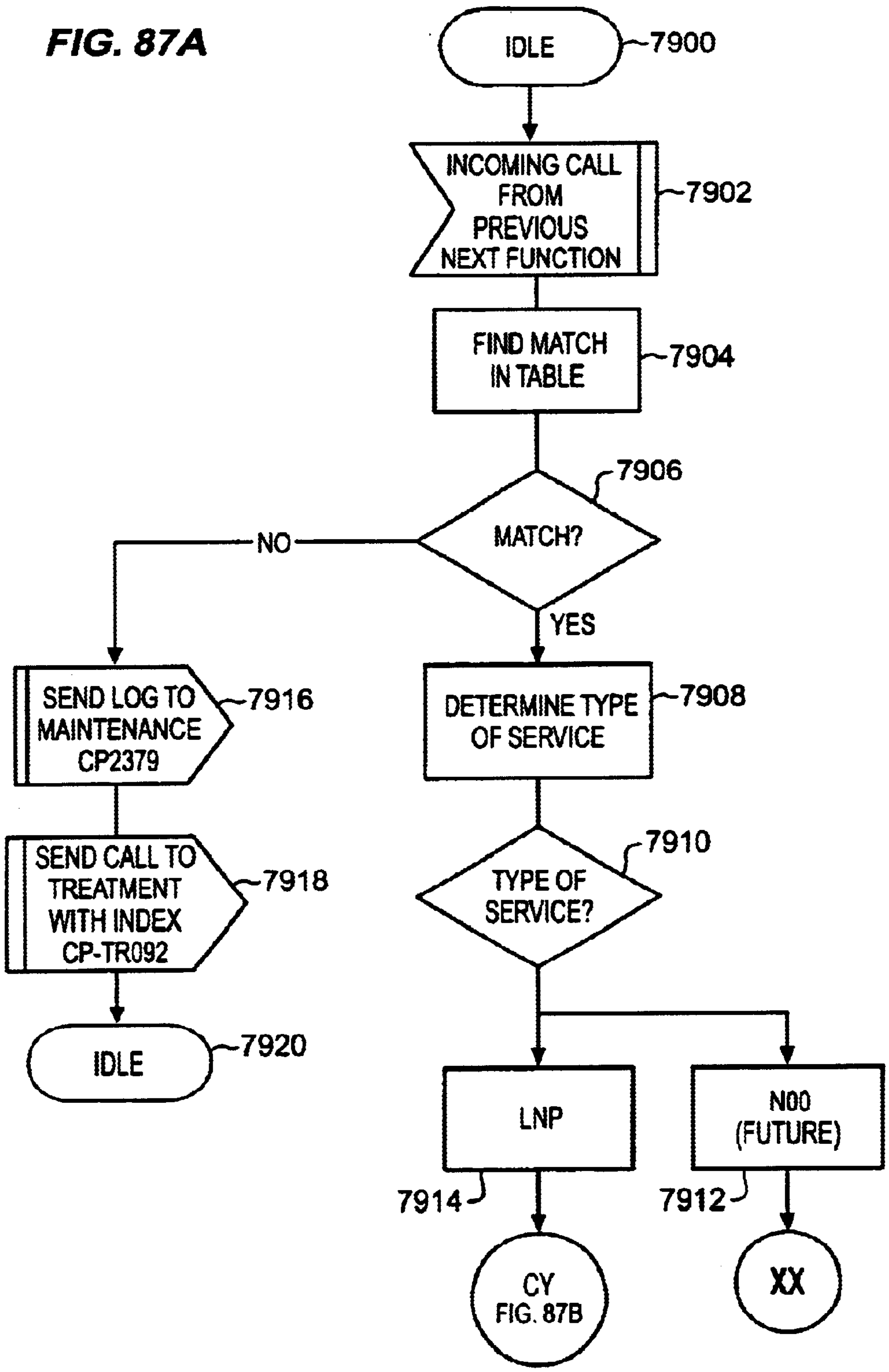
FIGS. 87A–87F are SDL diagrams of logic used in a version of the invention for database services table processing.
Figure 87B:
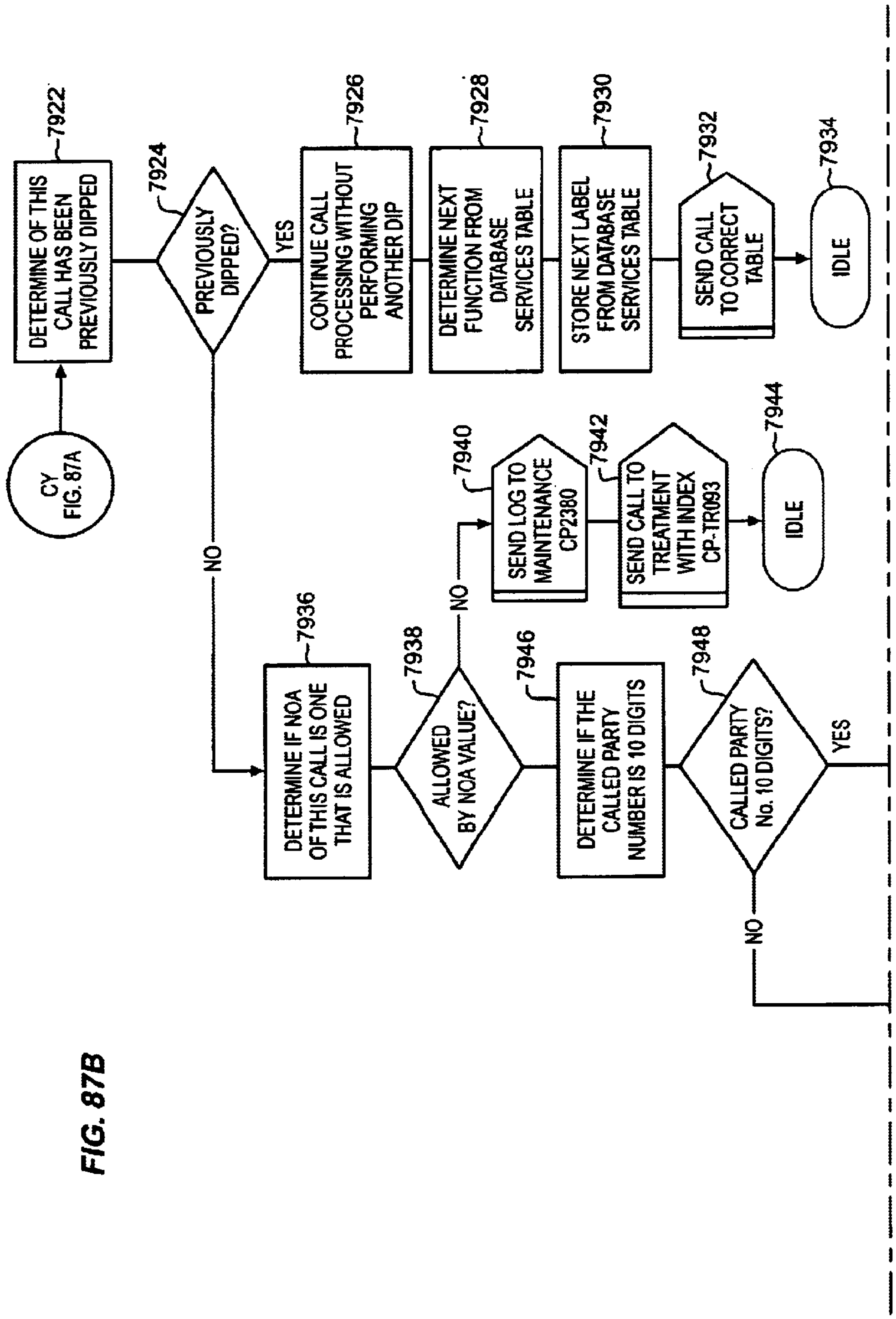
Figure 87C:
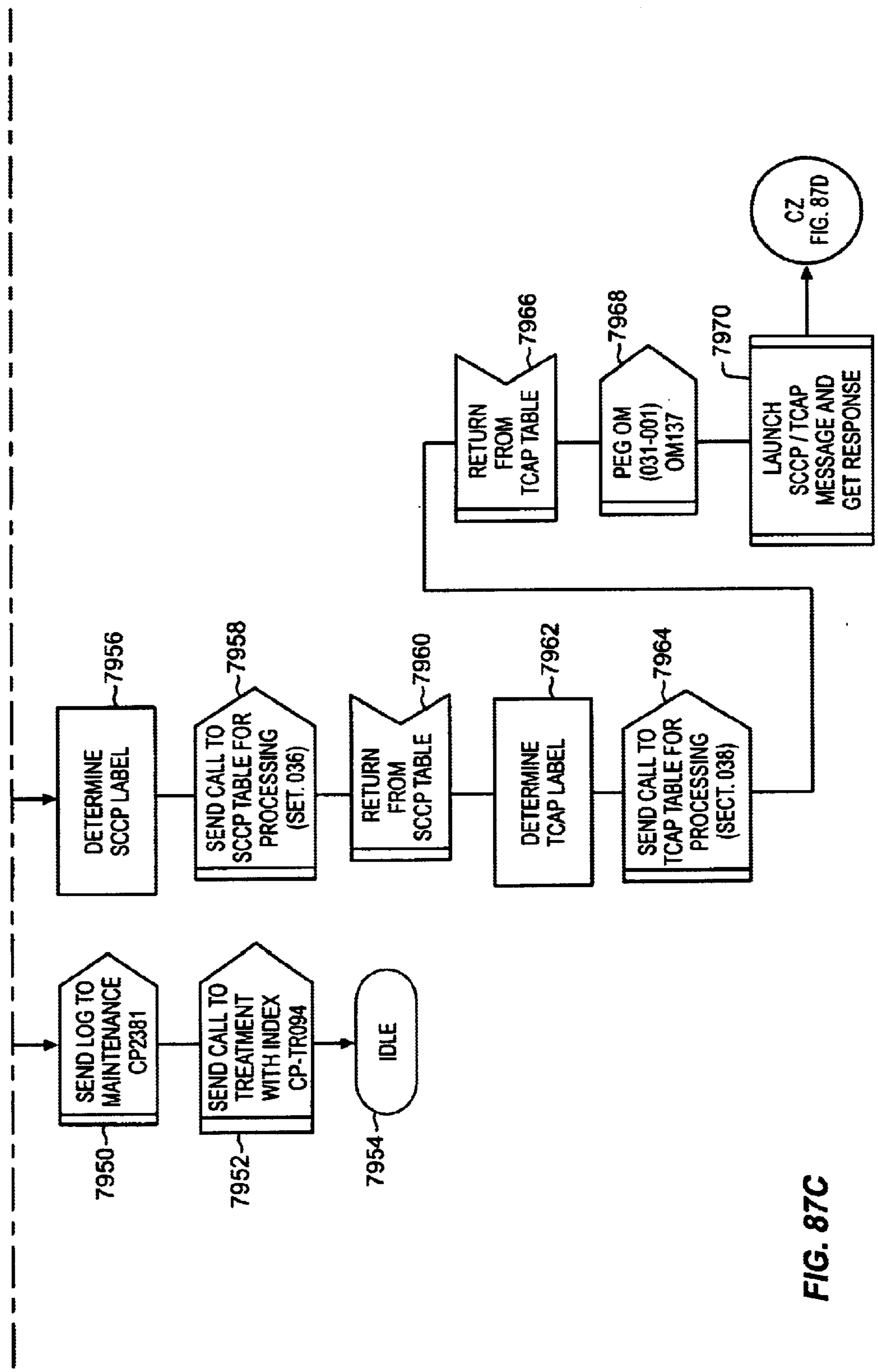
Figure 87D:
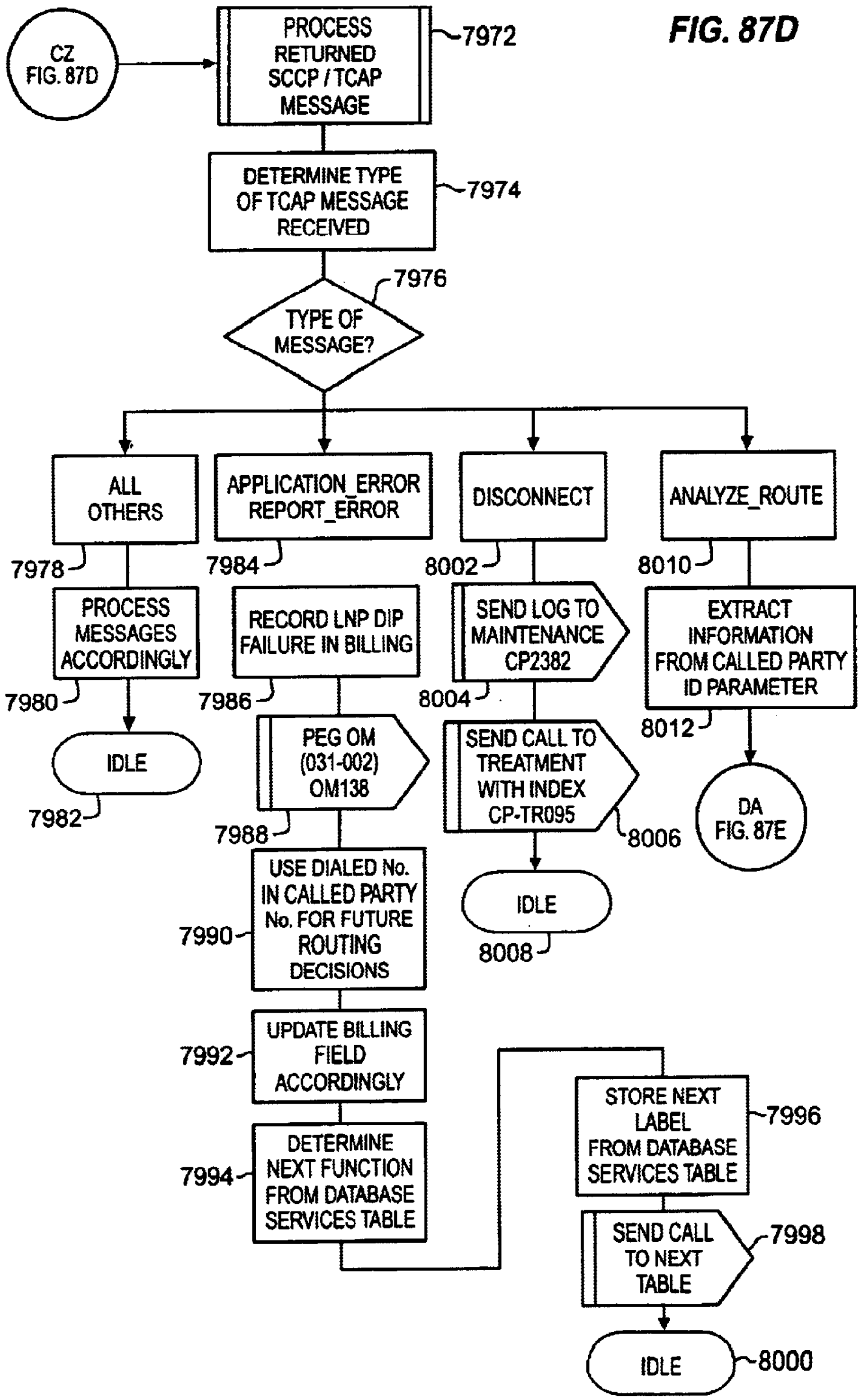
Figure 87E:
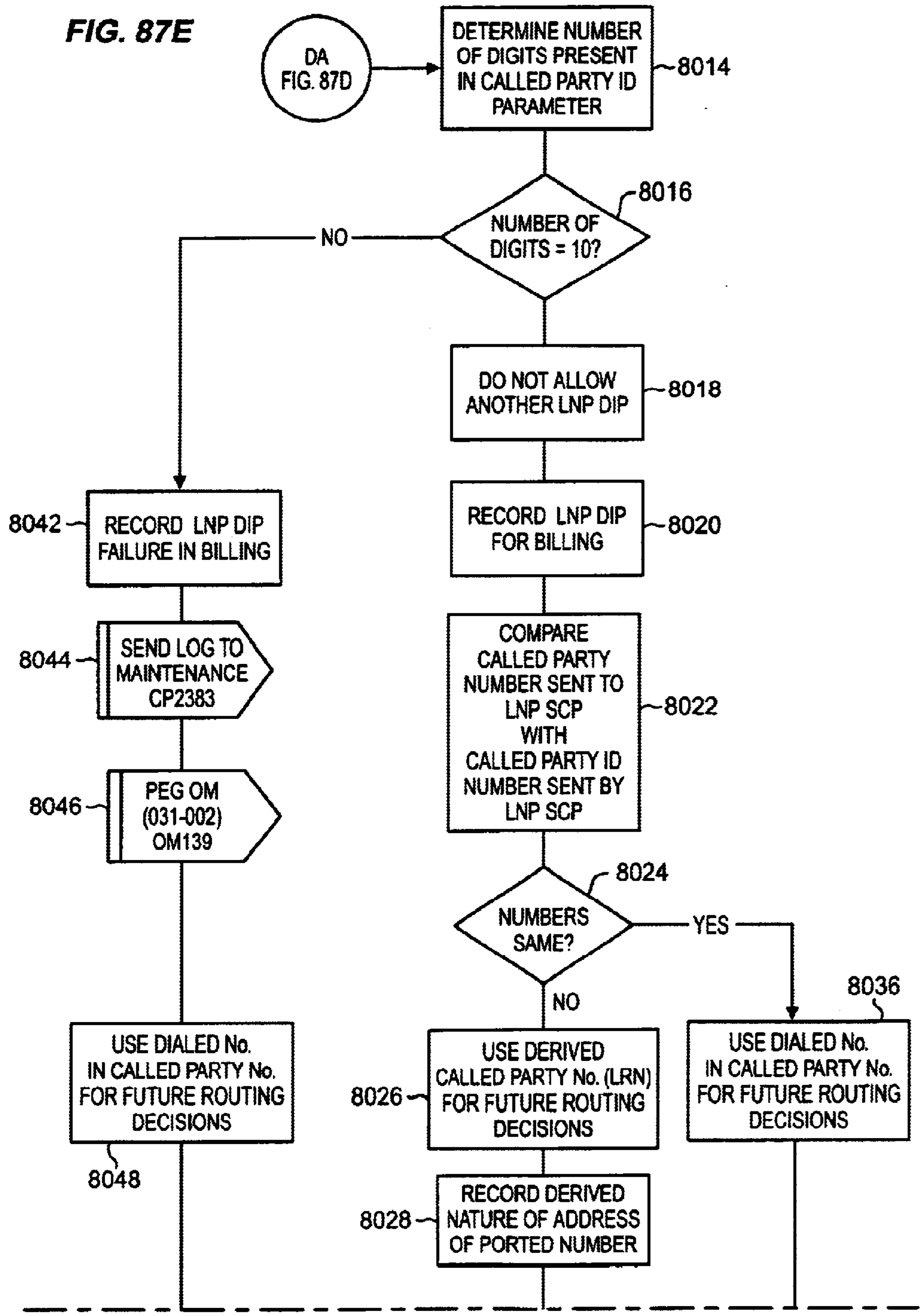
Figure 87F:
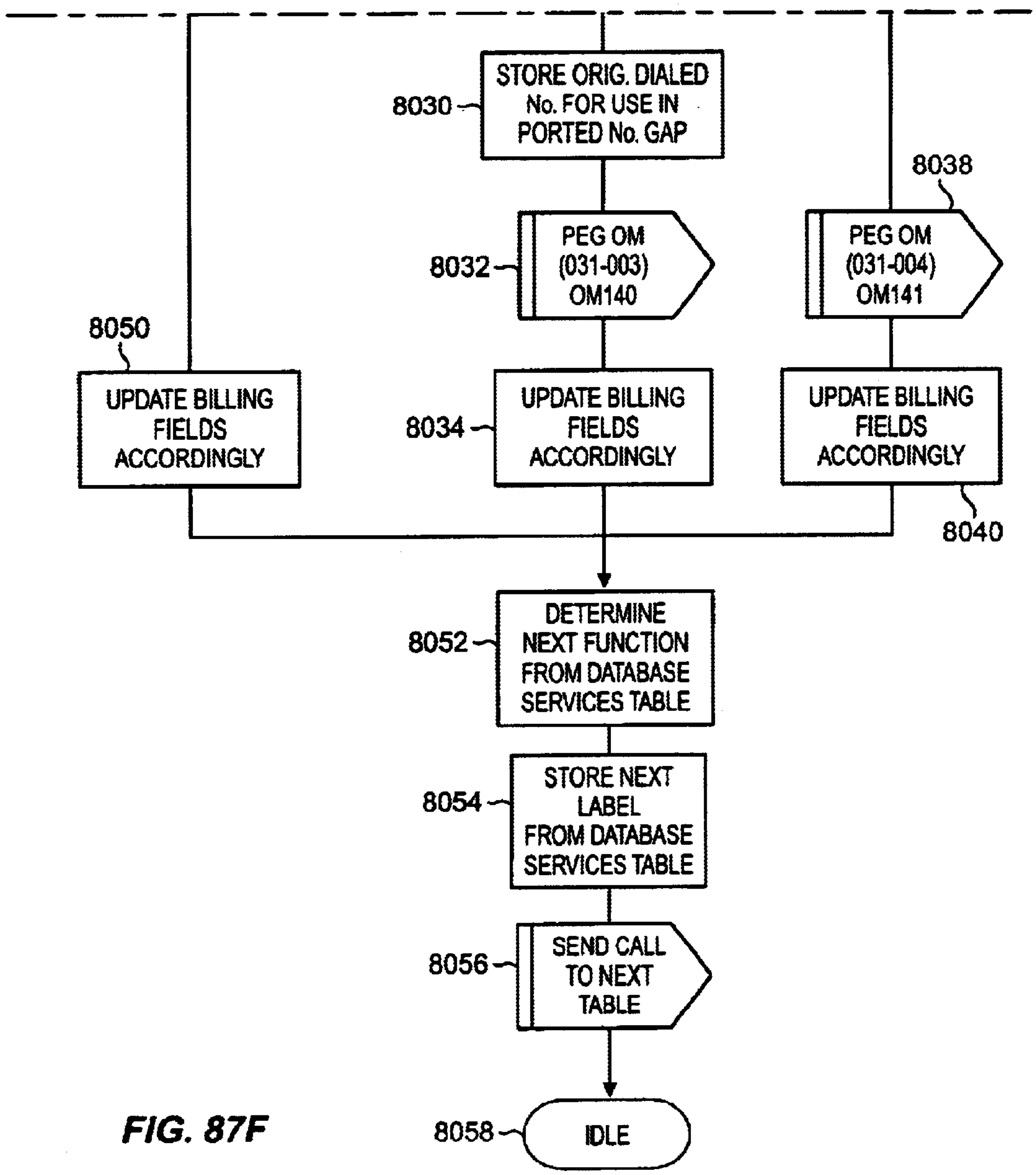

FIG. 86 depicts processing for the call rate table. The process is idle at 7864. An incoming call is received from a previous next function at 7866. The value in the call rate field is checked at 7868 and the time since the last check of this row in the table is computed at 7870. If the time since the last check of this table row is not greater than or equal to the call rate at 7872, the control function label is used at 7874. The OM is pegged at 7876. If the time since the last check of this same table row is greater than or equal to the call rate at 7872, the passed function label is used at 7878. The OM is pegged at 7880.

After step 7876 or step 7880, the current time is recorded as the time that the table row was last checked at 7882. The type of next function is determined at 7884. If the type of next function at 7884 is the called number screening table at 7886, the called number table at 7888, the routing table at 7890, or the treatment table at 7892, the next label value is stored for look up on the next function table at 7894. The table hop count process is started at 7896, and idle is attained at 7898.

Data Base Services Table

FIGS. 87A–87E depict processing for the database services table. The process is idle at 7900. An incoming call is received from the previous next function at 7902. The database services table is searched to find the next label at 7904. If a match is found at 7906, the type of service is determined at 7908. If the type of service at 7910 is an N00 service at 7912, the process will be implemented in the future. If the type of service at 7910 is an LNP service at 7914, the process continues at step 7922.

If a match is not found at 7906, a log is sent to maintenance at 7916. The call is sent to treatment at 7918, and idle is attained at 7920.

At step 7922, it is determined if a query has previously been made for this call to an LNP service control point (SCP) or another database containing LNP information. This query is commonly referred to as a dip. If the call has been dipped previously at 7924, the call processing is continued without performing another dip at 7926. The next function is determined from the database services table at 7928, and the next label from the database services table is stored at 7930. The call is sent to the correct table as identified from the next label from the database services table at 7932. Idle is attained at 7934.

If the call has been dipped previously at 7924, it is determined if the nature of address (NOA) of this call is one that is allowed for call processing at 7936. The NOAs that are allowed are the national number and the test call. If the NOA value is not allowed at 7938, a log is sent to maintenance at 7940. The call is sent to treatment at 7942, and idle is attained at 7944. If the NOA is allowed at 7938, it is determined if the called party number is ten digits at 7946 and 7948.

If the called party number is not ten digits at 7948, a log is sent to maintenance at 7950. The call is sent to treatment at 7952, and idle is attained at 7954.

If the called party number is ten digits at 7948, the SCCP label is determined at 7956. The call is sent to the SCCP table for processing at 7958, and returns from the SCCP table at 7960. The TCAP label is determined at 7962. The call is sent to the TCAP table for processing at 7964, and returns from the TCAP table at 7966. The OM is pegged at 7968 for LNP queries initiated. The SCCP/TCAP message is launched, and a response is obtained at 7970.

The process returns from the SCCP/TCAP message process at 7972. The type of TCAP message that was received is determined at 7974. If the type of message at 7976 is anything other than, an application error, a report error, a disconnect, or an analyze route at 7978, the messages are processed accordingly at 7980. Idle is attained at 7982.

If the type of message at 7976 is an application_error or a report_error at 7984, the LNP dip failure is recorded in billing at 7986. The OM for the LNP query failure is pegged at 7988. The dialed number in the called party number is used for future routing decisions at 7990, and the billing fields are updated accordingly at 7992. The next function is determined from the database services table at 7994, and the next label from the database services table is stored at 7996. The call is sent to the next table as identified from the next label at 7998. Idle is attained at 8000.

If the type of message at 7976 is a disconnect at 8002, the log is sent to maintenance at 8004. The call is sent to treatment at 8006, and idle is attained at 8008.

If the type of message at 7976 is an analyze_route at 8010, information is extracted from the called party ID parameter at 8012. The process then continues at step 8014.

The number of digits that are present in the called party ID parameter are determined at 8014. If the number of digits is equal to 10 at 8016, another LNP dip is not allowed at 8018. The LNP dip is recorded for billing at 8020. The called party number that was sent to the LNP SCP is compared with the called party ID number sent by the LNP SCP at 8022. If the numbers are not the same at 8024, then the call has been dipped, and the called number is a ported number. The derived called party number (i.e. the LRN) is used for future routing decisions at 8026, and the derived NOA of the ported number is recorded at 8028. The original dialed number is stored for use in the ported numbered GAP at 8030. The OM is pegged at 8032, and the billing fields are updated accordingly at 8034.

If the numbers are the same at 8024, then the call has been dipped, and the called number is not a ported number. The dialed number in the called party number is used for future routing decisions at 8036. The OM is pegged at 8038, and the billing fields are updated accordingly at 8040.

If the number of the digits is not equal to 10 at 8016, the LNP dip failure is recorded for billing at 8042. A log is sent to maintenance at 8044, and the OM is pegged at 8046. The dialed number in the called party number parameter is used for future routing decisions at 8048, and the billing fields are updated accordingly.

After steps 8034, 8040, or 8050, the next function is determined from the database services table at 8052. The next label from the database services table is stored at 8054. The call is sent to the next table based upon the next label at 8056, and idle is attained at 8058.

Message Mapping Table

Figure 88A:
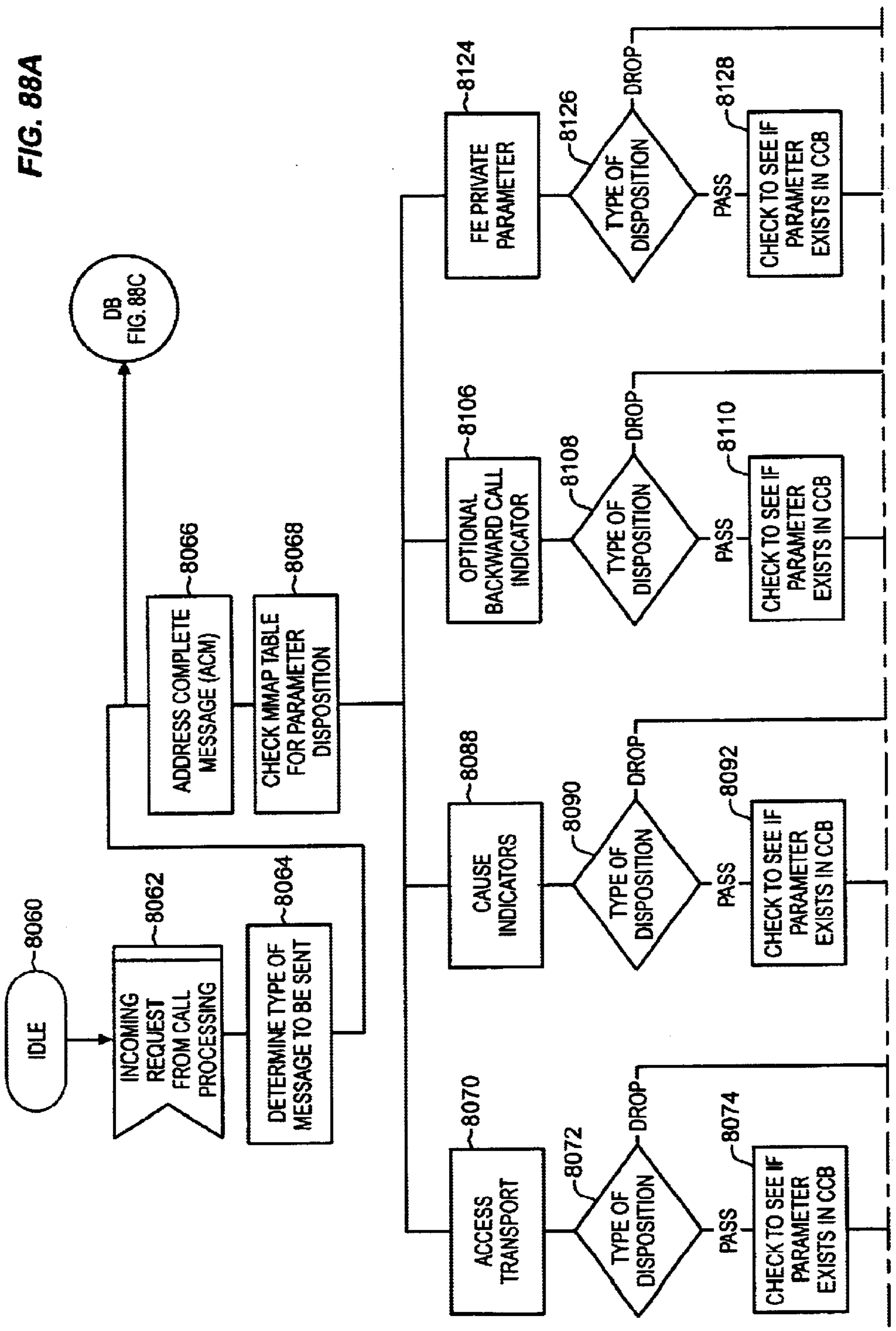
FIGS. 88A–88Z are SDL diagrams of logic used in a version of the invention for message mapping table processing.
Figure 88B:
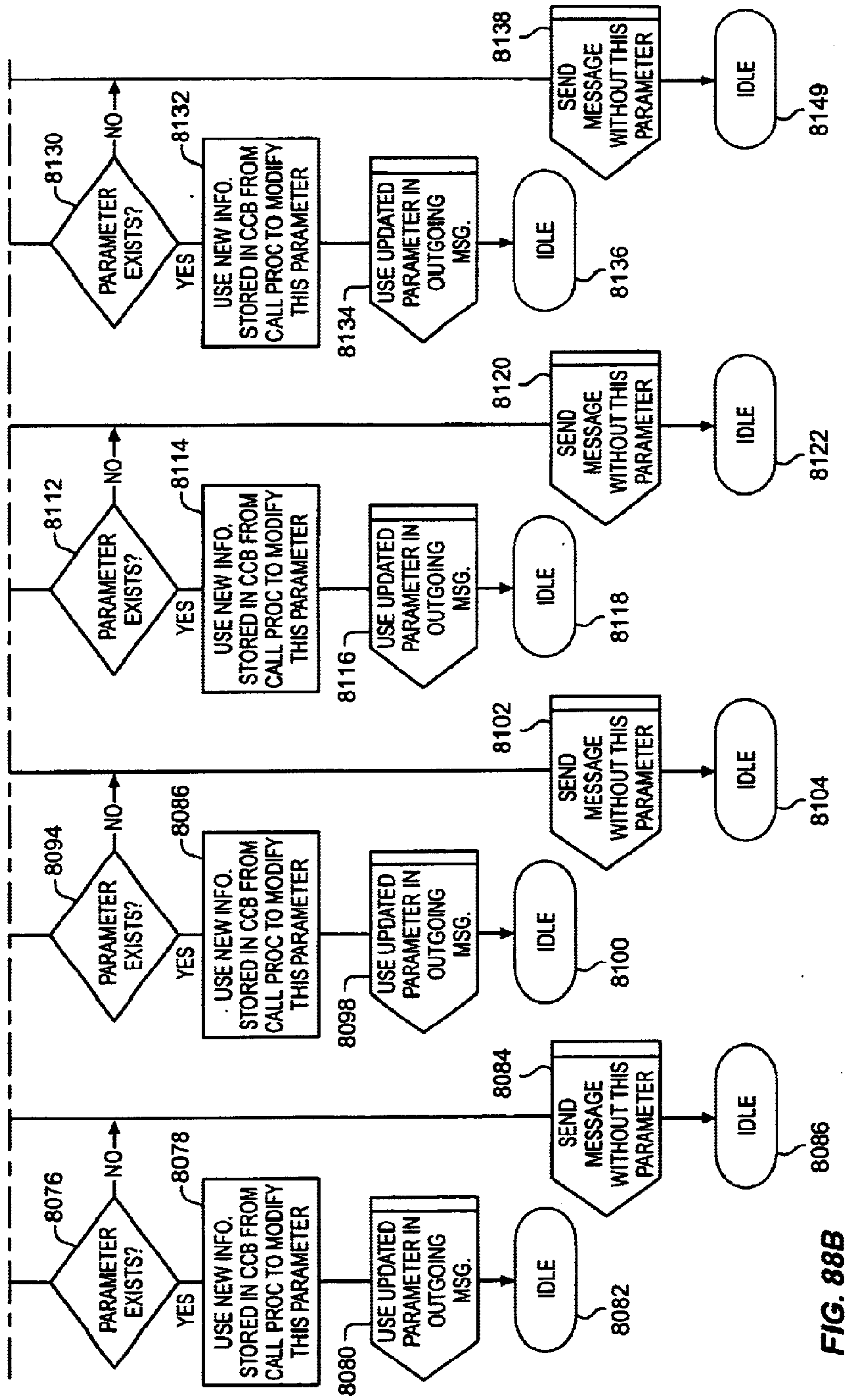
Figure 88C:
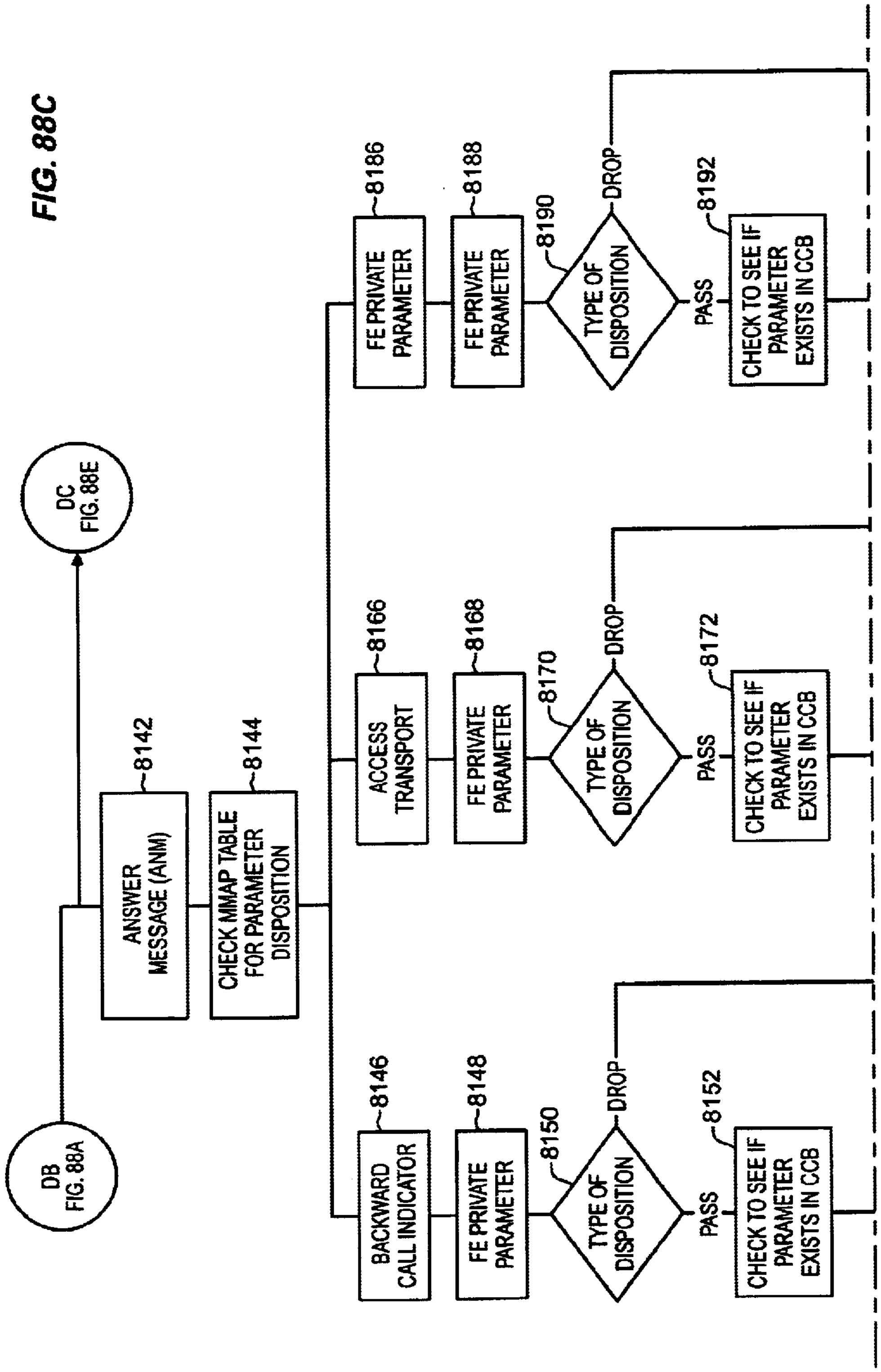
Figure 88D:
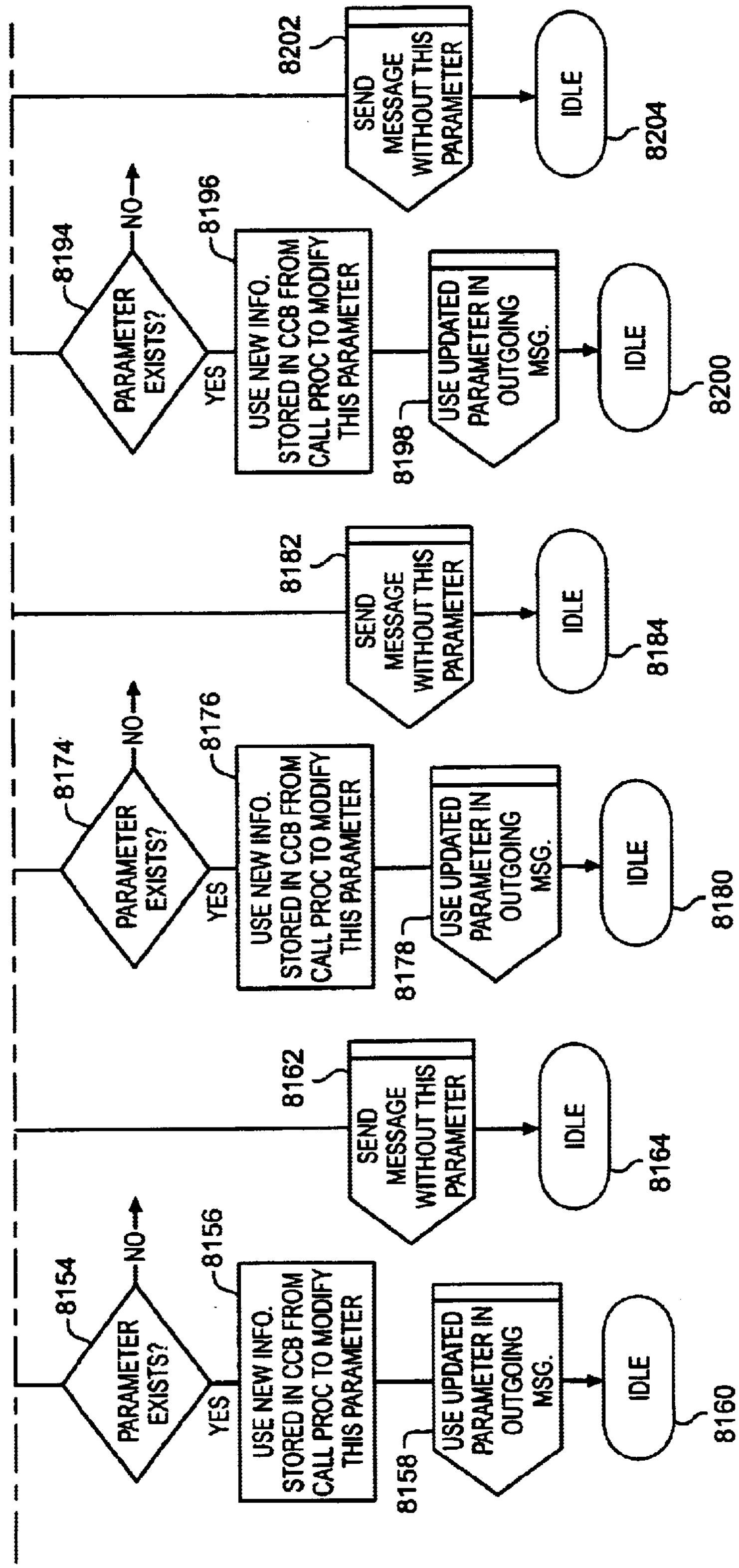
Figure 88E:
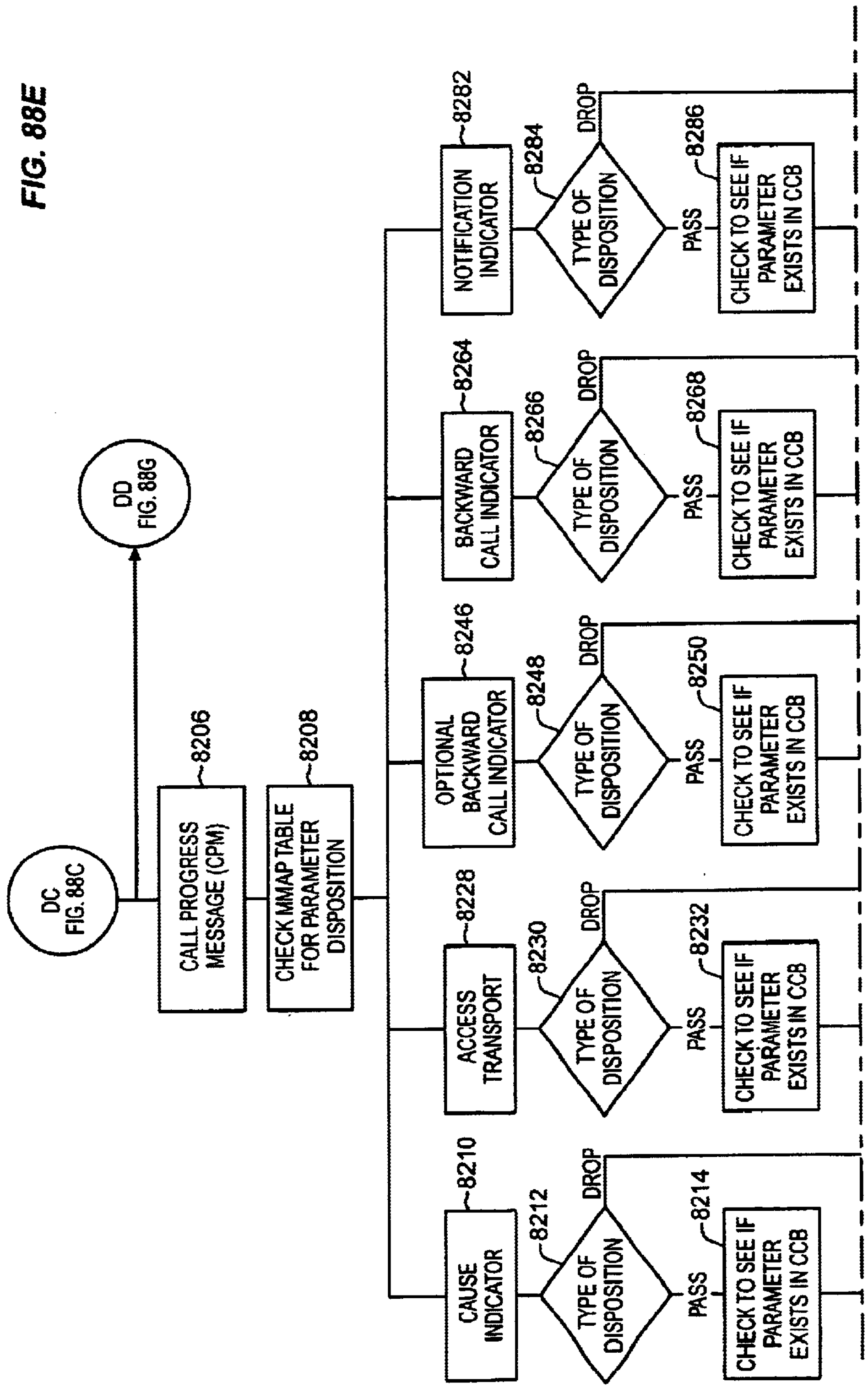
Figure 88F:
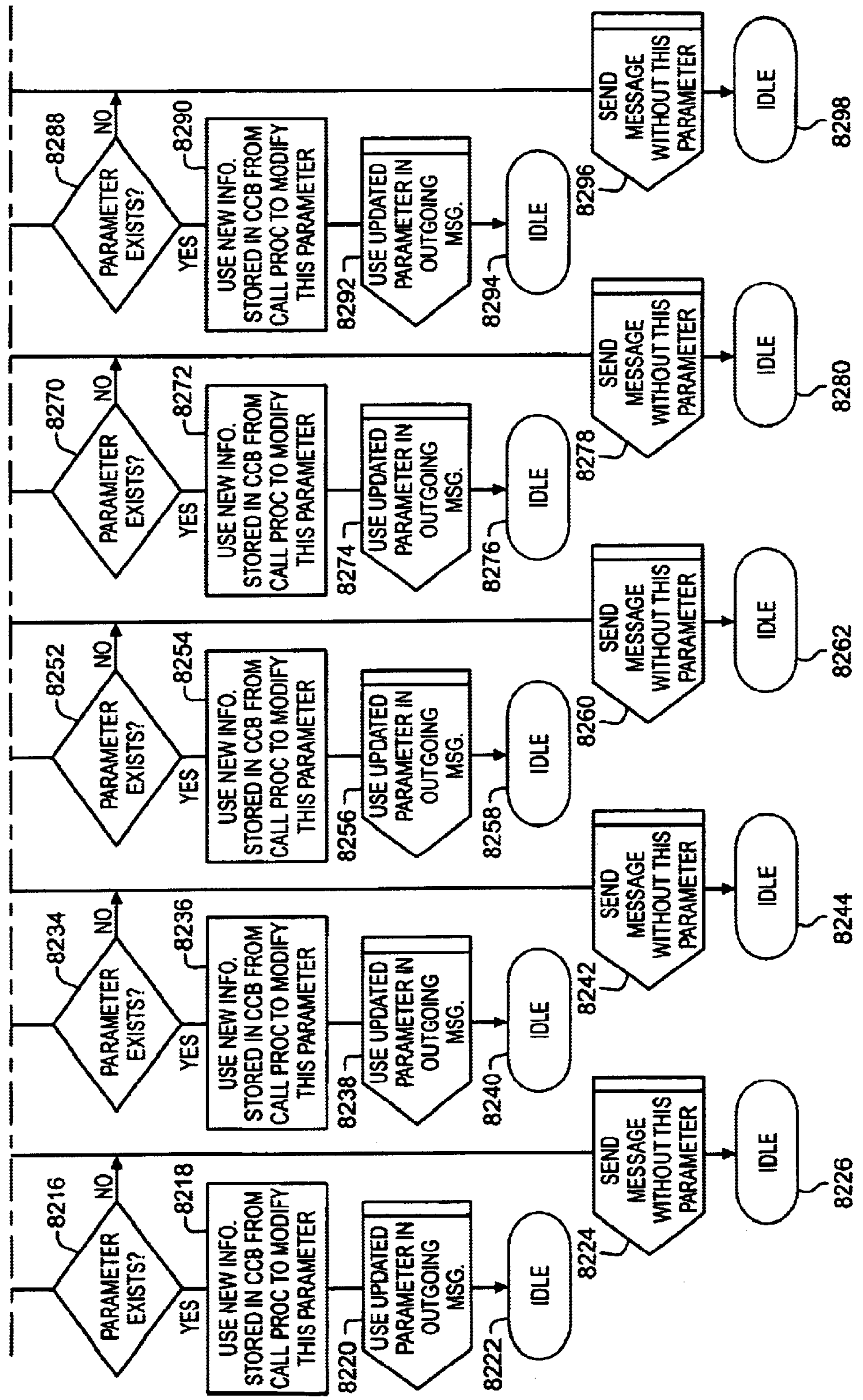
Figure 88G:
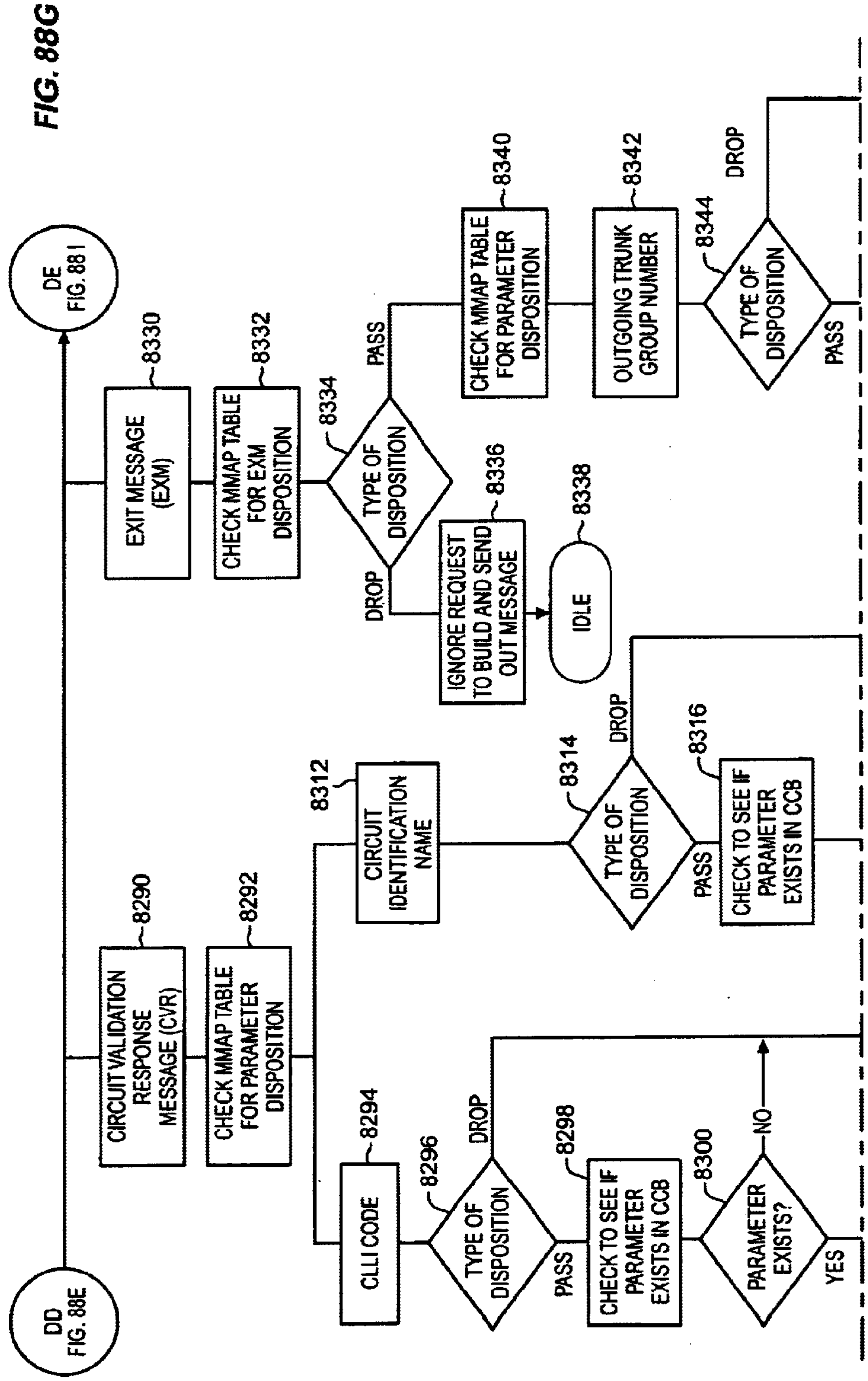
Figure 88H:
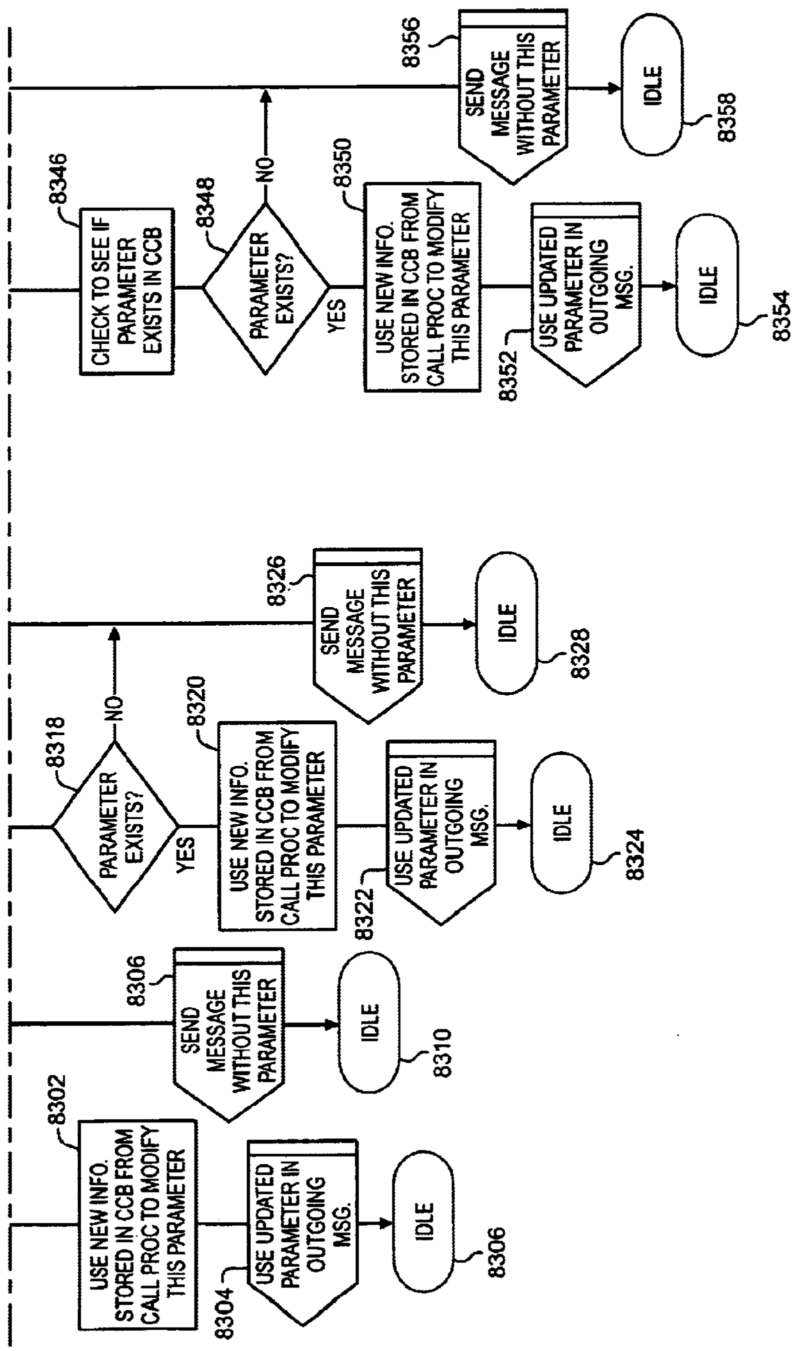
Figure 88:
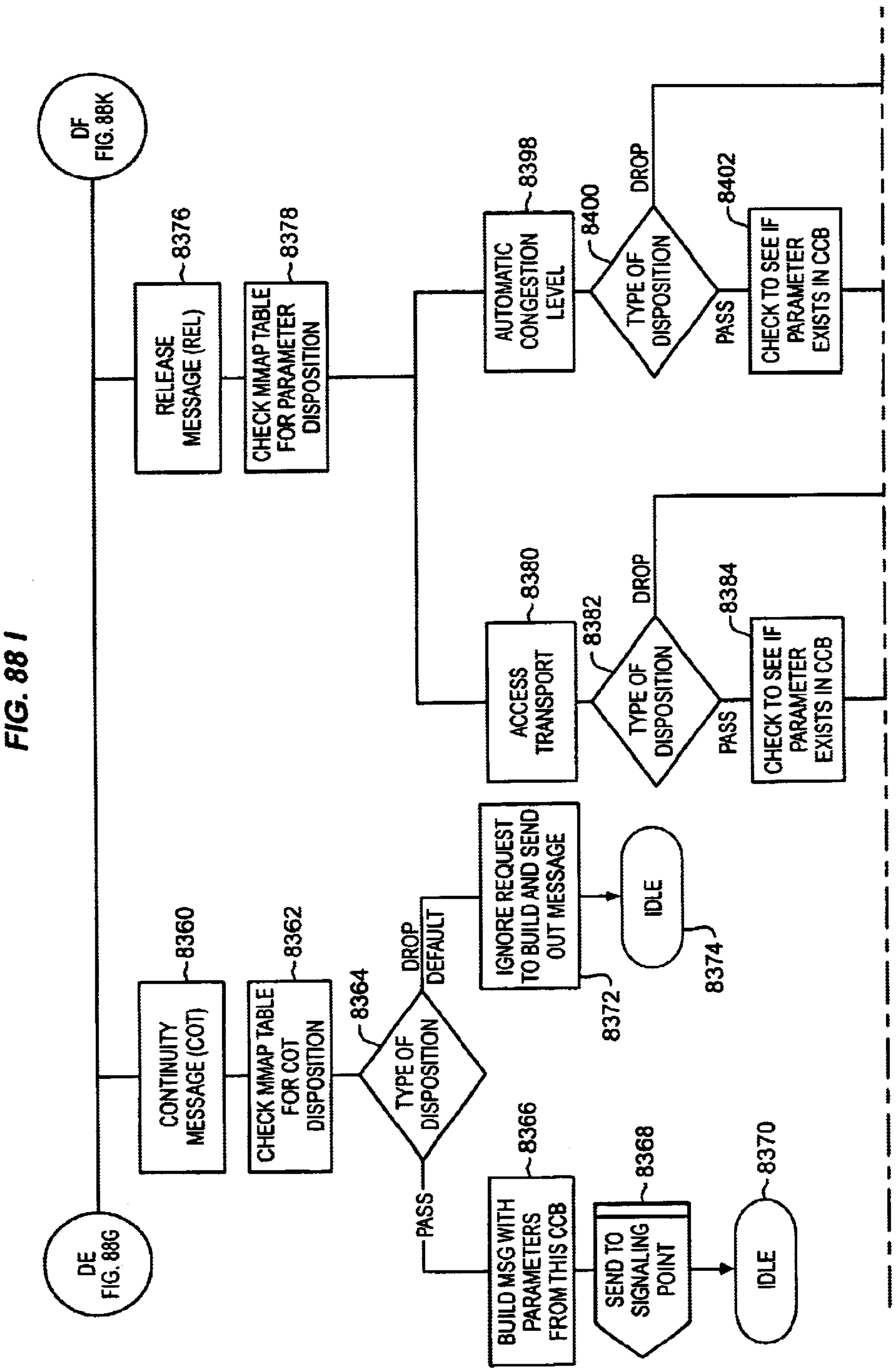
Figure 88J:
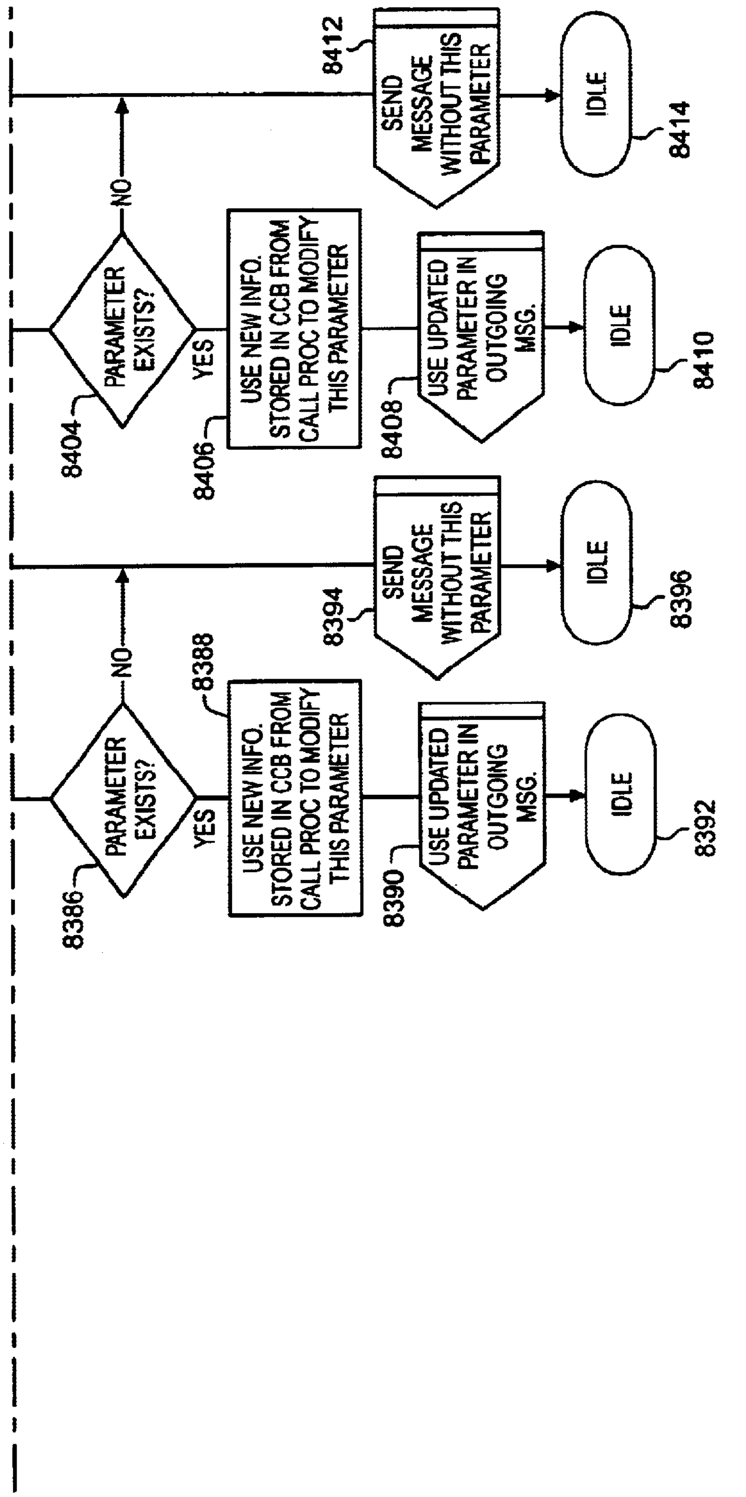
Figure 88K:
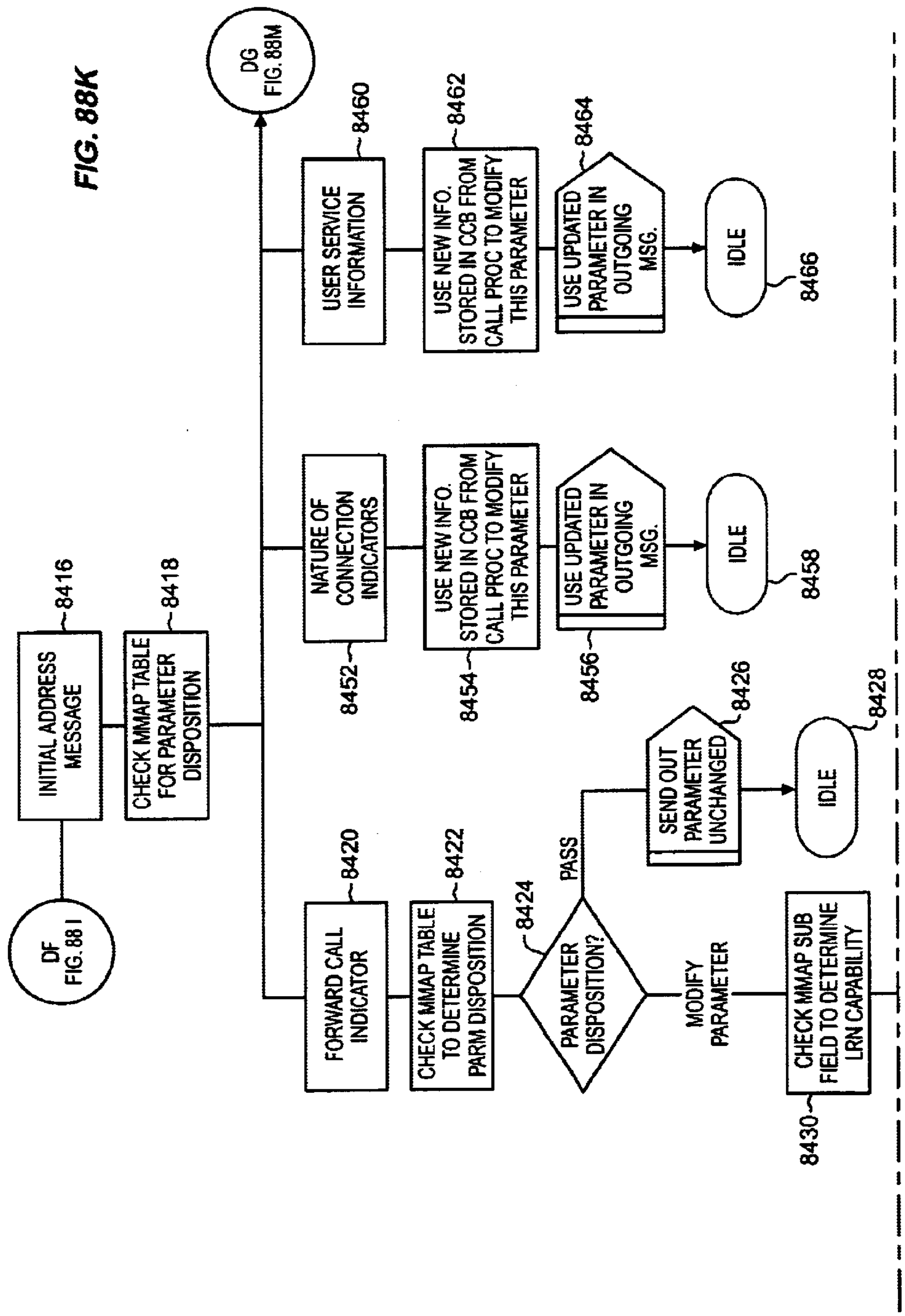
Figure 88L:
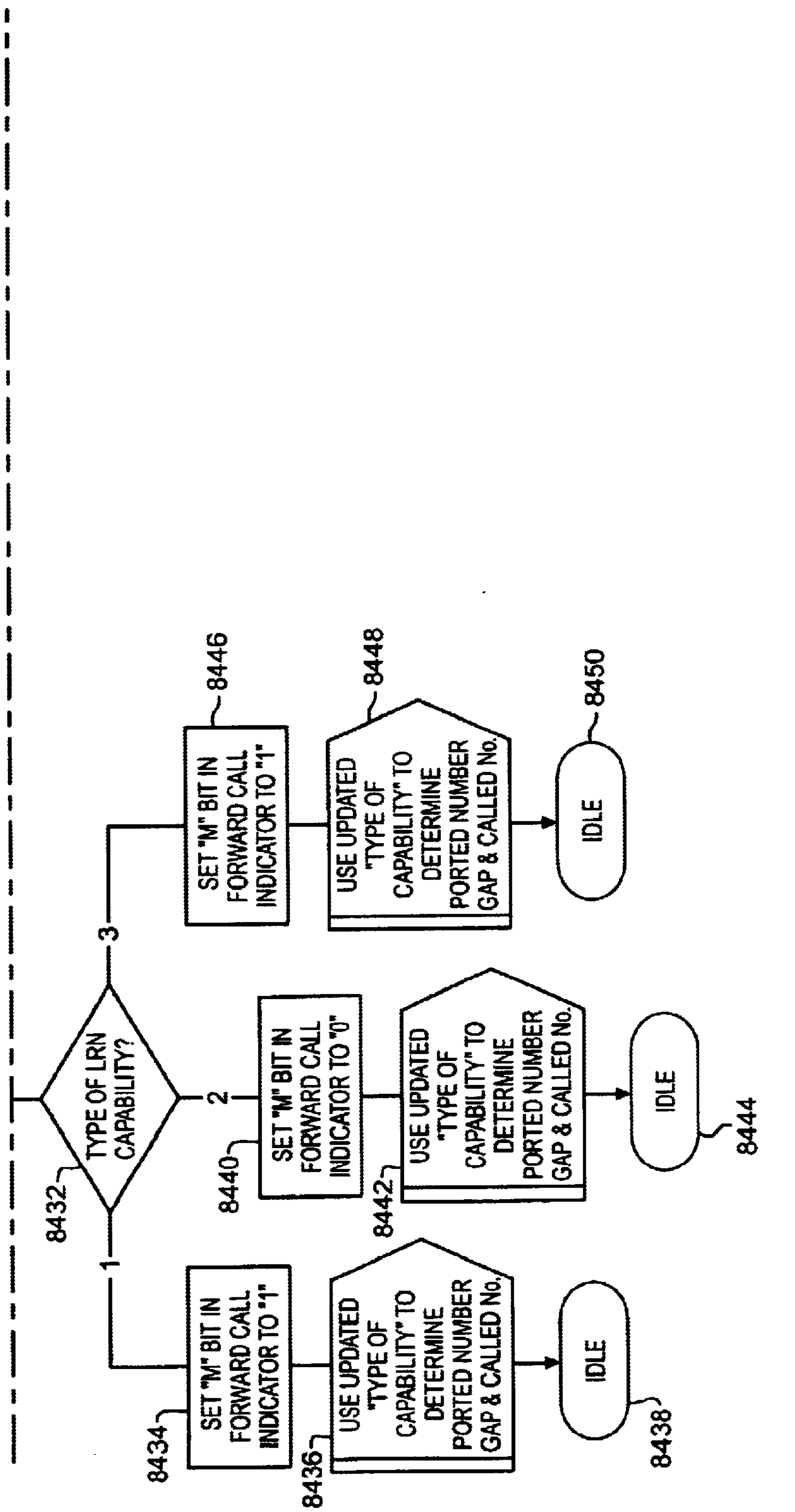
Figure 88M:
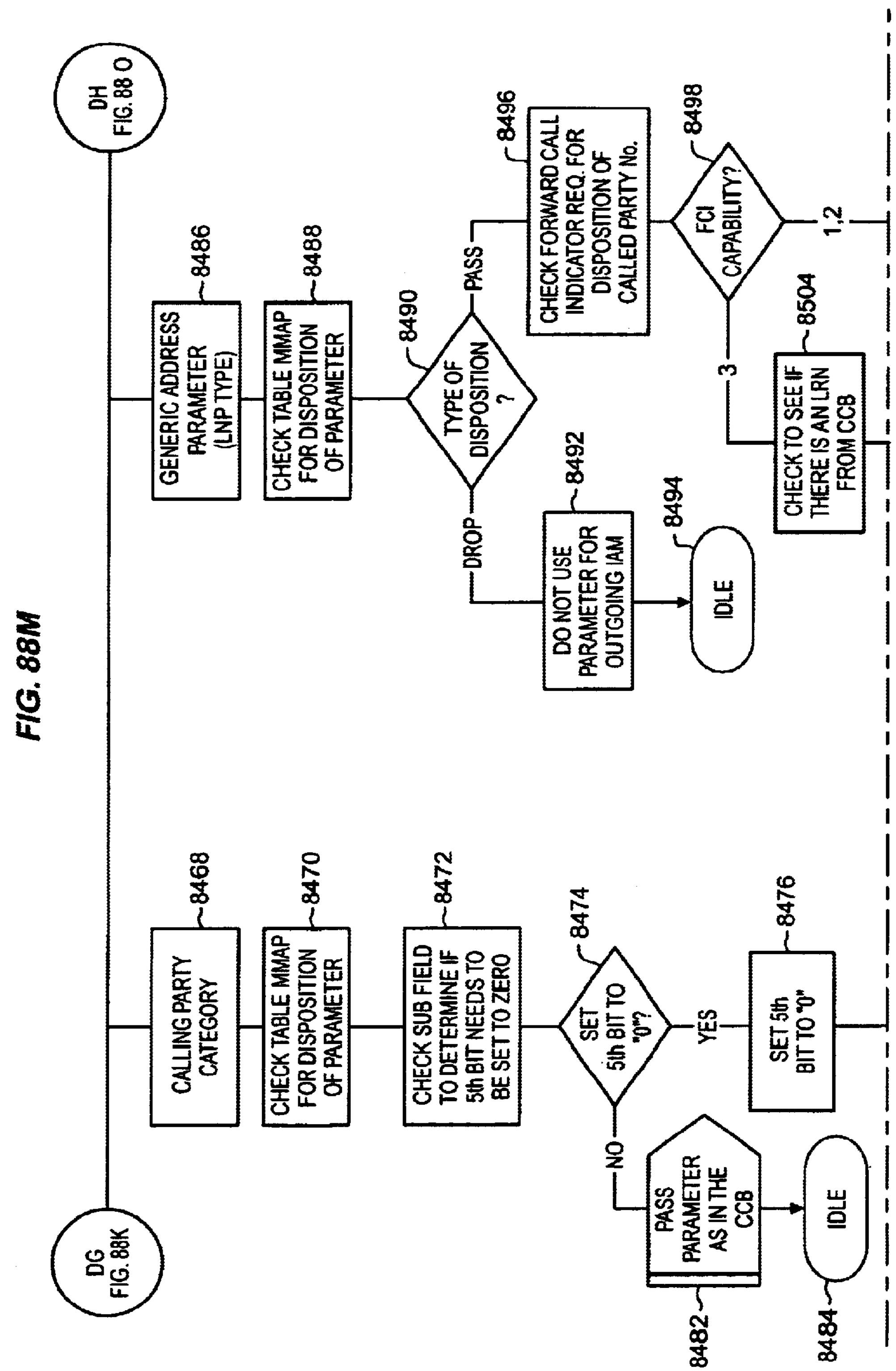
Figure 88N:
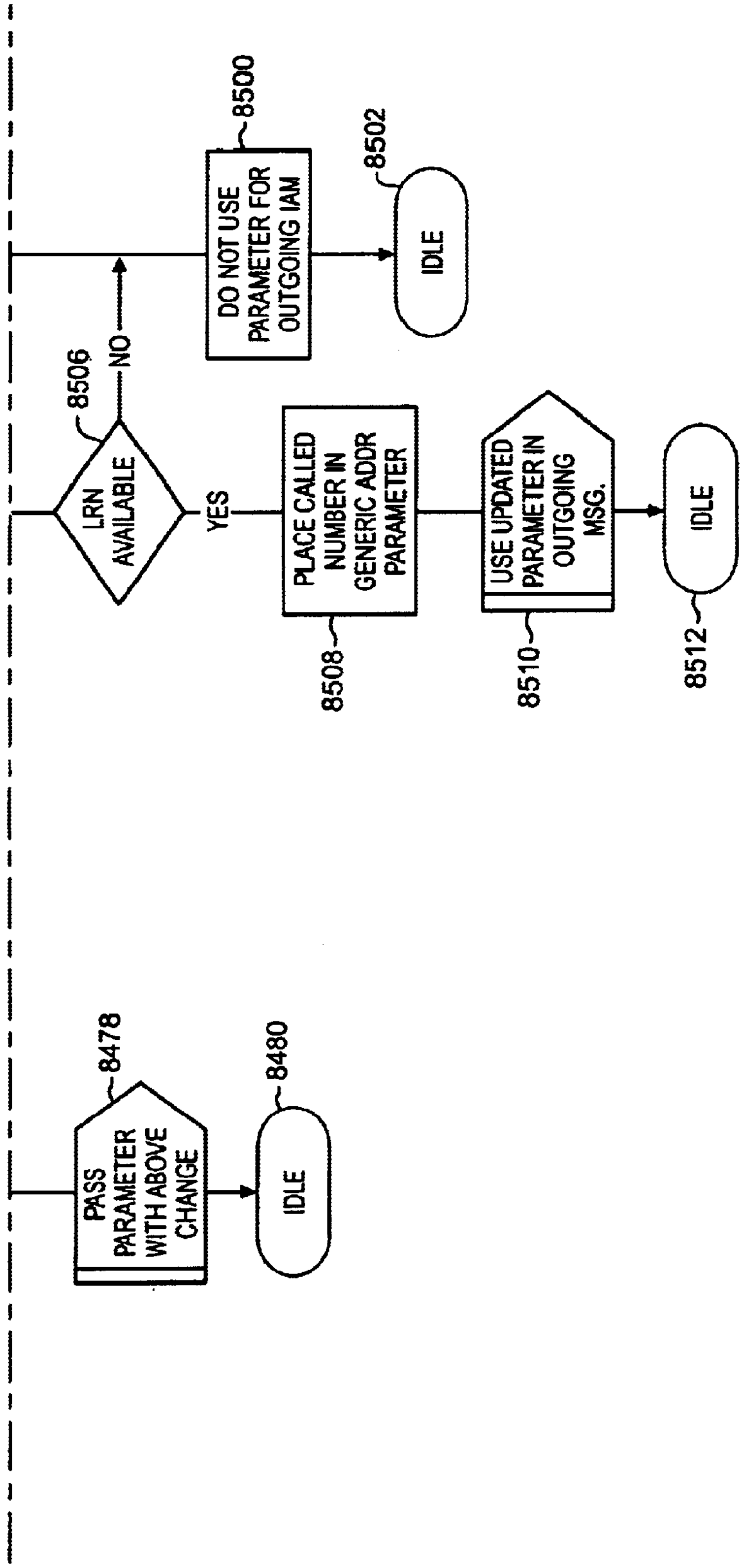
Figure 88:
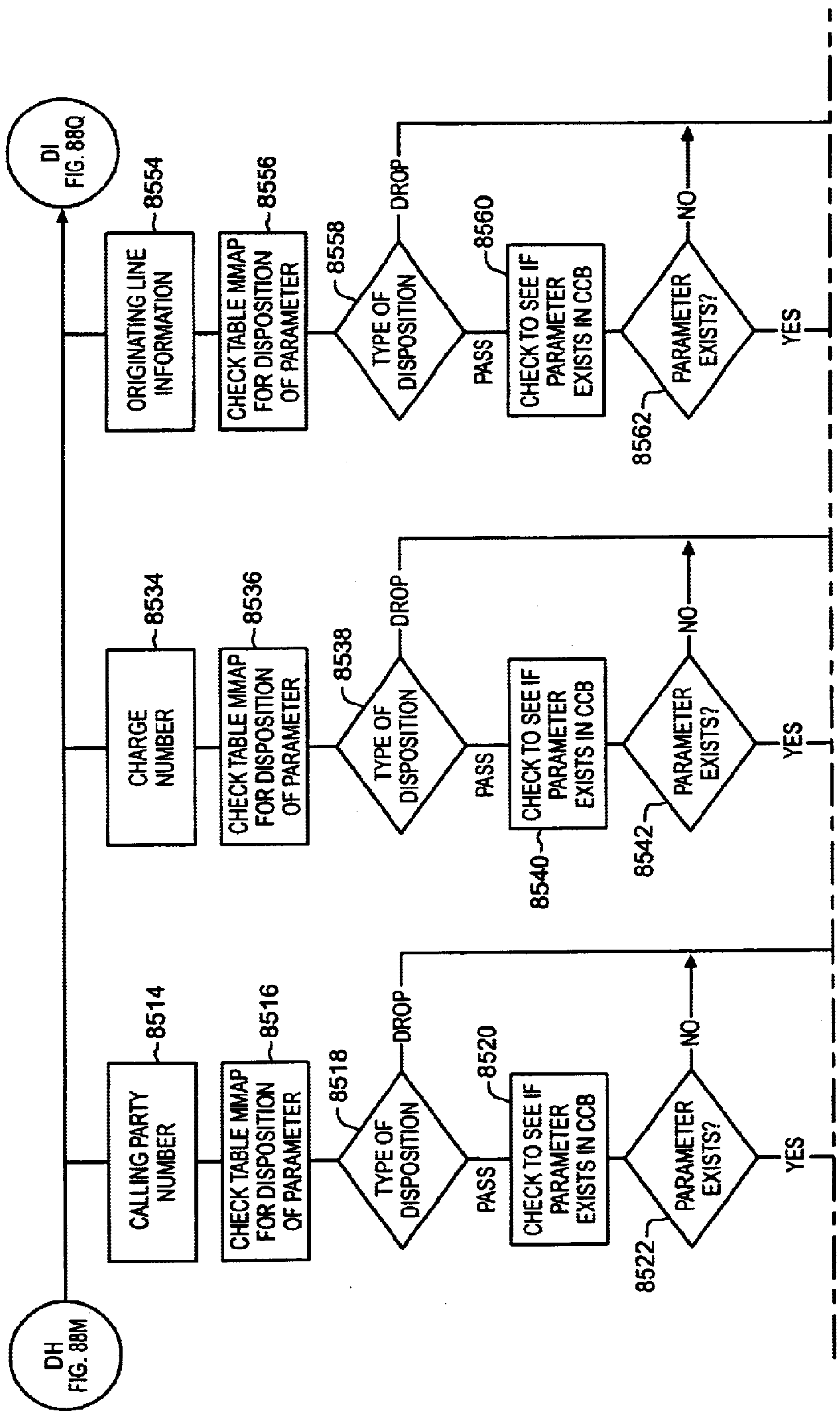
Figure 88P:
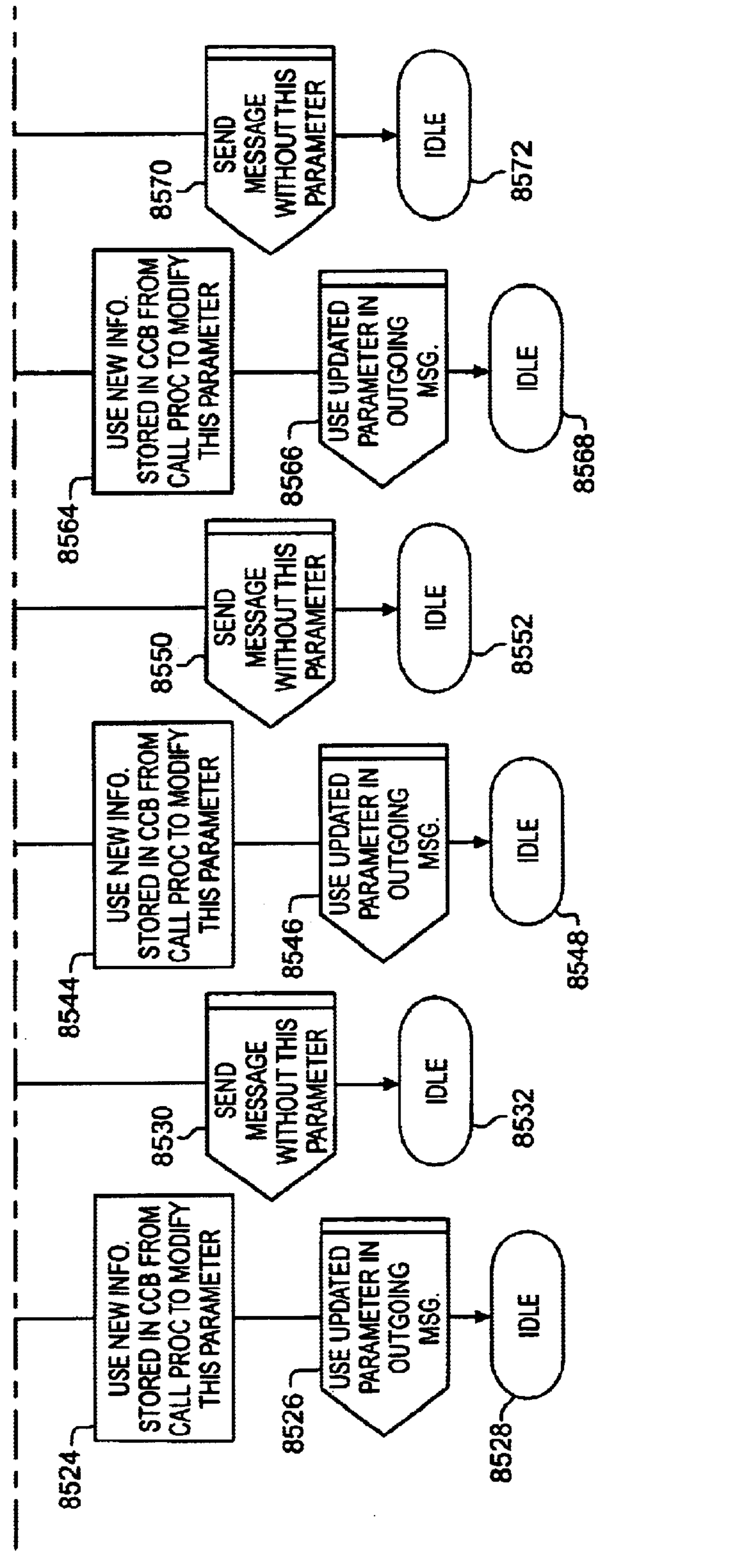
Figure 88Q:
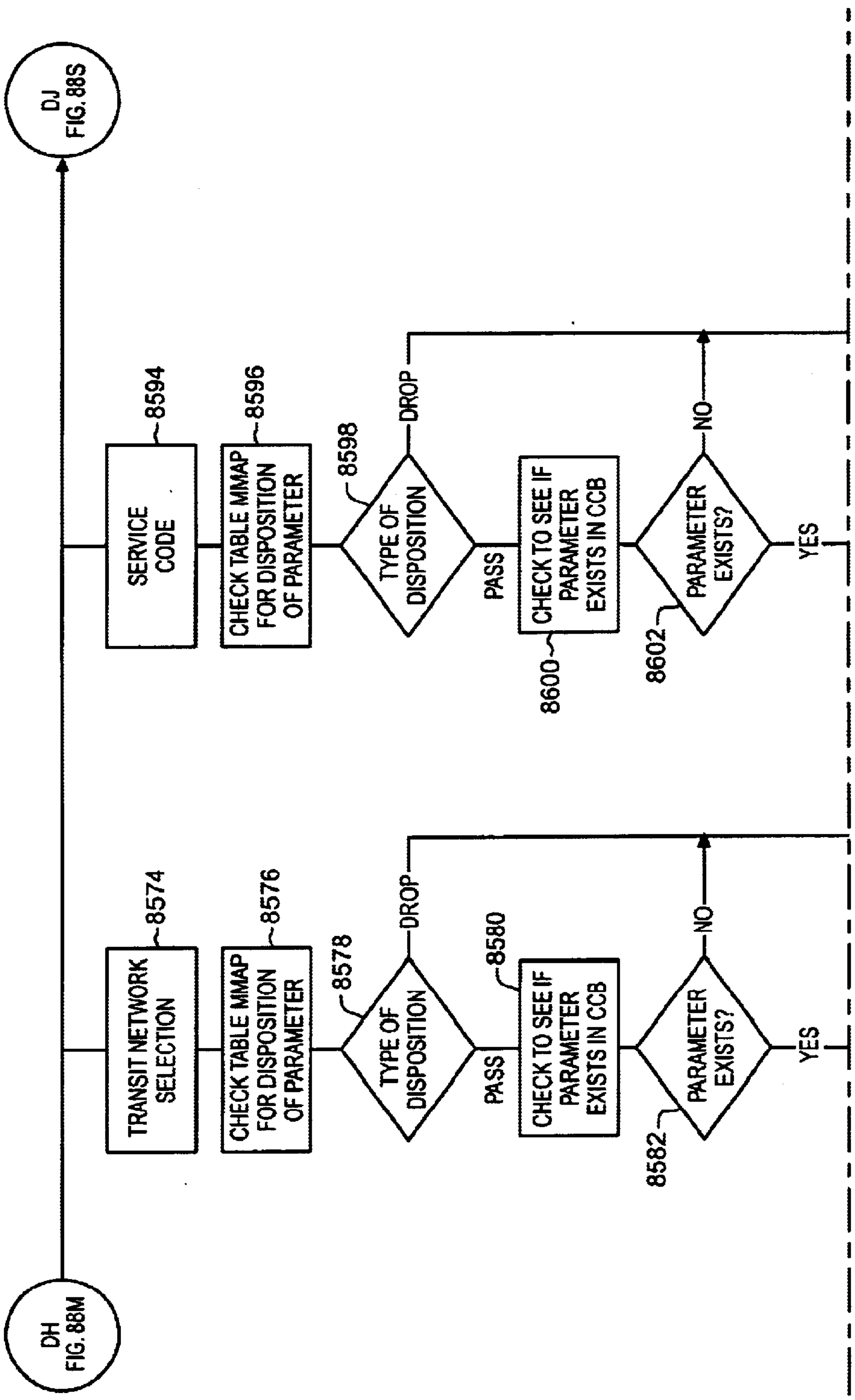
Figure 88R:
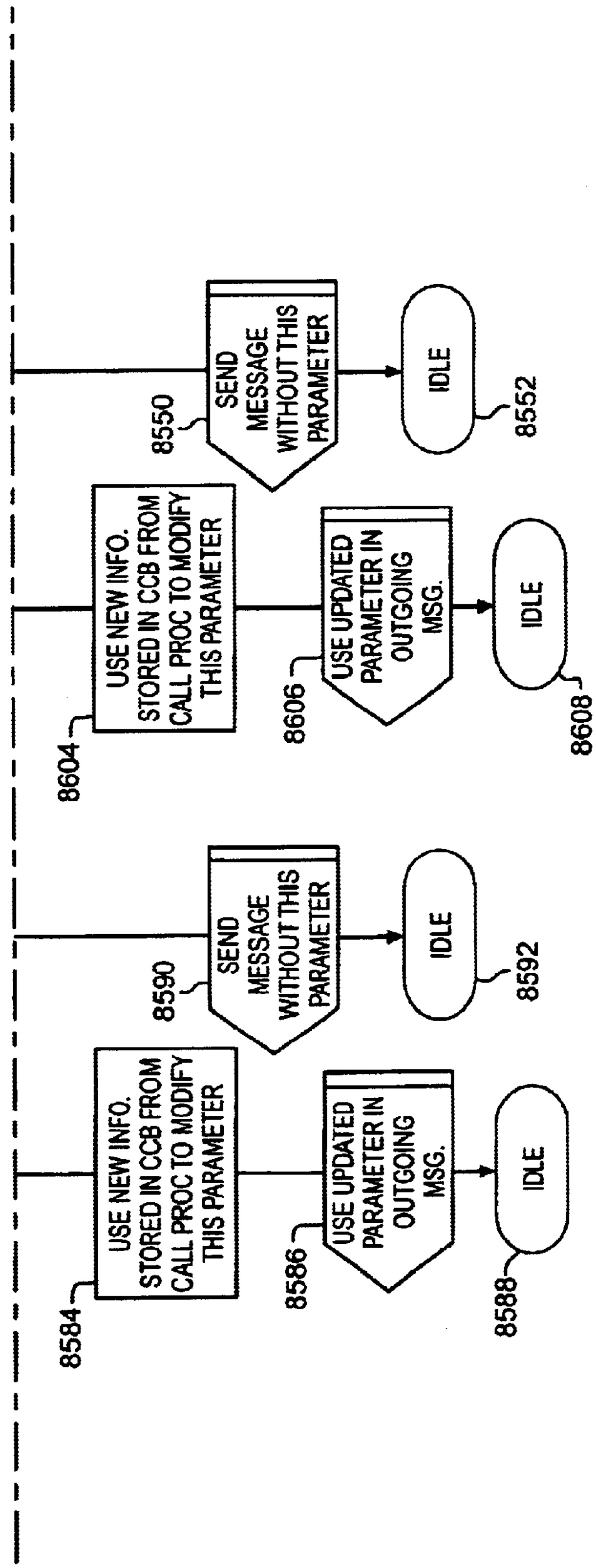
Figure 88S:
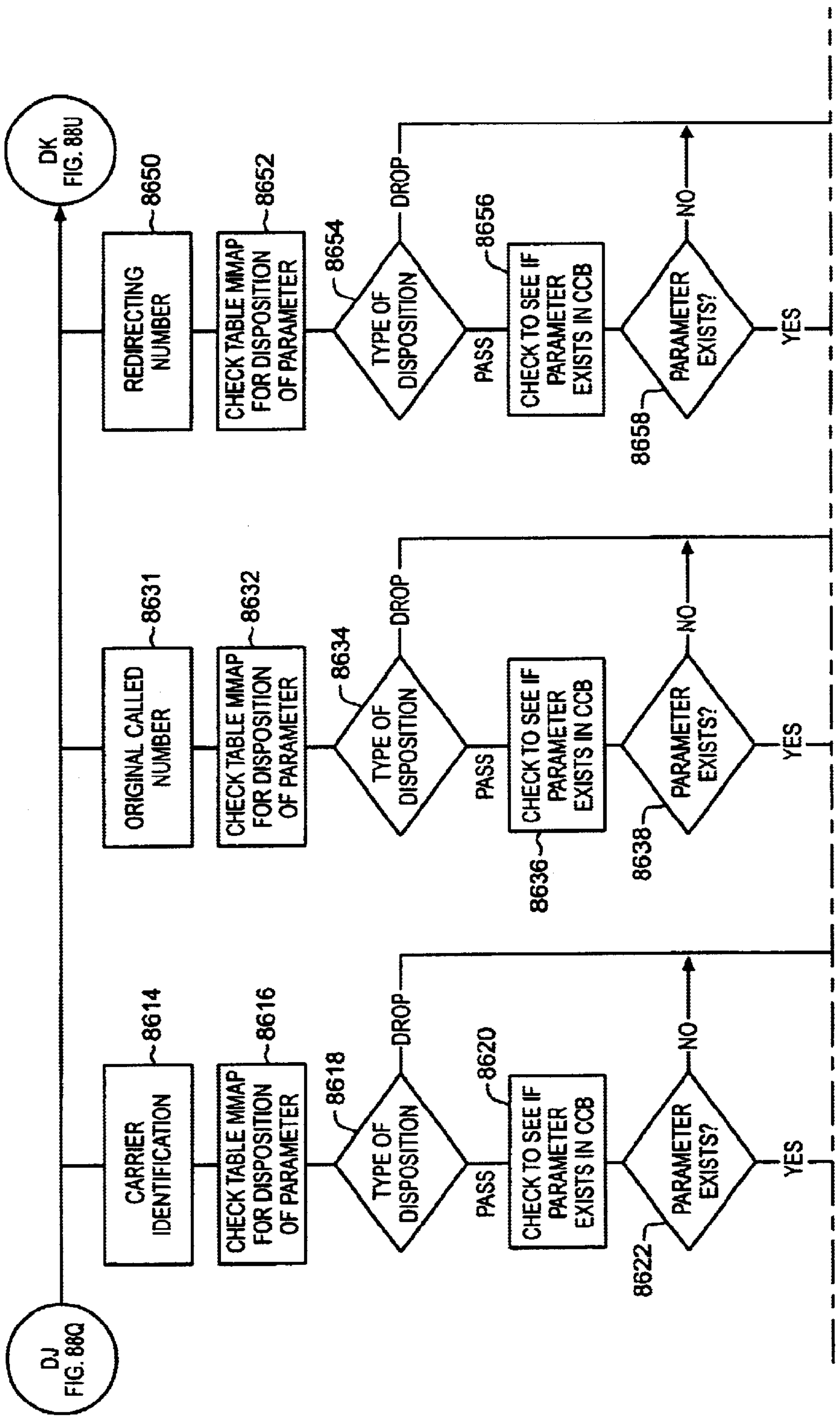
Figure 88T:
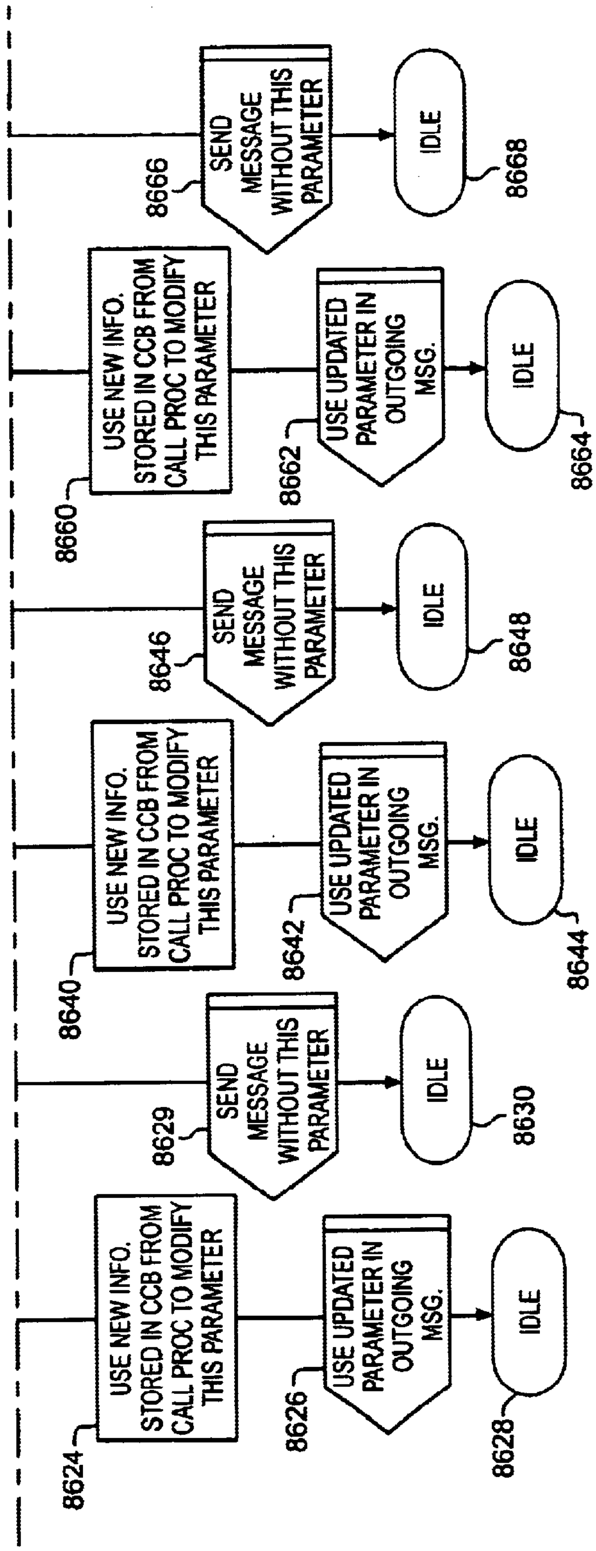
Figure 88U:
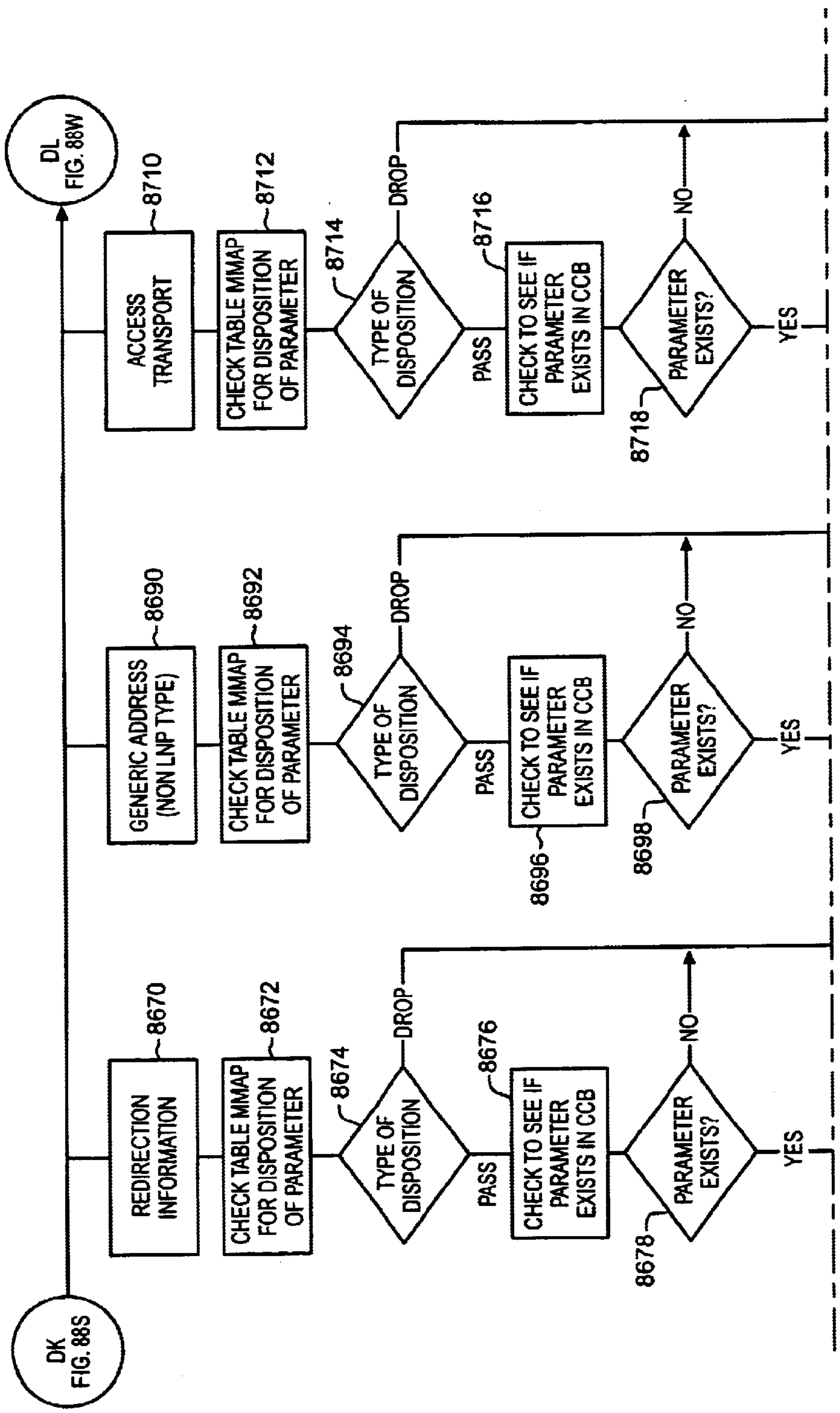
Figure 88V:
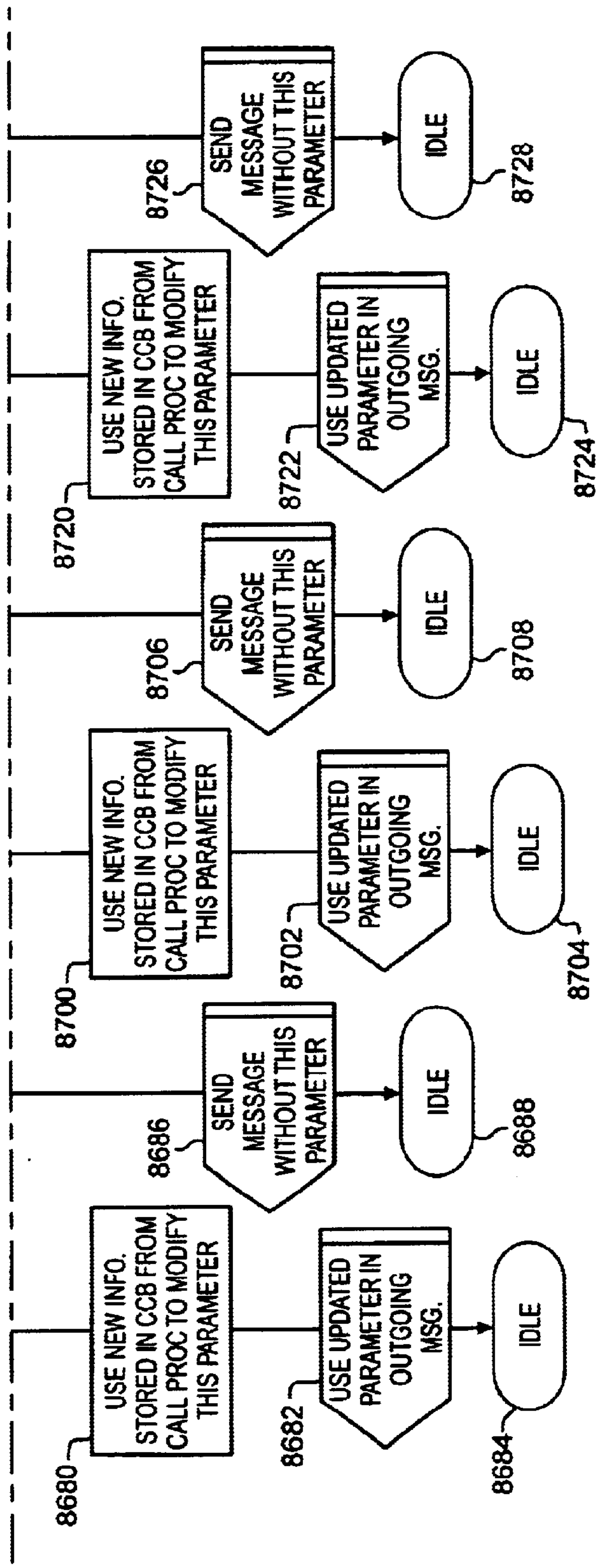
Figure 88W:
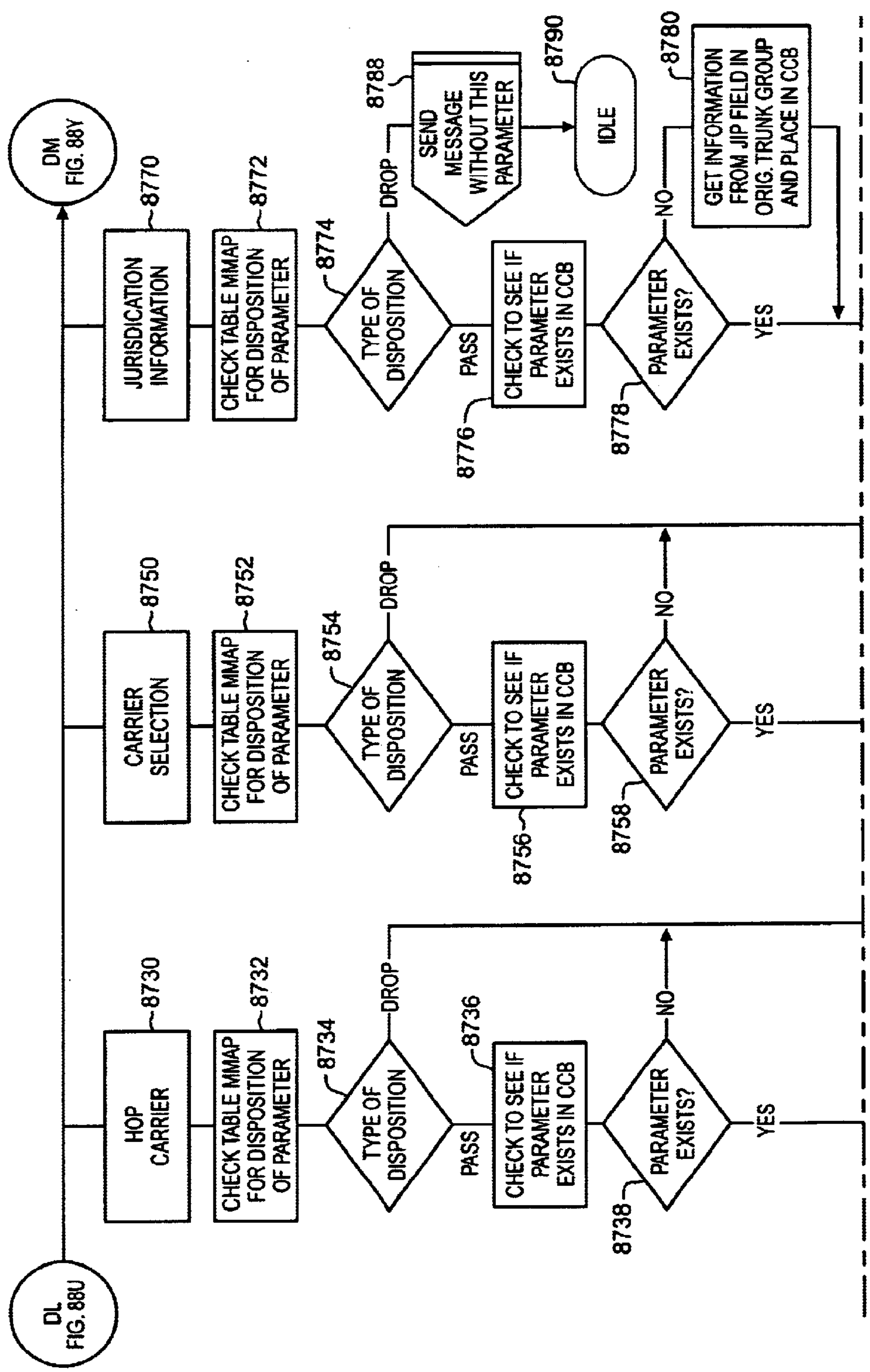
Figure 88X:
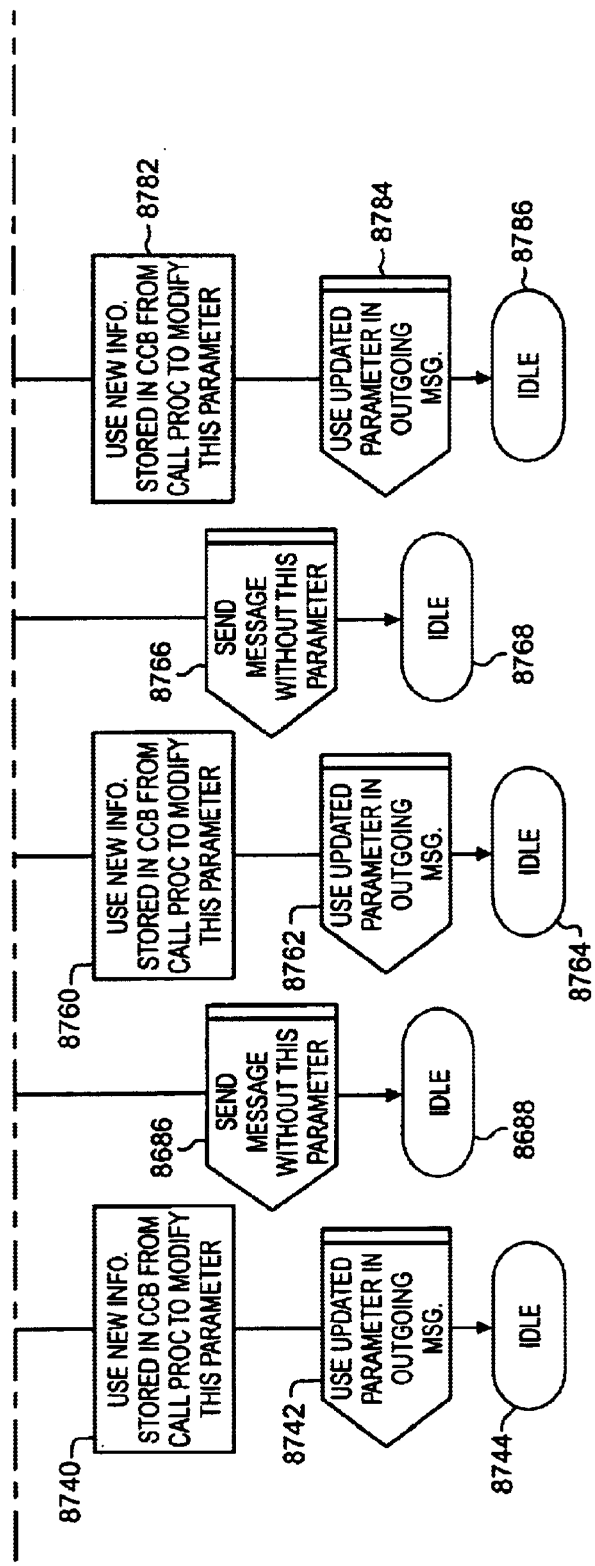
Figure 88Y:
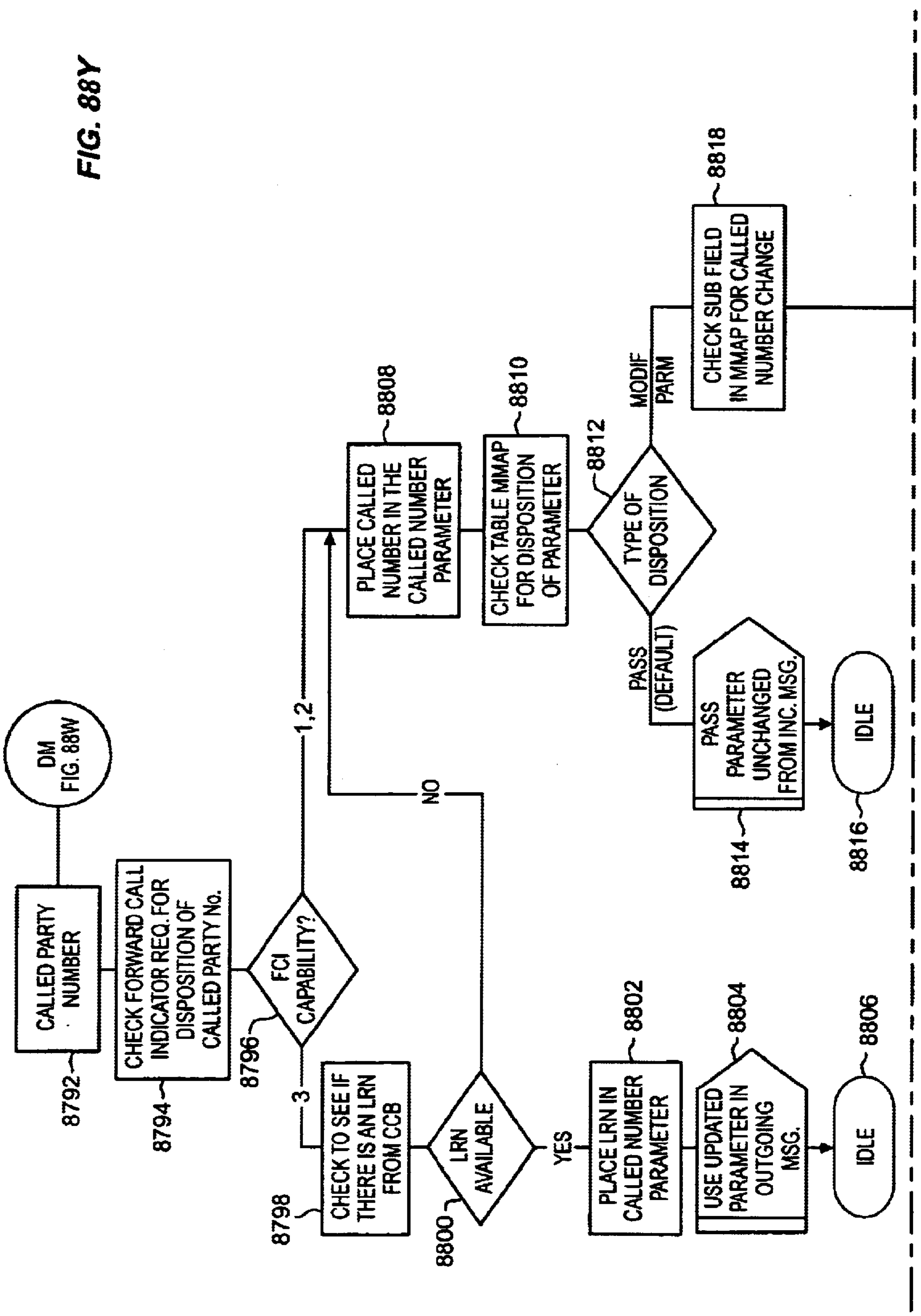
Figure 88Z:
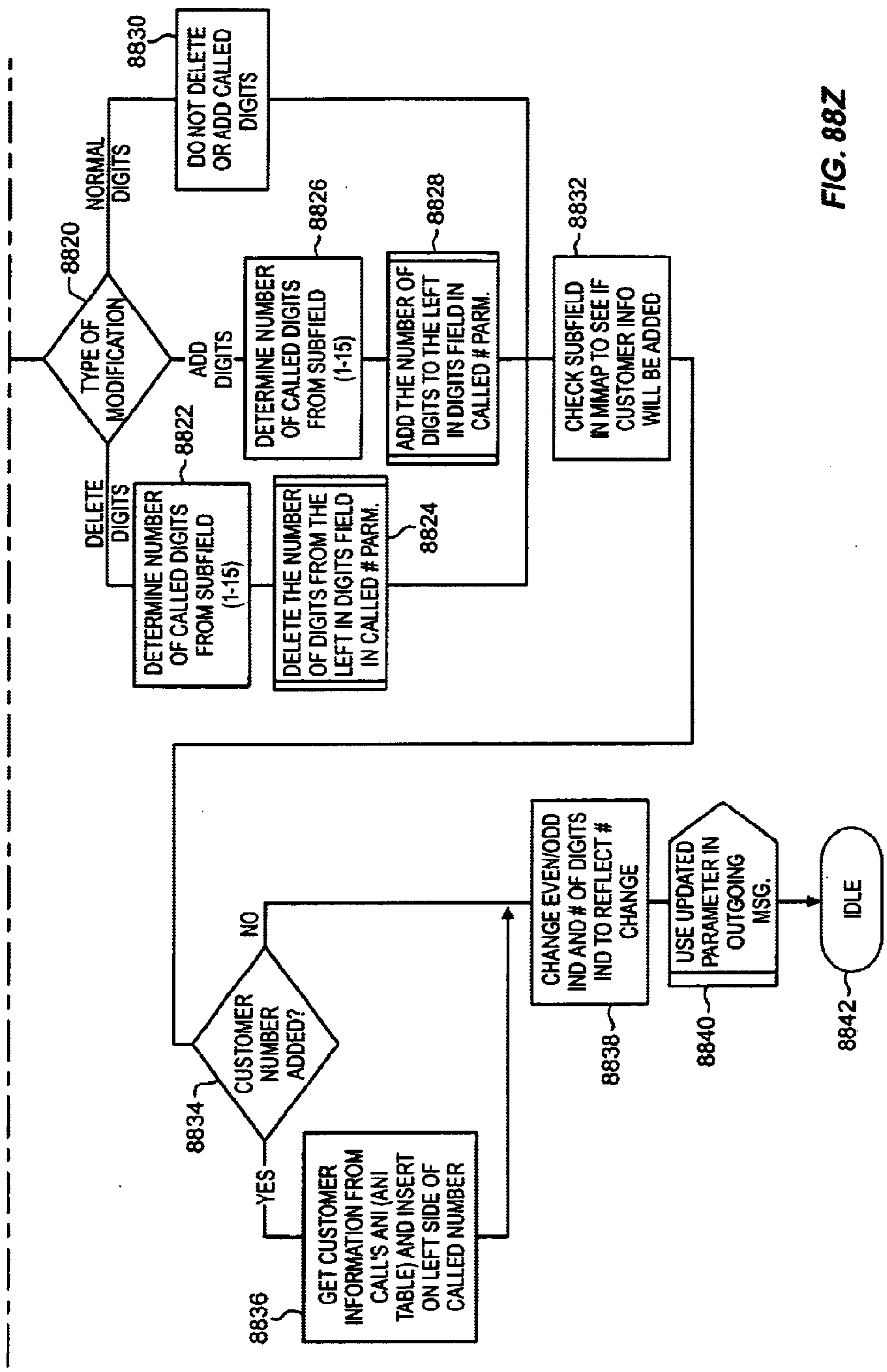

FIGS. 88A–88Z depict processing for the message mapping table. The process is idle at 8060. An incoming request is received from the call process at 8062. The type of message to be sent is determined at 8064. If the type of message is an ACM at 8066, the message mapping table is checked to determine the parameter disposition at 8068.

If the parameter disposition at 8068 is an access transport at 8070, and if the type of disposition is a pass at 8072, it is determined if the parameter exists in the CIB at 8074. If the parameter does exist 8076, the new information that is stored in the CIB from call processing is used to modify the parameter at 8078. The updated parameter is used in the outgoing message at 8080. Idle is attained at 8082.

If the type of disposition is a drop at 8072, or if the parameter does not exist in the CIB at 8076, then the message is sent without this parameter at 8084. Idle is attained at 8086.

If the parameter disposition at 8068 is a cause indicator at 8088, and if the type of disposition is a pass at 8090, it is determined that the parameter exists in the CIB at 8092. If the parameter exists at 8094, then the new information that is stored in the CIB from call processing is used to modify this parameter at 8096. The updated parameter is used in the outgoing message at 8098, and idle is attained at 8100.

If the type of disposition is a drop at 8090, or if the parameter does not exist in the CIB at 8094, then the message is sent without this parameter at 8102. Idle then is attained at 8104.

If the parameter disposition at 8068 is an optional backward call indicator at 8106, and if the type of disposition is a pass at 8108, it is determined if the parameter exists in the CIB at 8110. If the parameter exists at 8112, the new information stored in the CIB from the call processing is used to modify this parameter at 8114. The updated parameter is used in the outgoing message at 8116, and idle is attained at 8118.

If the type of disposition is a drop at 8108, or if the parameter does not exist in the CIB at 8112, the message is sent out without this parameter at 8120. Idle then is attained at 8122.

If the parameter disposition at 8068 is a private parameter at 8124, and if the type of disposition is a pass at 8126 it is determined if the parameter exists in the CIB at 8128. If the parameter exists at 8130, the new information is stored in the CIB from the call processing is used to modify this parameter at 8132. The updated parameter is used in the outgoing message at 8134. Idle is attained at 8136.

If the type of disposition is a drop at 8126, or if the parameter does not exist in the CIB at 8130, the message is sent without this parameter at 8138. Idle then is attained at 8140.

If an IAM is received at 8142, the message mapping table is checked to determine the parameter disposition at 8144. If the parameter disposition at 8144 is a backward call indicator at 8146, the message mapping table is checked to determine the parameter disposition at 8148. If the type of disposition is a pass at 8150, it is determined if the parameter exists in the CIB at 8152. If the parameter does exist at 8154, the new information that is stored in the CIB from call processing is used to modify this parameter at 8156. The update parameter is used in the outgoing message at 8158, and idle is attained at 8160.

If the type of disposition is a drop at 8150, or if the parameter does not exist at 8154, the message is sent without this parameter at 8162. Idle then is attained at 8164.

If the parameter disposition at 8144 is an access transport at 8166, the message mapping table is checked to determine the parameter disposition at 8168. If the type of disposition is a pass at 8170, it is determined if the parameter exists in the CIB at 8172. If the parameter exists at 8174, the new information that is stored in the CIB from call processing is used to modify this parameter at 8176. The updated parameter is used in the outgoing message at 8178, and idle is attained at 8180.

If the type of disposition is a drop at 8170, or if the parameter does not exist in the CIB at 8174, the message is sent without this parameter at 8182. Idle then is attained at 8184.

If the parameter disposition at 8144 is a private parameter at 8186, the message mapping table is checked to determine the parameter disposition at 8188. If the type of disposition is a pass at 8190, it is determined if the parameter exists in the CIB at 8192. If the parameter does exist 8194, the new information that is stored in the CIB from call processing is used to modify this parameter at 8196. The updated parameter is used in the outgoing message at 8198, and idle is attained at 8200.

If the type of disposition is a drop at 8190, or if the parameter does not exist in the CIB at 8194, the message is sent without this parameter at 8202. Idle then is attained at 8204.

If the type of message is a CPM at 8206, the message mapping table is checked to determine the parameter disposition at 8208. If the parameter disposition at 8208 is a cause indicator at 8210, and if the type of disposition of the parameter is a pass at 8212, it is determined if the parameter exists in the CIB at 8214. If the parameter exists in the CIB at 8216, the new information that is stored in the CIB from call processing is used to modify this parameter at 8218. The updated parameter is used in the outgoing message at 8220, and idle is attained at 8222.

If the parameter disposition type at 8212 is a drop, or if the parameter does not exist in the CIB at 8216, the message is sent without this parameter at 8224. Idle then is attained at 8226.

If the parameter disposition at 8208 is an access transport at 8228, and if the type of disposition of the parameter is a pass at 8230, it is determined if the parameter in the CIB at 8232. If the parameter does exist at 8234, the new information that is stored in the CIB from call processing is used to modify this parameter at 8236. The updated parameter is used in the outgoing message at 8238, and idle is attained at 8240.

If the type of disposition is a drop at 8230, or if the parameter does not exist in the CIB at 8234, the message is sent without this parameter at 8242. Idle then is attained at 8244.

If the parameter disposition at 8208 is an optional backward call indicator at 8246, and if the type of disposition is a pass at 8248, it is determined if the parameter exists in the CIB at 8250. If the parameter does exist at 8252, the new information stored in the CIB from call processing is used to modify this parameter at 8254. The updated parameter is used in the outgoing message at 8256, and idle is attained at 8258.

If the type of disposition is a drop at 8248, or if the parameter does not exist in the CIB at 8252, the message is sent without this parameter at 8260. Idle then is attained at 8262.

If the parameter disposition at 8208 is a backward call indicator at 8264, and if the type of disposition of the parameter is a pass at 8266, it is determined if the parameter exists in the CIB at 8268. If the parameter does exist at 8270, the new information stored in the CIB from call processing is used to modify this parameter at 8272. The update parameter is used in the outgoing message at 8274, and idle is attained at 8276.

If the type of disposition of the parameter is a drop at 8266, or if the parameter does not exist in the CIB at 8270, the message is sent without this parameter at 8278. Idle then is attained at 8280.

If the parameter disposition at 8208 is a notification indicator at 8282, and if the type of disposition of the parameter is a pass at 8284, it is determined if the parameter exists in the CIB at 8286. If the parameter does exist at 8288, the new information stored in the CIB from call processing is used to modify the parameter at 8290. The updated parameter is used in the outgoing message at 8292, and idle is attained at 8294.

If the type of disposition of the parameter is a drop at 8284, or if the parameter does not exist in the CIB at 8288, the message is sent without this parameter at 8296. Idle then is attained at 8298.

If the type of message that is to be sent is a CVR at 8290, the message mapping table is checked for the parameter disposition at 8292. If the parameter disposition at 8292 is a CLLI code at 8294, and if the disposition type is a pass at 8296, it is determined if the parameter exists in the CIB at 8298. If the parameter exists at 8300, the new information that is stored in the CIB from call processing is used to modify this parameter at 8302. The updated parameter is used in the outgoing message at 8304, and idle is attained at 8306.

If the disposition type is a drop at 8296, or if the parameter does not exist in the CIB at 8300, the message is sent without this parameter at 8308. Idle then is attained at 8310.

If the parameter disposition at 8292 is a circuit identification name at 8312, and if the disposition type is a pass at 8314, it is determined if the parameter exists in the CIB at 8316. If the parameter does not exist at 8318, the new information that is stored in the CIB from call processing is used to modify this parameter at 8320. The updated parameter is used in the outgoing message at 8322. Idle then is attained at 8324.

If the disposition type of the parameter is a drop at 8314, or if the parameter does not exist in the CIB at 8318, the message is sent without this parameter at 8326. Idle then is attained at 8328.

If the type of message to be sent is an EXM at 8330, the message mapping table is checked to determine the EXM disposition at 8332. If the type of disposition is a drop at 8334, the request to build and sent out a message is ignored at 8336. Idle then is attained at 8338.

If the disposition type is a pass at 8334, the message mapping table is checked for the parameter disposition at 8340. The outgoing trunk group number is determined at 8342. If the type of disposition of the parameter is a pass at 8344, it is determined if the parameter exists in the CIB at 8346. If the parameter does exist in the CIB at 8348, the new information that is stored in the CIB from call processing is used to modify this parameter at 8350. The updated parameter is used in the outgoing message at 8352, and idle is attained at 8354.

If the disposition type of the parameter is a drop at 8344, or if the parameter does not exist in the CIB at 8348, the message is sent without this parameter at 8356. Idle then is attained at 8358.

If the type of message to be sent is a COT at 8360, then the message mapping table is checked for the COT disposition at 8362. If the type of disposition is a pass at 8364, the message is built with parameters from the CIB at 8366. The message is sent to the signaling point at 8368, and idle is attained at 8370. If the disposition type is a drop or a default at 8364, then the request to build and send out the message is ignored at 8372. Idle then is attained at 8374.

If the message to be sent is an REL at 8376, the message mapping table is checked to determine the parameter disposition at 8378. If the parameter disposition is an access transport at 8380, and if the disposition type is a pass at 8382, then it is determined if the parameter exists in the CIB at 8384. If the parameter exists at 8386, then the new information that is stored in the CIB from call processing is used to modify this parameter at 8388. The updated parameter is used in the outgoing message at 8390, and idle is attained at 8392.

If the disposition type of the parameter is a drop at 8382, or if the parameter does not exist in the CIB at 8386, then the message is sent without this parameter at 8394. Idle then is attained at 8396.

If the parameter disposition at 8378 is an automatic congestion control level at 8398, and if the disposition type of the parameter is a pass at 8400, then it is determined if the parameter exists in the CIB at 8402. If the parameter does exist at 8404, then the new information that is stored in the CIB from call processing is used to modify this parameter at 8406. The updated parameter is used in the outgoing message at 8408, and idle is attained at 8410.

If the disposition type of the parameter is a drop at 8400, or if the parameter does not exist in the CIB at 8404, then the message is sent without this parameter at 8412. Idle then is attained at 8414.

If the message to be sent is an IAM at 8416, then the message mapping table is checked to determine the parameter disposition at 8418. If the parameter disposition at 8418 is the forward call indicator at 8420, then the message mapping table is checked to determine the parameter disposition at 8422. If the parameter disposition is a pass at 8424 then the message is sent out with the parameter unchanged at 8426. Idle then is attained at 8428.

If the parameter disposition is a modified parameter at 8424, the message mapping subfield is checked to determine the LRN capability at 8430. If the LRN capability type is set to 1 at 8432, then all dip has been made, and the dialed number is not ported. The M bit in the FCI is set to 1 at 8434. The updated "type of capability" is used to determine the ported number GAP and the called number at 8436. Idle then is attained at 8438.

If the LRN capability type is 2 at 8432, then a dip has not been made, and the dialed number is not a portable number. The M bit in the FCI is set to 0 at 8440. The updated "type of capability" is used to determine the ported number GAP and the called number at 8442. Idle then is attained at 8444.

If the LRN capability type is set to 3 at 8432, then a dip has been made, and the dialed number is a ported number. The M bit in the FCI is set to 1 at 8446. The updated "type of capability" is used to determine the ported number GAP and the called number at 8448. Idle then is attained at 8450.

If the parameter disposition at 8418 is a nature of connection indicator at 8452, the new information that is stored in the CIB from call processing is used to modify this parameter at 8454. The updated parameter is used in the outgoing message at 8456, and idle is attained at 8458.

If the parameter disposition at 8418 is a user service information at 8460, the new information that was stored in the CIB from call processing is used to modify this parameter at 8462. The updated parameter is used in the outgoing message at 8464, and idle is attained at 8466.

If the parameter disposition at 8418 is a calling party category at 8468, then the message mapping table is checked for the parameter disposition at 8470. The subfield is checked to determine if the fifth bit needs to be set to 0 at 8472. If the fifth bit is to be set to 0 at 8474, then the fifth bit is set to 0 at 8476. The parameter is passed with the above change at 8478, and idle is attained at 8480. If the fifth bit is not to be set to 0 at 8474, then the parameter is passed as in the CIB at 8482. Idle then is attained at 8484.

If the IAM parameter disposition is an LNP GAP at 8486, the message mapping table is checked for the parameter disposition at 8488. If the parameter disposition is a drop at 8490, then the parameter is not used for the outgoing IAM at 8492. Idle then is attained at 8494.

If the disposition type is a pass at 8490, the forward call indicator requirements are checked for the disposition of the called party number at 8496. If the FCI capability is either a 1 or a 2 at 8498, then the parameter is not used for the outgoing IAM at 8500. Idle then is attained at 8502.

If the FCI capability is a 3 at 8498, then it is determined if there is an LRN from the CIB at 8504. If the LRN is available at 8506, the called number is placed in the LNP GAP at 8508. The updated parameter is used in the outgoing message at 8510, and idle is attained at 8512. If the LRN is not available at 8506, then the parameter is not used for the outgoing IAM at 8500. Idle is attained at 8502.

If the parameter disposition for the IAM is a calling party number at 8514, the message mapping table is checked for the disposition of the parameter at 8516. If the type of disposition is a pass at 8518, then it is determined if the parameter exists in the CIB at 8520. If the parameter exists in the CIB at 8522, the new information that was stored in the CIB from call processing is used to modify the parameter at 8524. The updated parameter is used in the outgoing message at 8526, and idle is attained at 8528.

If the parameter disposition type is a drop at 8518, or if the parameter does not exist in the CIB at 8522, then the message is sent without this parameter at 8530. Idle then is attained at 8532.

If the IAM parameter disposition is a charge number at 8534, the message mapping table is checked for the disposition of the parameter at 8536. If the type of disposition is a pass at 8538, it is determined if the parameter exists in the CIB at 8540. If the parameter exists at 8542, the new information that was stored in the CIB from call processing is used to modify this parameter at 8544. The updated parameter is used in the outgoing message at 8546, and idle is attained at 8548.

If the parameter disposition type is a drop at 8538, or if the parameter does not exist in the CIB at 8542, the message is sent without this parameter at 8550. Idle then is attained at 8552.

If the IAM parameter disposition is an OLI at 8554, the message mapping table is checked for the disposition of the parameter at 8556. If the parameter disposition type is a pass at 8558, it is determined if the parameter exists in the CIB at 8560. If the parameter exists at 8562, the new information that is stored in the CIB from call processing is used to modify this parameter at 8564. The updated parameter is used in the outgoing message at 8566, and idle is attained at 8568.

If the parameter disposition type is a drop at 8558, or if the parameter does not exist in the CIB at 8562, the message is sent without this parameter at 8570. Idle then is attained at 8572.

If the IAM parameter disposition is a transit network selection (TNS) at 8574, then the message mapping table is checked for the disposition of the parameter at 8576. If the parameter disposition type is a pass at 8578, it is determined if the parameter exists in the CIB at 8580. If the parameter does exist at 8582, then the new information stored in the CIB from call processing is used to modify this parameter at 8584. The updated parameter is used in the outgoing message at 8586, and idle is attained at 8588.

If the parameter disposition type is a drop at 8578, or if the parameter does not exist in the CIB at 8582, the message is sent without this parameter at 8590. Idle then is attained at 8592.

If the IAM parameter disposition is a service code at 8594, the message mapping table is checked for the disposition of the parameter at 8596. If the disposition type of the parameter is a pass at 8598, it is determined if the parameter exists in the CIB at 8600. If the parameter does exist at 8602, the new information that is stored in the CIB from call processing is used to modify this parameter at 8604. The updated parameter is used in the outgoing message at 8606, and idle is attained at 8608.

If the parameter disposition type is a drop at 8598, or if the parameter does not exist in the CIB at 8602, the message is sent without this parameter at 8610. Idle then is attained at 8612.

If the IAM parameter disposition is a carrier identification at 8614, the message mapping table is checked for the disposition of the parameter at 8616. If the parameter disposition type is a pass at 8618, it is determined if the parameter exists in the CIB at 8620. If the parameter does exist at 8622, the new information that was stored in the CIB from call processing is used to modify this parameter at 8624. The updated parameter is used in the outgoing message at 8626, and idle is attained at 8628.

If the parameter disposition type is a drop at 8618, or if the parameter does not exist in the CIB at 8622, the message is sent without this parameter at 8629. Idle then is attained at 8630.

If the IAM parameter disposition is an original called number at 8631, the message mapping table is checked for the disposition of the parameter at 8632. If the parameter disposition type is a pass at 8634, it is determined if the parameter exists in the CIB at 8636. If the parameter exists at 8638, the new information stored in the CIB from call processing is used to modify the parameter at 8640. The updated parameter is used in the outgoing message at 8642, and idle is attained at 8644.

If the parameter disposition type is a drop at 8634, or if the parameter does not exist in the CIB at 8638, the message is sent without this parameter at 8646. Idle then is attained at 8648.

If the IAM parameter disposition is for redirecting the number at 8650, the message mapping table is checked for the disposition of the parameter at 8652. If the parameter disposition type is a pass at 8654, it is determined if the parameter exists in the CIB at 8656. If the parameter exists at 8658, the new information stored in the CIB from call processing is used to modify the parameter at 8660. The updated parameter is used in the outgoing message at 8662, and idle is attained at 8664.

If the parameter disposition type is a drop at 8654, or if the parameter does not exist in the CIB at 8658, the message is sent without this parameter at 8666. Idle then is attained at 8668.

If the IAM parameter disposition is for redirection information at 8670, the message mapping table is checked for the disposition of the parameter at 8672. If the disposition type of the parameter is a pass at 8674, it is determined if the parameter exists in the CIB at 8676. If the parameter exists at 8678, the new information stored in the CIB from call processing is used to modify this parameter at 8680. The updated parameter is used in the outgoing message at 8682, and idle is attained at 8684.

If the parameter disposition type is a drop at 8674, or if the parameter does not exist in the CIB at 8678, the message is sent without this parameter at 8686. Idle then is attained at 8688.

If the IAM parameter disposition is a GAP at 8690, the message mapping table is checked for the parameter disposition at 8692. If the parameter disposition type is a pass at 8694, it is determined if the parameter exists in the CIB at 8696. If the parameter exists at 8698, the new information that is stored in the CIB from call processing is used to modify this parameter at 8700. The updated parameter is used in the outgoing message at 8702, and idle is attained at 8704.

If the parameter disposition type is a drop at 8694, or if the parameter does not exist in the CIB at 8698, the message is sent without this parameter at 8706. Idle then is attained at 8708.

If the IAM parameter disposition is an access transport at 8710, the message mapping table is checked for the disposition of the parameter at 8712. If the parameter disposition type is a pass at 8714, it is determined if the parameter exists in the CIB at 8716. If the parameter exists at 8718, the new information stored in the CIB from call processing is used to modify this parameter at 8720. The updated parameter is used in the outgoing message at 8722, and idle is attained at 8724.

If the parameter disposition type is a drop at 8714, or if the parameter does not exist in the CIB at 8718, the message is sent without this parameter at 8726. Idle then is attained at 8728.

If the IAM parameter disposition is a hop counter at 8730, the message mapping table is checked for the disposition of the parameter at 8732. If the parameter disposition type is a pass at 8734, it is determined if the parameter exists in the CIB at 8736. If the parameter does exist at 8738, the new information that was stored in the CIB from call processing is used to modify this parameter at 8740. The updated parameter is used in the outgoing message at 8742, and idle is attained at 8744.

If the parameter disposition type is a drop at 8734, or if the parameter does not exist in the CIB at 8738, the message is sent without this parameter at 8746. Idle then is attained at 8748.

If the IAM parameter disposition is a carrier selection at 8750, the message mapping table is checked for the parameter disposition at 8752. If the parameter disposition type is a pass at 8754, it is determined if the parameter exists in the CIB at 8756. If the parameter exists at 8758, the new information that was stored in the CIB from call processing is used to modify this parameter at 8760. The updated parameter is used in the outgoing message at 8762, and idle is attained at 8764.

If the parameter disposition type is a drop at 8754, or if the parameter does not exist in the CIB at 8758, the message is sent without this parameter at 8766. Idle then is attained at 8768.

If the IAM parameter disposition is jurisdiction information at 8770, the message mapping table is checked for the disposition of the parameter at 8772. If the parameter disposition type is a pass at 8774, it is determined if the parameter exists in the CIB at 8776. If the parameter does not exist at 8778, the information is obtained from the JIP field in the originating trunk group and placed in the CIB at 8780. After step 8780 or if the parameter does exist in the CIB at 8778, the new information that is stored in the CIB from call processing is used to modify this parameter at 8782. The updated parameter is used in the outgoing message at 8784, and idle is attained at 8786.

If the parameter disposition type is a drop at 8774, the message is sent without this parameter at 8788. Idle then is attained at 8790.

If the IAM parameter disposition is a called party number at 8792, the forward call indicator requirements are checked for the disposition of the called party number at 8794. If the FCI capability is 3 at 8796, the call has been dipped, and the called number is a ported number. It is determined if there is an LRN in the CIB at 8798. If an LRN is available at 8800, the LRN, is placed in the called number parameter at 8802. The updated parameter is used in the outgoing message at 8804, and idle is attained at 8806.

If the FCI capability is a 1 or a 2 at 8796 so that either the call has been dipped and the called number is not a ported number, or the call has not been dipped and the called number is not a portable number, or if there is not an LRN available at 8800, the called number is placed in the called number parameter at 8808. The message mapping table is checked for the disposition of the parameter at 8810. If the type of disposition is a pass at 8812, the parameter is passed unchanged from the incoming message at 8814. Idle then is attained at 8816.

If the type of disposition is a modification of the parameter at 8812, the subfield of the message mapping table is checked for the called number change at 8818. If the type of modification is a delete digits at 8220, the number of called digits from the subfield is determined at 8822. The number of digits is deleted from the left in the digits field of the called number parameter at 8824.

If the type of modification is an add digits at 8820, the number of called digits from the subfield is determined at 8826. The number of digits is added to the left in the digits field of the called number parameter at 8828.

If the type of modification is normal digits at 8820, no digits are added or deleted at 8830. After step 8824, step 18828 or step 8830, the subfield of the message mapping table is checked to determine if customer information will be added at 8832.

If a customer number is to be added at 8834, customer information is obtained from the call's ANI and inserted on the left side of the called number at 8836. After step 8836 or if a customer number is not added at 8834, the even/odd indicator and the number of digits indicator are changed to reflect the number change at 8838. The updated parameter is used in the outgoing message at 8840. Idle is attained at 8842.

Call Maintenance

An example of call maintenance is illustrated in FIGS. 89–104B. Call maintenance is the process of treating calls for non-call associated massaging. A standard call maintenance process is described in ANSI standard T1.113, the contents of which are incorporated herein by reference. The following FIGS. 89–104B illustrate an exemplary embodiment of the call treatment process logic maintenance process logic that relates to the maintenance of circuits and connections for calls and treatment of calls, call signaling, and non-signaling messages to maintain the circuits and connections.

Blocking and Unblocking Message Receiving

Figure 89:
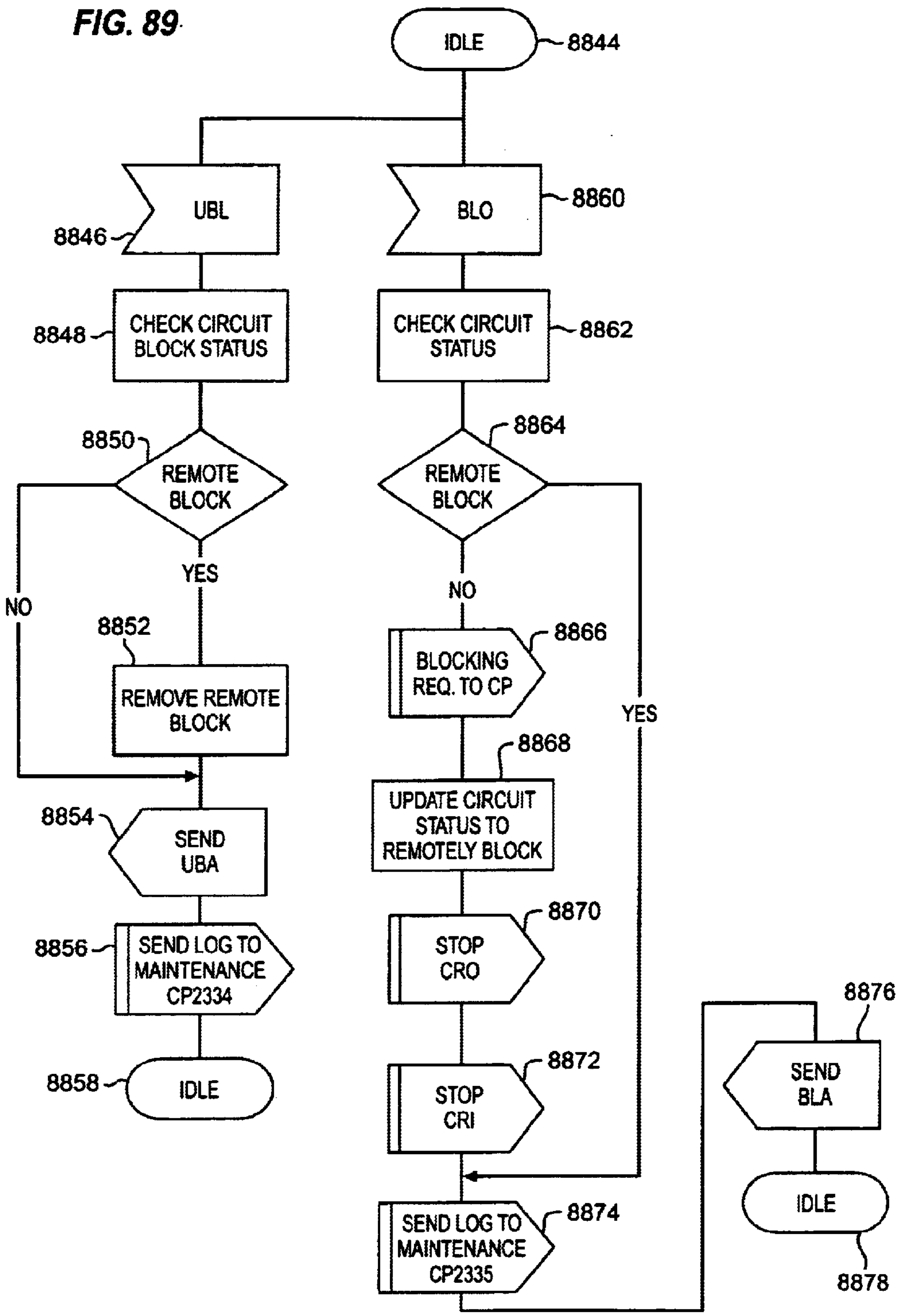
FIG. 89 is an SDL diagram of logic used in a version of the invention for a blocking and unblocking message receiving process.
Figure 90A:
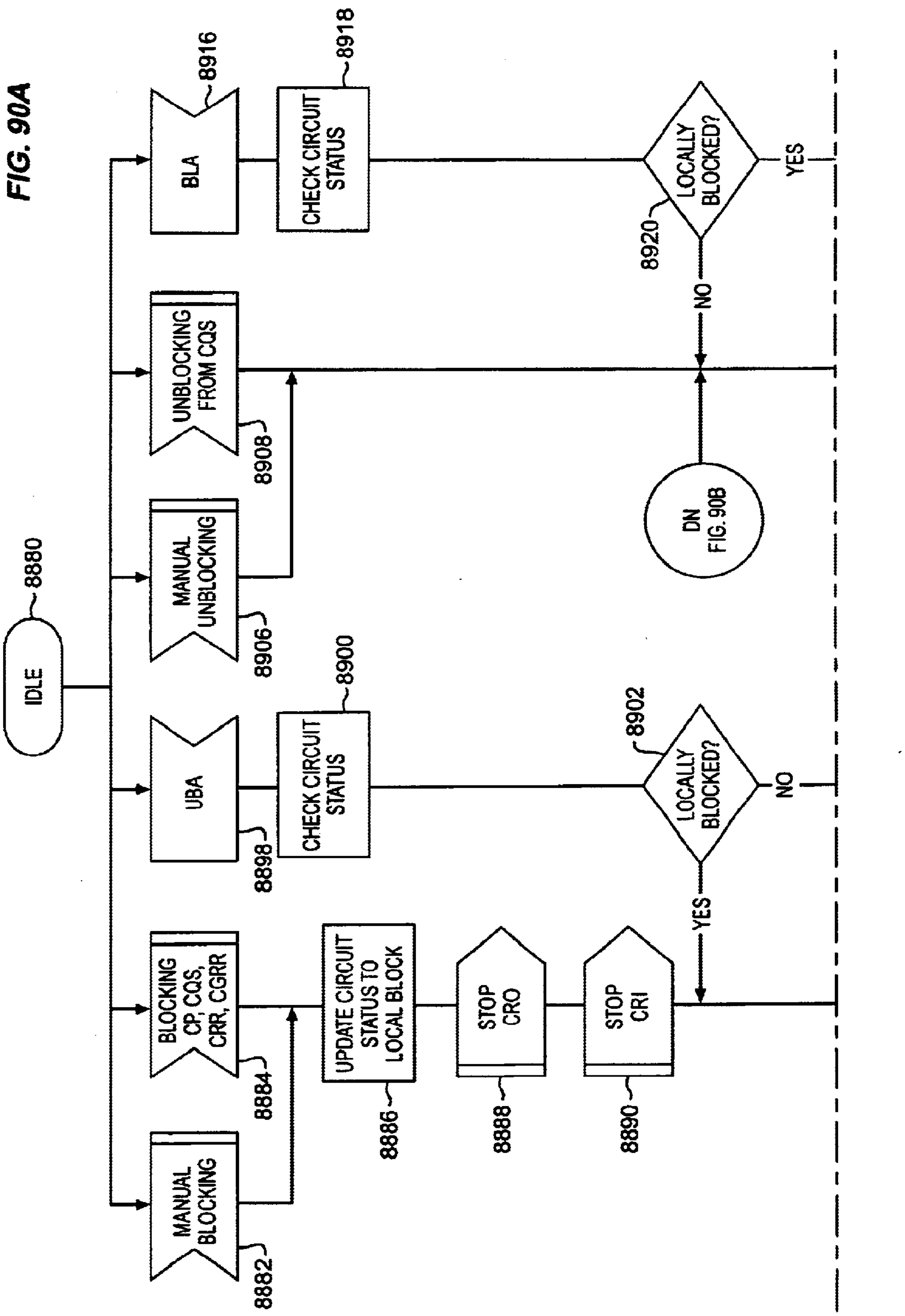
FIGS. 90A–90D are SDL diagrams of logic used in a version of the invention for a blocking and unblocking message sending process.
Figure 90B:
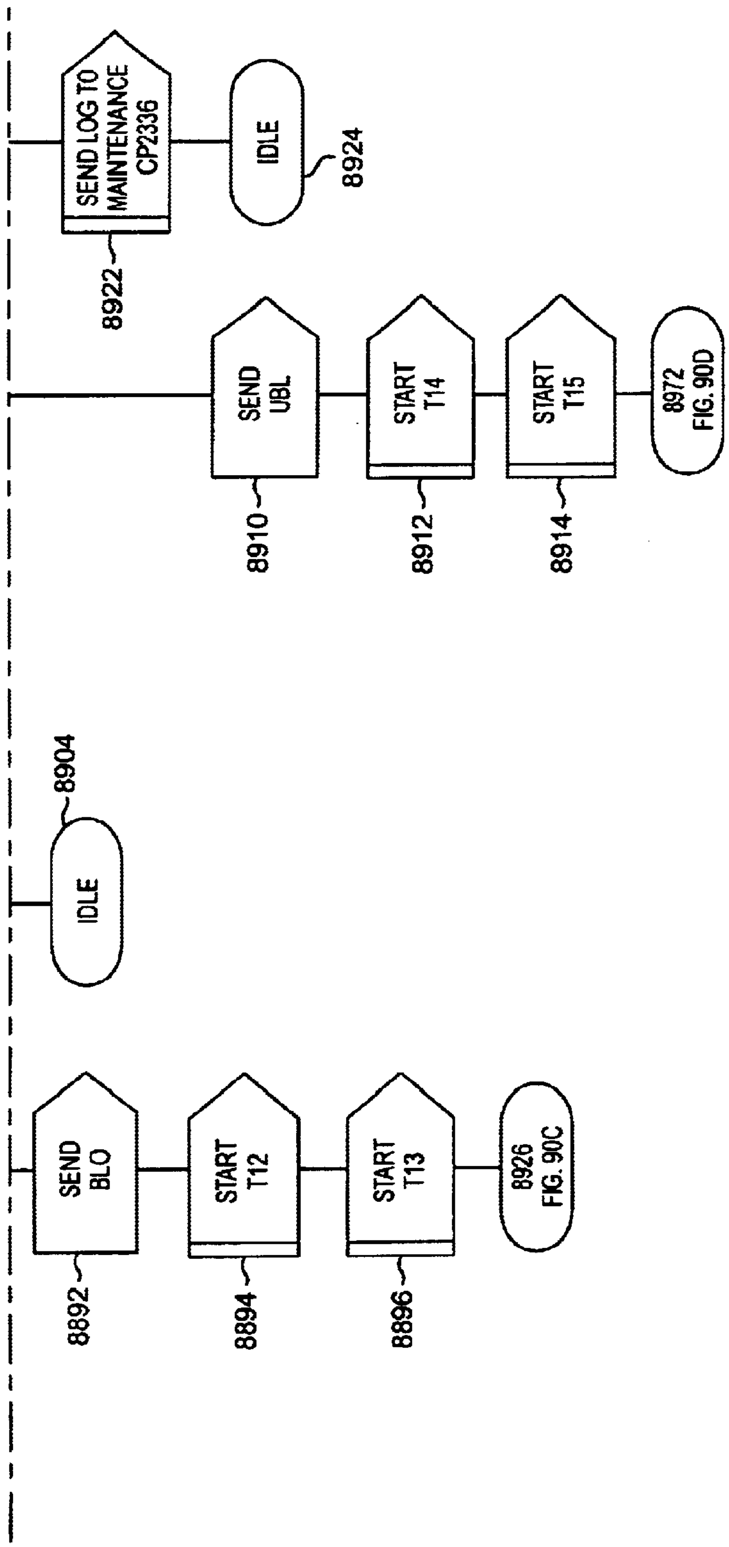
Figure 90C:
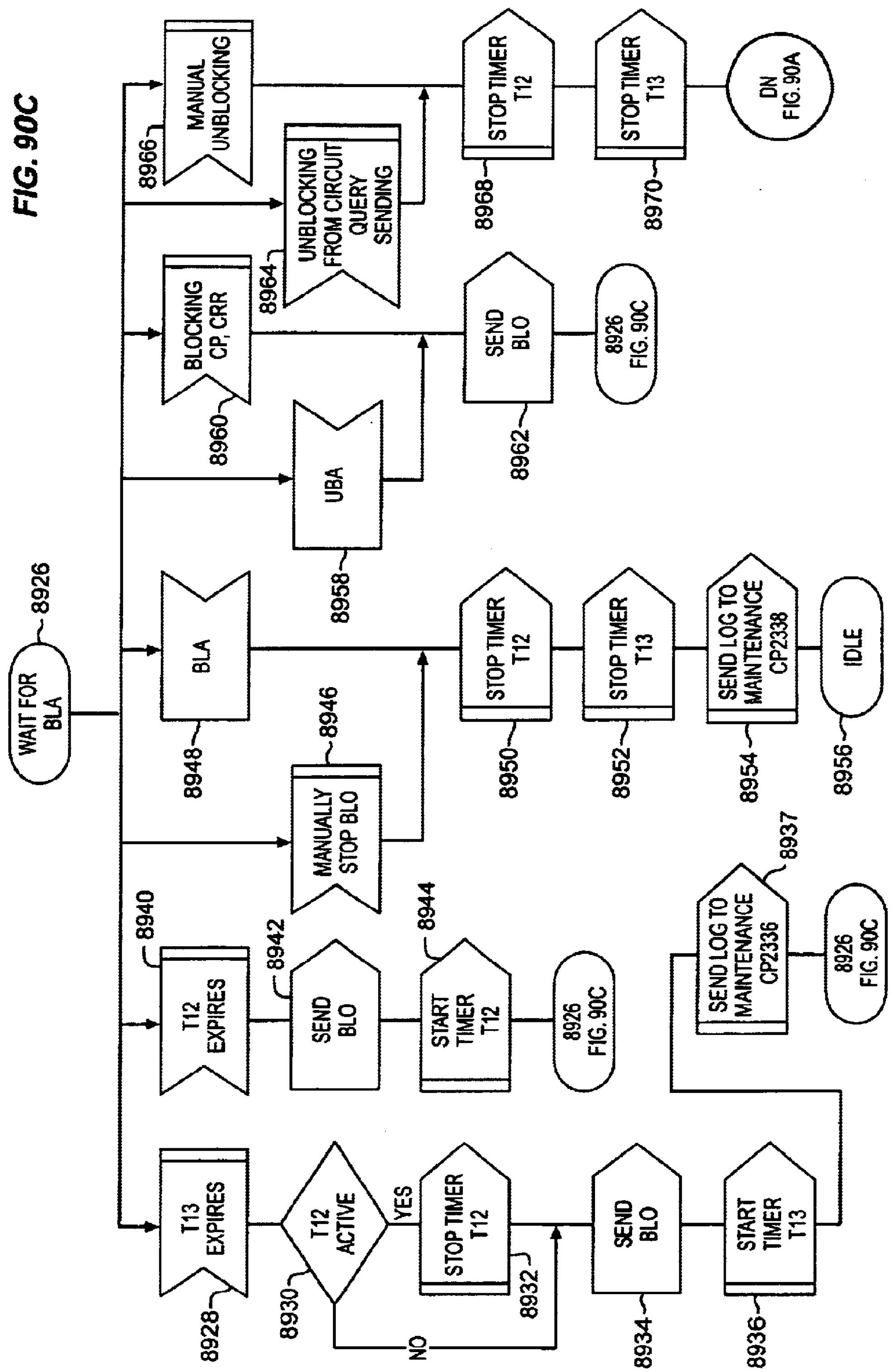
Figure 90D:
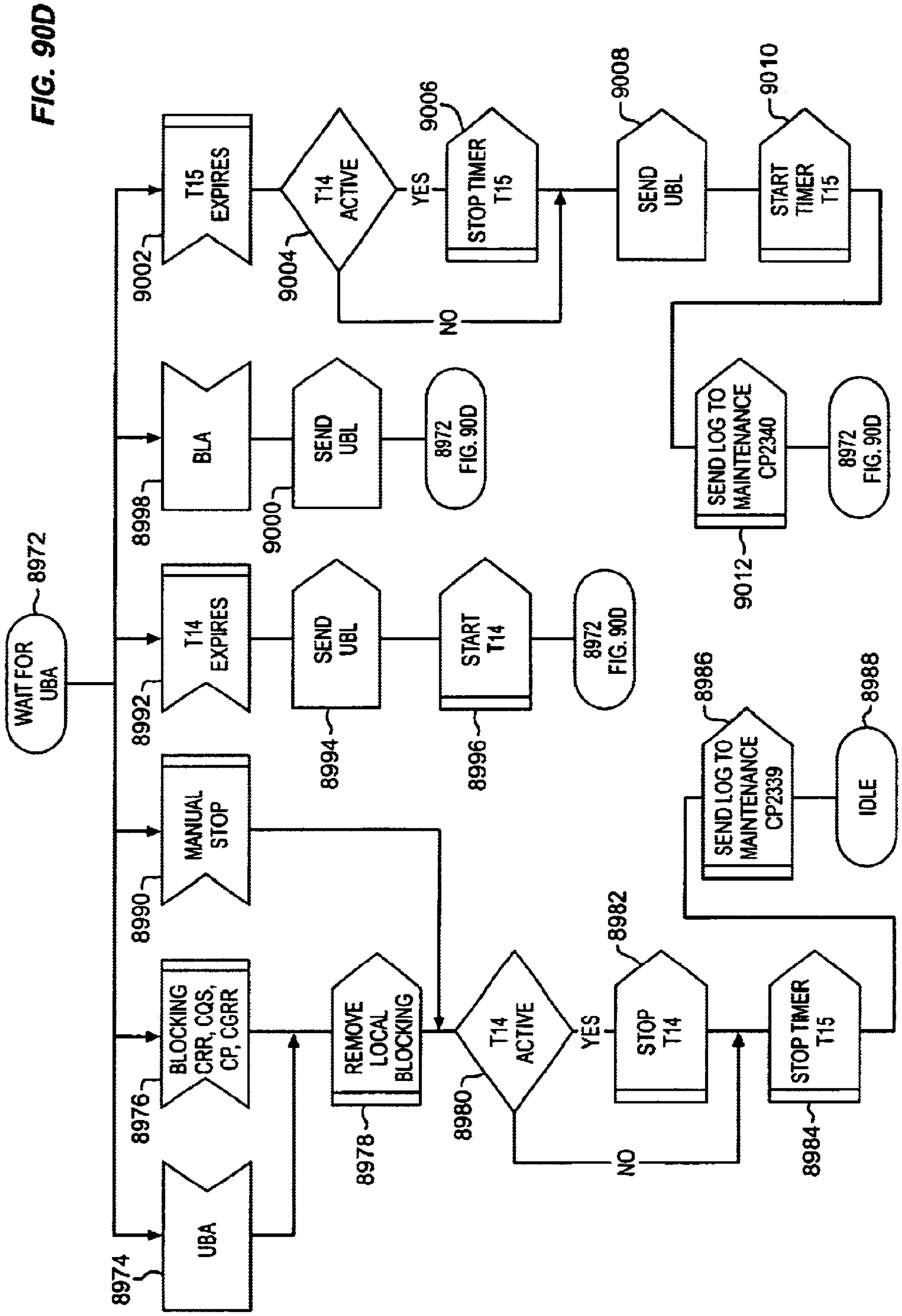

FIG. 89 illustrates a blocking message (BLO) and an unblocking message (UBL) receiving process (BLR). The process is idle at 8844. If a UBL is received at 8846, the circuit blocking status is checked at 8848. If the circuit is remotely blocked at 8850, the remote blocking is removed at 8852. After step 8852, or if the circuit is not remotely blocked at 8850, a UBA is sent at 8854. A log is sent to maintenance at 8856, and idle is attained at 8858.

If a BLO is received at 8860 while the process is idle at 8844, the circuit status is checked at 8862. If the circuit is not remotely blocked at 8864, a blocking request is sent to call processing at 8866. The circuit status is updated to identify the circuit as remotely blocked at 8868. The CRO process is stopped at 8870, and the CRI process is stopped at 8872. After step 8872 or if the circuit is remotely blocked at 8864, a log is sent to maintenance at 8874. A BLA is sent at 8876, and idle is attained at 8878.

Blocking and Unblocking Message Sending

FIGS. 90A–90D illustrate a blocking and unblocking message sending process (BLS). The process is idle at 8880. If manual blocking is initiated at 8882, or if blocking is initiated by call processing (CP), the circuit query sending process (CQS), the circuit reset reception process (CRR), or the circuit group reset reception process (CGRR) at 8884, the circuit status is updated to identify the circuit as locally blocked at 8886. The CRO process is stopped at 8888, and the CRI process is stopped at 8890. A BLO is sent at 8892. The T12 timer is started at 8894, and the T13 timer is started at 8896. The process then continues at step 8926.

If a UBA is received at 8898, the circuit status is checked at 8900. If the circuit is not locally blocked at 8902, idle is attained at 8904. If the circuit is locally blocked at 8902, a BLO is sent at 8892. The T12 and T13 timers are started at 8894 and 8896. The process then continues at step 8926.

If manual unblocking is initiated at 8906, or if unblocking is initiated from the CQS process at 8908, a UBL is sent at 8910. The T14 timer is started at 8912, and the T15 timer is started at 8914. The process then continues at step 8972.

If a BLA is received at 8916, the circuit status is checked at 8918. If the circuit is locally blocked at 8920, a log is sent to maintenance at 8922. Idle then is attained at 8924. If the circuit is not locally blocked at 8920, a UBL is sent at 8910. The T14 and T15 timers are started at 8912 and 8914. The process then continues at step 8972.

The process is waiting for a BLA at 8926. If the T13 timer expires at 8928, and if the T12 timer is active at 8930, the T12 timer is stopped at 8932. After step 8932, or if the T12 timer is not active at 8930, a BLO is sent at 8934. The T13 timer is started at 8936, and a log is sent to maintenance at 8938. The process then continues at step 8926.

If the T12 timer expires at 8940, a BLO is sent at 8942. The T12 timer is started at 8944, and the process continues at step 8926.

If the BLO is manually stopped at 8946, or if a BLA is received at 8948, the T12 and T13 timers are stopped at 8950 and 8952. A log is sent to maintenance at 8954, and idle is attained at 8956.

If a UBA is received at 8958, or if blocking is initiated from the CP process or the CRR process at 8960, a BLO is sent at 8962. The process then continues at step 8926.

If unblocking is initiated by the CQS at 8964, or if manual unblocking is initiated at 8966, the T12 timer is stopped at 8968. The T13 timer is stopped at 8970. The process then continues at step 8910.

The process is waiting for a UBA at 8972. If a UBA is received at 8974, or if blocking is initiated by the CRR, the CQS, the CP process, or the CGRR at 8976, the local blocking is removed from the circuit at 8978. If the T14 timer is active at 8980, the T14 timer is stopped at 8982. After step 8982 or if the T14 timer is not active at 8980, the T15 timer is stopped at 8984. A log is sent to maintenance at 8986, and idle is attained at 8988.

If a manual stop is initiated at 8990, and if the T14 timer is active at 8980, the T14 timer is stopped at 8982. After step 8982 or if the T14 timer is not active at 8980, the T15 timer is stopped at 8984. A log is sent to maintenance at 8986, and idle is attained at 8988.

If the T14 timer expires at 8992, a UBL is sent at 8994. The T14 timer is started at 8996, and the process continues at step 8972.

If a BLA is received at 8998, a UBL is sent at 9000. The process then continues at step 8972.

If the T15 timer expires at 9002, and if the T14 timer is active at 9004, the T14 timer is stopped at 9006. After step 9006 or if the T14 timer is not active at 9004, a UBL is sent at 9008. The T15 timer is started at 9010, and a log is sent to maintenance at 9012. The process then continues at step 8972.

Circuit Reset Receiving

Figure 91A:
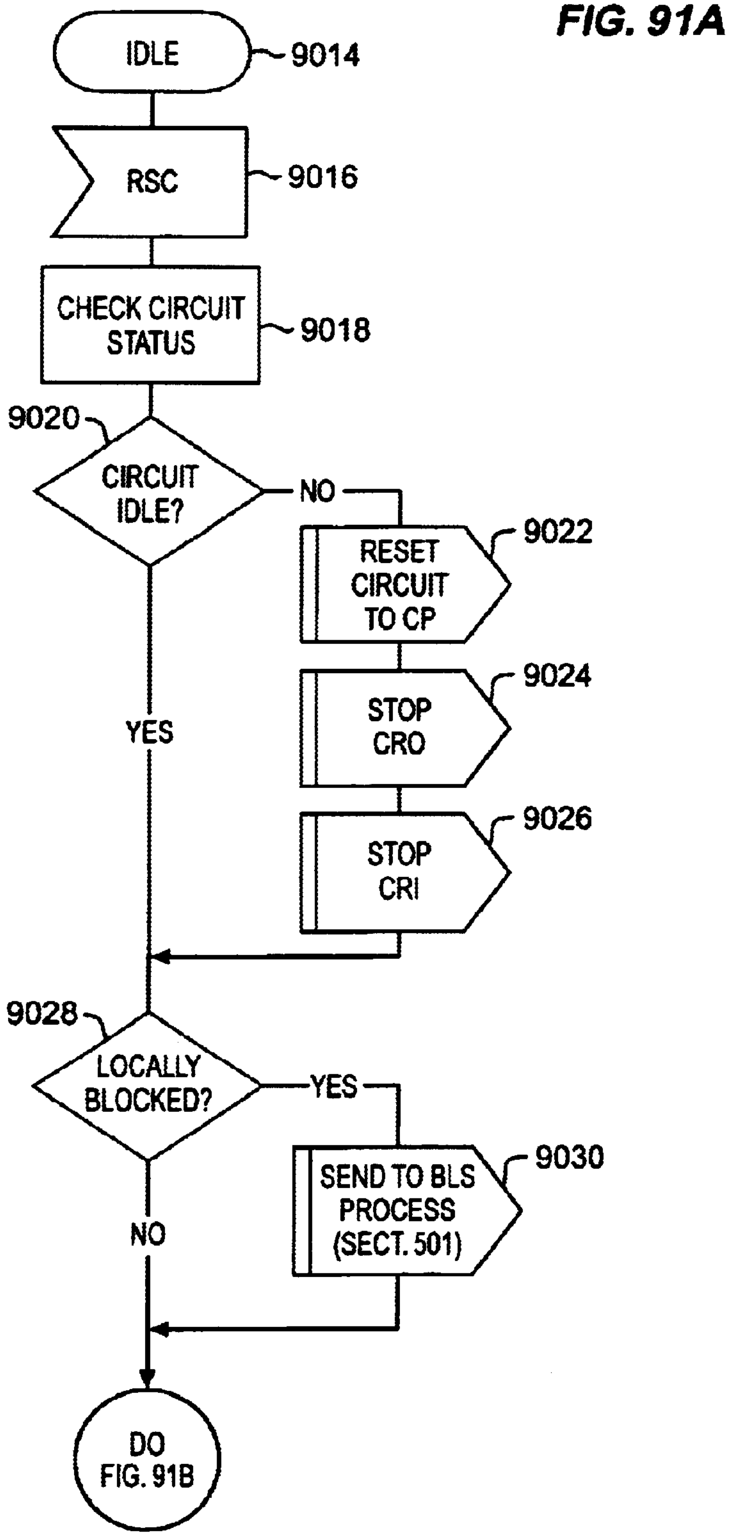
FIGS. 91A–91B are SDL diagrams of logic used in a version of the invention for a circuit reset reception process.
Figure 91B:
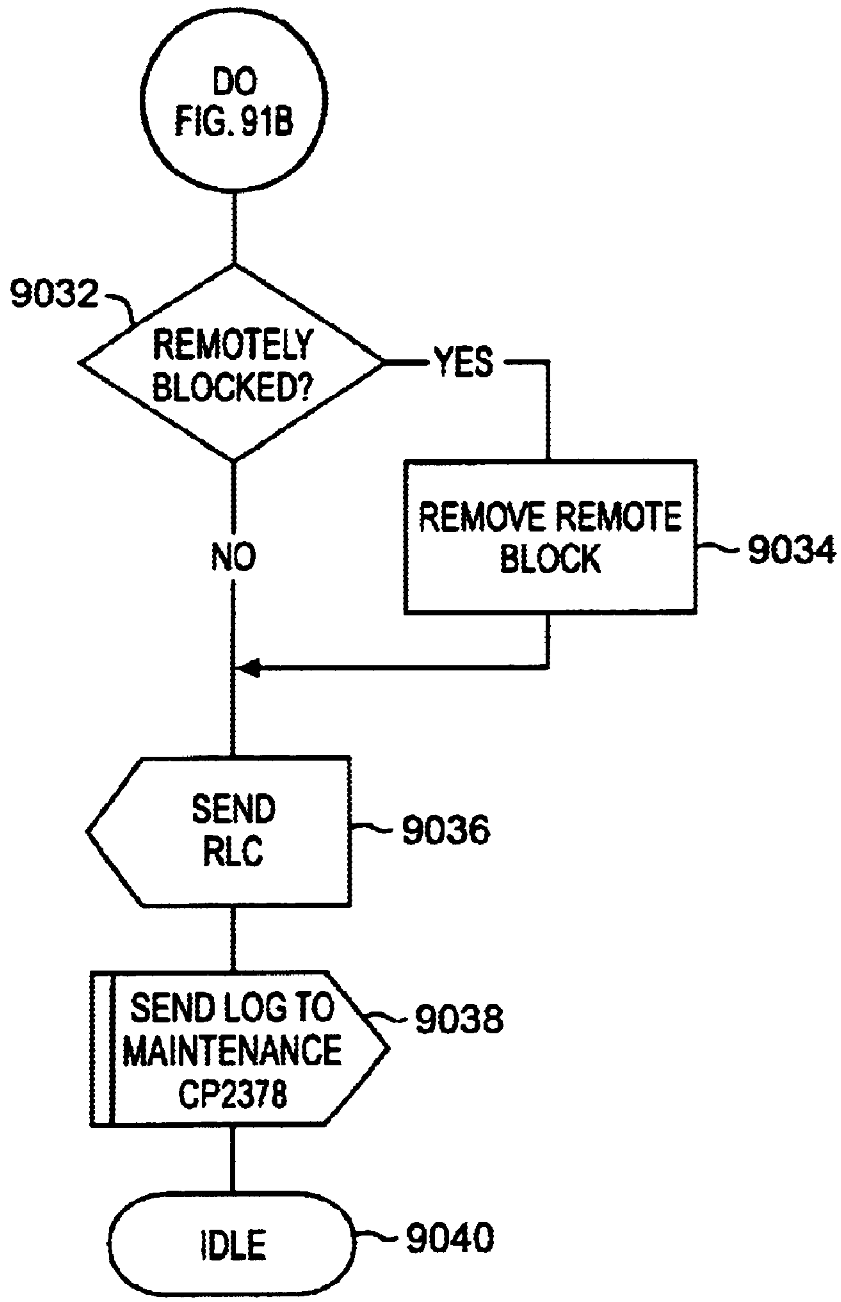

FIGS. 91A–91B illustrate the circuit reset message receiving process (CRR). The CRR process is idle at 9014. An RSC is received at 9016, and the circuit status is checked at 9018. If the circuit is not idle at 9020, the circuit is reset at 9022. The CRO process is stopped at 9020, and the CRI process is stopped at 9026. After step 9026 or if the circuit is idle at 9024, it is determined if the circuit is locally blocked at 9028. If the circuit is locally blocked at 9028, the BLS process is initiated at 9030. After step 9030 or if the circuit is not locally blocked at 9028, it is determined if the circuit is remotely blocked at 9032.

If the circuit is remotely blocked at 9032, the remote blocking is removed at 9034. After step 9034 or if the circuit is not remotely blocked at 9032, an RLC is sent at 9036. A log is sent to maintenance at 9038, and idle is attained at 9040.

Circuit Reset Sending

Figure 92A:
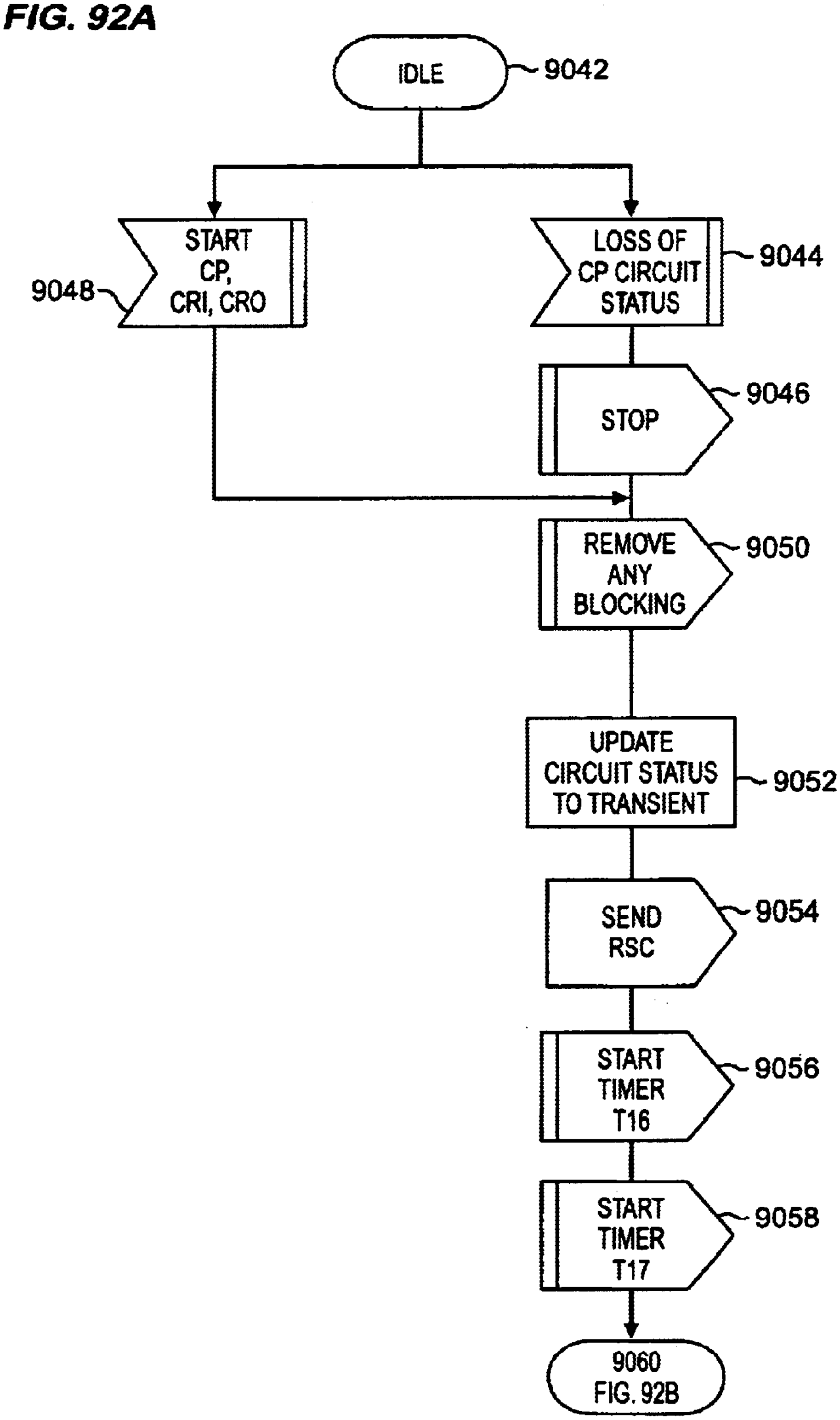
FIGS. 92A–92B are SDL diagrams of logic used in a version of the invention for a circuit reset sending process.
Figure 92B:
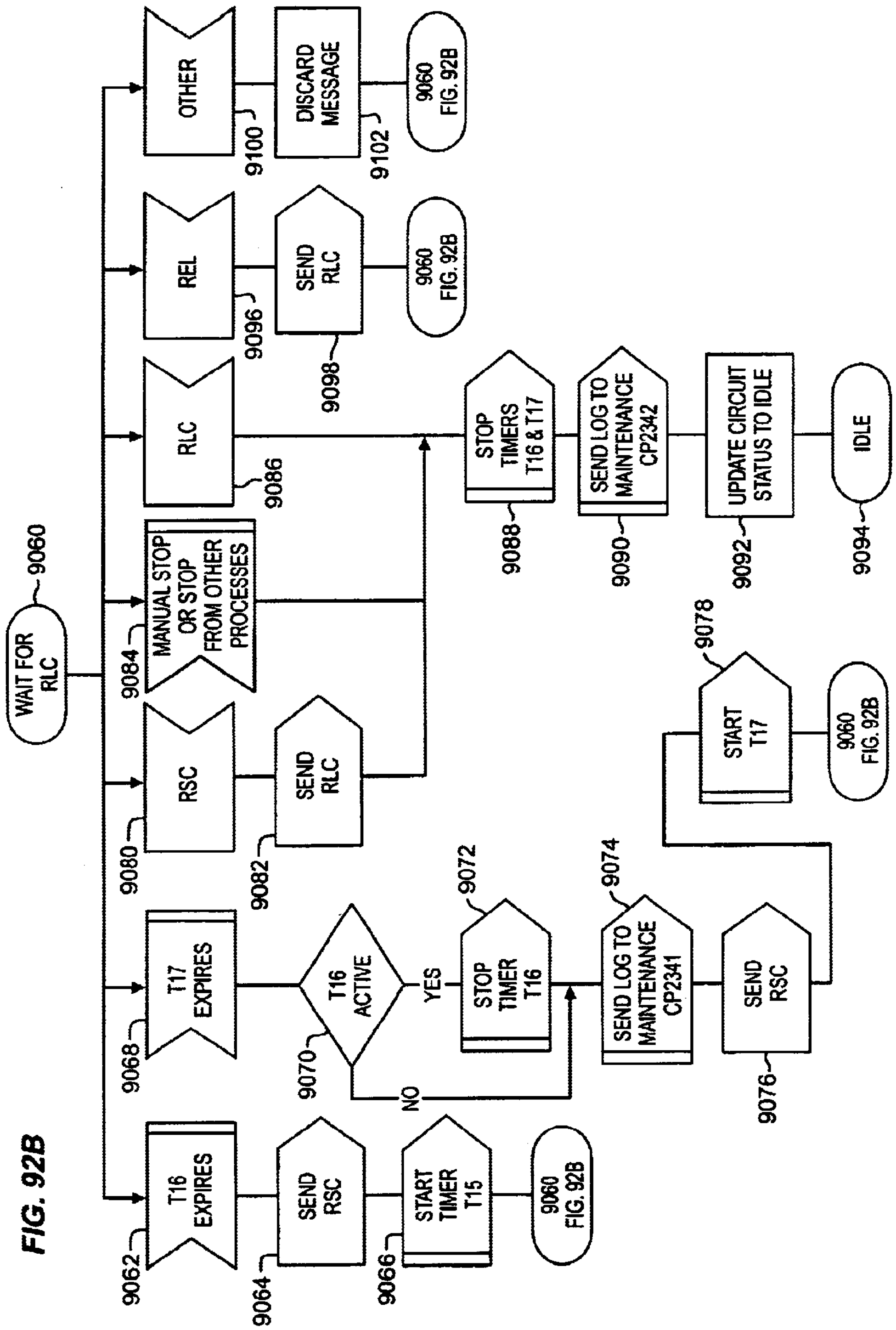

FIGS. 92A–92B illustrate the circuit reset sending (CRS) process. The CRS process is idle at 9042. If the call processor loses the circuit status at 9044, all processes for this circuit are stopped at 9046. After step 9046 or if the CP process, the CRI process, or the CRO process are started at 9048, local and or remote blocking are removed from the circuit at 9050. The circuit status is updated to transient at 9052, and an RSC is sent at 9054. The T1 timer is started at 9056, and the T17 timer is started at 9058. The process then continues at step 9060.

The process waits for an RLC at 6060. If the T16 timer expires at 9062, an RSC is sent at 9064. The T16 timer is started at 9066, and the process continues at step 9060.

If the T17 timer expires at 9068, and if the T16 timer is active at 9070, the T16 timer is stopped at 9072. After step 9072 or if the T16 timer is not active at 9070, a log is sent to maintenance at 9074. An RSC is sent at 9076, and the T17 timer is started at 9078. The process then continues at step 9060.

If an RSC is received at 9080, an RLC is sent at 9082. After step 9082, if a manual stop is received from other processes at 9084, or if an RLC is received at 9086, the T16 and T17 timers are stopped at 9088. A log is sent to maintenance at 9090, and the circuit status is updated to idle at 9092. Idle is attained at 9094.

If an REL is received at 9096, an RLC is sent at 9098. The process then continues at step 9060.

If any other messages are received at 9100, the message is discarded at 9102. The process then continues at step 9060.

Circuit Query Message Receiving

Figure 93:
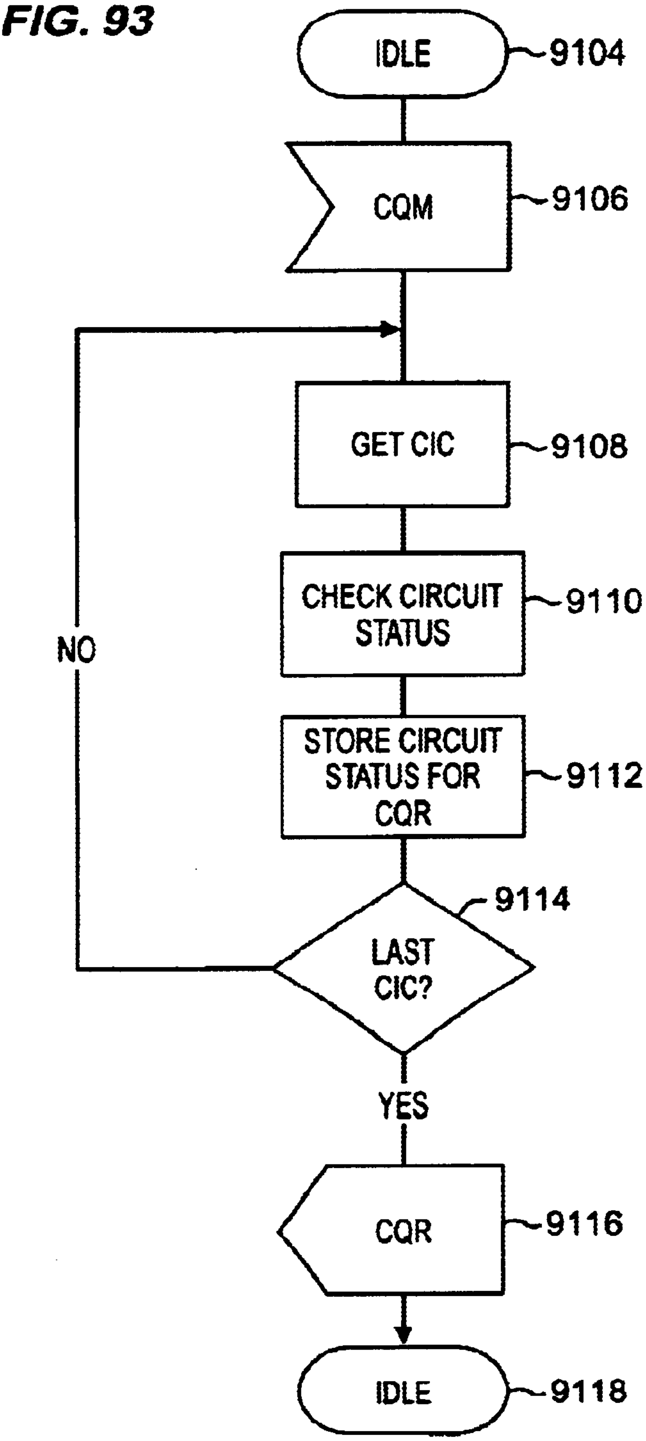
FIG. 93 is an SDL diagram of logic used in a version of the invention for a circuit query message reception process.

FIG. 93 illustrates the circuit query message receiving process (CQR). The process is idle at 9104. If a CQM is received at 9106, the CIC is obtained for each circuit in the range of circuits at 9108. The trunk circuit table is checked to determine the circuit status at 9110. The circuit status is stored for use with the CQR at 9112. If the CIC that was received from the circuit status check is not the last CIC in the range parameter at 9114, then the process continues at step 9108. If the CIC is the last CIC at 9114, the CQR is sent at 9116. Idle is attained at 9118.

Circuit Query Message Sending

Figure 94:
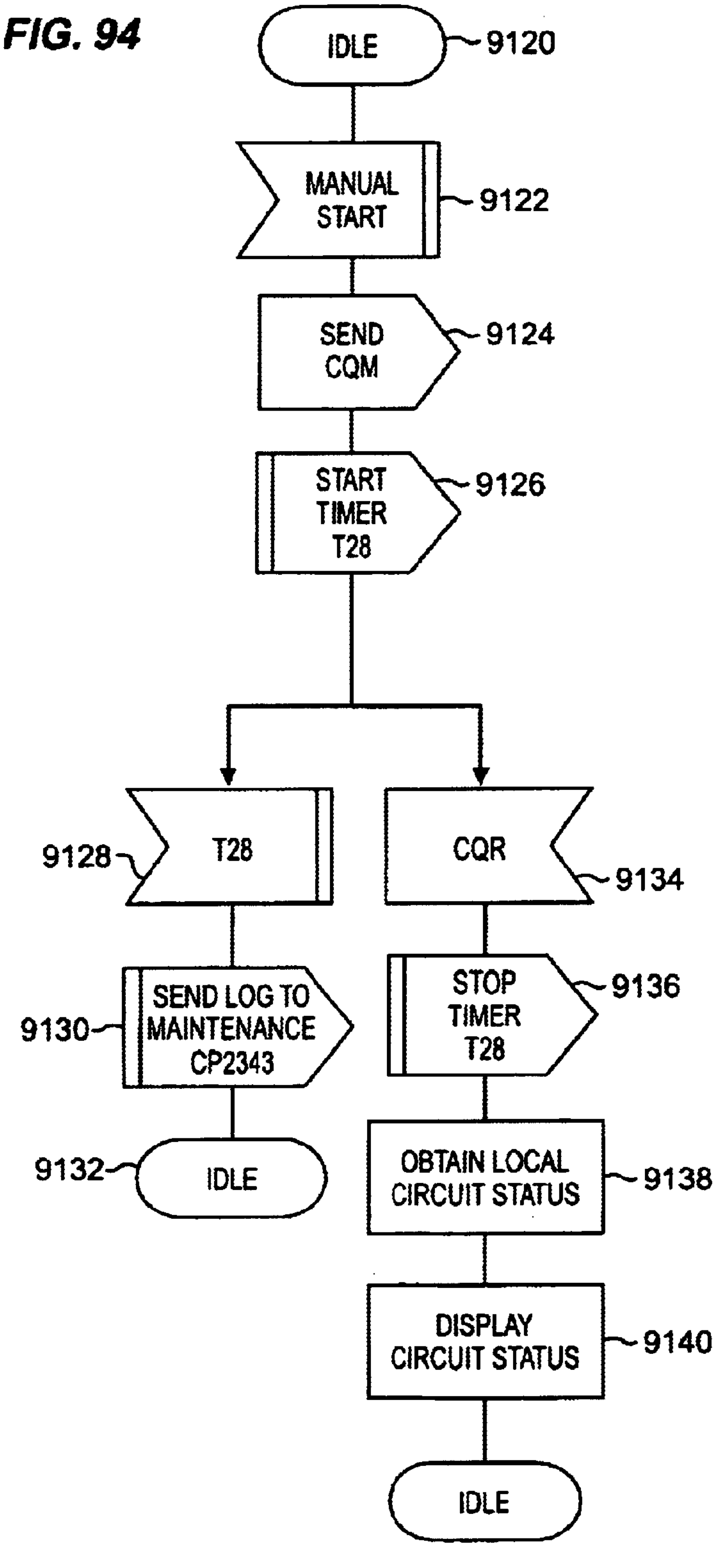
FIG. 94 is an SDL diagram of logic used in a version of the invention for a circuit query message sending process.

FIG. 94 illustrates the circuit query sending (CQS) process. The process is idle at 9120. If a manual start is initiated at 9122, a CQM is sent at 9124. The T28 timer is started at 9126. If the T28 timer expires at 9128, a log is sent to maintenance at 9130. Idle is attained at 9132.

If a CQR is received at 9134, the T28 timer is stopped at 9136. The local circuit status is obtained at 9138, and the circuit status is displayed at 9140. Idle is attained at 9142.

Circuit Group Block/Unblocking Message Receiving

Figure 95A:
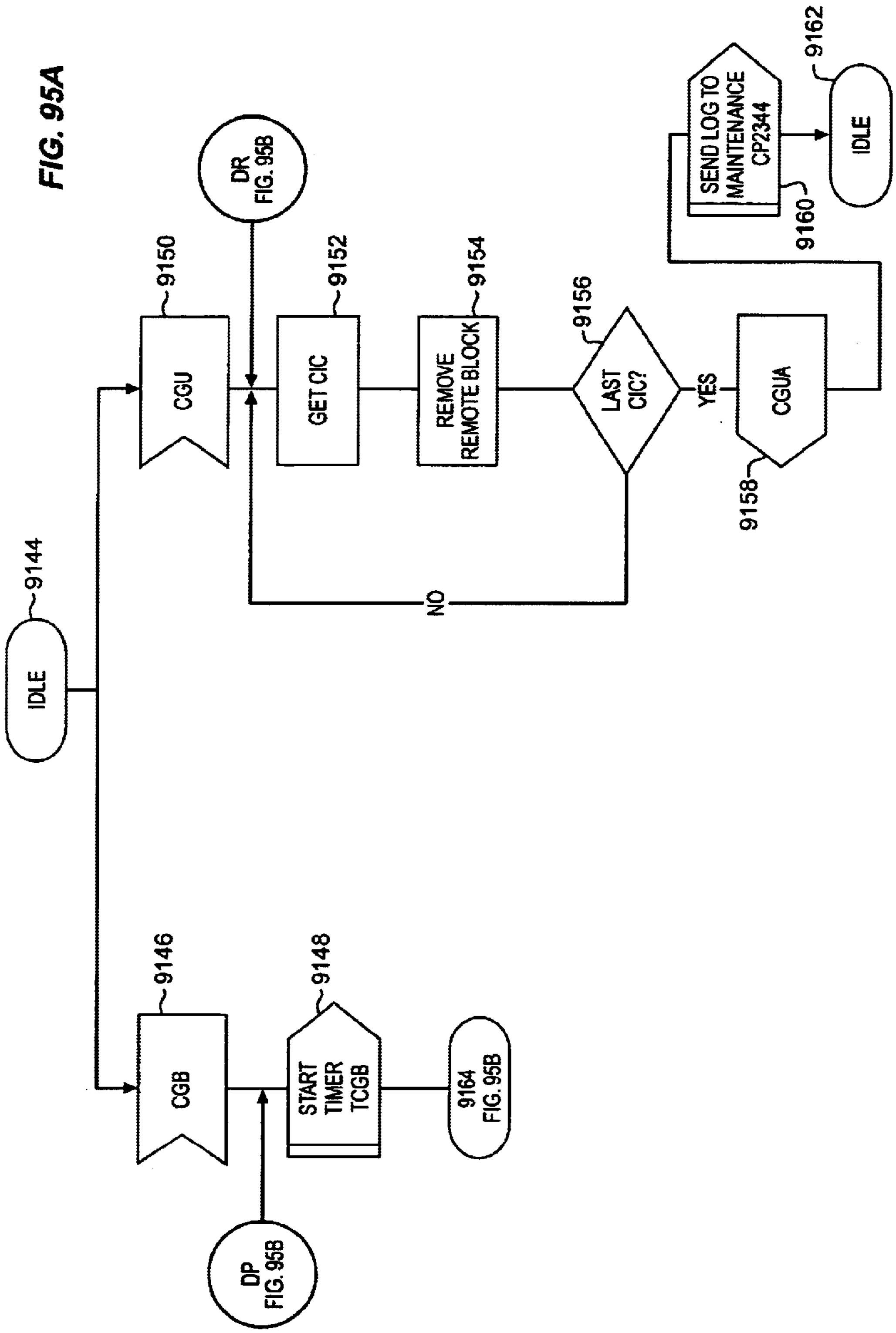
FIGS. 95A–95C are SDL diagrams of logic used in a version of the invention for a circuit group blocking/unblocking reception process.
Figure 95B:
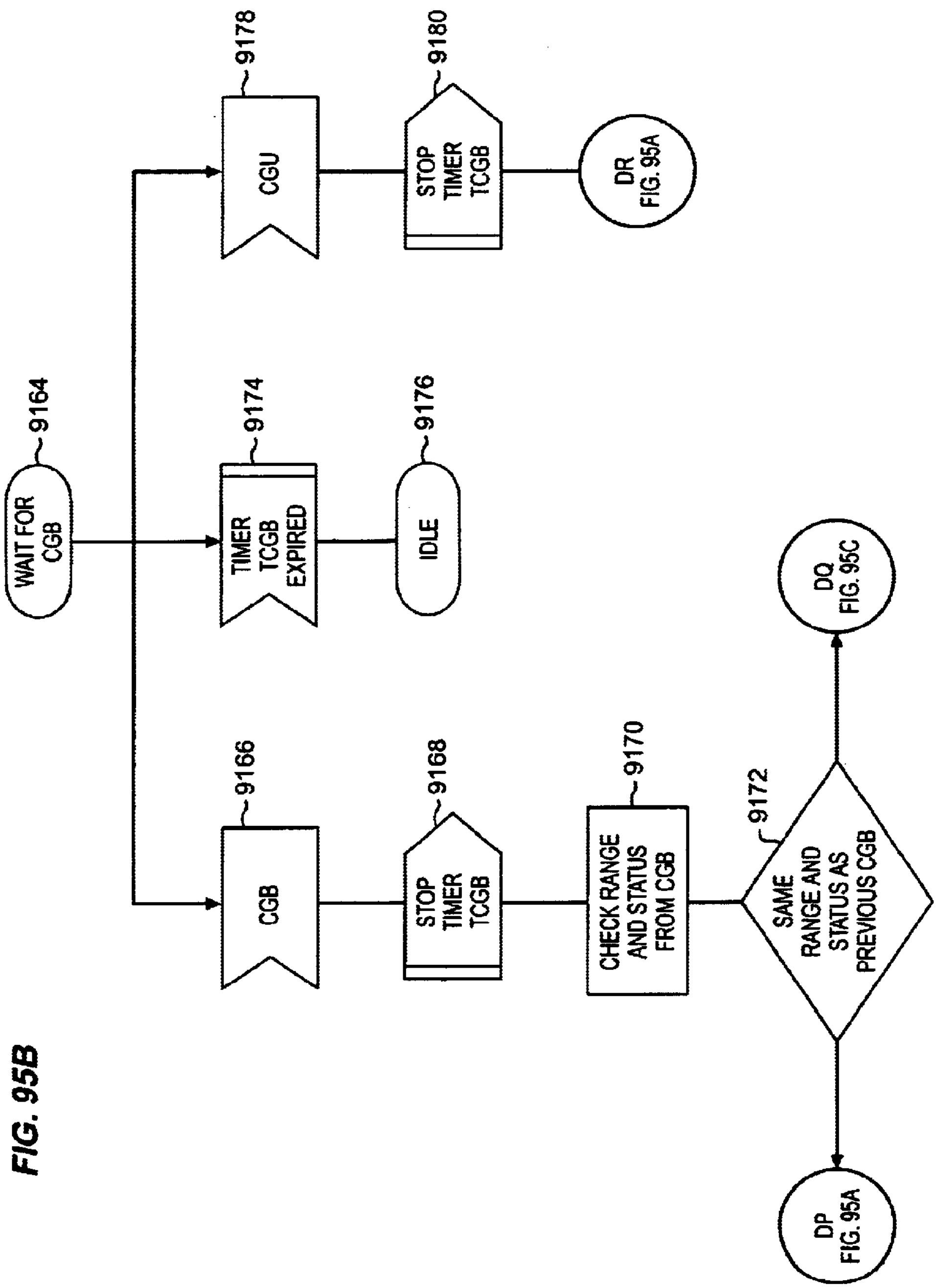
Figure 95C:
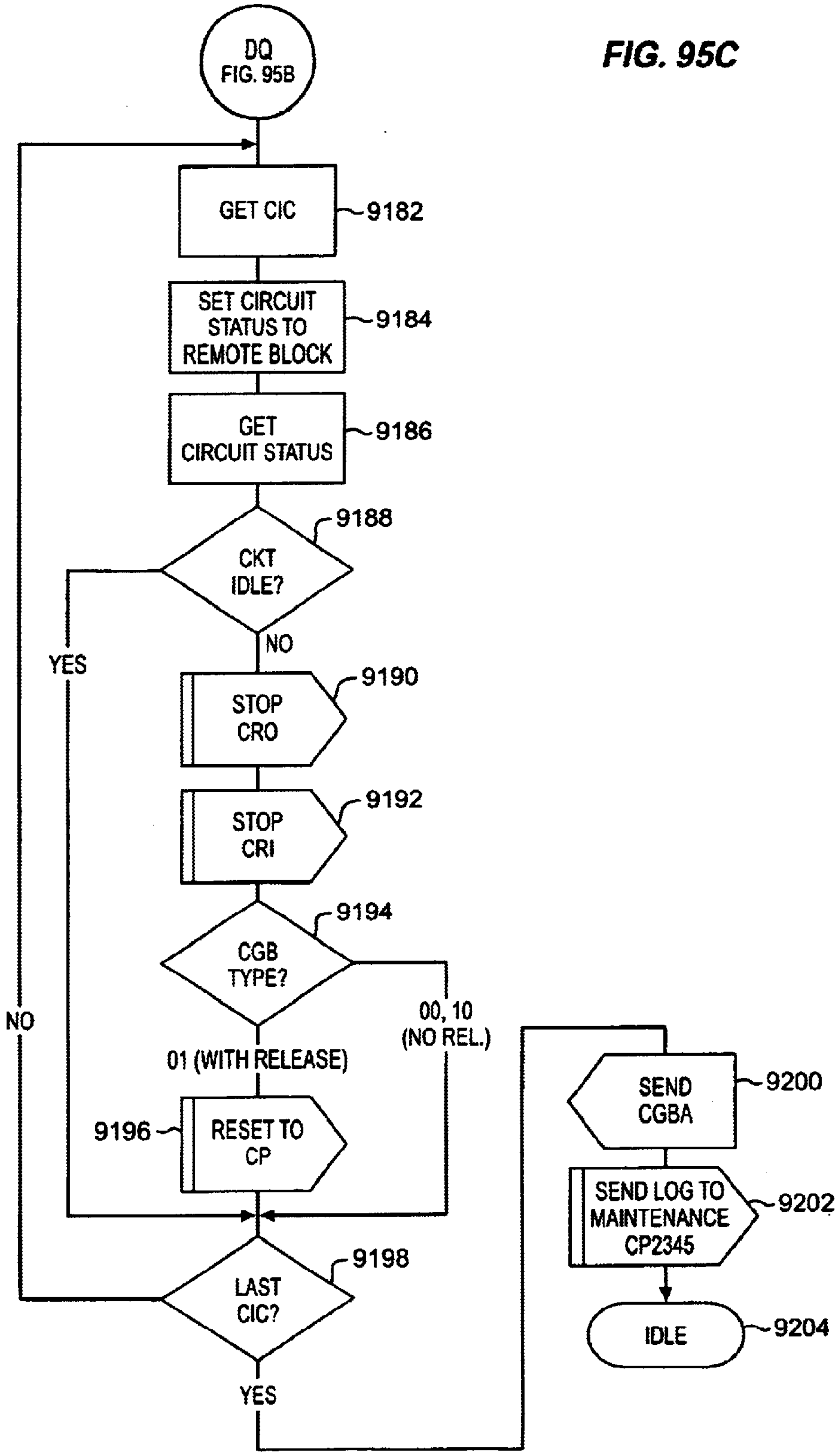

FIGS. 95A–95C illustrate a process for the circuit group blocking (CGB) and circuit group unblocking (CGU) receiving (GBUR) process. On FIG. 95A, the process is idle at 9144. If a CGB is received at 9146, the Tcgb timer (T18) is started at 9148. The process then continues at step 9164.

If a CGU is received at 9150, the CIC is obtained at 9152. The remote blocking is removed for the circuit at 9154. If the CIC is not the last CIC in the specified range at 9156, the process continues at step 9152, and the next CIC is obtained. This process continues until the last CIC is obtained. If the last CIC is obtained at 9156, a CGUA is sent at 9158. A log is sent to maintenance at 9160, and idle is attained at 9162.

The process waits for a CGB at 9164. If the CGB is received at 9166, the Tcgb timer (T18) is stopped at 9168. The range and status of the circuit from the CGB are checked at 9170. If the range and status are the same as the previous CGB at 9172, the process continues at step 9182. If the range and status are not the same as the previous CGB at 9172, the process continues at step 9148.

If the Tcgb timer (T18) expires at 9174, idle is attained at 9176. If a CGU is received at 9178, the Tcgb timer (T18) is stopped at 9180. The process then continues at step 9152.

The CIC is obtained at 9182. The circuit status is set for remote blocking at 9184. The circuit status is obtained from the trunk circuit table at 9186. If the circuit is not set to idle at 9188, the CRO process is stopped at 9190. The CRI process is stopped at 9192. If the CGB type is a 01 so that it is with release at 9194, the circuit is reset to idle at 9196. After step 9196, if the circuit is idle at 9198, or if the CGB type is a 00 or a 10 so that it is with no release at 9194, it is determined if the CIC is the last CIC in the range at 9198. If it is not the last CIC at 9198, the process continues at step 9182 to obtain another CIC. If this is the last CIC within the range at 9198, a CGBA is sent at 9200. A log is sent to maintenance at 9202, and idle is attained at 9204.

Circuit Group Blocking and Unblocking Sending

FIGS. 96A–96M illustrate a circuit group blocking and circuit group unblocking sending (GBUS) process. The process is idle at 9208. The circuit group blocking with no release is initiated from maintenance at 9210. A CGB with no release is sent at 9212 and 9214. The CIC is obtained at 9216, and the circuit is set to locally blocked at 9218. If the CIC is not the last CIC in the range at 9220, the process continues at step 9216. If the CIC is the last CIC at 9220, the T18 timer is started at 9222. The T19 timer is started at 9224. The process then continues at step 9326.

If the circuit group blocking with release is initiated for maintenance at 9226, a CGB is sent at 9228 and 9230. The CIC for this circuit is obtained at 9232, and the circuit status is set to locally blocked at 9234. The call status is obtained at 9236. If the circuit is not idle at 9238, the circuit is reset to idle at 9240. After step 9240 or if the circuit is idle at 9238, a log is sent to maintenance at 9242. If the CIC is not the last CIC within the range at 9244, the process continues to step 9232 to obtain another CIC. If the CIC is the last CIC within the range at 9244, the T18 timer and the T19 timer are started at 9246 and 9248. The process then continues at step 9392.

If group unblocking with no release is initiated for maintenance at 9250, a CGU with no release is sent at 9252. The T20 timer is started at 9254, and the T21 timer is started at 9256. The process then continues at step 9458.

If the group unblocking with release process is initiated for maintenance at 9258, a CGU with release is sent at 9260. The T20 timer and the T21 timer are started at 9262 and 9264, respectively. The process then continues at step 9524.

If a CGBA is received at 9266, the CIC is obtained at 9268. The status of the circuit is obtained at 9270. If the circuit is not locally blocked at 9272, the bit is set in the status field at 9274 so that a circuit group unblocking message shall be sent for the circuit. However, if the circuit is locally blocked at 9272, the step at 9274 for setting the bit and the status field is skipped. Next, at 9276, if it is determined that the CIC that was obtained at step 9268 is not the last CIC within the range specified in the CGBA, then the process returns to step 9268 to obtain another CIC in the range. If the CIC was the last CIC in the range at 9276, then it is determined if the bits are set for the CGBA type at 9278. If the bits are not set for the CGBA type at 9278, the process returns to idle at 9280. If the bits for the CGBA type are set at 9278, then the bit type is determined at step 9298.

If a CGUA is received at 9282, and the CGUA is not expected as an acknowledgement for any circuit group unblocking message, the CIC is obtained at 9284. The trunk circuit table is queried to determine the circuit status at 9286. If the circuit is locally blocked at 9288, the bit in the status field is set at 9290 so that a circuit group blocking message will be sent for that circuit. If the circuit is not locally blocked at 9288, then the step at 9290 is skipped.

At 9292, it is determined if the CIC that was obtained at step 9284 is the last CIC within the range. If the CIC was not the last CIC within the range at 9292, the process returns to step 9284, and the next CIC within the range is obtained. If the CIC is the last CIC within the range at 9292, then it is determined if the CGUA bits for the indicator type are set at 9294. If the bits are not set at 9294, the process returns to idle at 9296. If the bits are set at 9294, the bit types are determined at step 9312.

At 9298, if the CGBA type is a 00 so that it is without release or if the indicator type is a 10, then a CGU is sent with no release or 10 at 9300. The T20 timer is started at 9302, and the T21 timer is started at 9304. The process then continues at step 9458.

If the CGBA type is a 01 so that the CGUA is with release at 9298, the CGU with release is sent at 9306. The T20 timer and the T21 timer are started at 9308 and 9310. The process then continues at step 9524.

At 9312, if the CGUA type is a 00 for no release or a 10, a CGB with no release is sent at 9314. The T18 timer is started at 9316, and the T1 timer is started at 9318. The process then continues at step 9326.

If the CGUA type is a 01 so that it is with release at 9312, a CGB is sent with release at 9320. The T18 timer is started at 9322, and the T19 timer is started at 9324. The process then continues at step 9392.

Figure 96A:
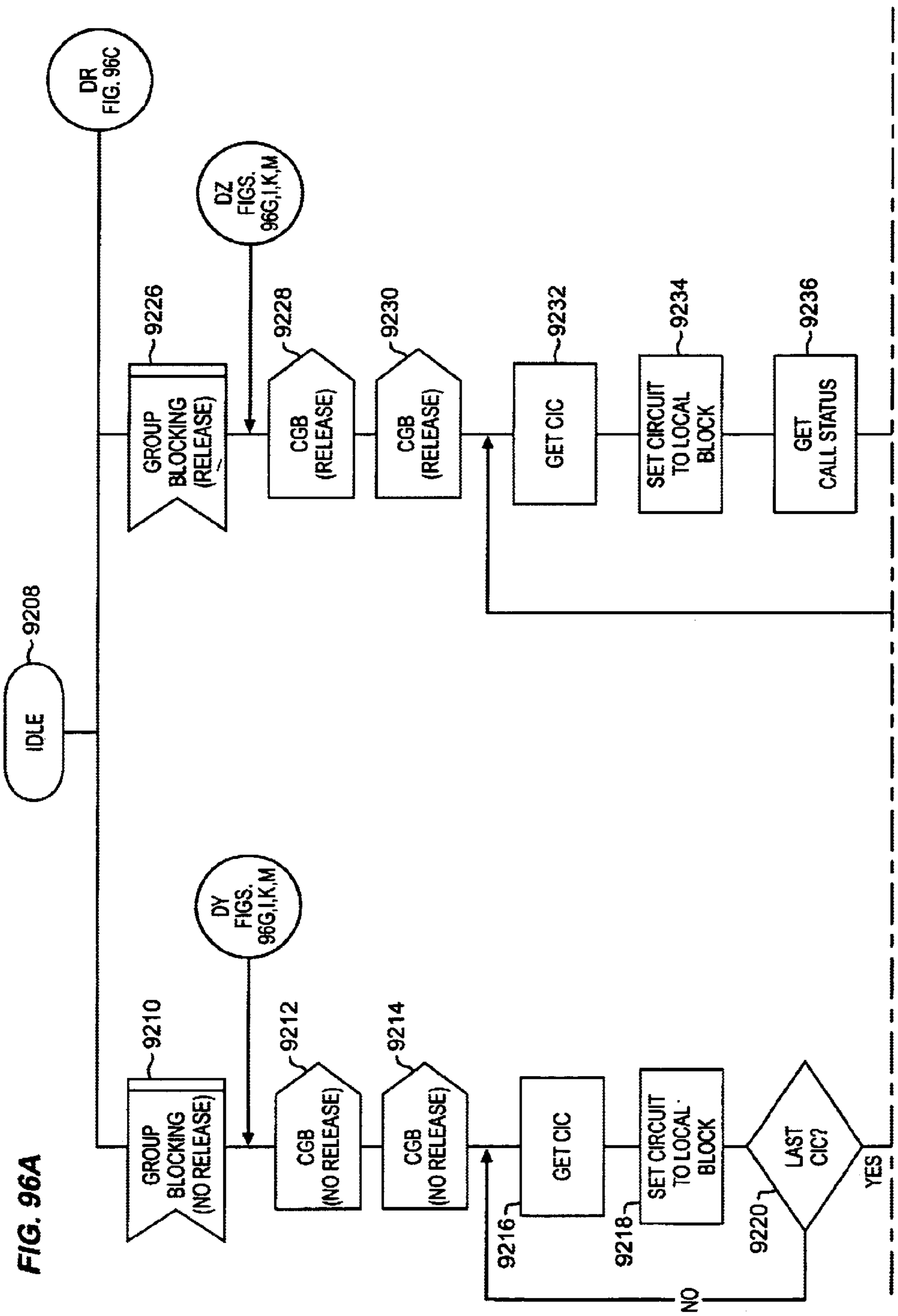
FIGS. 96A–96M are SDL diagrams of logic used in a version of the invention for a circuit group blocking/unblocking sending process.
Figure 96B:
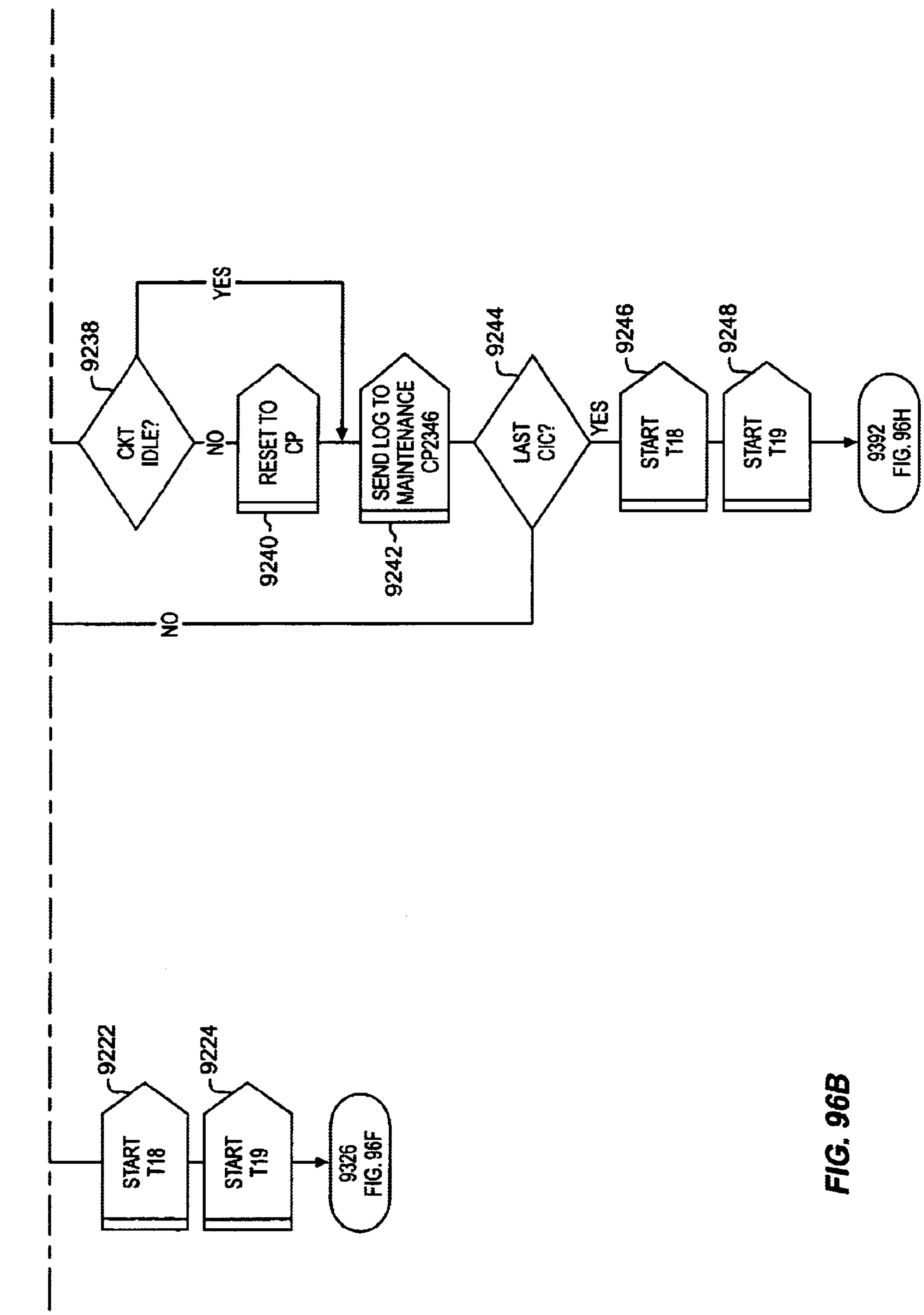
Figure 96C:
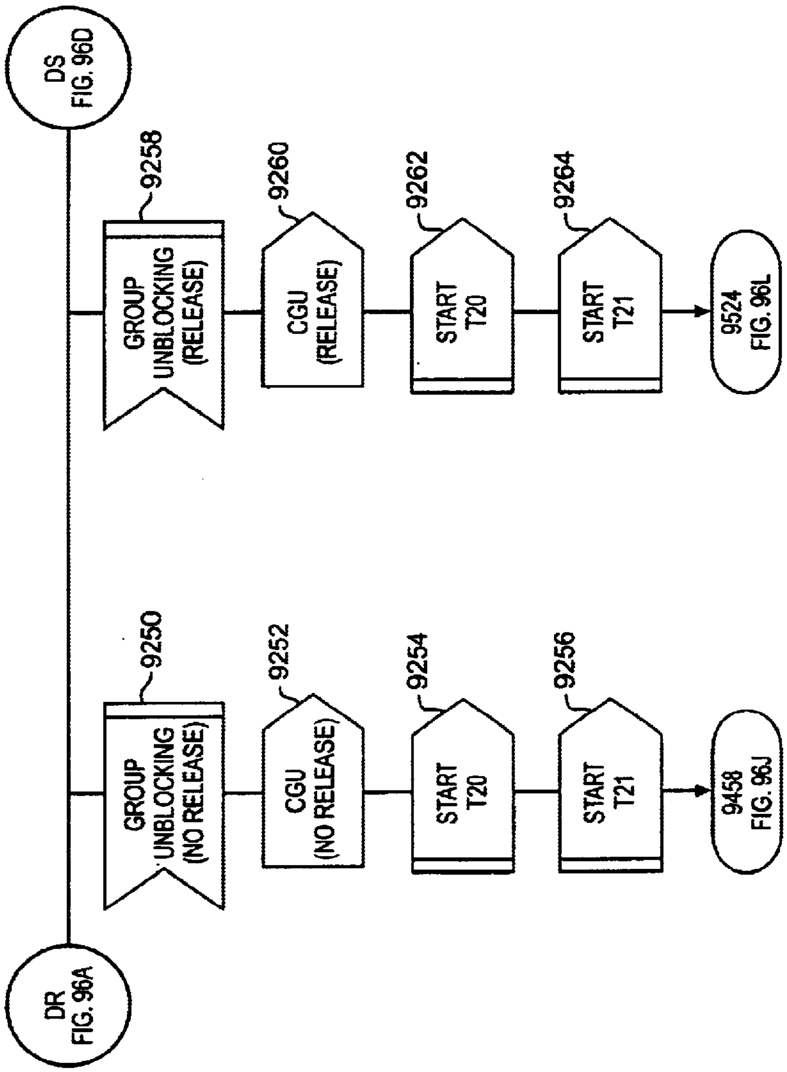
Figure 96D:
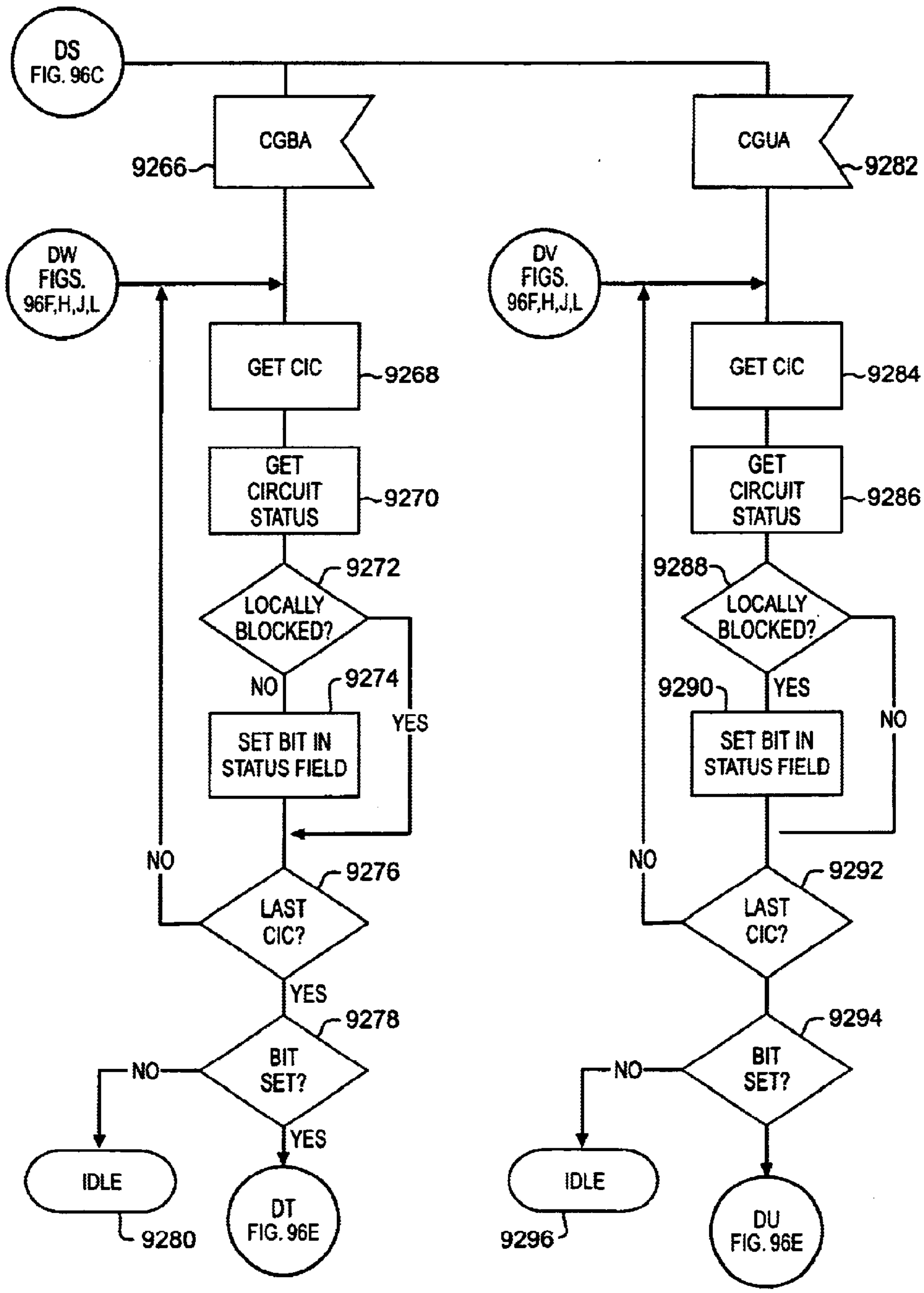
Figure 96E:
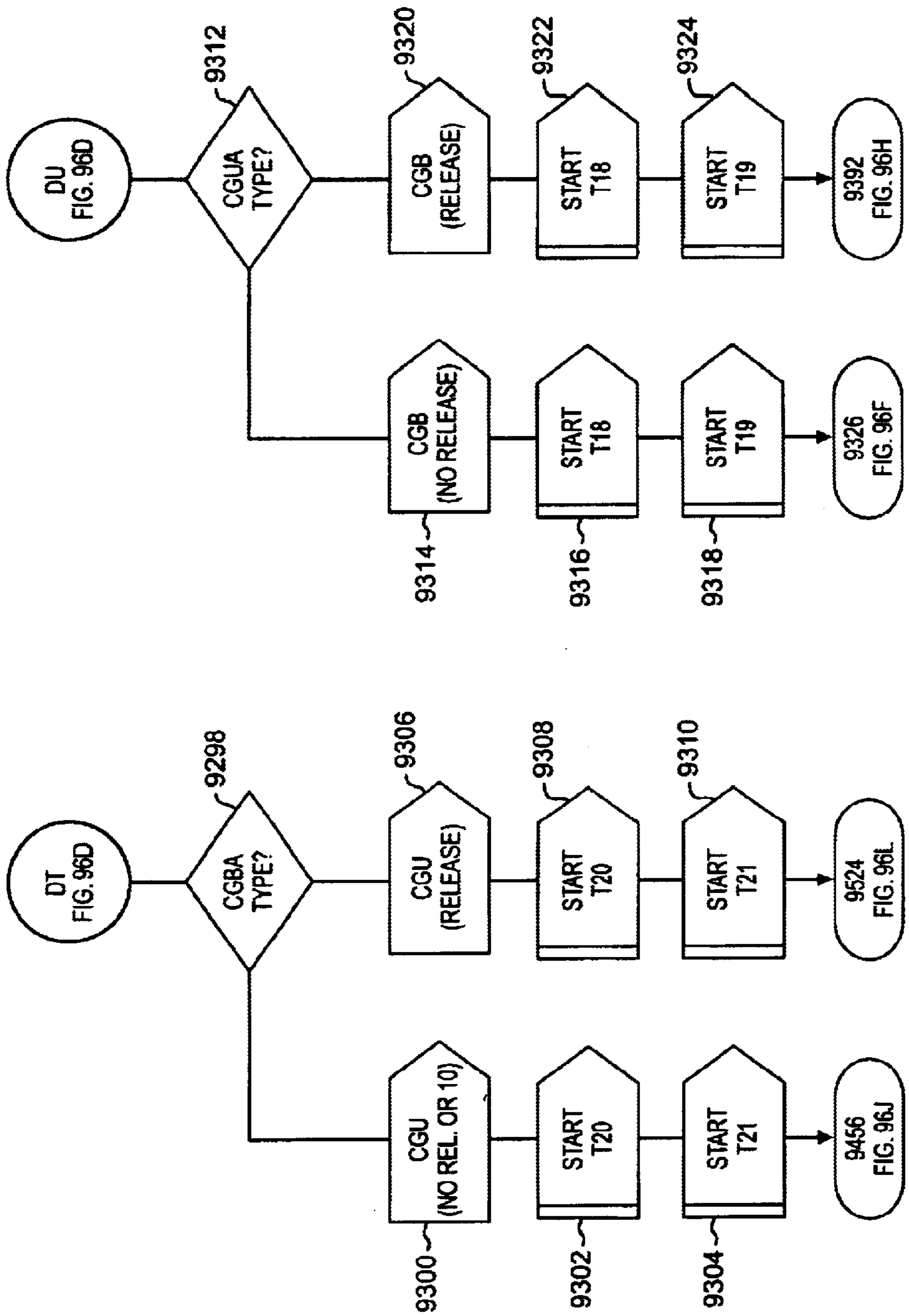
Figure 96F:
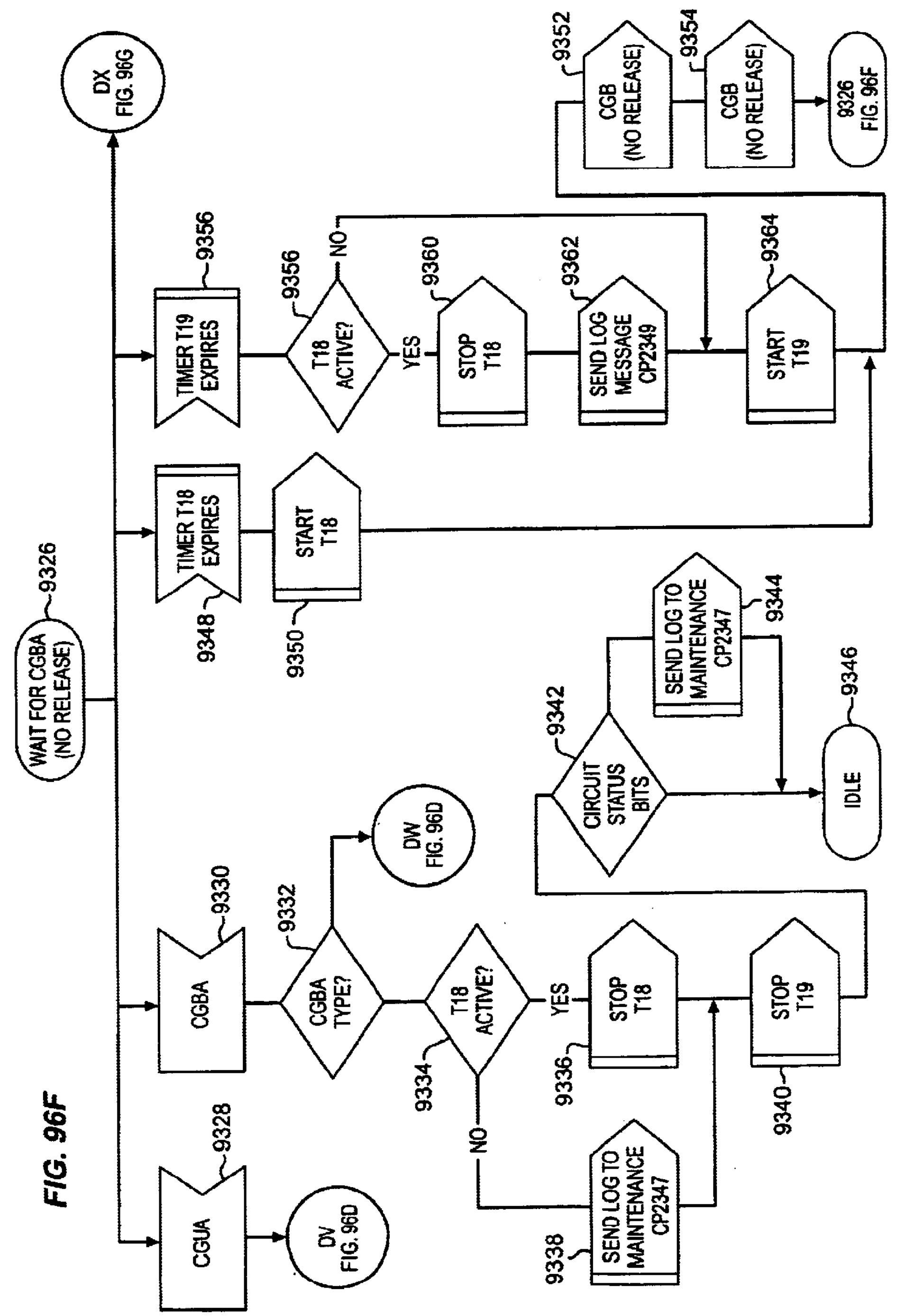

On FIG. 96E, the process is waiting for a CGBA with no release at 9326. If a CGUA is received at 9328, the process continues at step 9284. If a CGBA is received at 9330, the CGBA type is determined at 9332. If the CGBA is with release at 9332, the process continues at step 9268. If the CGBA type at 9332 is with no release, and if the T18 timer is active at 9334, the T18 timer is stopped at 9336. If the T18 timer is not active at 9334, a log is sent to maintenance at 9338.

Next, the T19 timer is stopped at 9340. The circuit status bits are checked at 9342. If there are too many circuits blocked or if there are too few circuits blocked at 9342, a log is sent to maintenance at 9344. Idle then is attained at 9346. If, however, the correct number of circuits are blocked at 9342, idle is attained at 9346 without sending a log to maintenance.

If the T18 timer expires at 9348, the T18 timer is started at 9350. A CGB with no release is sent at 9352 and 9354. The process then continues at step 9326.

If the T19 timer times out at 9356, and if the T18 timer is active at 9358, the T18 timer is stopped at 9360. A log is sent to maintenance at 9362. After step 9362 or if the T18 timer is not active at 9358, the T19 timer is started at 9364. A CGB with no release is sent at 9352. The CGB with no release is automatically retransmitted at 9354. The process then continues at step 9326.

If the group unblocking with no release is initiated at 9366, and if the T18 timer is active at 9368, the T18 timer is stopped at 9370. After step 9370, or if the T18 timer is not active at 9368, the T1 timer is stopped at 9372. The process then continues at step 9212.

If the group unblocking with release is initiated at 9374, and if the T18 timer is active at 9376, the T18 timer is stopped at 9378. After step 9378 or if the T18 timer is not active at 9376, the T19 timer is stopped at 9380. The process then continues at step 9228.

If a stop is initiated at 9382, and if the T18 timer is active at 9384, the T18 timer is stopped at 9386. After step 9386 or if the T18 timer is not active at 9384, the T19 timer is stopped at 9388. Idle is attained at 9390.

Figure 96G:
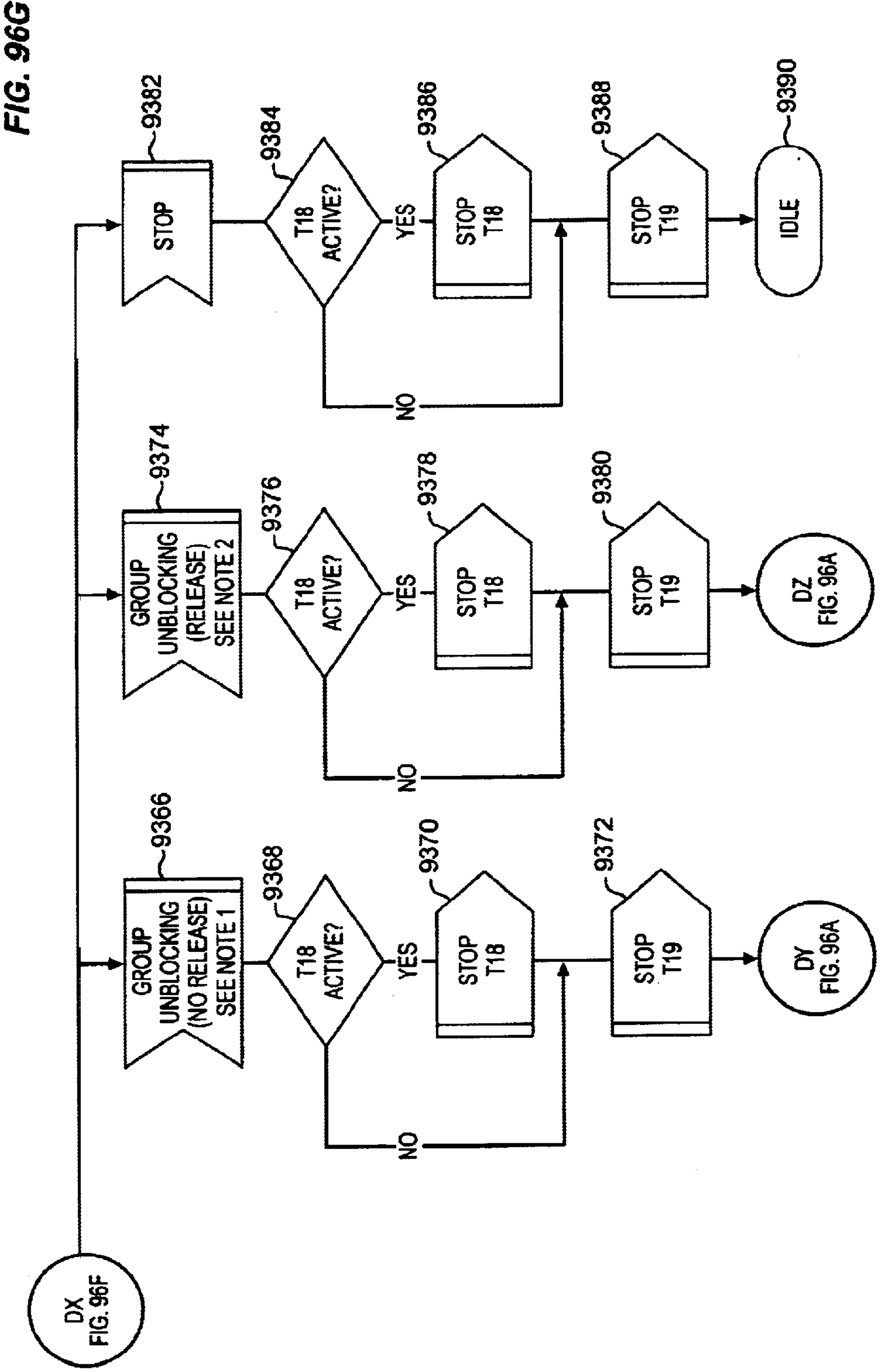
Figure 96H:
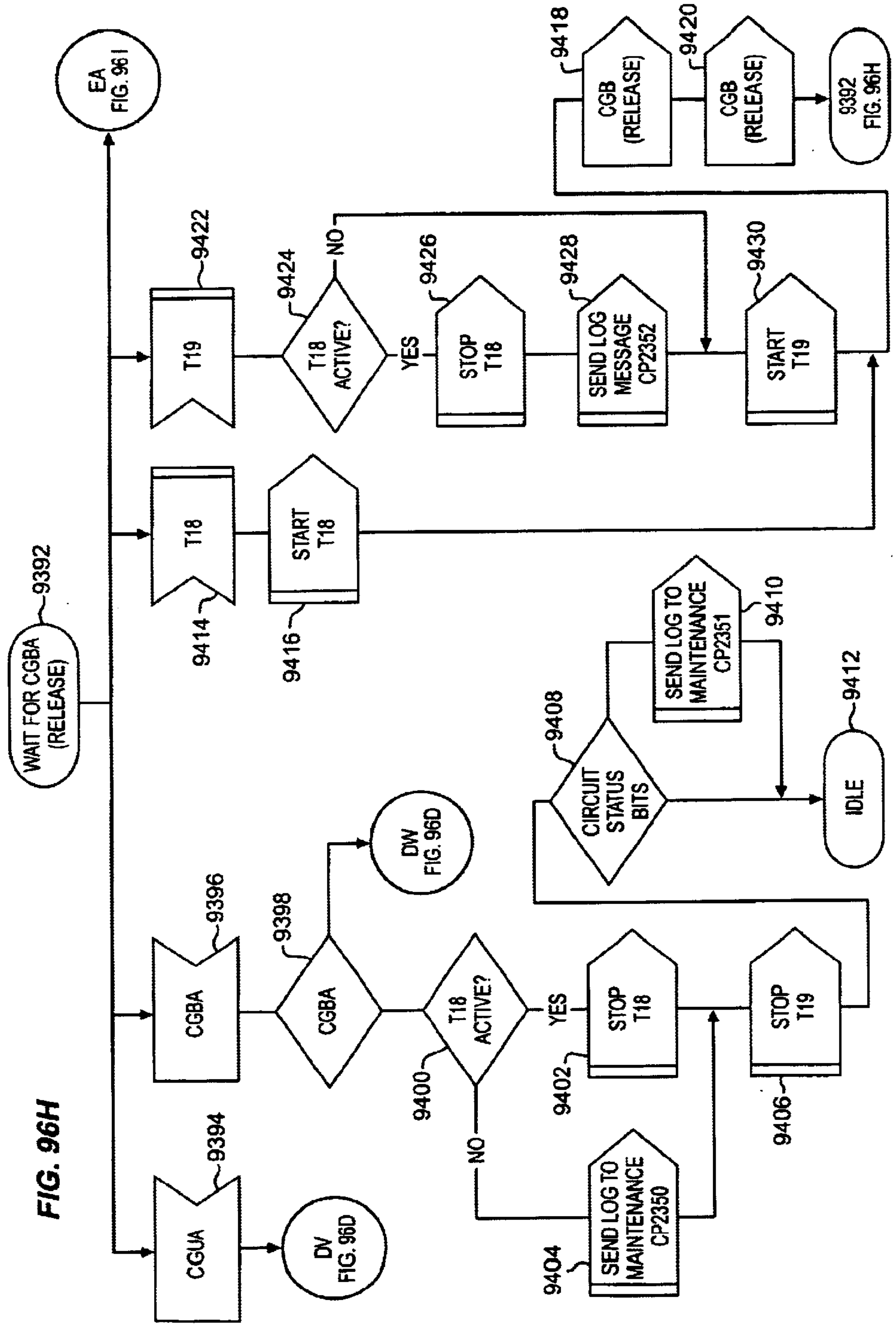
Figure 96:
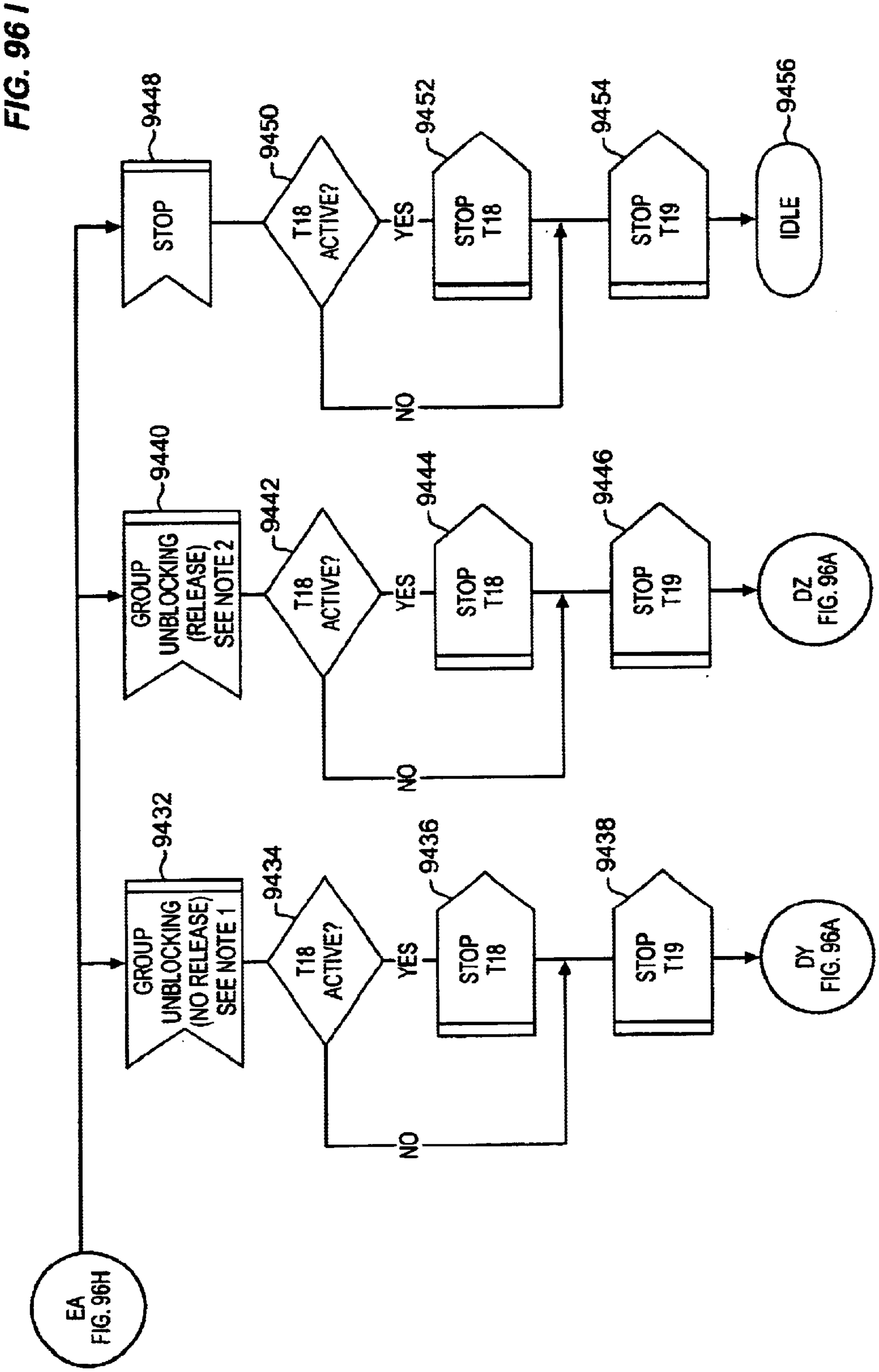
Figure 96J:
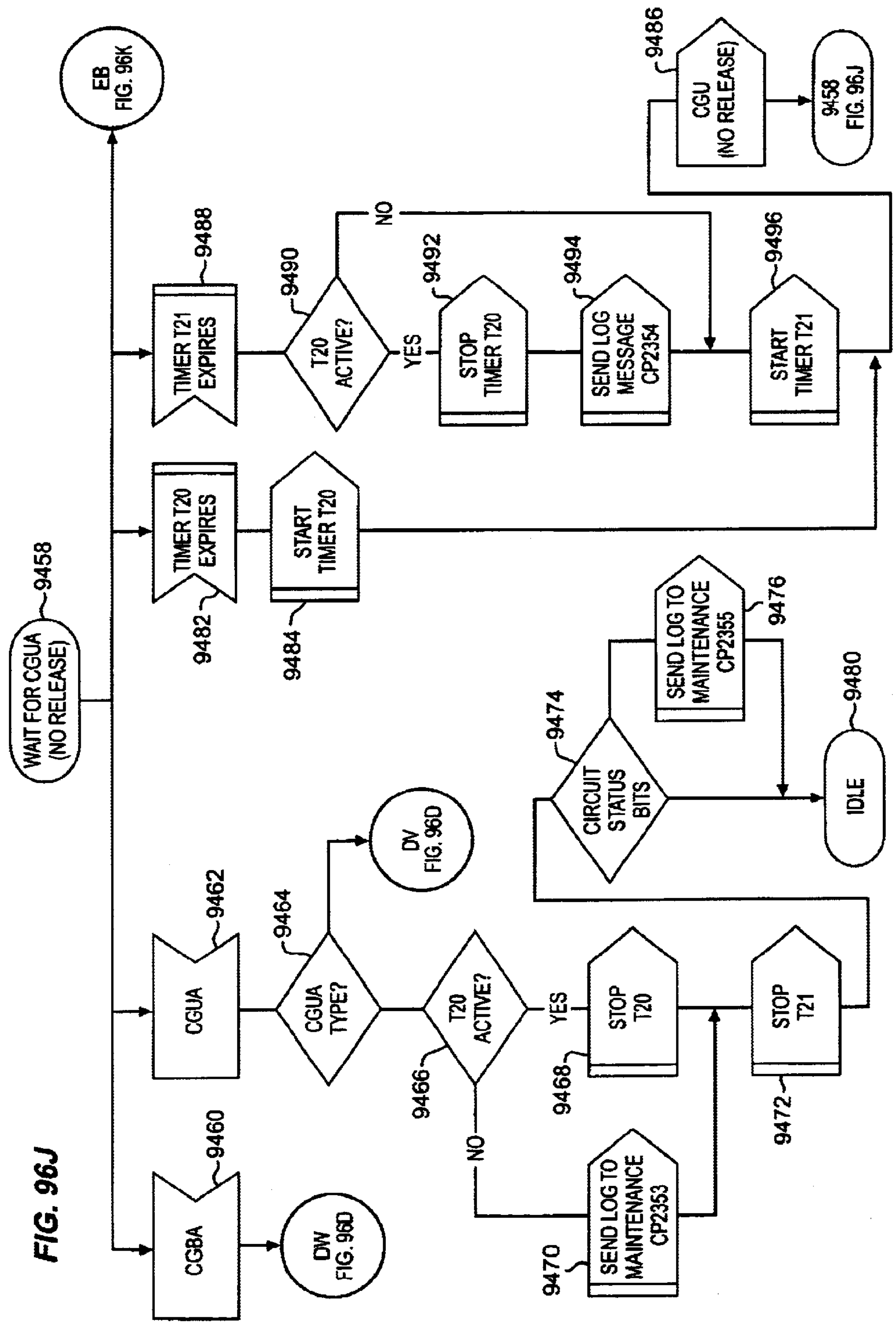
Figure 96K:
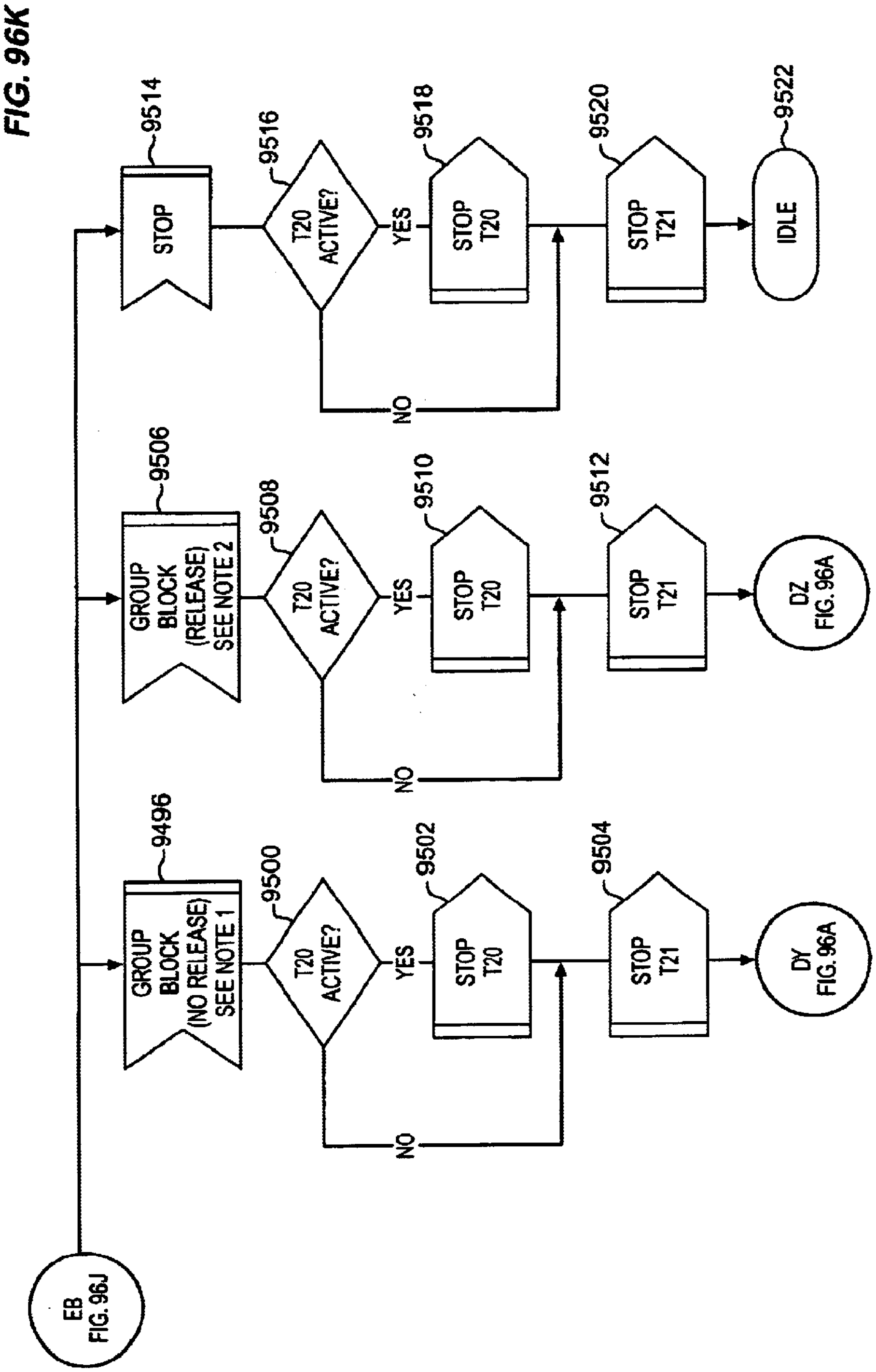
Figure 96L:
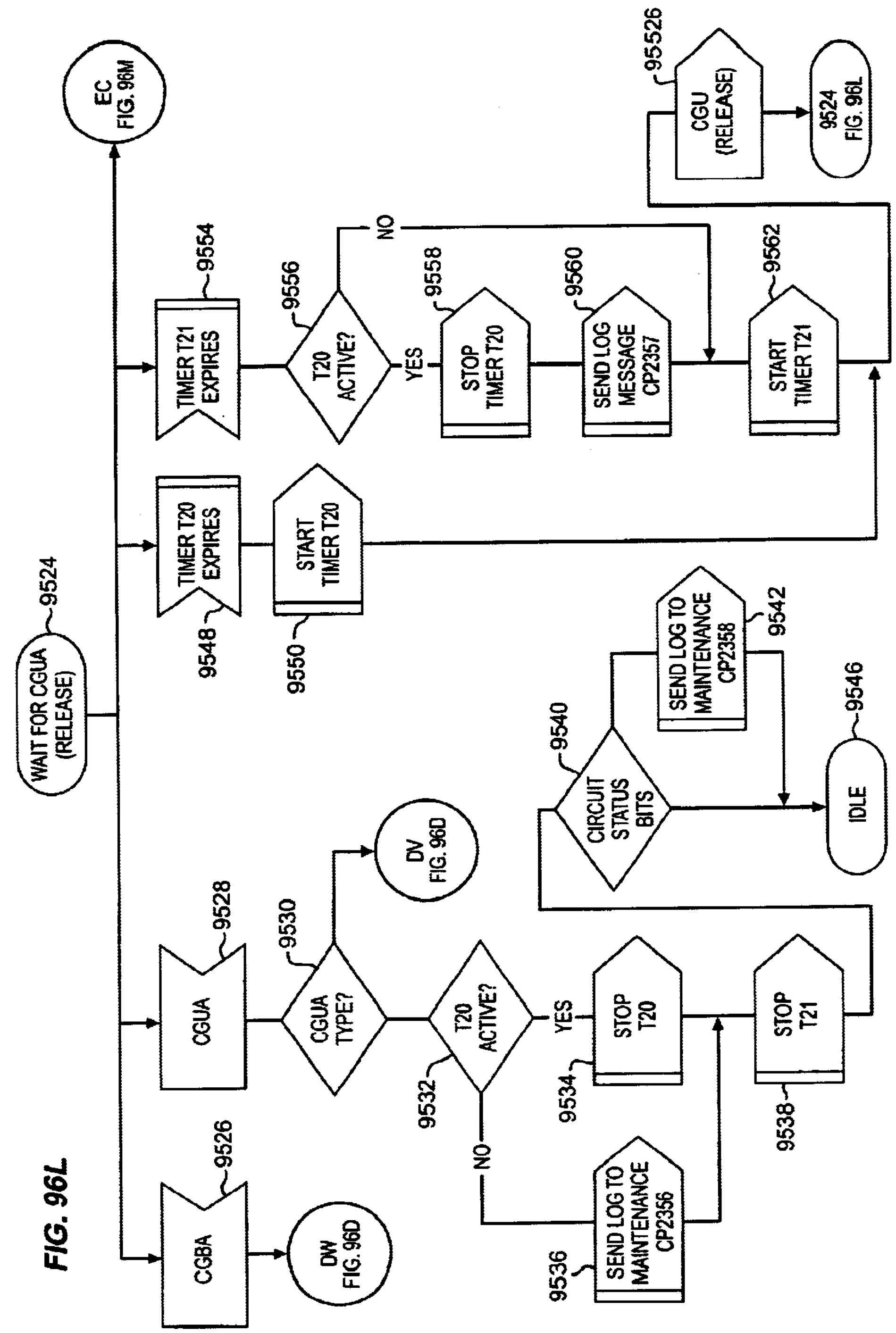
Figure 96M:
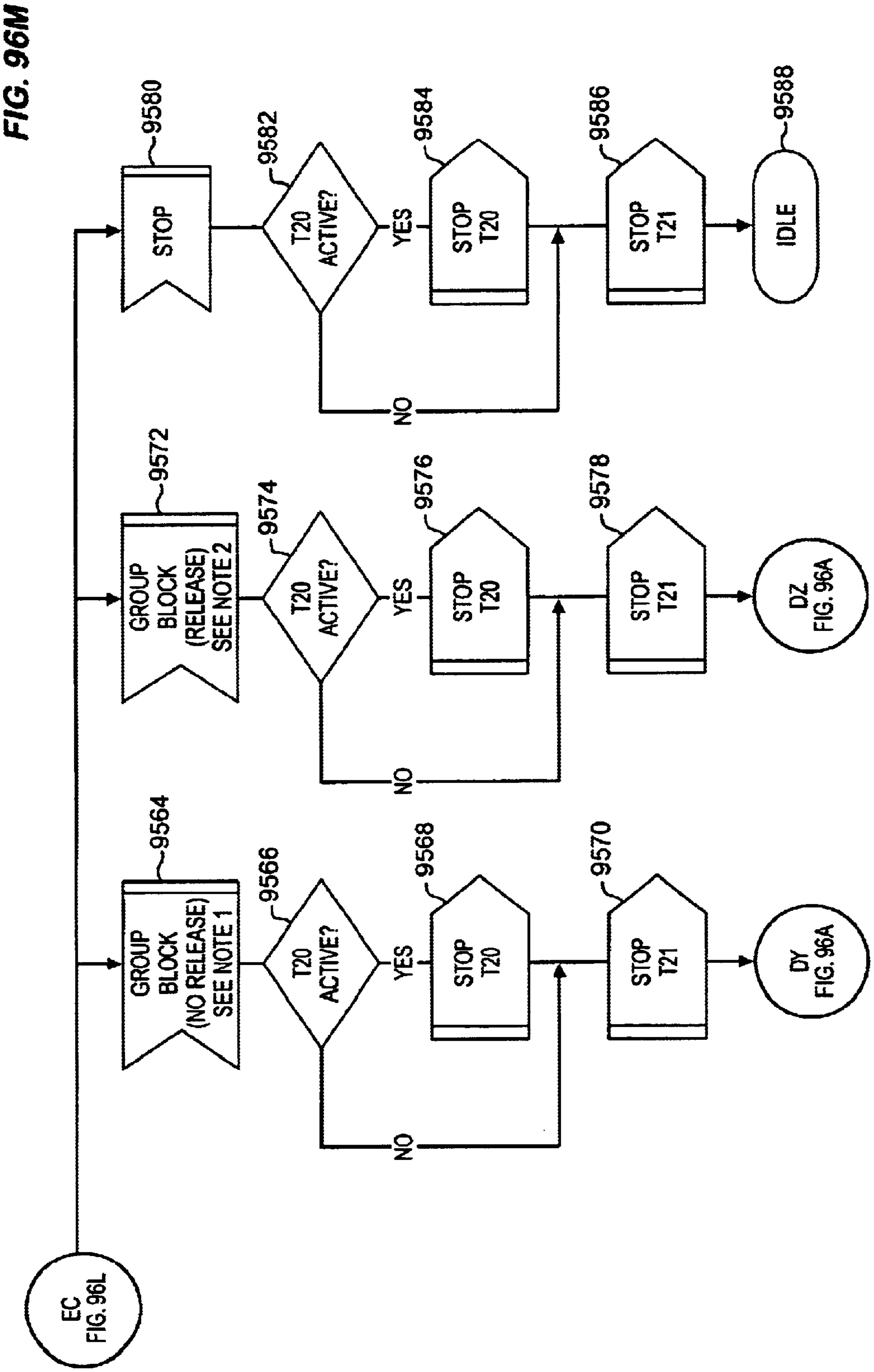

On FIG. 96G, the process waiting for an CGBA with the release at 9392. If a CGUA is received at 9394, the process continues at step 9284. If a CGBA is received at 9396, the CGBA type is determined at 9398. If the CGBA is with no release at 9398, the process continues at step 9268. If the CGBA type is with release at 9398, and if the T18 timer is active at 9400, the T18 timer is stopped at 9402. If the T18 timer is not active at 9400, a log is sent to maintenance at 9404.

Next, the T19 timer is stopped at 9404. The circuit status is determined at 9408. If too many circuits are blocked or if too few circuits are blocked at 9408, a log is sent to maintenance at 9410. Idle then is attained at 9412. If the correct number of circuits are blocked at 9408, idle is attained at 9412.

If the T18 timer times out at 9414, the T18 timer is started at 9416. A CGB with release is sent at 9418, and a CGB with release is automatically retransmitted at 9420. The process then continues at step 9392.

If the T19 timer times out at 9422, and if the T18 timer is active at 9424, the T18 timer is stopped at 9426. A log is sent to maintenance at 9428. After step 9428 or if the T18 timer is not active at 9424, the T19 timer is started at 9430. A CGB with release is sent at 9418, and a CGB with release is automatically retransmitted at 9420. The process then continues at step 9392.

If the group unblocking with no release is initiated at 9432, and if the T18 timer is active at 9434, the T18 timer is stopped at 9436. After step 9436 or if the T18 timer is not active at 9434, the T19 timer is stopped at 9438. The process then continues at step 9212.

If the group unblocking with release is initiated at 9440, and if the T18 timer is active at 9442, the T18 timer is stopped at 9444. After step 9444 or if the T18 timer is not active at 9442, the T19 timer is stopped at 9446. The process then continues at step 9228.

If a stop is initiated at 9448 while waiting for a CGBA with release, and if the T18 timer is active at 9450, the T18 timer is stopped at 9452. After step 9452 or if the T18 timer is not active at 9450, the T19 timer is stopped at 9454. Idle is attained at 9456.

The process is waiting for a CGUA with no release at 9458. The CGBA is received at 9460, and the process continues at step 9268. If the CGUA is received at 9462, the type of the CGUA is determined at 9464. If the CGUA is with release at 9464, the process continues at step 9284. If the CGUA is with no release at 9464, and if the T20 timer is active at 9466, the T20 timer is stopped at 9468. If the T20 timer is not active at 9466, a log is sent to maintenance at 9470.

Next, the T21 timer is stopped at 9472. If too many circuits are to be unblocked or too few circuits are to be unblocked at 9474, a log is sent to maintenance at 9476. If the correct number of circuits are to be unblocked at 9474, the local blocking is removed at 9478. Idle is attained at 9480.

If the T20 timer expires at 9482, the T20 timer is restarted at 9484. The CGU with no release is sent at 9486. The process then continues at 9458.

If the T21 timer expires at 9488, and if the T20 timer is active at 9490, the T20 timer is stopped at 9492. A log is sent to maintenance at 9494. After step 9494 or if the T20 timer is not active at 9490, the T21 timer is started at 9496. A CGU with no release is sent at 9486. The process then continues at step 9458.

If group blocking with no release is initiated at 9498, and if the T20 timer is active at 9500, the T20 timer is stopped at 9502. After step 9502 or if the T20 timer is not active at 9500, the T21 timer is stopped at 9504. The process then continues at step 9212.

If group blocking with release is initiated at 9506, and if the T20 timer is active at 9508, the T20 timer is stopped at 9510. After step 9510 or if the T2 timer is not active at 9508, the T21 timer is stopped at 9512. The process then continues at step 9228.

If a stop is initiated at 9514, and if the T20 timer is active at 9516, the T20 timer is stopped at 9518. After step 9518 or if the T20 timer is not active at 9516, the T21 timer is stopped at 9520. Idle then is attained at 9522.

The process is waiting for a CGUA with release at 9524. If a CGBA is received at 9526, the process continues at step 9268. If a CGUA is received at 9528, the CGUA type is determined at 9530. If the CGUA type is with no release or a 10 at 9530, the process continues at step 9284. If the CGUA type is with release at 9530, and if the T20 timer is active at 9532, the T20 timer is stopped at 9534. If the T20 timer is not active at 9532, a log is sent to maintenance at 9536.

Next, the T21 timer is stopped at 9538. If the circuit status indicates that too many circuits are to be unblocked or if too few circuits are to be unblocked at 9540, a log is sent to maintenance at 9542. If the correct number of circuits are to be unblocked at 9540, local blocking is removed at 9544. Idle is attained at 9546.

If the T20 timer expires at 9548, the T20 timer is restarted at 9550. A CGU with release is sent at 9552. The process then continues at step 9524.

If the T21 timer expires at 9554, and if the T20 timer is active at 9556, the T20 timer is stopped at 9558. A log is sent to maintenance at 9560. After step 9560 or if the T20 timer is not active at 9556, the T21 timer is started at 9562. A CGU with release is sent at 9552. The process then continues at step 9524.

If group blocking with no release is initiated at 9564, and if a T20 timer is active at 9566, the T20 timer is stopped at 9568. After step 9568 or if the T20 is not active at 9566, the T21 timer is stopped at 9570. The process then continues at step 9212.

If group blocking with release is initiated at 9572, and if the T20 timer is active at 9574, the T20 timer is stopped at 9576. After step 9576 or if the T20 timer is not active at 9574, the T21 timer is stopped at 9578. The process then continues at step 9228.

If a stop is initiated at 9580, and if the T20 timer is active at 9582, the T20 timer is stopped at 9584. After step 9584 or if the T20 timer is not active at 9582, the T21 timer is stopped at 9586. Idle then is attained at 9588.

Circuit Validation Test Receiving

Figure 97:
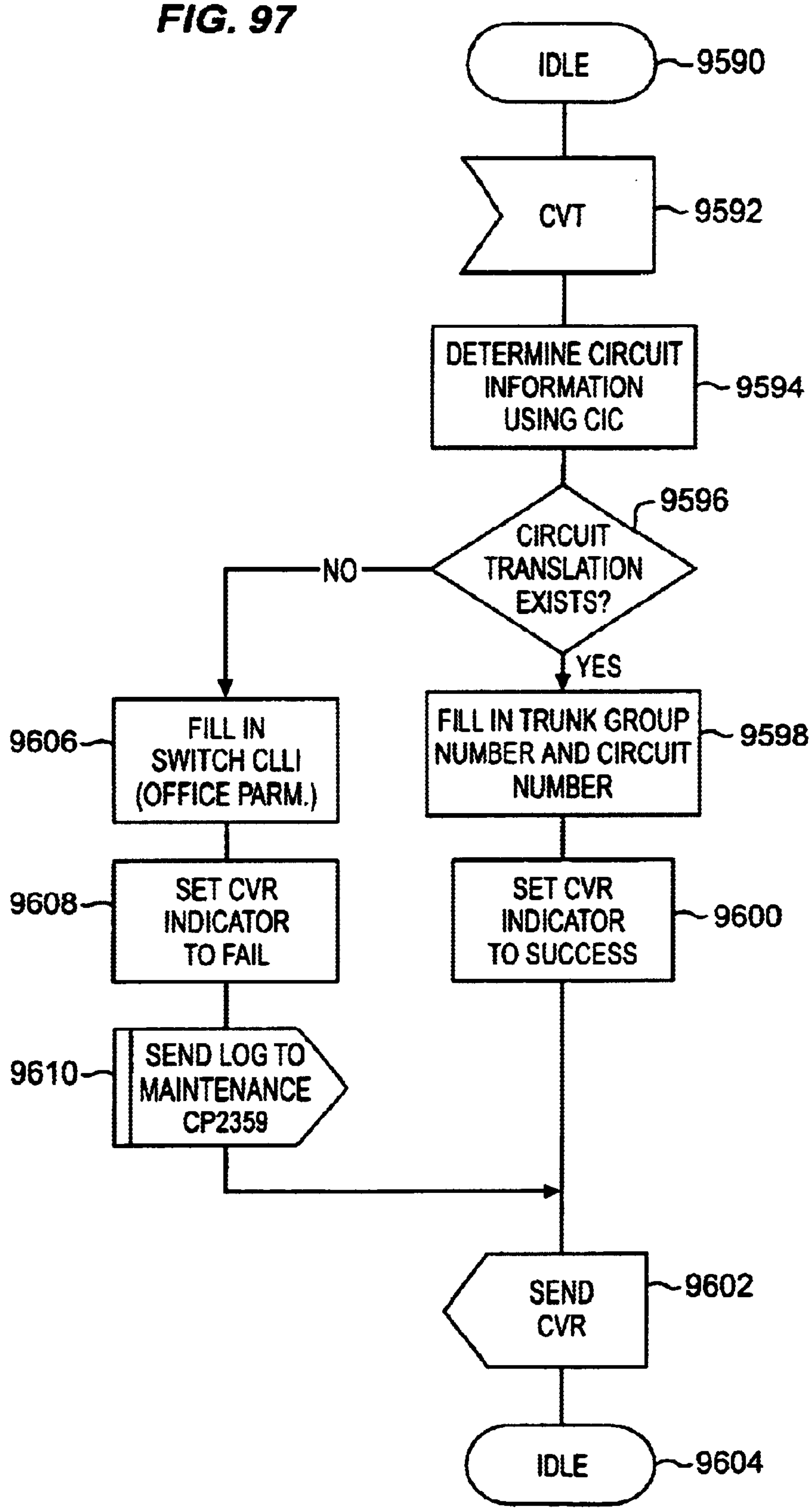
FIG. 97 is an SDL diagram of logic used in a version of the invention for a circuit validation test receiving process.

FIG. 97 illustrates a process for circuit validation test (CVT) receiving. The CVT receiving process (CVTR) is idle at 9590. If a CVT is received at 9592, the circuit information is determined using the CIC at 9594. If circuit translations exist in the CVT at 9596, the trunk group number and the circuit number are filled in at 9598. The CVR indicator is set to success at 9600. A CVR is sent at 9602, and idle is attained at 9604.

If the circuit translation does not exist at 9596, then the switch CLLI is filled in for the response parameter at 9666. The CVR indicator is set to fail at 9608. A log is sent to maintenance at 9610. A CVR is sent at 9602, and idle is attained at 9604.

Circuit Validation Test Sending

Figure 98A:
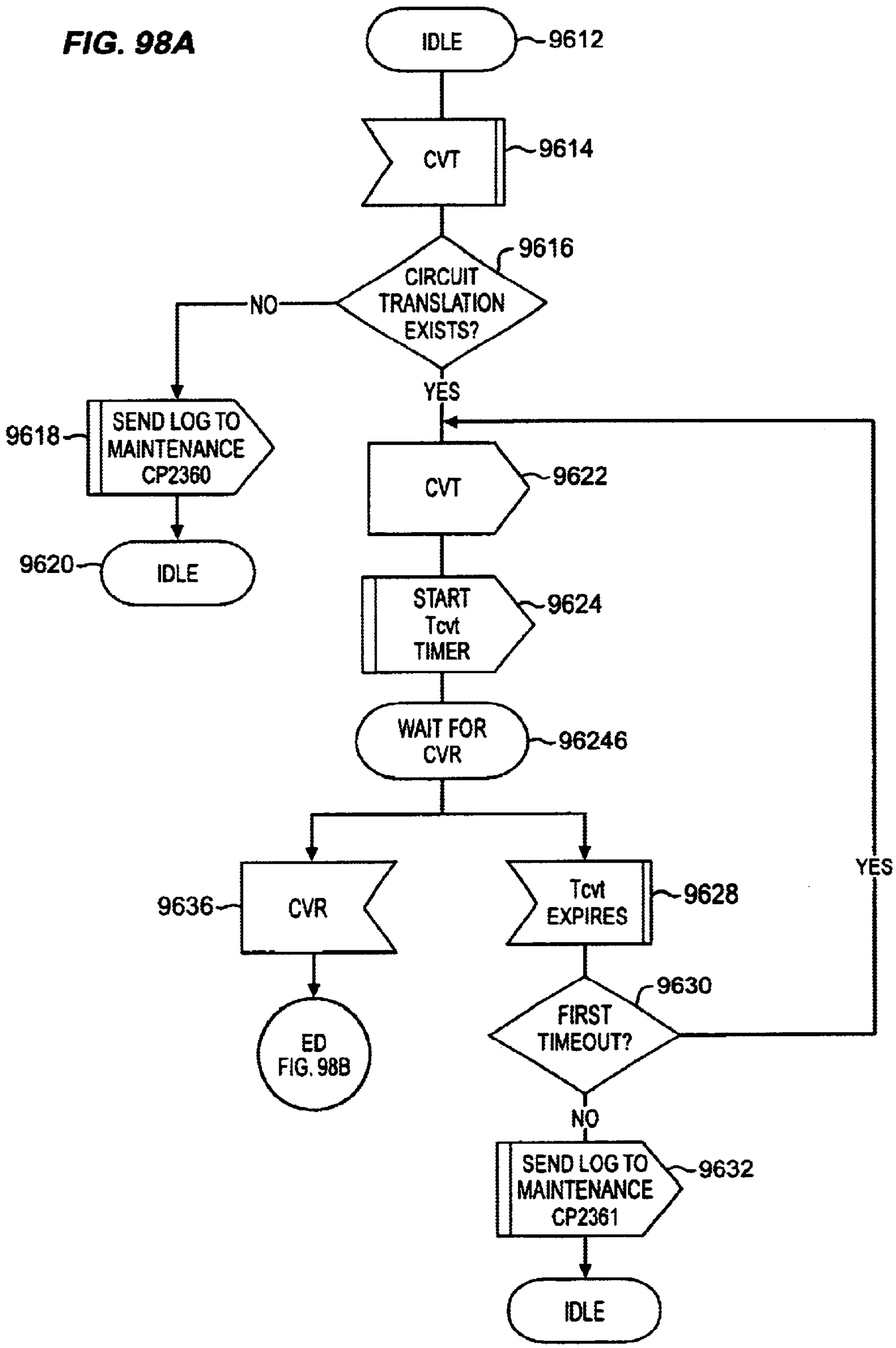
FIGS. 98A–98B are SDL diagrams of logic used in a version of the invention for a circuit validation test sending process.
Figure 98B:
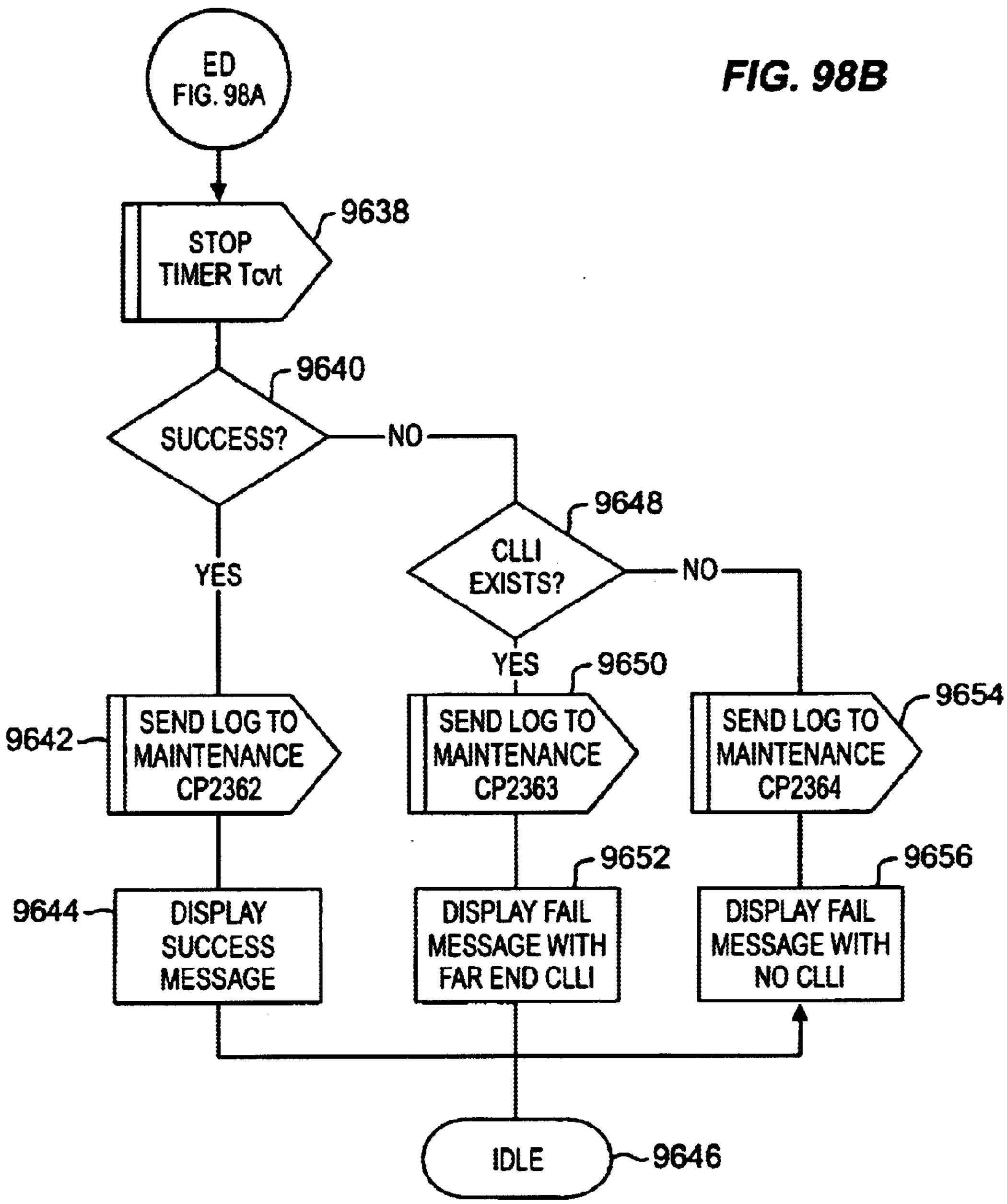

FIGS. 98A–98B illustrate the CVT sending process (CVTS). The process is idle at 9612. A CVT is initiated locally at 9614. If a circuit translation does not exist at 9616, a log is sent to maintenance at 9618. Idle then is attained at 9620.

If a circuit translation does exist at 9616, a CVT is sent at 9622. The Tcvt timer is started at 9624, and the process waits for a CVR at 9626.

If the Tcvt timer expires at 9628, but if this is not the first time out of the timer at 9630, a log is sent to maintenance at 9632. Idle then is attained at 9634. If this is the first time out for the Tcvt timer at 9630, the process continues at step 9622. If while waiting for the CVR at 9626, a CVR is received at 9636, the process continues at step 9638.

The Tcvt timer is stopped at 9638. If the CVT was successful at 9640, a log is sent to maintenance at 9642. A success message is displayed at 9644, and idle is attained at 9646.

If the CVT was not successful at 9640, and if a CLLI exists in the CVR at 9648, a log is sent to maintenance at 9650. A fail message with the far end CLLI is displayed at 9652. Idle is attained at 9646.

If the CVT was not successful at 9640, and if a CLLI does not exist in the CVR at 9648, a log is sent to maintenance at 9654. A fail message with no CLLI is displayed at 9656. Idle is attained at 9646.

Continuity Recheck Incoming

Figure 99A:
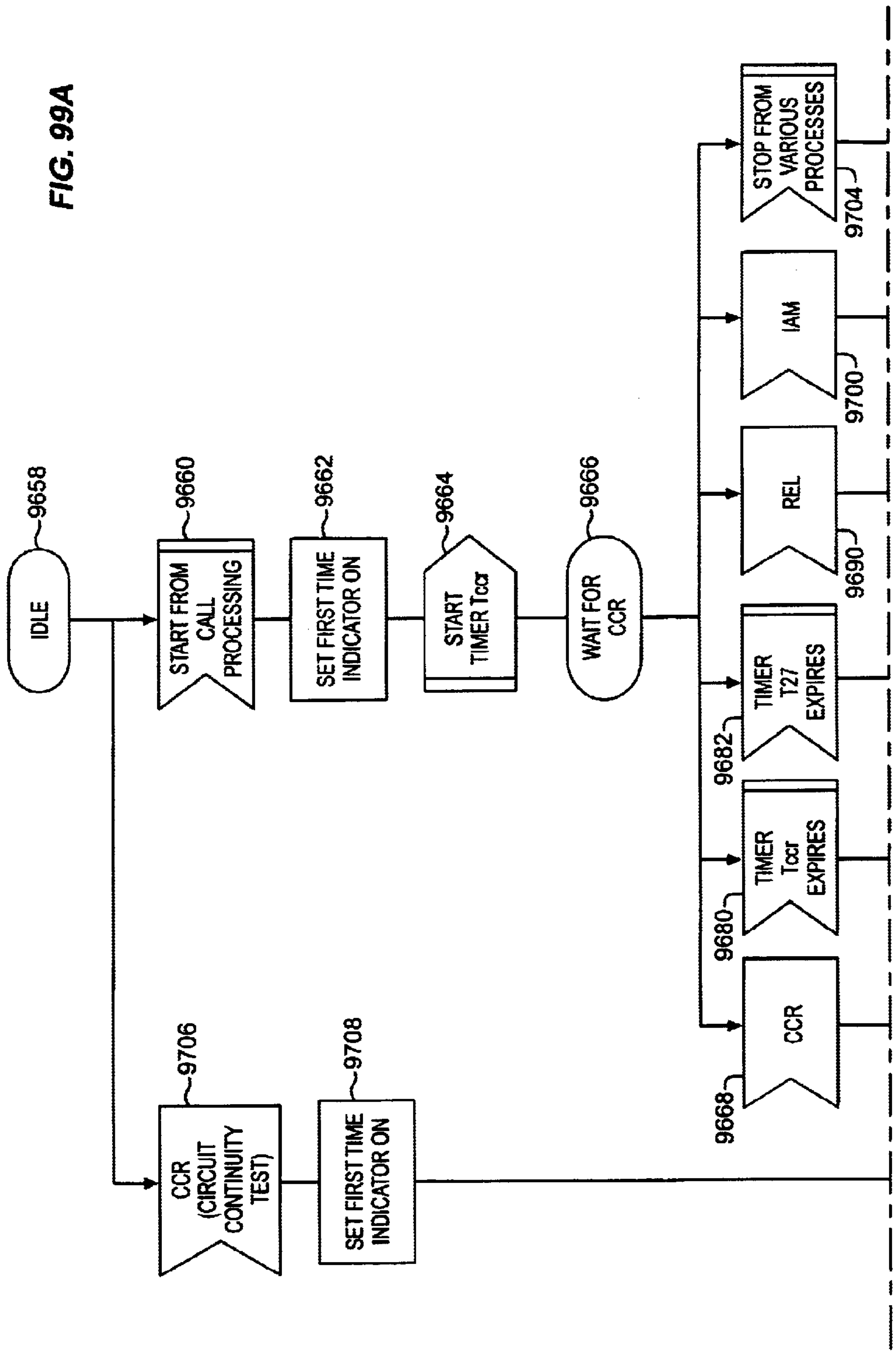
FIGS. 99A–99C are SDL diagrams of logic used in a version of the invention for a continuity recheck incoming process.
Figure 99B:
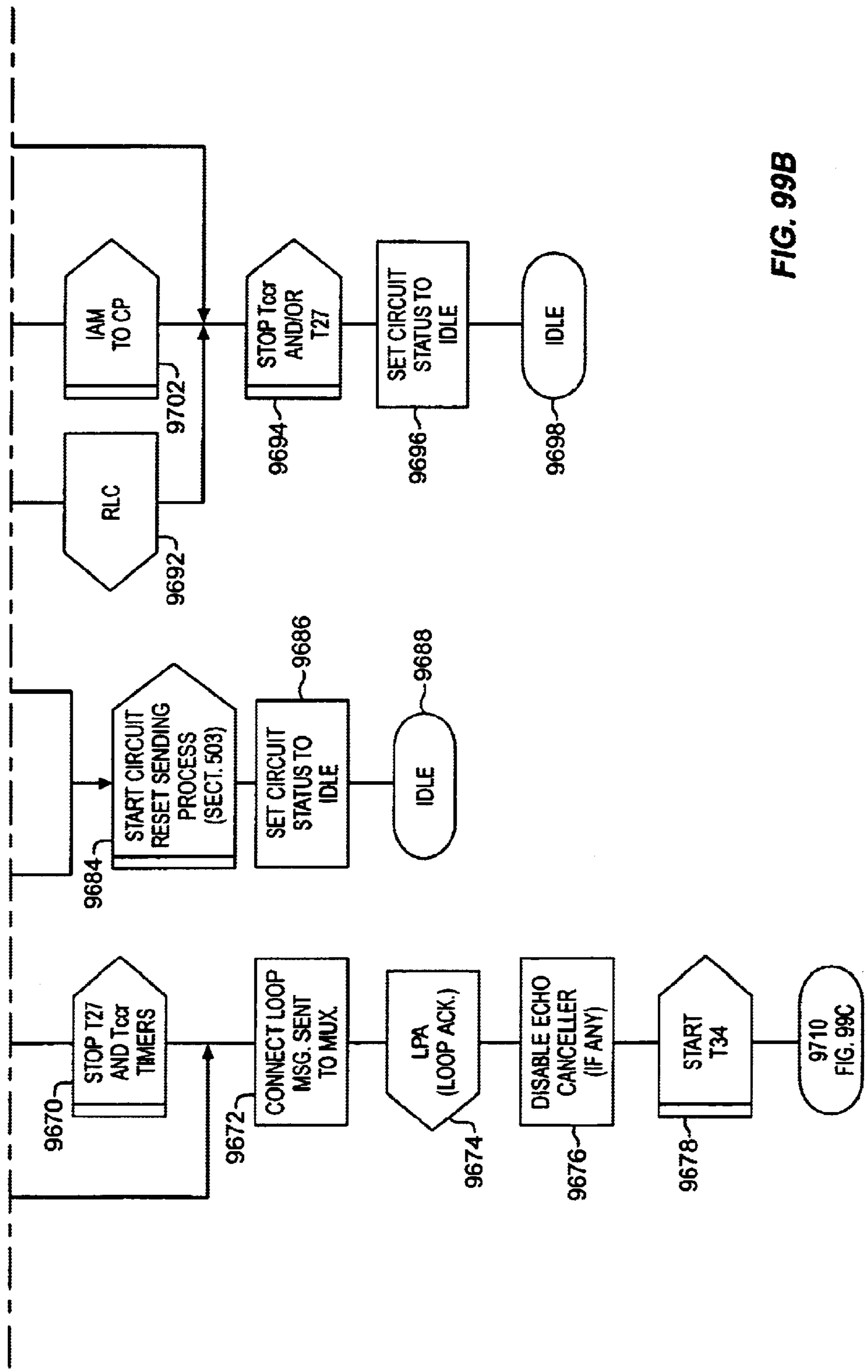
Figure 99C:
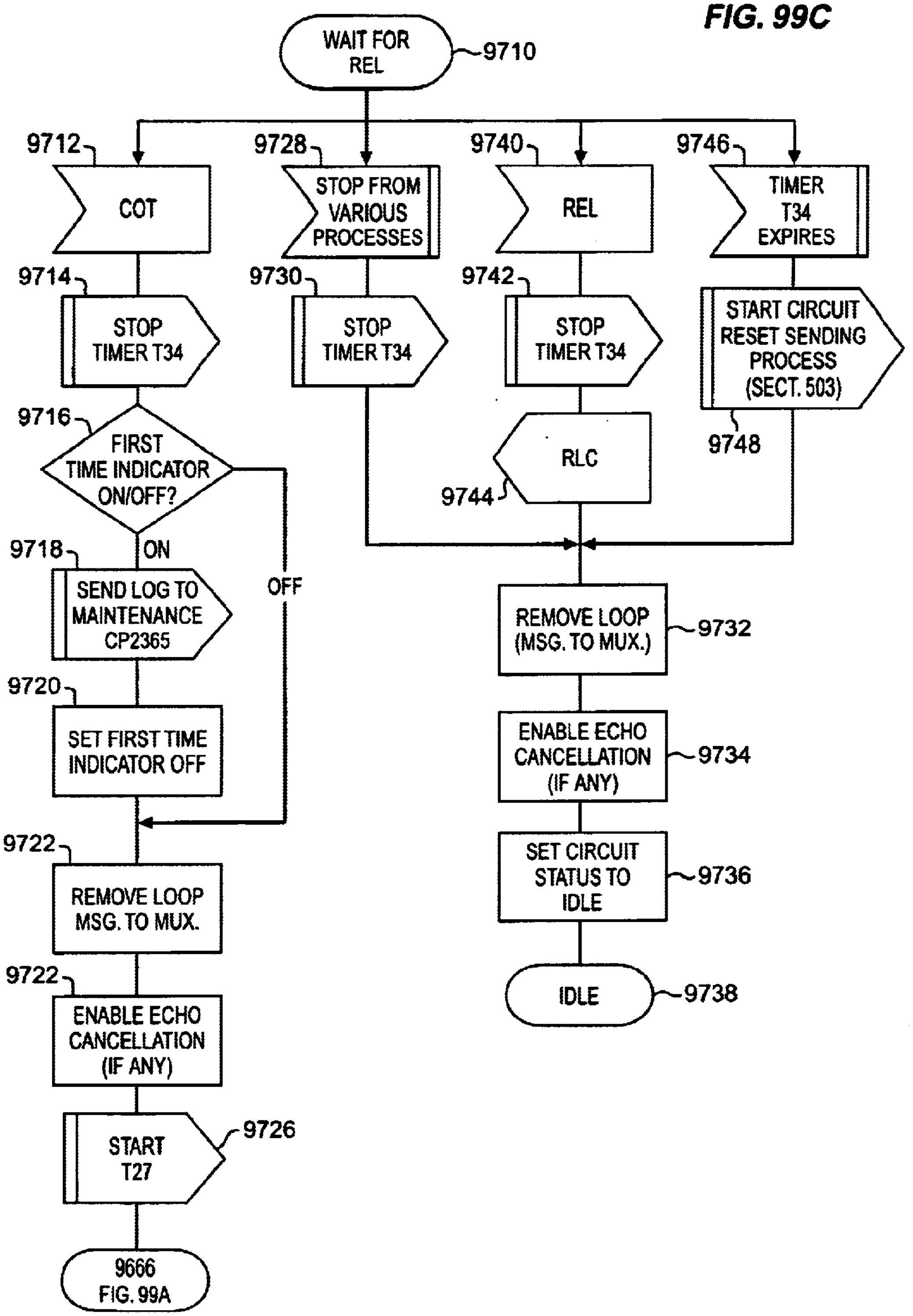
Figure 100A:
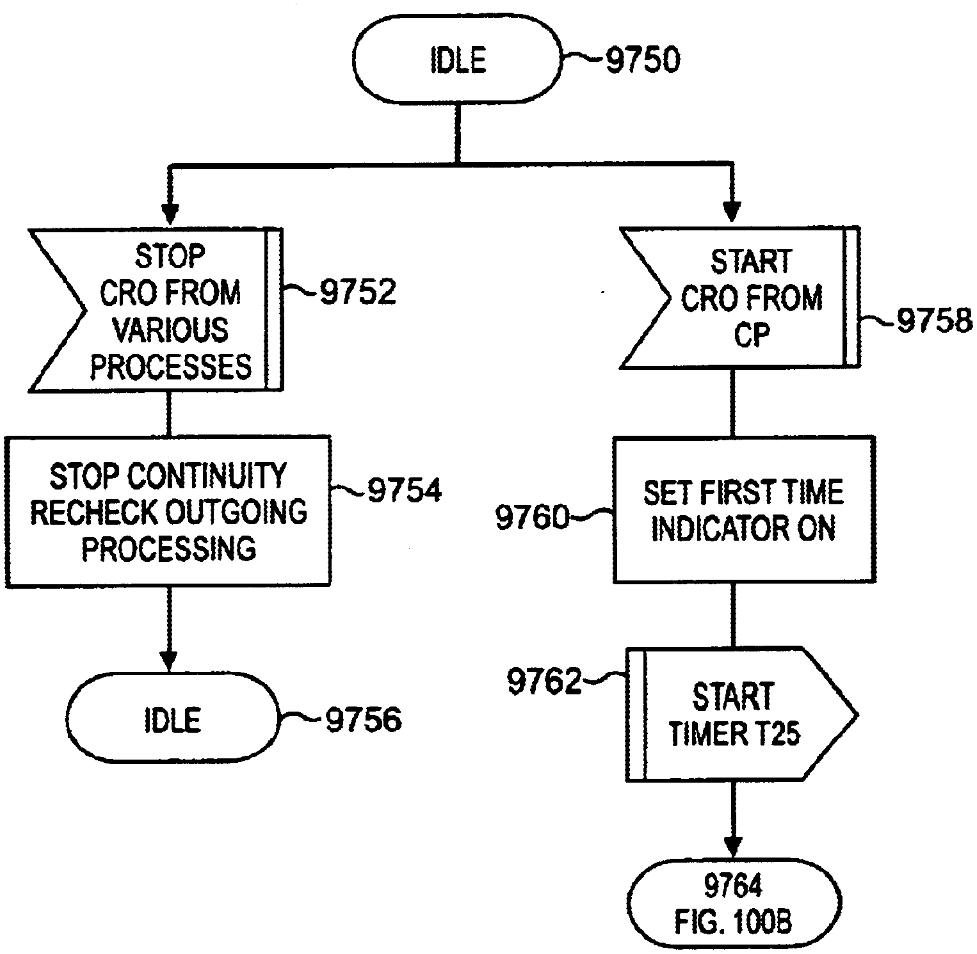
FIGS. 100A–100G are SDL diagrams of logic used in a version of the invention for a continuity recheck outgoing process.
Figure 100B:
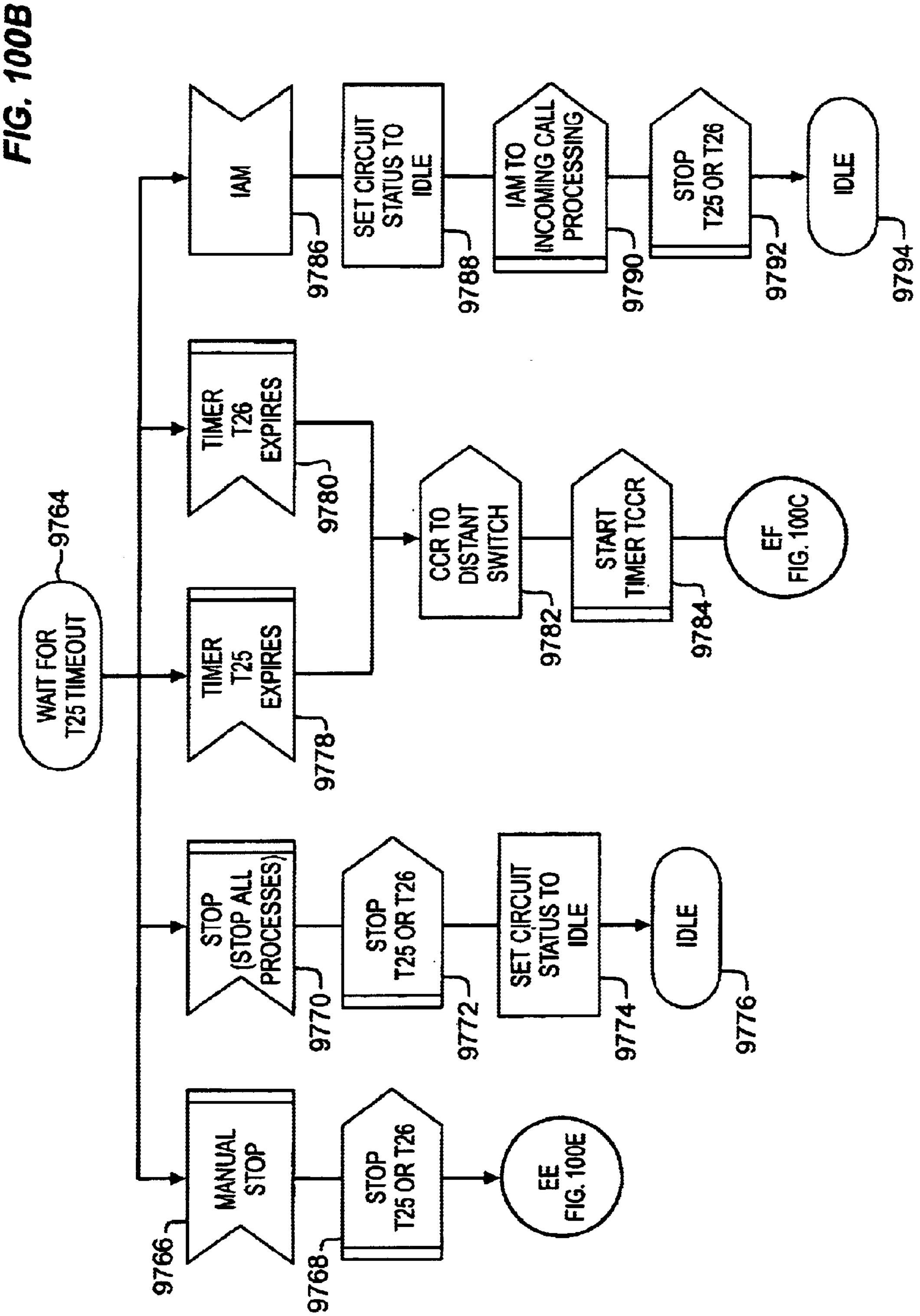
Figure 100C:
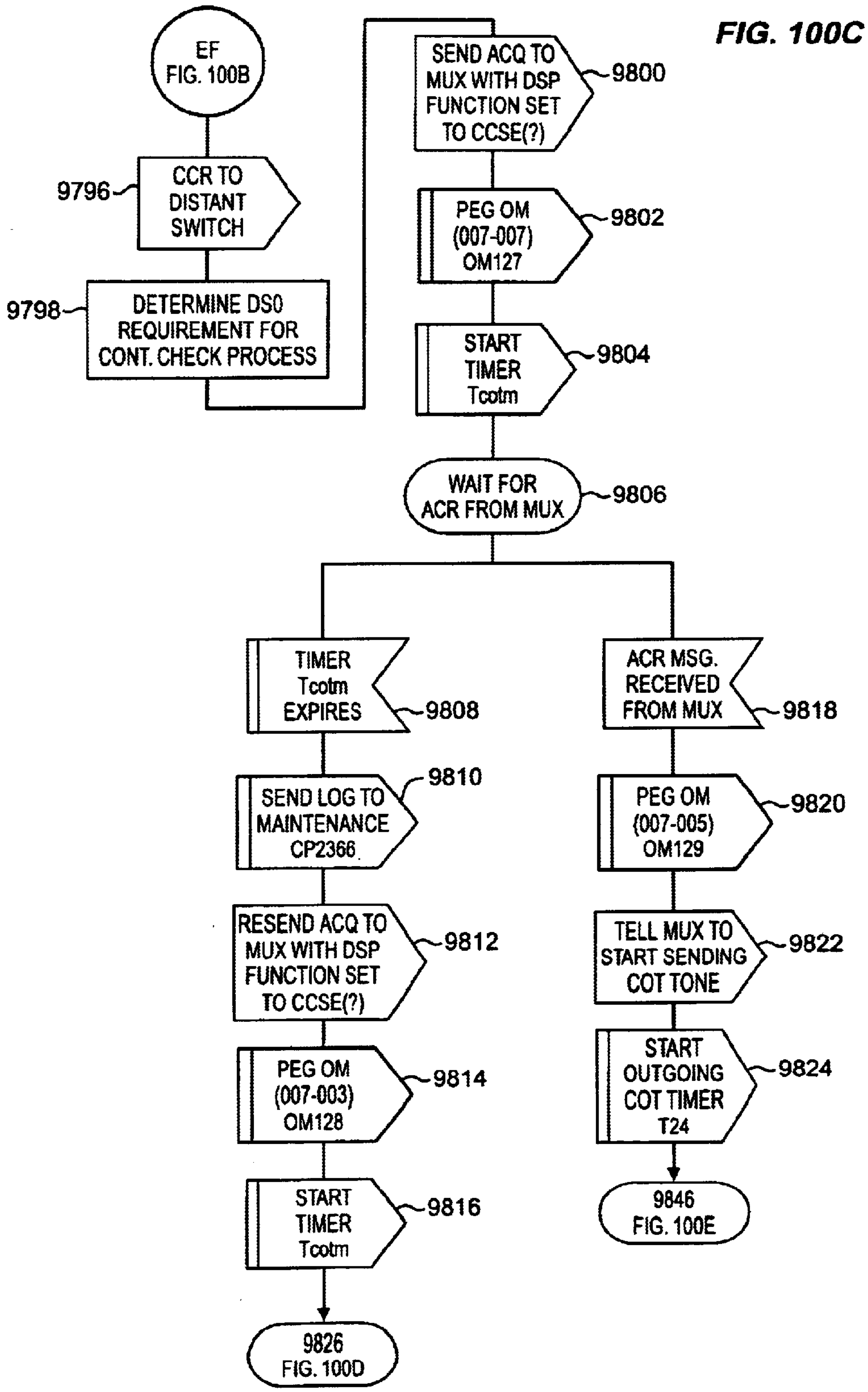
Figure 100D:
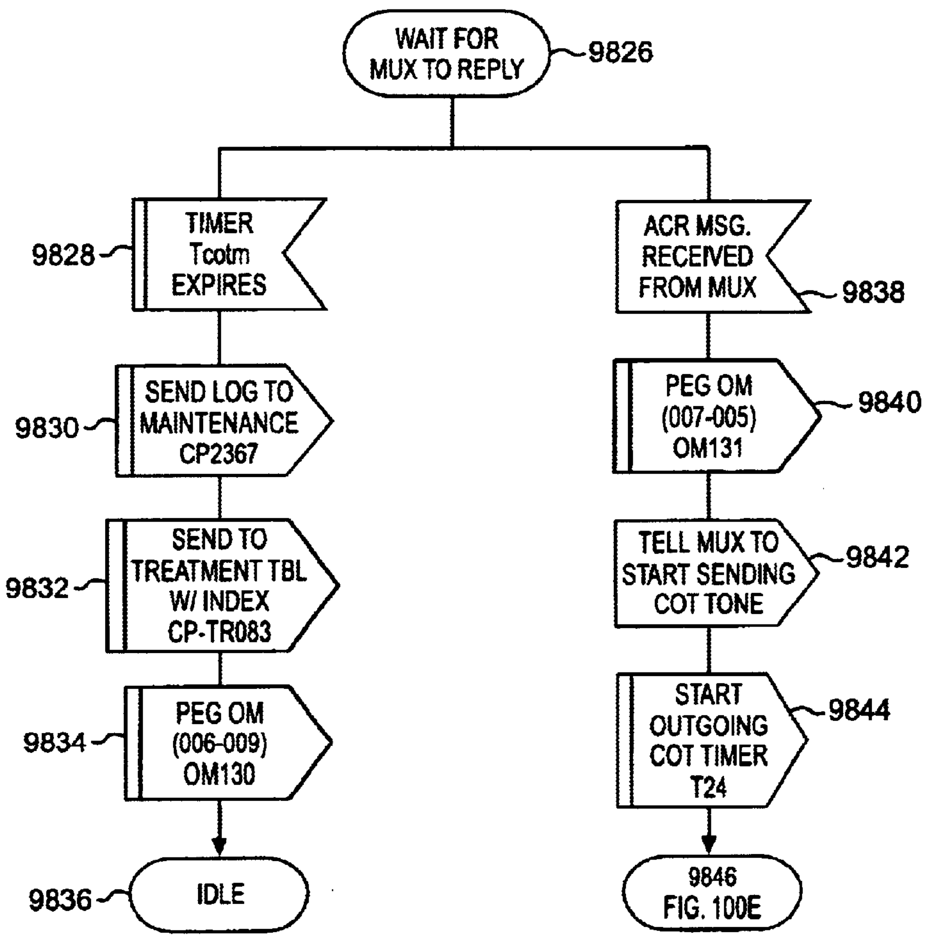
Figure 100E:
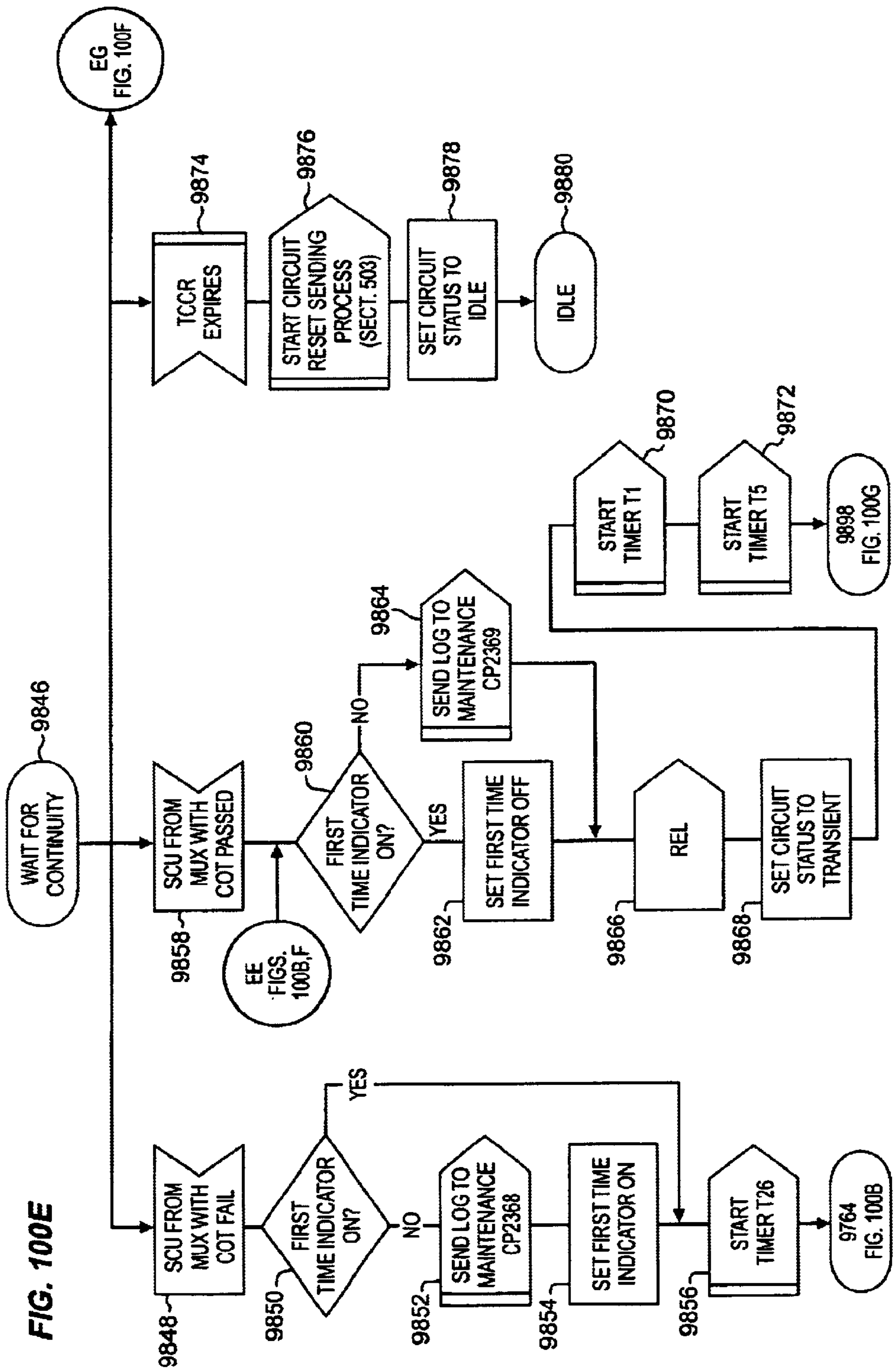
Figure 100F:
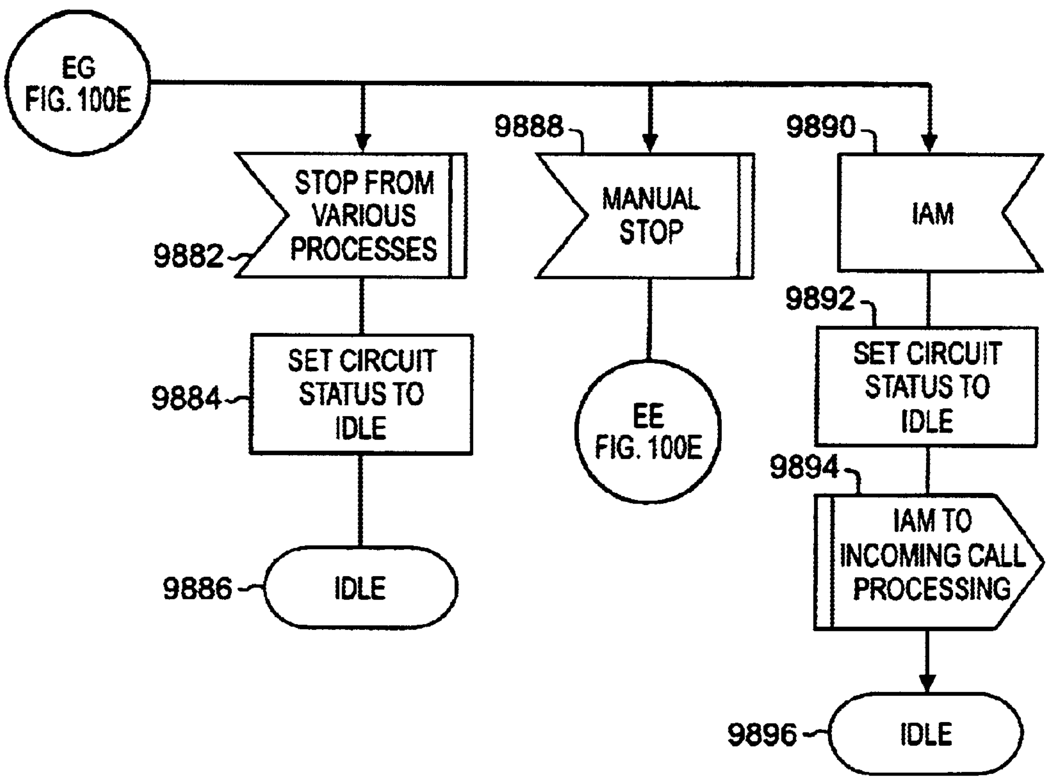
Figure 100G:
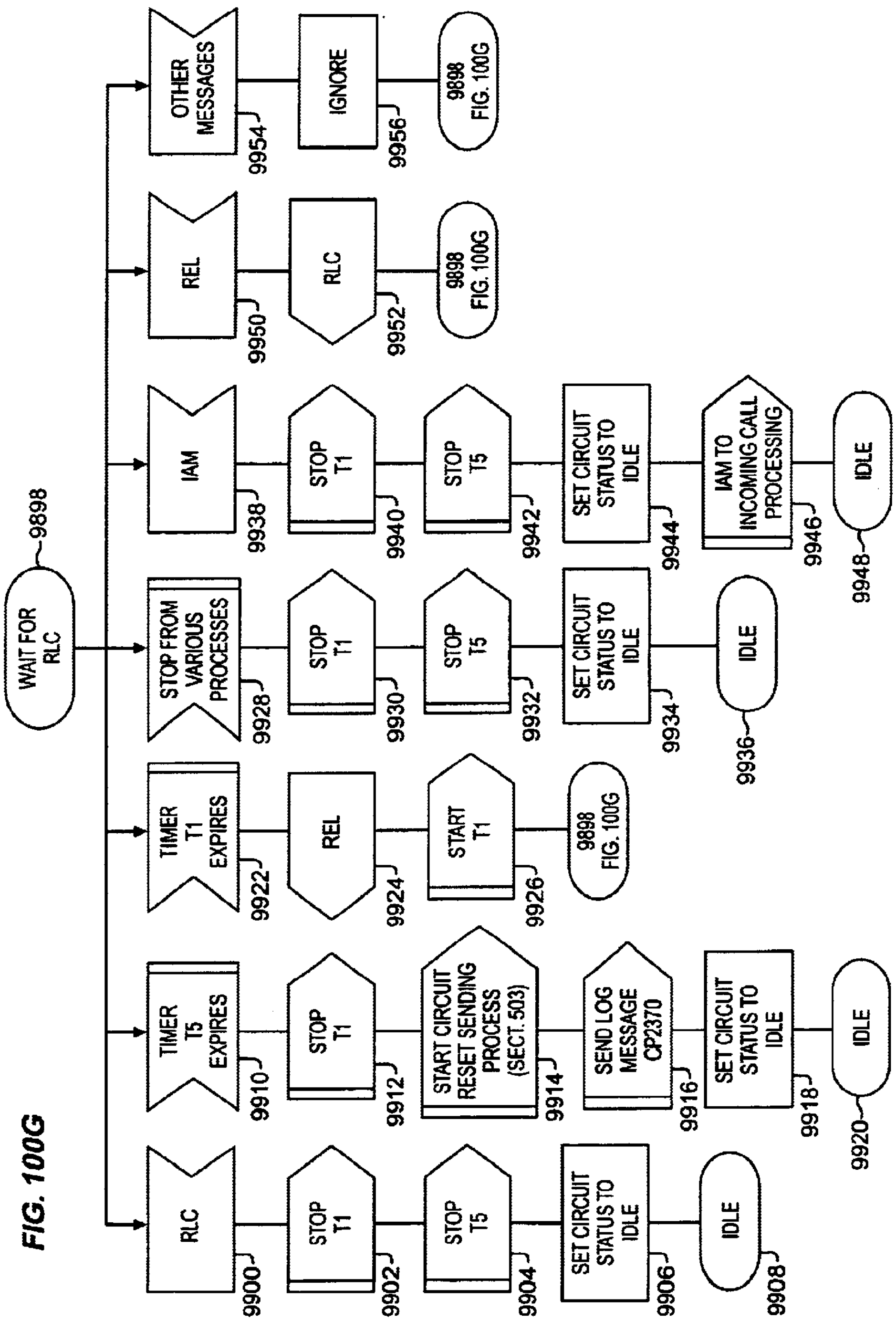

FIGS. 99A–99C illustrate the continuity recheck incoming process (CRI). The process is idle at 9658. If the CRI is started from call processing at 9660, the first time indicator is set to on at 9662. The Tccr timer is started at 9664, and the process waits for CCR at 9666.

If a CCR is received at 9668, the T27 and Tccr timers are stopped at 9670. A connect loop message is sent to the mux at 9672, and a LPA is sent at 9674. The echo cancellers are disabled, if any, at 9676, and the T34 timer is started at 9678. The process then continues at step 9710.

If the Tccr timer expires at 9680 or if the T27 timer expires at 9682, the circuit reset sending process is started at 9684. The circuit status is set to idle at 9686, and idle is attained at 9688.

If an REL is received at 9690, an RLC is sent at 9692. The Tccr timer and the T27 timer are stopped at 9694. The circuit status is set to idle at 9696, and idle is attained at 9698.

If an IAM is received at 9700, the IAM is sent to call processing at 9702. After step 9702 or if a stop is received from various call processes at 9704, the Tccr timer and the T27 timer are stopped at 9694. The circuit status is set to idle at 9696, and idle is attained at 9698.

If a CCR is received at 9706 while the process is idle at 9658, the first time indicator is set on at 9708. The process then continues at step 9672.

The process is waiting for an REL at 9710. If a COT is received at 9712, the T34 timer is stopped at 9714. If the first time indicator is on at 9716, a log is sent to maintenance at 9718. The first time indicator is set to off at 9720. After step 9720 or if the first time indicator is set to off at 9716, a remove loop message is sent to the mux at 9722. Echo cancellation is enabled, if any, at 9724. The T27 timer is started at 9726, and the process continues at step 9666.

If a stop is received from various processes at 9728, the T34 timer is stopped at 9730. A remove loop message is sent to the mux at 9732. Echo cancellation, if any, is enabled at 9734. The circuit status is set to idle at 9736, and idle is attained at 9738.

If an REL is received at 9740, the T34 timer is stopped at 9742. An RLC is sent at 9744. The process then continues at step 9732.

If the T34 timer expires at 9746, the circuit reset sending process is started at 9748. The process then continues at step 9732.

Continuity Recheck Outgoing

FIGS. 100A–100G illustrate the continuity recheck outgoing process (CRO). The process is idle at 9750. If a stop is initiated from various processes at 9752, the CRO process is stopped at 9754. Idle is attained at 9756.

If a start CRO is received from call processing at 9758, the first time indicator is set to on at 9760. The T25 timer is started at 9762. The process continues at 9764.

The process waits for a T25 timer time out at 9764. If a manual stop is initiated at 9766, the T25 timer and the T26 timer are stopped at 9768. The process then continues at step 9860.

If a stop is initiated for all: processes at 9770, the T25 timer or the T26 timer is stopped at 9772. The circuit status is set to idle at 9774, and idle is attained at 9776.

If the T25 timer expires at 9778 or the T26 timer expires at 9780, a CCR is sent to the distant switch at 9782. The Tccr timer is started at 9784. The process then continues at step 9796.

If an IAM is received at 9786, the circuit status is set to idle at 9788. The IAM is forwarded to the incoming call processing at 9790. The T25 timer or the T26 timer is stopped at 9792. Idle is attained at 9794.

At step 9796, a CCR is sent to the distant switch. The DS0 requirements for the CCR process are determined at 9798. An ACQ is sent to the mux with a DSP function set to ATM continuity check sending end (CCSE) so that the outgoing circuit will be connected with the COT transceiver at 9800. Also, this request will turn off the EC in the mux for the time that the COT process is used.

The Om is pegged at 9802, and the Tcotm timer is started at 9804. The process waits for an ACR from the mux at 9806.

If the Tcotm timer expires at 9808, a log is sent to maintenance at 9810. The ACQ is resent to the mux with a DSP function set to CCSE at 9812. The OM is pegged at 9814, and the Tcotm timer is restarted at 9816. The process then continues at step 9826.

If an ACR message is received from the mux at 9818, the OM is pegged at 9820. The mux is instructed to start sending a COT tone at 9822, and the outgoing COT timer (T24) is started at 9824. The process then continues at step 9846.

The process waits for the mux to reply at 9826. If the Tcotm timer expires at 9828, a log is sent to maintenance at 9830. The process is sent to the treatment table at 9832, and an OM is pegged at 9834. Idle is attained at 9836.

If an ACR is received from the mux at 9838, the OM is pegged at 9840. The mux is instructed to start sending a COT tone at 9842, and the outgoing COT timer (T24) is started at 9844. The process then continues at step 9846.

The process waits for a COT at 9846. If an SCU is received from the mux with a COT failure at 9848, and if the first time indicator is set to off at 9850, a log is sent to maintenance at 9852. The first time indicator is set to on at 9854. After step 9854 or if the first time indicator is set to on at 9850, the T26 timer is started at 9856. The process then continues at step 9764.

If an SCU is received from the mux with a COT passed at 9858, and if the first time indicator is set to on at 9860, the first time indicator is set to off at 9862. If the first time indicator is set to off at 9860, a log is sent to maintenance at 9864. After step 9862 or step 9864, an REL is sent at 9866. The circuit status is set to transient at 9868. The T1 timer and the T5 timer are started at 9870 and 9872. The process then continues at step 9898.

If the Tccr timer expires at 9874, the circuit reset sending process is started at 9876. The circuit status is set to idle at 9878, and idle is attained at 9880.

If a stop is initiated from various processes at 9882, the circuit status is set to idle at 9884. Idle then is attained at 9886. If a manual stop is initiated at 9888, the process continues at step 9846.

If an IAM is received at 9890, the circuit status is set to idle at 9892. The IAM is sent to the incoming call processing at 9894. Idle is attained at 9896.

The process waits for an RLC at 9898. If an RLC is received at 9900, the T1 timer is stopped at 9902, and the T5 timer is stopped at 9904. The circuit status is set to idle at 9906, and idle is attained at 9908.

If the T5 timer expires at 9910, the T1 timer is stopped at 9912. The circuit reset sending process is started at 9914, and a log is sent to maintenance at 9916. The circuit status is set to idle at 9918, and idle is attained at 9920.

If the T1 timer expires at 9922, an REL is sent at 9924. The T1 timer is restarted at 9926. The process then continues at step 9898.

If a stop is initiated from various processes at 9928, the T1 timer and the T5 timer are stopped at 9930 and 9932. The circuit status is set to idle at 9934, and idle is attained at 9936.

If an IAM is received at 9938, the T1 timer and the T5 timer are stopped at 9940 and 9942. The circuit status is set to idle at 9944, and the IAM is sent to the incoming call processing at 9946. Idle then is attained at 9948.

If an REL is received at 9950, an RLC is sent at 9952. The process then continues at step 9898.

If other messages are received at 9954, they are ignored at 9956. The process then continues at step 9898.

Circuit Group Reset Receiving

Figure 101A:
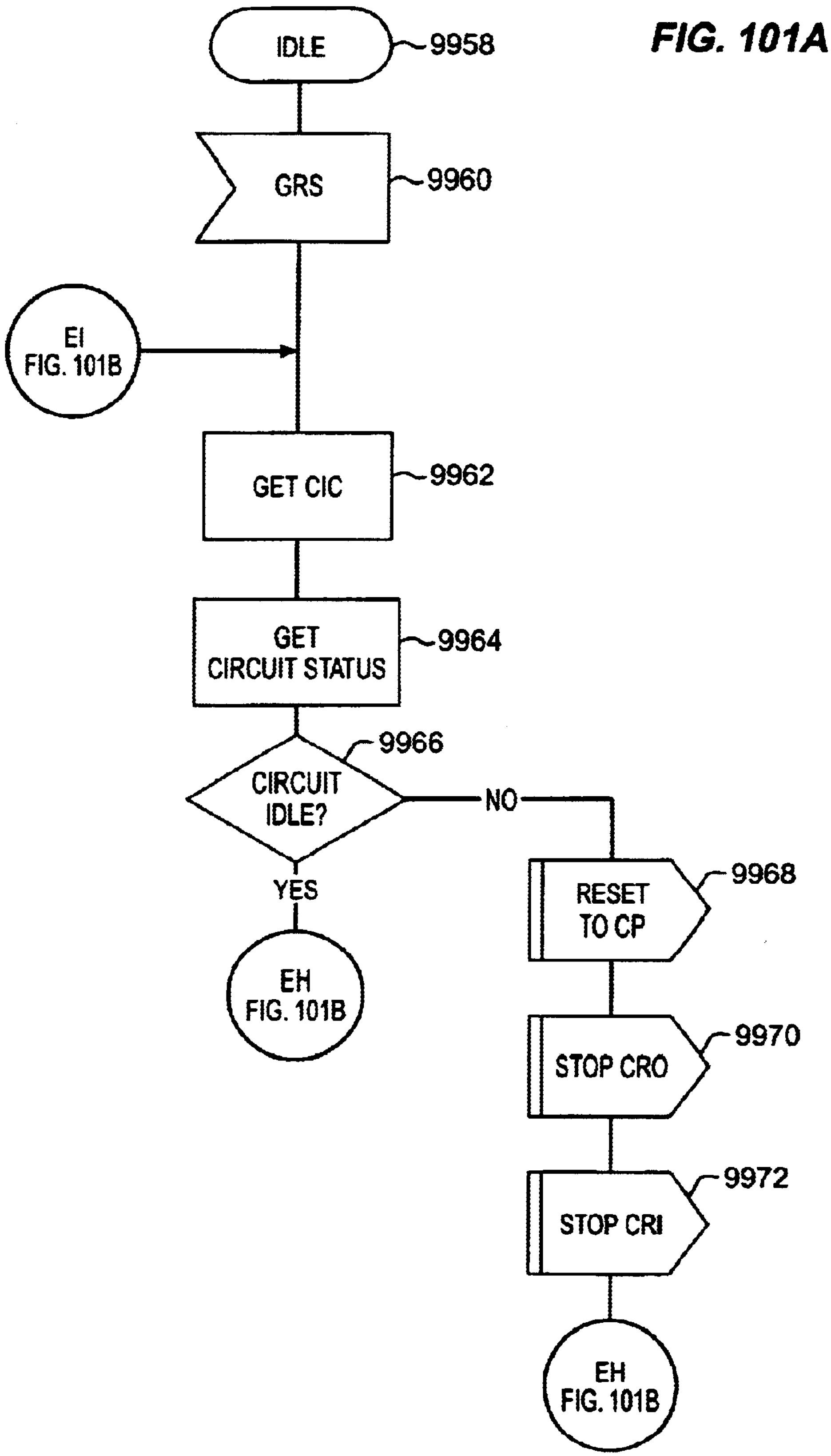
FIGS. 101A–101B are SDL diagrams of logic used in a version of the invention for a circuit group reset reception process.
Figure 101B:
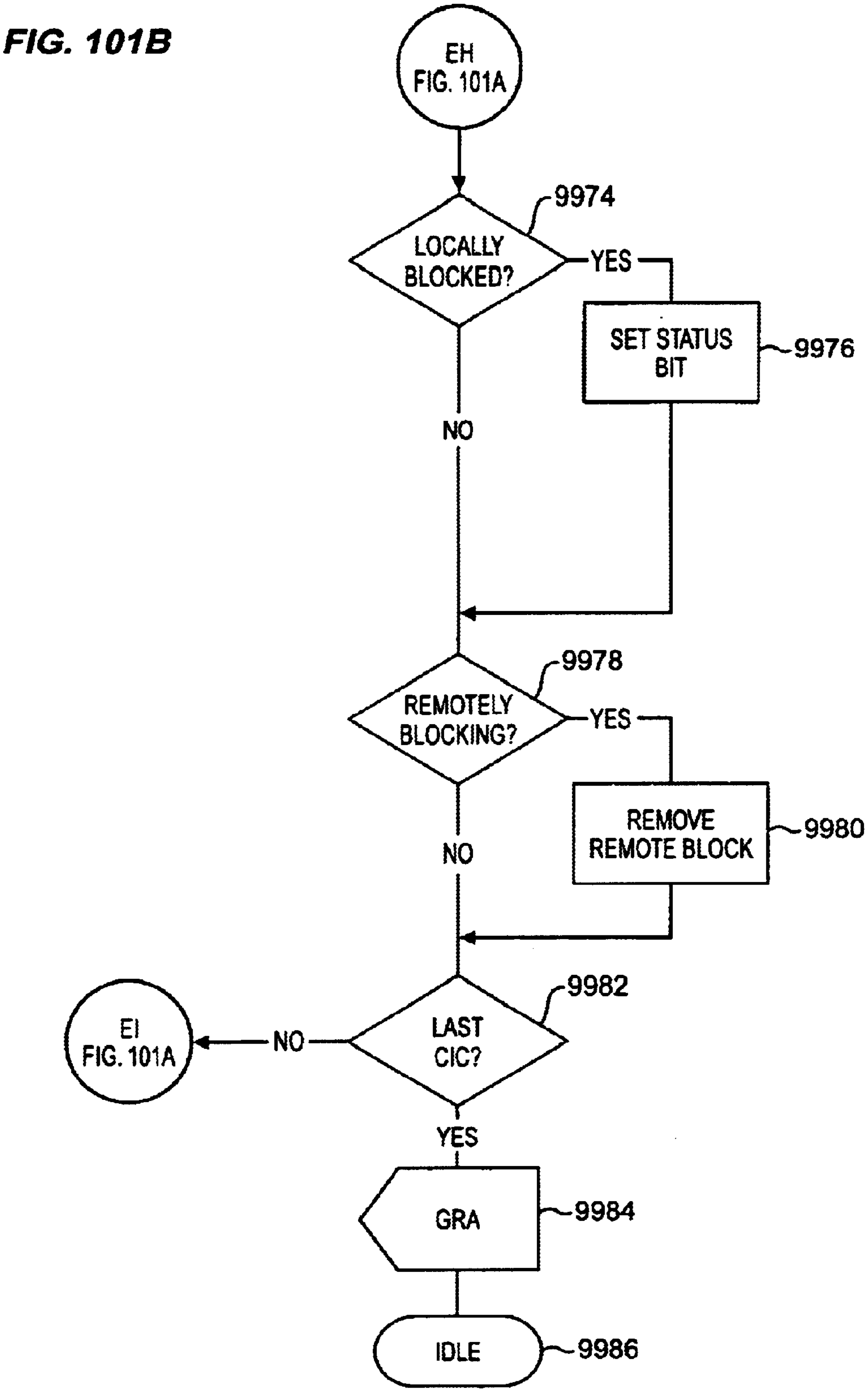

FIGS. 101A–101B illustrate a circuit group reset message receiving (CGRR) process. The process is idle at 9958. A GRS is received at 9960. The CIC for the range is obtained at 9962 and the circuit status is obtained at 9964. If the circuit is idle at 9966, the process continues at step 9974. If the circuit is not idle at 9966, the circuit is reset to idle at 9968. The CRO process is stopped at 9970, and the CRI process is stopped at 9972.

If the circuit is locally blocked at 9974, the status bit is set for the group reset acknowledgement message (GRA) at 9976. After step 9976 or if the circuit is not locally blocked at 9974, the remote blocking is determined at 9978. If the circuit is remotely blocked at 9978, the remote blocking is removed at 9980. After step 9980 or if the circuit is not remotely blocked at 9978, the CIC is checked at 9982. If the CIC is not the last CIC within the range at 9982, the process continues at step 9962. If the CIC is the last CIC within the range at 9982, a GRA is sent at 9984. Idle then is attained at 9986.

Circuit Group Reset Sending

Figure 102A:
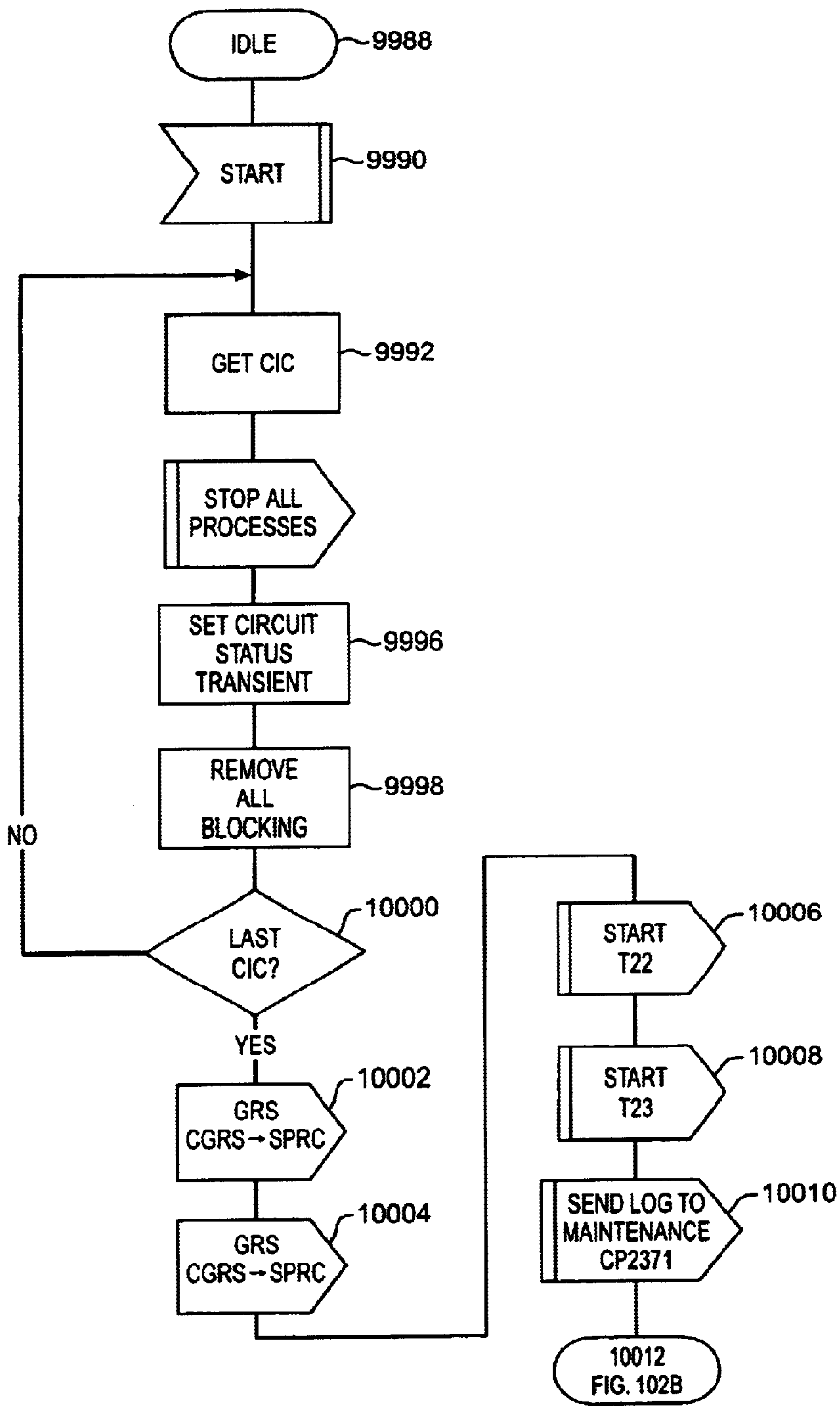

FIGS. 102A–102B illustrate the circuit group reset message (CGR) sending (CGRS) process. The process is idle at 9988. The process is started at 9990, and the CIC is obtained at 9992. All processes are stopped at 9994, and the circuit status is set to transient at 9996. All blocking is removed from the circuits at 9998. If the CIC obtained at step 9992 was not the last CIC within the range at 10000, the process continues at step 9992. If the CIC was the last CIC within the range at 10000, a GRS is sent at 10002. The GRS is automatically resent at 10004. The T22 timer and the T23 timer are started at 10006 and 10008. A log is sent to maintenance at 10010. The process then continues at step 10012.

The process waits for a GRA at 10012. If the T22 timer expires at 10014, a GRS is sent at 10016 and automatically resent at 10018. The T22 timer is restarted at 10020, and the process continues at step 10012.

If the T23 timer expires at 10022, a log is sent to maintenance at 10024. The T22 timer is stopped at 10026. A GRS is sent at 10028 and automatically resent at 10030. The T23 timer is restarted at 10032, and the process continues at step 10012.

If a GRA is received at 10034, and if the T22 timer is active at 10036, the T22 timer is stopped at 10038. After step 10038 or if the T22 timer is not active at 10036, the T23 timer is stopped at 10040. The remotely blocked states are refreshed for the range and status at 10042 from the range and status specified in the GRA received at 10034. The circuit status is set to idle at 1044, and idle is attained at 10046. If a manual stop is initiated at 10048, and if the T22 timer is active at 10050, the T22 timer is stopped at 10052. After step 10052 or if the T22 timer is not active at 10050, the T23 timer is stopped at 10054. Idle is attained at 10056.

If a stop is initiated for the CGRS process at 10058, and if the T22 timer is active at 10060, the T22 timer is stopped at 10062. After step 10062 or if the T22 timer is not active at 10060, the T23 timer is stopped at 10064. A log is sent to maintenance at 10066, and idle is attained at 10068.

Unequipped Circuit Identification Code Reception

Figure 103A:
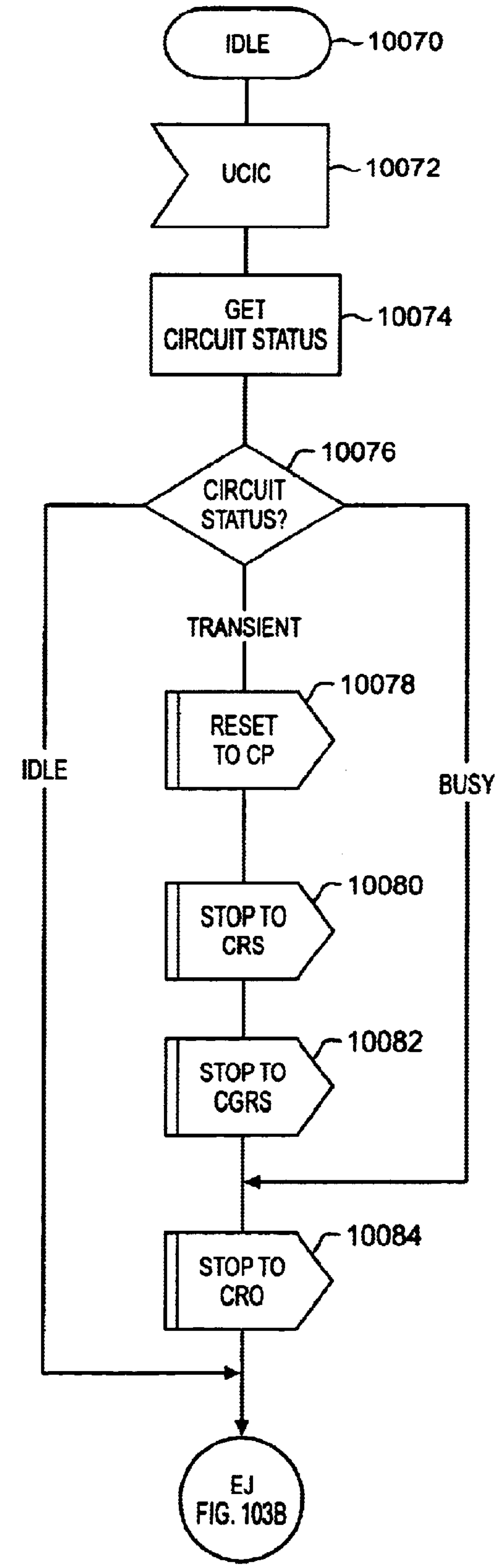
FIGS. 103A–103B are SDL diagrams of logic used in a version of the invention for an unequipped circuit identification code reception process.
Figure 103B:
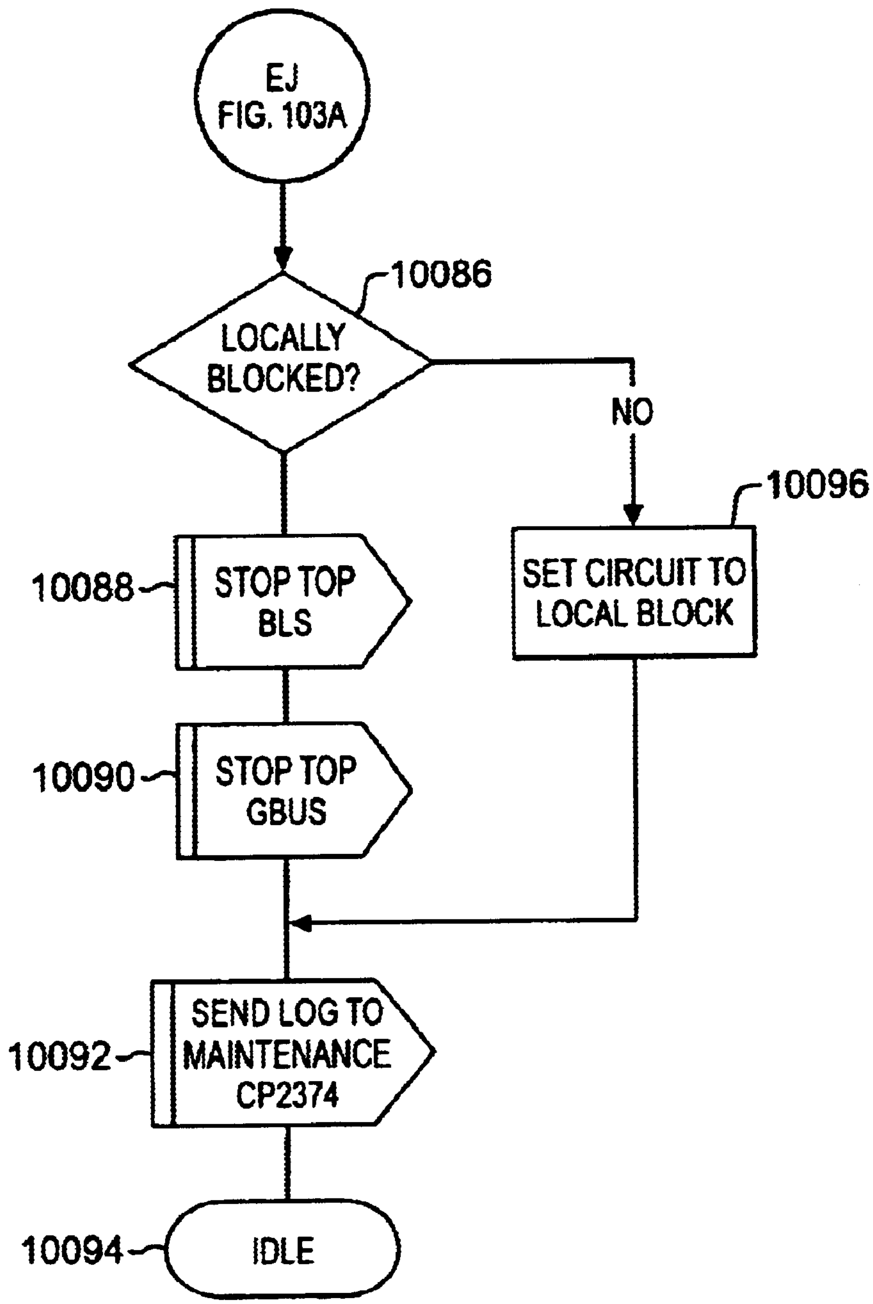

FIG. 103A–103B illustrate the maintenance process for an unequipped circuit identification code (UCIC) reception the process is idle at 10070. A UCIC is received at 10072, and the circuit status is obtained at 10074. If the circuit status is transient at 10076, the circuit is reset to idle at 10078. The CRS process is stopped at 10080, and the CGRS process is stopped at 10082. After step 10082 or if the circuit status is busy at 1076, the CRO process is stopped at 10084. After step 10084 or if the circuit status is idle at 10076, the process continues at step 10086.

If the circuit is locally blocked at 10086, the BLS process is stopped at 10088. The GBUS process is stopped at 10090. A log is sent to maintenance at 10092, and idle is attained at 10094.

If the circuit is not locally blocked at 10086, the circuit is set to be locally blocked to remove the circuit from service at 10096. A log is sent to maintenance at 10092, and idle is attained at 10094.

Loop Back Acknowledgement

Figure 104A:
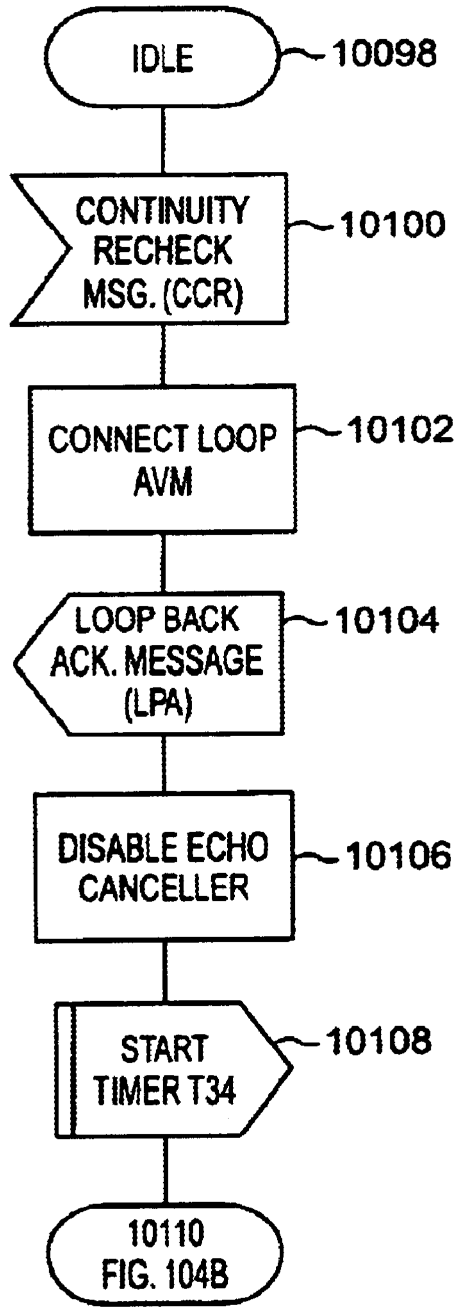
FIGS. 104A–104B are SDL diagrams of logic used in a version of the invention for a loop back acknowledgment process.
Figure 104B:
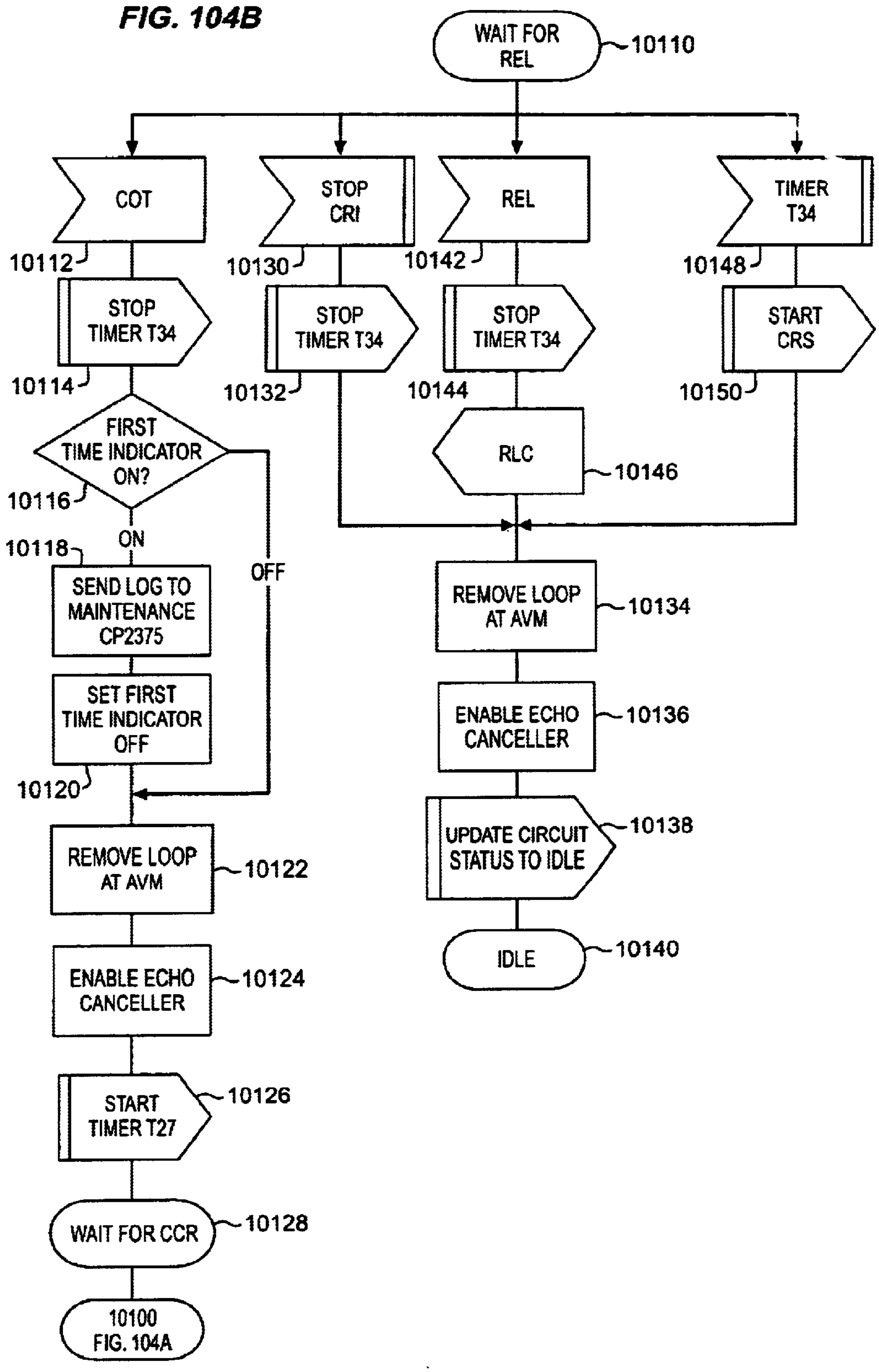

FIGS. 104A–104B illustrate the loop back acknowledgement process. The process is idle at 10098. A CCR is received at 10100, and a loop is connected to the mux at 10102. An LPA is sent at 10104, and the echo canceller is disabled at 10106. The T34 timer is started at 10108, and the process continues at 10110.

The process waits for an REL at 10110. If a COT is received at 10112, the T34 timer is stopped at 10114. If the first time indicator is set to on at 10116, a log is sent to maintenance at 10118. The first time indicator is set to off at 10120. After step 10120 or if the first time indicator is set to off at 10116, the loop is removed from the mux at 10122. The echo canceller is enabled at 10124. The T27 timer is started at 10126, and the process waits for a CCR at 10128. The process then continues at step 10100.

If a stop CRI is initiated at 10130, the T34 timer is stopped at 10132. The loop is removed at the mux at 10134, and the echo canceller is enabled at 10136. The circuit status is updated to idle at 10138,: and idle is attained at 10140.

If an REL is received at 10142, the T34 timer is stopped at 10144. An RLC is sent at 10146, and the loop is removed from the mux at 10134. The echo canceller is enabled at 10136, and the circuit status is updated to idle at 10138. Idle then attained at 10140.

If the T34 timer expires at 10148, the CRS process is started at 10150. The loop is removed at the mux at 10134, and the echo canceller is enabled at 10136. The circuit status is updated to idle at 10138, and idle is attained at 10140.

Those skilled in the art will appreciate that variations from the specific embodiments disclosed above are contemplated by the invention. The invention should not be restricted to the above embodiments, but should be measured by the following claims.

What is claimed is:

1. A system that processes a call, the system comprising:

a call processing logic module comprising:

an origination process module adapted to process signaling information parameters that relate to an originating circuit to determine if a first terminating circuit should be selected; and a termination process module adapted to process the signaling information parameters to select the first terminating circuit and a second terminating circuit;

a processor adapted to execute the call processing logic module to select the first terminating circuit and the second terminating circuit; and a connection system comprising an interworking unit and an asynchronous transfer mode matrix, wherein the interworking unit is adapted to connect the first terminating circuit to the originating circuit, and wherein the asynchronous transfer mode matrix is adapted to connect, the second terminating circuit to the first terminating circuit.

2. The system of claim 1 wherein the processor further is adapted to process the call processing logic module to determine new signaling information parameters.

3. The system of claim 2 wherein the processor further is adapted to create new call signaling and to transmit the new call signaling.

4. The system of claim 1 wherein the termination process module further is adapted to determine new signaling information parameters.

5. The system of claim 1 wherein the processor further is adapted to create at least one control message identifying the first termination circuit and the second termination circuit and to transmit the control message to the connection system.

6. The system of claim 5 wherein the processor is adapted to create a first control message identifying the first terminating circuit, to create a second control message identifying the second terminating circuit, and to transmit the first control message and the second control message to the connection system.

7. The system of claim 1 wherein the processor is adapted to transmit at least one control message to the connection system identifying the first terminating circuit and the second terminating circuit.

8. The system of claim 1 wherein the termination process module comprises:

a routing process module adapted to determine a correct route; and a termination call control process module adapted to establish the first termination circuit and the second termination circuit that corresponds to the route.

9. The system of claim 1 further comprising:

a maintenance process module adapted to process information parameters to maintain the originating circuit, the first terminating circuit, and the second terminating circuit; and wherein the processor further is adapted to execute the maintenance process module to maintain the originating circuit, the first terminating circuit, and the second terminating circuit.

10. The system of claim 1 further comprising at least one data structure having call-associated data and wherein the termination process module is adapted to process the signaling information parameters with the call-associated data in the data structures to select the first terminating circuit and the second terminating circuit.

11. The system of claim 10 wherein the data structure comprises a circuit data structure that contains information pertinent to circuit connections.

12. The system of claim 10 wherein the data structure comprises a time division multiplex circuit data structure that contains information pertinent to time division multiplex circuit connections.

13. The system of claim 10 wherein the data structure comprises an asynchronous transfer mode circuit data structure that contains information pertinent to asynchronous transfer mode circuit connections.

14. The system of claim 10 wherein the data structure comprises a trunk group data structure that contains information pertinent to trunk group connections.

15. The system of claim 10 wherein the data structure comprises a carrier data structure that contains information pertinent to a carrier of the call.

16. The system of claim 10 wherein the data structure comprises an exception data structure that contains information pertinent to call route exceptions.

17. The system of claim 10 wherein the data structure comprises a line information data structure that contains information pertinent to information digits transmitted from a carrier.

18. The system of claim 10 wherein the data structure comprises a caller number data structure that contains information pertinent to caller numbers.

19. The system of claim 10 wherein the data structure comprises a called number screening data structure that contains information pertinent to a trigger detection point for a ported number query.

20. The system of claim 10 wherein the data structure comprises a called number data structure that contains information pertinent to called numbers.

21. The system of claim 10 wherein the data structure comprises a local routing number data structure that contains information pertinent to routing requirements for a ported number.

22. The system of claim 10 wherein the data structure comprises a routing data structure that contains information pertinent to call route selections.

23. The system of claim 10 wherein the data structure comprises a class of service data structure that contains information pertinent to a class of service of trunks.

24. The system of claim 10 wherein the data structure comprises a day of week data structure that contains information pertinent to a day of week of the call.

25. The system of claim 10 wherein the data structure comprises a day of year data structure that contains information pertinent to a day of year of the call.

26. The system of claim 10 wherein the data structure comprises a time of day data structure that contains information pertinent to a time of day of the call.

27. The system of claim 10 wherein the data structure comprises a time zone data structure that contains information pertinent to a time zone of the call.

28. The system of claim 10 wherein the data structure comprises a treatment data structure that contains information pertinent to an error of the call.

29. The system of claim 10 wherein the data structure comprises an outgoing release data structure that contains information pertinent to an outgoing release message for the call.

30. The system of claim 1 further comprising at least one data structure having call-associated data and wherein the origination process module is adapted to process the signaling information parameters with the call-associated data in the data structures to determine if the first terminating circuit should be selected.

31. The system of claim 30 wherein the data structure comprises a circuit data structure that contains information pertinent to circuit connections.

32. The system of claim 30 wherein the data structure comprises a time division multiplex circuit data structure that contains information pertinent to time division multiplex circuit connections.

33. The system of claim 30 wherein the data structure comprises an asynchronous transfer mode circuit data structure that contains information pertinent to asynchronous transfer mode circuit connections.

34. The system of claim 30 wherein the data structure comprises a trunk group data structure that contains information pertinent to trunk group connections.

35. The system of claim 30 wherein the data structure comprises a carrier data structure that contains information pertinent to a carrier of the call.

36. The system of claim 30 wherein the data structure comprises an exception data structure that contains information pertinent to call route exceptions.

37. The system of claim 30 wherein the data structure comprises a line information data structure that contains information pertinent to information digits transmitted from a carrier.

38. The system of claim 30 wherein the data structure comprises a caller number data structure that contains information pertinent to caller numbers.

39. The system of claim 30 wherein the data structure comprises a called number screening data structure that contains information pertinent to a trigger detection point for a ported number query.

40. The system of claim 30 wherein the data structure comprises a treatment data structure that contains information pertinent to an error of a call.

41. The system of claim 1 further comprising at least one data structure having call-associated data and wherein the processor further is adapted to process the call processing logic module with the call-associated data in the data structures to determine new signaling information parameters.

42. The system of claim 41 wherein the data structure comprises a message mapping data structure that contains information pertinent to new signaling parameters.

43. The system of claim 41 wherein the data structure comprises a database services data structure that contains information pertinent to a type of database service requested by the call processing logic module.

44. The system of claim 41 wherein the data structure comprises a signaling connection control part data structure that contains information pertinent to building a signaling connection control part message.

45. The system of claim 41 wherein the data structure comprises a transactions capabilities application part data structure that contains information pertinent to building a transactions capabilities application part message.

46. The system of claim 41 wherein the data structure comprises a network identification data structure that contains information pertinent to a network used to route a signaling connection control part message.

47. The system of claim 41 wherein the data structure comprises a advanced intelligent network event parameters data structure that contains information pertinent to parameters to be included in a transactions capabilities application part message.

48. The system of claim 41 wherein the data structure comprises a treatment data structure that contains information pertinent to an error of a call.

49. The system of claim 1 wherein the signaling information parameters comprise local number portability parameters.

50. The system of claim 1 wherein the origination process module further is adapted to determine that additional signaling information parameters are needed so that the termination process module can select the first terminating circuit and the second termination circuit.

51. The system of claim 50 wherein the additional signaling information parameters comprises local number portability parameters.

52. The system of claim 51 wherein the termination process module processes the local number portability parameters to select the first termination circuit and the second termination circuit.

53. The system of claim 1 wherein the origination process module is adapted to perform automatic congestion control.

54. The system of claim 1 wherein the origination process module is adapted to determine glare control requirements for the call.

55. The system of claim 1 wherein the origination process module is adapted to determine continuity check requirements for the call.

56. The system of claim 1 wherein the termination process module is adapted to determine echo control requirements for the call.

57. The system of claim 1 further comprising at least one data structure having connection system-associated data and wherein the processor further is adapted to process the call processing logic module with the connection system-associated data in the data structures.

58. The system of claim 57 wherein the data structure comprises an interworking unit data structure that contains connection address information.

59. The system of claim 57 wherein the data structure comprises an external echo canceller data structure that contains information pertinent to an external echo canceller used for the call.

60. The system of claim 57 wherein the data structure comprises an asynchronous transfer mode matrix data structure that contains information pertinent to an asynchronous transfer mode matrix used for the call.

61. The system of claim 1 wherein the processor and the call processing logic module are not on a bearer path.

62. The system of claim 1 wherein the first terminating circuit comprises an asynchronous transfer mode circuit and the second terminating circuit comprises another asynchronous transfer mode circuit.

63. The system of claim 1 wherein the first terminating circuit comprises an asynchronous transfer mode circuit and the second terminating circuit comprises a time division multiplex circuit.

64. A system that processes a call, the system comprising:

a call processing logic module comprising:

an origination process module adapted to process signaling information parameters that relate to an originating circuit to determine whether a call attempt is to be authorized; and a termination process module adapted to process the signaling information parameters to select a first terminating circuit and a second terminating circuit;

a processor adapted to execute the call processing logic module to select the first terminating circuit and the second terminating circuit; and a connection system comprising an interworking unit and an asynchronous transfer mode matrix, wherein the interworking unit is adapted to connect the first terminating circuit to the originating circuit, and wherein the asynchronous transfer mode matrix is adapted to connect the second terminating circuit to the first terminating circuit.

65. A system that processes a call, the system comprising:

a call processing logic module comprising:

an origination process module adapted to process signaling information parameters that relate to an originating circuit to determine whether the call is to be accepted; and a termination process module adapted to process the signaling information parameters to select a first terminating circuit and a second terminating circuit;

a processor adapted to execute the call processing logic module to select the first terminating circuit and the second terminating circuit; and a connection system comprising an interworking unit and an asynchronous transfer mode matrix, wherein the interworking unit is adapted to connect the first terminating circuit to the originating circuit, and wherein the asynchronous transfer mode matrix is adapted to connect the second terminating circuit to the first terminating circuit.

66. A system that processes a call, the system comprising:

a call processing logic mode comprising:

an origination process module adapted to process signaling information parameters that relate to an originating circuit to determine additional signaling information parameters that relate to the originating circuit are needed and to collect the additional signaling information parameters; and a termination process module adapted to process the signaling inflammation parameters and the additional signaling information parameters to select a first terminating circuit and a second terminating circuit;

a processor adapted to execute the call processing logic module to select the first terminating circuit and the second terminating circuit; and a connection system comprising an interworking unit and an asynchronous transfer mode matrix, wherein the interworking unit is adapted to connect the first terminating circuit to the originating circuit, and wherein the asynchronous transfer mode matrix is adapted to connect the second terminating circuit to the first terminating circuit.

67. A system that processes a call, the system comprising:

a call processing logic module comprising:

an origination process module adapted to process signaling information parameters that relate to an originating circuit and to segment the call for particular processing based on the signaling information parameters; and a termination process module adapted to process the signaling information parameters with particular processing to select a first terminating circuit and a second terminating circuit;

a processor adapted to execute the call processing logic module to select the first terminating circuit and the second terminating circuit; and a connection system comprising an interworking unit and an asynchronous transfer mode matrix, wherein the interworking unit is adapted to connect the first terminating circuit to the originating circuit, and wherein the asynchronous transfer mode matrix is adapted to connect the second terminating circuit to the first terminating circuit.

68. A system that processes a call, the system comprising:

a call processing logic module comprising:

a termination process module adapted to process signaling information parameters to select a first terminating circuit and a second terminating circuit; and an origination process module adapted to error check the signaling information parameters that relate to an originating circuit to determine if the signaling information parameters can be processed by the termination process module to select the first terminating circuit and the second terminating circuit;

a processor adapted to execute the call processing logic module to select the first terminating circuit and the second terminating circuit; and a connection system comprising an interworking unit and an asynchronous transfer mode matrix, wherein the interworking unit is adapted to connect the first terminating circuit to the originating circuit, and wherein the asynchronous transfer mode matrix is adapted to connect the second terminating circuit to the first terminating circuit.

69. A system that processes a call, the system comprising:

a call processing logic module comprising:

a termination process module adapted to process signaling information parameters to select a first terminating circuit and a second terminating circuit; and an origination process module adapted to obtain signaling information parameters that relate to an originating circuit in order to allow the termination process module to select the first terminating circuit and the second terminating circuit;

a processor adapted to execute the call processing logic module to select the first terminating circuit and the second terminating circuit; and a connection system comprising an interworking unit and an asynchronous transfer mode matrix, wherein the interworking unit is adapted to connect the first terminating circuit to the second terminating circuit, and wherein the asynchronous transfer mode matrix is adapted to connect the first terminating circuit to the originating circuit.

70. A method of processing a call, the method comprising:

in a processor, receiving signaling information parameters relating to an originating circuit for the call;

in the processor, processing the signaling information parameters using call-associated data in data structures to determine if the call can be connected through a connection system that includes an interworking unit and an asynchronous transfer mode matrix;

in the processor, selecting a first terminating circuit and a second terminating circuit based on the call-associated data;

transmitting a first control message from the processor to the interworking unit indicating the originating circuit and the first terminating circuit;

in the interworking unit, connecting the first terminating circuit to the originating circuit based on the first control message;

transmitting a second control message to the asynchronous transfer mode matrix indicating the first terminating circuit and the second terminating circuit;

in the asynchronous transfer mode matrix, connecting the second terminating circuit to the first terminating circuit based on the second control message; and in the interworking unit, interworking communications for the call through the connection system.

71. The method of claim 70 wherein the data structures comprise a circuit data structure that contains information pertinent to circuit connections.

72. The method of claim 71 wherein the data structures comprise a time division multiplex circuit data structure that contains information pertinent to time division multiplex circuit connections.

73. The method of claim 71 wherein the data structures comprise an asynchronous transfer mode circuit data structure that contains information pertinent to asynchronous transfer mode circuit connections.

74. The method of claim 71 wherein the data structures comprise a trunk group data structure that contains information pertinent to trunk group connections.

75. The method of claim 71 wherein the data structures comprise a carrier data structure that contains information pertinent to a carrier of the call.

76. The method of claim 71 wherein the data structures comprise an exception data structure that contains information pertinent to call route exceptions.

77. The method of claim 71 wherein the data structures comprise a line information data structure that contains information pertinent to information digits transmitted from a carrier.

78. The method of claim 71 wherein the data structures comprise a caller number data structure that contains information pertinent to caller numbers.

79. The method of claim 71 wherein the data structures comprise a called number screening data structure that contains information pertinent to a trigger detection point for a ported number query.

80. The method of claim 71 wherein the data structures comprise a called number data structure that contains information pertinent to called numbers.

81. The method of claim 71 wherein the data structures comprise a local routing number data structure that contains information pertinent to routing requirements for a ported number.

82. The method of claim 71 wherein the data structures comprise a routing data structure that contains information pertinent to call route selections.

83. The method of claim 71 wherein the data structures comprise a class of service data structure that contains information pertinent to a class of service of trunks.

84. The method of claim 71 wherein the data structures comprise a day of year data structure that contains information pertinent to a day of year of the call.

85. The method of claim 71 wherein the data structures comprise a day of week data structure that contains information pertinent to a day of week of the call.

86. The method of claim 71 wherein the data structures comprise a time of day data structure that contains information pertinent to a time of day of the call.

87. The method of claim 71 wherein the data structures comprise a time zone data structure that contains information pertinent to a time zone of the call.

88. The method of claim 71 wherein the data structures comprise a treatment data structure that contains information pertinent to an error of the call.

89. The method of claim 71 wherein the data structures comprise an outgoing release data structure that contains information pertinent to an outgoing release message for the call.

90. The method of claim 71 wherein the data structures comprise a message mapping data structure that contains information pertinent to new signaling parameters.

91. The method of claim 71 wherein the data structures comprise a database services data structure that contains information pertinent to a type of database service requested by the call processing logic module.

92. The method of claim 71 wherein the data structures comprise a signaling connection control part data structure that contains information pertinent to building a signaling connection control part message.

93. The method of claim 71 wherein the data structures comprise a transactions capabilities application part data structure that contains information pertinent to building a transactions capabilities application part message.

94. The method of claim 71 wherein the data structures comprise a network identification data structure that contains information pertinent to a network used to route a signaling connection control part message.

95. The method of claim 71 wherein the data structures comprise an advanced intelligent network event parameters data structure that contains information pertinent to parameters to be included in a transactions capabilities application part message.

96. The method of claim 70 wherein the processor is adapted to execute an origination process module wherein the origination process module determines if the call can be connected through the connection system.

97. The method of claim 70 wherein the processor is adapted to execute a termination process module wherein the termination process module selects the first terminating circuit and the second termination circuit based on the call-associated data.

* * * * *